US010239256B2

(12) United States Patent
Holman et al.

(10) Patent No.: US 10,239,256 B2
(45) Date of Patent: Mar. 26, 2019

(54) FOOD PRINTING ADDITIVE LAYERING SUBSTRATE STRUCTURE INGESTIBLE MATERIAL PREPARATION SYSTEM AND METHOD

(71) Applicant: Elwha LLC, Bellevue, WA (US)

(72) Inventors: Paul Holman, Seattle, WA (US); Royce A. Levien, Lexington, MA (US); Mark A. Malamud, Seattle, WA (US); Neal Stephenson, Seattle, WA (US); Christopher Charles Young, Seattle, WA (US)

(73) Assignee: Elwha LLC, Bellevue, WA (US)

(*) Notice: Subject to any disclaimer, the term of this patent is extended or adjusted under 35 U.S.C. 154(b) by 674 days.

(21) Appl. No.: 14/750,950

(22) Filed: Jun. 25, 2015

(65) Prior Publication Data

US 2016/0021925 A1 Jan. 28, 2016

Related U.S. Application Data

(63) Continuation-in-part of application No. 13/590,774, filed on Aug. 21, 2012, now abandoned, and a (Continued)

(51) Int. Cl.

*B29C 64/20* (2017.01)
*A23L 5/00* (2016.01)
(Continued)

(52) U.S. Cl.

CPC ................ *B29C 64/20* (2017.08); *A23L 5/00* (2016.08); *A23P 20/00* (2016.08); *A23P 20/20* (2016.08);

(Continued)

(58) Field of Classification Search

CPC ..................................................... B29C 64/20
See application file for complete search history.

(56) References Cited

U.S. PATENT DOCUMENTS

| | | |
|---|---|---|
| 22,225 A | 12/1858 | Berry |
| 88,023 A | 3/1869 | Estell |

(Continued)

FOREIGN PATENT DOCUMENTS

| | | |
|---|---|---|
| EP | 1 469 431 B1 | 9/2009 |

OTHER PUBLICATIONS

Conners et al.; "Using a Visual Plate Waste Study to Monitor Menu Performance"; Journal of the American Dietetic Association; 2004; pp. 94-96; vol. 104; American Dietetic Association.

(Continued)

*Primary Examiner* — Timothy Kennedy

(57) ABSTRACT

A computationally implemented system and method that is designed to, but is not limited to: electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information and the electronically receiving the selection information. In addition to the foregoing, other method aspects are described in the claims, drawings, and text forming a part of the present disclosure.

20 Claims, 149 Drawing Sheets

Related U.S. Application Data continuation-in-part of application No. 13/560,477, filed on Jul. 27, 2012, now abandoned, and a continuation-in-part of application No. 13/560,447, filed on Jul. 27, 2012, now abandoned, and a continuation-in-part of application No. 13/554,237, filed on Jul. 20, 2012, now Pat. No. 9,619,958, and a continuation-in-part of application No. 13/554,194, filed on Jul. 20, 2012, now abandoned, and a continuation-in-part of application No. 13/548,633, filed on Jul. 13, 2012, now abandoned, and a continuation-in-part of application No. 13/548,671, filed on Jul. 13, 2012, now Pat. No. 10,104,904, and a continuation-in-part of application No. 13/535,855, filed on Jun. 28, 2012, now abandoned, and a continuation-in-part of application No. 13/535,902, filed on Jun. 28, 2012, now abandoned, and a continuation-in-part of application No. 13/528,298, filed on Jun. 20, 2012, now abandoned, and a continuation-in-part of application No. 13/528,331, filed on Jun. 20, 2012, now Pat. No. 10,121,218, and a continuation-in-part of application No. 13/494,536, filed on Jun. 12, 2012, now abandoned, and a continuation-in-part of application No. 13/494,654, filed on Jun. 12, 2012, now abandoned.

(51) Int. Cl.

| | |
|---|---|
| ***A23P 20/00*** | (2016.01) |
| ***A23P 20/20*** | (2016.01) |
| *B33Y 30/00* | (2015.01) |
| *B33Y 50/02* | (2015.01) |
| *A23P 20/25* | (2016.01) |

(52) U.S. Cl.
CPC ......... *A23P 2020/253* (2016.08); *B33Y 30/00* (2014.12); *B33Y 50/02* (2014.12)

(56) References Cited

U.S. PATENT DOCUMENTS 116,634 A 7/1871 Schwerin
260,918 A 7/1882 Yule et al.
249,129 A 2/1884 Heffernan
303,872 A 8/1884 Barton et al.
3,040,935 A * 6/1962 Lopata .................. A21C 11/16 200/33 B
3,702,583 A 11/1972 Ruliman
4,127,232 A 11/1978 Gagliardo et al.
4,452,132 A 6/1984 Miller et al.
4,666,204 A 5/1987 Reinholtz
4,723,614 A 2/1988 Lahti
4,796,182 A 1/1989 Duboff
4,797,818 A 1/1989 Cotter
4,974,747 A 12/1990 Ahlstrom
5,121,677 A 6/1992 Le Claire et al.
5,132,914 A 7/1992 Cahlander et al.
5,197,376 A 3/1993 Bird et al.
5,228,382 A 7/1993 Hayashi et al.
5,408,443 A 4/1995 Weinberger
5,522,309 A 6/1996 Mizobuchi et al.
5,522,310 A 6/1996 Black, Sr. et al.
5,598,947 A 2/1997 Smith
5,615,778 A 4/1997 Kaiser et al.
5,736,940 A 4/1998 Burgener
6,032,574 A 3/2000 Brayton et al.
6,112,182 A 8/2000 Akers et al.
6,105,818 A 9/2000 Speranza
6,137,686 A 10/2000 Saye
6,202,923 B1 3/2001 Boyer et al.
6,280,784 B1 8/2001 Yang et al.
6,280,785 B1 8/2001 Yang et al.
6,317,686 B1 11/2001 Ran
6,359,239 B1 3/2002 Missler et al.
6,415,555 B1 7/2002 Montague
6,490,870 B1 12/2002 Efremkine
6,618,062 B1 9/2003 Brown et al.
6,646,659 B1 11/2003 Brown et al.
6,658,990 B1 12/2003 Henning et al.
6,660,317 B1 12/2003 Akutagawa
6,660,982 B2 12/2003 Thorneywork
6,841,185 B2 1/2005 Sargent et al.
6,843,166 B1 1/2005 Li
6,859,215 B1 2/2005 Brown et al.
6,865,261 B1 3/2005 Rao et al.
7,027,996 B2 4/2006 Levinson
7,110,964 B2 9/2006 Tengler et al.
7,183,518 B2 2/2007 Near et al.
7,188,082 B2 3/2007 Keane et al.
7,200,644 B1 4/2007 Flanagan
7,231,917 B2 6/2007 Frederiksen
7,286,258 B2 10/2007 Schnoebelen et al.
7,343,174 B2 3/2008 Suryanarayana et al.
7,392,193 B2 6/2008 Mault
7,415,375 B2 8/2008 Shakman et al.
7,571,586 B1 8/2009 Morales
7,680,690 B1 3/2010 Catalano
7,762,181 B2 7/2010 Boland et al.
7,858,136 B2 12/2010 Park et al.
7,974,873 B2 7/2011 Simmons et al.
8,190,447 B2 5/2012 Hungerford et al.
8,204,757 B2 6/2012 Carlson et al.
8,321,364 B1 11/2012 Gharpure et al.
8,412,588 B1 4/2013 Bodell et al.
8,688,277 B2 4/2014 Studor et al.
8,744,618 B2 6/2014 Peters et al.
8,793,588 B2 7/2014 DiPietro
8,846,122 B2 9/2014 Rumbaut et al.
9,165,117 B2 10/2015 Teller et al.
9,240,028 B2 1/2016 Holman et al.
9,703,928 B2 7/2017 Mochizuki et al.
9,744,721 B2 8/2017 Klaber
2001/0005830 A1 6/2001 Kuroyanagi
2001/0028308 A1 10/2001 De La Huerga
2002/0029149 A1 3/2002 Nishina
2002/0035503 A1 3/2002 Matsumoto
2002/0042726 A1 4/2002 Mayaud
2002/0050526 A1 5/2002 Swartz et al.
2002/0055878 A1 5/2002 Burton et al.
2002/0069097 A1 6/2002 Conrath
2002/0116634 A1 8/2002 Okubo
2002/0165787 A1 11/2002 Bates et al.
2002/0174025 A1 11/2002 Hind et al.
2003/0024946 A1 2/2003 Severino
2003/0050854 A1 3/2003 Showghi et al.
2003/0051606 A1 3/2003 Cusenza et al.
2003/0069745 A1 4/2003 Zenko
2003/0071806 A1 4/2003 Annand
2003/0099157 A1 5/2003 Quine
2003/0105555 A1 6/2003 Lunak et al.
2003/0121929 A1 7/2003 Liff et al.
2003/0125963 A1 7/2003 Haken
2003/0125986 A1 7/2003 Collosi
2003/0197005 A1 10/2003 Huegerich et al.
2003/0220713 A1 11/2003 Owens
2003/0236682 A1 12/2003 Heyer
2003/0236706 A1 12/2003 Weiss
2004/0015403 A1 1/2004 Moskowitz et al.
2004/0025701 A1 2/2004 Colston et al.
2004/0044469 A1 3/2004 Bender et al.
2004/0044489 A1 3/2004 Jones et al.
2004/0054554 A1 3/2004 Barts et al.
2004/0073448 A1 4/2004 Barts et al.
2004/0073449 A1 4/2004 Yang
2004/0091843 A1 5/2004 Albro et al.
2004/0143503 A1 7/2004 Suthar
2004/0172169 A1 9/2004 Wright, IV et al.
2004/0183796 A1 9/2004 Velde et al.
2004/0193325 A1 9/2004 Bonderud et al.
2004/0193495 A1 9/2004 Kim
2004/0214597 A1 10/2004 Suryanarayana et al.
2004/0226775 A1 11/2004 Takatama et al.

(56) References Cited

U.S. PATENT DOCUMENTS

2004/0238555 A1 12/2004 Parks
2004/0246819 A1 12/2004 Quine
2004/0263319 A1 12/2004 Huomo
2005/0038719 A1 2/2005 Young et al.
2005/0048461 A1 3/2005 Lahteenmaki
2005/0059849 A1 3/2005 Liu
2005/0060063 A1 3/2005 Reichelt et al.
2005/0065640 A1 3/2005 Mallett et al.
2005/0080650 A1 4/2005 Noel
2005/0090425 A1 4/2005 Reardan et al.
2005/0098169 A1 5/2005 Frederiksen
2005/0113968 A1 5/2005 Williams et al.
2005/0171663 A1 8/2005 Mittelsteadt et al.
2005/0226975 A1* 10/2005 Drouillard ............ A23N 15/00 426/383
2005/0241497 A1 11/2005 Cantu
2005/0267811 A1 12/2005 Almblad
2005/0280544 A1 12/2005 Mishelevich
2006/0015289 A1 1/2006 Shakman et al.
2006/0053184 A1 3/2006 Grana
2006/0081653 A1 4/2006 Boland et al.
2006/0108415 A1 5/2006 Thomas et al.
2006/0182240 A1 8/2006 Schelberg, Jr. et al.
2006/0191885 A1 8/2006 Near et al.
2006/0224419 A1 10/2006 Servizio et al.
2006/0260601 A1 11/2006 Schedeler et al.
2006/0263501 A1 11/2006 Oghafua et al.
2006/0277066 A1 12/2006 Hungerford et al.
2006/0278093 A1 12/2006 Biderman et al.
2007/0027432 A1 2/2007 Radford et al.
2007/0038476 A1 2/2007 Sternlicht
2007/0038727 A1 2/2007 Bailey et al.
2007/0055550 A1 3/2007 Courtney et al.
2007/0088624 A1 4/2007 Vaughn et al.
2007/0150371 A1 6/2007 Gangji
2007/0150375 A1 6/2007 Yang
2007/0168205 A1 7/2007 Carlson et al.
2007/0170049 A1 7/2007 Mansur
2007/0170195 A1 7/2007 Segiet et al.
2007/0183633 A1 8/2007 Hoffmann
2007/0185785 A1 8/2007 Carlson et al.
2007/0267441 A1 11/2007 van Opstal et al.
2007/0271001 A1 11/2007 Ratnakar
2007/0292573 A1 12/2007 Smith
2007/0294129 A1 12/2007 Froseth et al.
2008/0141315 A1 6/2008 Ogilvie
2008/0162181 A1 7/2008 Ben-Haim et al.
2008/0163762 A1 7/2008 Weiss
2008/0171967 A1 7/2008 Blomquist et al.
2008/0172261 A1 7/2008 Albertson et al.
2008/0189143 A1 8/2008 Wurster
2008/0195247 A1 8/2008 Mallett et al.
2008/0249859 A1 10/2008 Angell et al.
2008/0260918 A1 10/2008 Lai et al.
2008/0281915 A1 11/2008 Elad et al.
2008/0314918 A1 12/2008 Nuriely
2009/0043176 A1 2/2009 Nakajima et al.
2009/0087819 A1 4/2009 Adachi et al.
2009/0094033 A1 4/2009 Mozer et al.
2009/0099944 A1 4/2009 Robinson et al.
2009/0106313 A1 4/2009 Boldyga
2009/0106826 A1 4/2009 Palestrant
2009/0142223 A1 6/2009 Hyde et al.
2009/0161907 A1 6/2009 Healey et al.
2009/0198547 A1 8/2009 Sudak
2009/0199105 A1 8/2009 Kamada et al.
2009/0209240 A1 8/2009 Mahowald
2009/0236333 A1 9/2009 Ben-Shmael et al.
2009/0236334 A1 9/2009 Ben-Shmuel et al.
2009/0236335 A1 9/2009 Ben-Shmuel et al.
2009/0259688 A1 10/2009 Do et al.
2009/0261175 A1 10/2009 Kauppinen et al.
2009/0271004 A1 10/2009 Zecchin et al.
2009/0307139 A1 12/2009 Mardikar et al.
2009/0313125 A1 12/2009 Roh et al.
2010/0017296 A1 1/2010 Spignesi, Jr. et al.
2010/0038416 A1 2/2010 Canora
2010/0038594 A1 2/2010 Bohlig et al.
2010/0042427 A1 2/2010 Graham et al.
2010/0043834 A1 2/2010 Sheringer
2010/0045705 A1 2/2010 Vertegaal et al.
2010/0052900 A1 3/2010 Covannon et al.
2010/0062169 A1 3/2010 Pierre
2010/0063889 A1 3/2010 Proctor, Jr. et al.
2010/0121669 A1 5/2010 Madigan
2010/0121722 A1 5/2010 Vawter
2010/0125362 A1 5/2010 Canora et al.
2010/0136666 A1 6/2010 Kobayashi et al.
2010/0160745 A1 6/2010 Hills et al.
2010/0181374 A1 7/2010 Martis et al.
2010/0204676 A1 8/2010 Cardullo
2010/0206765 A1 8/2010 Fonte
2010/0250384 A1 9/2010 Bhargava
2010/0268378 A1 10/2010 Sharpley
2010/0268792 A1 10/2010 Butler et al.
2010/0275625 A1 11/2010 Lowenstein
2010/0291515 A1 11/2010 Pinnisi et al.
2010/0303972 A1 12/2010 Srivastava
2010/0305974 A1 12/2010 Patch et al.
2010/0312601 A1 12/2010 Lin
2010/0328099 A1 12/2010 Wachman et al.
2010/0332140 A1 12/2010 Joyce et al.
2011/0000923 A1 1/2011 Morales
2011/0009715 A1 1/2011 O'Reilly et al.
2011/0022225 A1 1/2011 Rothschild
2011/0022298 A1 1/2011 Kronberg
2011/0031236 A1 2/2011 Ben-Shmuel et al.
2011/0035338 A1 2/2011 Kagan et al.
2011/0040660 A1 2/2011 Allison et al.
2011/0054678 A1 3/2011 Thompson
2011/0055044 A1 3/2011 Wiedl
2011/0060457 A1 3/2011 De Vrught et al.
2011/0080457 A1 4/2011 Nagamine et al.
2011/0133005 A1 6/2011 Chesack
2011/0160902 A1 6/2011 Postins
2011/0180441 A1 7/2011 Bach
2011/0186624 A1 8/2011 Wagner et al.
2011/0208617 A1 8/2011 Weiland
2011/0218839 A1 9/2011 Shamaiengar
2011/0231212 A1 9/2011 Hurley et al.
2011/0300270 A1 12/2011 Koppens
2011/0307316 A1 12/2011 Peters et al.
2011/0318717 A1 12/2011 Adamowicz
2012/0016745 A1 1/2012 Hendrickson
2012/0036046 A1 2/2012 Anderson et al.
2012/0041770 A1 2/2012 Phillippe
2012/0041778 A1 2/2012 Kraft
2012/0088023 A1 4/2012 Begun
2012/0088212 A1 4/2012 Knaan
2012/0089249 A1 4/2012 Rosenblum
2012/0101914 A1 4/2012 Kumar et al.
2012/0131619 A1 5/2012 Ogilvie
2012/0136731 A1 5/2012 Kidron et al.
2012/0137325 A1 5/2012 Ogilvie
2012/0232484 A1 9/2012 Blomquist
2012/0246004 A1 9/2012 Book et al.
2012/0262039 A1 10/2012 Daugbjerg et al.
2012/0284126 A1 11/2012 Giraud et al.
2012/0303425 A1 11/2012 Katzin et al.
2012/0323208 A1 12/2012 Bochenko et al.
2012/0323707 A1 12/2012 Urban
2013/0006415 A1 1/2013 Paydar et al.
2013/0018356 A1 1/2013 Prince et al.
2013/0048023 A1 2/2013 Holman et al.
2013/0048037 A1 2/2013 Holman et al.
2013/0092033 A1 4/2013 Murphy et al.
2013/0151268 A1 6/2013 Fletcher
2013/0158705 A1 6/2013 Levy et al.
2014/0236759 A1 8/2014 Mirabile
2015/0151050 A1 6/2015 Estes
2015/0216201 A1 8/2015 Bruckner et al.
2015/0296865 A1 10/2015 Holman et al.
2015/0302375 A1 10/2015 Holman et al.

(56) References Cited

U.S. PATENT DOCUMENTS

OTHER PUBLICATIONS

Poulter, Sean; "Medicine vending machines that dispense prescriptions 24 hours a day go on trial"; bearing a date of Jun. 22, 2010; created on Nov. 27, 2017; pp. 1-5; located at http://www.dailymail.co.uk/health/article-1288434/Medicine-vending-machine-dispenses-prescriptions-pharmacist-launched.html.

* cited by examiner

*Fig. 57* o11

Start electronically receiving user status information regarding one or more particular individual living beings including living being identification associated with the one or more particular individual living beings and electronically receiving selection information at least in part identifying one or more selected ingestible products being subject to ingestion by the one or more particular individual living beings, the selection information electronically received via electronically enabled input in response to electronically outputted one or more selection menus, the electronically receiving the user status information and the electronically receiving the selection information at least in part to electronically obtain treatment instructional information regarding one or more subsequent depositional operations on one or more portions of one or more ingestible substrate structures o1104 electronically receiving the user status information regarding the one or more particular individual living beings via one or more cell phone swipes o1105 electronically receiving the user status information regarding the one or more particular individual living beings via bar code communication o1106 electronically receiving the user status information regarding the one or more particular individual living beings via Internet communication End

Fig. 59 o11

Start electronically receiving user status information regarding one or more particular individual living beings including living being identification associated with the one or more particular individual living beings and electronically receiving selection information at least in part identifying one or more selected ingestible products being subject to ingestion by the one or more particular individual living beings, the selection information electronically received via electronically enabled input in response to electronically outputted one or more selection menus, the electronically receiving the user status information and the electronically receiving the selection information at least in part to electronically obtain treatment instructional information regarding one or more subsequent depositional operations on one or more portions of one or more ingestible substrate structures o1110 electronically receiving the user status information regarding the one or more particular individual living beings wirelessly o1111 electronically receiving the user status information regarding the one or more particular individual living beings via one or more electronic keypad entries o1112 electronically receiving the user status information regarding the one or more particular individual living beings including the living being identification associated with the one or more particular individual living beings via one or more medication histories End

Fig. 61 o11

Start electronically receiving user status information regarding one or more particular individual living beings including living being identification associated with the one or more particular individual living beings and electronically receiving selection information at least in part identifying one or more selected ingestible products being subject to ingestion by the one or more particular individual living beings, the selection information electronically received via electronically enabled input in response to electronically outputted one or more selection menus, the electronically receiving the user status information and the electronically receiving the selection information at least in part to electronically obtain treatment instructional information regarding one or more subsequent depositional operations on one or more portions of one or more ingestible substrate structures o1116 electronically receiving the user status information regarding the one or more particular individual living beings including the living being identification associated with the one or more particular individual living beings via one or more computer text files o1117 electronically receiving the user status information regarding the one or more particular individual living beings including the living being identification associated with the one or more particular individual living beings via one or more computer audio files o1118 electronically receiving the user status information regarding the one or more particular individual living beings including the living being identification associated with the one or more particular individual living beings via one or more computer video files End

Fig. 63 o11

Start electronically receiving user status information regarding one or more particular individual living beings including living being identification associated with the one or more particular individual living beings and electronically receiving selection information at least in part identifying one or more selected ingestible products being subject to ingestion by the one or more particular individual living beings, the selection information electronically received via electronically enabled input in response to electronically outputted one or more selection menus, the electronically receiving the user status information and the electronically receiving the selection information at least in part to electronically obtain treatment instructional information regarding one or more subsequent depositional operations on one or more portions of one or more ingestible substrate structures o1122 electronically receiving the selection information at least in part identifying the one or more selected ingestible products being subject to ingestion by the one or more particular individual living beings, the selection information electronically received via the electronically enabled input in response to the electronically outputted one or more selection menus in textual form o1123 electronically receiving the selection information at least in part identifying the one or more selected ingestible products being subject to ingestion by the one or more particular individual living beings, the selection information electronically received via the electronically enabled input in response to the electronically outputted one or more selection menus in icon form o1124 electronically receiving the selection information at least in part identifying the one or more selected ingestible products being subject to ingestion by the one or more particular individual living beings, the selection information electronically received via the electronically enabled input in response to the electronically outputted one or more selection menus in graphical form End

*Fig. 64* o11

Start electronically receiving user status information regarding one or more particular individual living beings including living being identification associated with the one or more particular individual living beings and electronically receiving selection information at least in part identifying one or more selected ingestible products being subject to ingestion by the one or more particular individual living beings, the selection information electronically received via electronically enabled input in response to electronically outputted one or more selection menus, the electronically receiving the user status information and the electronically receiving the selection information at least in part to electronically obtain treatment instructional information regarding one or more subsequent depositional operations on one or more portions of one or more ingestible substrate structures o1125 electronically receiving the selection information at least in part identifying the one or more selected ingestible products being subject to ingestion by the one or more particular individual living beings, the selection information electronically received via the electronically enabled input in response to the electronically outputted one or more selection menus in markup language form o1126 electronically receiving the selection information at least in part identifying the one or more selected ingestible products being subject to ingestion by the one or more particular individual living beings, the selection information electronically received via the electronically enabled input in response to the electronically outputted one or more selection menus in audio form o1127 electronically receiving the selection information at least in part identifying the one or more selected ingestible products being subject to ingestion by the one or more particular individual living beings, the selection information electronically received via the electronically enabled input in response to the electronically outputted one or more selection menus in list form End

*Fig. 66* o11

Start electronically receiving user status information regarding one or more particular individual living beings including living being identification associated with the one or more particular individual living beings and electronically receiving selection information at least in part identifying one or more selected ingestible products being subject to ingestion by the one or more particular individual living beings, the selection information electronically received via electronically enabled input in response to electronically outputted one or more selection menus, the electronically receiving the user status information and the electronically receiving the selection information at least in part to electronically obtain treatment instructional information regarding one or more subsequent depositional operations on one or more portions of one or more ingestible substrate structures o1131 electronically receiving the selection information at least in part identifying the one or more selected ingestible products being subject to ingestion by the one or more particular individual living beings, the selection information electronically received via the electronically enabled input in response to the electronically outputted one or more selection menus in ingestible sample form o1132 electronically receiving the user status information regarding the one or more particular individual living beings including the living being identification associated with one or more human beings o1133 electronically receiving the user status information regarding the one or more particular individual living beings including the living being identification associated with one or more electronic identification cards End

Fig. 67 o11

Start electronically receiving user status information regarding one or more particular individual living beings including living being identification associated with the one or more particular individual living beings and electronically receiving selection information at least in part identifying one or more selected ingestible products being subject to ingestion by the one or more particular individual living beings, the selection information electronically received via electronically enabled input in response to electronically outputted one or more selection menus, the electronically receiving the user status information and the electronically receiving the selection information at least in part to electronically obtain treatment instructional information regarding one or more subsequent depositional operations on one or more portions of one or more ingestible substrate structures o1134 electronically receiving the user status information regarding the one or more particular individual living beings including the living being identification associated with one or more electronic iris scans o1135 electronically receiving the user status information regarding the one or more particular individual living beings including the living being identification associated with one or more electronic voice prints o1136 electronically receiving the user status information regarding the one or more particular individual living beings including the living being identification associated with one or more electronically captured fingerprint images End

Fig. 77 o11

Start electronically receiving user status information regarding one or more particular individual living beings including living being identification associated with the one or more particular individual living beings and electronically receiving selection information at least in part identifying one or more selected ingestible products being subject to ingestion by the one or more particular individual living beings, the selection information electronically received via electronically enabled input in response to electronically outputted one or more selection menus, the electronically receiving the user status information and the electronically receiving the selection information at least in part to electronically obtain treatment instructional information regarding one or more subsequent depositional operations on one or more portions of one or more ingestible substrate structures o1164 electronically receiving selection information at least in part identifying one or more selected ingestible products being subject to ingestion by the one or more particular individual living beings, the selection information electronically received via electronically enabled input including via one or more electronic identification cards o1165 electronically receiving selection information at least in part identifying one or more selected ingestible products being subject to ingestion by the one or more particular individual living beings, the selection information electronically received via electronically enabled input including via a memory circuit coupled with one or more medication containers o1166 electronically receiving selection information at least in part identifying one or more selected ingestible products being subject to ingestion by the one or more particular individual living beings, the selection information electronically received via electronically enabled input including via one or more credit card swipes End

*Fig. 79* o11

Start electronically receiving user status information regarding one or more particular individual living beings including living being identification associated with the one or more particular individual living beings and electronically receiving selection information at least in part identifying one or more selected ingestible products being subject to ingestion by the one or more particular individual living beings, the selection information electronically received via electronically enabled input in response to electronically outputted one or more selection menus, the electronically receiving the user status information and the electronically receiving the selection information at least in part to electronically obtain treatment instructional information regarding one or more subsequent depositional operations on one or more portions of one or more ingestible substrate structures o1170 electronically receiving selection information at least in part identifying one or more selected ingestible products being subject to ingestion by the one or more particular individual living beings, the selection information electronically received via electronically enabled input including via electronic network communication o1171 electronically receiving selection information at least in part identifying one or more selected ingestible products being subject to ingestion by the one or more particular individual living beings, the selection information electronically received via electronically enabled input including via touch screen input o1172 electronically receiving selection information at least in part identifying one or more selected ingestible products being subject to ingestion by the one or more particular individual living beings, the selection information electronically received via electronically enabled input including via wireless input End

*Fig. 88* o12

Start electronically directing control of at least partial treatment of the one or more portions of the one or more ingestible substrate structures according to the treatment instructional information regarding the one or more subsequent depositional operations including at least one or more depositions of one or more materials onto the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products o1204 electronically directing control of the one or more depositions of the one or more materials as one or more color modification materials onto the one or more portions of the one or more ingestible substrate structures to modify one or more color properties of the one or more portions of the one or more ingestible substrate structures to form at least in part the one or more selected ingestible products o1205 electronically directing control of the one or more depositions of the one or more materials as one or more surface texture modification materials onto the one or more portions of the one or more ingestible substrate structures to modify one or more surface texture properties of the one or more portions of the one or more ingestible substrate structures to form at least in part the one or more selected ingestible products o1206 electronically directing control of the one or more depositions of the one or more materials as one or more oral sensation modification materials onto the one or more portions of the one or more ingestible substrate structures to modify one or more oral sensation properties of the one or more portions of the one or more ingestible substrate structures to form at least in part the one or more selected ingestible products End

Fig. 95 o12

Start electronically directing control of at least partial treatment of the one or more portions of the one or more ingestible substrate structures according to the treatment instructional information regarding the one or more subsequent depositional operations including at least one or more depositions of one or more materials onto the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products o1225 electronically directing control of the one or more depositions of the one or more materials onto the one or more portions of the one or more ingestible substrate structures to modify one or more properties of the one or more portions of the one or more ingestible substrate structures by at least partially integrating with the one or more portions of the one or more ingestible substrate structures to form at least in part the one or more selected ingestible products o1226 electronically directing control of the one or more depositions of the one or more materials onto the one or more portions of the one or more ingestible substrate structures to modify one or more properties of the one or more portions of the one or more ingestible substrate structures by at least partially softening the one or more portions of the one or more ingestible substrate structures to form at least in part the one or more selected ingestible products o1227 electronically directing control of the one or more depositions of the one or more materials onto the one or more portions of the one or more ingestible substrate structures to modify one or more properties of the one or more portions of the one or more ingestible substrate structures by at least partially hydrating the one or more portions of the one or more ingestible substrate structures to form at least in part the one or more selected ingestible products End

Fig. 103

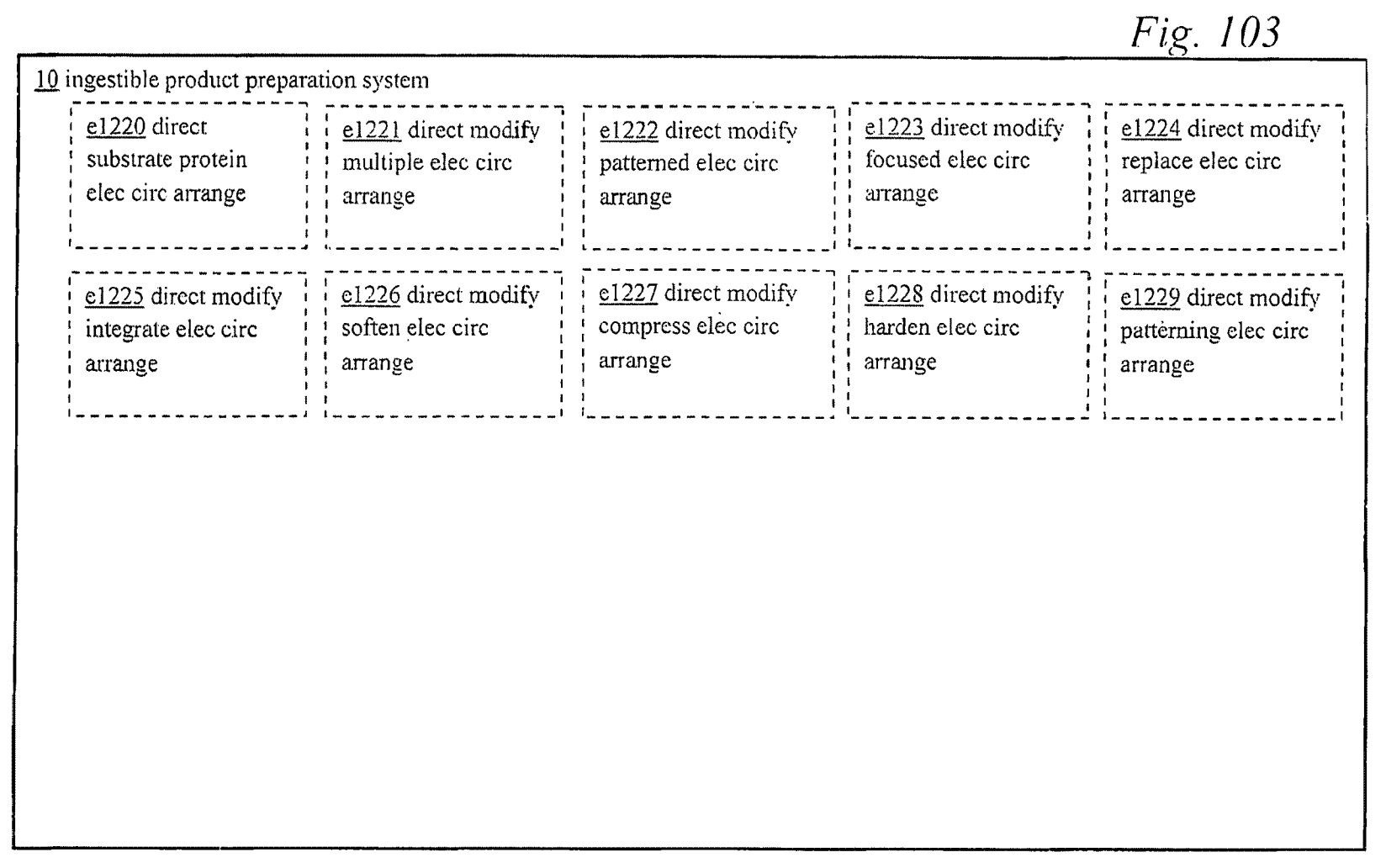

10 ingestible product preparation system

- e1220 direct substrate protein elec circ arrange
- e1221 direct modify multiple elec circ arrange
- e1222 direct modify patterned elec circ arrange
- e1223 direct modify focused elec circ arrange
- e1224 direct modify replace elec circ arrange
- e1225 direct modify integrate elec circ arrange
- e1226 direct modify soften elec circ arrange
- e1227 direct modify compress elec circ arrange
- e1228 direct modify harden elec circ arrange
- e1229 direct modify patterning elec circ arrange

Fig. 118 o10

Start o11 electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures o12 electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products End

*Fig. 122* o11

Start electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures o1110 electronically receiving the user status information regarding the one or more particular individual living beings wirelessly o1111 electronically receiving the user status information regarding the one or more particular individual living beings via one or more electronic keypad entries o1112 electronically receiving the user status information regarding the one or more particular individual living beings including the one or more identifiers associated with the one or more particular individual living beings via one or more restaurant meal orders End

*Fig 123*

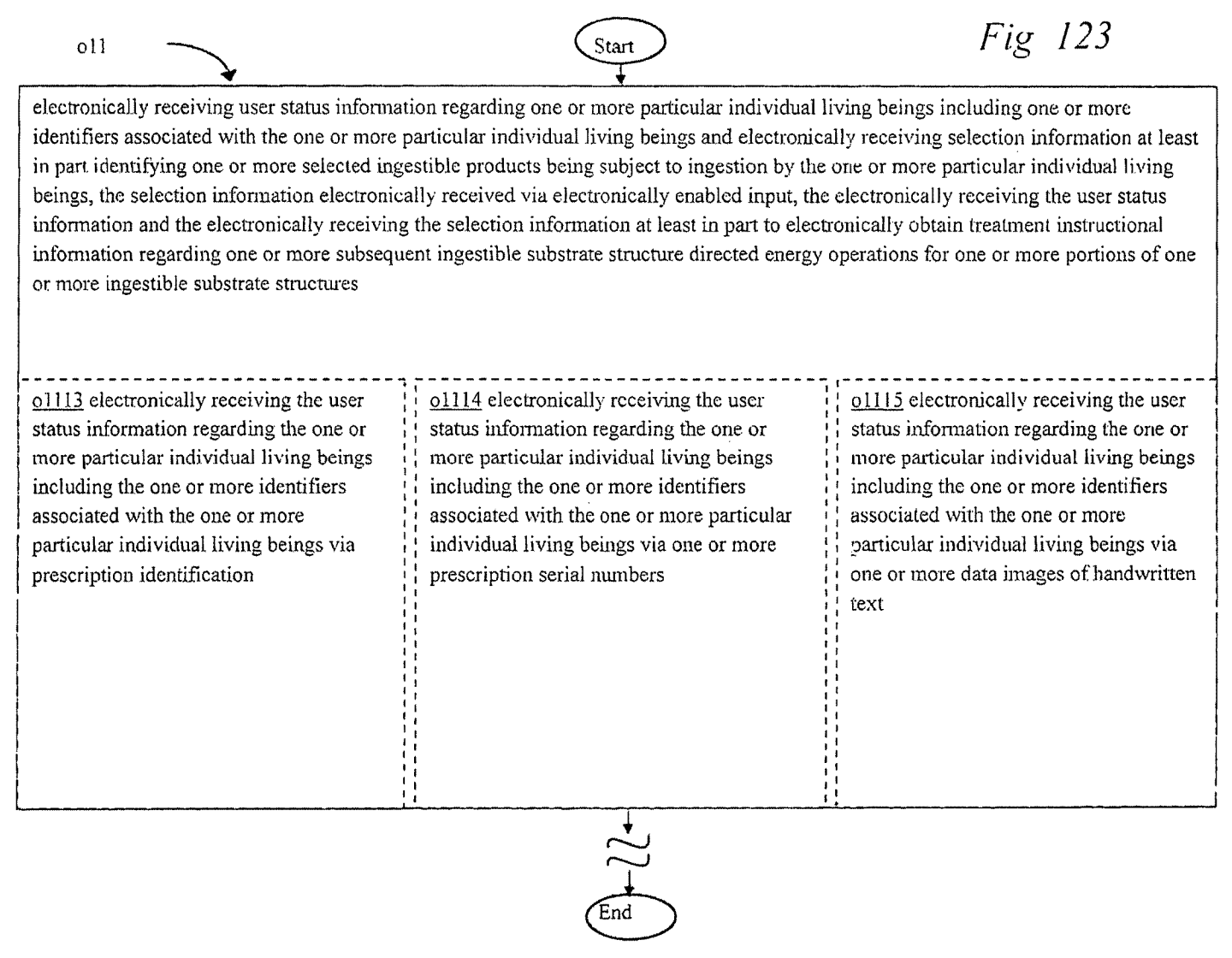

Start o11 electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures o1113 electronically receiving the user status information regarding the one or more particular individual living beings including the one or more identifiers associated with the one or more particular individual living beings via prescription identification o1114 electronically receiving the user status information regarding the one or more particular individual living beings including the one or more identifiers associated with the one or more particular individual living beings via one or more prescription serial numbers o1115 electronically receiving the user status information regarding the one or more particular individual living beings including the one or more identifiers associated with the one or more particular individual living beings via one or more data images of handwritten text End

Fig. 126 o11

Start electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures o1122 electronically receiving the selection information at least in part identifying the one or more selected ingestible products being subject to ingestion by the one or more particular individual living beings, the selection information electronically received via the electronically enabled input in response to the electronically outputted one or more selection menus in textual form o1123 electronically receiving the selection information at least in part identifying the one or more selected ingestible products being subject to ingestion by the one or more particular individual living beings, the selection information electronically received via the electronically enabled input in response to the electronically outputted one or more selection menus in icon form o1124 electronically receiving the selection information at least in part identifying the one or more selected ingestible products being subject to ingestion by the one or more particular individual living beings, the selection information electronically received via the electronically enabled input in response to the electronically outputted one or more selection menus in graphical form End

Fig. 127 o11

Start electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures o1125 electronically receiving the selection information at least in part identifying the one or more selected ingestible products being subject to ingestion by the one or more particular individual living beings, the selection information electronically received via the electronically enabled input in response to the electronically outputted one or more selection menus in markup language form o1126 electronically receiving the selection information at least in part identifying the one or more selected ingestible products being subject to ingestion by the one or more particular individual living beings, the selection information electronically received via the electronically enabled input in response to the electronically outputted one or more selection menus in audio form o1127 electronically receiving the selection information at least in part identifying the one or more selected ingestible products being subject to ingestion by the one or more particular individual living beings, the selection information electronically received via the electronically enabled input in response to the electronically outputted one or more selection menus in list form End

*Fig. 132* o11

Start electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures o1140 electronically receiving the user status information regarding the one or more particular individual living beings including the one or more identifiers associated with one or more fobs o1141 electronically receiving the user status information regarding the one or more particular individual living beings including the one or more identifiers associated with one or more cell phone swipes o1142 electronically receiving the user status information regarding the one or more particular individual living beings including the one or more identifiers associated with one or more breathalyzer tests End

Fig. 133 o11

Start electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures o1143 electronically receiving the selection information at least in part identifying the one or more selected ingestible products to incorporate one or more substances therein during the one or more substrate structure directed energy operations thereof o1144 electronically receiving the selection information at least in part identifying the one or more selected ingestible products to be ingested over a period of days o1145 electronically receiving the selection information at least in part identifying the one or more selected ingestible products to be swallowed End

Fig. 137 o11

Start electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures o1155 electronically receiving the selection information at least in part identifying the one or more selected ingestible products to be used as an assembled concoction o1156 electronically receiving the selection information at least in part identifying the one or more selected ingestible products to be used as a main entrée, a dessert, a liquid drink, an emulsion, a snack, a meal, or a combination thereof o1157 electronically receiving the selection information at least in part identifying the one or more selected ingestible products to be used periodically End

Fig. 138 o11

Start electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures o1158 electronically receiving the selection information at least in part identifying the one or more selected ingestible products being subject to ingestion by the one or more particular individual living beings, the selection information electronically received via the electronically enabled input in response to electronically outputted one or more selection menus including via one or more electronic display screens o1159 electronically receiving the selection information at least in part identifying the one or more selected ingestible products being subject to ingestion by the one or more particular individual living beings, the selection information electronically received via the electronically enabled input in response to electronically outputted one or more selection menus including via one or more audio output devices o1160 electronically receiving the selection information at least in part identifying the one or more selected ingestible products being subject to ingestion by the one or more particular individual living beings, the selection information electronically received via the electronically enabled input in response to electronically outputted one or more selection menus including via one or more network interfaces End

Fig. 140 o11

Start electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input; the electronically receiving the user status information and the electronically receiving the selection information at least in part to electronically obtain treatment instructional information regarding one or more subsequent ingestible substrate structure directed energy operations for one or more portions of one or more ingestible substrate structures o1164 electronically receiving the selection information at least in part identifying the one or more selected ingestible products being subject to ingestion by the one or more particular individual living beings, the selection information electronically received via the electronically enabled input including via one or more electronic identification cards o1165 electronically receiving the selection information at least in part identifying the one or more selected ingestible products being subject to ingestion by the one or more particular individual living beings, the selection information electronically received via the electronically enabled input including via a memory circuit coupled with one or more medication containers o1166 electronically receiving the selection information at least in part identifying the one or more selected ingestible products being subject to ingestion by the one or more particular individual living beings, the selection information electronically received via the electronically enabled input including via one or more credit card swipes End

Fig. 143 o11

Start electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures o1173 electronically receiving the selection information at least in part identifying the one or more selected ingestible products being subject to ingestion by the one or more particular individual living beings, the selection information electronically received via the electronically enabled input including via electronic imaging of the one or more particular individual living beings o1174 electronically receiving the selection information at least in part identifying the one or more selected ingestible products being subject to ingestion by the one or more particular individual living beings, the selection information electronically received via the electronically enabled input including via electronic based gesture recognition o1175 electronically receiving the selection information at least in part identifying the one or more selected ingestible products being subject to ingestion by the one or more particular individual living beings, the selection information electronically received via the electronically enabled input including via electronic audio recording of the one or more particular individual living beings End

*Fig. 150* o12

Start electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products o1201 electronically directing control of the at least partial treatment of the one or more ingestible substrate structures according to the treatment instructional information regarding the one or more subsequent ingestible substrate structure directed energy operations via at least in part one or more directly connected electrical circuits o1202 electronically directing control of the at least partial treatment of the one or more ingestible substrate structures according to the treatment instructional information regarding the one or more subsequent ingestible substrate structure directed energy operations via at least in part electronic computer network communication o1203 electronically directing control of the at least partial treatment of the one or more ingestible substrate structures through electronic circuitry located substantially adjacent to electronic circuitry for the electronically receiving the user status information and the electronically receiving the selection information End

Fig. 151 o12

Start electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products o1204 electronically directing control of the one or more subsequent ingestible substrate structure directed energy operations to treat at least in part the one or more portions of the one or more ingestible substrate structures to influence at least in part one or more color properties of the one or more portions of the one or more ingestible substrate structures to form at least in part the one or more selected ingestible products o1205 electronically directing control of the one or more subsequent ingestible substrate structure directed energy operations at least in part the one or more portions of the one or more ingestible substrate structures to influence at least in part one or more surface texture properties of the one or more portions of the one or more ingestible substrate structures to form at least in part the one or more selected ingestible products o1206 electronically directing control of the one or more subsequent ingestible substrate structure directed energy operations to treat at least in part the one or more portions of the one or more ingestible substrate structures to influence at least in part one or more oral sensation properties of the one or more portions of the one or more ingestible substrate structures to form at least in part the one or more selected ingestible products End

Fig. 152 o12

Start electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products o1207 electronically directing control of the one or more subsequent ingestible substrate structure directed energy operations to treat at least in part the one or more portions of the one or more ingestible substrate structures to influence at least in part one or more sound properties of the one or more portions of the one or more ingestible substrate structures to form at least in part the one or more selected ingestible products o1208 electronically directing control of the one or more subsequent ingestible substrate structure directed energy operations to treat at least in part the one or more portions of the one or more ingestible substrate structures to influence at least in part one or more structural texture properties of the one or more portions of the one or more ingestible substrate structures to form at least in part the one or more selected ingestible products o1209 electronically directing control of the one or more subsequent ingestible substrate structure directed energy operations to treat at least in part the one or more portions of the one or more ingestible substrate structures to influence at least in part one or more olfactory properties of the one or more portions of the one or more ingestible substrate structures to form at least in part the one or more selected ingestible products End

Fig. 154 o12

Start electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products o1213 electronically directing control of the one or more subsequent ingestible substrate structure directed energy operations to treat at least in part the one or more portions of the one or more ingestible substrate structures to influence at least in part one or more textual patterns of the one or more portions of the one or more ingestible substrate structures to form at least in part the one or more selected ingestible products o1214 electronically directing control of the one or more subsequent ingestible substrate structure directed energy operations including directing energy in laser form to treat the one or more portions of the one or more ingestible substrate structures to influence at least in part one or more properties of the one or more portions of the one or more ingestible substrate structures to form at least in part the one or more selected ingestible products o1215 electronically directing control of the one or more subsequent ingestible substrate structure directed energy operations including directing energy in microwave form to treat at least in part the one or more portions of the one or more ingestible substrate structures to influence at least in part one or more properties of the one or more portions of the one or more ingestible substrate structures to form at least in part the one or more selected ingestible products End

*Fig. 155* o12

Start electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products o1216 electronically directing control of the one or more subsequent ingestible substrate structure directed energy operations including directing energy in acoustic form to treat at least in part the one or more portions of the one or more ingestible substrate structures to influence at least in part one or more properties of the one or more portions of the one or more ingestible substrate structures to form at least in part the one or more selected ingestible products o1217 electronically directing control of the one or more subsequent ingestible substrate structure directed energy operations including directing energy in radiant form to treat at least in part the one or more portions of the one or more ingestible substrate structures to influence at least in part one or more properties of the one or more portions of the one or more ingestible substrate structures to form at least in part the one or more selected ingestible products o1218 electronically directing control of the one or more subsequent ingestible substrate structure directed energy operations to treat at least in part the one or more portions of the one or more ingestible substrate structures to influence at least in part one or more properties of the one or more portions of the one or more ingestible substrate structures as substantially one or more carbohydrates to form at least in part the one or more selected ingestible products End

Fig. 158 o12

Start electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products o1225 electronically directing control of the one or more subsequent ingestible substrate structure directed energy operations to treat at least in part the one or more portions of the one or more ingestible substrate structures to influence at least in part one or more properties of the one or more portions of the one or more ingestible substrate structures by at least partially integrating two or more portions of the one or more ingestible substrate structures to form at least in part the one or more selected ingestible products o1226 electronically directing control of the one or more subsequent ingestible substrate structure directed energy operations to treat at least in part the one or more portions of the one or more ingestible substrate structures to influence at least in part one or more properties of the one or more portions of the one or more ingestible substrate structures by at least partially softening the one or more portions of the one or more ingestible substrate structures to form at least in part the one or more selected ingestible products o1227 electronically directing control of the one or more subsequent ingestible substrate structure directed energy operations to treat at least in part the one or more portions of the one or more ingestible substrate structures to influence at least in part one or more properties of the one or more portions of the one or more ingestible substrate structures by at least partially compressing the one or more portions of the one or more ingestible substrate structures to form at least in part the one or more selected ingestible products End o12

Fig. 159

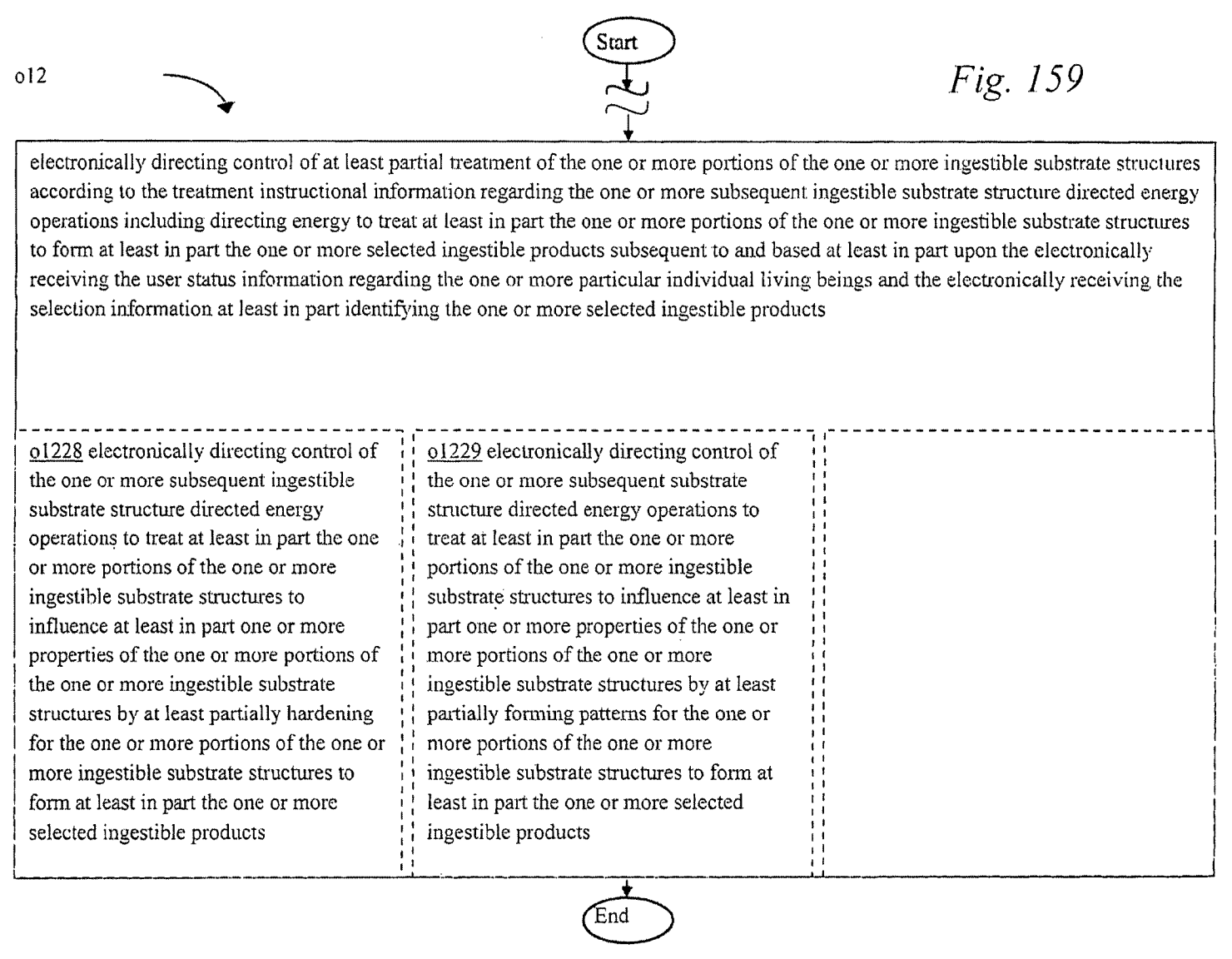

Start electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products o1228 electronically directing control of the one or more subsequent ingestible substrate structure directed energy operations to treat at least in part the one or more portions of the one or more ingestible substrate structures to influence at least in part one or more properties of the one or more portions of the one or more ingestible substrate structures by at least partially hardening for the one or more portions of the one or more ingestible substrate structures to form at least in part the one or more selected ingestible products o1229 electronically directing control of the one or more subsequent substrate structure directed energy operations to treat at least in part the one or more portions of the one or more ingestible substrate structures to influence at least in part one or more properties of the one or more portions of the one or more ingestible substrate structures by at least partially forming patterns for the one or more portions of the one or more ingestible substrate structures to form at least in part the one or more selected ingestible products End

FOOD PRINTING ADDITIVE LAYERING SUBSTRATE STRUCTURE INGESTIBLE MATERIAL PREPARATION SYSTEM AND METHOD

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

For purposes of the USPTO extra-statutory requirements, the present application constitutes a continuation-in-part of U.S. patent application Ser. No. 13/494,536 entitled SUBSTRATE STRUCTURE DEPOSITION TREATMENT SYSTEM AND METHOD FOR INGESTIBLE PRODUCT SYSTEM AND METHOD, naming PAUL HOLMAN, ROYCE A. LEVIEN, MARK A. MALAMUD, NEAL STEPHENSON, AND CHRISTOPHER CHARLES YOUNG as inventors, filed 12 Jun. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/494,654 entitled SUBSTRATE STRUCTURE DEPOSITION TREATMENT SYSTEM AND METHOD FOR INGESTIBLE PRODUCT SYSTEM AND METHOD, naming PAUL HOLMAN, ROYCE A. LEVIEN, MARK A. MALAMUD, NEAL STEPHENSON, AND CHRISTOPHER CHARLES YOUNG as inventors, filed 12 Jun. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/528,298 entitled SUBSTRATE STRUCTURE INJECTION TREATMENT SYSTEM AND METHOD FOR INGESTIBLE PRODUCT SYSTEM AND METHOD, naming PAUL HOLMAN, ROYCE A. LEVIEN, MARK A. MALAMUD, NEAL STEPHENSON, AND CHRISTOPHER CHARLES YOUNG as inventors, filed 20 Jun. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/528,331 entitled SUBSTRATE STRUCTURE INJECTION TREATMENT SYSTEM AND METHOD FOR INGESTIBLE PRODUCT SYSTEM AND METHOD, naming PAUL HOLMAN, ROYCE A. LEVIEN, MARK A. MALAMUD, NEAL STEPHENSON, AND CHRISTOPHER CHARLES YOUNG as inventors, filed 20 Jun. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/535,855 entitled SUBSTRATE STRUCTURE APPLIED FORCE TREATMENT SYSTEM AND METHOD FOR INGESTIBLE PRODUCT SYSTEM AND METHOD, naming PAUL HOLMAN, ROYCE A. LEVIEN, MARK A. MALAMUD, NEAL STEPHENSON, AND CHRISTOPHER CHARLES YOUNG as inventors, filed 28 Jun. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/535,902 entitled SUBSTRATE STRUCTURE APPLIED FORCE TREATMENT SYSTEM AND METHOD FOR INGESTIBLE PRODUCT SYSTEM AND METHOD, naming PAUL HOLMAN, ROYCE A. LEVIEN, MARK A. MALAMUD, NEAL STEPHENSON, AND CHRISTOPHER CHARLES YOUNG as inventors, filed 28 Jun. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/548,633 entitled SUBSTRATE STRUCTURE PARTS ASSEMBLY TREATMENT SYSTEM AND METHOD FOR INGESTIBLE PRODUCT SYSTEM AND METHOD, naming PAUL HOLMAN, ROYCE A. LEVIEN, MARK A. MALAMUD, NEAL STEPHENSON, AND CHRISTOPHER CHARLES YOUNG as inventors, filed 13 Jul. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/548,671 entitled SUBSTRATE STRUCTURE PARTS ASSEMBLY TREATMENT SYSTEM AND METHOD FOR INGESTIBLE PRODUCT SYSTEM AND METHOD, naming PAUL HOLMAN, ROYCE A. LEVIEN, MARK A. MALAMUD, NEAL STEPHENSON, AND CHRISTOPHER CHARLES YOUNG as inventors, filed 13 Jul. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/554,194 entitled SUBSTRATE STRUCTURE DUCT TREATMENT SYSTEM AND METHOD FOR INGESTIBLE PRODUCT SYSTEM AND METHOD, naming PAUL HOLMAN, ROYCE A. LEVIEN, MARK A. MALAMUD, NEAL STEPHENSON, AND CHRISTOPHER CHARLES YOUNG as inventors, filed 20 Jul. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/554,237 entitled SUBSTRATE STRUCTURE DUCT TREATMENT SYSTEM AND METHOD FOR INGESTIBLE PRODUCT SYSTEM AND METHOD, naming PAUL HOLMAN, ROYCE A. LEVIEN, MARK A. MALAMUD, NEAL STEPHENSON, AND CHRISTOPHER CHARLES YOUNG as inventors, filed 20 Jul. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/560,447 entitled SUBSTRATE STRUCTURE MASKING TREATMENT SYSTEM AND METHOD FOR INGESTIBLE PRODUCT SYSTEM AND METHOD, naming PAUL HOLMAN, ROYCE A. LEVIEN, MARK A. MALAMUD, NEAL STEPHENSON, AND CHRISTOPHER CHARLES YOUNG as inventors, filed 27 Jul. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/560,477 entitled SUBSTRATE STRUCTURE MASKING TREATMENT SYSTEM AND METHOD FOR INGESTIBLE PRODUCT SYSTEM AND METHOD, naming PAUL HOLMAN, ROYCE A. LEVIEN, MARK A. MALAMUD, NEAL STEPHENSON, AND CHRISTOPHER CHARLES YOUNG as inventors, filed 27 Jul. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/590,774 entitled SUBSTRATE STRUCTURE DIRECTED ENERGY TREATMENT SYSTEM AND METHOD FOR INGESTIBLE PRODUCT SYSTEM AND METHOD, naming PAUL HOLMAN, ROYCE A. LEVIEN, MARK A. MALAMUD, NEAL STEPHENSON, AND CHRISTOPHER CHARLES YOUNG as inventors, filed 21 Aug. 2012.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

In one aspect, a computationally-implemented method includes, but is not limited to electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures; and electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products. In addition to the foregoing, other method aspects are described in the claims, drawings, and text forming a part of the disclosure set forth herein.

In one or more various aspects, related machines, compositions of matter, or manufactures of systems may include, but are not limited to, circuitry and/or programming for effecting the herein-referenced method aspects; the circuitry and/or programming can be virtually any combination of hardware, software, and/or firmware configured to effect the herein-referenced method aspects depending upon the design choices of the system designer (limited to patentable subject matter under 35 USC 101).

A computationally-implemented system includes, but is not limited to: means for electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures; and means for electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products. In addition to the foregoing, other system aspects are described in the claims, drawings, and text forming a part of the disclosure set forth herein.

A computationally-implemented system includes, but is not limited to a receiving information electrical circuitry arrangement for electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures; and a controlling treatment electrical circuitry arrangement for electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products. In addition to the foregoing, other system aspects are described in the claims, drawings, and text forming a part of the disclosure set forth herein.

A system includes, but is not limited to a receiving information module configured to operate in accordance with electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures; and a controlling treatment module configured to operate in accordance with electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products. In addition to the foregoing, other system aspects are described in the claims, drawings, and text forming a part of the disclosure set forth herein.

An article of manufacture including one or more non-transitory signal-bearing storage medium bearing one or more instructions for electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures; and one or more instructions for electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products. In addition to the foregoing, other computer program product aspects are described in the claims, drawings, and text forming a part of the disclosure set forth herein.

A system including one or more computing devices; and one or more instructions when executed on the one or more computing devices cause the one or more computing devices to perform electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures; and electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products. In addition to the foregoing, other computer program product aspects are described in the claims, drawings, and text forming a part of the disclosure set forth herein.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of is an example of ingestible product preparation system that may provide context, for instance, in introducing one or more processes and/or devices described herein.

FIG. 57 is a high-level flowchart including exemplary implementations of operation p11 of FIG. 55.

FIG. 59 is a high-level flowchart including exemplary implementations of operation p11 of FIG. 55.

FIG. 61 is a high-level flowchart including exemplary implementations of operation p11 of FIG. 55.

FIG. 63 is a high-level flowchart including exemplary implementations of operation p11 of FIG. 55.

FIG. 64 is a high-level flowchart including exemplary implementations of operation p11 of FIG. 55.

FIG. 66 is a high-level flowchart including exemplary implementations of operation p11 of FIG. 55.

FIG. 67 is a high-level flowchart including exemplary implementations of operation p11 of FIG. 55.

FIG. 77 is a high-level flowchart including exemplary implementations of operation p11 of FIG. 55.

FIG. 79 is a high-level flowchart including exemplary implementations of operation p11 of FIG. 55.

FIG. 88 is a high-level flowchart including exemplary implementations of operation p12 of FIG. 55.

FIG. 95 is a high-level flowchart including exemplary implementations of operation p12 of FIG. 55.

FIG. 103 is a block diagram depicting one or more exemplary electrical circuitry arrangements of the ingestible product preparation system 10 of FIG. 1.

FIG. 115 is a block diagram depicting one or more exemplary modules of the ingestible product preparation system 10 of FIG. 1.

FIG. 116 is a block diagram depicting one or more exemplary modules of the ingestible product preparation system 10 of FIG. 1.

FIG. 117 is a block diagram depicting one or more exemplary modules of the ingestible product preparation system 10 of FIG. 1.

Figure 118:
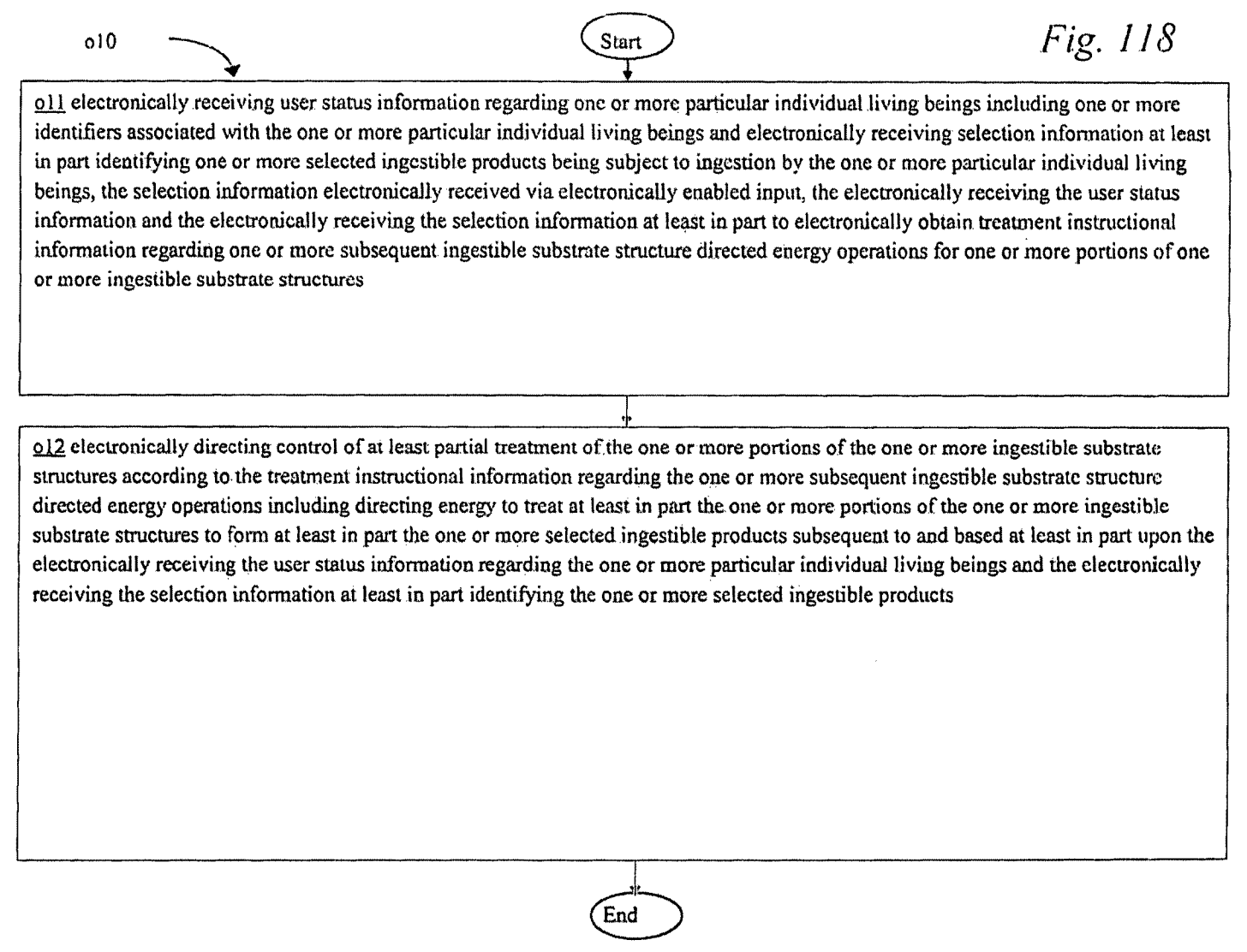

FIG. 118 is a high-level flowchart illustrating an operational flow o10 representing exemplary operations related to electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures, and electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products at least associated with the depicted exemplary implementations of the system.

Figure 119:
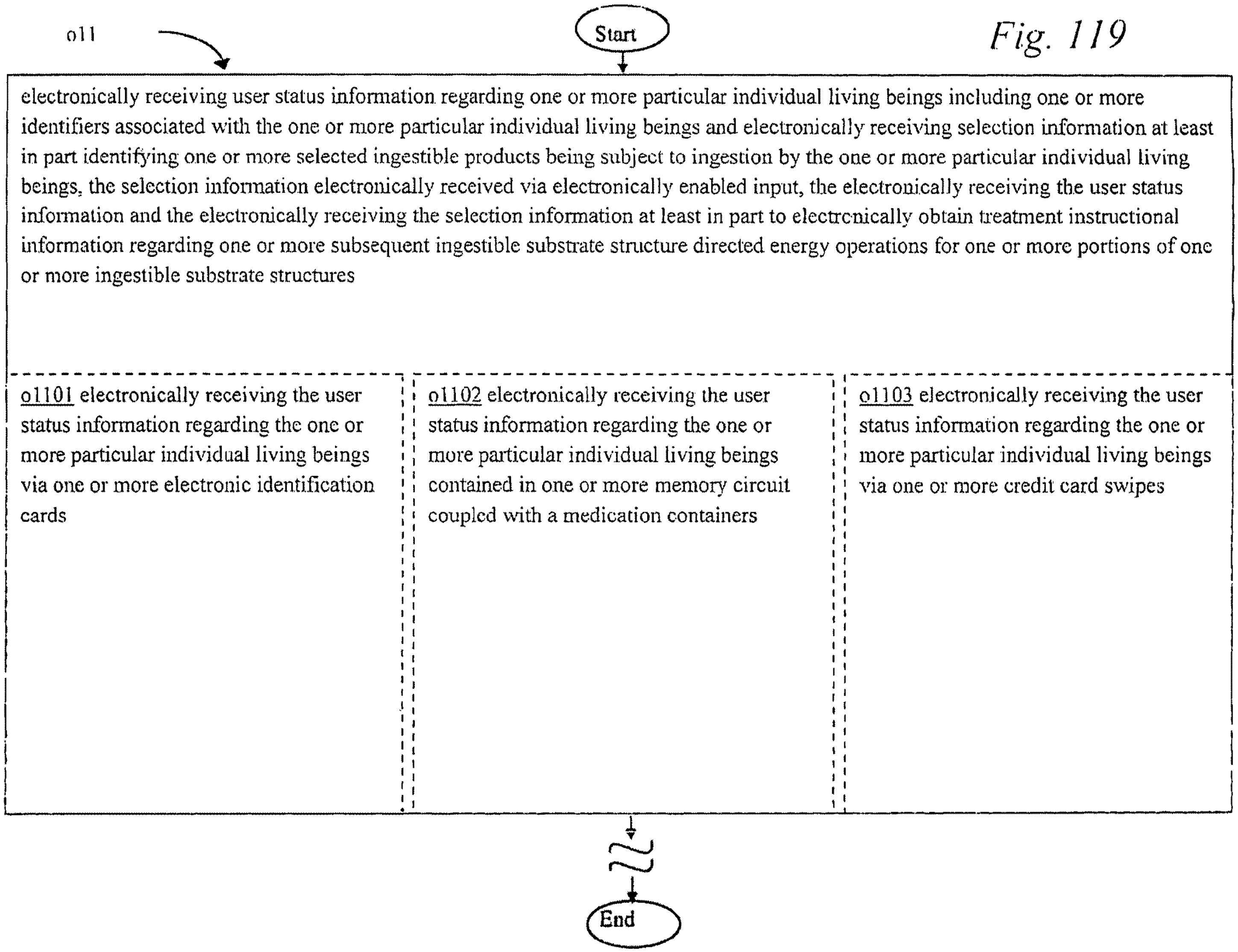

FIG. 119 is a high-level flowchart including exemplary implementations of operation o11 of FIG. 118.

Figure 120:
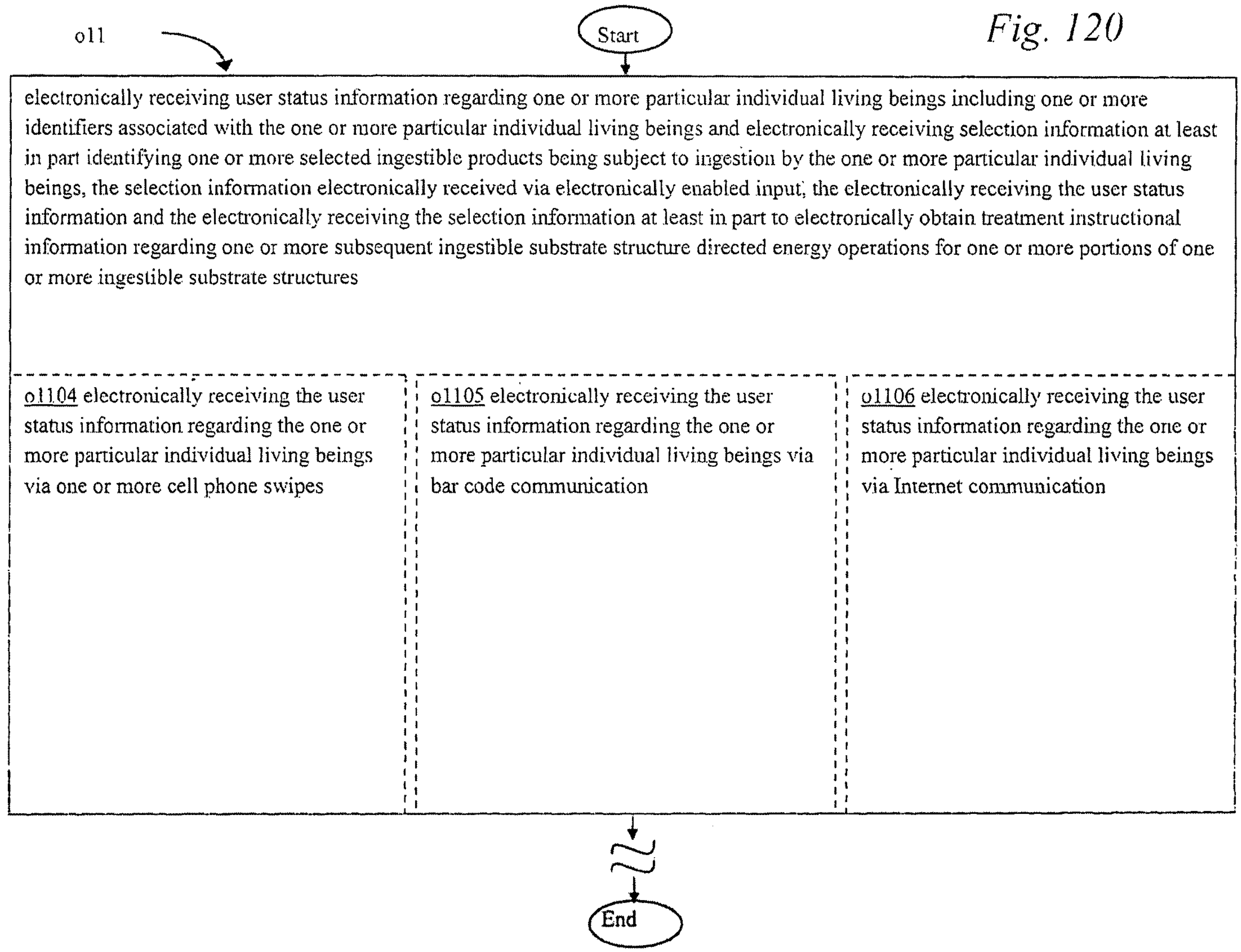

FIG. 120 is a high-level flowchart including exemplary implementations of operation o11 of FIG. 118.

Figure 121:
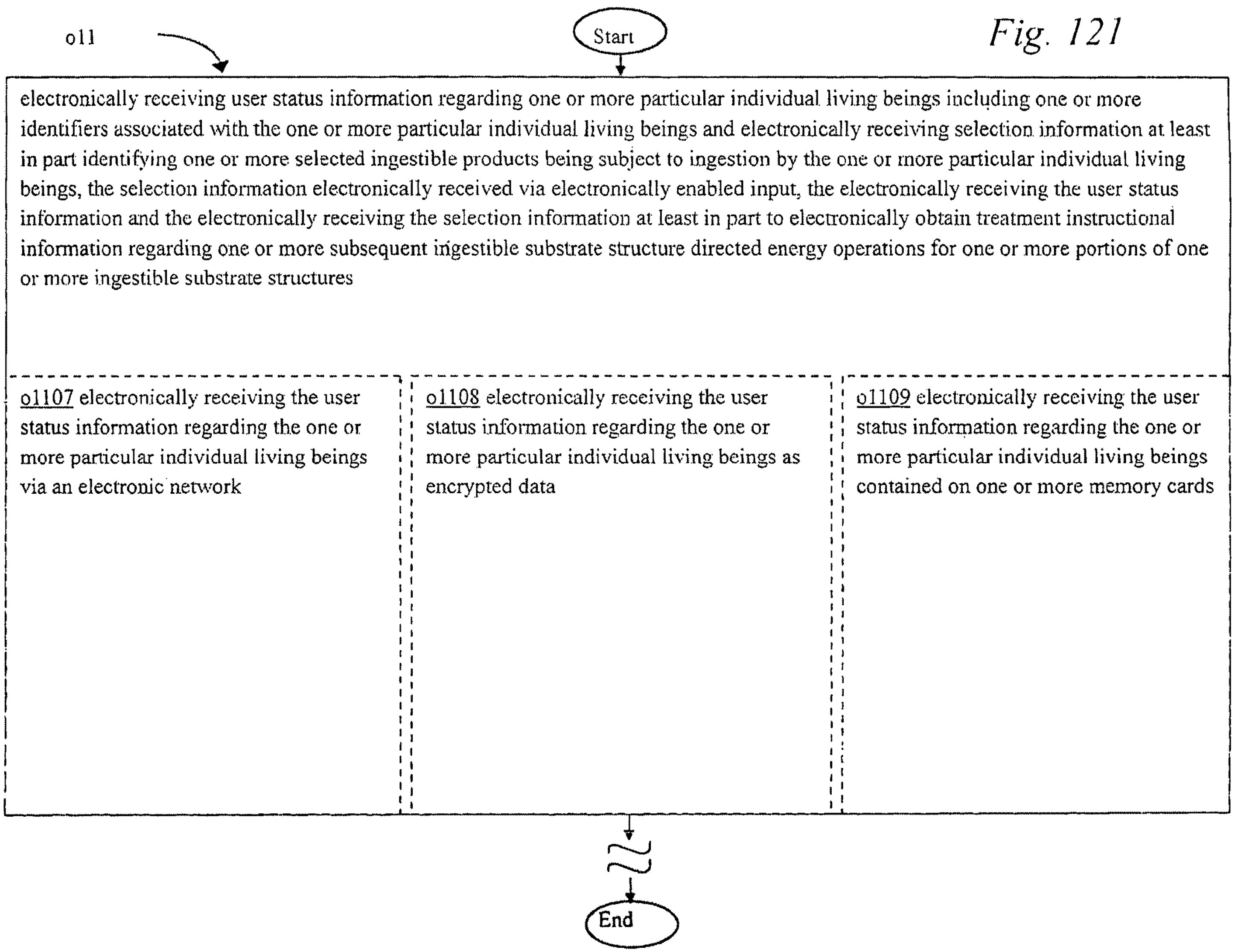

FIG. 121 is a high-level flowchart including exemplary implementations of operation o11 of FIG. 118.

Figure 122:
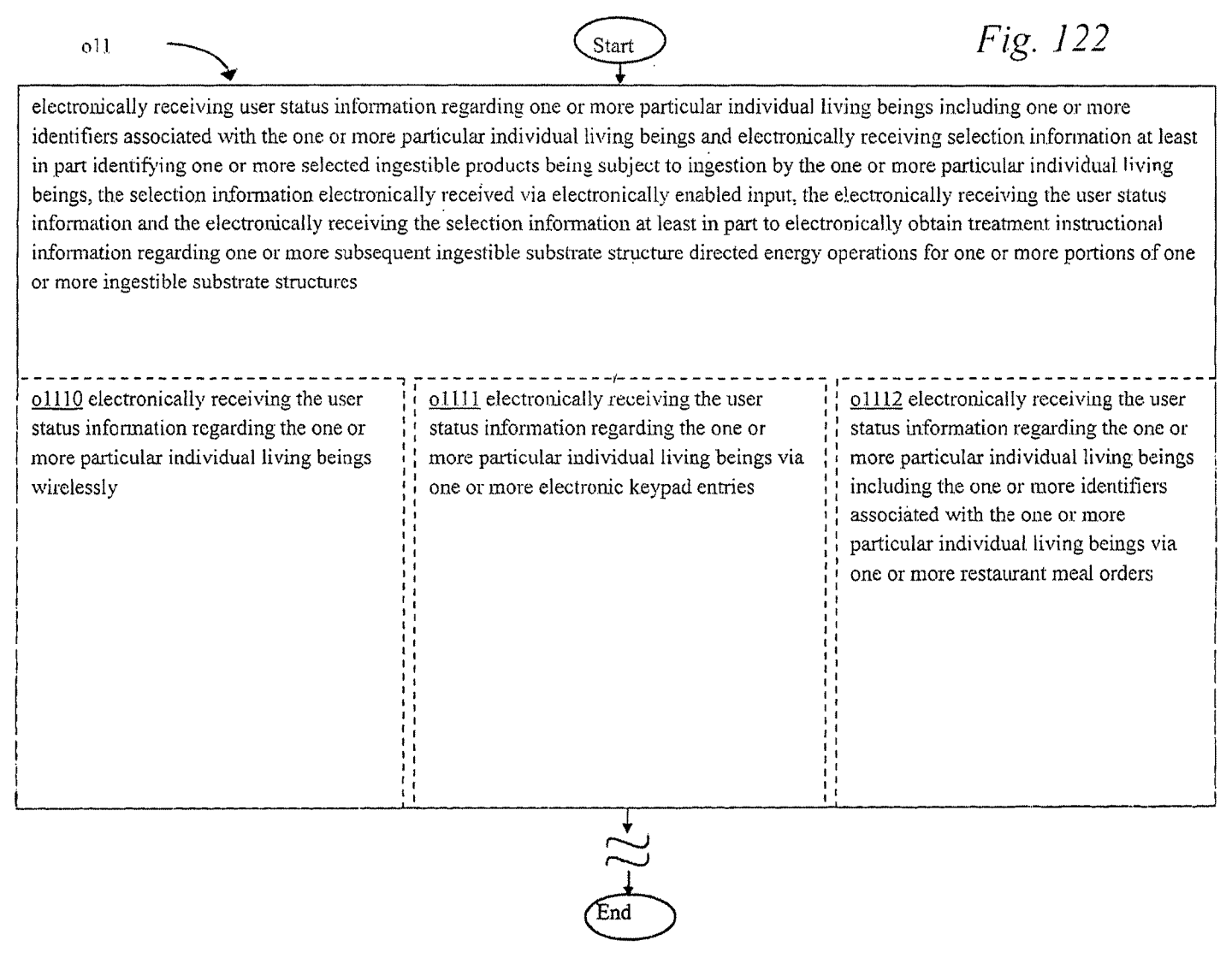

FIG. 122 is a high-level flowchart including exemplary implementations of operation o11 of FIG. 118.

FIG. 123 is a high-level flowchart including exemplary implementations of operation o11 of FIG. 118.

Figure 124:
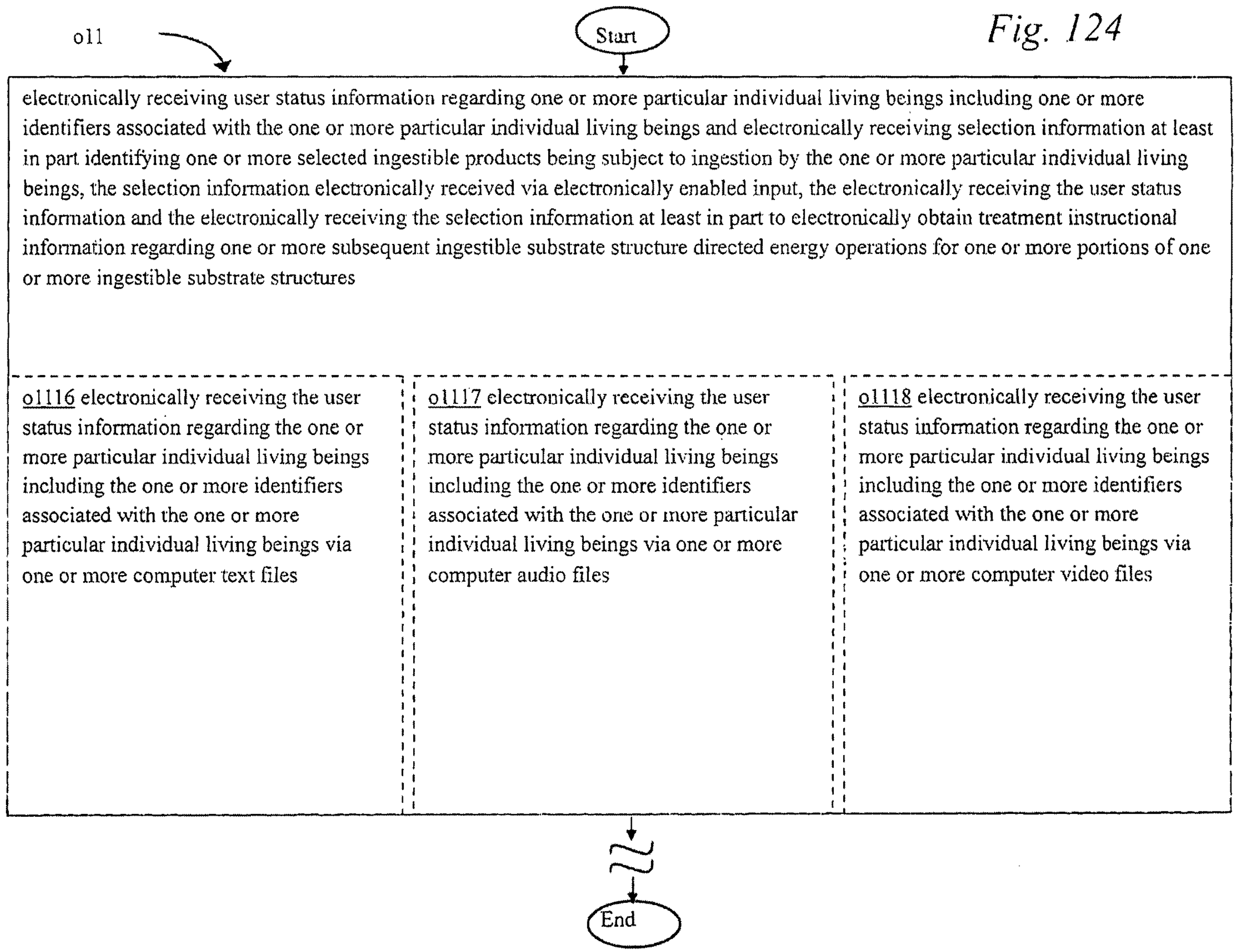

FIG. 124 is a high-level flowchart including exemplary implementations of operation o11 of FIG. 118.

Figure 125:
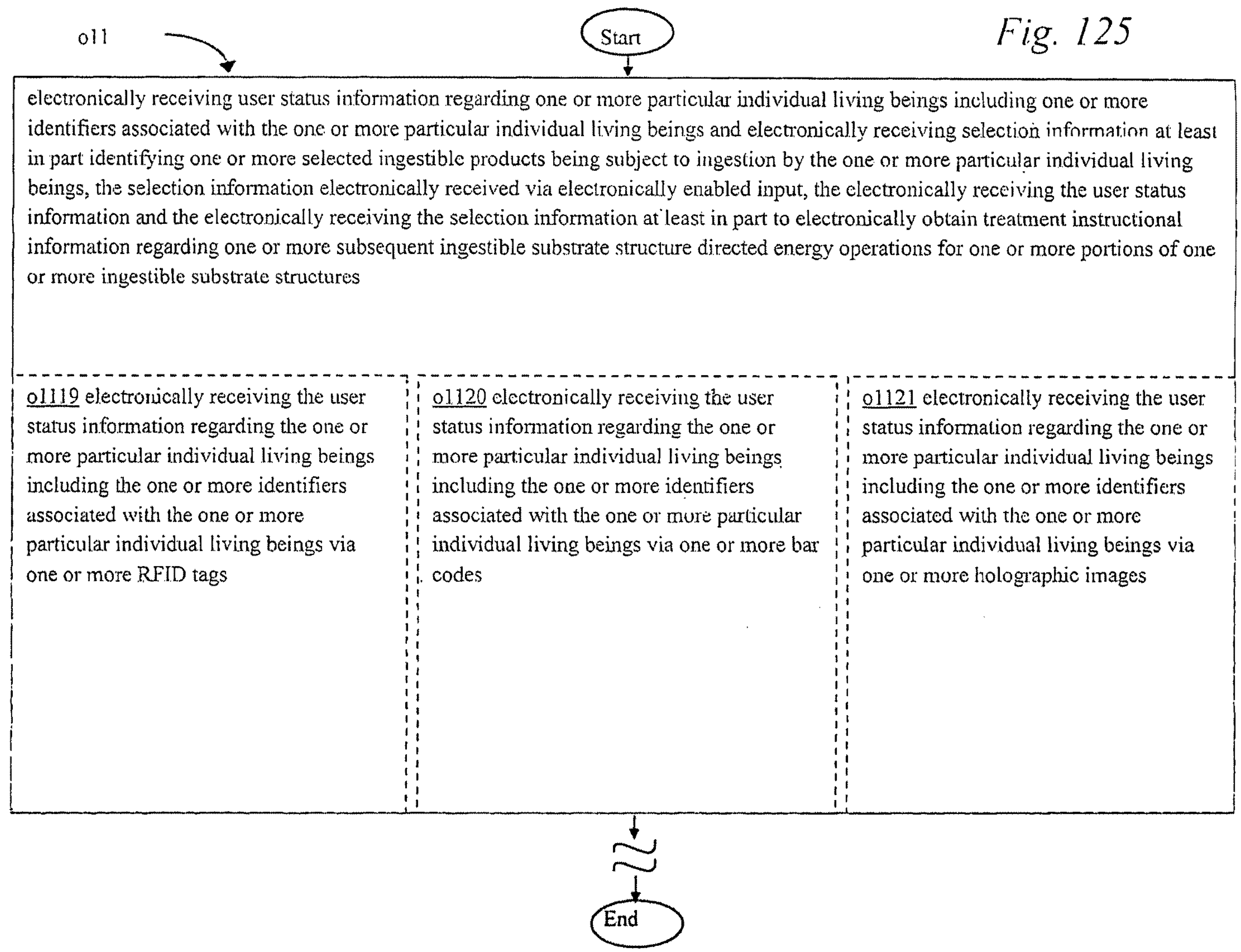

FIG. 125 is a high-level flowchart including exemplary implementations of operation o11 of FIG. 118.

Figure 126:
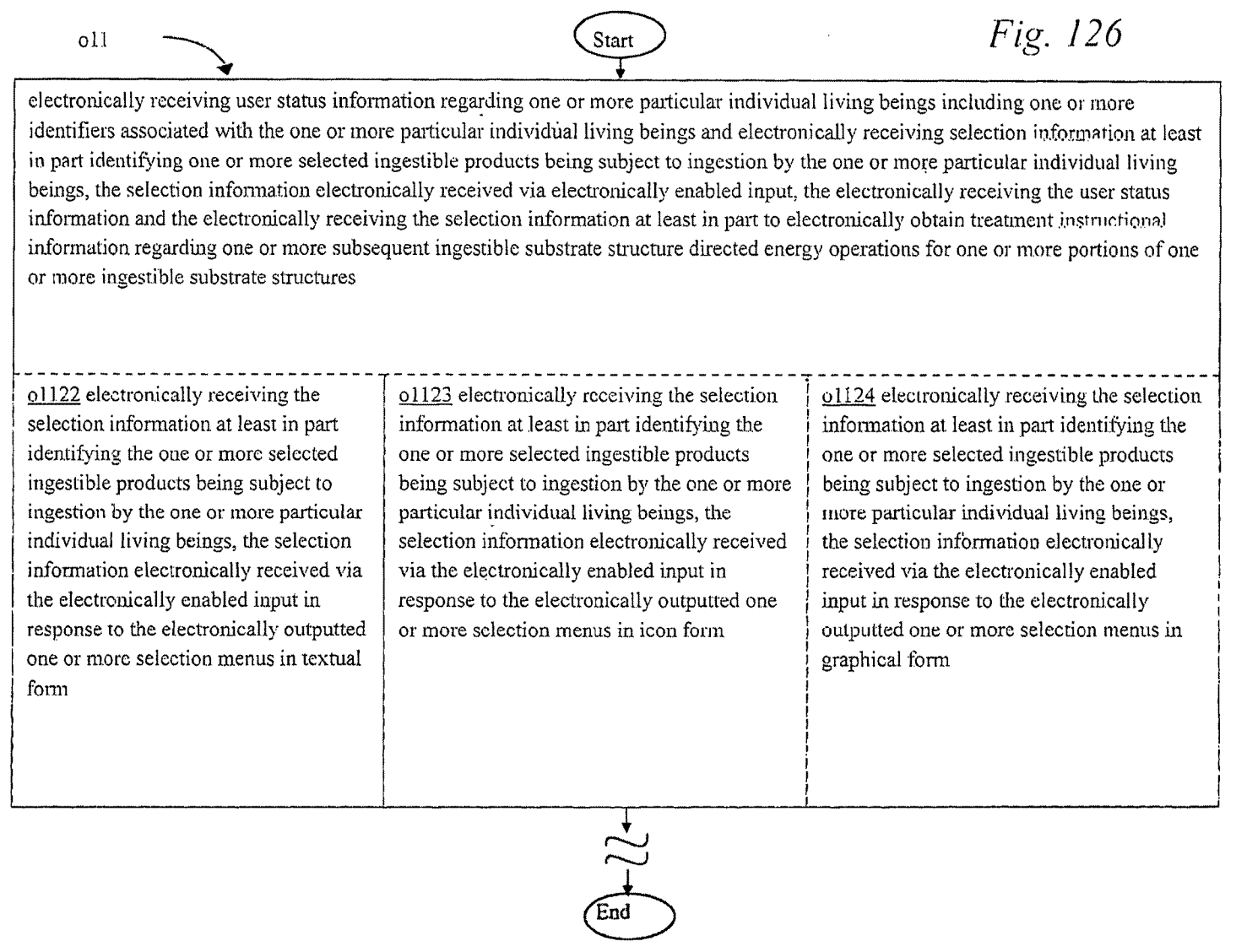

FIG. 126 is a high-level flowchart including exemplary implementations of operation o11 of FIG. 118.

Figure 127:
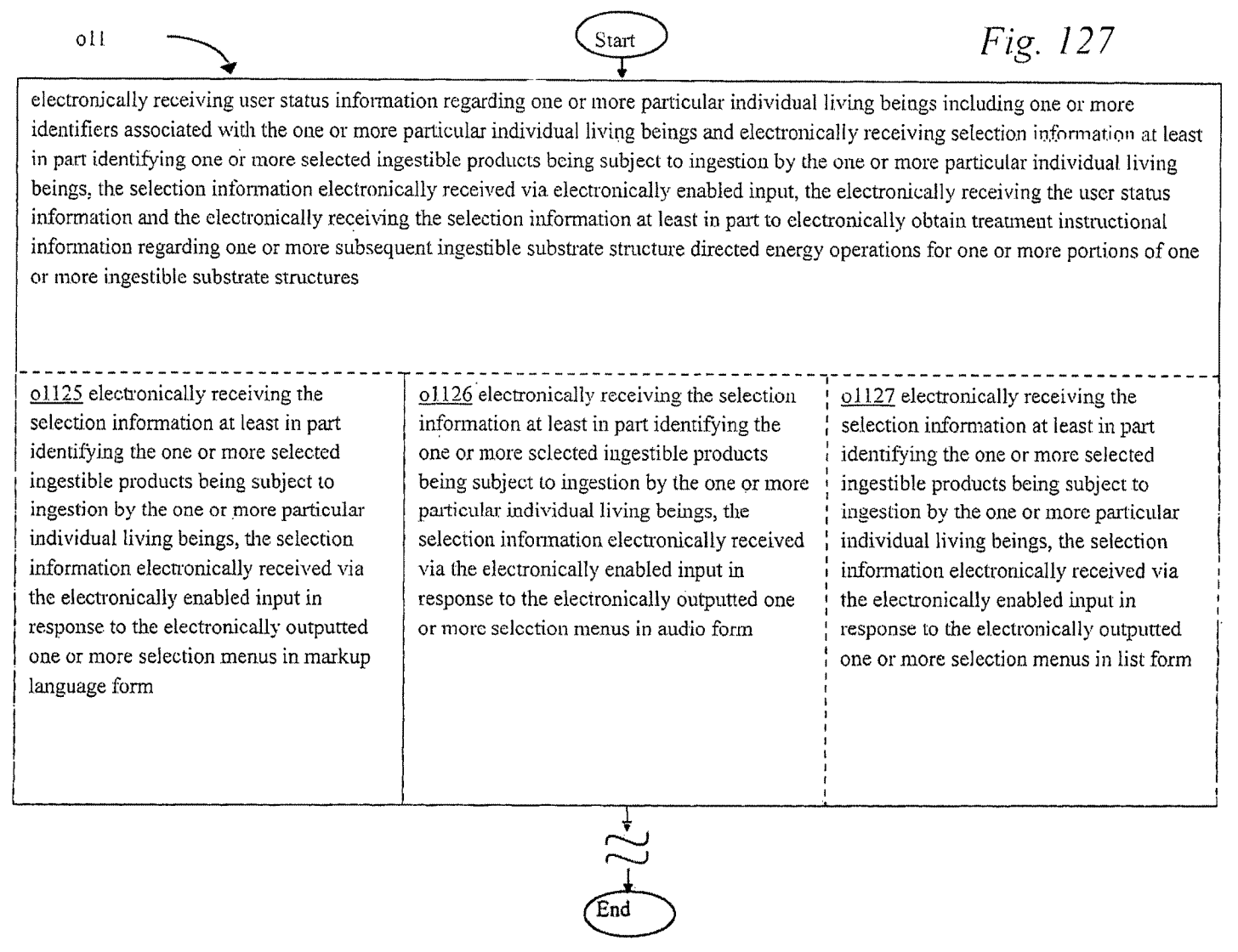

FIG. 127 is a high-level flowchart including exemplary implementations of operation o11 of FIG. 118.

Figure 128:
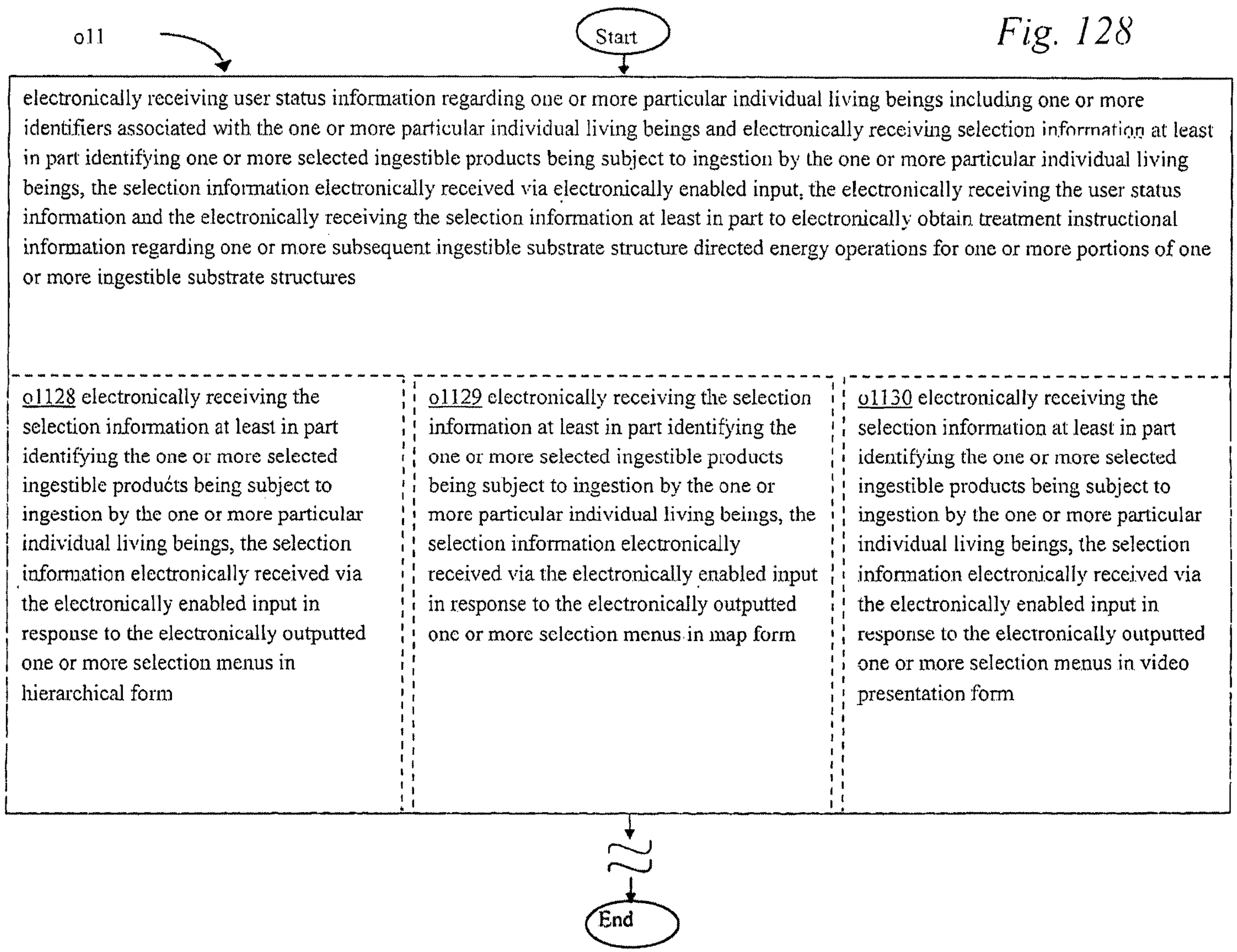

FIG. 128 is a high-level flowchart including exemplary implementations of operation o11 of FIG. 118.

Figure 129:
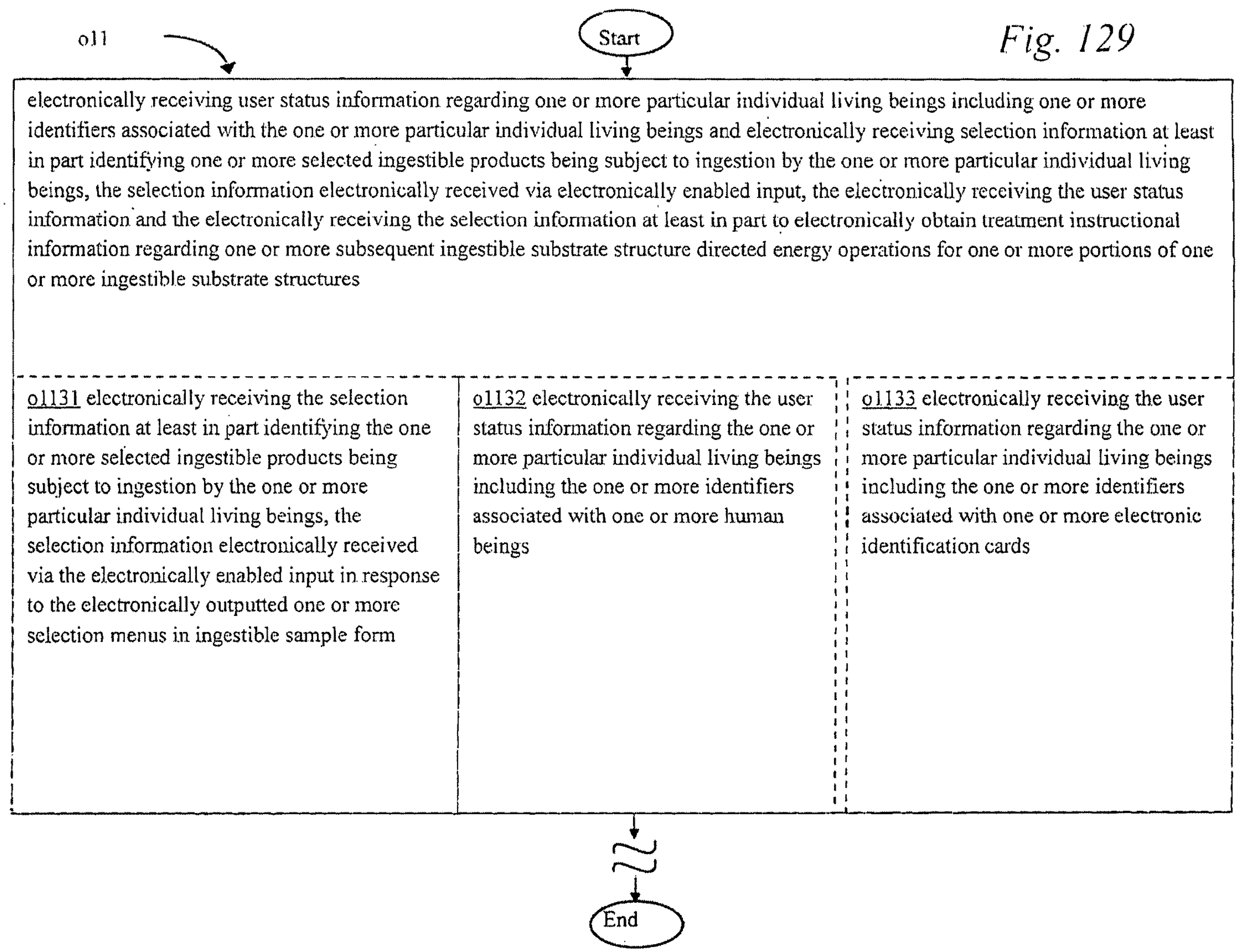

FIG. 129 is a high-level flowchart including exemplary implementations of operation o11 of FIG. 118.

Figure 130:
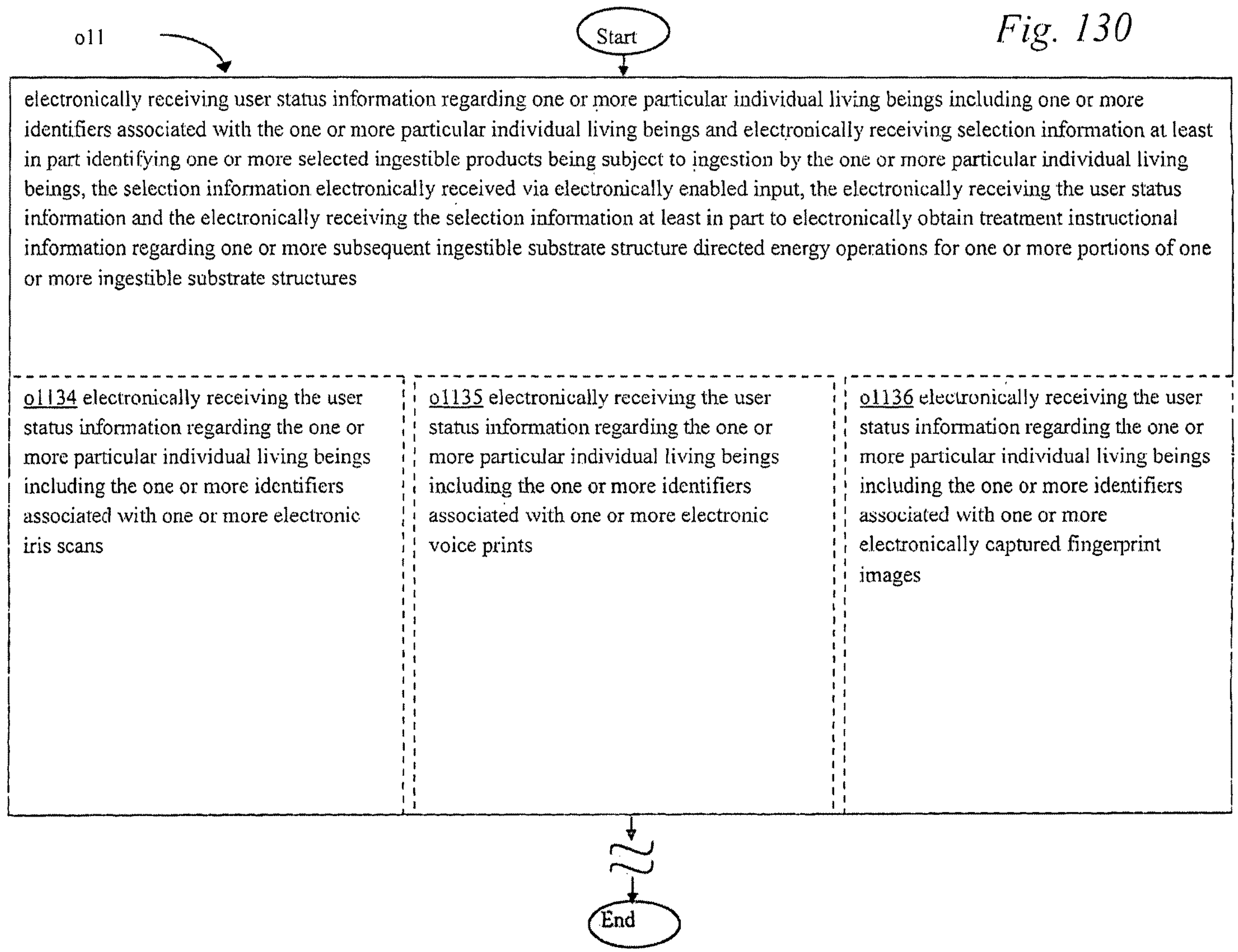

FIG. 130 is a high-level flowchart including exemplary implementations of operation o11 of FIG. 118.

Figure 131:
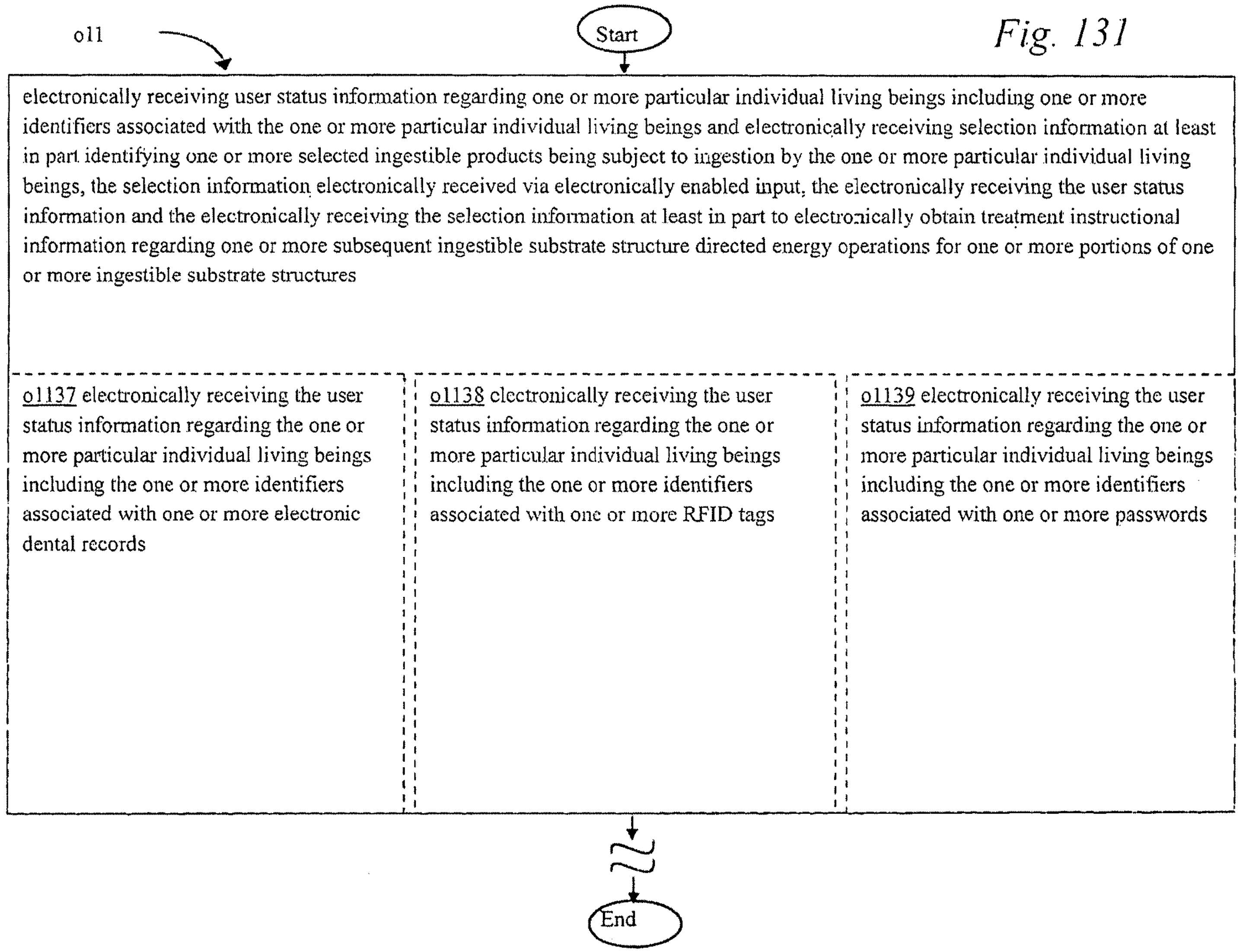

FIG. 131 is a high-level flowchart including exemplary implementations of operation o11 of FIG. 118.

Figure 132:
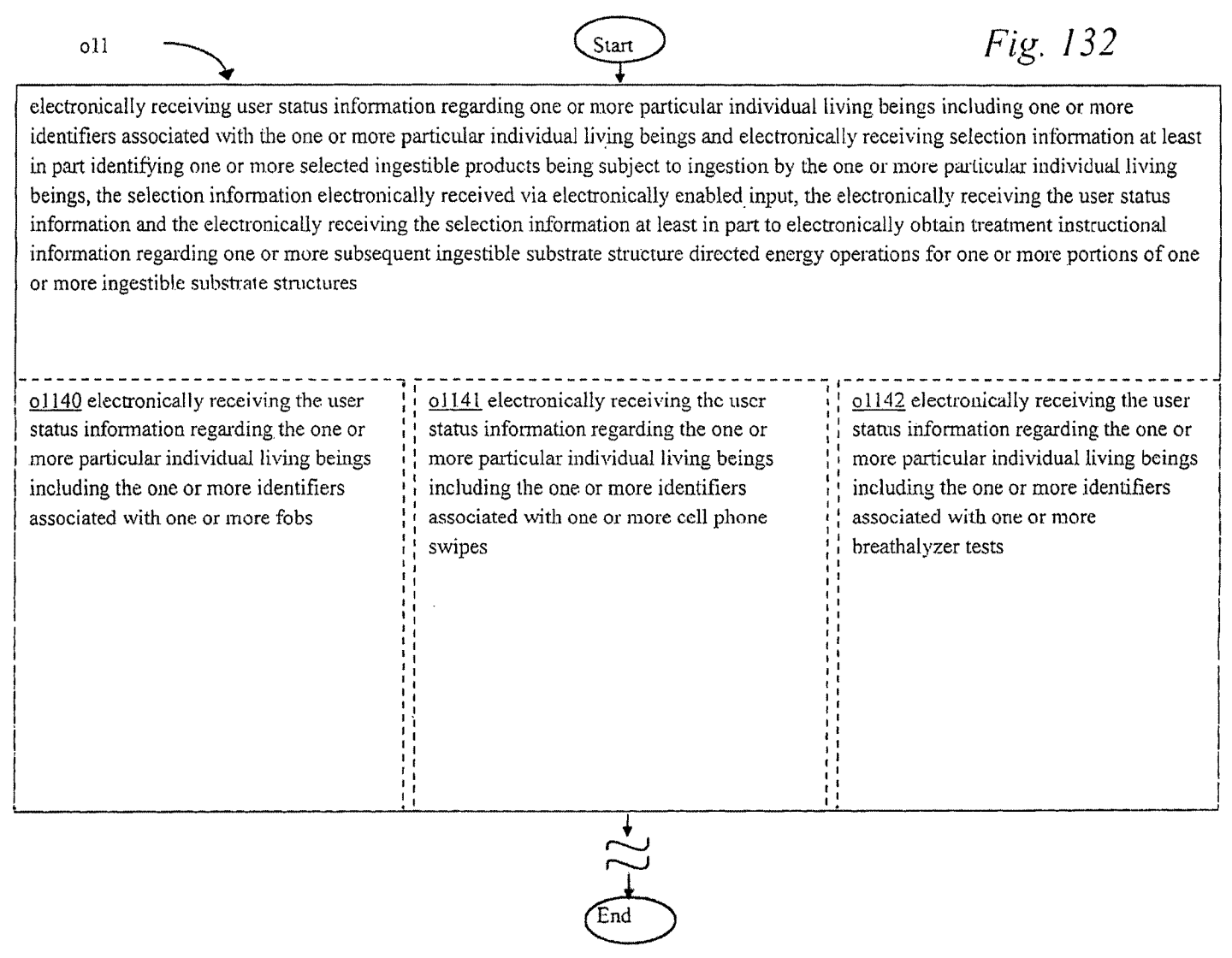

FIG. 132 is a high-level flowchart including exemplary implementations of operation o11 of FIG. 118.

Figure 133:
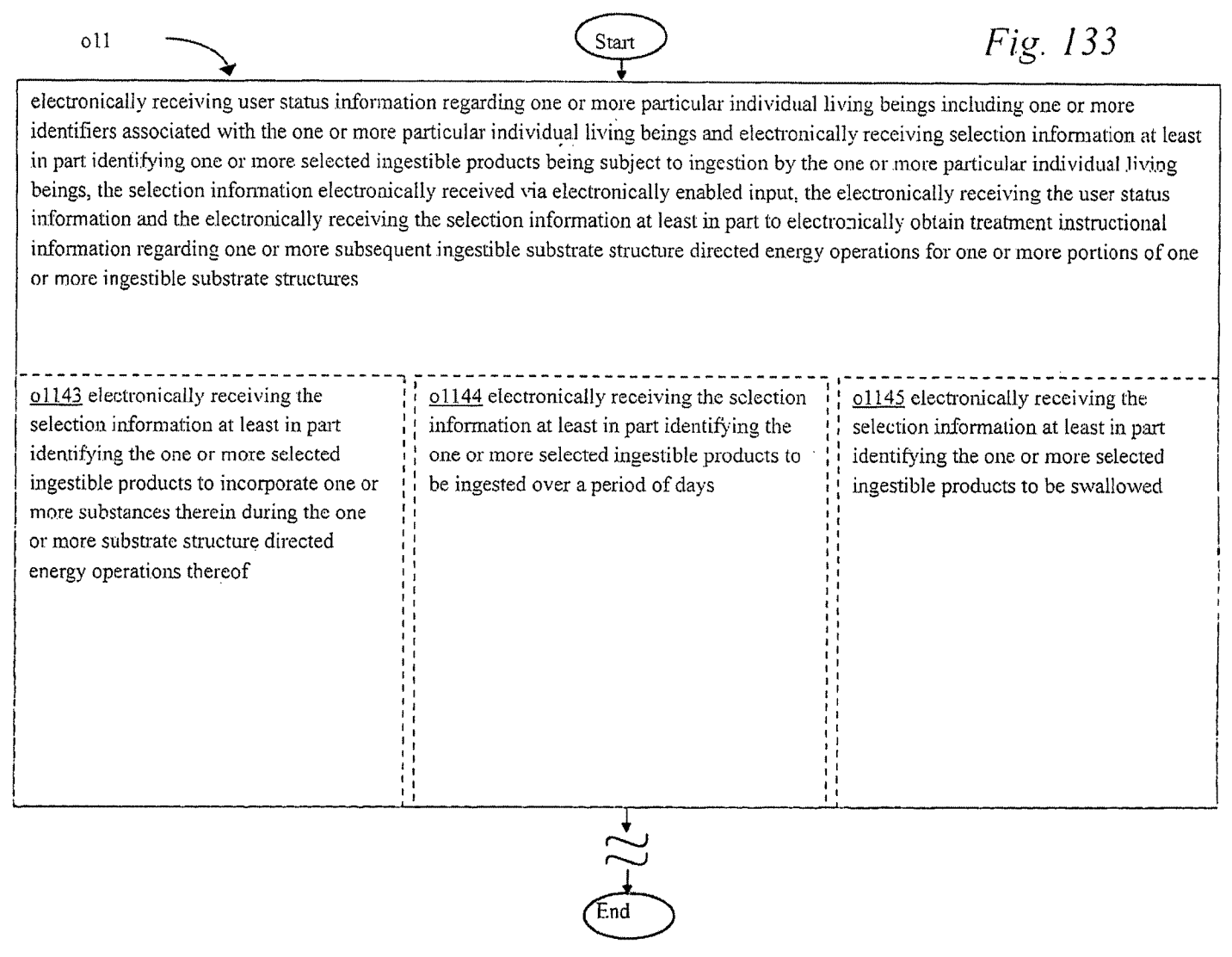

FIG. 133 is a high-level flowchart including exemplary implementations of operation o11 of FIG. 118.

Figure 134:
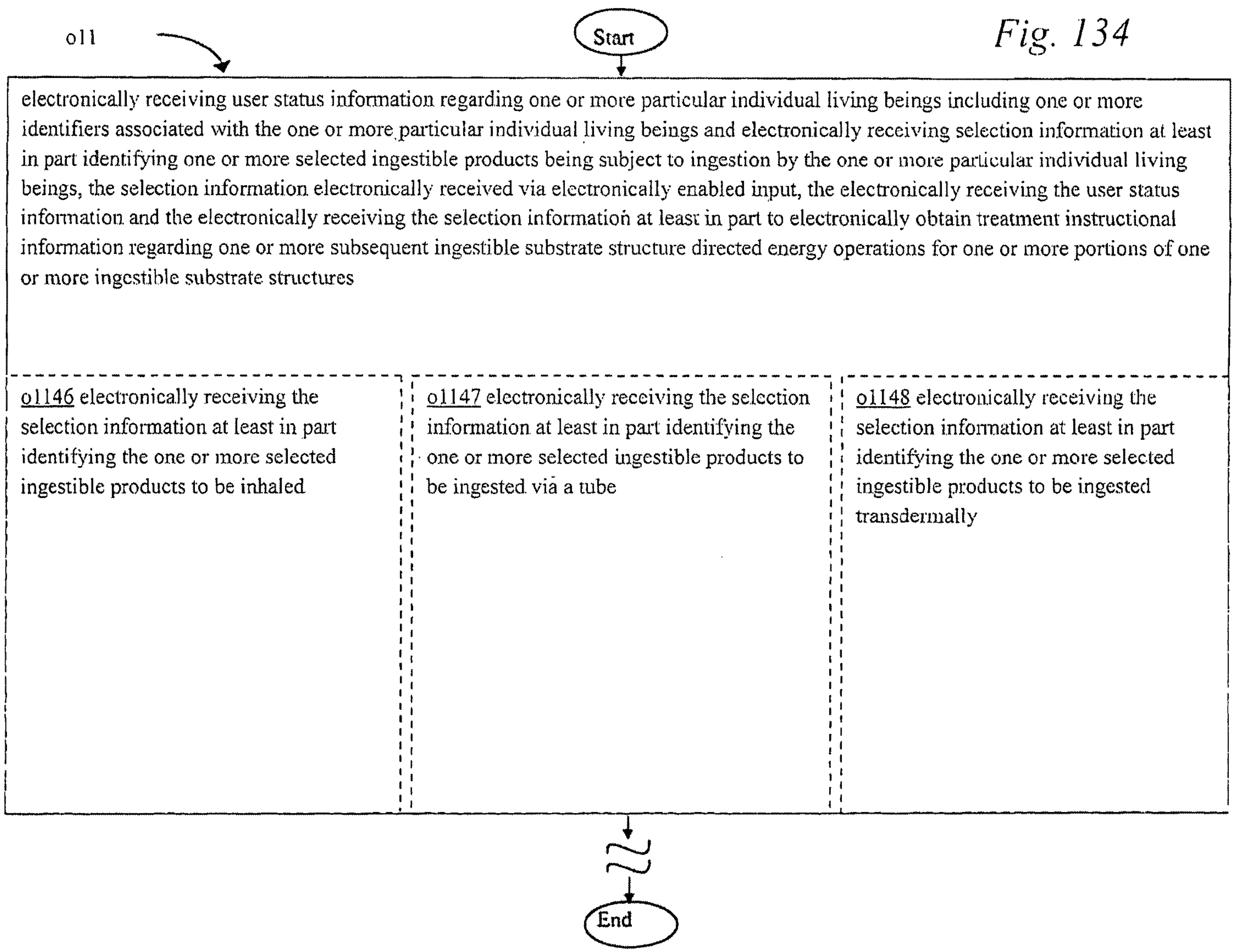

FIG. 134 is a high-level flowchart including exemplary implementations of operation o11 of FIG. 118.

Figure 135:
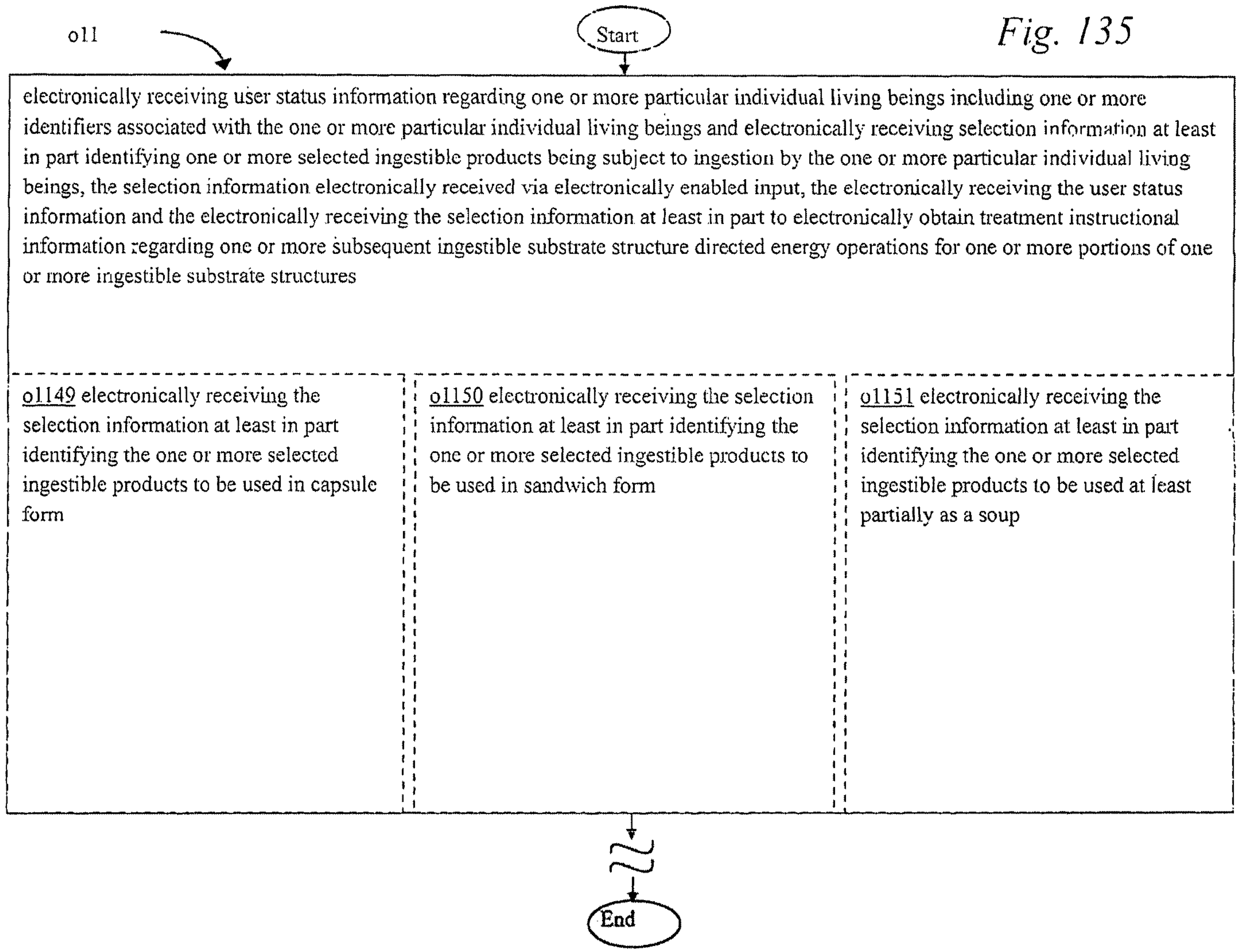

FIG. 135 is a high-level flowchart including exemplary implementations of operation o11 of FIG. 118.

Figure 136:
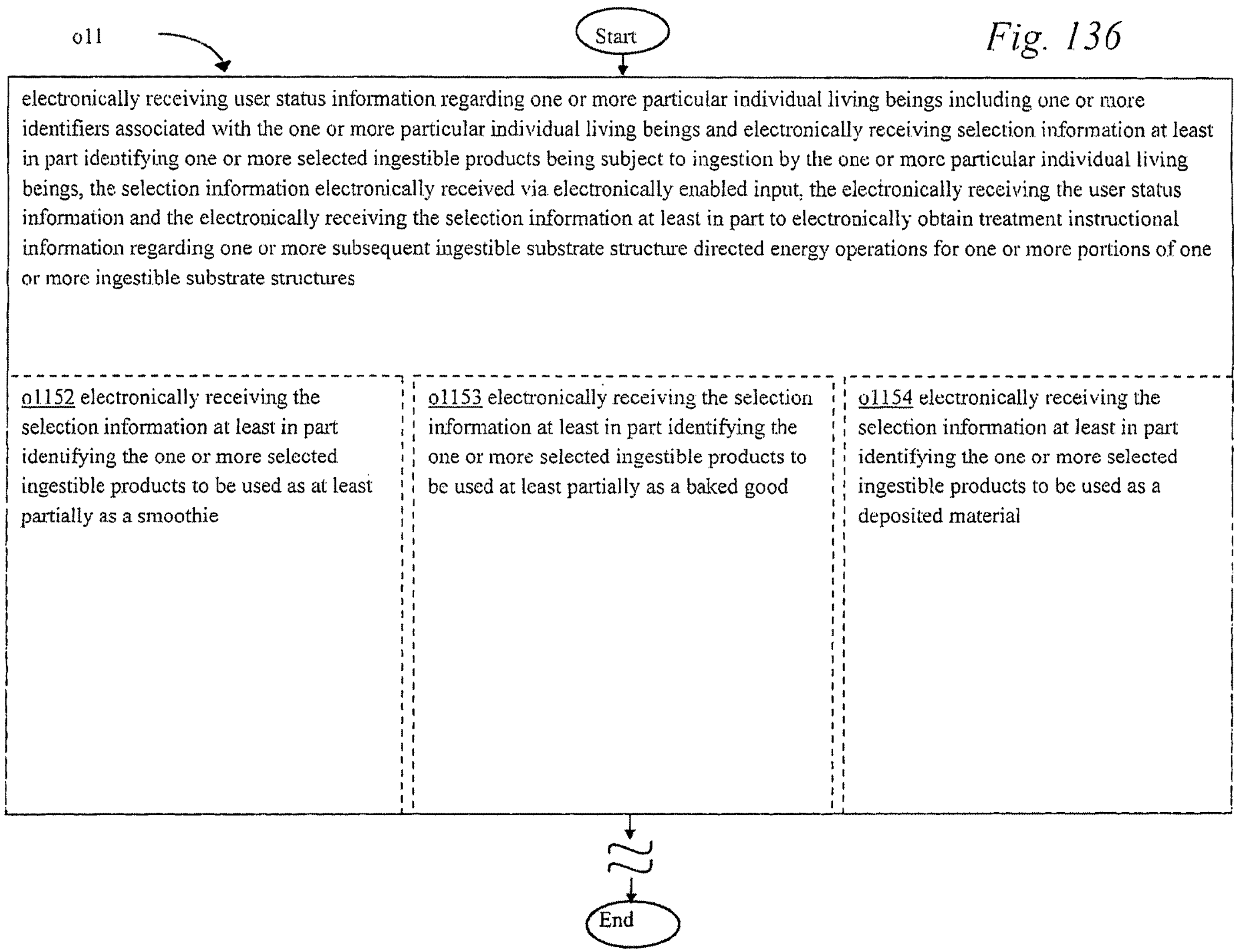

FIG. 136 is a high-level flowchart including exemplary implementations of operation o11 of FIG. 118.

Figure 137:
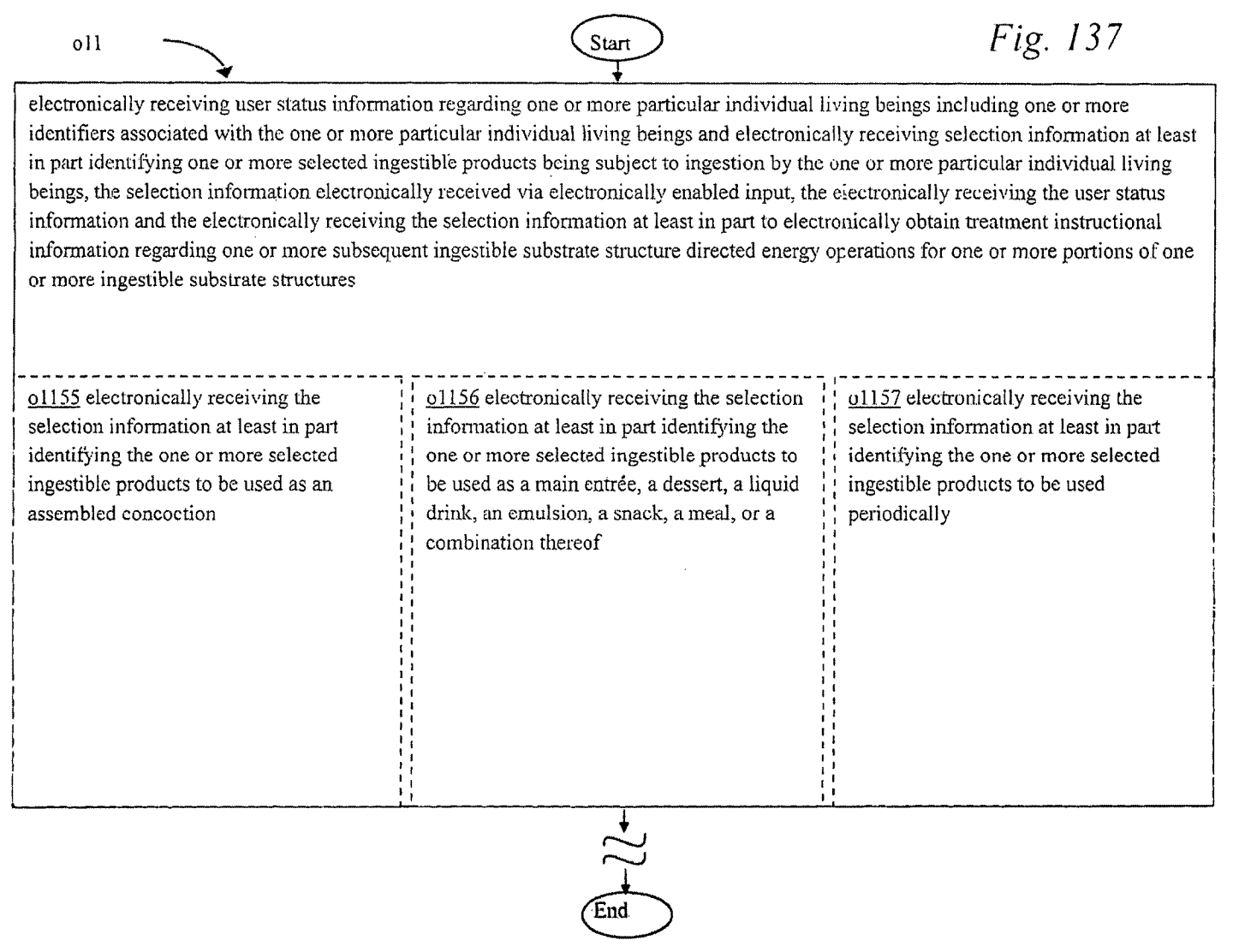

FIG. 137 is a high-level flowchart including exemplary implementations of operation o11 of FIG. 118.

Figure 138:
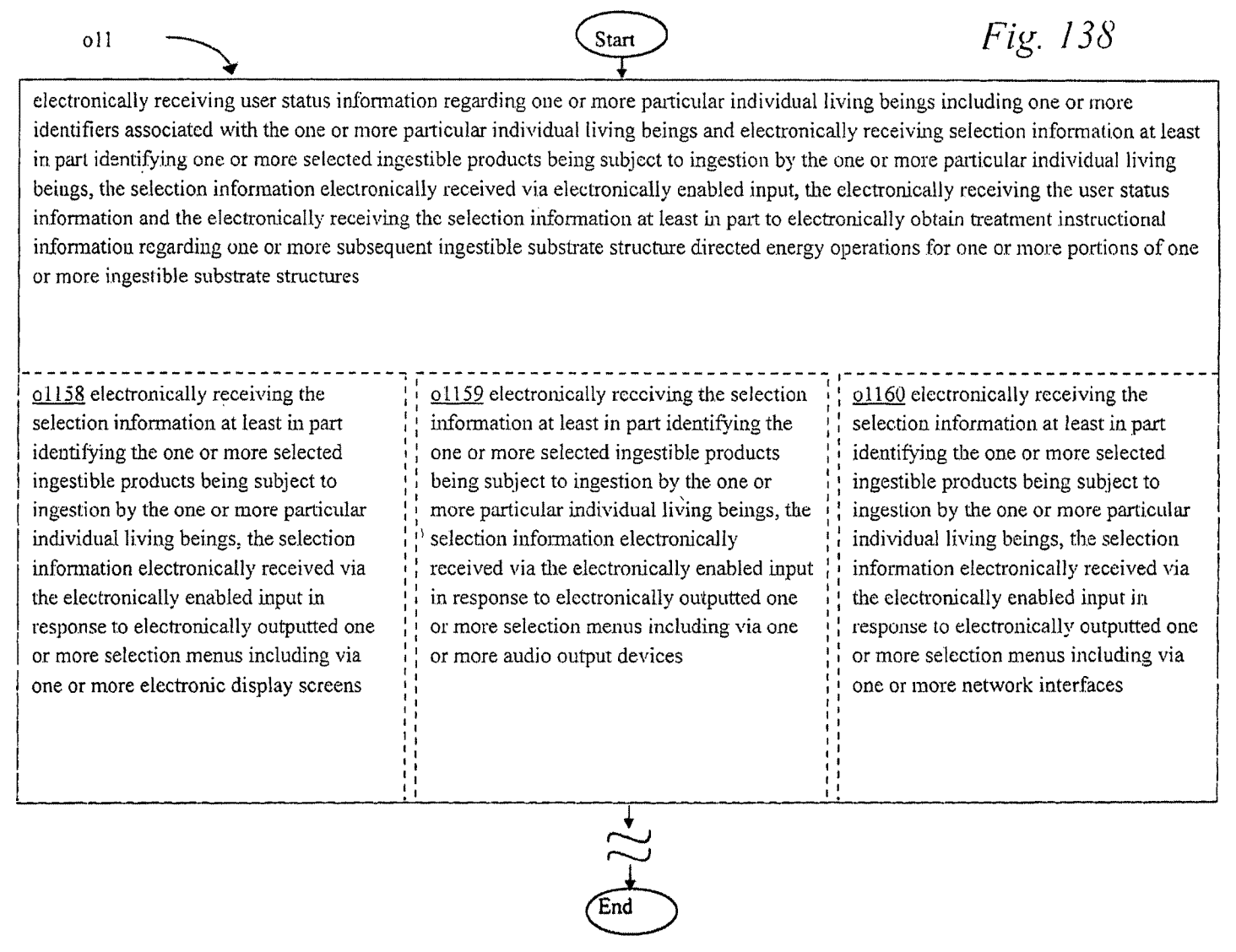

FIG. 138 is a high-level flowchart including exemplary implementations of operation o11 of FIG. 118.

Figure 139:
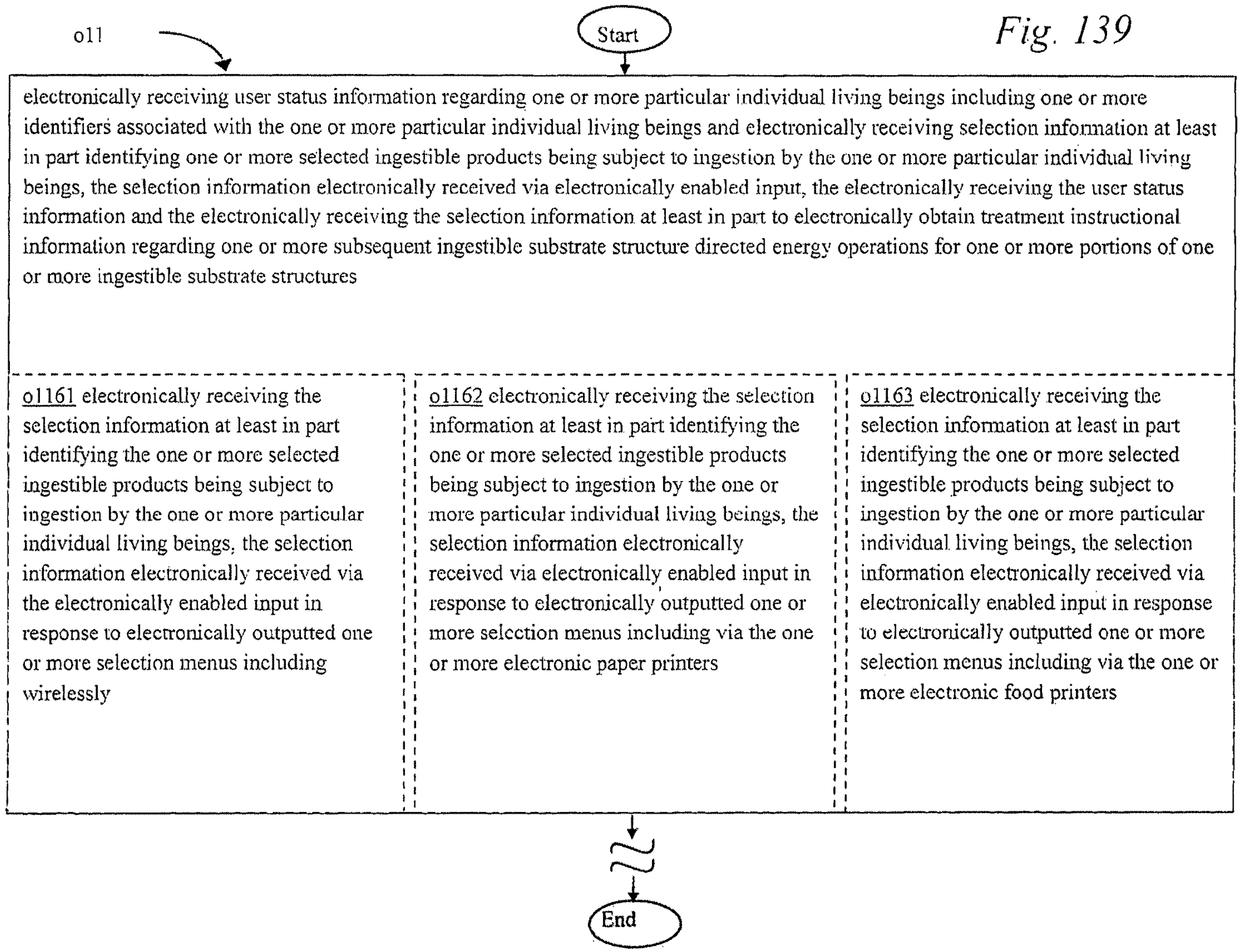

FIG. 139 is a high-level flowchart including exemplary implementations of operation o11 of FIG. 118.

Figure 140:
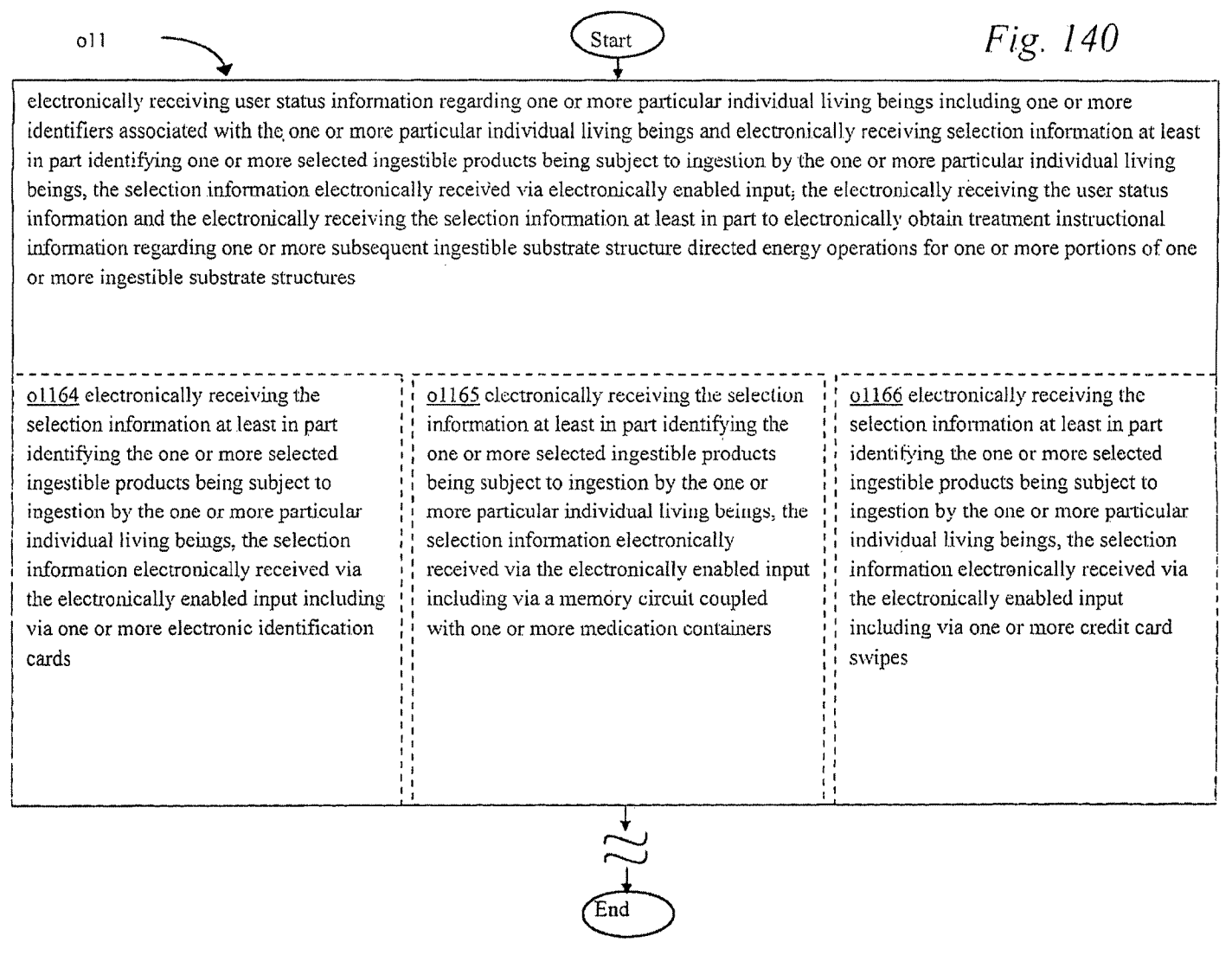

FIG. 140 is a high-level flowchart including exemplary implementations of operation o11 of FIG. 118.

Figure 141:
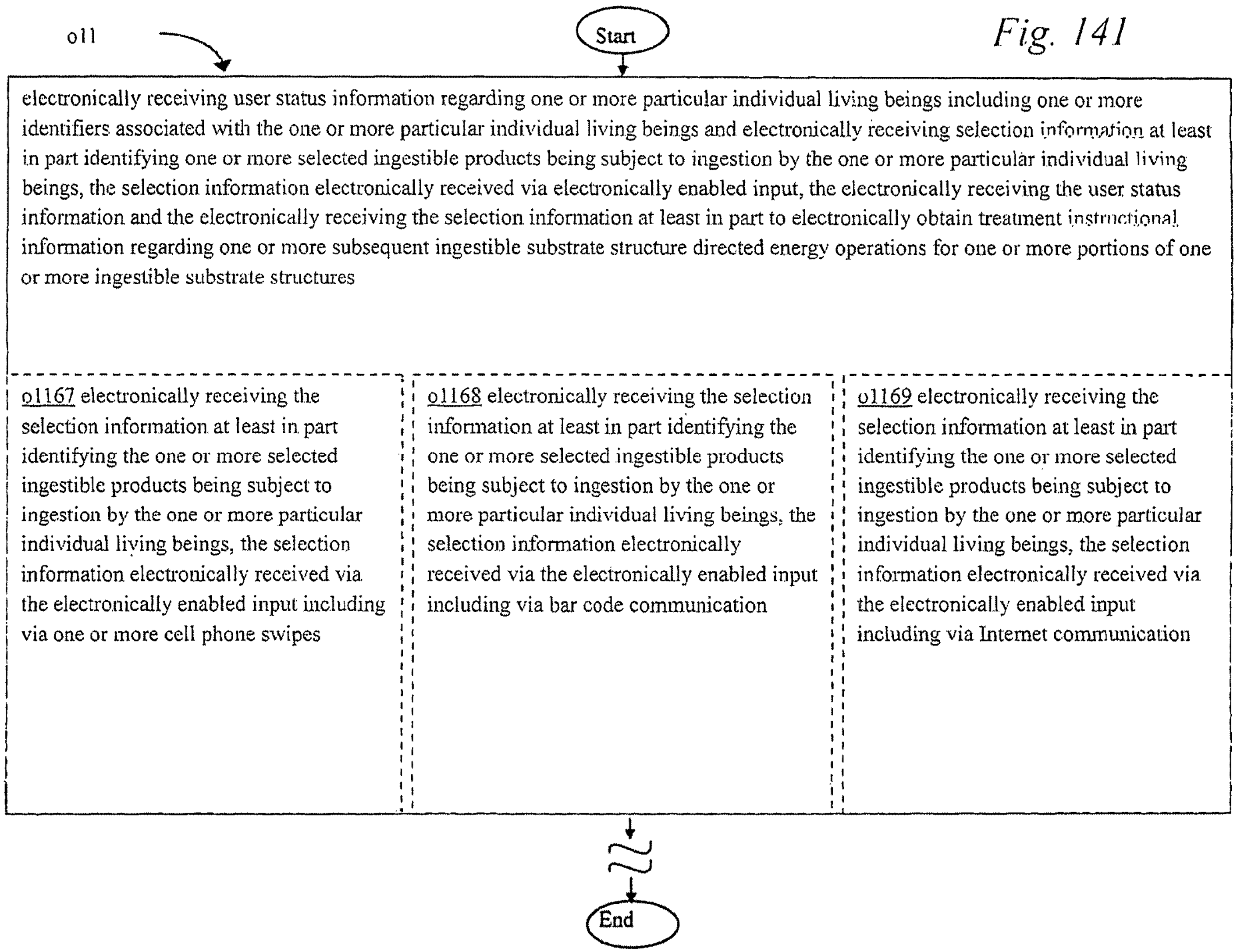

FIG. 141 is a high-level flowchart including exemplary implementations of operation o11 of FIG. 118.

Figure 142:
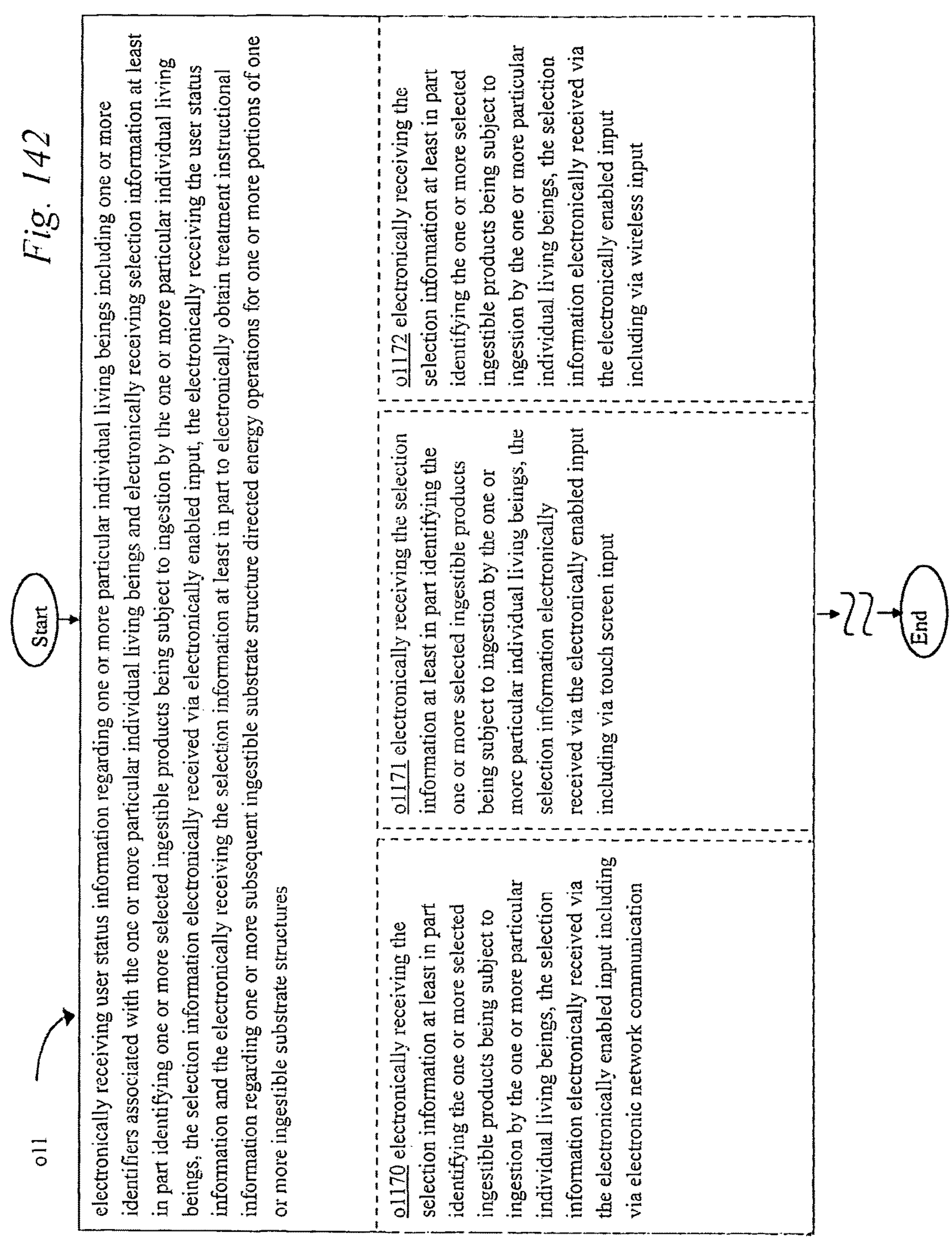

FIG. 142 is a high-level flowchart including exemplary implementations of operation o11 of FIG. 118.

Figure 143:
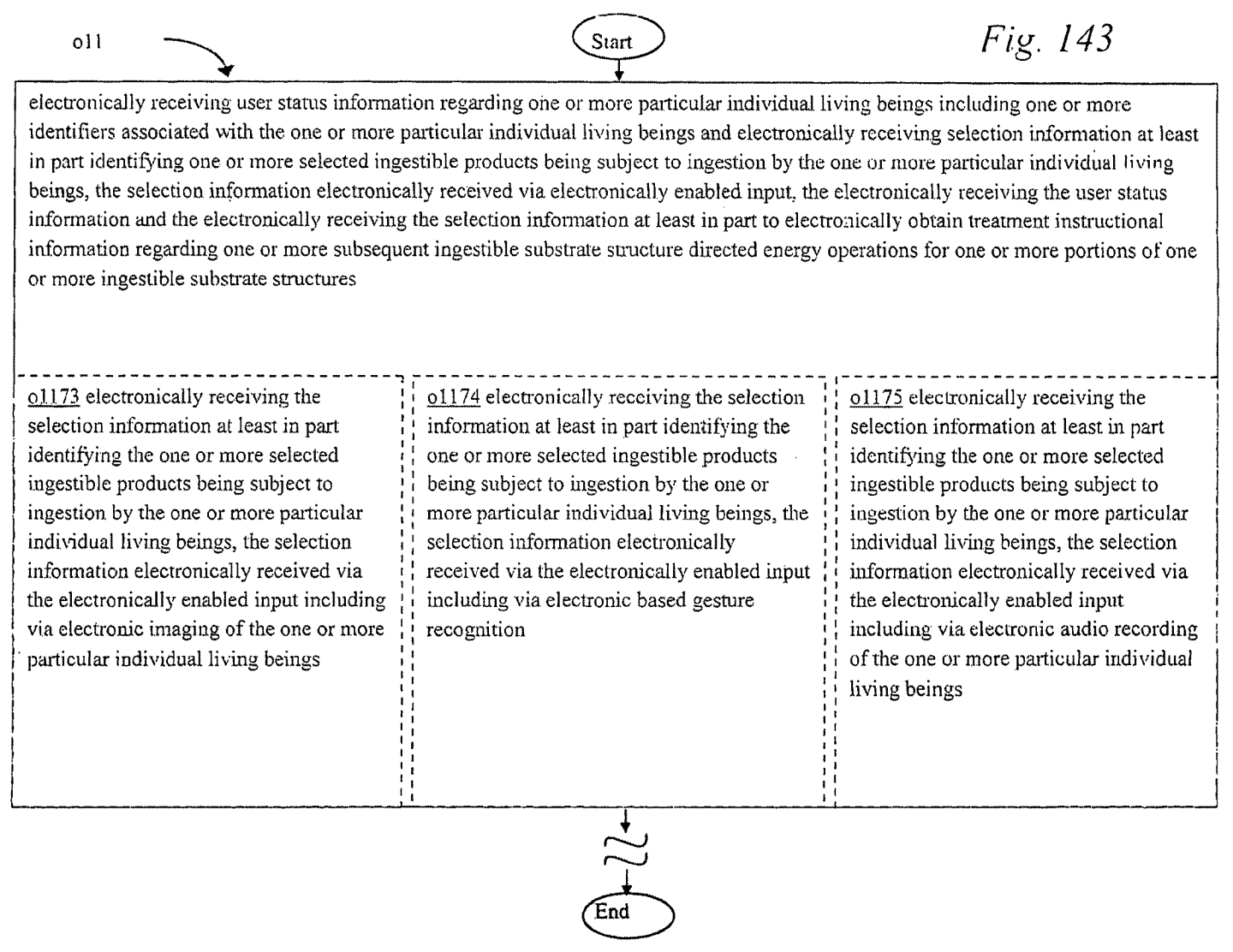

FIG. 143 is a high-level flowchart including exemplary implementations of operation o11 of FIG. 118.

Figure 144:
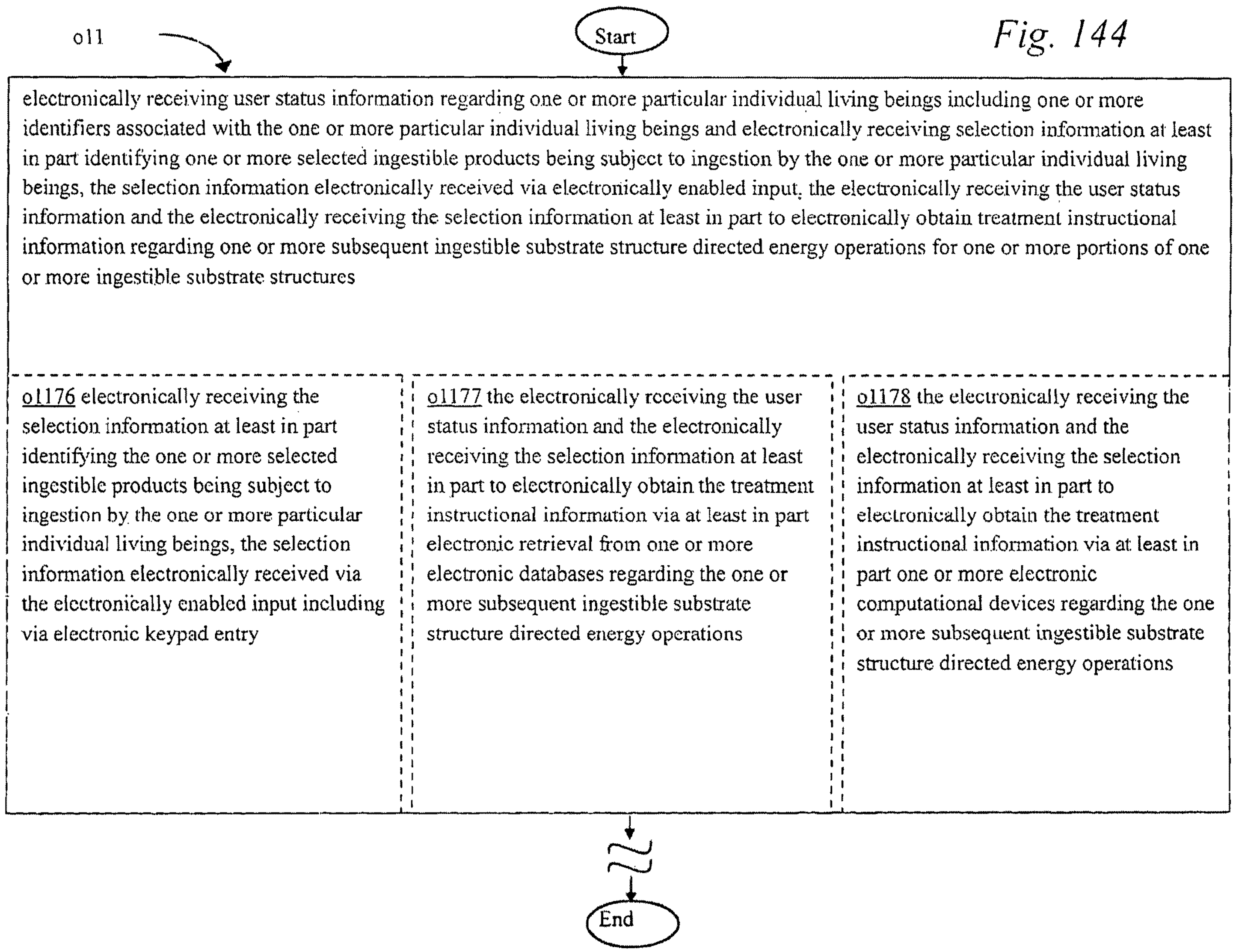

FIG. 144 is a high-level flowchart including exemplary implementations of operation o11 of FIG. 118.

Figure 145:
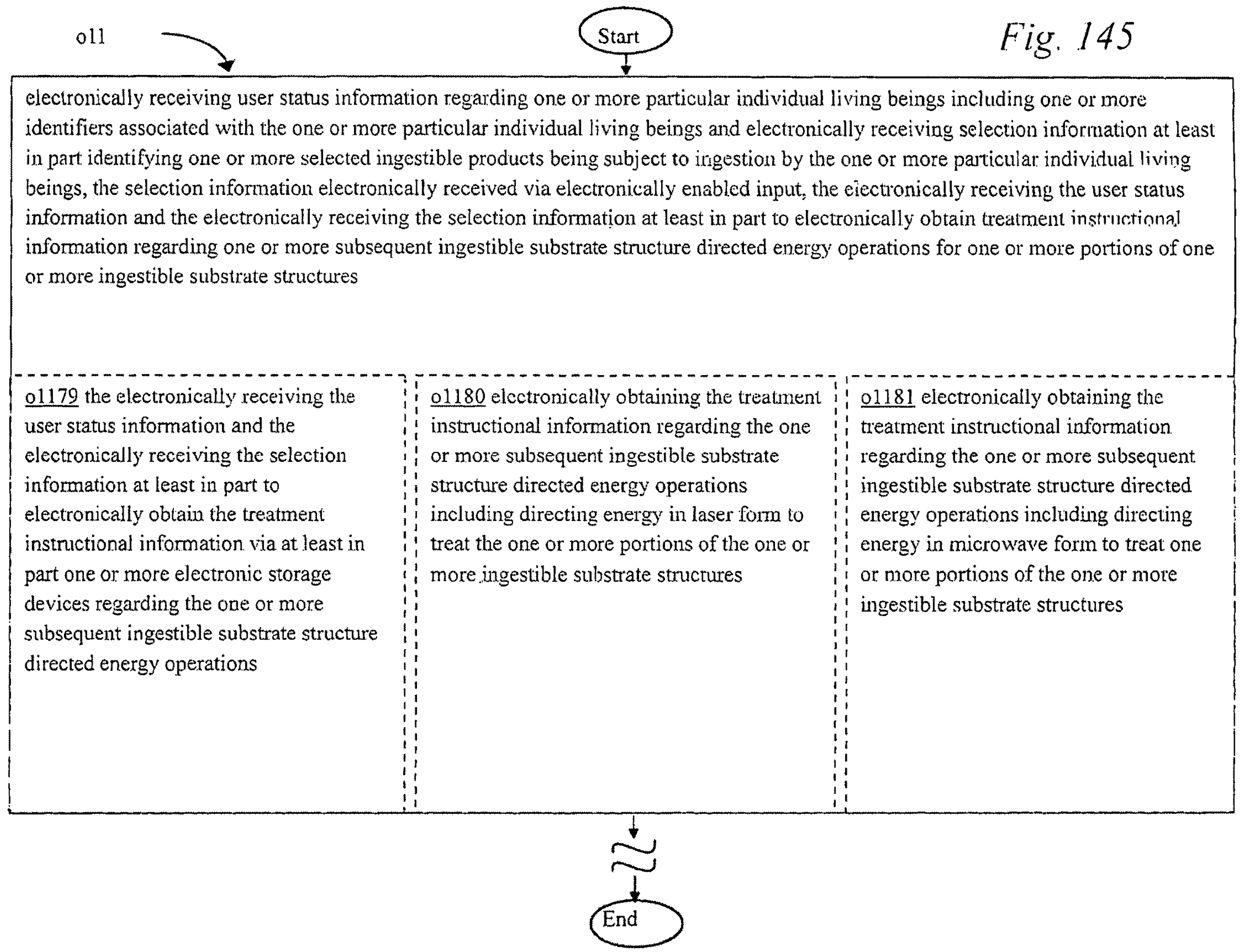

FIG. 145 is a high-level flowchart including exemplary implementations of operation o11 of FIG. 118.

Figure 146:
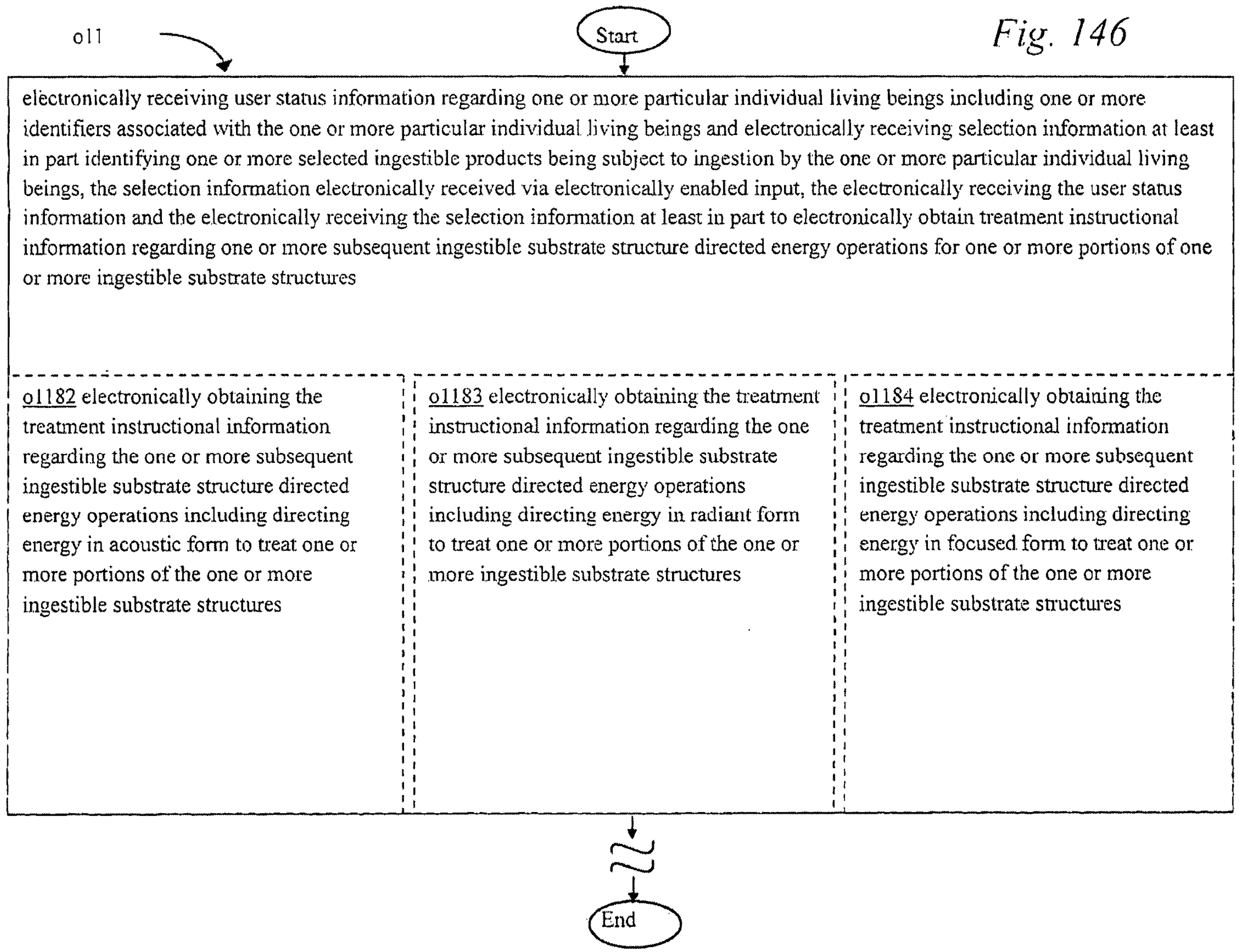

FIG. 146 is a high-level flowchart including exemplary implementations of operation o11 of FIG. 118.

Figure 147:
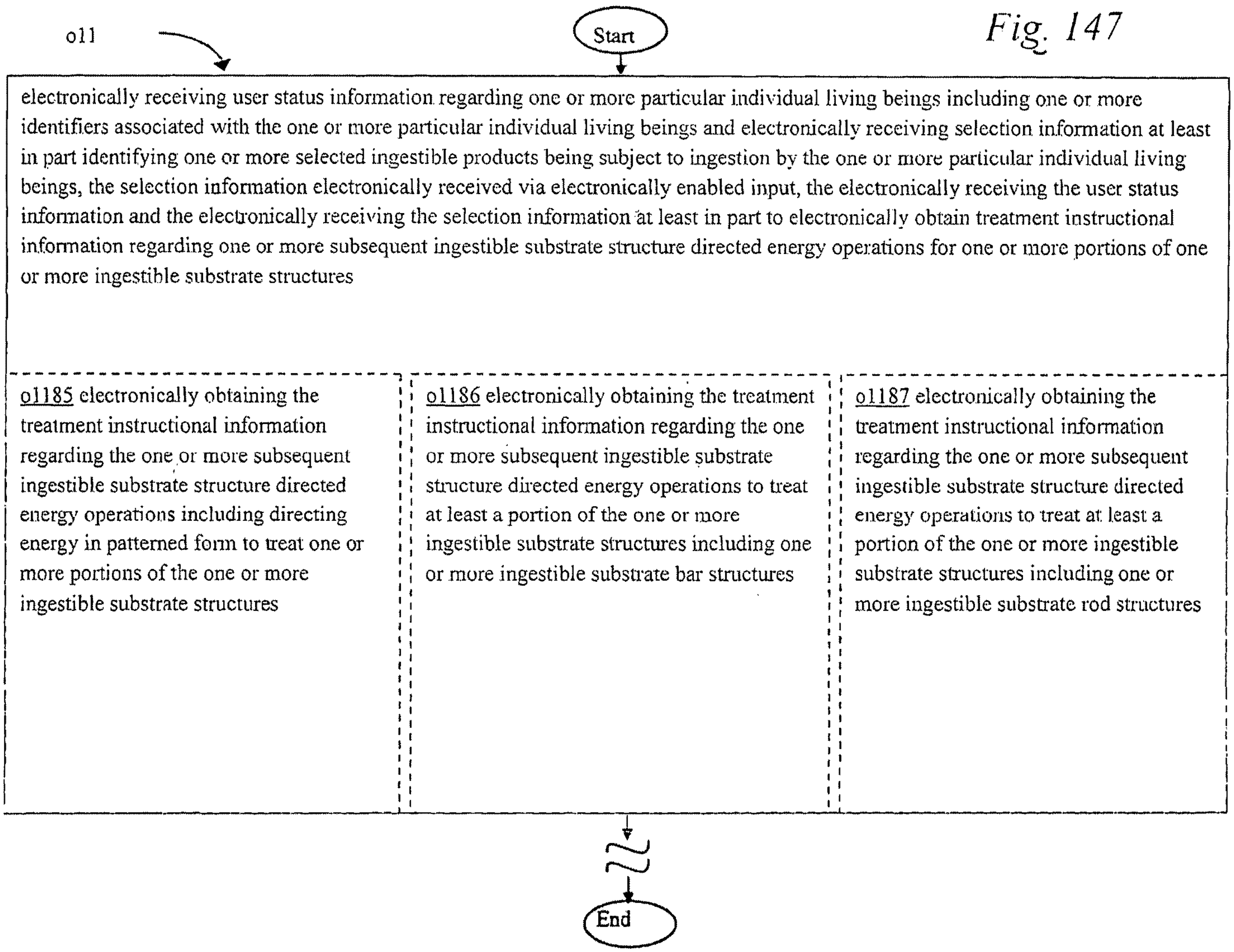

FIG. 147 is a high-level flowchart including exemplary implementations of operation o11 of FIG. 118.

Figure 148:
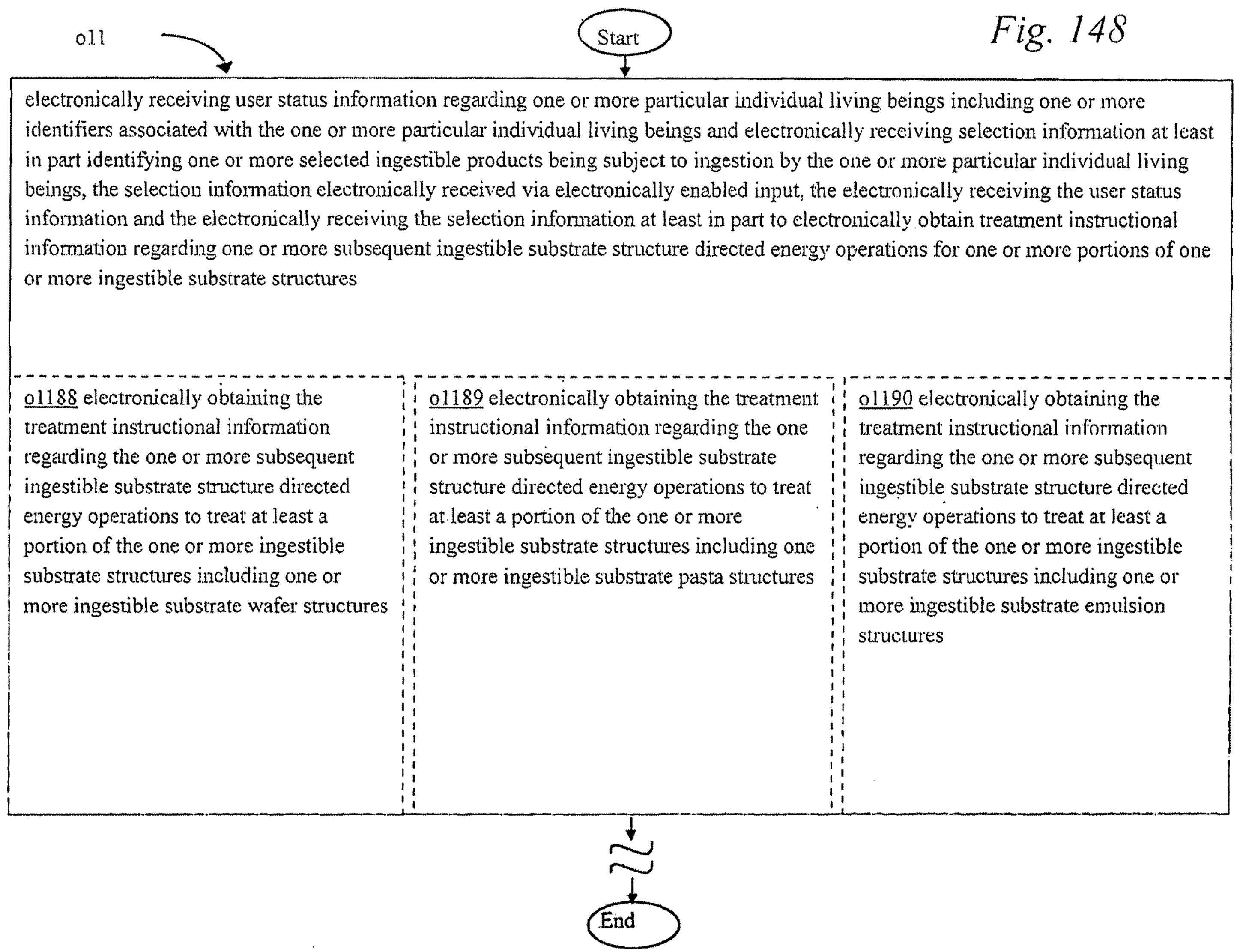

FIG. 148 is a high-level flowchart including exemplary implementations of operation o11 of FIG. 118.

Figure 149:
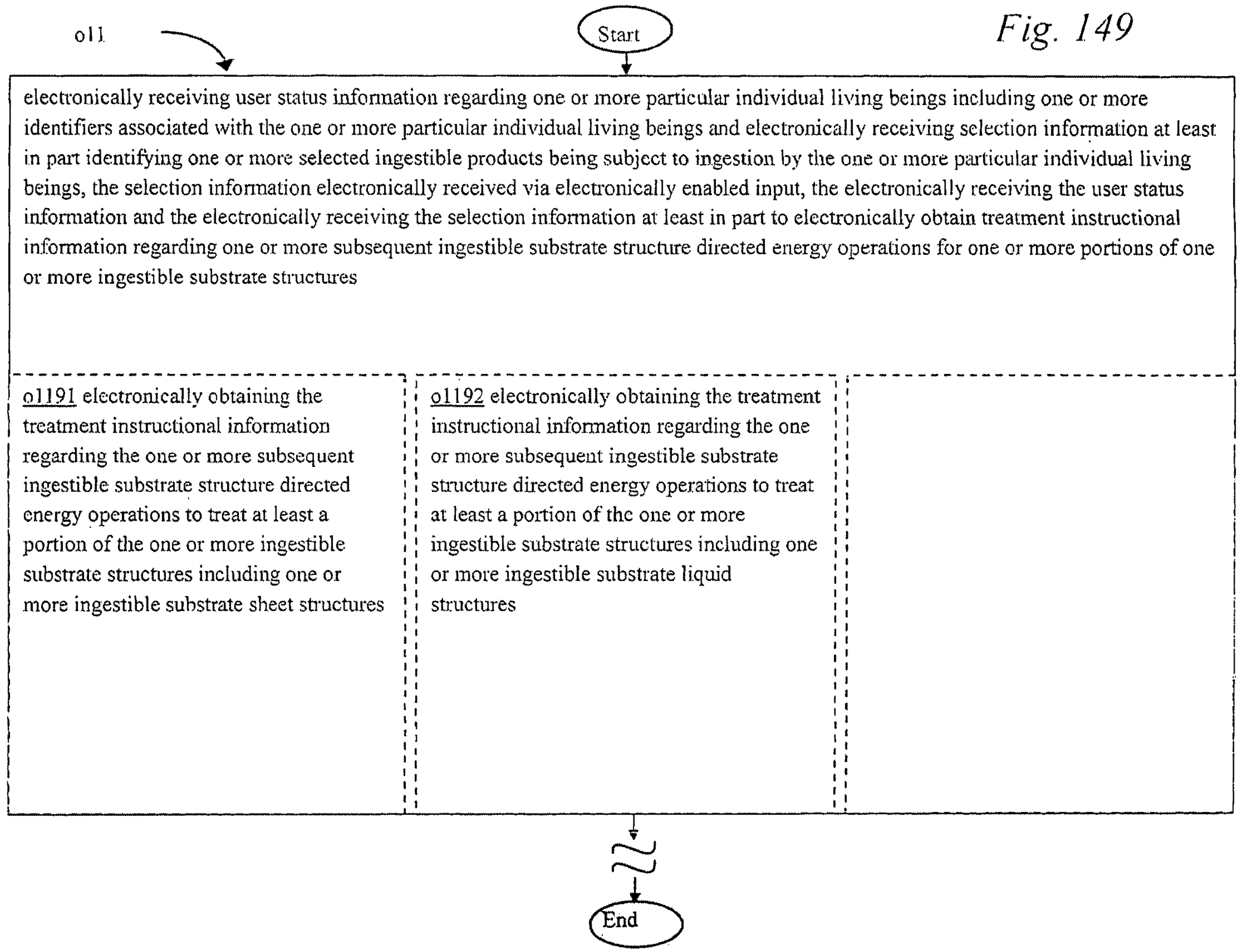

FIG. 149 is a high-level flowchart including exemplary implementations of operation o11 of FIG. 118.

Figure 150:
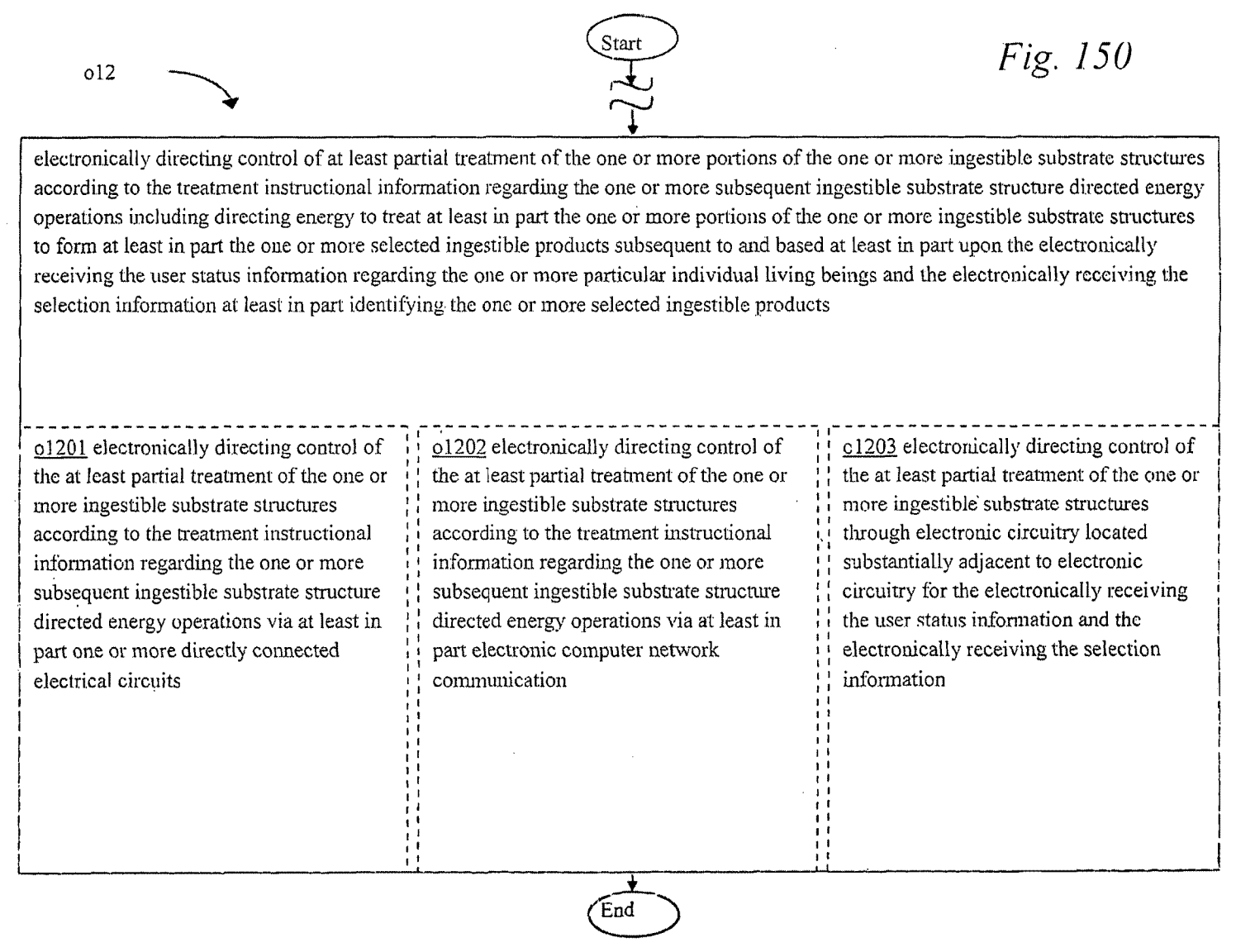

FIG. 150 is a high-level flowchart including exemplary implementations of operation o12 of FIG. 118.

Figure 151:
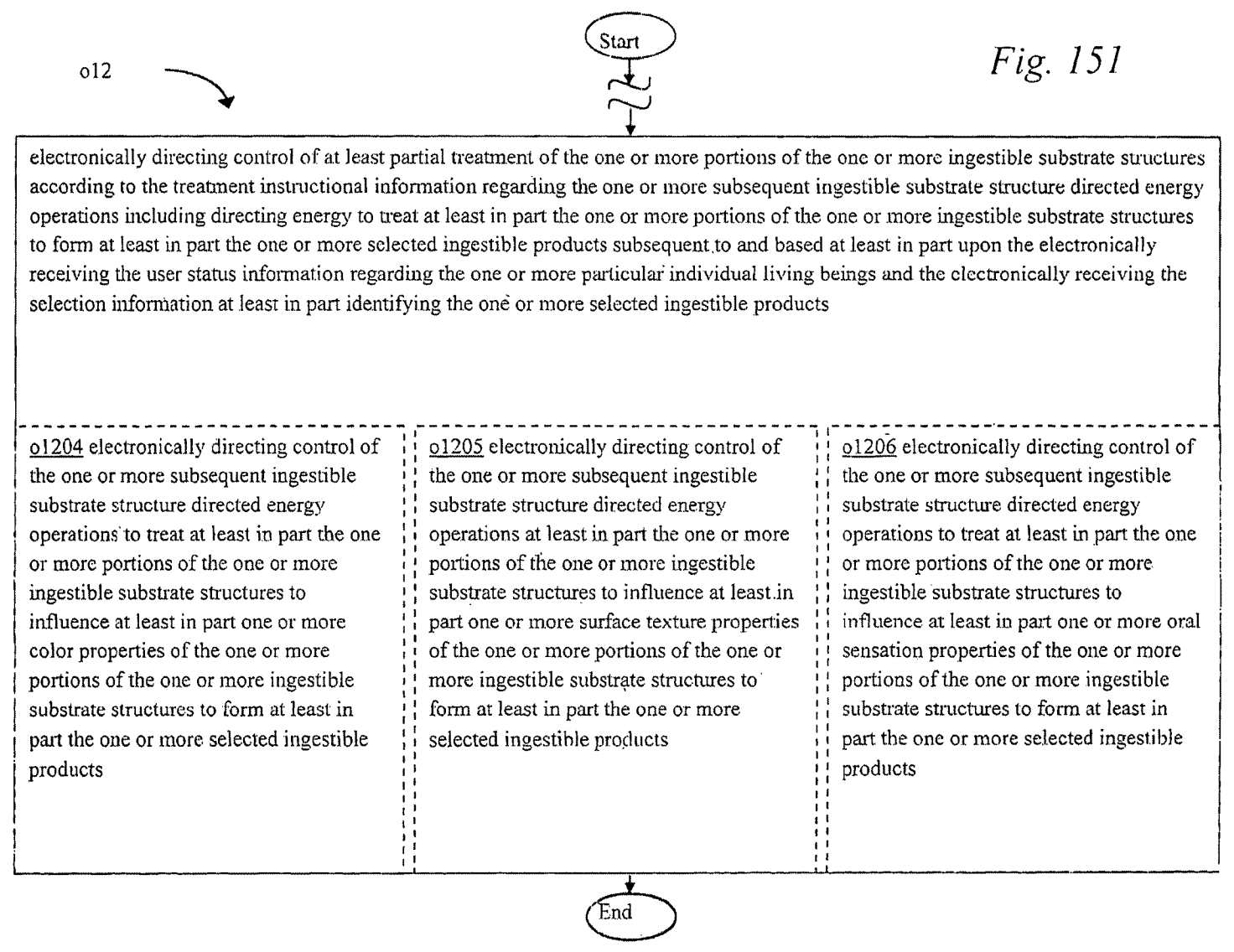

FIG. 151 is a high-level flowchart including exemplary implementations of operation o12 of FIG. 118.

Figure 152:
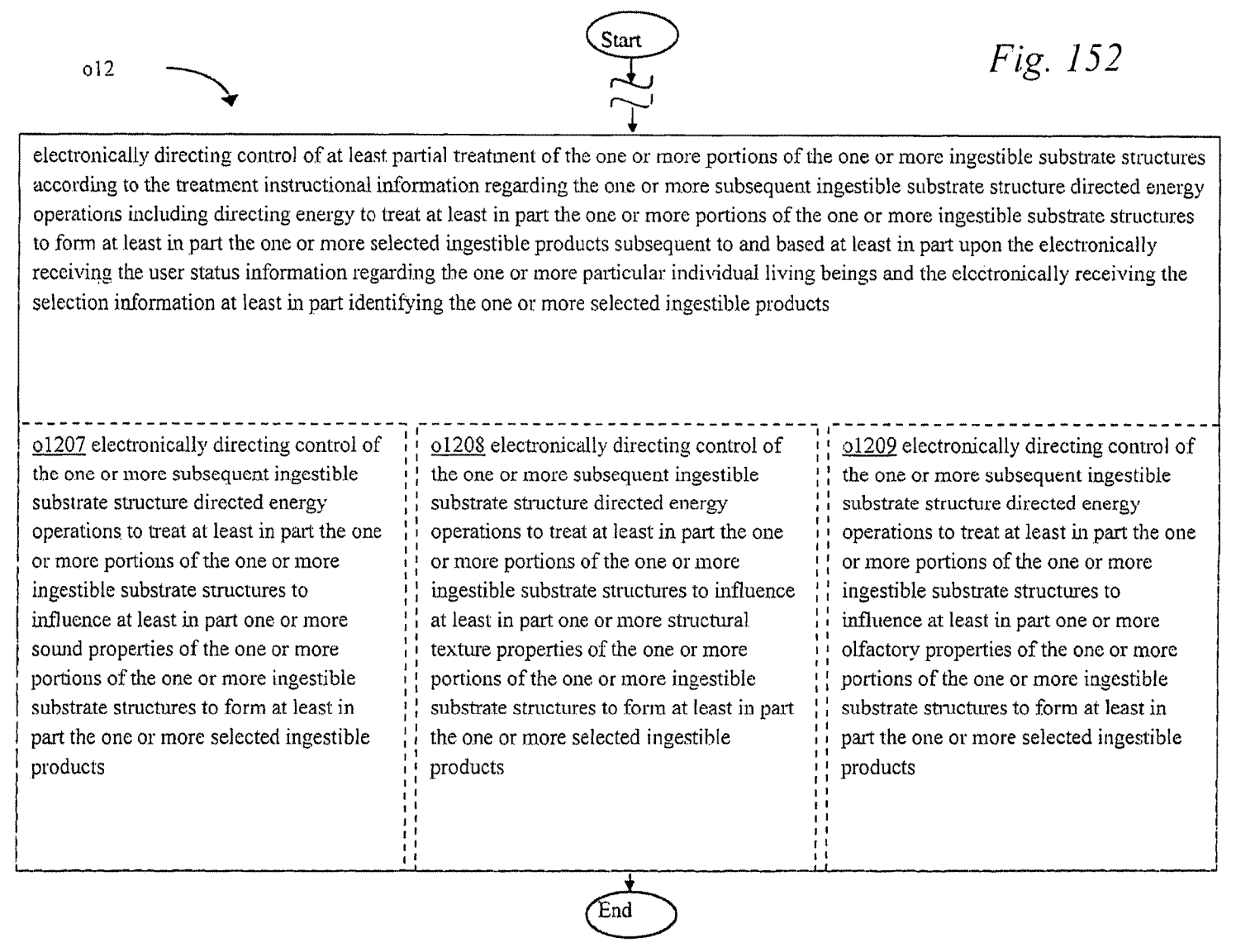

FIG. 152 is a high-level flowchart including exemplary implementations of operation o12 of FIG. 118.

Figure 153:
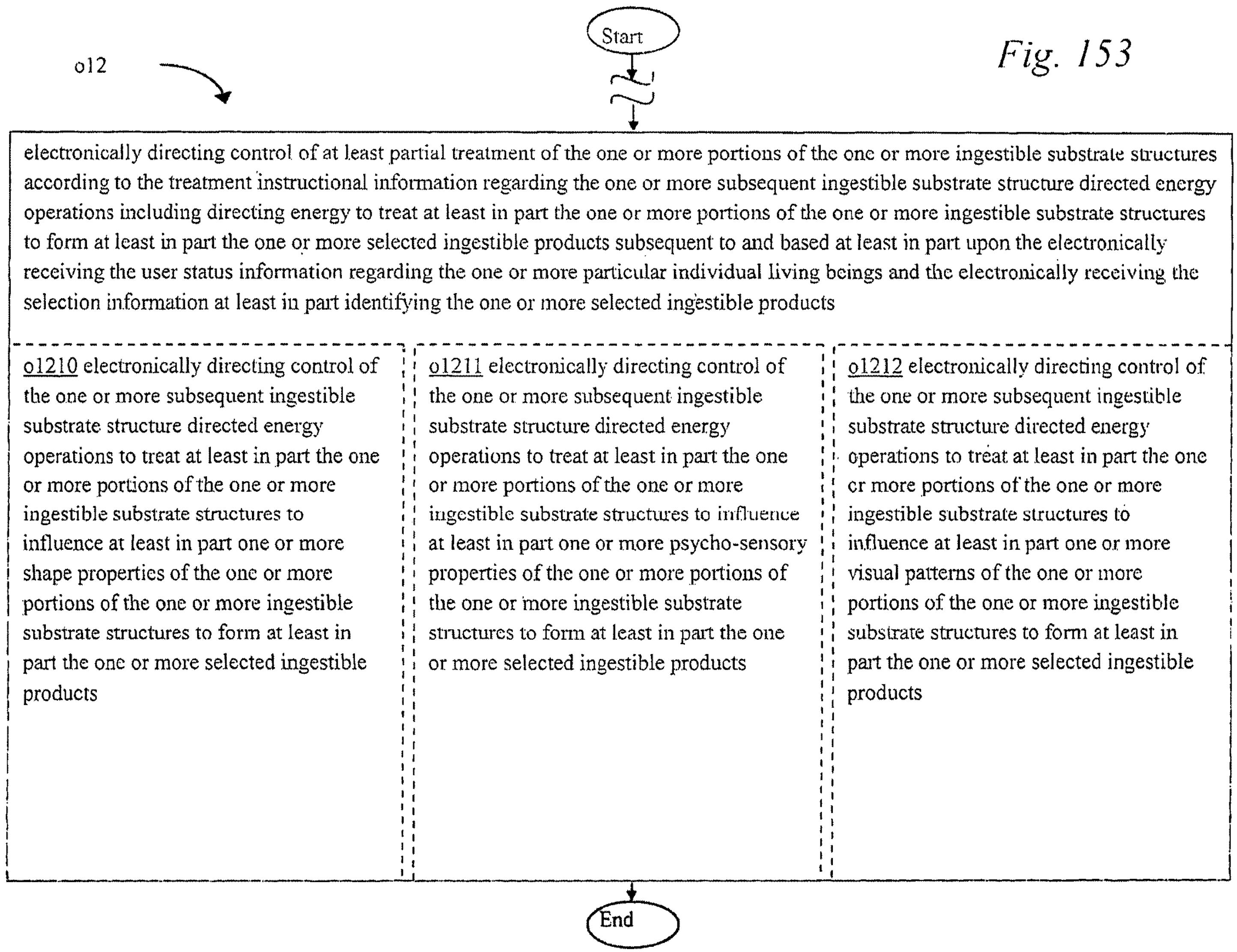

FIG. 153 is a high-level flowchart including exemplary implementations of operation o12 of FIG. 118.

Figure 154:
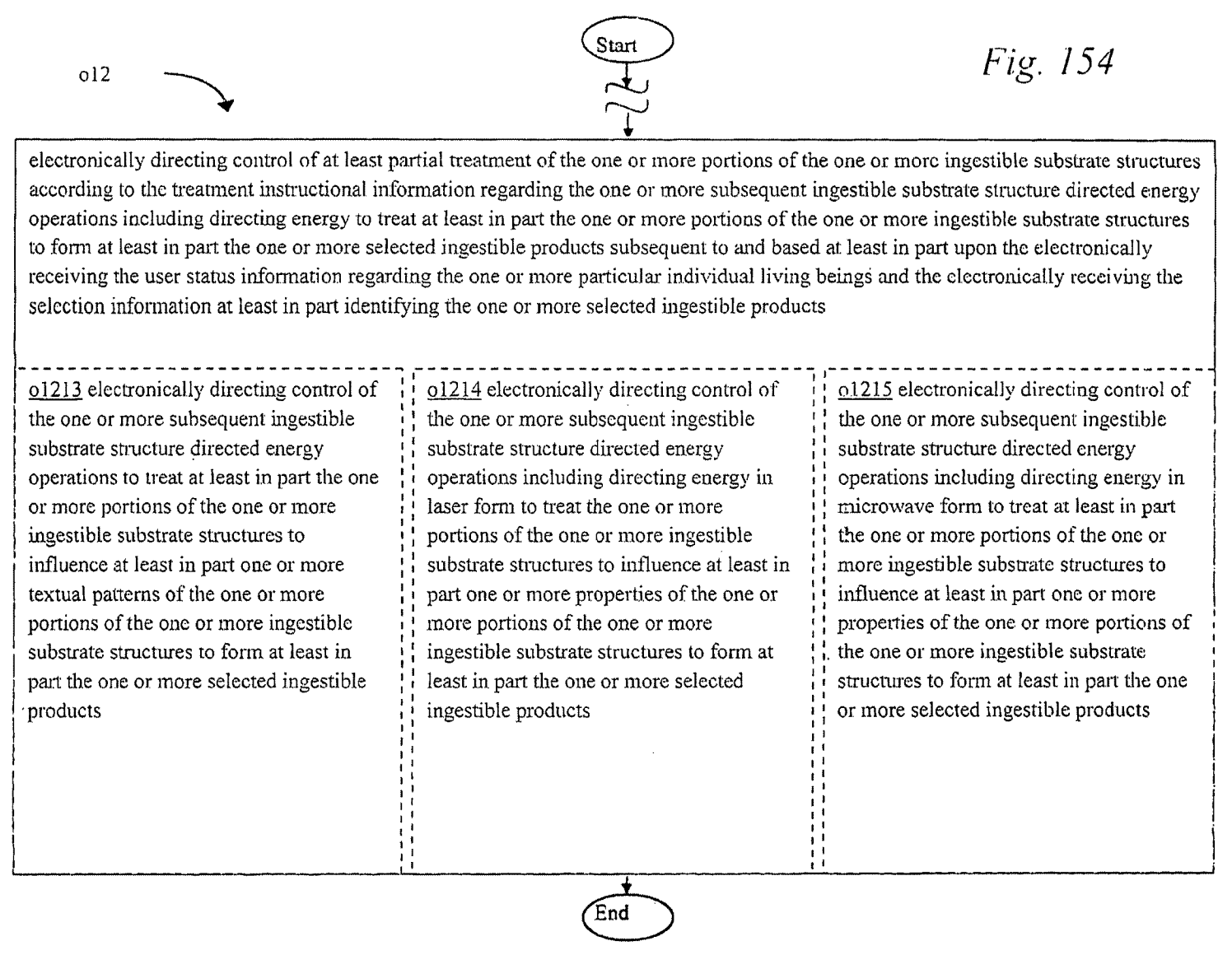

FIG. 154 is a high-level flowchart including exemplary implementations of operation o12 of FIG. 118.

Figure 155:
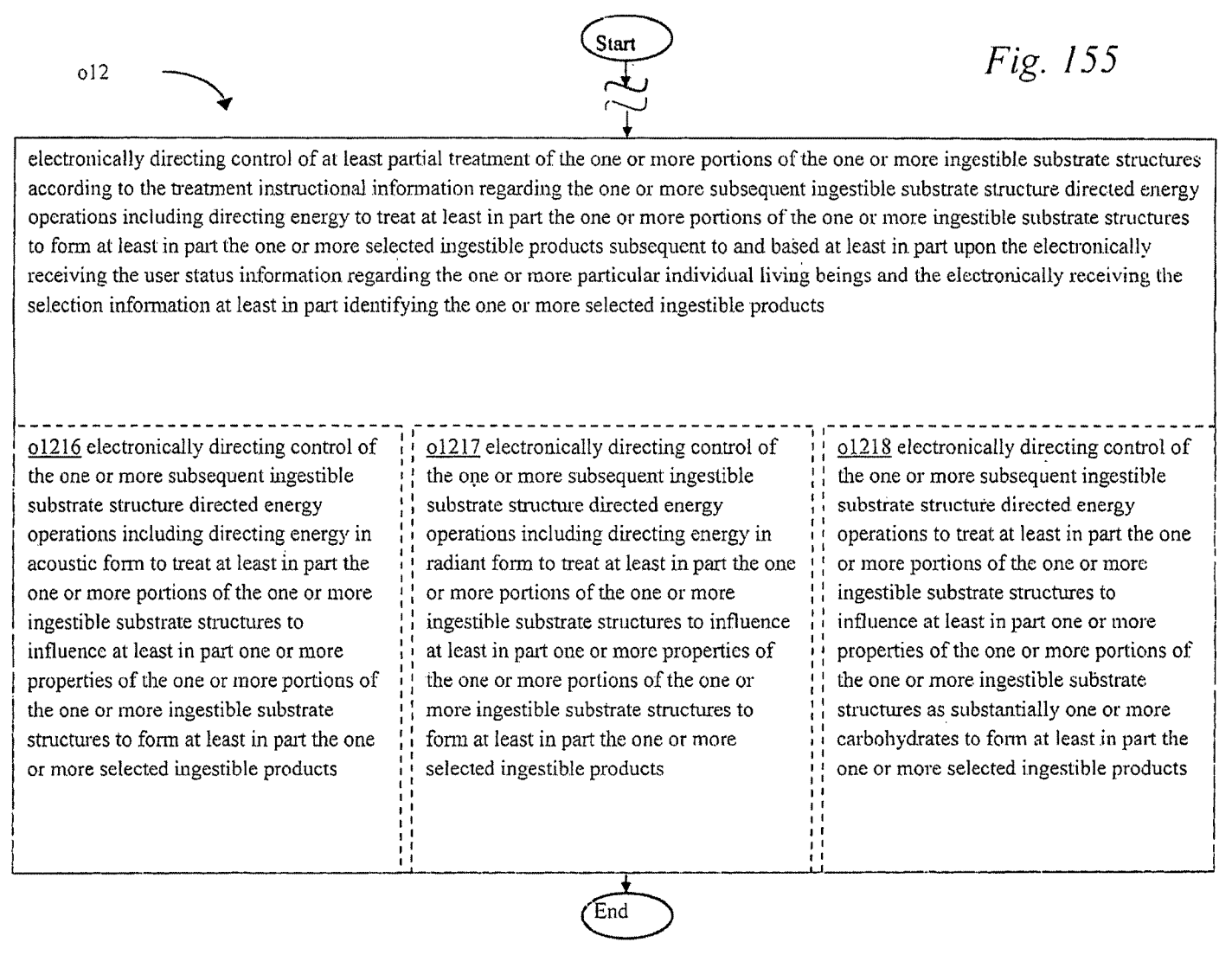

FIG. 155 is a high-level flowchart including exemplary implementations of operation o12 of FIG. 118.

Figure 156:
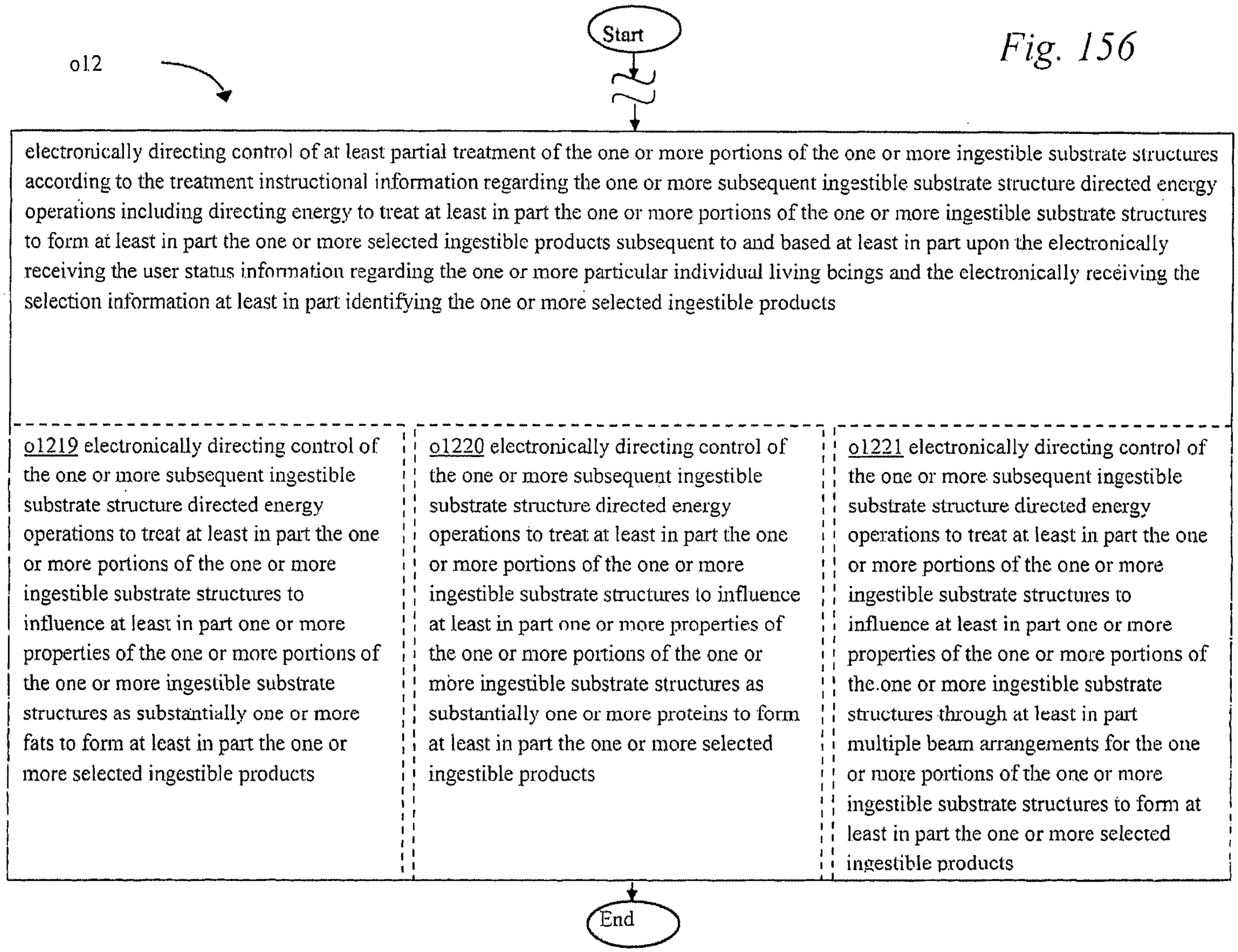

FIG. 156 is a high-level flowchart including exemplary implementations of operation o12 of FIG. 118.

Figure 157:
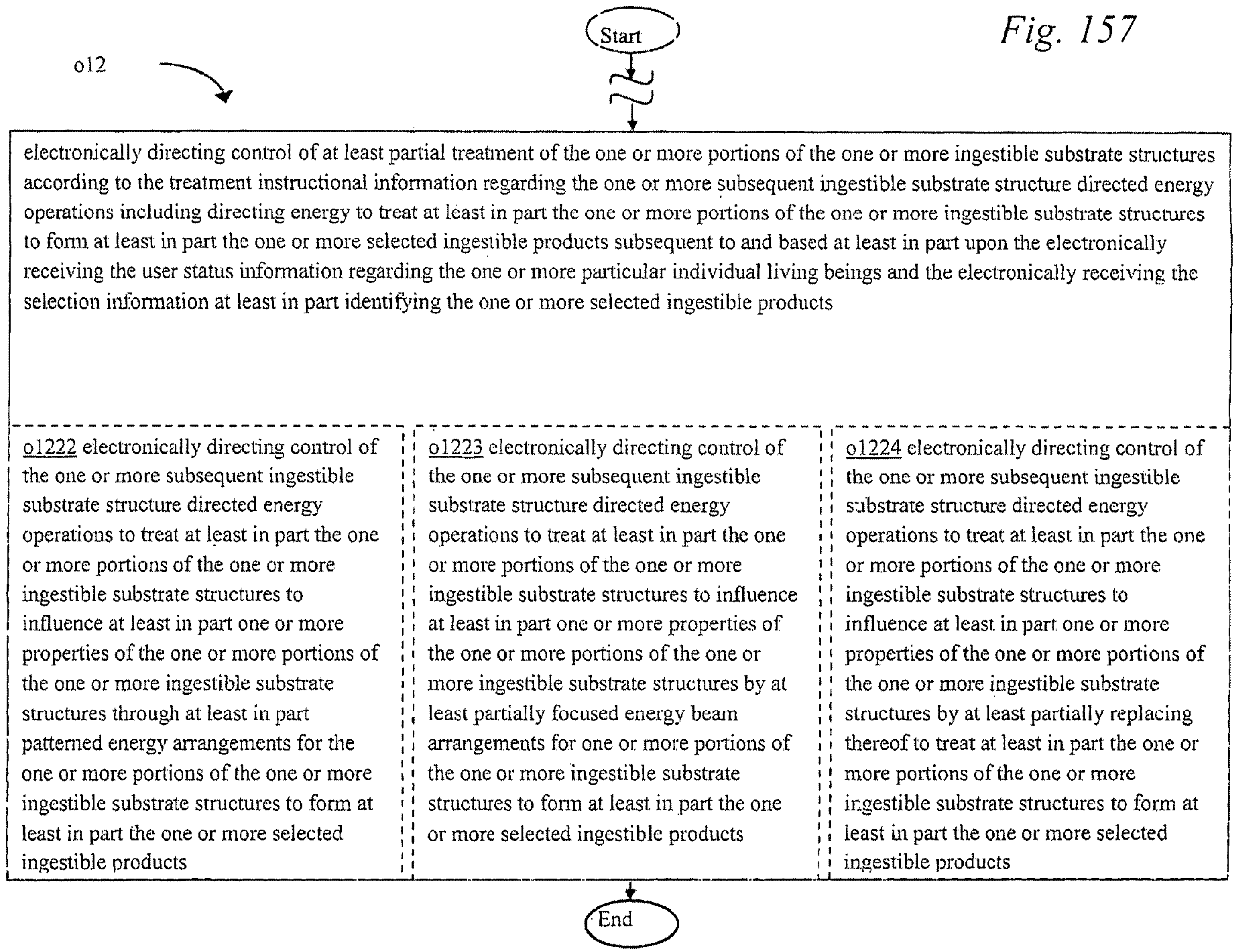

FIG. 157 is a high-level flowchart including exemplary implementations of operation o12 of FIG. 118.

Figure 158:
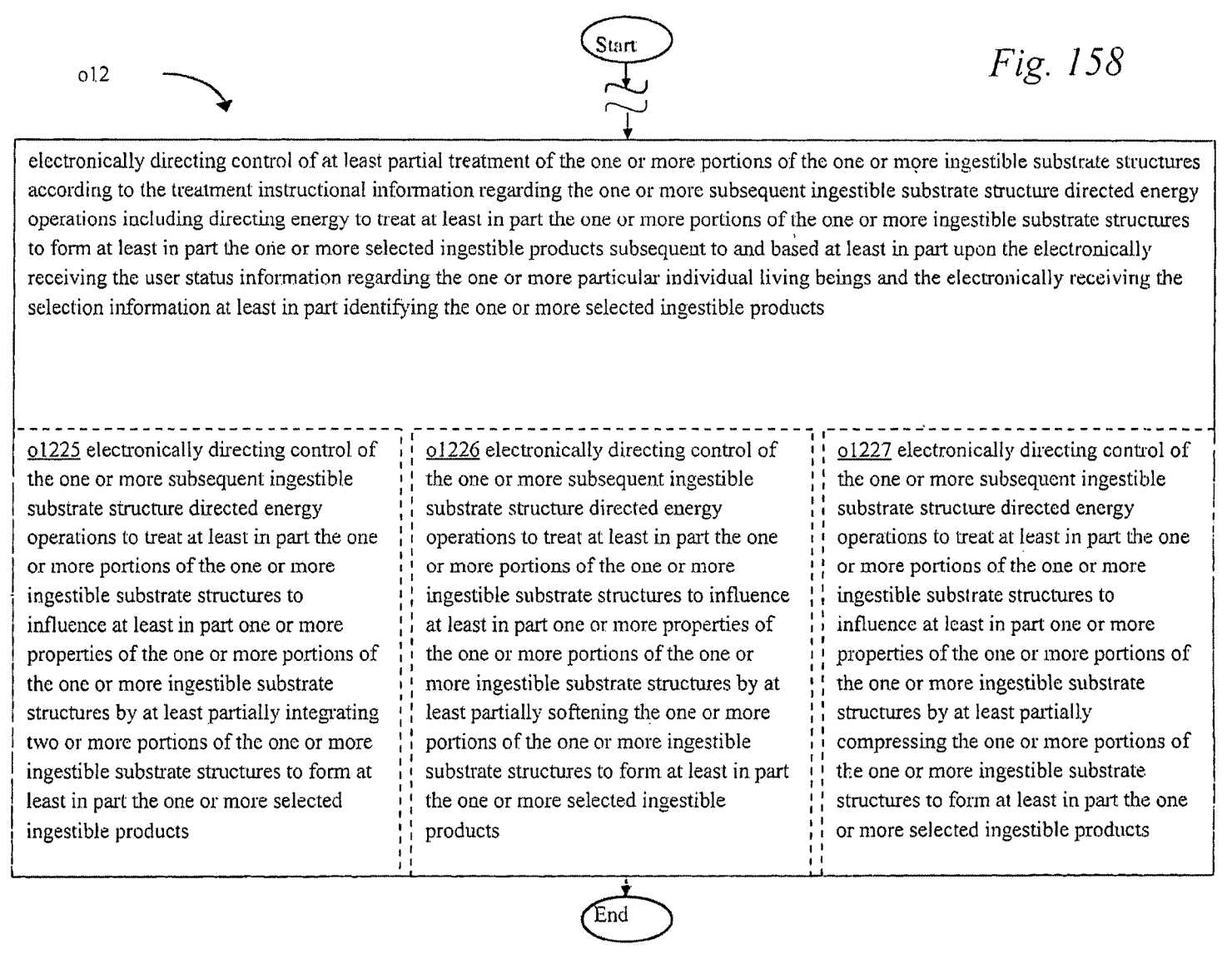

FIG. 158 is a high-level flowchart including exemplary implementations of operation o12 of FIG. 118.

FIG. 159 is a high-level flowchart including exemplary implementations of operation o12 of FIG. 118.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present application may use formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Generally, automated and semi-automated machines to make, manufacture, fabricate, or otherwise prepare and/or dispense ingestible products to be ingested by living beings such as humans, animals, plants, etc. are known to a degree with interest existing for future development as well. Automated and semi-automated preparation of the ingestible products can incorporate all known forms of preparation of food and other ingestible products including but not limited to all known forms of energy addition to one or more ingredients of the ingestible products (such as through various forms of thermal heating or adding microwave, infrared, or ultrasonic energy), extracting energy from one or more ingredients of the ingestible products (such as through thermodynamic-cycle based cooling or peltier cooling), deposition methods (including deposition by layering and/or at the pixel level, such as through use of printers, and/or etc.), and combinational methods (such as blending, mixing, ingredient injection, kneading, stirring, ultrasonic agitation, other agitational methods, etc.), etc. Printers can be configured to print food such as meat, vegetable, fruit, grain and other food materials.

Although ingestible products made, fabricated, or otherwise prepared and/or dispensed by semi-automated and automated machines are presently limited in scope to a degree, it is envisioned that with future development, this will change. Ingestible products can take many forms including, but not limited to, solids, semi-solids, liquids, gases, dispersions (such as true solutions, colloid dispersions, emulsions, foams, and gels) and vast combinations thereof. Time for final semi-automated and automated preparation may be reduced if ingestible substrate structures can be fabricated beforehand with modification, such as through deposition methods, done thereto near point of purchase or at other times near ingestion thereof.

Various methods of ingestion can include consumption methods and delivery methods such as oral, dermal, intranasal, transdermal, transmucosal, peroral, buccal, sublingual, ocular, rectal, injection, peg-tube, nasal, tear-duct, respiratory, inhalation, etc. as associated with ingestion by a particular individual living being of ingestible material dispensed or produced and selected under influence through selection information from the computer based social network service 46 through the ingestible product preparation system 10.

Figure 1A:
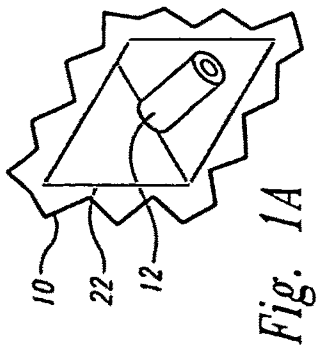
FIG. 1A is a fragmentary view depicting a second application of the first exemplary implementation of the ingestible product preparation system of FIG. 1.
Figure 1B:
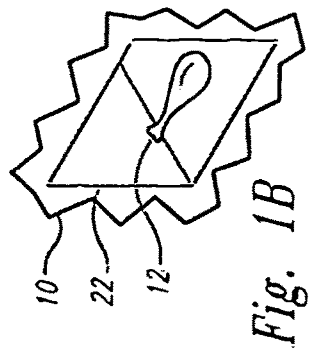
FIG. 1B is a fragmentary view depicting a third application of the first exemplary implementation of the ingestible product preparation system of FIG. 1.
Figure 1C:
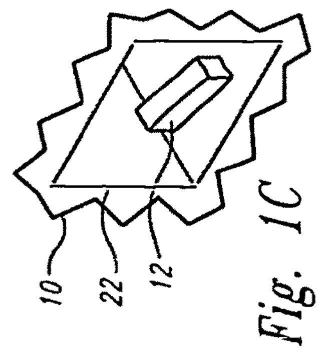
FIG. 1C is a fragmentary view depicting a fourth application of the first exemplary implementation of the ingestible product preparation system of FIG. 1.
Figure 1:
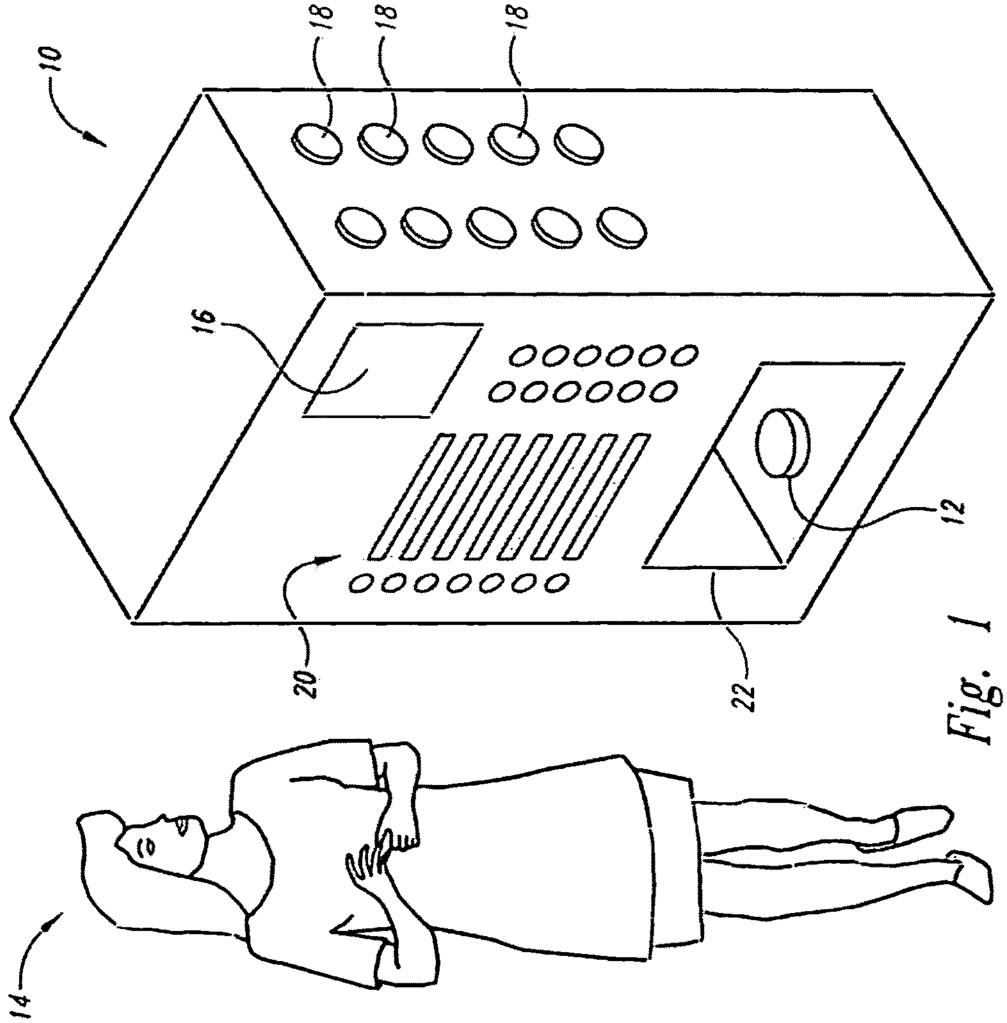
FIG. 1 is a perspective view depicting a first application of a first exemplary implementation of an ingestible product preparation system.
Figure 2:
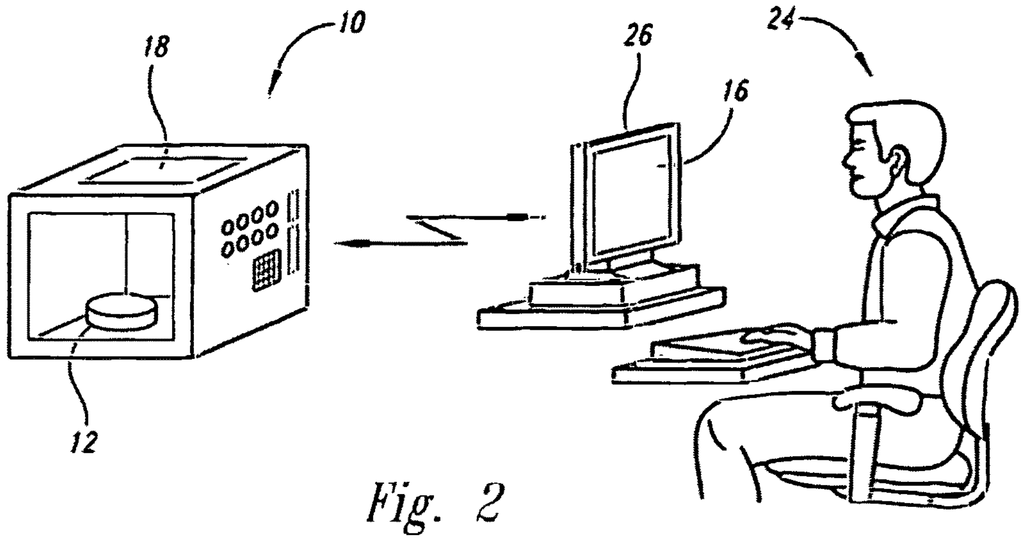
FIG. 2 is a perspective view depicting a first application of a second exemplary implementation of the ingestible product preparation system of FIG. 1.
Figure 3:
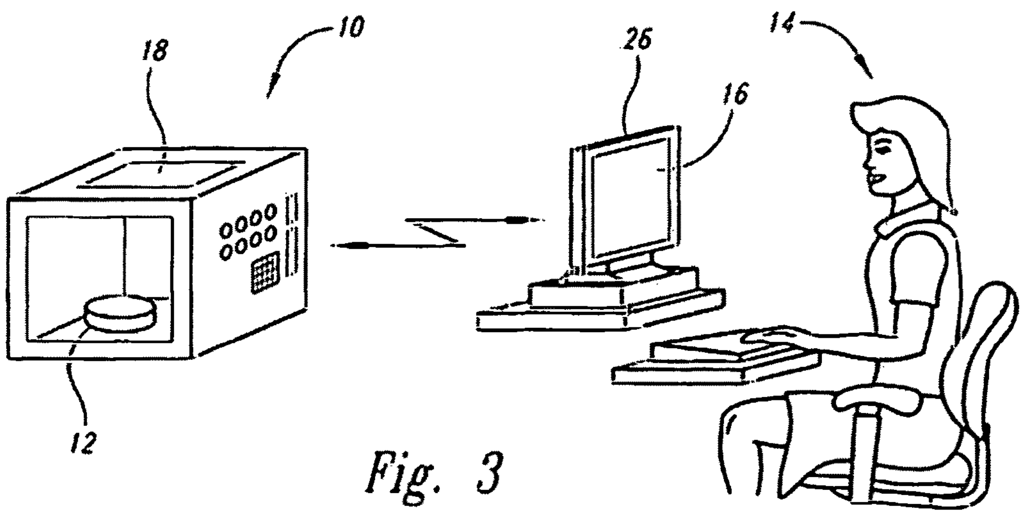
FIG. 3 is a perspective view depicting a second application of the second exemplary implementation of the ingestible product preparation system of FIG. 1.

As depicted in FIGS. 1-3, exemplary implementations of an ingestible product preparation system 10 are shown to prepare and dispense ingestible products 12 such as a liquid drink, hamburger, chicken dinner, or a snack bar (shown in dispensing area 22) to be consumed by a particular individual living being, such as a human being 14 (such as a user, etc.) shown. Exemplary implementations determine selection menus to be generated and outputted, for instance, on display 16 and selections or other information can be inputted through user interfaces, for instance, user input 20 or other types of user input.

For instance, input may be collected through active user input (e.g. keyboard, textual, audio, graphical user interface, etc.) or passive user input (e.g. image recognition of user behavior, refuse analysis of past dispensing such as quantity of wrappers, leftovers, audio analysis of collected unsolicited user comments, etc.). Selection menus can be generated that are unique to a particular individual living being, such as the human being 14, based upon such information as but not limited to identification of the individual and other information such as past selections, allergies, preferences, specials, holidays, location of preparation, location of dispensing, time of day, dislikes, recent ingestion, health goals, present illness, past illness, sports requirements, injuries, fads, hobbies, associated social organizations, etc. As further described these selection menus and other selection aspects can be influenced, guided, directed, or otherwise associated with factors that influence availability of ingredients used to prepare the ingestible products.

Other sorts of ingestible products can include but are not limited to sandwiches (FIG. 1A), full meals (FIG. 1B), food bars (FIG. 1C), meal replacements, snacks, plant and/or animal based products, nutraceuticals, pharmaceuticals, smoothies, etc. Just as the selection menus can be influenced by input from computer based social network services, the selection menus can also provide options for reporting to various computer based social networking services regarding use of the ingestible products including associates venues, parties, types of products involved, etc.

The ingestible product preparation system 10 and possibly smaller more portable versions such as unit 18 is further depicted in FIGS. 2 and 3 as communicating with the human being 14 an exemplary remotely located user or an exemplary advisor 24 (e.g. physician, nurse, nutritionist, health expert, sports coach, etc.) via a communication link (e.g. wireless or wired network or direct electronic communication, etc.) and display screen 16. The display screen 16 can include selection indicators configured to provide information described above by the users and advisors.

Selection menus can be furnished to suggest candidate ingestible products that once selected as selected ingestible products can be prepared and dispensed (in some implementations prepared such as from ingredient containers) and to provide other sorts of information discussed herein. The display screen 16 can display textual and graphic information such as including but not limited to menu screens allowing users to select various dispensing (including in some implementations preparation) options and information requests. Other implementations can include other devices and methods for information input and output including those further discussed below.

Figure 4:
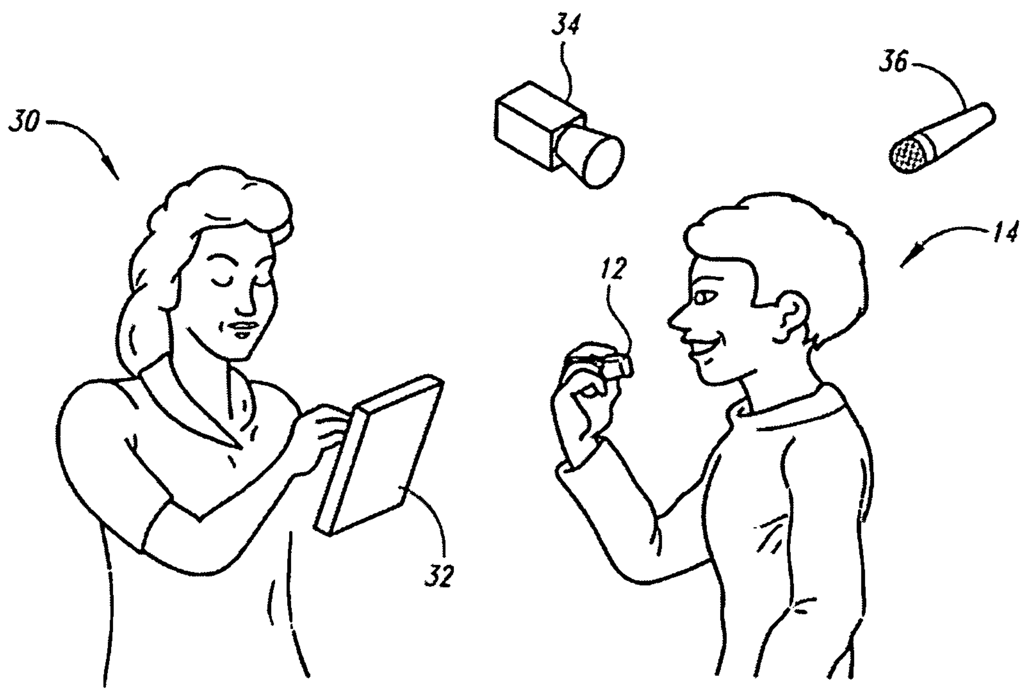
FIG. 4 is a perspective view depicting another location for placement of the ingestible product preparation system.
Figure 5:
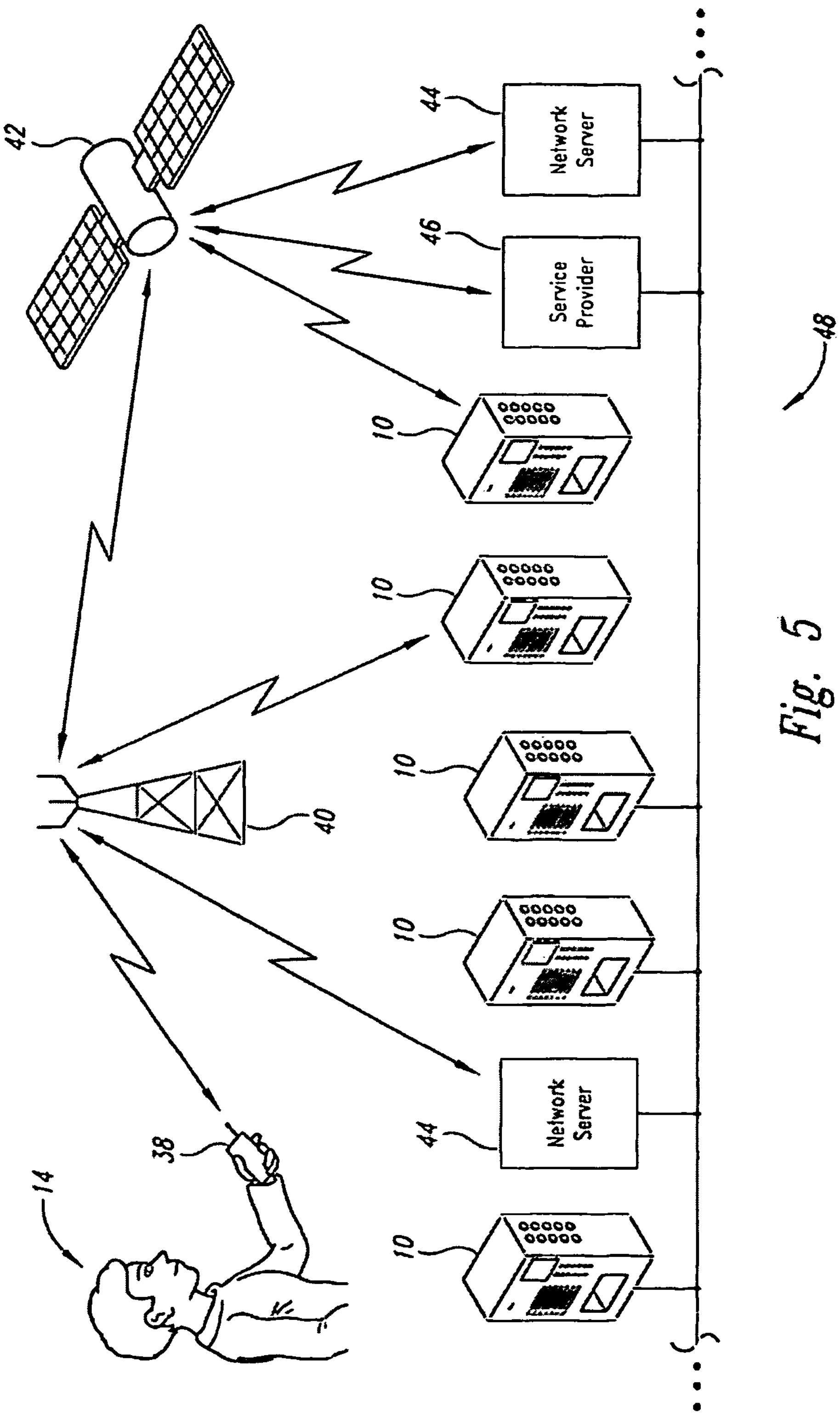
FIG. 5 is a perspective view depicting a communication network incorporating the ingestible product preparation system of FIG. 1.
Figure 6:
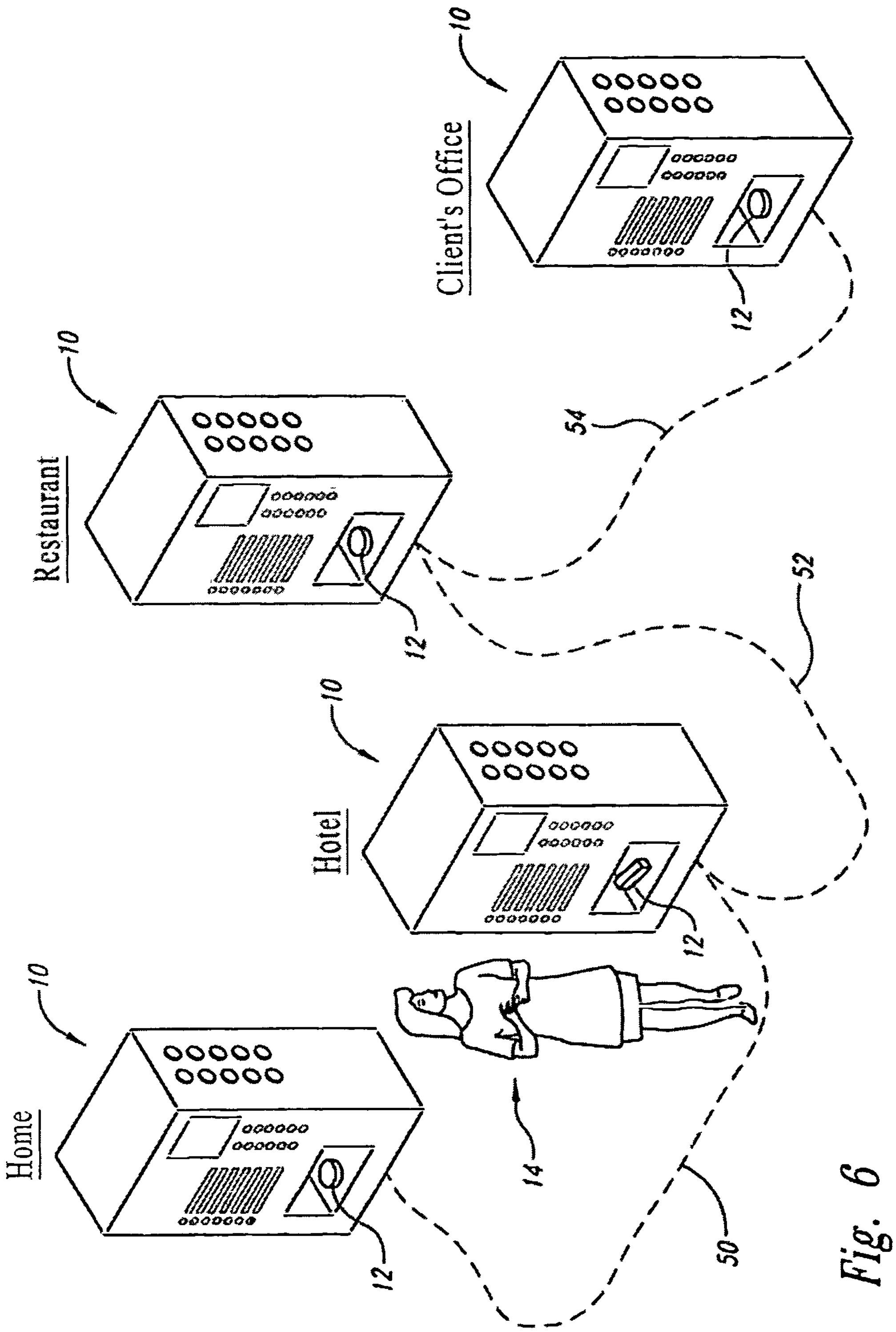
FIG. 6 is a perspective view depicting various locations for placement of the ingestible product preparation system of FIG. 1.

FIG. 4 is a perspective view depicting another location for placement of the ingestible product preparation system with the location including a wait staff 30, taking an order through input device 32 and having sensing devices such as camera 34 and microphone 36. FIG. 5 shows a schematic view of an exemplary communication network incorporating the ingestible product preparation system of FIG. 1 along with mobile device 38, base station 40, satellite 42, network server 44, and service provider 46. FIG. 6 is a perspective view depicting various locations for placement of the ingestible product preparation system of FIG. 1 along paths 50, 52, and 54.

Figure 7:
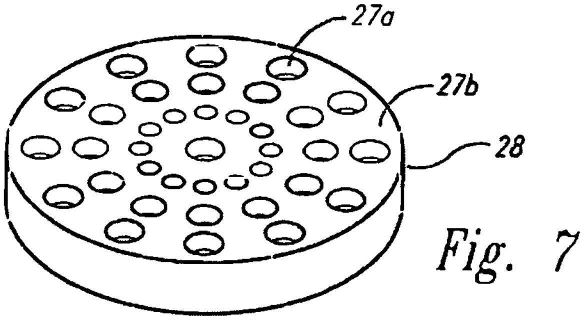
FIG. 7 is a perspective view of a first exemplary ingestible substrate implementation.

FIG. 7 is a perspective view of an exemplary implementation of an ingestible substrate structure 28 to be treated by one or more versions of the ingestible product preparation system. The ingestible substrate structure 28 is shown having an internal structural texture 27*a* and a surface texture 27*b*.

Figure 8:
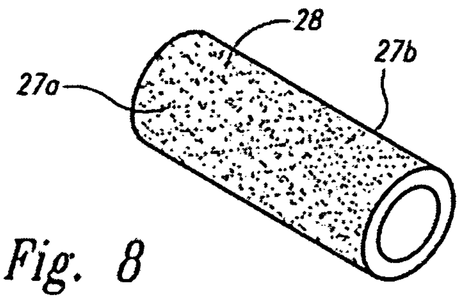
FIG. 8 is a perspective view of a second ingestible substrate implementation.
Figure 9:
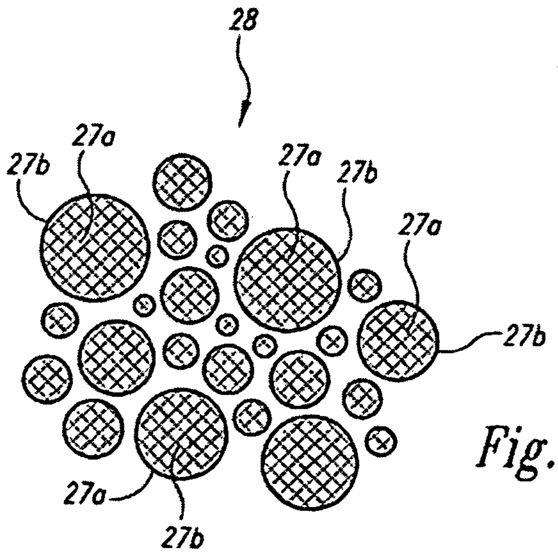
FIG. 9 is a perspective view of a third ingestible substrate implementation.
Figure 10:
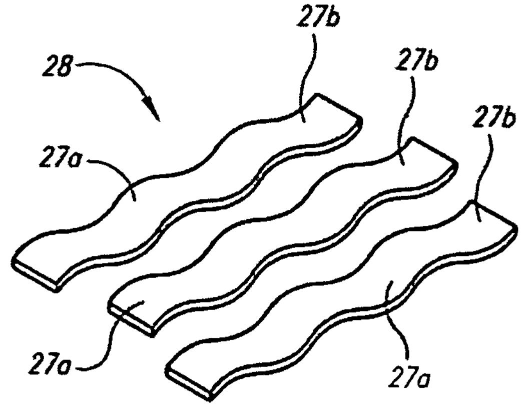
FIG. 10 is a perspective view of a fourth ingestible substrate implementation.

FIG. 8 is a perspective view of a second exemplary ingestible substrate structure 28. FIG. 9 is a perspective view of a third exemplary ingestible substrate structure 28. FIG. 10 is a perspective view of a fourth ingestible substrate structure 28.

The following exemplary assemblies of ingestible parts are for illustrative purposes so are not intended to be an exhaustive listing of what can be involved with various shapes, configurations, uses, or other characterization associated with the ingestible parts and their assemblies, which can include such factors as densities, void and other patterns, material selections, embedded encapsulations, structural textures, colors, olfactory properties, surface textures, oral sensations, shapes, sounds, psycho-sensory aspects, and/or etc.

Figure 11:
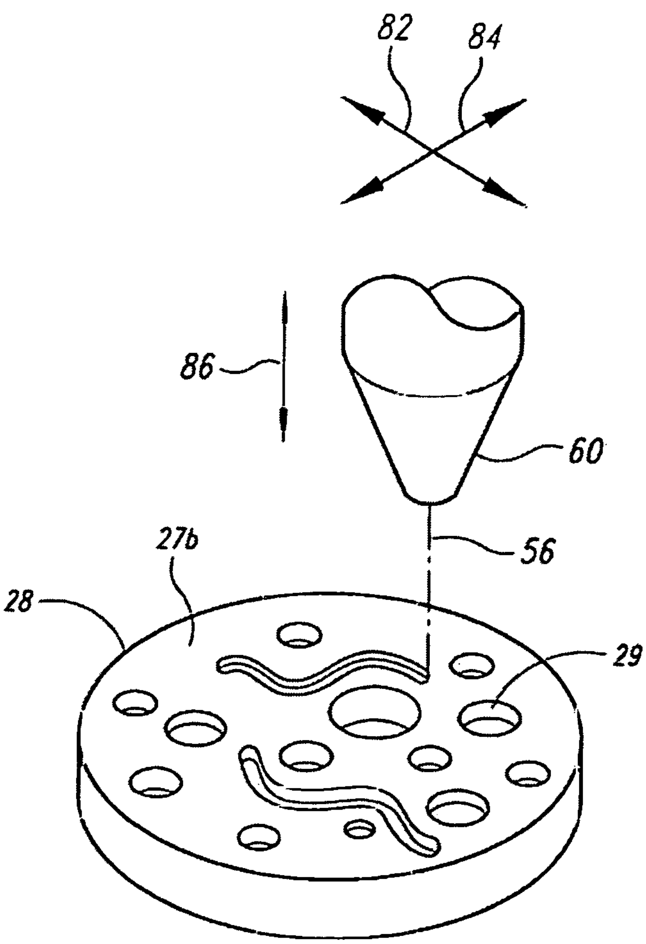
FIG. 11 is a perspective view of a first exemplary directed energy treatment assembly configured for the ingestible product preparation system.

FIG. 11 is a perspective view of a first exemplary directed energy treatment assembly having movable energy emitter 60 directing energy in the form of a focused energy beam 56 onto the surface 27*b* of the substrate 28 to form treated portions 29 as configured for the ingestible product preparation system. The energy beam 56 can be one of laser, microwave, acoustic, radiant, electromagnetic, or other energy type.

Figure 12:
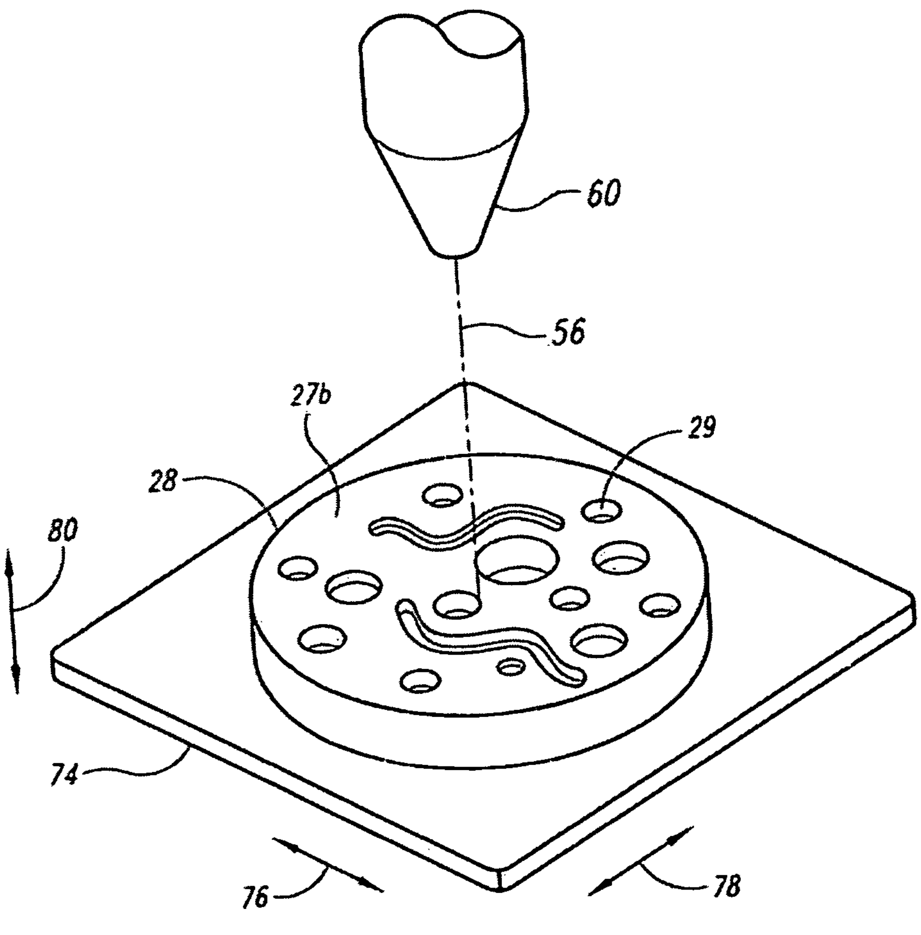
FIG. 12 is a perspective view of a second exemplary directed energy treatment assembly configured for the ingestible product preparation system.

FIG. 12 is a perspective view of a second exemplary directed energy treatment assembly having movable platform 74 and a stationary energy emitter 60 directing energy in the form of the focused energy beam 56 onto the surface 27*b* of the substrate 28 to form treated portions 29 as configured for the ingestible product preparation system. The energy beam 56 can be one of laser, microwave, acoustic, radiant, electromagnetic, or other energy type.

Figure 13:
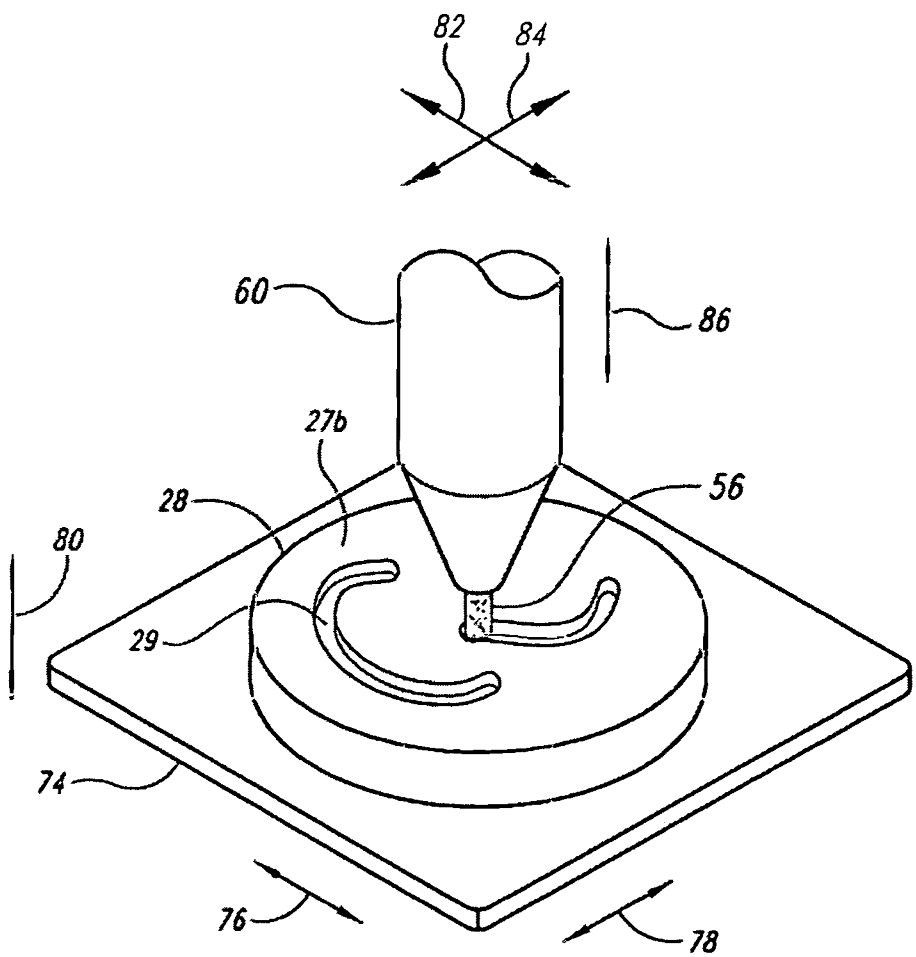
FIG. 13 is a perspective view of a third direct energy treatment assembly configured for the ingestible product preparation system.

FIG. 13 is a perspective view of a third exemplary directed energy treatment assembly having the movable platform 74 and the movable energy emitter 60 directing energy in the form of a less focused energy beam 56 onto the surface 27*b* of the substrate 28 to form treated portions 29 as configured for the ingestible product preparation system.

The energy beam 56 can be one of laser, microwave, acoustic, radiant, electromagnetic, or other energy type.

Figure 14:
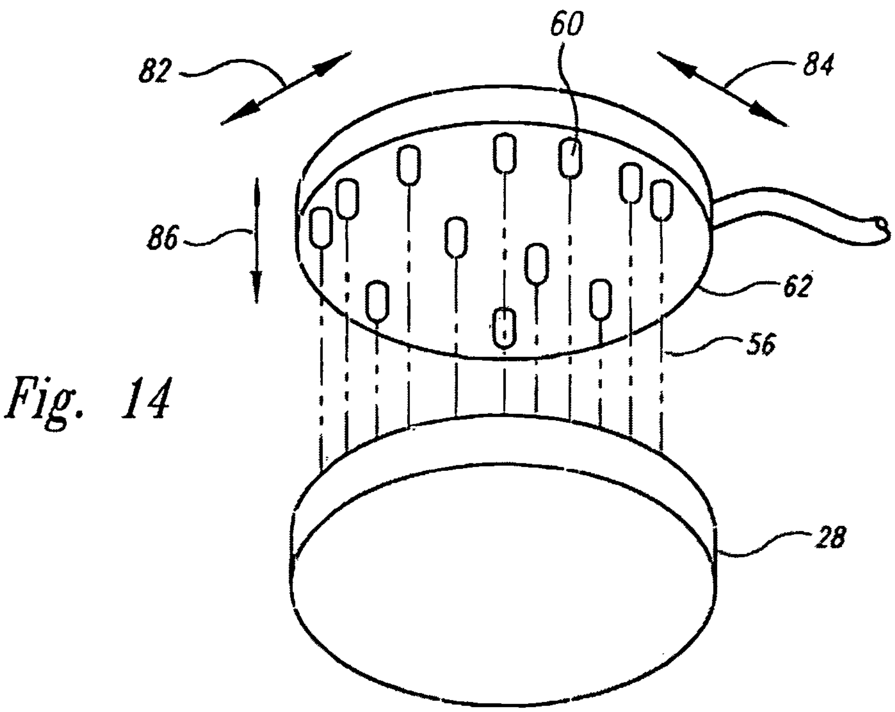
FIG. 14 is a perspective view of a fourth directed energy treatment assembly configured for the ingestible product preparation system.
Figure 15:
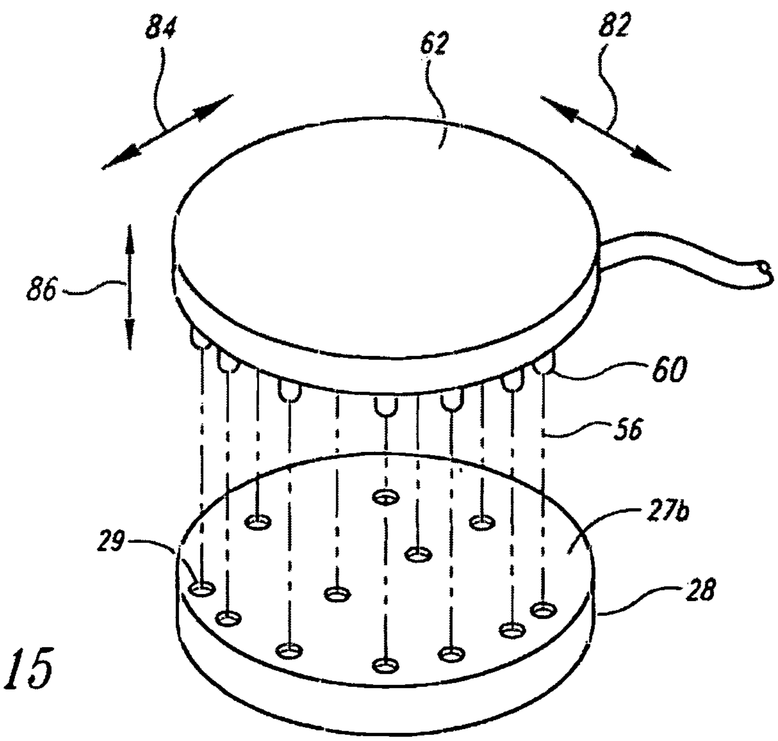
FIG. 15 is a perspective view of the fourth directed energy treatment assembly configured for the ingestible product preparation system.

FIGS. 14 and 15 are perspective views of a fourth exemplary directed energy treatment assembly having a movable energy emitter array 62 directing energy in the form of patterned multiple energy beams 56 onto the surface 27*b* of the substrate 28 to form treated portions 29 as configured for the ingestible product preparation system. The patterned multiple energy beams 56 can be one of laser, microwave, acoustic, radiant, electromagnetic, or other energy type.

Figure 16:
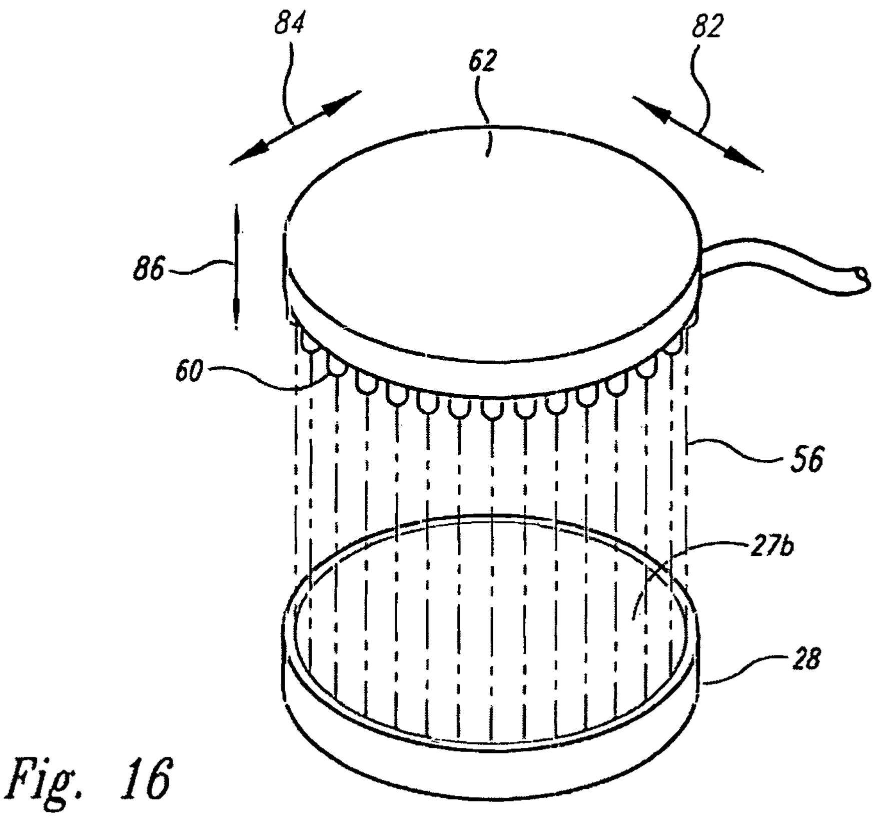
FIG. 16 is a perspective view of a fifth directed energy treatment assembly configured for the ingestible product preparation system.

FIG. 16 is a perspective view of a fifth exemplary directed energy treatment assembly having a movable energy emitter array 62 directing energy in the form of multiple energy beams 56 onto the surface 27*b* of the substrate 28 to form treated portions 29 as configured for the ingestible product preparation system. The patterned multiple energy beams 56 can be one of laser, microwave, acoustic, radiant, electromagnetic, or other energy type.

Figure 17:
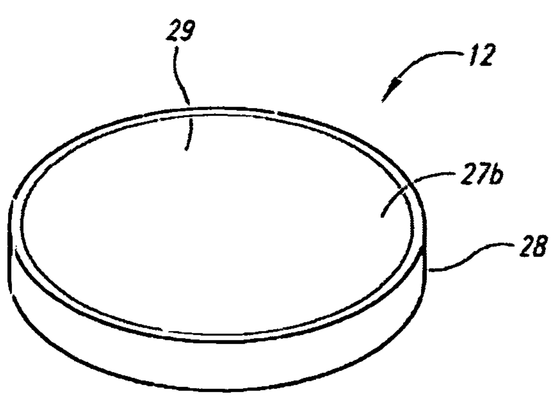
FIG. 17 is a perspective view of the fifth directed energy treatment assembly configured for the ingestible product preparation system.

FIG. 17 shows the substrate 28 having been treated over a continuous region of the substrate.

One or more of the ingestible substrate structures 28 can be comprised from a wide variety of various ingestible materials. Some of these ingestible materials can include, but are not limited, one or more of the following:

Soy-based ingestible materials: such as for example textured vegetable protein (TVP), soy meat, tofu, tempeh or other ingestible materials through culturing and controlled fermentation processes, etc.

Corn-based ingestible materials: such as for example cornbread, unleavened; cornmeal, oil, water, salt: (combine and cook); corn tortilla masa harina (cornmeal treated with calcium hydroxide), water: (combine and cook), etc.

Rice-based ingestible materials: such as for example rice cake—rice (cooked), rice flour, water, sugar, salt: (combine and cook); rice cracker—rice, water, salt: (combine and cook) and/or—spread thin and cook rice again until crispy, etc.

Wheat-based ingestible materials such as for example wheat bread—unleavened, wheat flour, oil, water: (combine and cook); wheat cracker—wheat flour, salt, butter, baking soda, water: (combine and cook), etc.

Potato-based ingestible materials such as for example potato cake—potato (cooked), egg, salt: (combine and cook); potato cracker—potato (cooked), wheat flour, oats, oil: (combine and cook), etc.

Cassava-based ingestible materials such as for example cassava cake—cassava, milk, coconut cream, sugar, egg, egg white: (combine and cook), etc.

Sweet potato-based ingestible materials such as for example sweet potato bread—sweet potato (cooked), egg, oil, wheat flour, sugar, salt, baking soda, baking powder (combine and cook); sweet potato chip—potato, oil: (combine and cook), etc.

Sorghum-based ingestible materials such as for example sorghum cookie—sorghum, oil, sugar, baking soda, wheat flour, egg: (combine and cook); sorghum cake—sorghum, butter, cinnamon, wheat flour, vanilla, egg, baking soda, baking powder, salt, buttermilk: (combine and cook)—sorghum, butter, cinnamon, wheat flour, vanilla, egg, baking soda, baking powder, salt, buttermilk: (combine and cook), etc.

Yam-based ingestible materials such as for example yam cracker—yam (cooked), wheat flour, oats, o11 (combine and cook); yam custard—yam (cooked), banana, milk, sugar, egg yolk, vanilla (combine and cook), etc.

Plantain-based ingestible materials such as for example plantain chip—plantain, oil, salt (combine and cook); plantain candied—plantain, butter, maple syrup, cinnamon (combine and cook), etc.

Legume-based ingestible materials such as for example adzuki, anasazi, black, black-eyed peas (cowpeas), broad, carob, chickpeas (garbanzo), edamame, fava, green, lentils, lima, lupins, mesquite, mung, navy, peanuts, peas, pinto, red kidney, soy, white, etc.

Grain-based ingestible materials such as for example amaranth, barley, buckwheat, durum, einkorn, emmer, fice, flax, fonio, kamut, kaniwa, maize, millet, oats, quinoa, rye, sorghum, spelt, teff, triticale, wild rice, wheat, etc.

Animal-based ingestible materials such as for example egg, meringue (whipped/foamed egg white), baked to hardened texture, yolk or white, etc.

Meat-based ingestible materials such as for example dehydrated (jerky), cured, cheese, hard, dry, creamed, string, melted, etc.

Other matter-based ingestible materials such as for example gelatin, pudding—custard, pureed fruit or vegetables, dehydrated and formed to shape, beverage—smoothie, etc.

Thinner-based ingestible materials such as for example oil, water, vinegar, etc.

Thickener-based ingestible materials such as for example starches, corn, arrowroot, kudzu, potato, rice, tapioca, wheat, etc.

Hydrocolloid-based ingestible materials such as for example agar, kappa carrageenan, lambda carrageenan, iota carrageenan, gelatin, high-acyl gellan, low-acyl gellan, guar gum, gum arabic, gum tragacanth, high methyl ester pectin, low methyl ester pectin, konjac gum, lucust bean gum, methylcellulose, hydroxypropyl methylcellulose, carboxy methylcellulose, microcrystalline cellulose, propylene glycol alginate, sodium alginate, xanthan gum, etc.

Surfactant emulsifier-based ingestible materials such as for example monoglyceride, diglyceride, sorbitan ester, polysorbate, propylene glycol esters, polyglycerol esters, phospholipids, gum arabic, etc.

Sugar-based ingestible materials such as for example monosaccharides, glucose (dextrose), fructose, galactose, disaccharides, sucrose, maltose, lactose, etc., sugar-based ingestible materials (common source) such as for example honey, sugar cane, sugar beet, etc. sweetener-based ingestible materials (natural) such as for example brazzein, curculin, erythritol, glycyrrhizin, glycerol, hydrogenated starch hydrolysates, inulin, isomalt, lactitol, luo han guo, mabinlin, maltitol, malto-oligosaccharide, mannitol, miraculin, monatin, monellin, osladin, pentadin, sorbitol, stevia, tagatose, thaumatin, xylitol, etc. sweetener-based ingestible materials (artificial) such as for example acesulfame potassium, aspartame, salt of aspartame-acesulfame, glucin, neohesperidin dihydrochalcone, neotame, saccharin, sucralose, etc.

Fat-based ingestible materials (plant) such as for example almond, avocado, beechnut, castor, cocoa butter, coconut, corn, cottonseed, grape seed, hazelnut, linseed, mustard, olive, palm, palm kernel, peanut, poppy seed, pumpkin seed, rapeseed, rice bran, safflower, soybean, sesame seed, sunflower seed, tea seed, walnut, etc. Fat-based ingestible materials (animal) such as for example milk, cow, milk, goat, chicken, cod liver, cow, egg yolk, fish, lard, pig, etc. Fat-based ingestible materials (forms) such as for example oil, milk, butter, lard, schmaltz, dripping, etc.

Binder-based ingestible materials (texture, forming, manipulation) such as for example egg albumen, semolina, rice gel, vital wheat gluten, saccharides, disaccharides, sucrose, lactose, polysaccharides, starches, cellulose, microcrystaline cellulose, cellulose esthers, hydroxypropyl, cellulose, sugar alcohols, xylitol, sorbitol, maltitol, protein, gelatin, synthetic, polymers, polyvinylpyrrolidone, polyethylene glycol, etc.

Coating-based ingestible materials such as those that generally, protect from deterioration by: moisture, light, air, other substances such as for example hydroxypropyl methylcellulose film coating, shellac, corn protein zein, gelatin, etc.

Disintegrant-based ingestible materials such as those that generally expand and dissolve when wet, causing material to break apart such as for example sodium starch glycolate, crosslinked polymers, crospovidone, croscarmellose sodium, etc.

Filler-based ingestible materials such as those that generally increase volume of material for particular handling needs such as for example plant cellulose, dibasic calcium phosphate, fats and oils, lactose, sucrose, glucose, mannitol, sorbitol, calcium carbonate, magnesium stearate, etc.

Lubricant-based ingestible materials such as those that generally prevent ingredients from sticking together and from sticking to delivery devices such as for example talc, silica, fats and oils, stearin, magnesium stearate, stearic acid, etc.

Glidant-based ingestible materials such as those that generally are used to promote material flow by reducing interparticle friction and cohesion such as for example fumed silica, talc, magnesium carbonate, magnesium stearate, etc.

Sorbent-based ingestible materials such as those that generally are used for material-proofing by limiting fluid sorbing (fluid moving both directions, in or out of material) in a dry state.

Preservative-based ingestible materials such as for example antioxidants, vitamin A, vitamin E, vitamin C, retinyl palmitate, selenium, amino acids, cysteine, methionine, citric acid, sodium citrate, parabens, methyl paraben, propyl paraben, etc.

The one or more substrate structures 28 can be fabricated or otherwise made prior to final treatment at point of sale or otherwise prior to final treatment by a wide variety of methods such as, but not limited to one or more of the following exemplary processes such as for example heat processed, steamed, baked, boiled, cooked, heated, fried, grilled, radiated (microwave), roasted, pressure cooked, smoked, toasted, tempered, raw (untreated, unprocessed, uncooked), cooled, chilled, frozen, thawed, fluid, hydrated, reconstituted, solid, dehydrated, cured, evaporated, dried, salted, melted, thinned, fermented, preserved, heating, cooking, boiling, oxidation, use of sulfur dioxide, ozonation, use of ozone gas, or ozonated water, toxic inhibition, smoking, use of carbon dioxide, vinegar, alcohol, dehydration, osmotic inhibition, use of syrups, low temperature inactivation, freezing, ultra high water pressure, "cold" pasteurization, pickled, vinegar, pasteurized, ultra-pasteurization, uht (ultra high temperature) treated, sterilization by heating for 1-2 seconds at temperatures exceeding 135 c (275 f), washed, cleansed/cleaned, sterilized, bleached, irradiated, deionized, ionized, thickened, gelled, crystallized, agglomerated, condensed, concentrated, hydrogenated, extended/expanded, stretched, reduced, hydrolyzed, rendered, refined, semi-refined, mixed, blended, emulsified, homogenized, mechanically processed, filtered, centrifuged, chopped, granulated, ground, grated, kneaded, minced, diced, squeezed, pureed, powdered, extruded, conched such as grinding and warming (through mechanical friction), pressed, injected, packed, wrapped, canned, jarred, sealed, etc.

Figure 18:
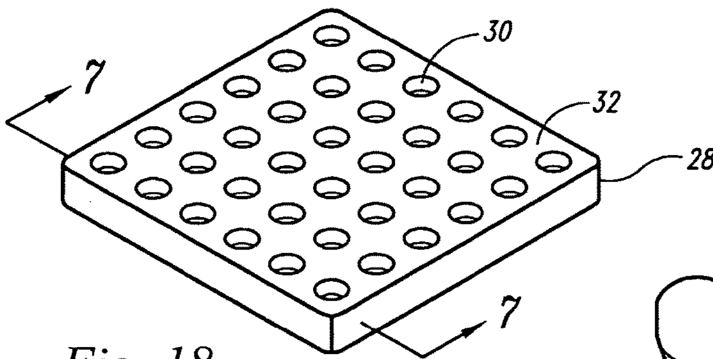
FIG. 18 is a perspective view of an exemplary ingestible substrate implementation to be treated by one or more versions of the ingestible product preparation system.

FIG. 18 is a perspective view of an exemplary implementation of an ingestible substrate structure 128 to be treated by one or more versions of the ingestible product preparation system. The ingestible substrate structure 128 is shown having an internal structural texture 130 as revealed depicted recesses and a surface texture 132.

Figure 19:
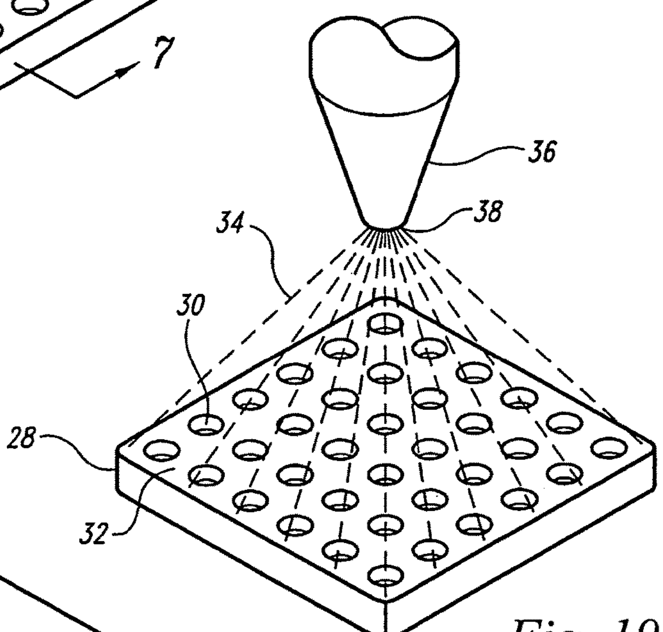
FIG. 19 is a perspective view of an exemplary ingestible substrate implementation being treated by one or more versions of the ingestible product preparation system.

FIG. 19 is a perspective view of the ingestible substrate structure 128 being treated through a deposition process by an applicator 136 having an orifice 138 producing an output 134 such as a spray, sputtering, powdering, etc. that is directed toward the ingestible substrate structure.

Figure 20:
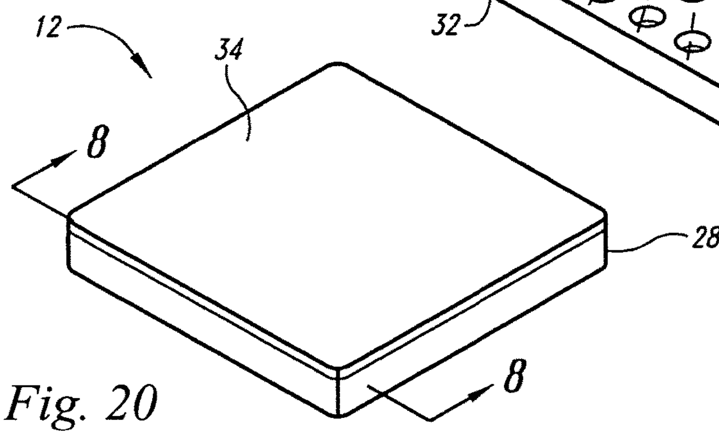
FIG. 20 is a perspective view of an exemplary ingestible substrate implementation having been treated by one or more versions of the ingestible product preparation system.

FIG. 20 is a perspective view of the ingestible substrate structure 128 having been so treated thereby having a coating of the output 134.

Figure 21:
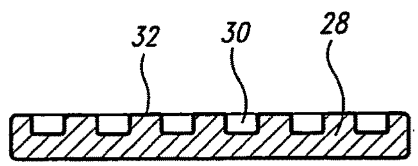
FIG. 21 is a cross-sectional view of the ingestible substrate implementation of FIG. 18.

FIG. 21 is a cross-sectional view of the ingestible substrate structure 128 before treatment.

Figure 22:
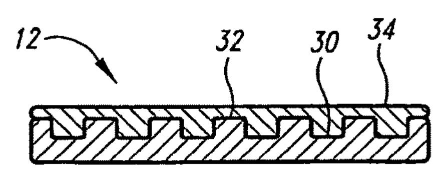
FIG. 22 is a cross-sectional view of the ingestible substrate implementation of FIG. 20.

FIG. 22 is a cross-sectional view of the ingestible substrate structure 128 after treatment.

Figure 23:
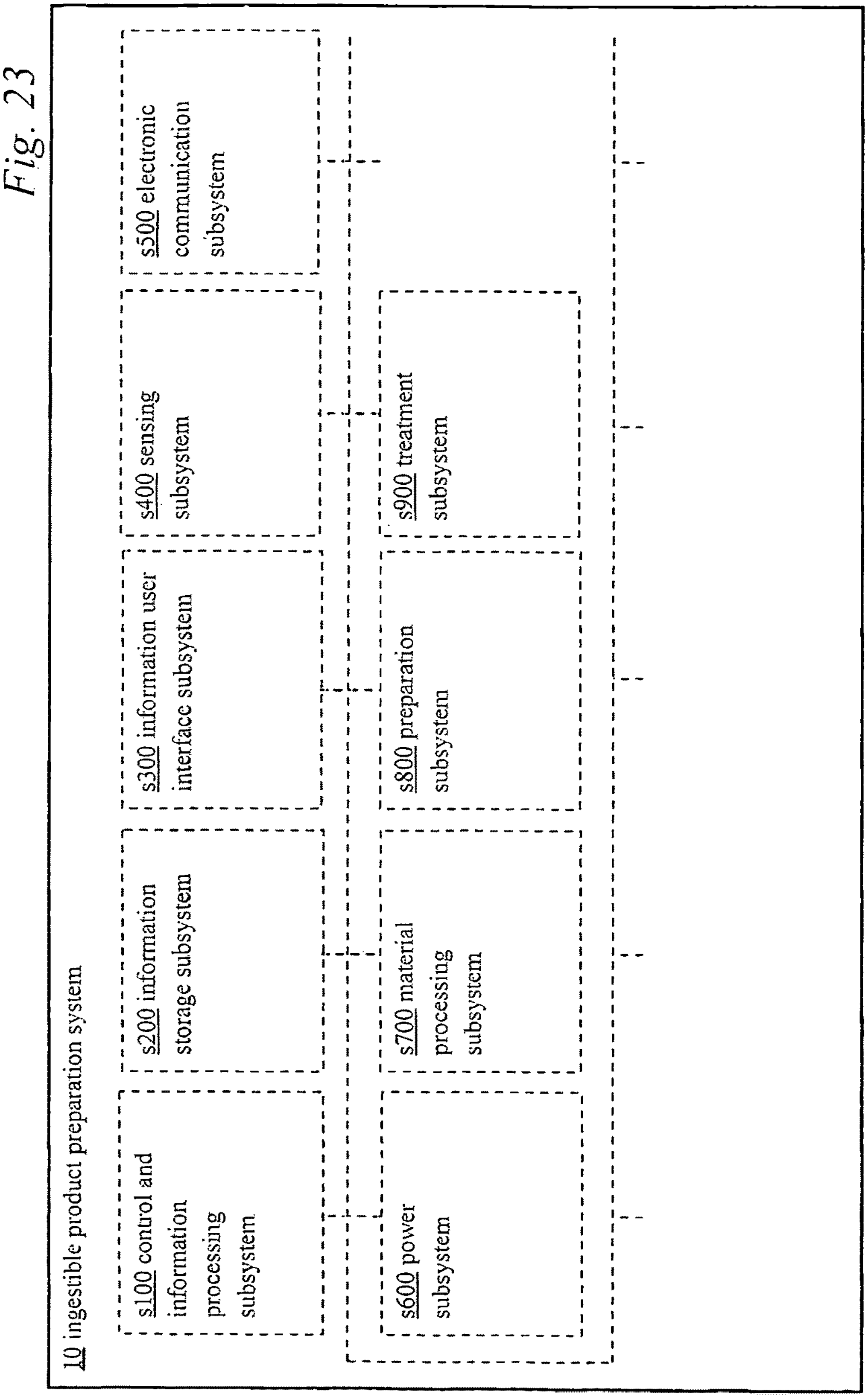
FIG. 23 is a block diagram depicting an exemplary implementation of the ingestible product preparation system 10 of FIG. 1 including exemplary subsystems.

An exemplary version of the ingestible product preparation system 10 is shown in FIG. 23 to optionally include various subsystems such as control and information processing subsystem s100, information storage subsystem s200, information user interface subsystem s300, sensing subsystem s400, electronic communication subsystem s500, power subsystem s600, material processing subsystem s700, preparation subsystem s800, treatment subsystem s900

Figure 24:
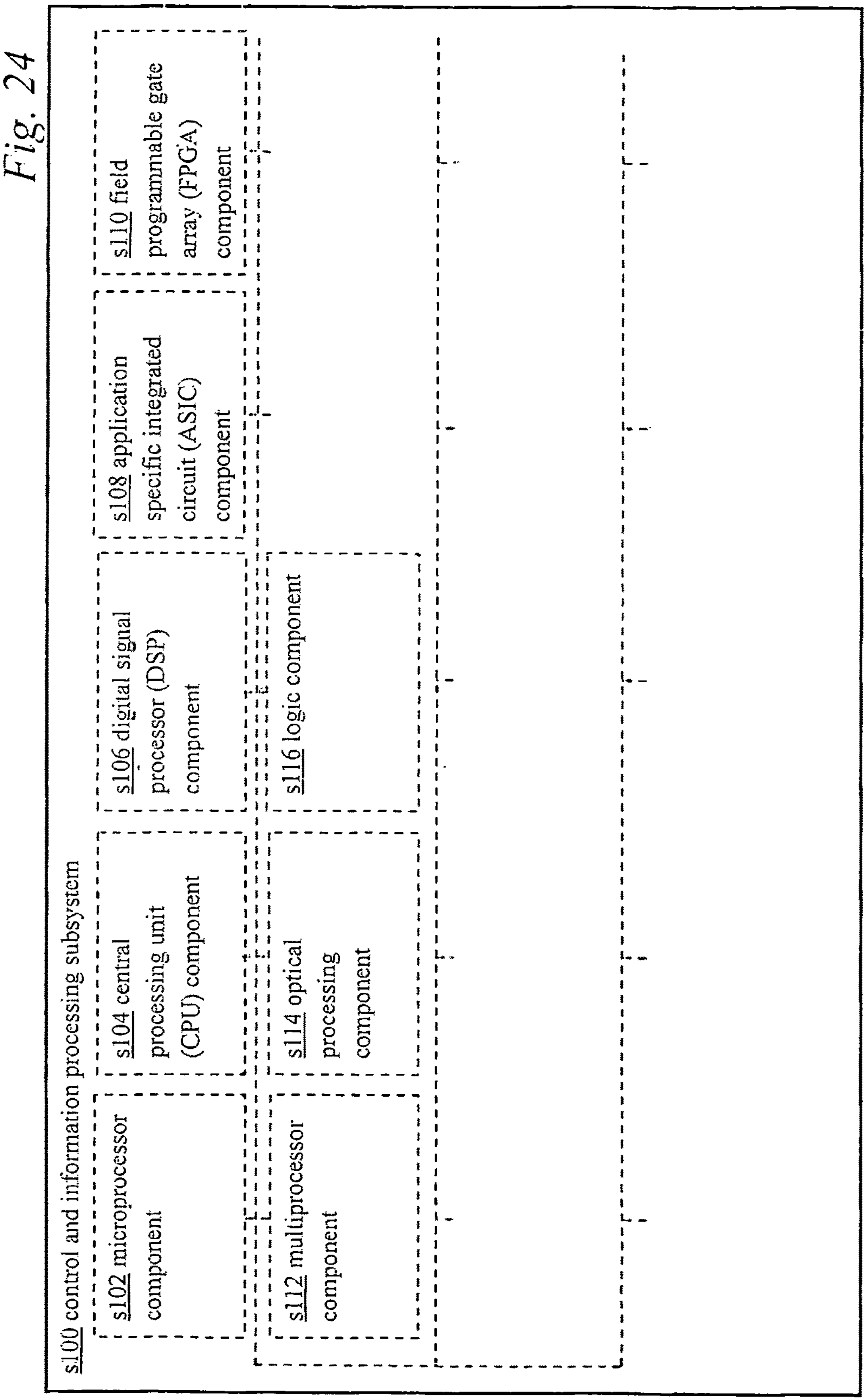
FIG. 24 is a block diagram depicting a control and information processing subsystem s100 of an exemplary implementation of the ingestible product preparation system 10 of FIG. 1.

An exemplary implementation of the control and information processing subsystem s100 is shown in FIG. 24 to optionally include various components such as microprocessor component s102, central processing unit (CPU) component s104, digital signal processor (DSP) component s106, application specific integrated circuit (ASIC) component s108, field programmable gate array (FPGA) component s110, multiprocessor component s112, optical processing component s114, and logic component s116.

Figure 25:
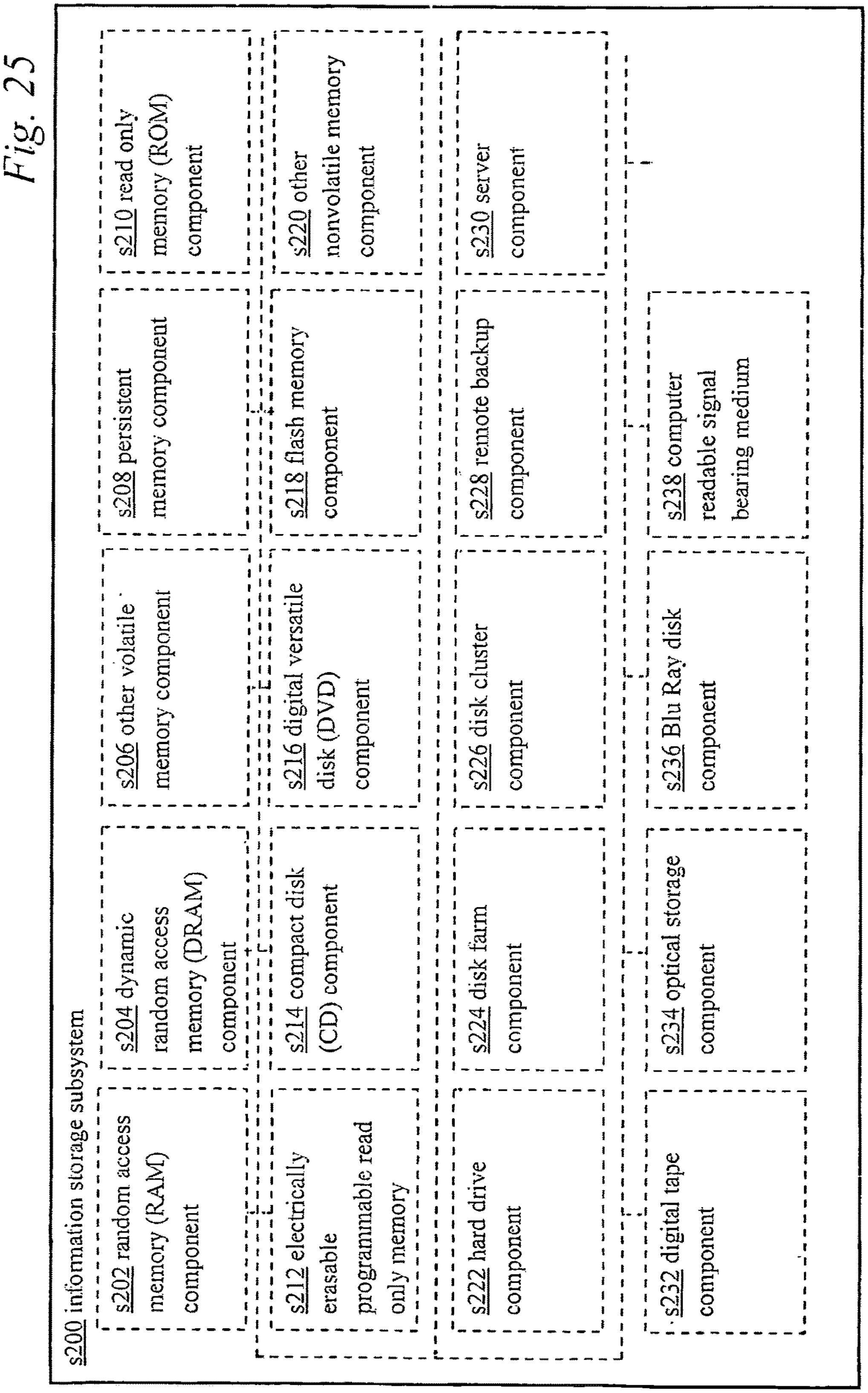
FIG. 25 is a block diagram depicting an information storage subsystem s200 of an exemplary implementation of the ingestible product preparation system 10 of FIG. 1.

An exemplary implementation of the information storage subsystem s200 is shown in FIG. 25 to optionally include various components such as random access memory (RAM) component s202, dynamic random access memory (DRAM) component s204, other volatile memory component s206, persistent memory component s208, read only memory (ROM) component s210, electrically erasable programmable read only memory (EEPROM) component s212, compact disk (CD) component s214, digital versatile disk (DVD) component s216, flash memory component s218, other nonvolatile memory component s220, hard drive component s222, disk farm component s224, disk cluster component s226, remote backup component s228, server component s230, digital tape component s232, optical storage component s234, Blu Ray disk component s236, and computer readable signal bearing medium s238.

Figure 26:
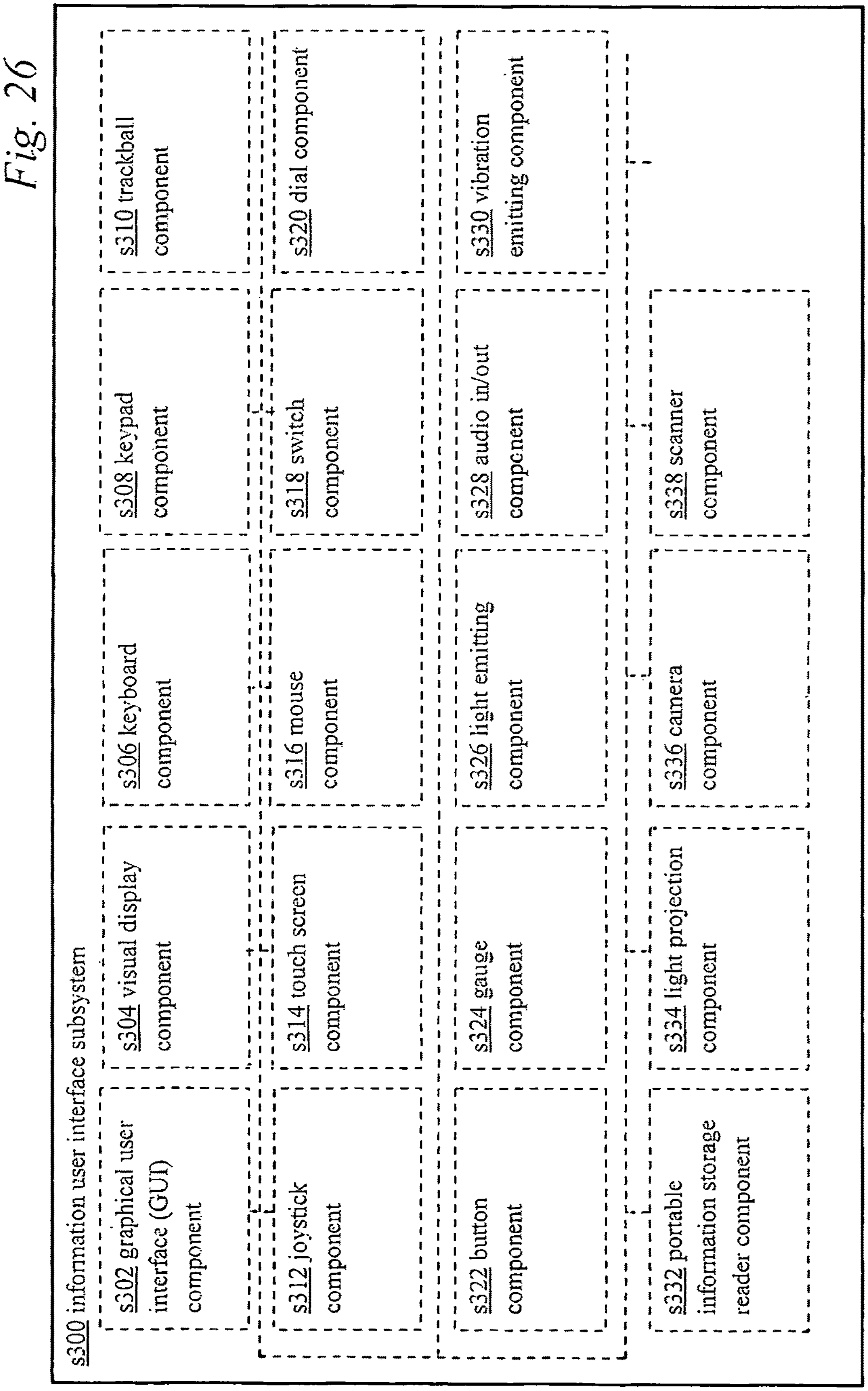
FIG. 26 is a block diagram depicting an information user interface subsystem s300 of an exemplary implementation of the ingestible product preparation system 10 of FIG. 1.

An exemplary implementation of the information user interface subsystem s300 is shown in FIG. 26 to optionally include various components such as graphical user interface (GUI) component s302, visual display component s304, keyboard component s306, keypad component s308, trackball component s310, joystick component s312, touch screen component s314, mouse component s316, switch component s318, dial component s320, button component s322, gauge component s324, light emitting component s326, audio in/out component s328, vibration emitting component s330, portable information storage reader component s332, light projection component s334, camera component s336, and scanner component s338.

Figure 27:
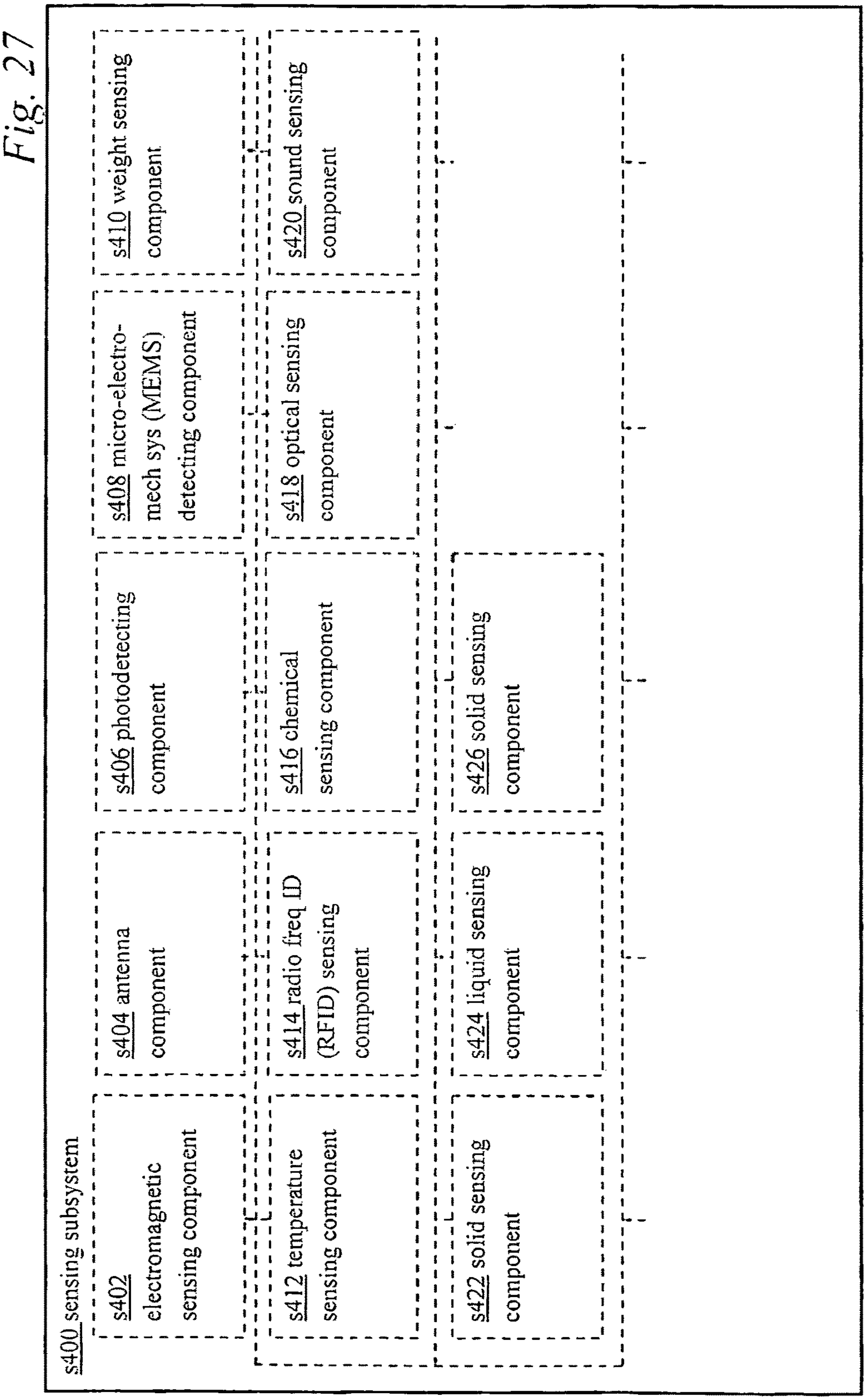
FIG. 27 is a block diagram depicting a sensing subsystem s400 of an exemplary implementation of the ingestible product preparation system 10 of FIG. 1.

An exemplary implementation of the sensing subsystem s400 is shown in FIG. 27 to optionally include various components such as electromagnetic sensing component s402, antenna component s404, photodetecting component s406, micro-electro-mech sys (MEMS) detecting component s408, weight sensing component s410, temperature sensing component s412, radio freq ID (RFID) sensing component s414, chemical sensing component s416, optical sensing component s418, sound sensing component s420, solid sensing component s422, liquid sensing component s424, and solid sensing component s426.

Figure 28:
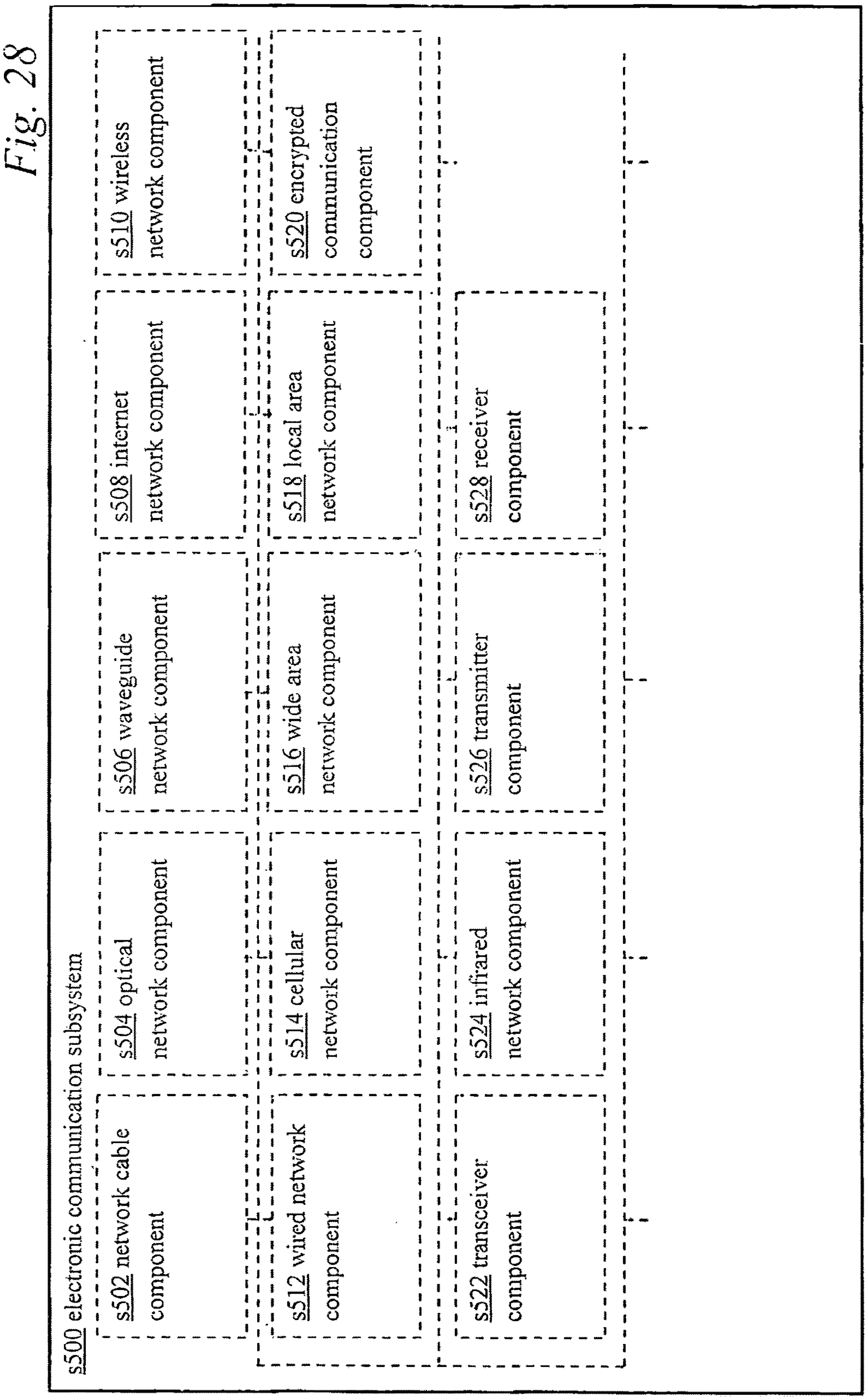
FIG. 28 is a block diagram depicting an electronic communication subsystem s500 of an exemplary implementation of the ingestible product preparation system 10 of FIG. 1.

An exemplary implementation of the electronic communication subsystem s500 is shown in FIG. 28 to optionally include various components such as network cable component s502, optical network component s504, waveguide network component s506, internet network component s508, wireless network component s510, wired network component s512, cellular network component s514, wide area network component s516, local area network component s518, encrypted communication component s520, transceiver component s522, infrared network component s524, transmitter component s526, and receiver component s528.

Figure 29:
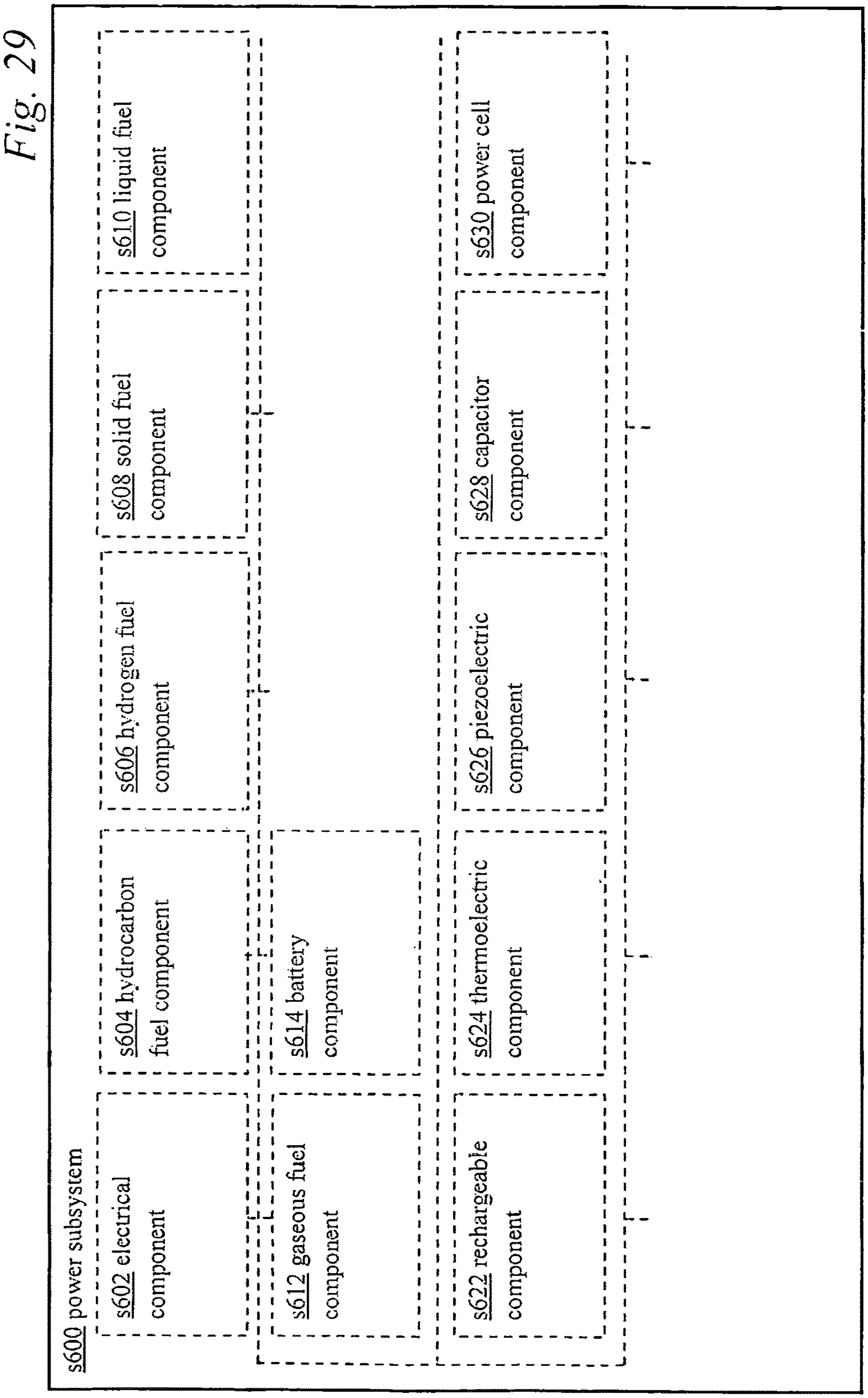
FIG. 29 is a block diagram depicting a power subsystem s600 of an exemplary implementation of the ingestible product preparation system 10 of FIG. 1.

An exemplary implementation of the power subsystem s600 is shown in FIG. 29 to optionally include various components such as electrical component s602, hydrocarbon fuel component s604, hydrogen fuel component s606, solid fuel component s608, liquid fuel component s610, gaseous fuel component s612, battery component s614, battery component s622, battery component s624, battery component s626, battery component s628, and power cell component s630.

Figure 30:
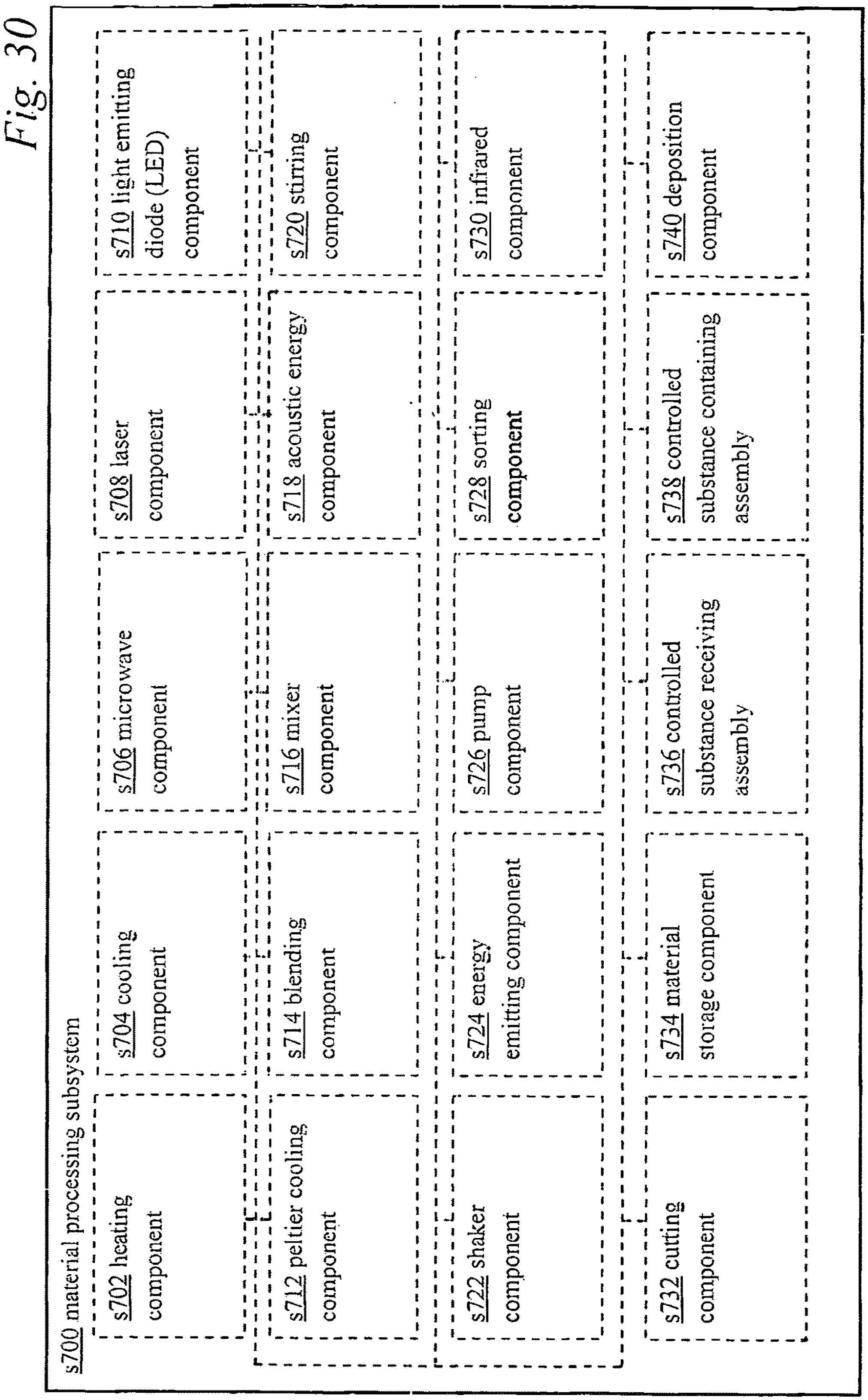
FIG. 30 is a block diagram depicting a material processing subsystem s700 of an exemplary implementation of the ingestible product preparation system 10 of FIG. 1.

An exemplary implementation of the material processing subsystem s700 is shown in FIG. 30 to optionally include various components such as heating component s702, cooling component s704, microwave component s706, laser component s708, light emitting diode (LED) component s710, peltier cooling component s712, blending component s714, mixer component s716, acoustic energy component s718, stirring component s720, shaker component s722, energy emitting component s724, pump component s726, sorting component s728, infrared component s730, cutting component s732, material storage component s734, controlled substance receiving assembly s736, controlled substance containing assembly s738, deposition component s740.

Figure 31:
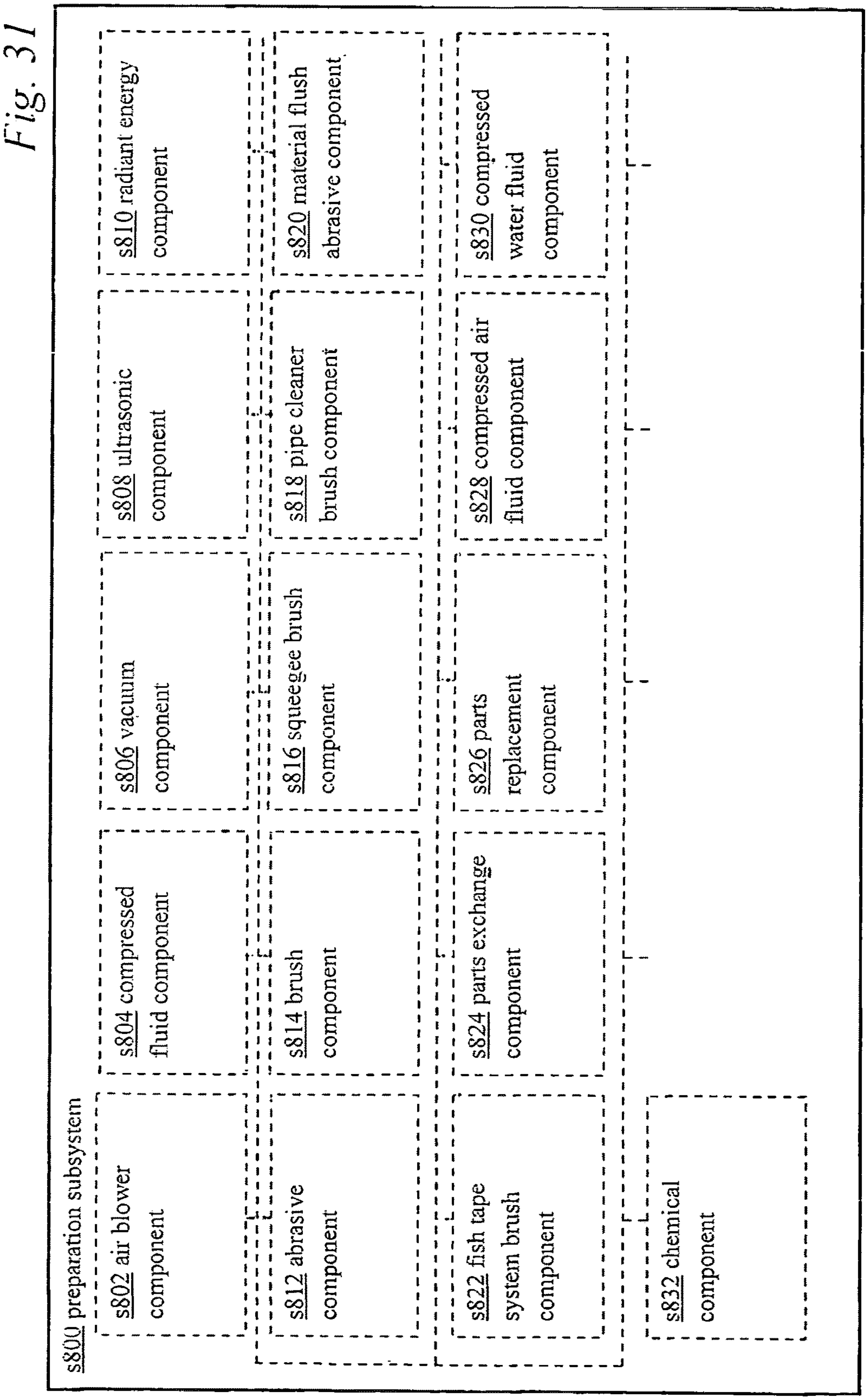
FIG. 31 is a block diagram depicting a preparation subsystem s800 of an exemplary implementation of the ingestible product preparation system 10 of FIG. 1.

An exemplary implementation of the preparation subsystem s800 is shown in FIG. 31 to optionally include various components such as air blower component s802, compressed fluid component s804, vacuum component s806, ultrasonic component s808, radiant energy component s810, abrasive component s812, brush component s814, squeegee brush component s816, pipe cleaner brush component s818, material flush abrasive component s820, fish tape system brush component s822, parts exchange component s824, parts replacement component s826, compressed air fluid component s828, compressed water fluid component s830, and chemical component s832.

Figure 32:
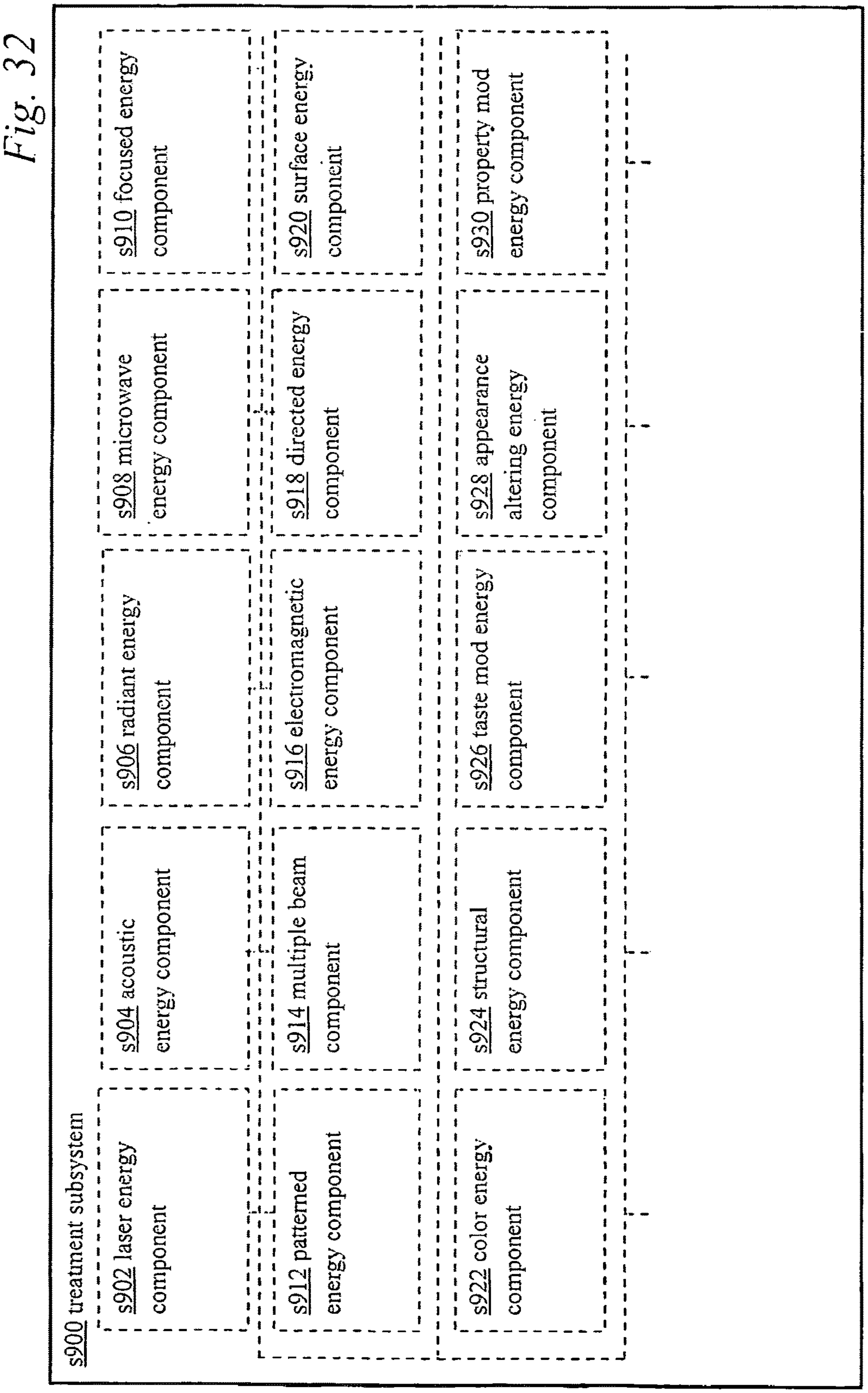
FIG. 32 is a block diagram depicting a treatment subsystem s900 of an exemplary implementation of the ingestible product preparation system 10 of FIG. 1.

An exemplary implementation of the treatment subsystem s900 is shown in FIG. 32 to optionally include various components such as laser energy component s902, acoustic energy component s904, radiant energy component s906, microwave energy component s908, focused energy component s910, and patterned energy component s912.

Figure 33:
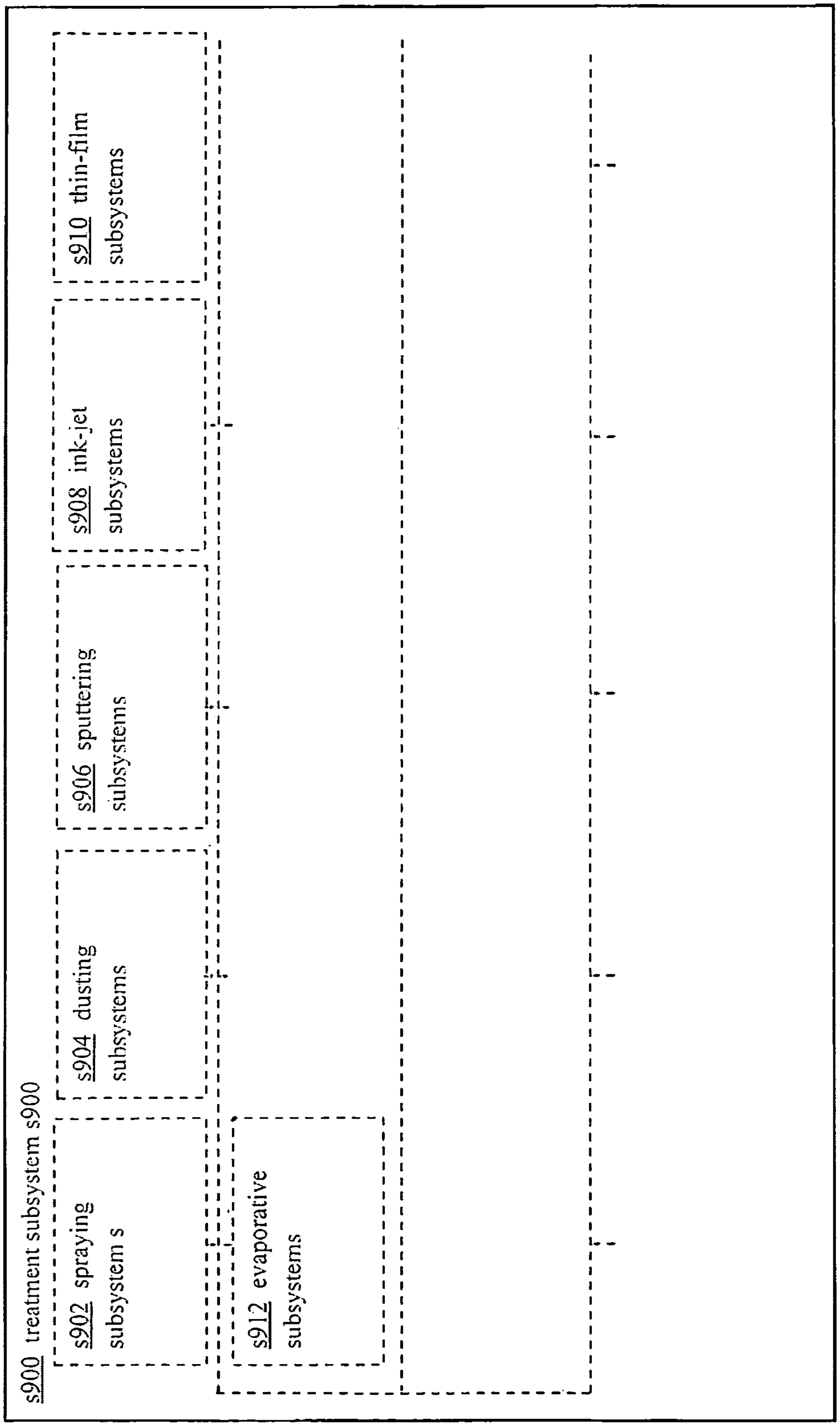
FIG. 33 is a block diagram depicting a treatment subsystem s900 of an exemplary implementation of the ingestible product preparation system 10 of FIG. 1.

An exemplary implementation of the treatment subsystem s900 is shown in FIG. 33 to optionally include various components such as spraying subsystem s932, dusting subsystem s934, sputtering subsystem s936, ink jet subsystem s938, thin-film subsystem s940, and evaporative subsystem s942.

Figure 34:
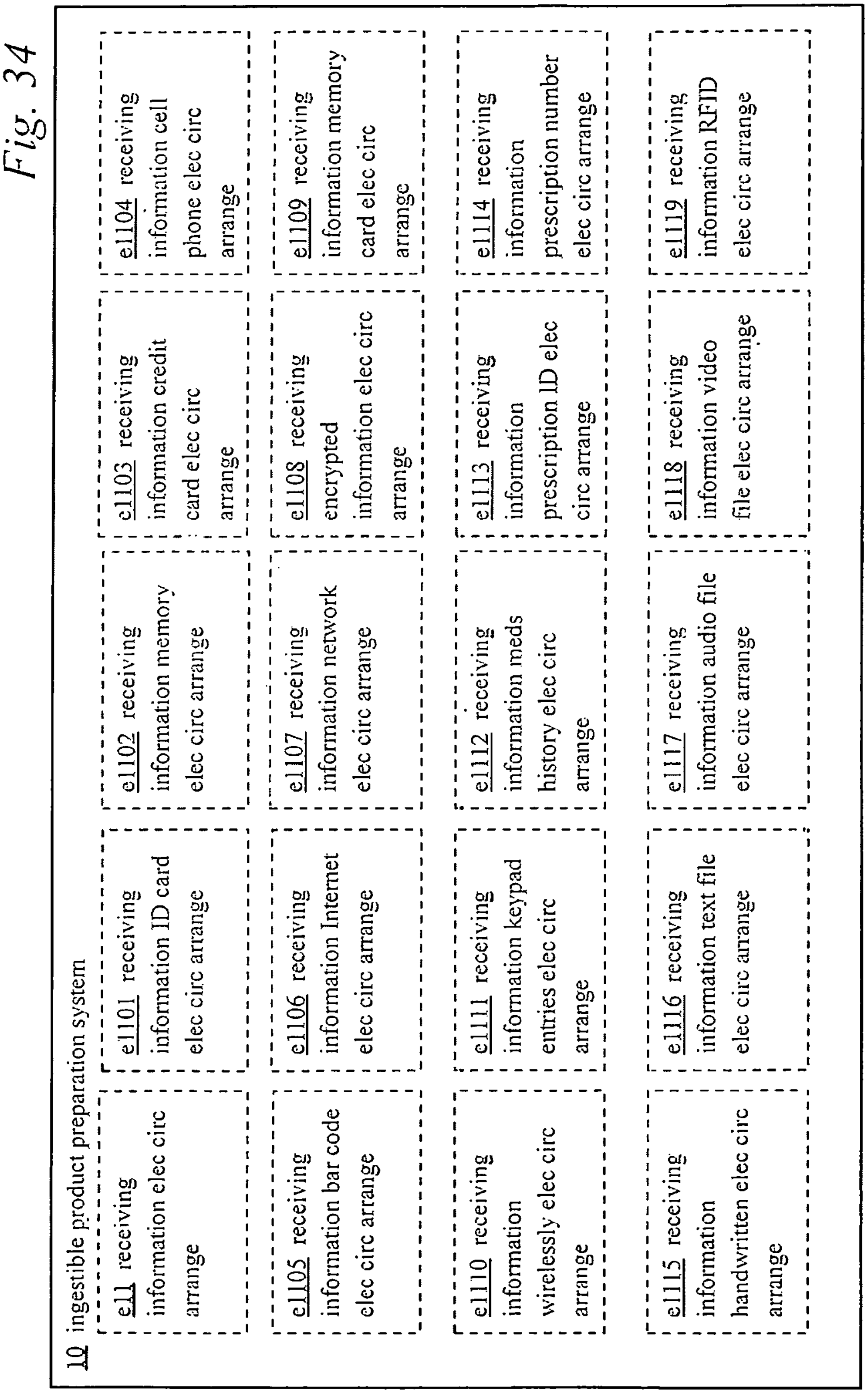
FIG. 34 is a block diagram depicting one or more exemplary electrical circuitry arrangements of the ingestible product preparation system 10 of FIG. 1.

Implementations involve different combinations (otherwise known as "electrical circuitry arrangements") of components from the subsystems of the ingestible product preparation system 10. Exemplary depictions of some of these electrical circuitry arrangements are shown in FIG. 34 to include receiving information electrical circuitry arrangement f11, receiving information ID card electrical circuitry arrangement f1101, receiving information memory electrical circuitry arrangement f1102, receiving information credit card electrical circuitry arrangement f1103, receiving information cell phone electrical circuitry arrangement f1104, receiving information bar code electrical circuitry arrangement f1105, receiving information Internet electrical circuitry arrangement f1106, receiving information network electrical circuitry arrangement f1107, receiving encrypted information electrical circuitry arrangement f1108, receiving information memory card electrical circuitry arrangement f1109, receiving information wirelessly electrical circuitry arrangement f1110, receiving information keypad entries electrical circuitry arrangement f1111, receiving information meds history electrical circuitry arrangement f1112, receiving information prescription ID electrical circuitry arrangement f1113, receiving information prescription number electrical circuitry arrangement f1114, receiving information handwritten electrical circuitry arrangement f1115, receiving information text file electrical circuitry arrangement f1116, receiving information audio file electrical circuitry arrangement f1117, receiving information video file electrical circuitry arrangement f1118, and receiving information RFID electrical circuitry arrangement f1119.

Figure 35:
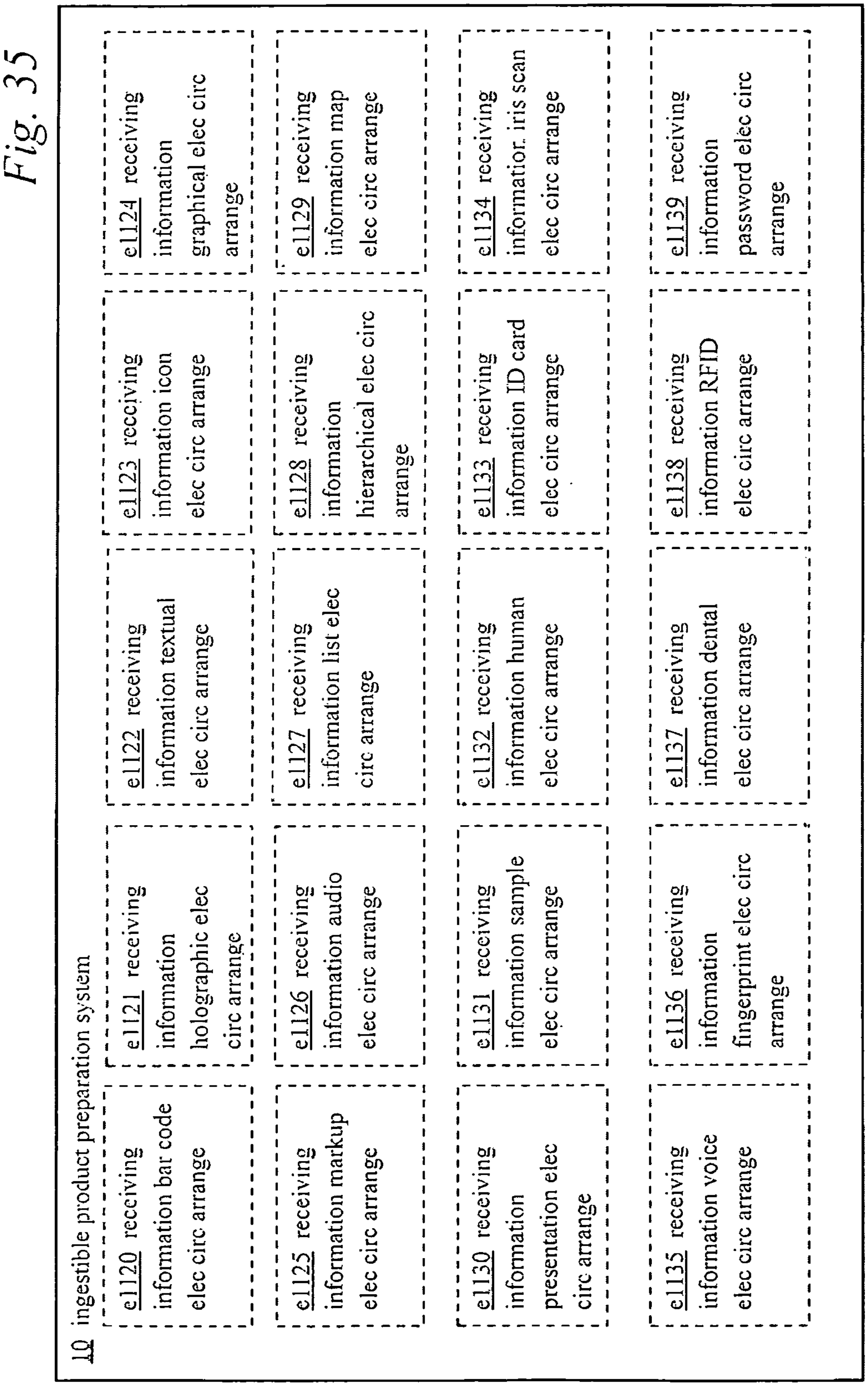
FIG. 35 is a block diagram depicting one or more exemplary electrical circuitry arrangements of the ingestible product preparation system 10 of FIG. 1.

Some of these electrical circuitry arrangements are depicted in FIG. 35 to include receiving information bar code electrical circuitry arrangement f1120, receiving information holographic electrical circuitry arrangement f1121, receiving information textual electrical circuitry arrangement f1122, receiving information icon electrical circuitry arrangement f1123, receiving information graphical electrical circuitry arrangement f1124, receiving information markup electrical circuitry arrangement f1125, receiving information audio electrical circuitry arrangement f1126, receiving information list electrical circuitry arrangement f1127, receiving information hierarchical electrical circuitry arrangement f1128, receiving information map electrical circuitry arrangement f1129, receiving information presentation electrical circuitry arrangement f1130, receiving information sample electrical circuitry arrangement f113, receiving information human electrical circuitry arrangement f1132, receiving information ID card electrical circuitry arrangement f1133, receiving information iris scan electrical circuitry arrangement f1134, receiving information voice electrical circuitry arrangement f1135, receiving information fingerprint electrical circuitry arrangement f1136, receiving information dental electrical circuitry arrangement f1137, receiving information RFID electrical circuitry arrangement f1138, and receiving information password electrical circuitry arrangement f1139.

Figure 36:
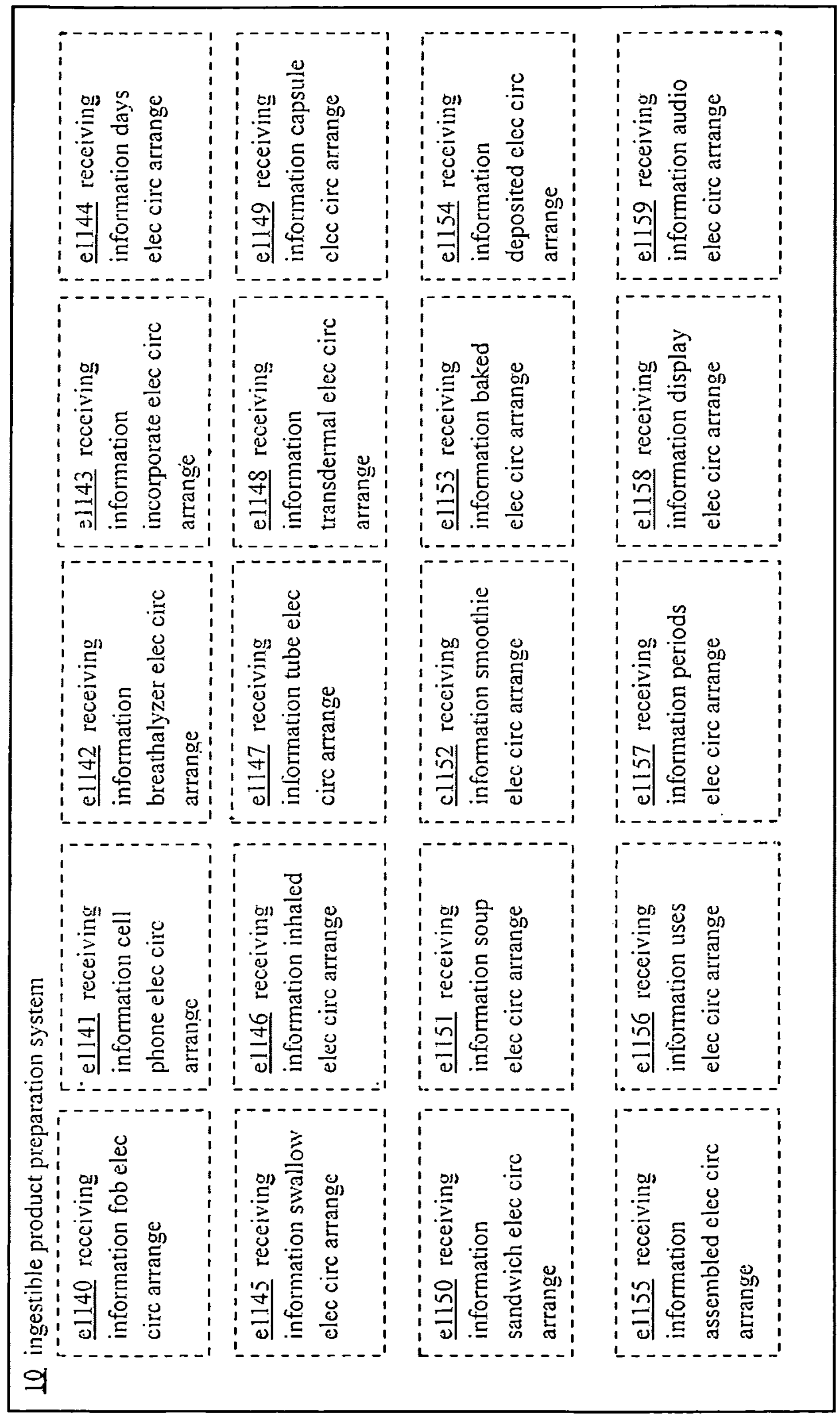
FIG. 36 is a block diagram depicting one or more exemplary electrical circuitry arrangements of the ingestible product preparation system 10 of FIG. 1.

Some of these electrical circuitry arrangements are depicted in FIG. 36 to include receiving information fob electrical circuitry arrangement f1140, receiving information cell phone electrical circuitry arrangement f1141, receiving information breathalyzer electrical circuitry arrangement f1142, receiving information incorporate electrical circuitry arrangement f1143, receiving information days electrical circuitry arrangement f1144, receiving information swallow electrical circuitry arrangement f1145, receiving information inhaled electrical circuitry arrangement f1146, receiving information tube electrical circuitry arrangement f1147, receiving information transdermal electrical circuitry arrangement f1148, receiving information capsule electrical circuitry arrangement f1149, receiving information sandwich electrical circuitry arrangement f1150, receiving information soup electrical circuitry arrangement f1151, receiving information smoothie electrical circuitry arrangement f1152, receiving information baked electrical circuitry arrangement f1153, receiving information deposited electrical circuitry arrangement f1154, receiving information assembled electrical circuitry arrangement f1155, receiving information uses electrical circuitry arrangement f1156, receiving information periods electrical circuitry arrangement f1157, receiving information display electrical circuitry arrangement f1158, and receiving information audio electrical circuitry arrangement f1159.

Figure 37:
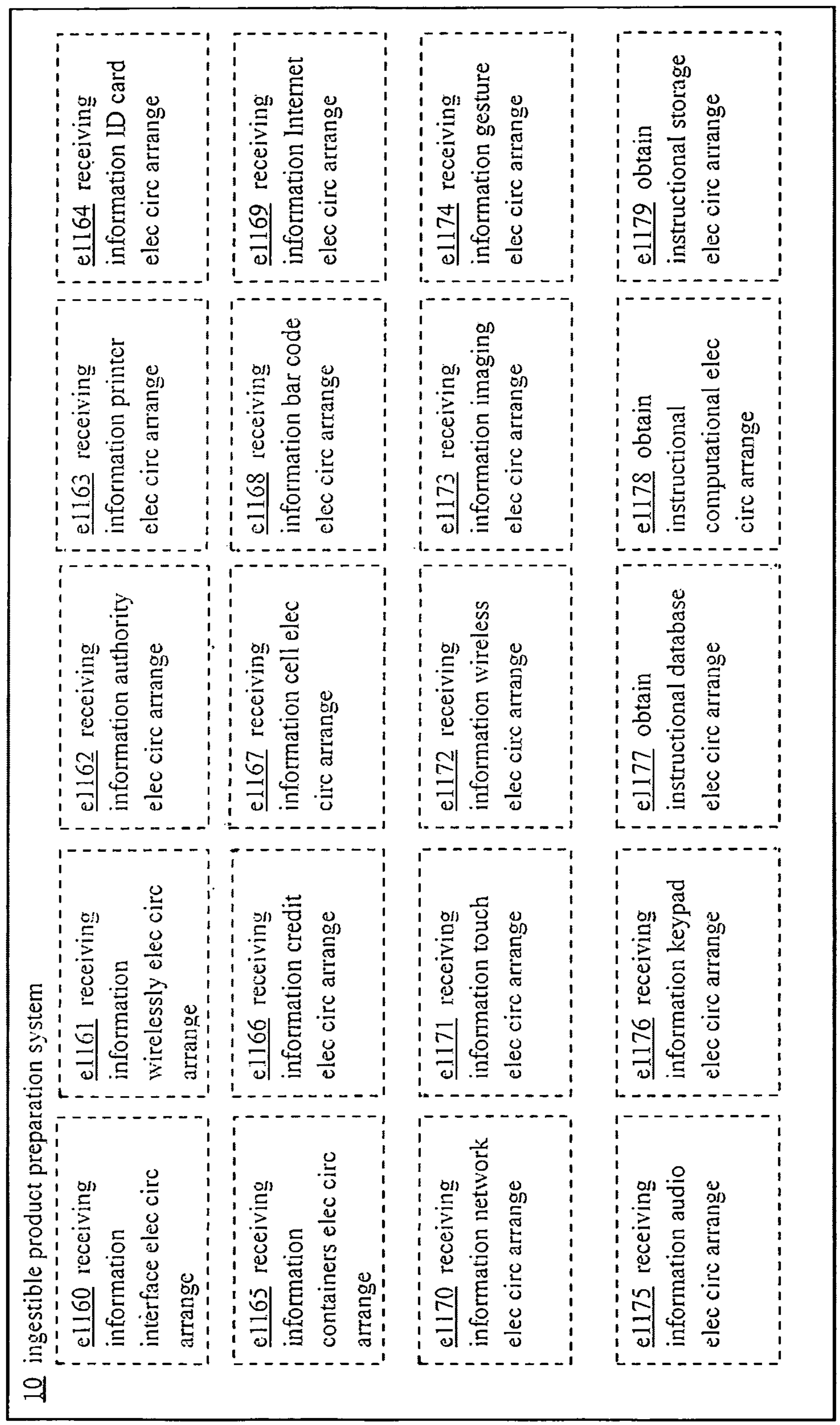
FIG. 37 is a block diagram depicting one or more exemplary electrical circuitry arrangements of the ingestible product preparation system 10 of FIG. 1.

Some of these electrical circuitry arrangements are depicted in FIG. 37 to include receiving information interface electrical circuitry arrangement f1160, receiving information wirelessly electrical circuitry arrangement f1161, receiving information authority electrical circuitry arrangement f1162, receiving information printer electrical circuitry arrangement f1163, receiving information ID card electrical circuitry arrangement f1164, receiving information containers electrical circuitry arrangement f1165, and receiving information credit electrical circuitry arrangement f1166, receiving information cell electrical circuitry arrangement f1167, receiving information bar code electrical circuitry arrangement f1168, receiving information Internet electrical circuitry arrangement f1169, receiving information network electrical circuitry arrangement f1170, receiving information touch electrical circuitry arrangement f1171, receiving information wireless electrical circuitry arrangement f1172, receiving information imaging electrical circuitry arrangement f1173, receiving information gesture electrical circuitry arrangement f1174, receiving information audio electrical circuitry arrangement f1175, receiving information keypad electrical circuitry arrangement f1176, obtain instructional database electrical circuitry arrangement f1177, obtain instructional computational electrical circuitry arrangement f1178, and obtain instructional storage electrical circuitry arrangement f1179.

Figure 38:
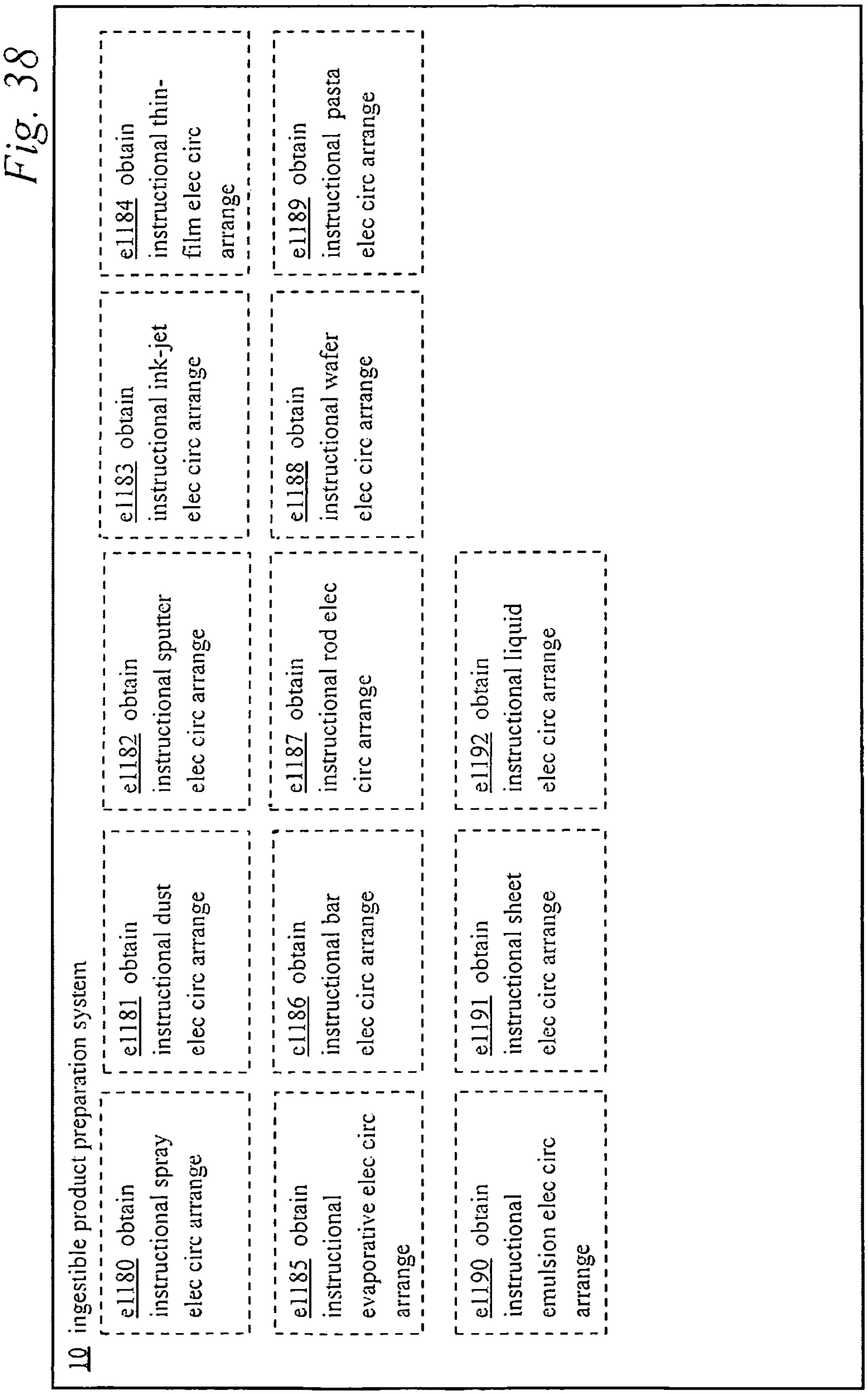
FIG. 38 is a block diagram depicting one or more exemplary electrical circuitry arrangements of the ingestible product preparation system 10 of FIG. 1.

Some of these electrical circuitry arrangements are depicted in FIG. 38 to include obtain instructional spray electrical circuitry arrangement f1180, obtain instructional dust electrical circuitry arrangement f1181, obtain instructional sputter electrical circuitry arrangement f1182, obtain instructional ink-jet electrical circuitry arrangement f1183, obtain instructional thin-film electrical circuitry arrangement f1184, obtain instructional evaporative electrical circuitry arrangement f1185, obtain instructional bar electrical circuitry arrangement f1186, obtain instructional rod electrical circuitry arrangement f1187, obtain instructional wafer electrical circuitry arrangement f1188, obtain instructional pasta electrical circuitry arrangement f1189, obtain instructional emulsion electrical circuitry arrangement f1190, obtain instructional sheet electrical circuitry arrangement f1191, and obtain instructional liquid electrical circuitry arrangement f1192.

Figure 39:
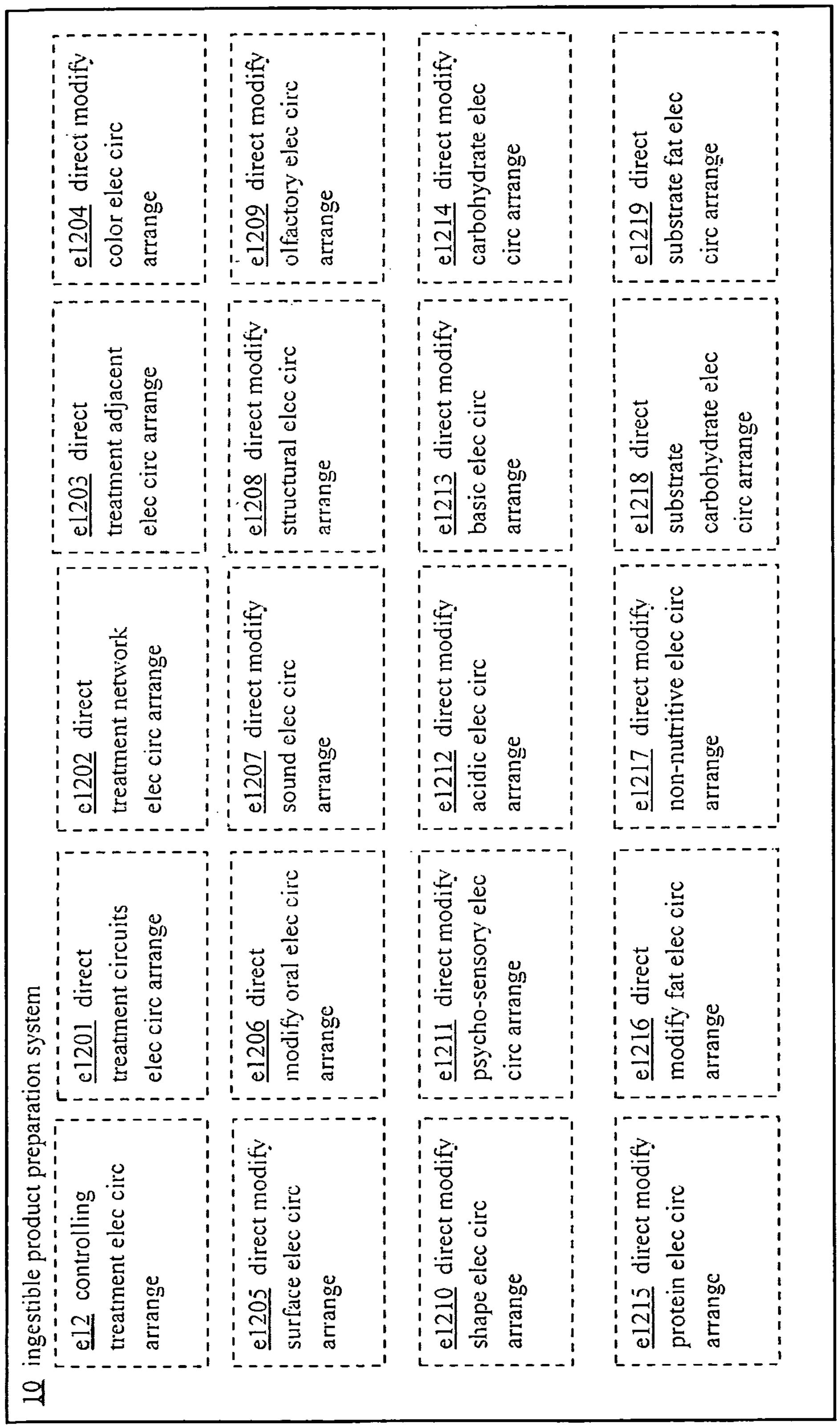
FIG. 39 is a block diagram depicting one or more exemplary electrical circuitry arrangements of the ingestible product preparation system 10 of FIG. 1.

Some of these electrical circuitry arrangements are depicted in FIG. 39 to include controlling treatment electrical circuitry arrangement f12, direct treatment circuits electrical circuitry arrangement f1201, direct treatment network electrical circuitry arrangement f1202, direct treatment adjacent electrical circuitry arrangement f1203, direct modify color electrical circuitry arrangement f1204, direct modify surface electrical circuitry arrangement f1205, direct modify oral electrical circuitry arrangement f1206, direct modify sound electrical circuitry arrangement f1207, direct modify structural electrical circuitry arrangement f1208, direct modify olfactory electrical circuitry arrangement f1209, direct modify shape electrical circuitry arrangement f1210, direct modify psycho-sensory electrical circuitry arrangement f1211, and direct modify acidic electrical circuitry arrangement f1212, direct modify basic electrical circuitry arrangement f1213, direct modify carbohydrate electrical circuitry arrangement f1214, direct modify protein electrical circuitry arrangement f1215, direct modify fat electrical circuitry arrangement f1216, direct modify non-nutritive electrical circuitry arrangement f1217, direct substrate carbohydrate electrical circuitry arrangement f1218, and direct substrate fat electrical circuitry arrangement f1219.

Figure 40:
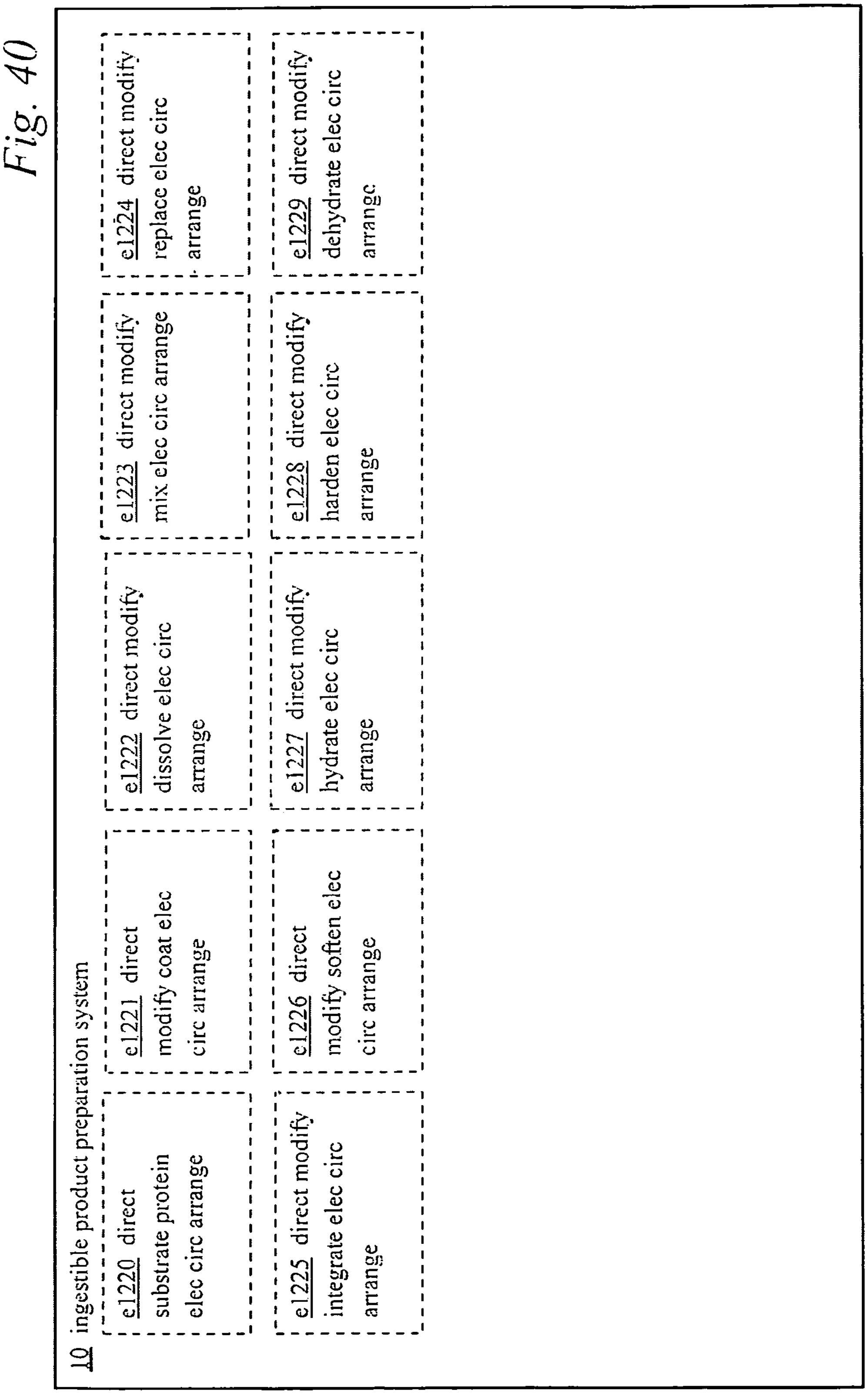
FIG. 40 is a block diagram depicting one or more exemplary electrical circuitry arrangements of the ingestible product preparation system 10 of FIG. 1.

Some of these electrical circuitry arrangements are depicted in FIG. 40 to include direct substrate protein electrical circuitry arrangement f12, direct modify coat electrical circuitry arrangement f1221, direct modify dissolve electrical circuitry arrangement f1222, direct modify mix electrical circuitry arrangement f1223, direct modify replace electrical circuitry arrangement f1224, direct modify integrate electrical circuitry arrangement f1225, direct modify soften electrical circuitry arrangement f1226, direct modify hydrate electrical circuitry arrangement f1227, direct modify harden electrical circuitry arrangement f1228, and direct modify dehydrate electrical circuitry arrangement f1229.

In implementations one or more instructions are stored and/or otherwise borne in various subsystems, components, and/or accessories of the ingestible product preparation system 10 such as being borne in a non-transitory signal bearing medium of information storage subsystem s200. One or more exemplary instructions depicted in FIG. 41 as being borne in an exemplary version of a non-transitory signal bearing medium of information storage subsystem s200 include one or more receiving information instructions j11, one or more receiving information ID card instructions j1101, one or more receiving information memory instructions j1102, one or more receiving information credit card instructions j1103, one or more receiving information cell phone instructions j1104, one or more receiving information bar code instructions j1105, one or more receiving information Internet instructions j1106, one or more receiving information network instructions j1107, one or more receiving encrypted information instructions j1108, one or more receiving information memory card instructions j1109, one or more receiving information wirelessly instructions j1110, one or more receiving information keypad entries instructions j1111, one or more receiving information meds history instructions j1112, one or more receiving information prescription ID instructions j1113, one or more receiving information prescription number instructions j1114, one or more receiving information handwritten instructions j1115, one or more receiving information text file instructions j1116, one or more receiving information audio file instructions j1117, one or more receiving information video file instructions j1118, and one or more receiving information RFID instructions j1119.

Figure 42:
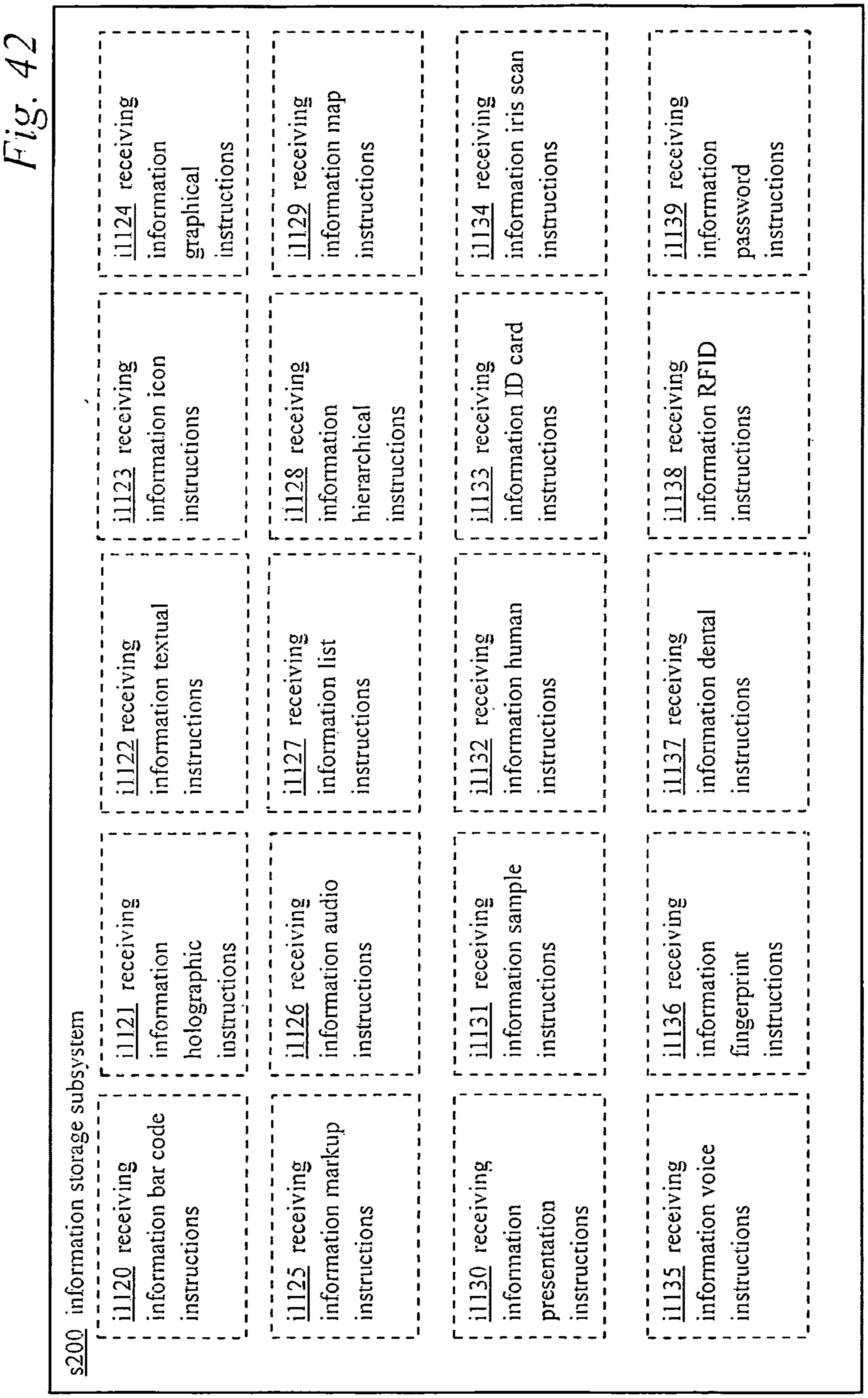
FIG. 42 is a block diagram depicting one or more exemplary instructions of the information storage subsystem s200 of the ingestible product preparation system 10 of FIG. 1.

One or more exemplary instructions depicted in FIG. 42 as being borne in an exemplary version of a non-transitory signal bearing medium of information storage subsystem s200 include one or more receiving information bar code instructions j1120, one or more receiving information holographic instructions j1121, one or more receiving information textual instructions j1122, one or more receiving information icon instructions j1123, one or more receiving information graphical instructions j1124, one or more receiving information markup instructions j1125, one or more receiving information audio instructions j1126, one or more receiving information list instructions j1127, one or more receiving information hierarchical instructions j1128, one or more receiving information map instructions j1129, one or more receiving information presentation instructions j1130, one or more receiving information sample instructions j1131, one or more receiving information human instructions j1132, one or more receiving information ID card instructions j1133, one or more receiving information iris scan instructions j1134, one or more receiving information voice instructions j1135, one or more receiving information fingerprint instructions j1136, one or more receiving information dental instructions j1137, one or more receiving information RFID instructions j1138, and one or more receiving information password instructions j1139.

Figure 43:
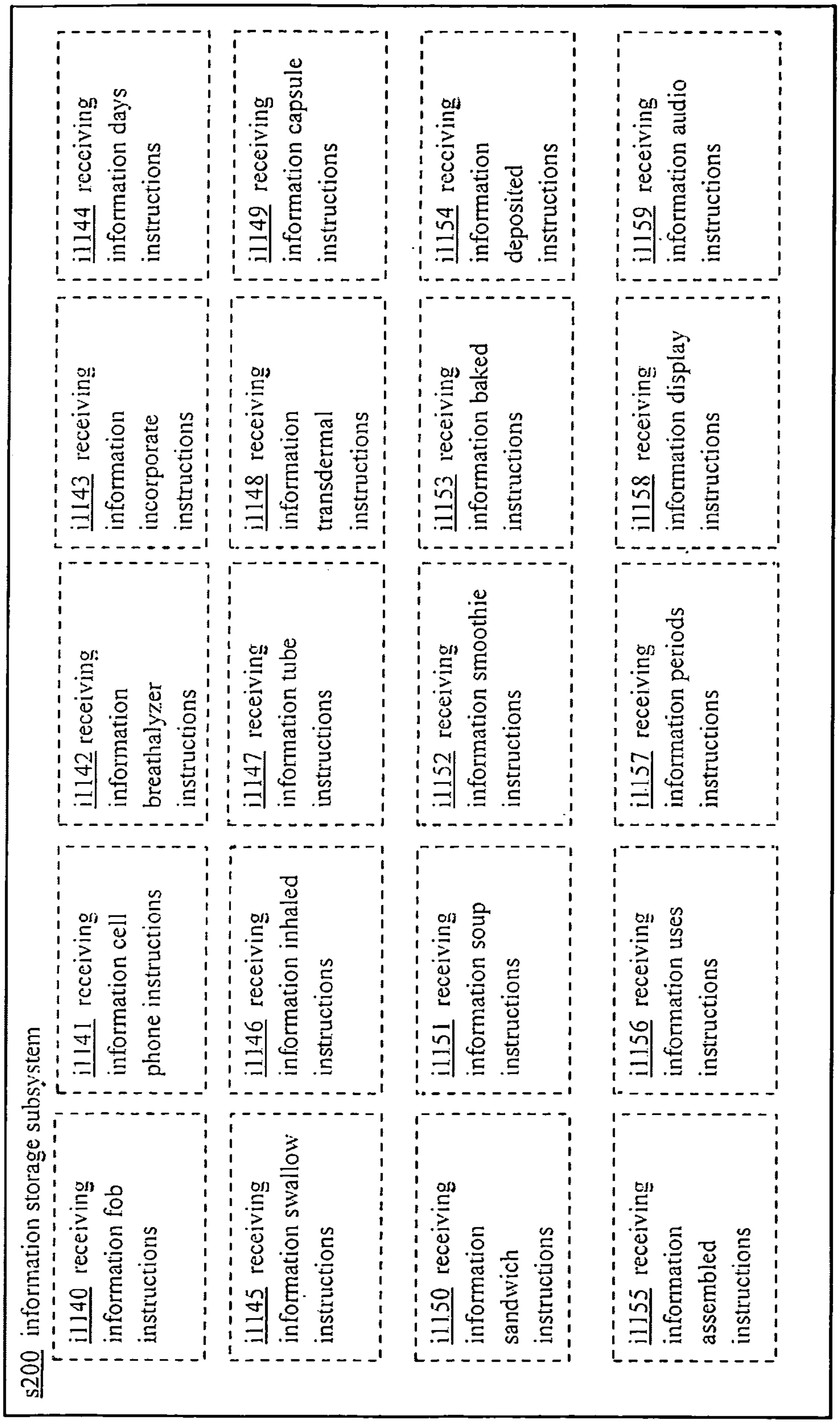
FIG. 43 is a block diagram depicting one or more exemplary instructions of the information storage subsystem s200 of the ingestible product preparation system 10 of FIG. 1.

One or more exemplary instructions depicted in FIG. 43 as being borne in an exemplary version of a non-transitory signal bearing medium of information storage subsystem s200 include one or more receiving information fob instructions j1140, one or more receiving information cell phone instructions j1141, one or more receiving information breathalyzer instructions j1142, one or more receiving information incorporate instructions j1143, one or more receiving information days instructions j1144, one or more receiving information swallow instructions j1145, one or more receiving information inhaled instructions j1146, one or more receiving information tube instructions j1147, one or more receiving information transdermal instructions j1148, one or more receiving information capsule instructions j1149, one or more receiving information sandwich instructions j1150, one or more receiving information soup instructions j1151, one or more receiving information smoothie instructions j1152, one or more receiving information baked instructions j1153, one or more receiving information deposited instructions j1154, one or more receiving information assembled instructions j1155, one or more receiving information uses instructions j1156, one or more receiving information periods instructions j1157, one or more receiving information display instructions j1158, and one or more receiving information audio instructions j1159.

Figure 44:
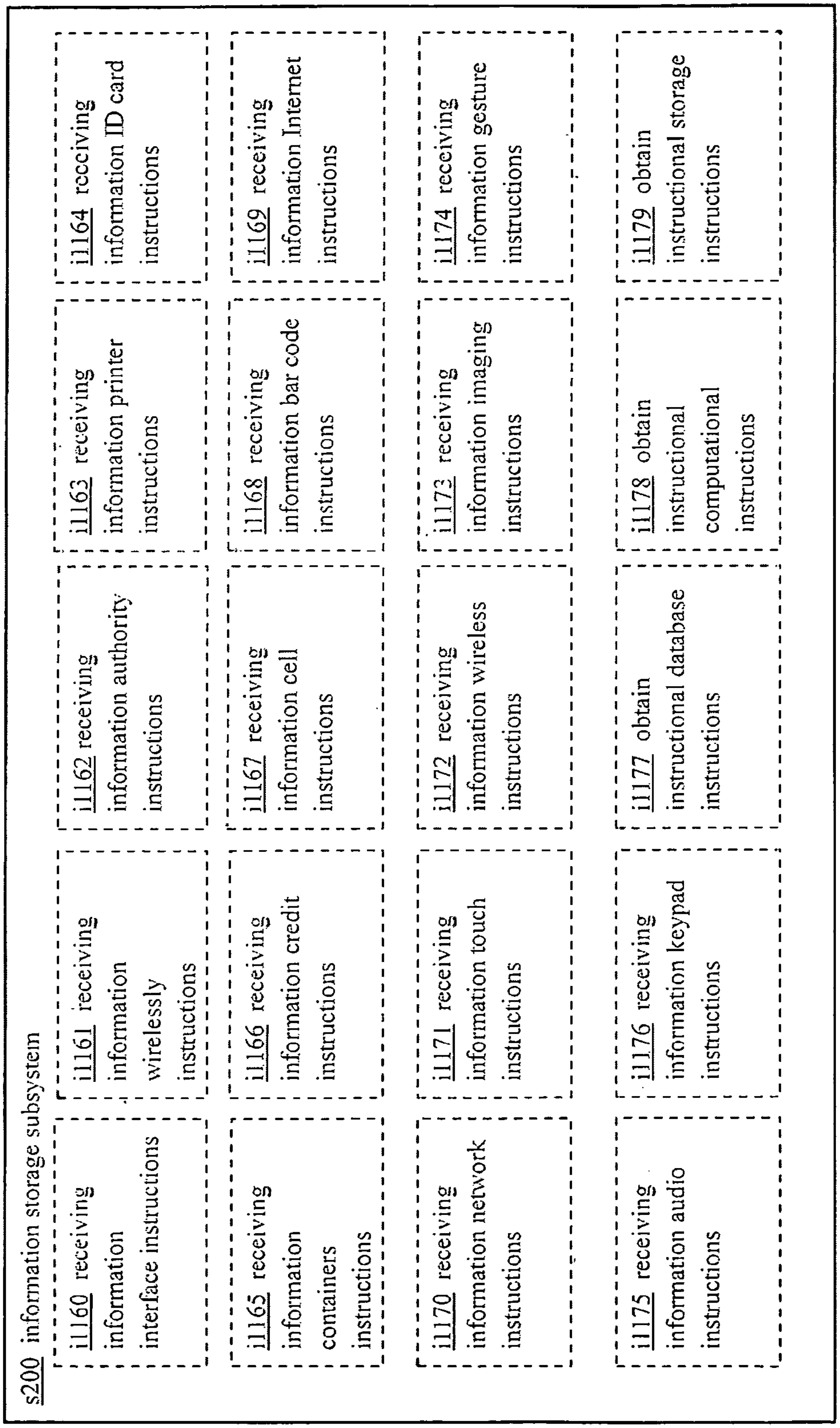
FIG. 44 is a block diagram depicting one or more exemplary instructions of the information storage subsystem s200 of the ingestible product preparation system 10 of FIG. 1.

One or more exemplary instructions depicted in FIG. 44 as being borne in an exemplary version of a non-transitory signal bearing medium of information storage subsystem s200 include one or more receiving information interface instructions j1160, one or more receiving information wirelessly instructions j1161, one or more receiving information authority instructions j1162, one or more receiving information printer instructions j1163, one or more receiving information ID card instructions j1164, one or more receiving information containers instructions j1165, and one or more receiving information credit instructions j1166, one or more receiving information cell instructions j1167, one or more receiving information bar code instructions j1168, one or more receiving information Internet instructions j1169, one or more receiving information network instructions j1170, one or more receiving information touch instructions j1171, one or more receiving information wireless instructions j1172, one or more receiving information imaging instructions j1173, one or more receiving information gesture instructions j1174, one or more receiving information audio instructions j1175, one or more receiving information keypad instructions j1176, one or more obtain instructional database instructions j1177, one or more obtain instructional computational instructions j1178, and one or more obtain instructional storage instructions j1179.

Figure 45:
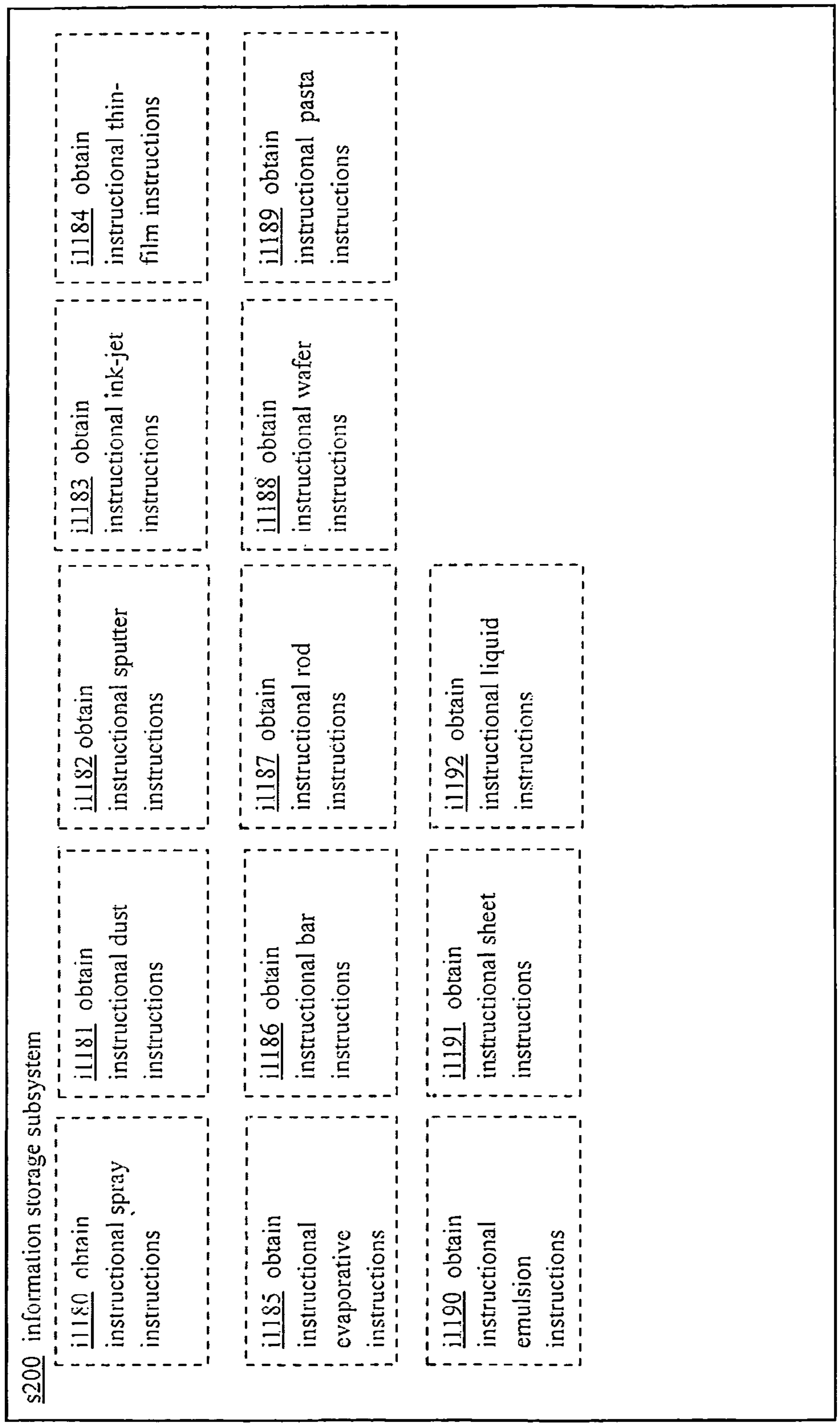
FIG. 45 is a block diagram depicting one or more exemplary instructions of the information storage subsystem s200 of the ingestible product preparation system 10 of FIG. 1.

One or more exemplary instructions depicted in FIG. 45 as being borne in an exemplary version of a non-transitory signal bearing medium of information storage subsystem s200 include one or more obtain instructional spray instructions j1180, one or more obtain instructional dust instructions j1181, one or more obtain instructional sputter instructions j1182, one or more obtain instructional ink-jet instructions j1183, one or more obtain instructional thin-film instructions j1184, one or more obtain instructional evaporative instructions j1185, one or more obtain instructional bar instructions j1186, one or more obtain instructional rod instructions j1187, one or more obtain instructional wafer instructions j1188, one or more obtain instructional pasta instructions j1189, one or more obtain instructional emulsion instructions j1190, one or more obtain instructional sheet instructions j1191, and one or more obtain instructional liquid instructions j1192.

Figure 46:
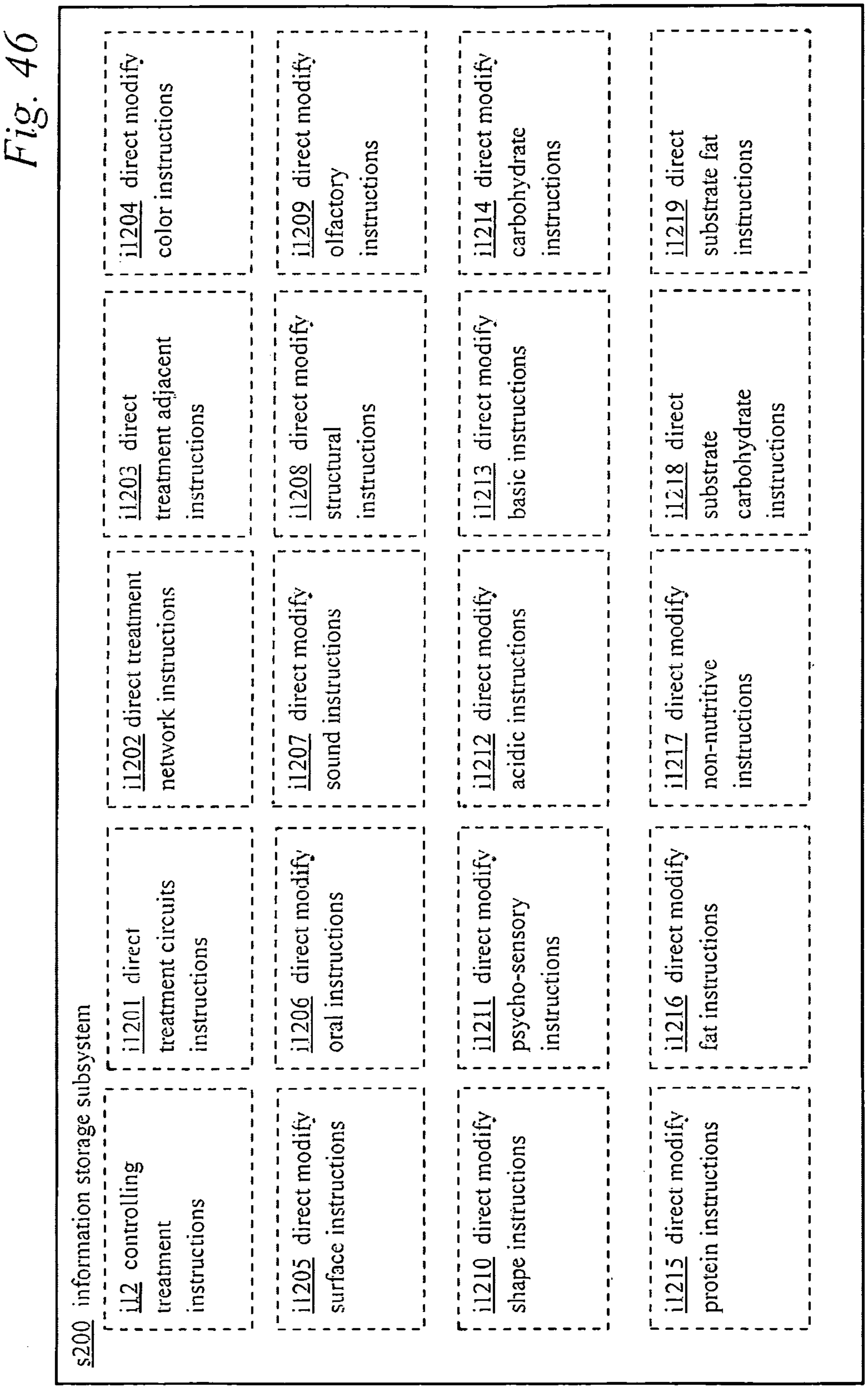
FIG. 46 is a block diagram depicting one or more exemplary instructions of the information storage subsystem s200 of the ingestible product preparation system 10 of FIG. 1.

One or more exemplary instructions depicted in FIG. 46 as being borne in an exemplary version of a non-transitory signal bearing medium of information storage subsystem s200 include one or more controlling treatment instructions j12j12, one or more direct treatment circuits instructions j1201, one or more direct treatment network instructions j1202, one or more direct treatment adjacent instructions j1203, one or more direct modify color instructions j1204, one or more direct modify surface instructions j1205, one or more direct modify oral instructions j1206, one or more direct modify sound instructions j1207, one or more direct modify structural instructions j1208, one or more direct modify olfactory instructions j1209, one or more direct modify shape instructions j1210, one or more direct modify psycho-sensory instructions j1211, one or more direct modify acidic instructions j1212, one or more direct modify basic instructions j1213, one or more direct modify carbohydrate instructions j1214, one or more direct modify protein instructions j1215, one or more direct modify fat instructions j1216, one or more direct modify non-nutritive instructions j1217, one or more direct substrate carbohydrate instructions j1218, and one or more direct substrate fat instructions j1219.

One or more exemplary instructions depicted in FIG. 46 as being borne in an exemplary version of a non-transitory signal bearing medium of information storage subsystem s200 include one or more direct substrate protein instructions j1220, one or more direct modify coat instructions j1221, one or more direct modify dissolve instructions j1222, one or more direct modify mix instructions j1223, one or more direct modify replace instructions j1224, one or more direct modify integrate instructions j1225, one or more direct modify soften instructions j1226, one or more direct modify hydrate instructions j1227, one or more direct modify harden instructions j1228, and one or more direct modify dehydrate instructions j1229.

Figure 48:
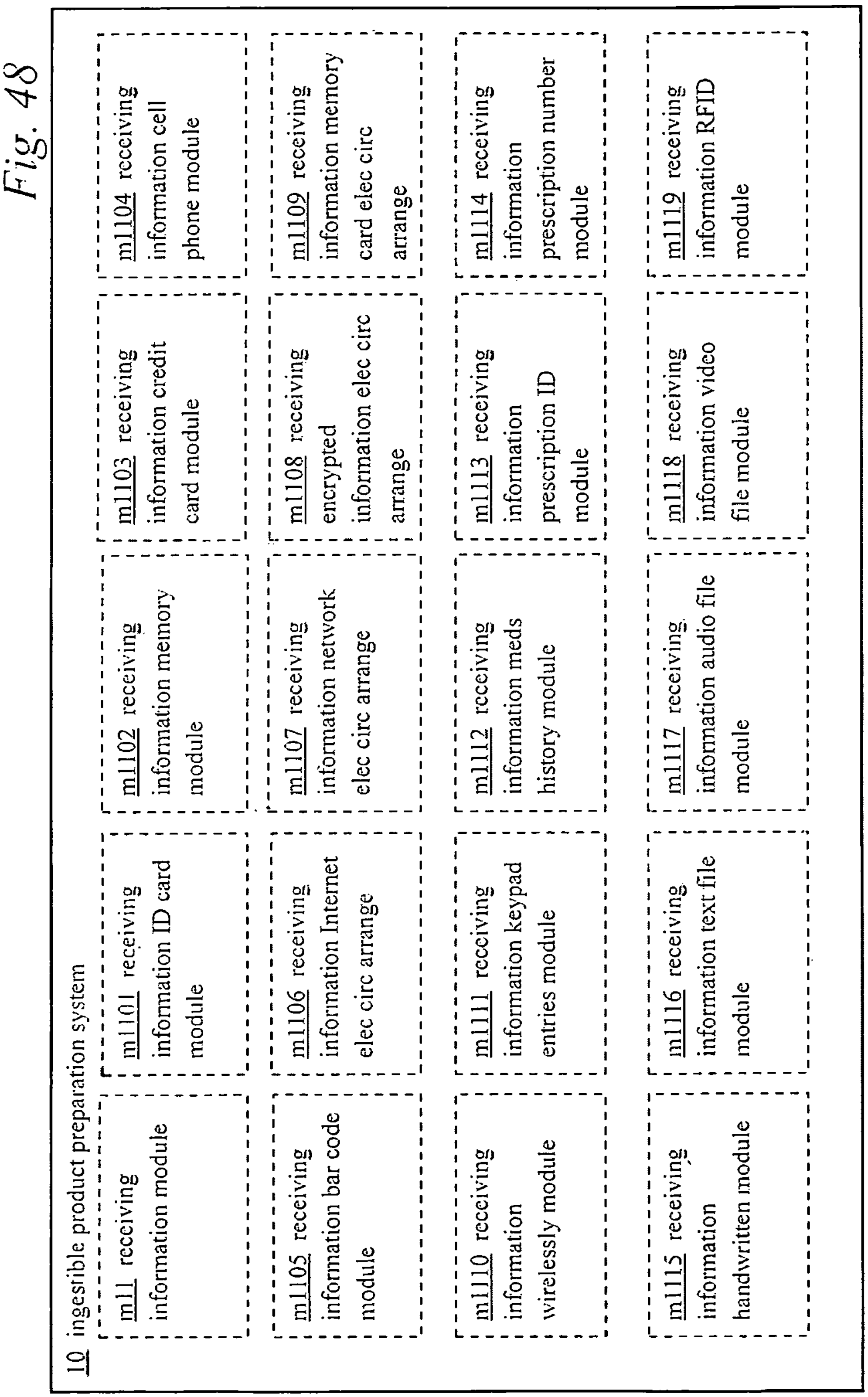
FIG. 48 is a block diagram depicting one or more exemplary modules of the ingestible product preparation system 10 of FIG. 1.

Implementations of modules involve different combinations (limited to patentable subject matter under 35 U.S.C. 101) of one or more aspects from one or more of the electrical circuitry arrangements and/or one or more aspects from one or more of the instructions of the ingestible product preparation system 10. Exemplary depictions of some of these modules are shown in FIG. 48 to include receiving information module n11, receiving information ID card module n1101, receiving information memory module n1102, receiving information credit card module n1103, receiving information cell phone module n1104, receiving information bar code module n1105, receiving information Internet module n1106, receiving information network module n1107, receiving encrypted information module n1108, receiving information memory card module n1109, receiving information wirelessly module n1110, receiving information keypad entries module n1111, receiving information meds history module n1112, receiving information prescription ID module n1113, receiving information prescription number module n1114, receiving information handwritten module n1115, receiving information text file module n1116, receiving information audio file module n1117, receiving information video file module n1118, and receiving information RFID module n1119.

Figure 49:
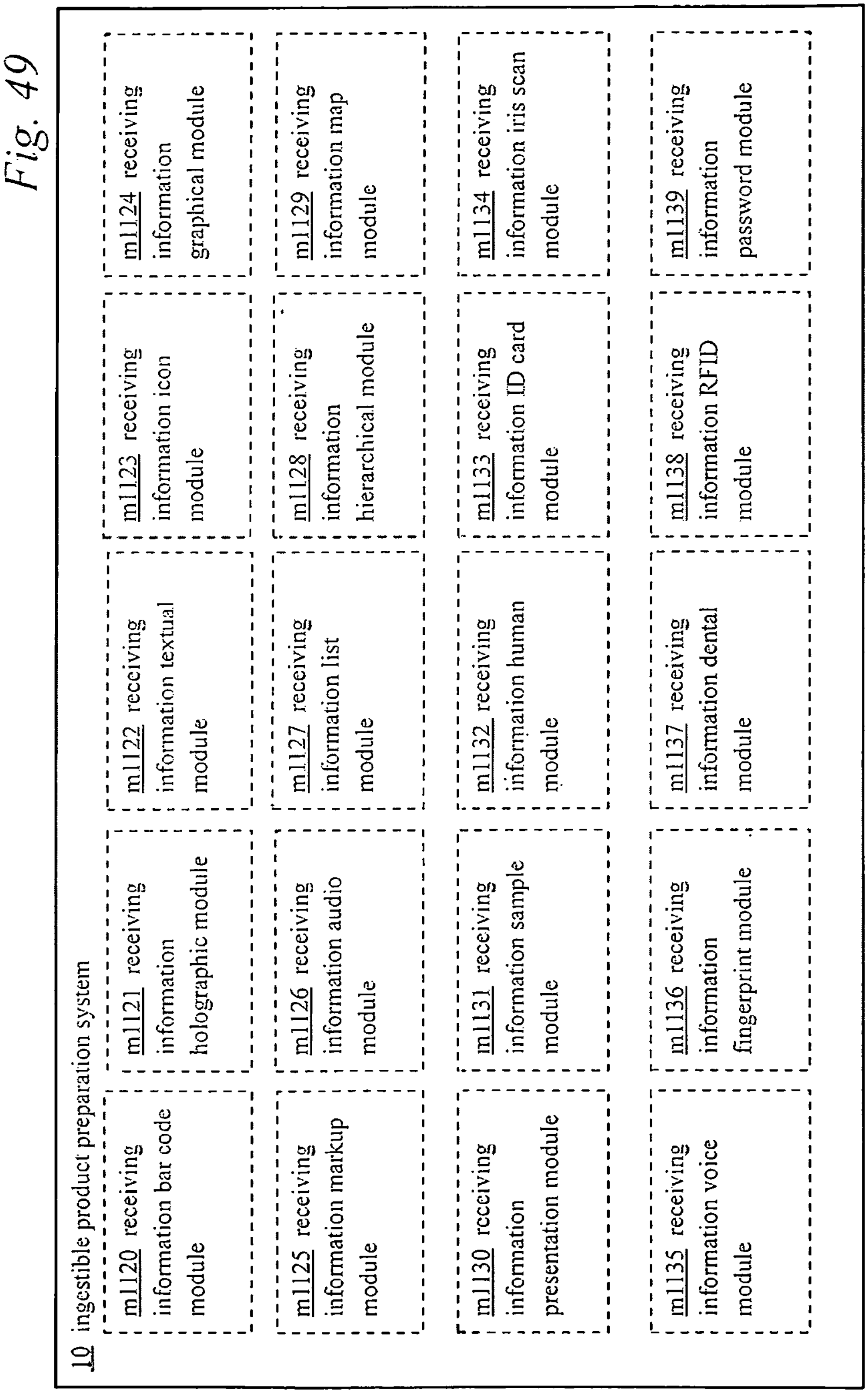
FIG. 49 is a block diagram depicting one or more exemplary modules of the ingestible product preparation system 10 of FIG. 1.

Some of these modules are depicted in FIG. 49 to include receiving information bar code module n1120, receiving information holographic module n1121, receiving information textual module n1122, receiving information icon module n1123, receiving information graphical module n1124, receiving information markup module n1125, receiving information audio module n1126, receiving information list module n1127, receiving information hierarchical module n1128, receiving information map module n1129, receiving information presentation module n1130, receiving information sample module n113, receiving information human module n1132, receiving information ID card module n1133, receiving information iris scan module n1134, receiving information voice module n1135, receiving information fingerprint module n1136, receiving information dental module n1137, receiving information RFID module n1138, and receiving information password module n1139.

Figure 50:
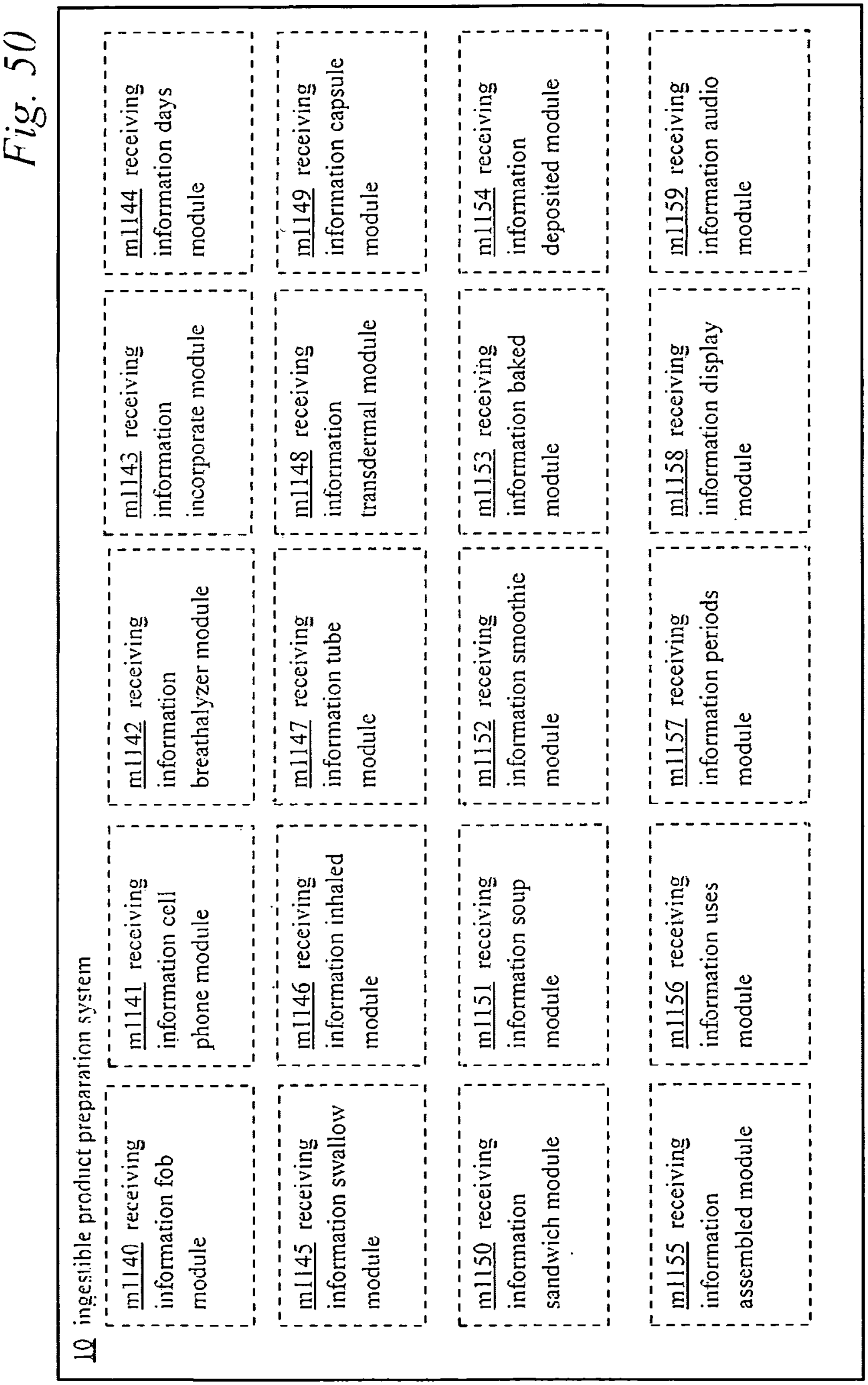
FIG. 50 is a block diagram depicting one or more exemplary modules of the ingestible product preparation system 10 of FIG. 1.

Some of these modules are depicted in FIG. 50 to include receiving information fob module n1140, receiving information cell phone module n1141, receiving information breathalyzer module n1142, receiving information incorporate module n1143, receiving information days module n1144, receiving information swallow module n1145, receiving information inhaled module n1146, receiving information tube module n1147, receiving information transdermal module n1148, receiving information capsule module n1149, receiving information sandwich module n1150, receiving information soup module n1151, receiving information smoothie module n1152, receiving information baked module n1153, receiving information deposited module n1154, receiving information assembled module n1155, receiving information uses module n1156, receiving information periods module n1157, receiving information display module n1158, and receiving information audio module n1159.

Figure 51:
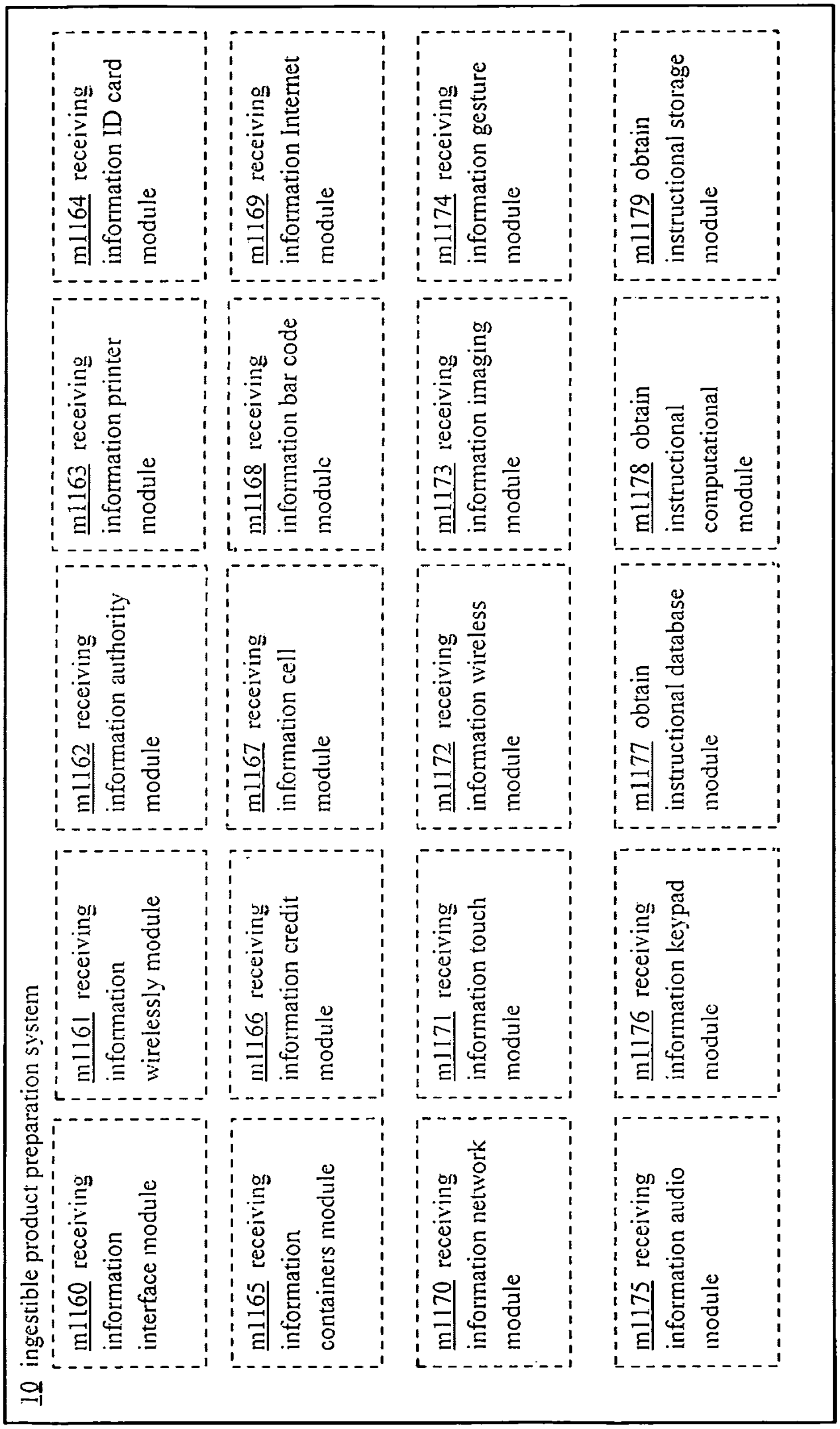
FIG. 51 is a block diagram depicting one or more exemplary modules of the ingestible product preparation system 10 of FIG. 1.

Some of these modules are depicted in FIG. 51 to include receiving information interface module n1160, receiving information wirelessly module n1161, receiving information authority module n1162, receiving information printer module n1163, receiving information ID card module n1164, receiving information containers module n1165, and receiving information credit module n1166, receiving information cell module n1167, receiving information bar code module n1168, receiving information Internet module n1169, receiving information network module n1170, receiving information touch module n1171, receiving information wireless module n1172, receiving information imaging module n1173, receiving information gesture module n1174, receiving information audio module n1175, receiving information keypad module n1176, obtain instructional database module n1177, obtain instructional computational module n1178, and obtain instructional storage module n1179.

Figure 52:
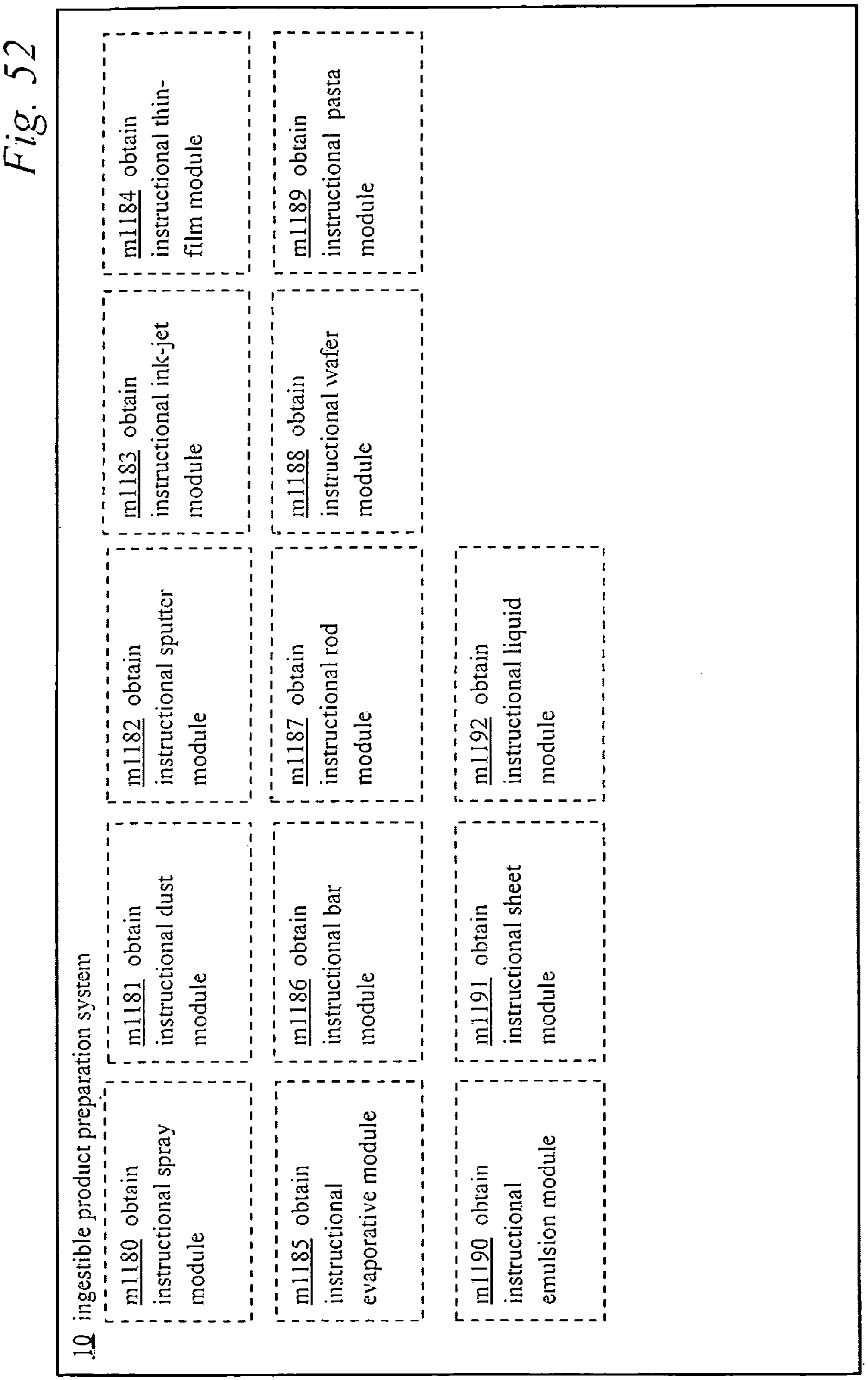
FIG. 52 is a block diagram depicting one or more exemplary modules of the ingestible product preparation system 10 of FIG. 1.

Some of these modules are depicted in FIG. 52 to include obtain instructional spray module n1180, obtain instructional dust module n1181, obtain instructional sputter module n1182, obtain instructional ink jet module n1183, obtain instructional thin-film module n1184, obtain instructional evaporative module n1185, obtain instructional bar module n1186, obtain instructional rod module n1187, obtain instructional wafer module n1188, obtain instructional pasta module n1189, obtain instructional emulsion module n1190, obtain instructional sheet module n1191, and obtain instructional liquid module n1192.

Figure 53:
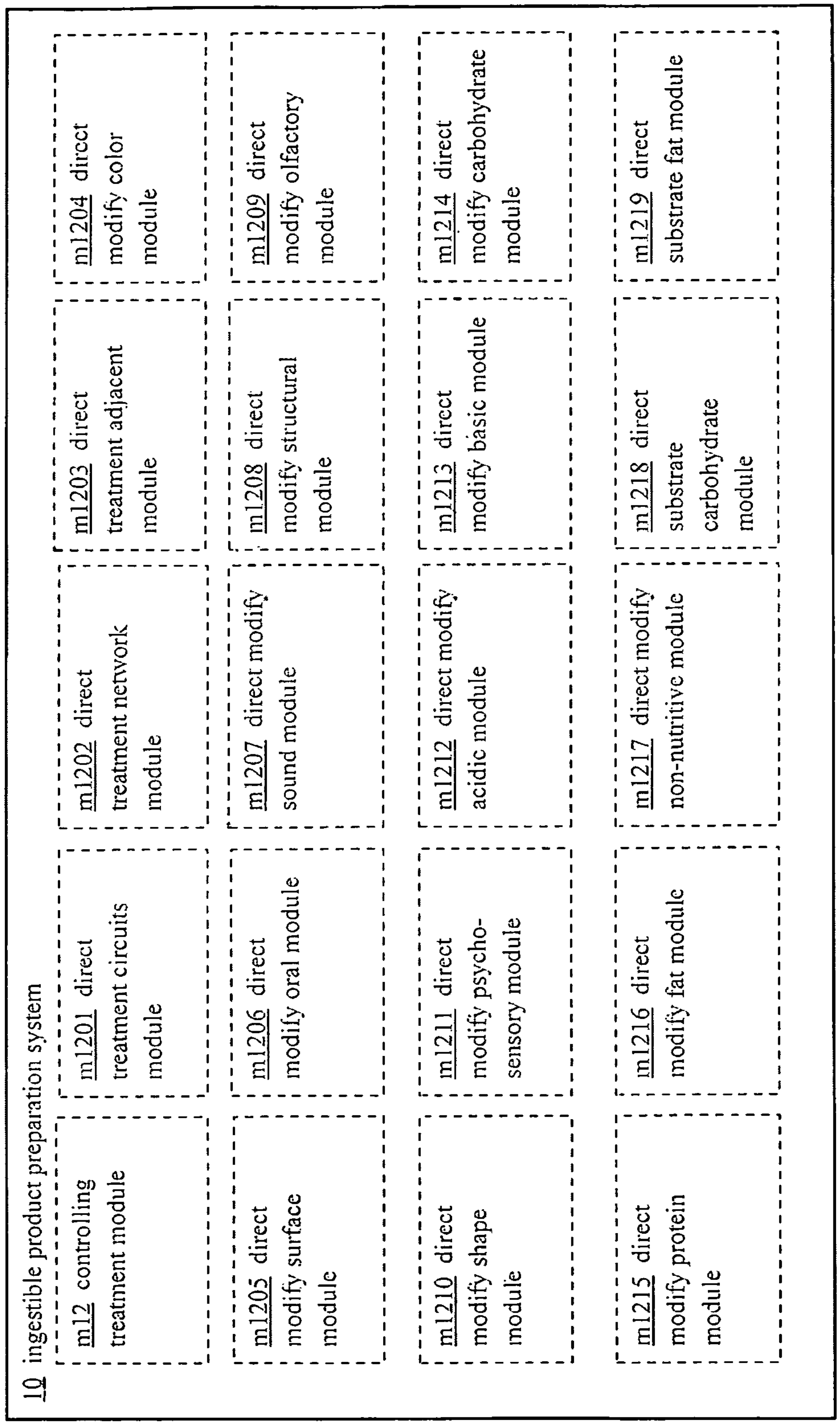
FIG. 53 is a block diagram depicting one or more exemplary modules of the ingestible product preparation system 10 of FIG. 1.

Some of these modules are depicted in FIG. 53 to include controlling treatment module n12, direct treatment circuits module n1201, direct treatment network module n1202, direct treatment adjacent module n1203, direct modify color module n1204, direct modify surface module n1205, direct modify oral module n1206, direct modify sound module n1207, direct modify structural module n1208, direct modify olfactory module n1209, direct modify shape module n1210, direct modify psycho-sensory module n1211, and direct modify acidic module n1212, direct modify basic module n1213, direct modify carbohydrate module n1214, direct modify protein module n1215, direct modify fat module n1216, direct modify non-nutritive module n1217, direct substrate carbohydrate module n1218, and direct substrate fat module n1219.

Figure 54:
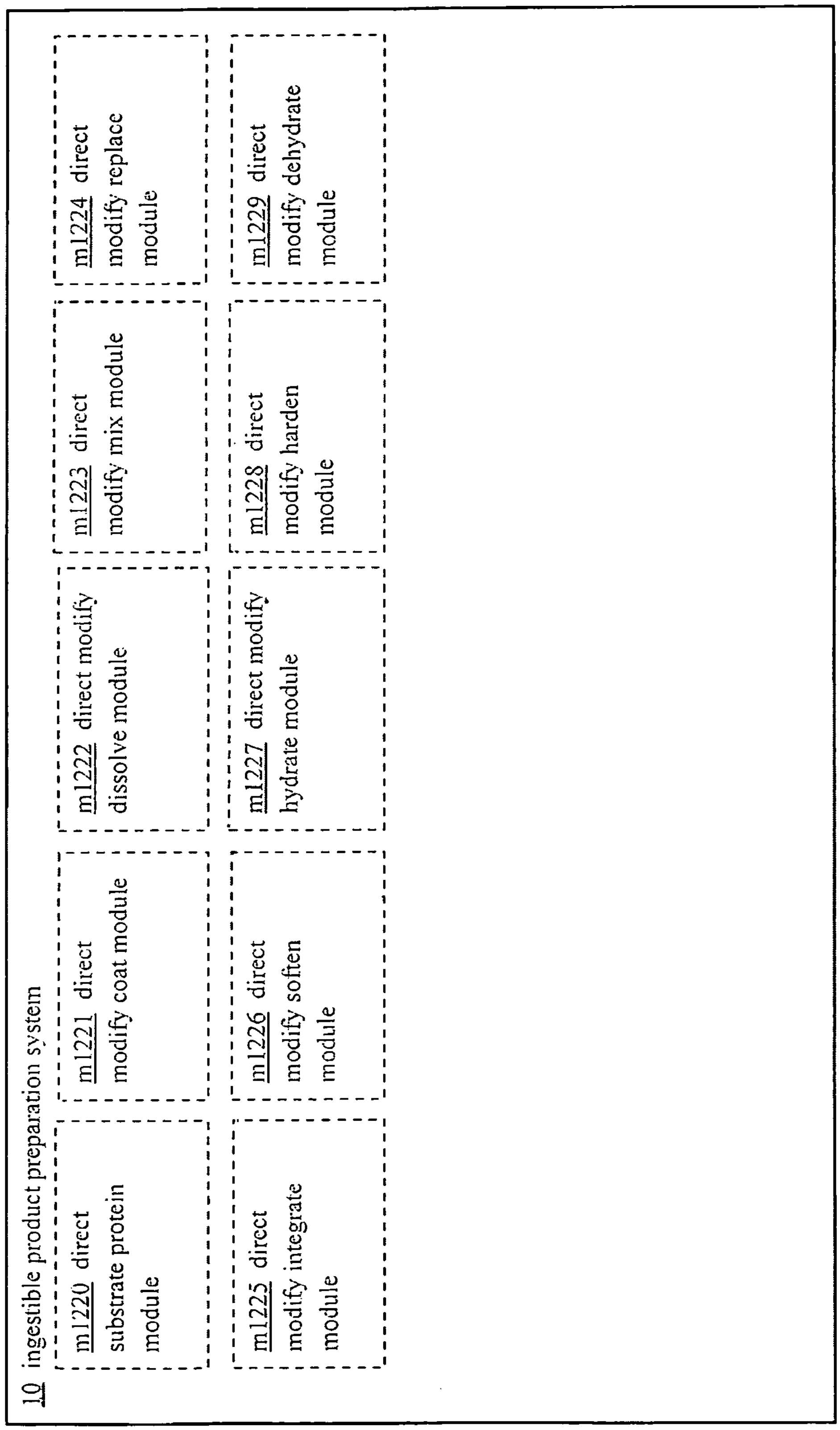
FIG. 54 is a block diagram depicting one or more exemplary modules of the ingestible product preparation system 10 of FIG. 1.

Some of these modules are depicted in FIG. 54 to include direct substrate protein module n12, direct modify coat module n1221, direct modify dissolve module n1222, direct modify mix module n1223, direct modify replace module n1224, direct modify integrate module n1225, direct modify soften module n1226, direct modify hydrate module n1227, direct modify harden module n1228, and direct modify dehydrate module n1229.

In some implementations, non-transitory signal-bearing medium of information storage subsystem s200 as articles of manufacture may store the one or more exemplary instructions. In some implementations, the non-transitory signal bearing medium may include a computer-readable medium. In some implementations, the non-transitory signal-bearing medium may include a recordable medium. In some implementations, the signal-bearing medium may include a communication medium.

The various subsystems and components of the ingestible product preparation system s10 such as the control and information processing subsystem s100, the information storage subsystem s200, the information user interface subsystem s300, the sensing subsystem s400 and the electronic communication subsystem s500 and their sub-components and the other exemplary entities depicted may be embodied by hardware, software and/or firmware (limited to patentable subject matter under 35 USC 101). For example, in some implementations of the ingestible product preparation system s10, aspects may be implemented with a processor (e.g., microprocessor, controller, and so forth) executing computer readable instructions (e.g., computer program product) stored in a storage medium (e.g., volatile or non-volatile memory) such as a signal-bearing medium. Alternatively, hardware such as application specific integrated circuit (ASIC) may be employed in order to implement such modules in some alternative implementations.

Figure 55:
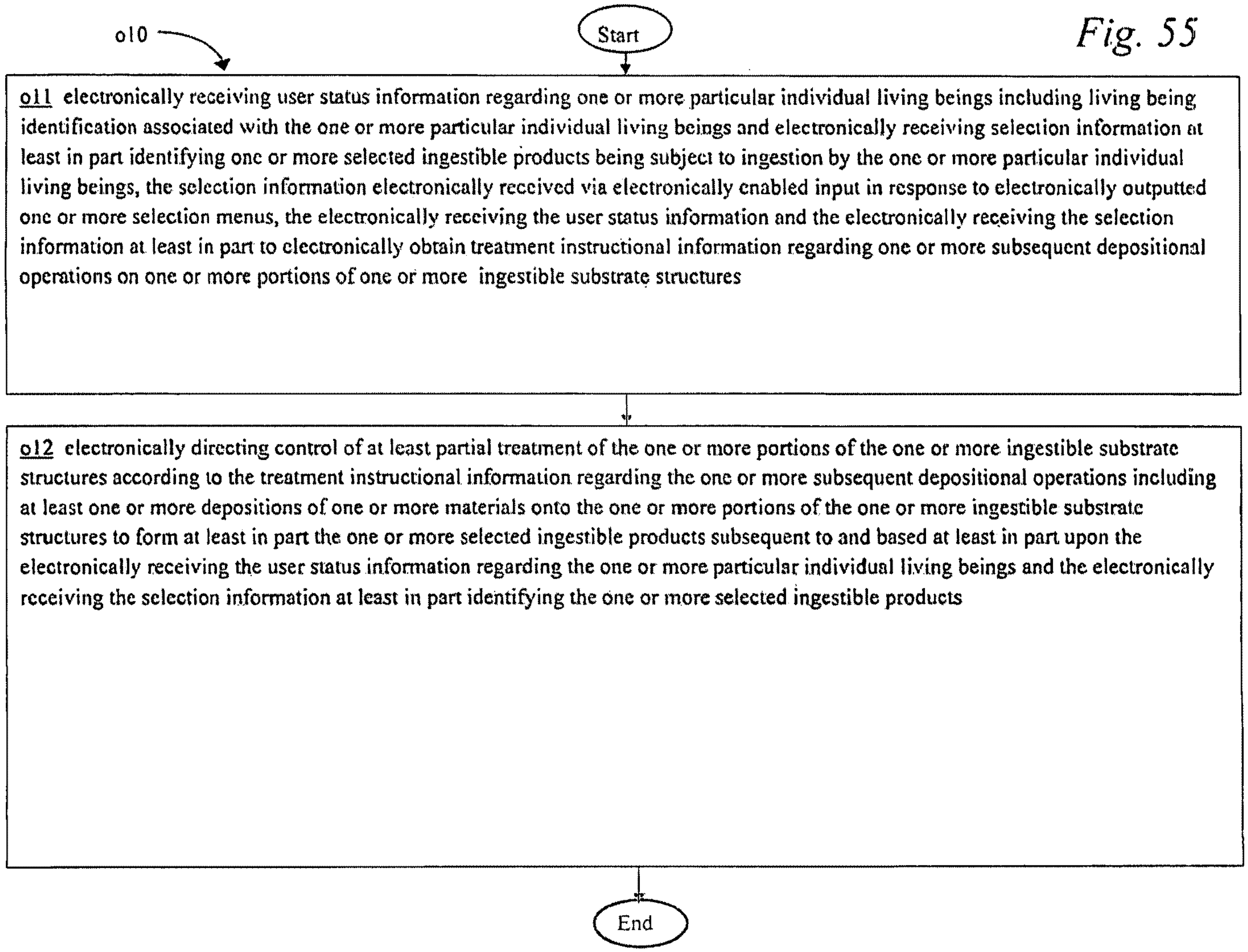
FIG. 55 is a high-level flowchart illustrating an operational flow o10 representing exemplary operations related to electronically receiving user status information regarding one or more particular individual living beings including living being identification associated with the one or more particular individual living beings and electronically receiving selection information at least in part identifying one or more selected ingestible products being subject to ingestion by the one or more particular individual living beings, the selection information electronically received via electronically enabled input in response to electronically outputted one or more selection menus, the electronically receiving the user status information and the electronically receiving the selection information at least in part to electronically obtain treatment instructional information regarding one or more subsequent depositional operations on one or more portions of one or more ingestible substrate structures, and electronically directing control of at least partial treatment of the one or more portions of the one or more ingestible substrate structures according to the treatment instructional information regarding the one or more subsequent depositional operations including at least one or more depositions of one or more materials onto the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products at least associated with the depicted exemplary implementations of the system.

An operational flow p10 as shown in FIG. 55 represents example operations related to electronically receiving user status information regarding one or more particular individual living beings including living being identification associated with the one or more particular individual living beings and electronically receiving selection information at least in part identifying one or more selected ingestible products being subject to ingestion by the one or more particular individual living beings, the selection information electronically received via electronically enabled input in response to electronically outputted one or more selection menus, the electronically receiving the user status information and the electronically receiving the selection information at least in part to electronically obtain treatment instructional information regarding one or more subsequent depositional operations on one or more portions of one or more ingestible substrate structures and electronically directing control of at least partial treatment of the one or more portions of the one or more ingestible substrate structures according to the treatment instructional information regarding the one or more subsequent depositional operations including at least one or more depositions of one or more materials onto the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products.

FIG. 55 and those figures that follow may have various examples of operational flows, and explanation may be provided with respect to the above-described examples of FIGS. 1-15 and/or with respect to other examples and contexts. Nonetheless, it should be understood that the operational flows may be executed in a number of other environments and contexts, and/or in modified versions of FIGS. 1-15. Furthermore, although the various operational flows are presented in the sequence(s) illustrated, it should be understood that the various operations may be performed in other orders than those which are illustrated, or may be performed concurrently.

In FIG. 55 and those figures that follow, various operations may be depicted in a box-within-a-box manner. Such depictions may indicate that an operation in an internal box may comprise an optional exemplary implementation of the operational step illustrated in one or more external boxes. However, it should be understood that internal box operations may be viewed as independent operations separate from any associated external boxes and may be performed in any sequence with respect to all other illustrated operations, or may be performed concurrently.

As shown in FIG. 55, the operational flow p10 proceeds to operation p11 for electronically receiving user status information regarding one or more particular individual living beings including living being identification associated with the one or more particular individual living beings and electronically receiving selection information at least in part identifying one or more selected ingestible products being subject to ingestion by the one or more particular individual living beings, the selection information electronically received via electronically enabled input in response to electronically outputted one or more selection menus, the electronically receiving the user status information and the electronically receiving the selection information at least in part to electronically obtain treatment instructional information regarding one or more subsequent depositional operations on one or more portions of one or more ingestible substrate structures. An exemplary version of a non-transitory signal bearing medium of information storage subsystem s200 is depicted as bearing one or more receiving information instructions j11 that when executed will direct performance of the operation p11. In an implementation, the one or more receiving information instructions j11 when executed direct electronically receiving (e.g. including the network cable component s502 carries information to the transceiver component s522, etc.) user status information (e.g. including identification, characteristics, affiliations, etc.) regarding one or more particular individual living beings (e.g. including one or more particular human beings, animals, etc.) including living being identification (e.g. including identification numbers, passwords, biometric data such as voice prints, stored in information storage subsystem 200, etc.) associated with the one or more particular individual living beings (e.g. including one or more humans, animals, etc.) and electronically receiving (e.g. including through the receiver component s528, etc.) selection information (e.g. including preferences, choices, etc.) at least in part identifying (e.g. including textual descriptions, graphical representations, etc.) one or more selected ingestible products (e.g. including sandwiches, snack bars, full course meals, etc.) being subject to ingestion (e.g. including oral, dermal, nasal, etc.) by the one or more particular individual living beings (e.g. including one or more humans, animals, etc.), the selection information (e.g. including likes, dislikes, meal selection, etc.) electronically received (e.g. including through the transceiver component s522, etc.) via electronically enabled input (e.g. including voice, gesture, keypad, etc.) in response to electronically outputted (e.g. including screen display, audio, etc.) one or more selection menus (e.g. including textual, icons, etc.), the electronically receiving (e.g. including through transceiver component s522, etc.) the user status information (e.g. including identification, associated location information, memberships, etc.) and the electronically receiving (e.g. including through transceiver component s522, etc.) the selection information (e.g. including ingestible materials desired, etc.) at least in part to electronically obtain (e.g. including through data packets, etc.) treatment instructional information (e.g. including methodology, preparation steps, etc.) regarding one or more subsequent depositional operations (e.g. including spraying, dusting, etc.) on one or more portions of one or more ingestible substrate structures (e.g. including bars, sheets, etc.). Furthermore, the receiving information electrical circuitry arrangement ("elec circ arrange") f11 when activated will perform the operation p1101. Also, the receiving information ID card module n1101, when executed and/or activated, will direct performance of and/or performs the operation p11. In an implementation, the receiving information electrical circuitry arrangement f11, when activated performs electronically receiving (e.g. including the network cable component s502 carries information to the transceiver component s522, etc.) user status information (e.g. including identification, characteristics, affiliations, etc.) regarding one or more particular individual living beings (e.g. including one or more particular human beings, animals, etc.) including living being identification (e.g. including identification numbers, passwords, biometric data such as voice prints, stored in information storage subsystem 200, etc.) associated with the one or more particular individual living beings (e.g. including one or more humans, animals, etc.) and electronically receiving (e.g. including through the receiver component s528, etc.) selection information (e.g. including preferences, choices, etc.) at least in part identifying (e.g. including textual descriptions, graphical representations, etc.) one or more selected ingestible products (e.g. including sandwiches, snack bars, full course meals, etc.) being subject to ingestion (e.g. including oral, dermal, nasal, etc.) by the one or more particular individual living beings (e.g. including one or more humans, animals, etc.), the selection information (e.g. including likes, dislikes, meal selection, etc.) electronically received (e.g. including through the transceiver component s522, etc.) via electronically enabled input (e.g. including voice, gesture, keypad, etc.) in response to electronically outputted (e.g. including screen display, audio, etc.) one or more selection menus (e.g. including textual, icons, etc.), the electronically receiving (e.g. including through transceiver component s522, etc.) the user status information (e.g. including identification, associated location information, memberships, etc.) and the electronically receiving (e.g. including through transceiver component s522, etc.) the selection information (e.g. including ingestible materials desired, etc.) at least in part to electronically obtain (e.g. including through data packets, etc.) treatment instructional information (e.g. including methodology, preparation steps, etc.) regarding one or more subsequent depositional operations (e.g. including spraying, dusting, etc.) on one or more portions of one or more ingestible substrate structures (e.g. including bars, sheets, etc.). Also, the receiving information module n11, when executed and/or activated, will direct performance of and/or perform the operation p11. In an implementation, the electronically receiving user status information regarding one or more particular individual living beings including living being identification associated with the one or more particular individual living beings and electronically receiving selection information at least in part identifying one or more selected ingestible products being subject to ingestion by the one or more particular individual living beings, the selection information electronically received via electronically enabled input in response to electronically outputted one or more selection menus, the electronically receiving the user status information and the electronically receiving the selection information at least in part to electronically obtain treatment instructional information regarding one or more subsequent depositional operations on one or more portions of one or more ingestible substrate structures is carried out by electronically receiving (e.g. including the network cable component s502 carries information to the transceiver component s522, etc.) user status information (e.g. including identification, characteristics, affiliations, etc.) regarding one or more particular individual living beings (e.g. including one or more particular human beings, animals, etc.) including living being identification (e.g. including identification numbers, passwords, biometric data such as voice prints, stored in information storage subsystem 200, etc.) associated with the one or more particular individual living beings (e.g. including one or more humans, animals, etc.) and electronically receiving (e.g. including through the receiver component s528, etc.) selection information (e.g. including preferences, choices, etc.) at least in part identifying (e.g. including textual descriptions, graphical representations, etc.) one or more selected ingestible products (e.g. including sandwiches, snack bars, full course meals, etc.) being subject to ingestion (e.g. including oral, dermal, nasal, etc.) by the one or more particular individual living beings (e.g. including one or more humans, animals, etc.), the selection information (e.g. including likes, dislikes, meal selection, etc.) electronically received (e.g. including through the transceiver component s522, etc.) via electronically enabled input (e.g. including voice, gesture, keypad, etc.) in response to electronically outputted (e.g. including screen display, audio, etc.) one or more selection menus (e.g. including textual, icons, etc.), the electronically receiving (e.g. including through transceiver component s522, etc.) the user status information (e.g. including identification, associated location information, memberships, etc.) and the electronically receiving (e.g. including through transceiver component s522, etc.) the selection information (e.g. including ingestible materials desired, etc.) at least in part to electronically obtain (e.g. including through data packets, etc.) treatment instructional information (e.g. including methodology, preparation steps, etc.) regarding one or more subsequent depositional operations (e.g. including spraying, dusting, etc.) on one or more portions of one or more ingestible substrate structures (e.g. including bars, sheets, etc.).

Figure 41:
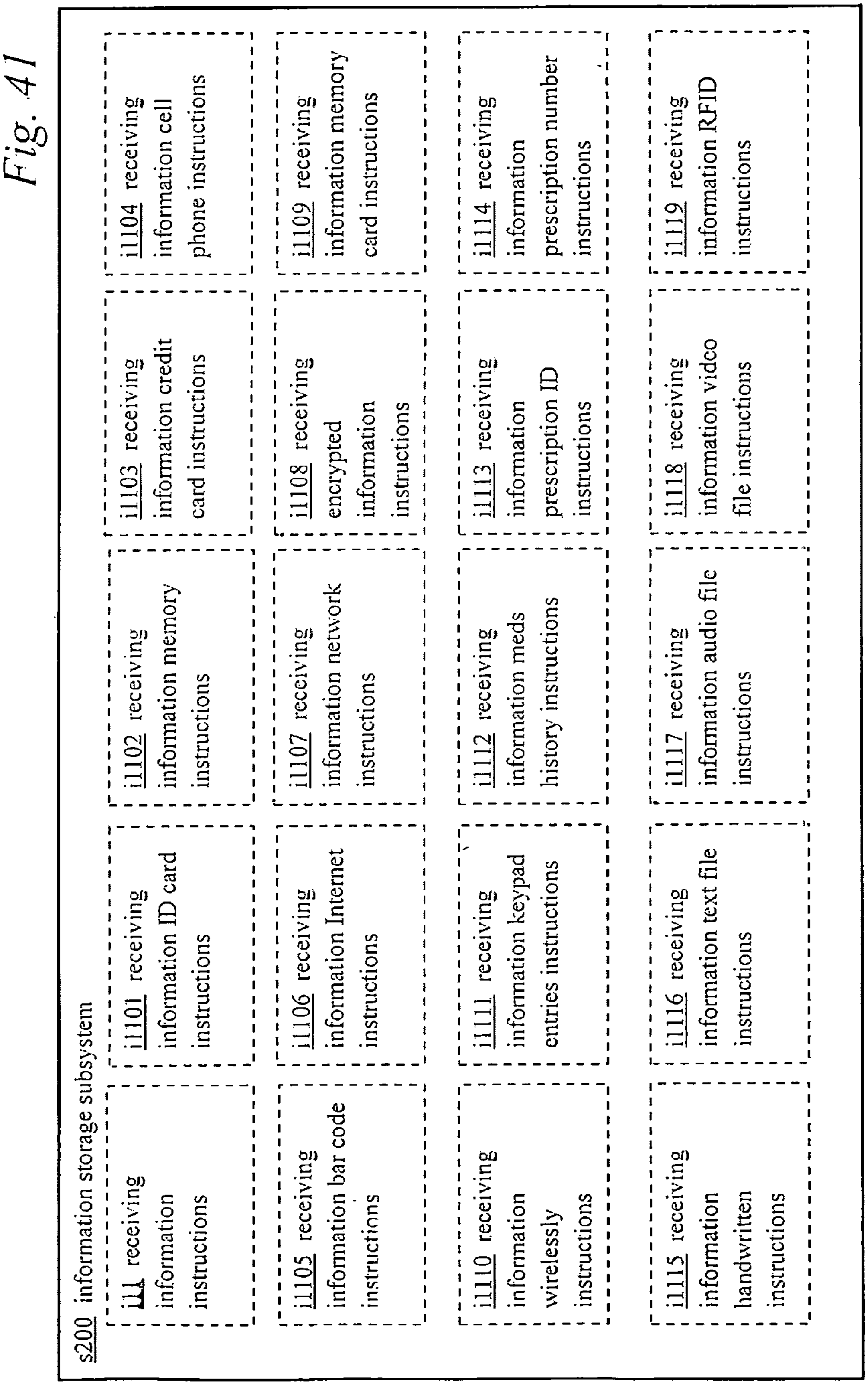
FIG. 41 is a block diagram depicting one or more exemplary instructions of the information storage subsystem s200 of the ingestible product preparation system 10 of FIG. 1.
Figure 56:
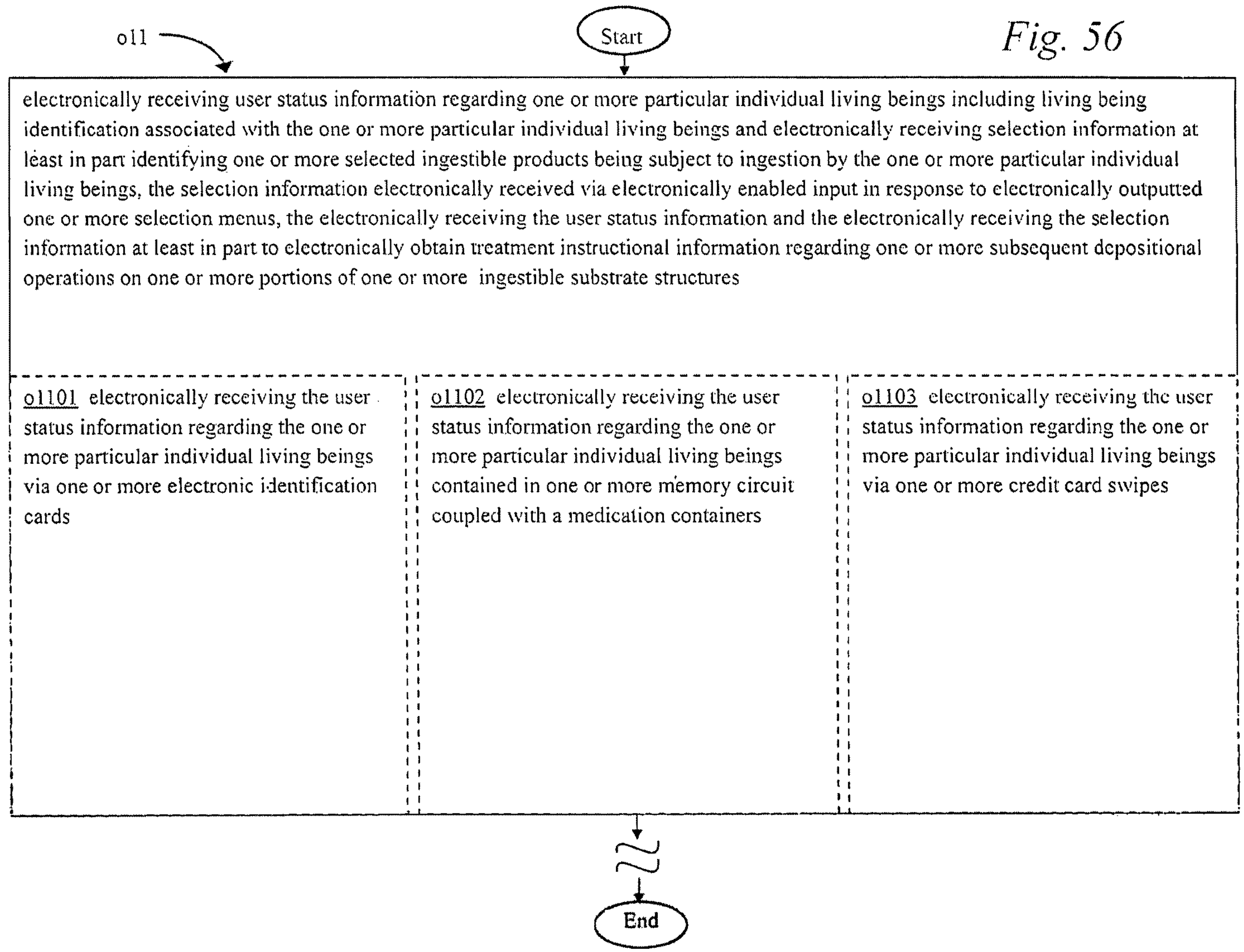
FIG. 56 is a high-level flowchart including exemplary implementations of operation p11 of FIG. 55.

In one or more implementations, as shown in FIG. 56, operation p11 includes an operation p1101 for electronically receiving the user status information regarding the one or more particular individual living beings via one or more electronic identification cards. Origination of an illustratively derived receiving information ID card component group can be accomplished through skilled in the art design choice selection of one or more of the above depicted components from one or more of the above depicted subsystems shown in FIG. 16. Components from the receiving information ID card component group can be used in implementing execution of the one or more receiving information ID card instructions j1101 of FIG. 41, can be used in performance of the receiving information ID card electrical circuitry arrangement f1101 of FIG. 42, and/or can be used in otherwise fulfillment of the operation p1101. An exemplary non-transitory signal bearing medium version of the information storage subsystem s200 is depicted in FIG. 41 as bearing the one or more receiving information ID card instructions j1101 that when executed will direct performance of the operation p1101. Furthermore, the receiving information ID card electrical circuitry arrangement ("elec circ arrange") f1101, when activated, will perform the operation p1101. Also, the receiving information ID card module n1101, when executed and/or activated, will direct performance of and/or perform the operation p1101. For instance, in one or more exemplary implementations, the one or more receiving information ID card instructions j1101, when executed, direct performance of the operation p1101 in the illustrative depiction as follows, and/or the receiving information ID card electrical circuitry arrangement f1101, when activated, performs the operation p1101 in the illustrative depiction as follows, and/or the receiving information ID card module n1101, when executed and/or activated, directs performance of and/or performs the operation p1101 in the illustrative depiction as follows, and/or the operation p1101 is otherwise carried out in the illustrative depiction as follows: electronically receiving the user status information regarding the one or more particular individual living beings via one or more electronic identification cards (e.g. including an implementation of the receiver component s528 is configured to electronically engage with a card having memory storage holding the user status information, etc.).

In one or more implementations, as shown in FIG. 56, operation p11 includes an operation p1102 for electronically receiving the user status information regarding the one or more particular individual living beings contained in one or more memory circuit coupled with a medication containers. Origination of an illustratively derived receiving information memory component group can be accomplished through skilled in the art design choice selection of one or more of the above depicted components from one or more of the above depicted subsystems shown in FIG. 16. Components from the receiving information memory component group can be used in implementing execution of the one or more receiving information memory instructions j1102 of FIG. 41, can be used in performance of the receiving information memory electrical circuitry arrangement f1102 of FIG. 42, and/or can be used in otherwise fulfillment of the operation p1102. An exemplary non-transitory signal bearing medium version of the information storage subsystem s200 is depicted in FIG. 41 as bearing the one or more receiving information memory instructions j1102 that when executed will direct performance of the operation p1102. Furthermore, the receiving information memory electrical circuitry arrangement ("elec circ arrange") f1102, when activated, will perform the operation p1102. Also, the receiving information memory module n1102, when executed and/or activated, will direct performance of and/or perform the operation p1102. For instance, in one or more exemplary implementations, the one or more receiving information memory instructions j1102, when executed, direct performance of the operation p1102 in the illustrative depiction as follows, and/or the receiving information memory electrical circuitry arrangement f1102, when activated, performs the operation p1102 in the illustrative depiction as follows, and/or the receiving information memory module n1102, when executed and/or activated, directs performance of and/or performs the operation p1102 in the illustrative depiction as follows, and/or the operation p1102 is otherwise carried out in the illustrative depiction as follows: electronically receiving the user status information regarding the one or more particular individual living beings contained in one or more memory circuit (e.g. including RAM component s202, etc.) coupled with a medication containers (e.g. including an implementation of the receiver component s528 is configured to electronically engage with a memory storage coupled with a medication container to receive the user status information in electronic form, etc.).

In one or more implementations, as shown in FIG. 56, operation p11 includes an operation p1103 for electronically receiving the user status information regarding the one or more particular individual living beings via one or more credit card swipes. Origination of an illustratively derived receiving information credit card component group can be accomplished through skilled in the art design choice selection of one or more of the above depicted components from one or more of the above depicted subsystems shown in FIG. 16. Components from the receiving information credit card component group can be used in implementing execution of the one or more receiving information credit card instructions j1103 of FIG. 41, can be used in performance of the receiving information credit card electrical circuitry arrangement f1103 of FIG. 42, and/or can be used in otherwise fulfillment of the operation p1103. An exemplary non-transitory signal bearing medium version of the information storage subsystem s200 is depicted in FIG. 41 as bearing the one or more receiving information credit card instructions j1103 that when executed will direct performance of the operation p1103. Furthermore, the receiving information credit card electrical circuitry arrangement ("elec circ arrange") f1103, when activated, will perform the operation p1103. Also, the receiving information credit card module n1103, when executed and/or activated, will direct performance of and/or perform the operation p1103. For instance, in one or more exemplary implementations, the one or more receiving information credit card instructions j1103, when executed, direct performance of the operation p1103 in the illustrative depiction as follows, and/or the receiving information credit card electrical circuitry arrangement f1103, when activated, performs the operation p1103 in the illustrative depiction as follows, and/or the receiving information credit card module n1103, when executed and/or activated, directs performance of and/or performs the operation p1103 in the illustrative depiction as follows, and/or the operation p1103 is otherwise carried out in the illustrative depiction as follows: electronically receiving the user status information regarding the one or more particular individual living beings via one or more credit card swipes (e.g. including an implementation of the receiver component s528 is configured to electronically engage with an electronic memory stripe integrated into a credit card to receive the user status information, etc.).

Figure 57:
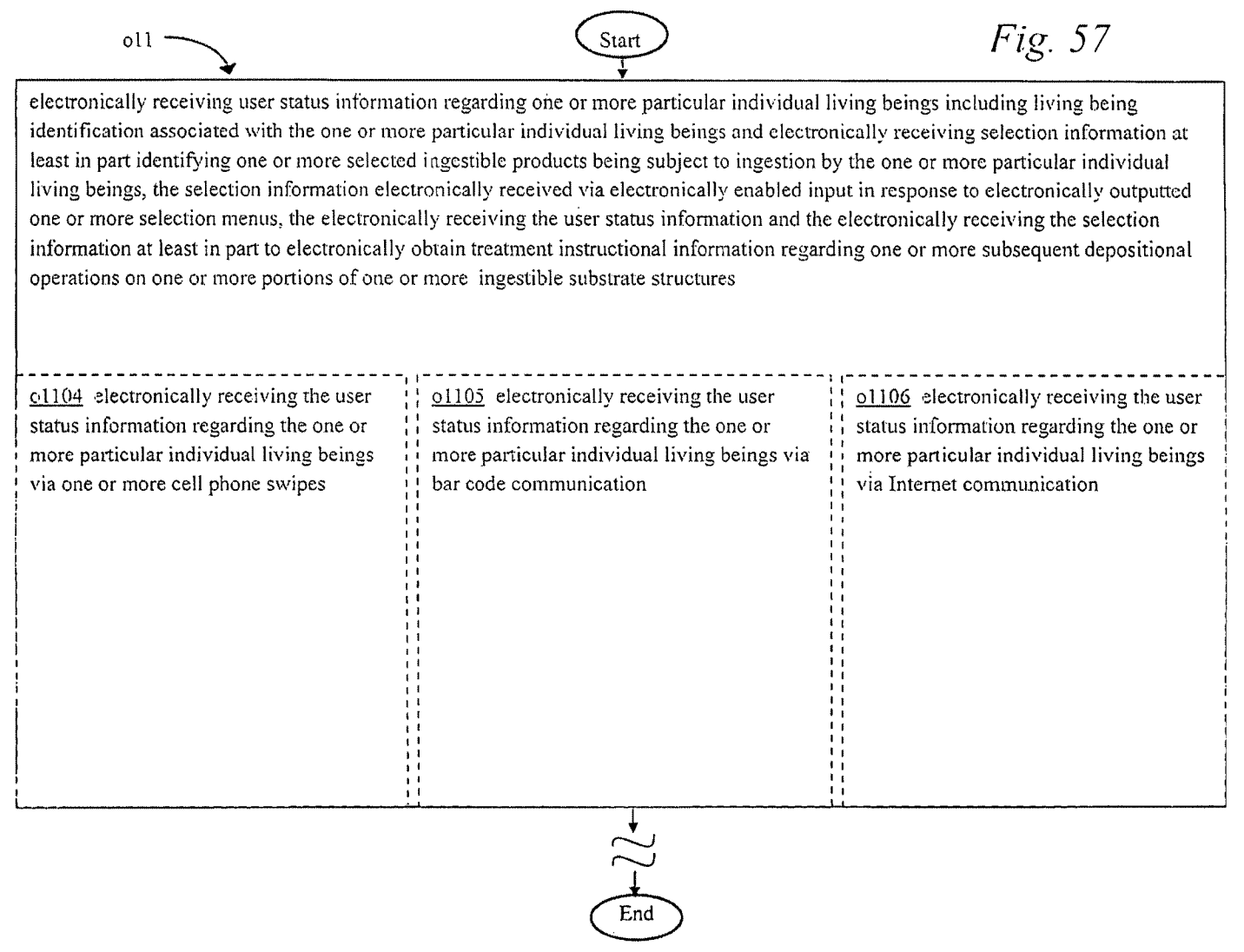

In one or more implementations, as shown in FIG. 57, operation p11 includes an operation p1104 for electronically receiving the user status information regarding the one or more particular individual living beings via one or more cell phone swipes. Origination of an illustratively derived receiving information cell phone component group can be accomplished through skilled in the art design choice selection of one or more of the above depicted components from one or more of the above depicted subsystems shown in FIG. 16. Components from the receiving information cell phone component group can be used in implementing execution of the one or more receiving information cell phone instructions j1104 of FIG. 41, can be used in performance of the receiving information cell phone electrical circuitry arrangement f1104 of FIG. 42, and/or can be used in otherwise fulfillment of the operation p1104. An exemplary non-transitory signal bearing medium version of the information storage subsystem s200 is depicted in FIG. 41 as bearing the one or more receiving information cell phone instructions j1104 that when executed will direct performance of the operation p1104. Furthermore, the receiving information cell phone electrical circuitry arrangement ("elec circ arrange") f1104, when activated, will perform the operation p1104. Also, the receiving information cell phone module n1104, when executed and/or activated, will direct performance of and/or perform the operation p1104. For instance, in one or more exemplary implementations, the one or more receiving information cell phone instructions j1104, when executed, direct performance of the operation p1104 in the illustrative depiction as follows, and/or the receiving information cell phone electrical circuitry arrangement f1104, when activated, performs the operation p1104 in the illustrative depiction as follows, and/or the receiving information cell phone module n1104, when executed and/or activated, directs performance of and/or performs the operation p1104 in the illustrative depiction as follows, and/or the operation p1104 is otherwise carried out in the illustrative depiction as follows: electronically receiving the user status information regarding the one or more particular individual living beings via one or more cell phone swipes (e.g. including an implementation of the receiver component s528 is configured to electronically engage with an electronic memory component integrated into a cell phone to receive the user status information, etc.).

In one or more implementations, as shown in FIG. 57, operation p11 includes an operation p1105 for electronically receiving the user status information regarding the one or more particular individual living beings via bar code communication. Origination of an illustratively derived receiving information bar code component group can be accomplished through skilled in the art design choice selection of one or more of the above depicted components from one or more of the above depicted subsystems shown in FIG. 16. Components from the receiving information bar code component group can be used in implementing execution of the one or more receiving information bar code instructions j1105 of FIG. 41, can be used in performance of the receiving information bar code electrical circuitry arrangement f1105 of FIG. 42, and/or can be used in otherwise fulfillment of the operation p1105. An exemplary non-transitory signal bearing medium version of the information storage subsystem s200 is depicted in FIG. 41 as bearing the one or more receiving information bar code instructions j1105 that when executed will direct performance of the operation p1105. Furthermore, the receiving information bar code electrical circuitry arrangement ("elec circ arrange") f1105, when activated, will perform the operation p1105. Also, the receiving information bar code module n1105, when executed and/or activated, will direct performance of and/or perform the operation p1105. For instance, in one or more exemplary implementations, the one or more receiving information bar code instructions j1105, when executed, direct performance of the operation p1105 in the illustrative depiction as follows, and/or the receiving information bar code electrical circuitry arrangement f1105, when activated, performs the operation p1105 in the illustrative depiction as follows, and/or the receiving information bar code module n1105, when executed and/or activated, directs performance of and/or performs the operation p1105 in the illustrative depiction as follows, and/or the operation p1105 is otherwise carried out in the illustrative depiction as follows: electronically receiving the user status information regarding the one or more particular individual living beings via bar code communication (e.g. including an implementation of the receiver component s528 is configured to electronically read a bar code label to receive the user status information, etc.).

In one or more implementations, as shown in FIG. 57, operation p11 includes an operation p1106 for electronically receiving the user status information regarding the one or more particular individual living beings via Internet communication. Origination of an illustratively derived receiving information Internet component group can be accomplished through skilled in the art design choice selection of one or more of the above depicted components from one or more of the above depicted subsystems shown in FIG. 16. Components from the receiving information Internet component group can be used in implementing execution of the one or more receiving information Internet instructions j1106 of FIG. 41, can be used in performance of the receiving information Internet electrical circuitry arrangement f1106 of FIG. 42, and/or can be used in otherwise fulfillment of the operation p1106. An exemplary non-transitory signal bearing medium version of the information storage subsystem s200 is depicted in FIG. 41 as bearing the one or more receiving information Internet instructions j1106 that when executed will direct performance of the operation p1106. Furthermore, the receiving information Internet electrical circuitry arrangement ("elec circ arrange") f1106, when activated, will perform the operation p1106. Also, the receiving information Internet module n1106, when executed and/or activated, will direct performance of and/or perform the operation p1106. For instance, in one or more exemplary implementations, the one or more receiving information Internet instructions j1106, when executed, direct performance of the operation p1106 in the illustrative depiction as follows, and/or the receiving information Internet electrical circuitry arrangement f1106, when activated, performs the operation p1106 in the illustrative depiction as follows, and/or the receiving information Internet module n1106, when executed and/or activated, directs performance of and/or performs the operation p1106 in the illustrative depiction as follows, and/or the operation p1106 is otherwise carried out in the illustrative depiction as follows: electronically receiving the user status information regarding the one or more particular individual living beings via Internet communication (e.g. including an implementation of the receiver component s528 is configured to electronically receive through the internet network component s508 the user status information, etc.).

Figure 58:
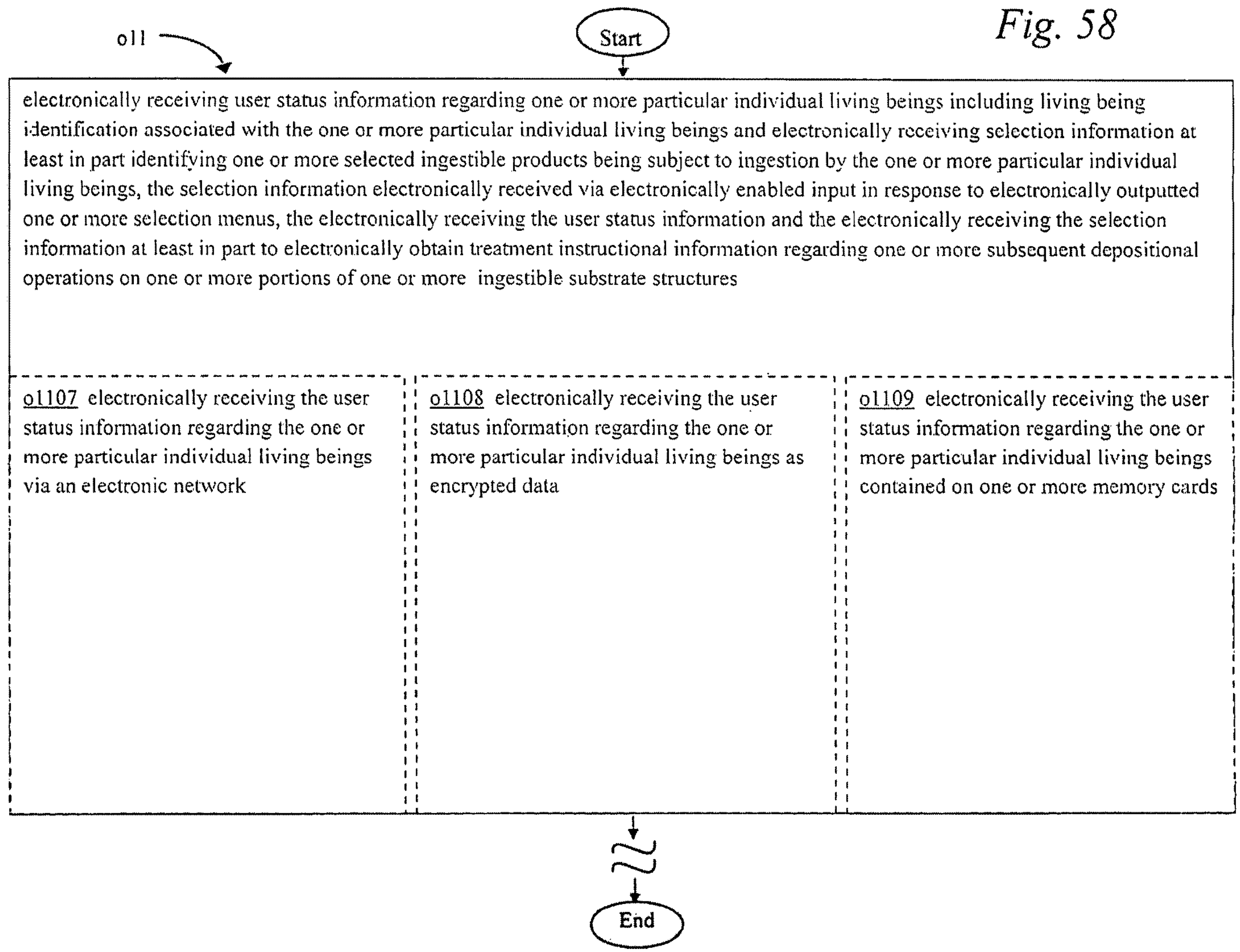
FIG. 58 is a high-level flowchart including exemplary implementations of operation p11 of FIG. 55.

In one or more implementations, as shown in FIG. 58, operation p11 includes an operation p1107 for electronically receiving the user status information regarding the one or more particular individual living beings via an electronic network. Origination of an illustratively derived receiving information network component group can be accomplished through skilled in the art design choice selection of one or more of the above depicted components from one or more of the above depicted subsystems shown in FIG. 16. Components from the receiving information network component group can be used in implementing execution of the one or more receiving information network instructions j1107 of FIG. 41, can be used in performance of the receiving information network electrical circuitry arrangement f1107 of FIG. 42, and/or can be used in otherwise fulfillment of the operation p1107. An exemplary non-transitory signal bearing medium version of the information storage subsystem s200 is depicted in FIG. 41 as bearing the one or more receiving information network instructions j1107 that when executed will direct performance of the operation p1107. Furthermore, the receiving information network electrical circuitry arrangement ("elec circ arrange") f1107, when activated, will perform the operation p1107. Also, the receiving information network module n1107, when executed and/or activated, will direct performance of and/or perform the operation p1107. For instance, in one or more exemplary implementations, the one or more receiving information network instructions j1107, when executed, direct performance of the operation p1107 in the illustrative depiction as follows, and/or the receiving information network electrical circuitry arrangement f1107, when activated, performs the operation p1107 in the illustrative depiction as follows, and/or the receiving information network module n1107, when executed and/or activated, directs performance of and/or performs the operation p1107 in the illustrative depiction as follows, and/or the operation p1107 is otherwise carried out in the illustrative depiction as follows: electronically receiving the user status information regarding the one or more particular individual living beings via an electronic network (e.g. including an implementation of the receiver component s528 is configured to electronically engage with the network cable component s502 to receive the user status information, etc.).

In one or more implementations, as shown in FIG. 58, operation p11 includes an operation p1108 for electronically receiving the user status information regarding the one or more particular individual living beings as encrypted data. Origination of an illustratively derived receiving encrypted information component group can be accomplished through skilled in the art design choice selection of one or more of the above depicted components from one or more of the above depicted subsystems shown in FIG. 16. Components from the receiving encrypted information component group can be used in implementing execution of the one or more receiving encrypted information instructions j1108 of FIG. 41, can be used in performance of the receiving encrypted information electrical circuitry arrangement f1108 of FIG. 42, and/or can be used in otherwise fulfillment of the operation p1108. An exemplary non-transitory signal bearing medium version of the information storage subsystem s200 is depicted in FIG. 41 as bearing the one or more receiving encrypted information instructions j1108 that when executed will direct performance of the operation p1108. Furthermore, the receiving encrypted information electrical circuitry arrangement ("elec circ arrange") f1108, when activated, will perform the operation p1108. Also, the receiving encrypted information module n1108, when executed and/or activated, will direct performance of and/or perform the operation p1108. For instance, in one or more exemplary implementations, the one or more receiving encrypted information instructions j1108, when executed, direct performance of the operation p1108 in the illustrative depiction as follows, and/or the receiving encrypted information electrical circuitry arrangement f1108, when activated, performs the operation p1108 in the illustrative depiction as follows, and/or the receiving encrypted information module n1108, when executed and/or activated, directs performance of and/or performs the operation p1108 in the illustrative depiction as follows, and/or the operation p1108 is otherwise carried out in the illustrative depiction as follows: electronically receiving the user status information regarding the one or more particular individual living beings as encrypted data (e.g. including an implementation of the receiver component s528 is configured to electronically receive through the encrypted communication component s520 the user status information, etc.).

In one or more implementations, as shown in FIG. 58, operation p11 includes an operation p1109 for electronically receiving the user status information regarding the one or more particular individual living beings contained on one or more memory cards. Origination of an illustratively derived receiving information memory card component group can be accomplished through skilled in the art design choice selection of one or more of the above depicted components from one or more of the above depicted subsystems shown in FIG. 16. Components from the receiving information memory card component group can be used in implementing execution of the one or more receiving information memory card instructions j1109 of FIG. 41, can be used in performance of the receiving information memory card electrical circuitry arrangement f1109 of FIG. 42, and/or can be used in otherwise fulfillment of the operation p1109. An exemplary non-transitory signal bearing medium version of the information storage subsystem s200 is depicted in FIG. 41 as bearing the one or more receiving information memory card instructions j1109 that when executed will direct performance of the operation p1109. Furthermore, the receiving information memory card electrical circuitry arrangement ("elec circ arrange") f1109, when activated, will perform the operation p1109. Also, the receiving information memory card module n1109, when executed and/or activated, will direct performance of and/or perform the operation p1109. For instance, in one or more exemplary implementations, the one or more receiving information memory card instructions j1109, when executed, direct performance of the operation p1109 in the illustrative depiction as follows, and/or the receiving information memory card electrical circuitry arrangement f1109, when activated, performs the operation p1109 in the illustrative depiction as follows, and/or the receiving information memory card module n1109, when executed and/or activated, directs performance of and/or performs the operation p1109 in the illustrative depiction as follows, and/or the operation p1109 is otherwise carried out in the illustrative depiction as follows: electronically receiving the user status information regarding the one or more particular individual living beings contained on one or more memory cards (e.g. including an implementation of the receiver component s528 is configured to electronically engage with an electronic memory card to receive the user status information, etc.).

Figure 59:
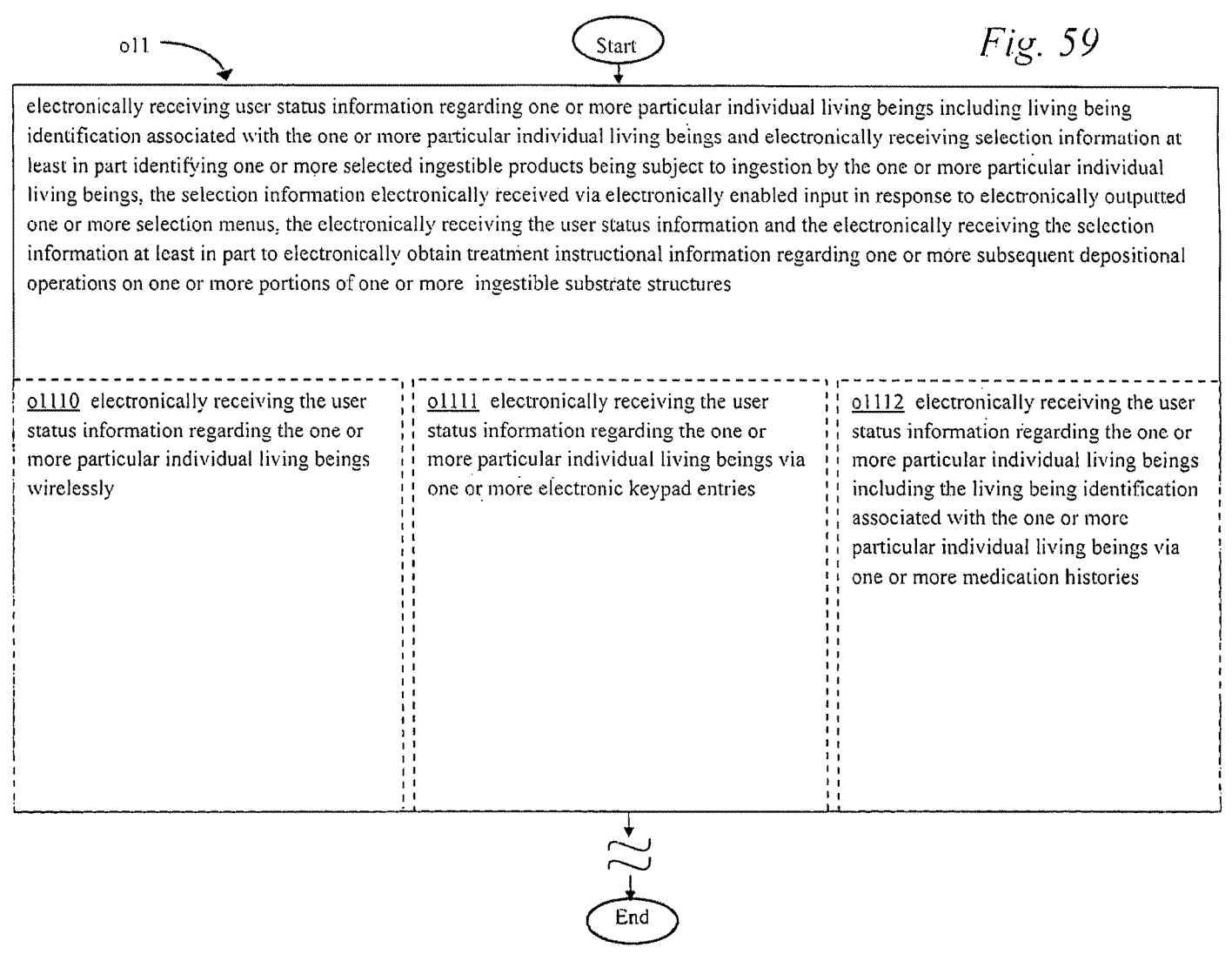

In one or more implementations, as shown in FIG. 59, operation p11 includes an operation p1110 for electronically receiving the user status information regarding the one or more particular individual living beings wirelessly. Origination of an illustratively derived receiving information wirelessly component group can be accomplished through skilled in the art design choice selection of one or more of the above depicted components from one or more of the above depicted subsystems shown in FIG. 16. Components from the receiving information wirelessly component group can be used in implementing execution of the one or more receiving information wirelessly instructions j1110 of FIG. 41, can be used in performance of the receiving information wirelessly electrical circuitry arrangement f1110 of FIG. 42, and/or can be used in otherwise fulfillment of the operation p1110. An exemplary non-transitory signal bearing medium version of the information storage subsystem s200 is depicted in FIG. 41 as bearing the one or more receiving information wirelessly instructions j1110 that when executed will direct performance of the operation p1110. Furthermore, the receiving information wirelessly electrical circuitry arrangement ("elec circ arrange") f1110, when activated, will perform the operation p1110. Also, the receiving information wirelessly module n1110, when executed and/or activated, will direct performance of and/or perform the operation p1110. For instance, in one or more exemplary implementations, the one or more receiving information wirelessly instructions j1110, when executed, direct performance of the operation p1110 in the illustrative depiction as follows, and/or the receiving information wirelessly electrical circuitry arrangement f1110, when activated, performs the operation p1110 in the illustrative depiction as follows, and/or the receiving information wirelessly module n1110, when executed and/or activated, directs performance of and/or performs the operation p1110 in the illustrative depiction as follows, and/or the operation p1110 is otherwise carried out in the illustrative depiction as follows: electronically receiving the user status information regarding the one or more particular individual living beings wirelessly (e.g. including an implementation of the receiver component s528 is configured to electronically receive through the wireless network component s512 the user status information, etc.).

In one or more implementations, as shown in FIG. 59, operation p11 includes an operation p1111 for electronically receiving the user status information regarding the one or more particular individual living beings via one or more electronic keypad entries. Origination of an illustratively derived receiving information keypad entries component group can be accomplished through skilled in the art design choice selection of one or more of the above depicted components from one or more of the above depicted subsystems shown in FIG. 16. Components from the receiving information keypad entries component group can be used in implementing execution of the one or more receiving information keypad entries instructions j1111 of FIG. 41, can be used in performance of the receiving information keypad entries electrical circuitry arrangement f1111 of FIG. 42, and/or can be used in otherwise fulfillment of the operation p1111. An exemplary non-transitory signal bearing medium version of the information storage subsystem s200 is depicted in FIG. 41 as bearing the one or more receiving information keypad entries instructions j1111 that when executed will direct performance of the operation p1111. Furthermore, the receiving information keypad entries electrical circuitry arrangement ("elec circ arrange") f1111, when activated, will perform the operation p1111. Also, the receiving information keypad entries module n1111, when executed and/or activated, will direct performance of and/or perform the operation p1111. For instance, in one or more exemplary implementations, the one or more receiving information keypad entries instructions j1111, when executed, direct performance of the operation p1111 in the illustrative depiction as follows, and/or the receiving information keypad entries electrical circuitry arrangement f1111, when activated, performs the operation p1111 in the illustrative depiction as follows, and/or the receiving information keypad entries module n1111, when executed and/or activated, directs performance of and/or performs the operation p1111 in the illustrative depiction as follows, and/or the operation p1111 is otherwise carried out in the illustrative depiction as follows: electronically receiving the user status information regarding the one or more particular individual living beings via one or more electronic keypad entries (e.g. including an implementation of the receiver component s528 is configured to electronically engage with the keypad component s308 to receive the user status information as inputted by a user, etc.).

In one or more implementations, as shown in FIG. 59, operation p11 includes an operation p1112 for electronically receiving the user status information regarding the one or more particular individual living beings including the living being identification associated with the one or more particular individual living beings via one or more medication histories. Origination of an illustratively derived receiving information meds history component group can be accomplished through skilled in the art design choice selection of one or more of the above depicted components from one or more of the above depicted subsystems shown in FIG. 16. Components from the receiving information meds history component group can be used in implementing execution of the one or more receiving information meds history instructions j1112 of FIG. 41, can be used in performance of the receiving information meds history electrical circuitry arrangement f1112 of FIG. 42, and/or can be used in otherwise fulfillment of the operation p1112. An exemplary non-transitory signal bearing medium version of the information storage subsystem s200 is depicted in FIG. 41 as bearing the one or more receiving information meds history instructions j1112 that when executed will direct performance of the operation p1112. Furthermore, the receiving information meds history electrical circuitry arrangement ("elec circ arrange") f1112, when activated, will perform the operation p1112. Also, the receiving information meds history module n1112, when executed and/or activated, will direct performance of and/or perform the operation p1112. For instance, in one or more exemplary implementations, the one or more receiving information meds history instructions j1112, when executed, direct performance of the operation p1112 in the illustrative depiction as follows, and/or the receiving information meds history electrical circuitry arrangement f1112, when activated, performs the operation p1112 in the illustrative depiction as follows, and/or the receiving information meds history module n1112, when executed and/or activated, directs performance of and/or performs the operation p1112 in the illustrative depiction as follows, and/or the operation p1112 is otherwise carried out in the illustrative depiction as follows: electronically receiving the user status information regarding the one or more particular individual living beings including the living being identification associated with the one or more particular individual living beings via one or more medication histories (e.g. including an implementation of the receiver component s528 is configured to electronically engage with the processor component s102 to receive the user status information including the living being identification associated with the particular individual living being as determined by the processor component to identify the name and control number of the medication history of the particular individual living being, etc.).

Figure 60:
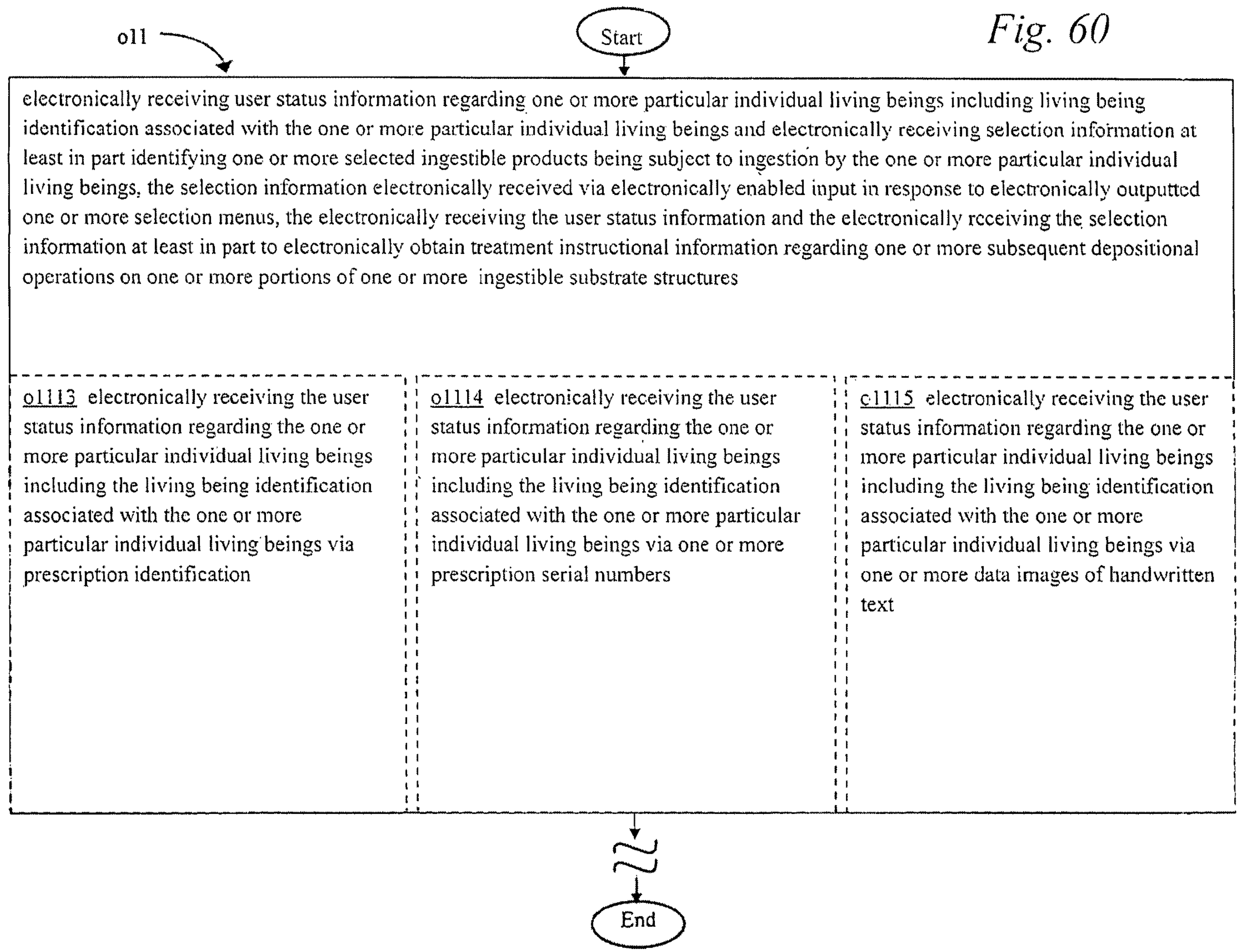
FIG. 60 is a high-level flowchart including exemplary implementations of operation p11 of FIG. 55.

In one or more implementations, as shown in FIG. 60, operation p11 includes an operation p1113 for electronically receiving the user status information regarding the one or more particular individual living beings including the living being identification associated with the one or more particular individual living beings via prescription identification. Origination of an illustratively derived receiving information prescription ID component group can be accomplished through skilled in the art design choice selection of one or more of the above depicted components from one or more of the above depicted subsystems shown in FIG. 16. Components from the receiving information prescription ID component group can be used in implementing execution of the one or more receiving information prescription ID instructions j1113 of FIG. 41, can be used in performance of the receiving information prescription ID electrical circuitry arrangement f1113 of FIG. 42, and/or can be used in otherwise fulfillment of the operation p1113. An exemplary non-transitory signal bearing medium version of the information storage subsystem s200 is depicted in FIG. 41 as bearing the one or more receiving information prescription ID instructions j1113 that when executed will direct performance of the operation p1113. Furthermore, the receiving information prescription ID electrical circuitry arrangement ("elec circ arrange") f1113, when activated, will perform the operation p1113. Also, the receiving information prescription ID module n1113, when executed and/or activated, will direct performance of and/or perform the operation p1113. For instance, in one or more exemplary implementations, the one or more receiving information prescription ID instructions j1113, when executed, direct performance of the operation p1113 in the illustrative depiction as follows, and/or the receiving information prescription ID electrical circuitry arrangement f1113, when activated, performs the operation p1113 in the illustrative depiction as follows, and/or the receiving information prescription ID module n1113, when executed and/or activated, directs performance of and/or performs the operation p1113 in the illustrative depiction as follows, and/or the operation p1113 is otherwise carried out in the illustrative depiction as follows: electronically receiving the user status information regarding the one or more particular individual living beings including the living being identification associated with the one or more particular individual living beings via prescription identification (e.g. including an implementation of the receiver component s528 is configured to electronically engage with the processor component s102 to receive the user status information including the living being identification associated with the particular individual living being as determined by the processor component to include a prescription identification, etc.).

In one or more implementations, as shown in FIG. 60, operation p11 includes an operation p1114 for electronically receiving the user status information regarding the one or more particular individual living beings including the living being identification associated with the one or more particular individual living beings via one or more prescription serial numbers. Origination of an illustratively derived receiving information prescription number component group can be accomplished through skilled in the art design choice selection of one or more of the above depicted components from one or more of the above depicted subsystems shown in FIG. 16. Components from the receiving information prescription number component group can be used in implementing execution of the one or more receiving information prescription number instructions j1114 of FIG. 41, can be used in performance of the receiving information prescription number electrical circuitry arrangement f1114 of FIG. 42, and/or can be used in otherwise fulfillment of the operation p1114. An exemplary non-transitory signal bearing medium version of the information storage subsystem s200 is depicted in FIG. 41 as bearing the one or more receiving information prescription number instructions j1114 that when executed will direct performance of the operation p1114. Furthermore, the receiving information prescription number electrical circuitry arrangement ("elec circ arrange") f1114, when activated, will perform the operation p1114. Also, the receiving information prescription number module n1114, when executed and/or activated, will direct performance of and/or perform the operation p1114. For instance, in one or more exemplary implementations, the one or more receiving information prescription number instructions j1114, when executed, direct performance of the operation p1114 in the illustrative depiction as follows, and/or the receiving information prescription number electrical circuitry arrangement f1114, when activated, performs the operation p1114 in the illustrative depiction as follows, and/or the receiving information prescription number module n1114, when executed and/or activated, directs performance of and/or performs the operation p1114 in the illustrative depiction as follows, and/or the operation p1114 is otherwise carried out in the illustrative depiction as follows: electronically receiving the user status information regarding the one or more particular individual living beings including the living being identification associated with the one or more particular individual living beings via one or more prescription serial numbers (e.g. including an implementation of the receiver component s528 is configured to electronically engage with the processor component s102 to receive the user status information including the living being identification associated with the particular individual living being as determined by the processor component to include a prescription serial number, etc.).

In one or more implementations, as shown in FIG. 60, operation p11 includes an operation p1115 for electronically receiving the user status information regarding the one or more particular individual living beings including the living being identification associated with the one or more particular individual living beings via one or more data images of handwritten text. Origination of an illustratively derived receiving information handwritten component group can be accomplished through skilled in the art design choice selection of one or more of the above depicted components from one or more of the above depicted subsystems shown in FIG. 16. Components from the receiving information handwritten component group can be used in implementing execution of the one or more receiving information handwritten instructions j1115 of FIG. 41, can be used in performance of the receiving information handwritten electrical circuitry arrangement f1115 of FIG. 42, and/or can be used in otherwise fulfillment of the operation p1115. An exemplary non-transitory signal bearing medium version of the information storage subsystem s200 is depicted in FIG. 41 as bearing the one or more receiving information handwritten instructions j1115 that when executed will direct performance of the operation p1115. Furthermore, the receiving information handwritten electrical circuitry arrangement ("elec circ arrange") f1115, when activated, will perform the operation p1115. Also, the receiving information handwritten module n1115, when executed and/or activated, will direct performance of and/or perform the operation p1115. For instance, in one or more exemplary implementations, the one or more receiving information handwritten instructions j1115, when executed, direct performance of the operation p1115 in the illustrative depiction as follows, and/or the receiving information handwritten electrical circuitry arrangement f1115, when activated, performs the operation p1115 in the illustrative depiction as follows, and/or the receiving information handwritten module n1115, when executed and/or activated, directs performance of and/or performs the operation p1115 in the illustrative depiction as follows, and/or the operation p1115 is otherwise carried out in the illustrative depiction as follows: electronically receiving the user status information regarding the one or more particular individual living beings including the living being identification associated with the one or more particular individual living beings via one or more data images of handwritten text (e.g. including an implementation of the receiver component s528 is configured to electronically engage with the processor component s102 to receive the user status information regarding the particular individual living being including the living being identification associated with the particular individual living being as determined by the processor component through electronic handwriting analysis of the data image of the handwritten text, etc.).

Figure 61:
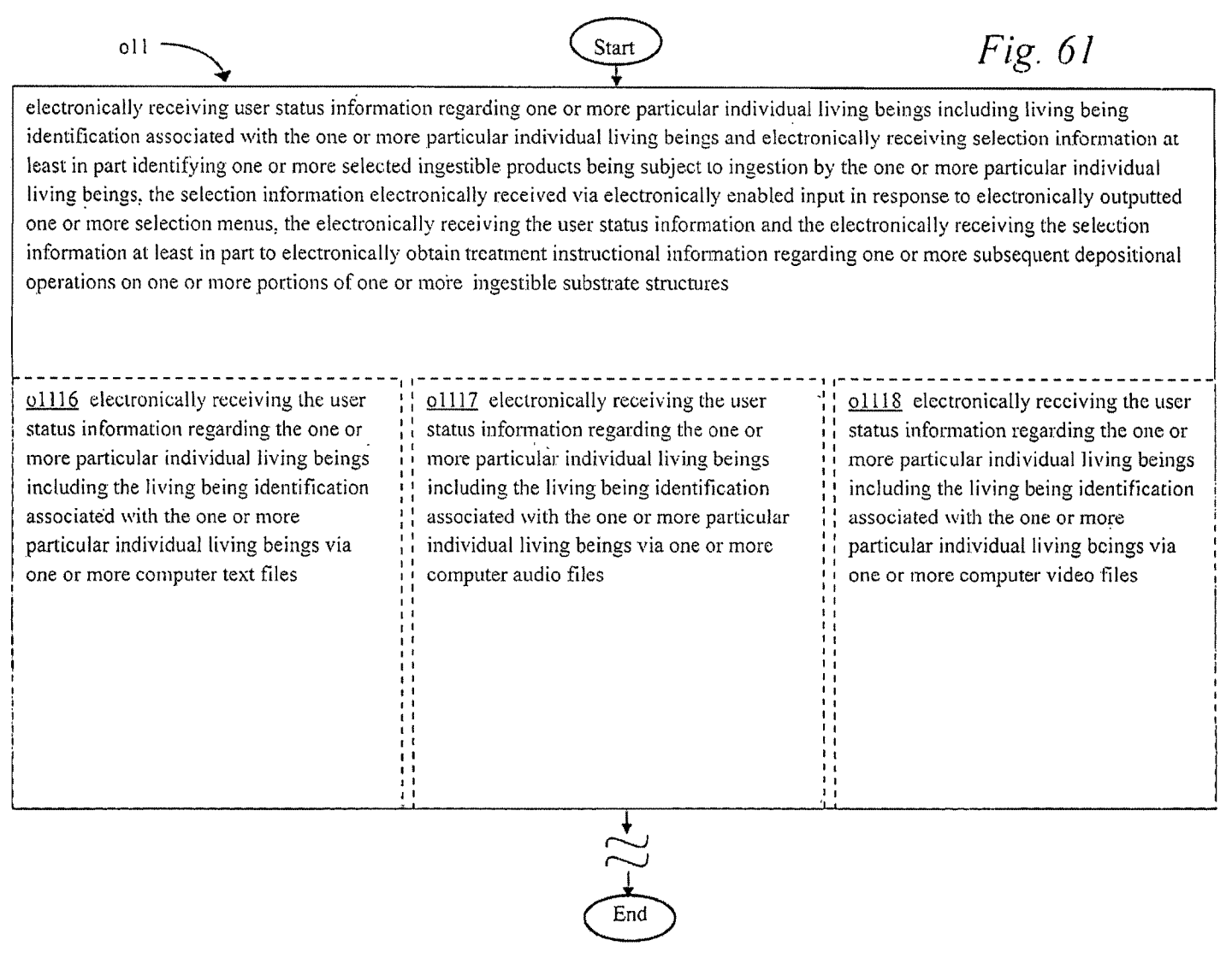

In one or more implementations, as shown in FIG. 61, operation p11 includes an operation p1116 for electronically receiving the user status information regarding the one or more particular individual living beings including the living being identification associated with the one or more particular individual living beings via one or more computer text files. Origination of an illustratively derived receiving information text file component group can be accomplished through skilled in the art design choice selection of one or more of the above depicted components from one or more of the above depicted subsystems shown in FIG. 16. Components from the receiving information text file component group can be used in implementing execution of the one or more receiving information text file instructions j1116 of FIG. 41, can be used in performance of the receiving information text file electrical circuitry arrangement f1116 of FIG. 42, and/or can be used in otherwise fulfillment of the operation p1116. An exemplary non-transitory signal bearing medium version of the information storage subsystem s200 is depicted in FIG. 41 as bearing the one or more receiving information text file instructions j1116 that when executed will direct performance of the operation p1116. Furthermore, the receiving information text file electrical circuitry arrangement ("elec circ arrange") f1116, when activated, will perform the operation p1116. Also, the receiving information text file module n1116, when executed and/or activated, will direct performance of and/or perform the operation p1116. For instance, in one or more exemplary implementations, the one or more receiving information text file instructions j1116, when executed, direct performance of the operation p1116 in the illustrative depiction as follows, and/or the receiving information text file electrical circuitry arrangement f1116, when activated, performs the operation p1116 in the illustrative depiction as follows, and/or the receiving information text file module n1116, when executed and/or activated, directs performance of and/or performs the operation p1116 in the illustrative depiction as follows, and/or the operation p1116 is otherwise carried out in the illustrative depiction as follows: electronically receiving the user status information regarding the one or more particular individual living beings including the living being identification associated with the one or more particular individual living beings via one or more computer text files (e.g. including an implementation of the receiver component s528 is configured to electronically engage with the processor component s102 to receive the user status information including the living being identification associated with the particular individual living being as determined by the processor component through electronic reading of the computer text file, etc.).

In one or more implementations, as shown in FIG. 61, operation p11 includes an operation p1117 for electronically receiving the user status information regarding the one or more particular individual living beings including the living being identification associated with the one or more particular individual living beings via one or more computer audio files. Origination of an illustratively derived receiving information audio file component group can be accomplished through skilled in the art design choice selection of one or more of the above depicted components from one or more of the above depicted subsystems shown in FIG. 16. Components from the receiving information audio file component group can be used in implementing execution of the one or more receiving information audio file instructions j1117 of FIG. 41, can be used in performance of the receiving information audio file electrical circuitry arrangement f1117 of FIG. 42, and/or can be used in otherwise fulfillment of the operation p1117. An exemplary non-transitory signal bearing medium version of the information storage subsystem s200 is depicted in FIG. 41 as bearing the one or more receiving information audio file instructions j1117 that when executed will direct performance of the operation p1117. Furthermore, the receiving information audio file electrical circuitry arrangement ("elec circ arrange") f1117, when activated, will perform the operation p1117. Also, the receiving information audio file module n1117, when executed and/or activated, will direct performance of and/or perform the operation p1117. For instance, in one or more exemplary implementations, the one or more receiving information audio file instructions j1117, when executed, direct performance of the operation p1117 in the illustrative depiction as follows, and/or the receiving information audio file electrical circuitry arrangement f1117, when activated, performs the operation p1117 in the illustrative depiction as follows, and/or the receiving information audio file module n1117, when executed and/or activated, directs performance of and/or performs the operation p1117 in the illustrative depiction as follows, and/or the operation p1117 is otherwise carried out in the illustrative depiction as follows: electronically receiving the user status information regarding the one or more particular individual living beings including the living being identification associated with the one or more particular individual living beings via one or more computer audio files (e.g. including an implementation of the receiver component s528 is configured to electronically engage with the processor component s102 to receive the user status information including the living being identification associated with the particular individual living being as determined by the processor component through electronic reading of the computer audio file, etc.).

In one or more implementations, as shown in FIG. 61, operation p11 includes an operation p1118 for electronically receiving the user status information regarding the one or more particular individual living beings including the living being identification associated with the one or more particular individual living beings via one or more computer video files. Origination of an illustratively derived receiving information video file component group can be accomplished through skilled in the art design choice selection of one or more of the above depicted components from one or more of the above depicted subsystems shown in FIG. 16. Components from the receiving information video file component group can be used in implementing execution of the one or more receiving information video file instructions j1118 of FIG. 41, can be used in performance of the receiving information video file electrical circuitry arrangement f1118 of FIG. 42, and/or can be used in otherwise fulfillment of the operation p1118. An exemplary non-transitory signal bearing medium version of the information storage subsystem s200 is depicted in FIG. 41 as bearing the one or more receiving information video file instructions j1118 that when executed will direct performance of the operation p1118. Furthermore, the receiving information video file electrical circuitry arrangement ("elec circ arrange") f1118, when activated, will perform the operation p1118. Also, the receiving information video file module n1118, when executed and/or activated, will direct performance of and/or perform the operation p1118. For instance, in one or more exemplary implementations, the one or more receiving information video file instructions j1118, when executed, direct performance of the operation p1118 in the illustrative depiction as follows, and/or the receiving information video file electrical circuitry arrangement f1118, when activated, performs the operation p1118 in the illustrative depiction as follows, and/or the receiving information video file module n1118, when executed and/or activated, directs performance of and/or performs the operation p1118 in the illustrative depiction as follows, and/or the operation p1118 is otherwise carried out in the illustrative depiction as follows: electronically receiving the user status information regarding the one or more particular individual living beings including the living being identification associated with the one or more particular individual living beings via one or more computer video files (e.g. including an implementation of the receiver component s528 is configured to electronically engage with the processor component s102 to receive the user status information including the living being identification associated with the particular individual living being as determined by the processor component through electronic reading of the computer video file, etc.).

Figure 62:
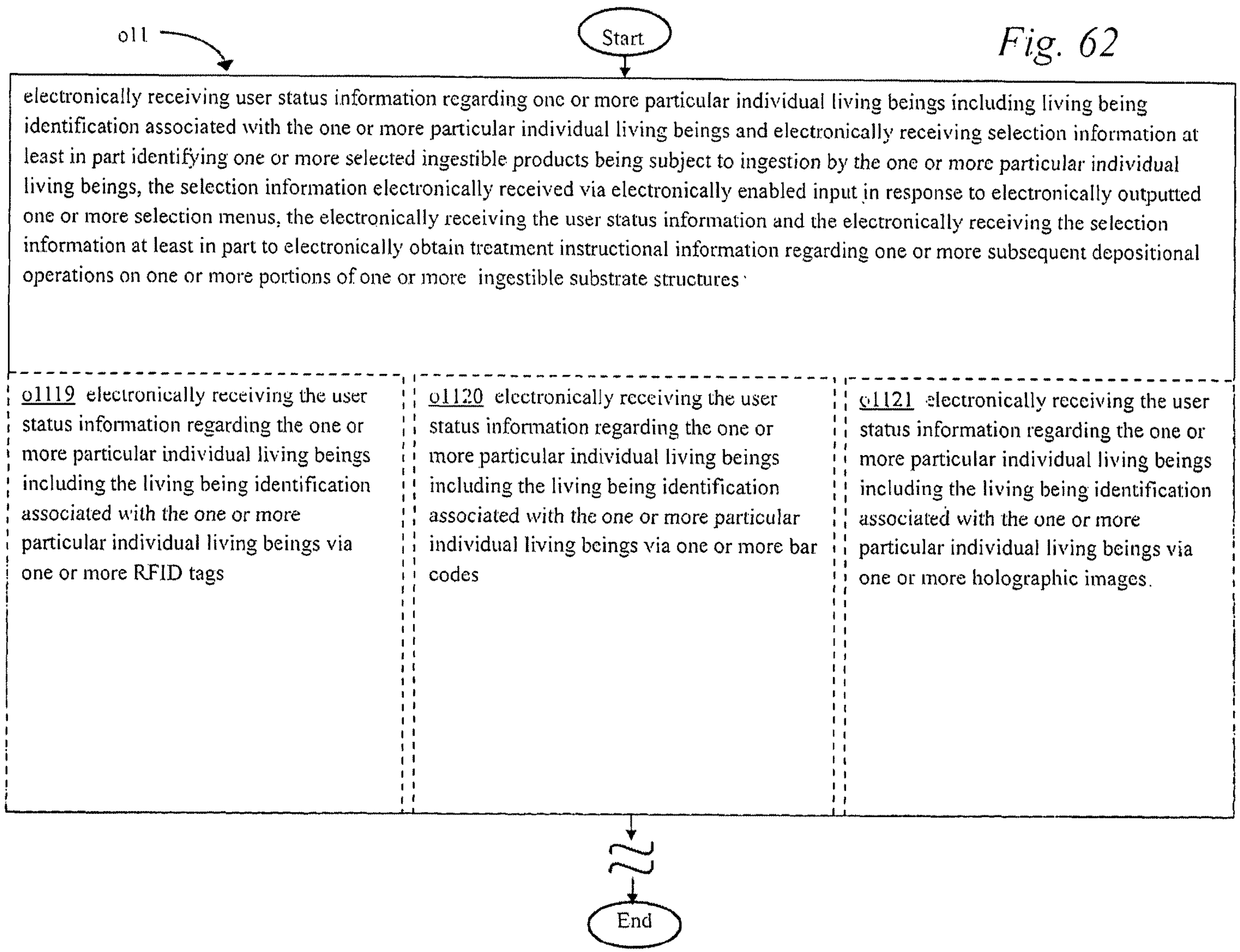
FIG. 62 is a high-level flowchart including exemplary implementations of operation p11 of FIG. 55.

In one or more implementations, as shown in FIG. 62, operation p11 includes an operation p1119 for electronically receiving the user status information regarding the one or more particular individual living beings including the living being identification associated with the one or more particular individual living beings via one or more RFID tags. Origination of an illustratively derived receiving information RFID component group can be accomplished through skilled in the art design choice selection of one or more of the above depicted components from one or more of the above depicted subsystems shown in FIG. 16. Components from the receiving information RFID component group can be used in implementing execution of the one or more receiving information RFID instructions j1119 of FIG. 41, can be used in performance of the receiving information RFID electrical circuitry arrangement f1119 of FIG. 42, and/or can be used in otherwise fulfillment of the operation p1119. An exemplary non-transitory signal bearing medium version of the information storage subsystem s200 is depicted in FIG. 41 as bearing the one or more receiving information RFID instructions j1119 that when executed will direct performance of the operation p1119. Furthermore, the receiving information RFID electrical circuitry arrangement ("elec circ arrange") f1119, when activated, will perform the operation p1119. Also, the receiving information RFID module n1119, when executed and/or activated, will direct performance of and/or perform the operation p1119. For instance, in one or more exemplary implementations, the one or more receiving information RFID instructions j1119, when executed, direct performance of the operation p1119 in the illustrative depiction as follows, and/or the receiving information RFID electrical circuitry arrangement f1119, when activated, performs the operation p1119 in the illustrative depiction as follows, and/or the receiving information RFID module n1119, when executed and/or activated, directs performance of and/or performs the operation p1119 in the illustrative depiction as follows, and/or the operation p1119 is otherwise carried out in the illustrative depiction as follows: electronically receiving the user status information regarding the one or more particular individual living beings including the living being identification associated with the one or more particular individual living beings via one or more RFID tags (e.g. including an implementation of the receiver component s528 is configured to electronically engage with the processor component s102 to receive the user status information including the living being identification associated with the particular individual living being as determined by the processor component through electronic reading be the radio frequency identification (RFID) sensing component s414 of the RFID tag, etc.).

In one or more implementations, as shown in FIG. 62, operation p11 includes an operation p1120 for electronically receiving the user status information regarding the one or more particular individual living beings including the living being identification associated with the one or more particular individual living beings via one or more bar codes. Origination of an illustratively derived receiving information bar code component group can be accomplished through skilled in the art design choice selection of one or more of the above depicted components from one or more of the above depicted subsystems shown in FIG. 16. Components from the receiving information bar code component group can be used in implementing execution of the one or more receiving information bar code instructions j1120 of FIG. 42, can be used in performance of the receiving information bar code electrical circuitry arrangement f1120 of FIG. 43, and/or can be used in otherwise fulfillment of the operation p1120. An exemplary non-transitory signal bearing medium version of the information storage subsystem s200 is depicted in FIG. 42 as bearing the one or more receiving information bar code instructions j1120 that when executed will direct performance of the operation p1120. Furthermore, the receiving information bar code electrical circuitry arrangement ("elec circ arrange") f1120, when activated, will perform the operation p1120. Also, the receiving information bar code module n1120, when executed and/or activated, will direct performance of and/or perform the operation p1120. For instance, in one or more exemplary implementations, the one or more receiving information bar code instructions j1120, when executed, direct performance of the operation p1120 in the illustrative depiction as follows, and/or the receiving information bar code electrical circuitry arrangement f1120, when activated, performs the operation p1120 in the illustrative depiction as follows, and/or the receiving information bar code module n1120, when executed and/or activated, directs performance of and/or performs the operation p1120 in the illustrative depiction as follows, and/or the operation p1120 is otherwise carried out in the illustrative depiction as follows: electronically receiving the user status information regarding the one or more particular individual living beings including the living being identification associated with the one or more particular individual living beings via one or more bar codes (e.g. including an implementation of the receiver component s528 is configured to electronically engage with the processor component s102 to receive the user status information including the living being identification associated with the particular individual living being as determined by the processor component through electronic reading of the bar code, etc.).

In one or more implementations, as shown in FIG. 62, operation p11 includes an operation p1121 for electronically receiving the user status information regarding the one or more particular individual living beings including the living being identification associated with the one or more particular individual living beings via one or more holographic images. Origination of an illustratively derived receiving information holographic component group can be accomplished through skilled in the art design choice selection of one or more of the above depicted components from one or more of the above depicted subsystems shown in FIG. 16. Components from the receiving information holographic component group can be used in implementing execution of the one or more receiving information holographic instructions j1121 of FIG. 42, can be used in performance of the receiving information holographic electrical circuitry arrangement f1121 of FIG. 43, and/or can be used in otherwise fulfillment of the operation p1121. An exemplary non-transitory signal bearing medium version of the information storage subsystem s200 is depicted in FIG. 42 as bearing the one or more receiving information holographic instructions j1121 that when executed will direct performance of the operation p1121. Furthermore, the receiving information holographic electrical circuitry arrangement ("elec circ arrange") f1121, when activated, will perform the operation p1121. Also, the receiving information holographic module n1121, when executed and/or activated, will direct performance of and/or perform the operation p1121. For instance, in one or more exemplary implementations, the one or more receiving information holographic instructions j1121, when executed, direct performance of the operation p1121 in the illustrative depiction as follows, and/or the receiving information holographic electrical circuitry arrangement f1121, when activated, performs the operation p1121 in the illustrative depiction as follows, and/or the receiving information holographic module n1121, when executed and/or activated, directs performance of and/or performs the operation p1121 in the illustrative depiction as follows, and/or the operation p1121 is otherwise carried out in the illustrative depiction as follows: electronically receiving the user status information regarding the one or more particular individual living beings including the living being identification associated with the one or more particular individual living beings via one or more holographic images (e.g. including an implementation of the receiver component s528 is configured to electronically engage with the processor component s102 to receive the user status information including the living being identification associated with the particular individual living being as determined by the processor component through electronic reading of the holographic image, etc.).

Figure 63:
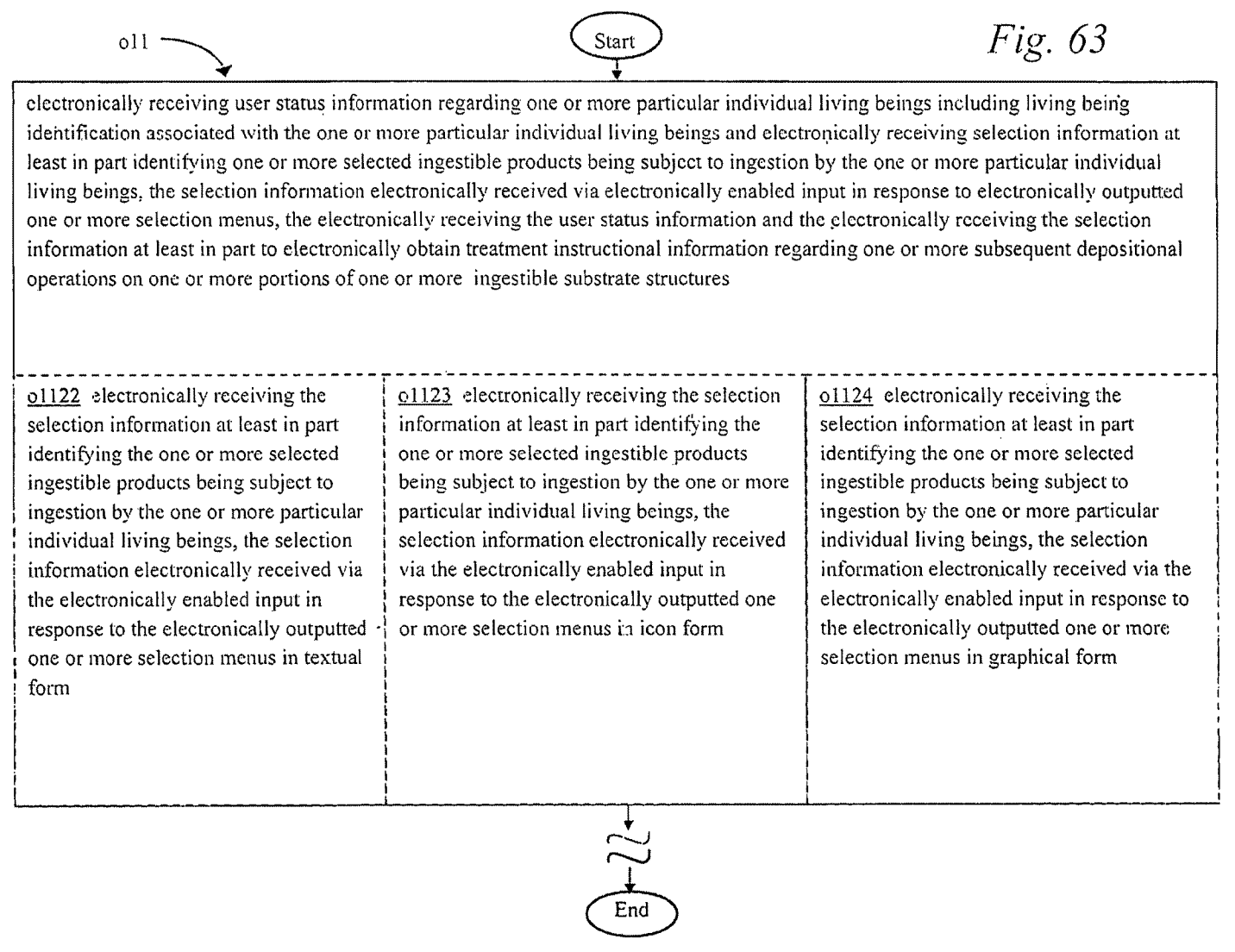

In one or more implementations, as shown in FIG. 63, operation p11 includes an operation p1122 for electronically receiving the selection information at least in part identifying the one or more selected ingestible products being subject to ingestion by the one or more particular individual living beings, the selection information electronically received via the electronically enabled input in response to the electronically outputted one or more selection menus in textual form. Origination of an illustratively derived receiving information textual component group can be accomplished through skilled in the art design choice selection of one or more of the above depicted components from one or more of the above depicted subsystems shown in FIG. 16. Components from the receiving information textual component group can be used in implementing execution of the one or more receiving information textual instructions j1122 of FIG. 42, can be used in performance of the receiving information textual electrical circuitry arrangement f1122 of FIG. 43, and/or can be used in otherwise fulfillment of the operation p1122. An exemplary non-transitory signal bearing medium version of the information storage subsystem s200 is depicted in FIG. 42 as bearing the one or more receiving information textual instructions j1122 that when executed will direct performance of the operation p1122. Furthermore, the receiving information textual electrical circuitry arrangement ("elec circ arrange") f1122, when activated, will perform the operation p1122. Also, the receiving information textual module n1122, when executed and/or activated, will direct performance of and/or perform the operation p1122. For instance, in one or more exemplary implementations, the one or more receiving information textual instructions j1122, when executed, direct performance of the operation p1122 in the illustrative depiction as follows, and/or the receiving information textual electrical circuitry arrangement f1122, when activated, performs the operation p1122 in the illustrative depiction as follows, and/or the receiving information textual module n1122, when executed and/or activated, directs performance of and/or performs the operation p1122 in the illustrative depiction as follows, and/or the operation p1122 is otherwise carried out in the illustrative depiction as follows: electronically receiving the selection information at least in part identifying the one or more selected ingestible products being subject to ingestion by the one or more particular individual living beings, the selection information electronically received via the electronically enabled input in response to the electronically outputted one or more selection menus in textual form (e.g. including an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated allergies, one or more selection menus in textual form, such as a menu containing textual one or more descriptions of possible ingestible product to select from, etc.).

In one or more implementations, as shown in FIG. 63, operation p11 includes an operation p1123 for electronically receiving the selection information at least in part identifying the one or more selected ingestible products being subject to ingestion by the one or more particular individual living beings, the selection information electronically received via the electronically enabled input in response to the electronically outputted one or more selection menus in icon form. Origination of an illustratively derived receiving information icon component group can be accomplished through skilled in the art design choice selection of one or more of the above depicted components from one or more of the above depicted subsystems shown in FIG. 16. Components from the receiving information icon component group can be used in implementing execution of the one or more receiving information icon instructions j1123 of FIG. 42, can be used in performance of the receiving information icon electrical circuitry arrangement f1123 of FIG. 43, and/or can be used in otherwise fulfillment of the operation p1123. An exemplary non-transitory signal bearing medium version of the information storage subsystem s200 is depicted in FIG. 42 as bearing the one or more receiving information icon instructions j1123 that when executed will direct performance of the operation p1123. Furthermore, the receiving information icon electrical circuitry arrangement ("elec circ arrange") f1123, when activated, will perform the operation p1123. Also, the receiving information icon module n1123, when executed and/or activated, will direct performance of and/or perform the operation p1123. For instance, in one or more exemplary implementations, the one or more receiving information icon instructions j1123, when executed, direct performance of the operation p1123 in the illustrative depiction as follows, and/or the receiving information icon electrical circuitry arrangement f1123, when activated, performs the operation p1123 in the illustrative depiction as follows, and/or the receiving information icon module n1123, when executed and/or activated, directs performance of and/or performs the operation p1123 in the illustrative depiction as follows, and/or the operation p1123 is otherwise carried out in the illustrative depiction as follows: electronically receiving the selection information at least in part identifying the one or more selected ingestible products being subject to ingestion by the one or more particular individual living beings, the selection information electronically received via the electronically enabled input in response to the electronically outputted one or more selection menus in icon form (e.g. including an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated previous meals, one or more selection menus in icon form, such as a menu containing iconic one or more descriptions of possible ingestible product to select from, etc.).

In one or more implementations, as shown in FIG. 63, operation p11 includes an operation p1124 for electronically receiving the selection information at least in part identifying the one or more selected ingestible products being subject to ingestion by the one or more particular individual living beings, the selection information electronically received via the electronically enabled input in response to the electronically outputted one or more selection menus in graphical form. Origination of an illustratively derived receiving information graphical component group can be accomplished through skilled in the art design choice selection of one or more of the above depicted components from one or more of the above depicted subsystems shown in FIG. 16. Components from the receiving information graphical component group can be used in implementing execution of the one or more receiving information graphical instructions j1124 of FIG. 42, can be used in performance of the receiving information graphical electrical circuitry arrangement f1124 of FIG. 43, and/or can be used in otherwise fulfillment of the operation p1124. An exemplary non-transitory signal bearing medium version of the information storage subsystem s200 is depicted in FIG. 42 as bearing the one or more receiving information graphical instructions j1124 that when executed will direct performance of the operation p1124. Furthermore, the receiving information graphical electrical circuitry arrangement ("elec circ arrange") f1124, when activated, will perform the operation p1124. Also, the receiving information graphical module n1124, when executed and/or activated, will direct performance of and/or perform the operation p1124. For instance, in one or more exemplary implementations, the one or more receiving information graphical instructions j1124, when executed, direct performance of the operation p1124 in the illustrative depiction as follows, and/or the receiving information graphical electrical circuitry arrangement f1124, when activated, performs the operation p1124 in the illustrative depiction as follows, and/or the receiving information graphical module n1124, when executed and/or activated, directs performance of and/or performs the operation p1124 in the illustrative depiction as follows, and/or the operation p1124 is otherwise carried out in the illustrative depiction as follows: electronically receiving the selection information at least in part identifying the one or more selected ingestible products being subject to ingestion by the one or more particular individual living beings, the selection information electronically received via the electronically enabled input in response to the electronically outputted one or more selection menus in graphical form (e.g. including an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated favorite foods as observed and recorded in a database, one or more selection menus in graphical form, such as a menu containing graphical one or more descriptions of possible ingestible product to select from, etc.).

Figure 64:
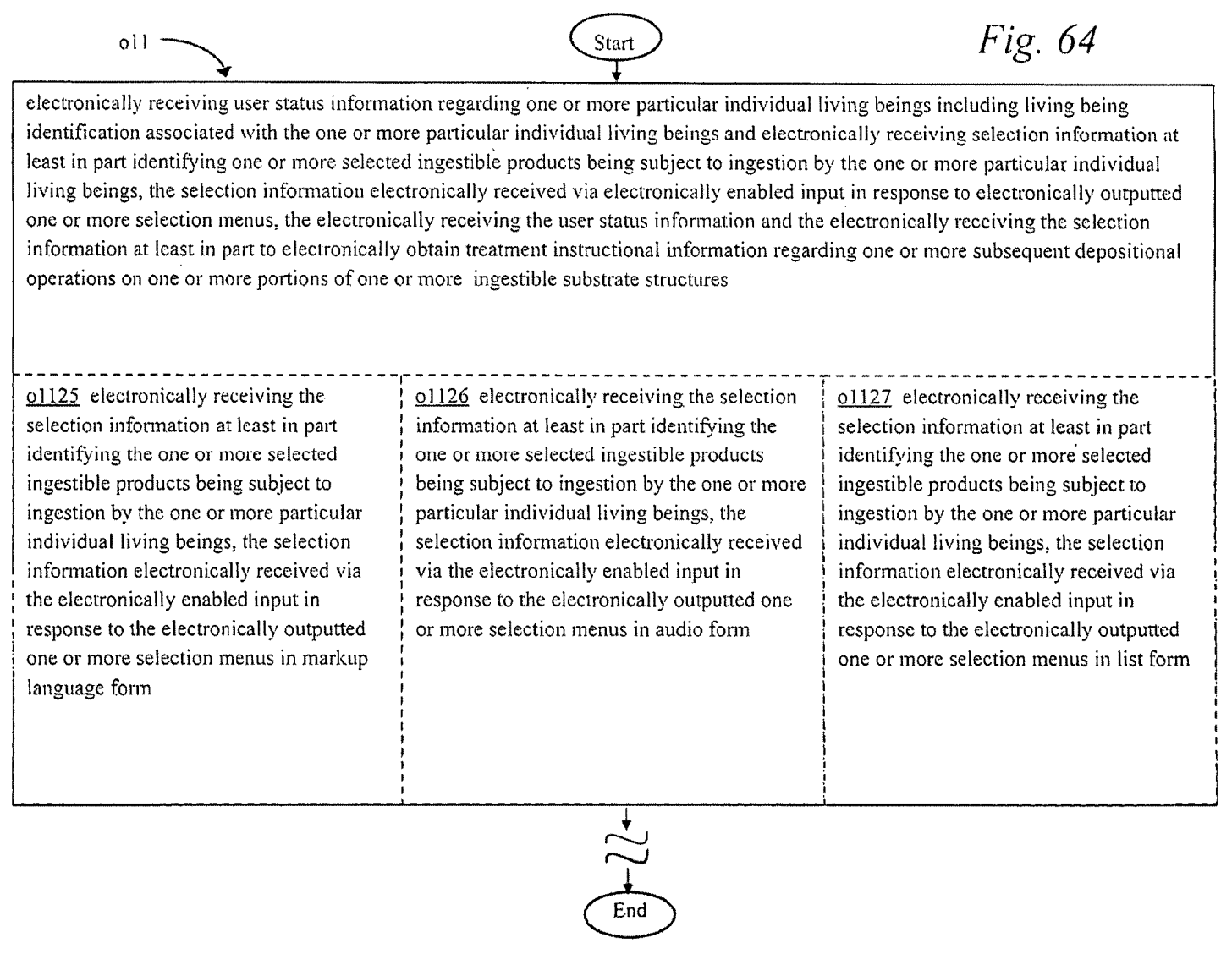

In one or more implementations, as shown in FIG. 64, operation p11 includes an operation p1125 for electronically receiving the selection information at least in part identifying the one or more selected ingestible products being subject to ingestion by the one or more particular individual living beings, the selection information electronically received via the electronically enabled input in response to the electronically outputted one or more selection menus in markup language form. Origination of an illustratively derived receiving information markup component group can be accomplished through skilled in the art design choice selection of one or more of the above depicted components from one or more of the above depicted subsystems shown in FIG. 16. Components from the receiving information markup component group can be used in implementing execution of the one or more receiving information markup instructions j1125 of FIG. 42, can be used in performance of the receiving information markup electrical circuitry arrangement f1125 of FIG. 43, and/or can be used in otherwise fulfillment of the operation p1125. An exemplary non-transitory signal bearing medium version of the information storage subsystem s200 is depicted in FIG. 42 as bearing the one or more receiving information markup instructions j1125 that when executed will direct performance of the operation p1125. Furthermore, the receiving information markup electrical circuitry arrangement ("elec circ arrange") f1125, when activated, will perform the operation p1125. Also, the receiving information markup module n1125, when executed and/or activated, will direct performance of and/or perform the operation p1125. For instance, in one or more exemplary implementations, the one or more receiving information markup instructions j1125, when executed, direct performance of the operation p1125 in the illustrative depiction as follows, and/or the receiving information markup electrical circuitry arrangement f1125, when activated, performs the operation p1125 in the illustrative depiction as follows, and/or the receiving information markup module n1125, when executed and/or activated, directs performance of and/or performs the operation p1125 in the illustrative depiction as follows, and/or the operation p1125 is otherwise carried out in the illustrative depiction as follows: electronically receiving the selection information at least in part identifying the one or more selected ingestible products being subject to ingestion by the one or more particular individual living beings, the selection information electronically received via the electronically enabled input in response to the electronically outputted one or more selection menus in markup language form (e.g. including an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated health building goals, one or more selection menus in markup language form, such as a menu containing markup language one or more descriptions of possible ingestible product to select from, etc.).

In one or more implementations, as shown in FIG. 64, operation p11 includes an operation p1126 for electronically receiving the selection information at least in part identifying the one or more selected ingestible products being subject to ingestion by the one or more particular individual living beings, the selection information electronically received via the electronically enabled input in response to the electronically outputted one or more selection menus in audio form. Origination of an illustratively derived receiving information audio component group can be accomplished through skilled in the art design choice selection of one or more of the above depicted components from one or more of the above depicted subsystems shown in FIG. 16. Components from the receiving information audio component group can be used in implementing execution of the one or more receiving information audio instructions j1126 of FIG. 42, can be used in performance of the receiving information audio electrical circuitry arrangement f1126 of FIG. 43, and/or can be used in otherwise fulfillment of the operation p1126. An exemplary non-transitory signal bearing medium version of the information storage subsystem s200 is depicted in FIG. 42 as bearing the one or more receiving information audio instructions j1126 that when executed will direct performance of the operation p1126. Furthermore, the receiving information audio electrical circuitry arrangement ("elec circ arrange") f1126, when activated, will perform the operation p1126. Also, the receiving information audio module n1126, when executed and/or activated, will direct performance of and/or perform the operation p1126. For instance, in one or more exemplary implementations, the one or more receiving information audio instructions j1126, when executed, direct performance of the operation p1126 in the illustrative depiction as follows, and/or the receiving information audio electrical circuitry arrangement f1126, when activated, performs the operation p1126 in the illustrative depiction as follows, and/or the receiving information audio module n1126, when executed and/or activated, directs performance of and/or performs the operation p1126 in the illustrative depiction as follows, and/or the operation p1126 is otherwise carried out in the illustrative depiction as follows: electronically receiving the selection information at least in part identifying the one or more selected ingestible products being subject to ingestion by the one or more particular individual living beings, the selection information electronically received via the electronically enabled input in response to the electronically outputted one or more selection menus in audio form (e.g. including an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated disease mitigating measures, one or more selection menus in audio form, such as a menu containing audio one or more descriptions of possible ingestible product to select from, etc.).

In one or more implementations, as shown in FIG. 64, operation p11 includes an operation p1127 for electronically receiving the selection information at least in part identifying the one or more selected ingestible products being subject to ingestion by the one or more particular individual living beings, the selection information electronically received via the electronically enabled input in response to the electronically outputted one or more selection menus in list form. Origination of an illustratively derived receiving information list component group can be accomplished through skilled in the art design choice selection of one or more of the above depicted components from one or more of the above depicted subsystems shown in FIG. 16. Components from the receiving information list component group can be used in implementing execution of the one or more receiving information list instructions j1127 of FIG. 42, can be used in performance of the receiving information list electrical circuitry arrangement f1127 of FIG. 43, and/or can be used in otherwise fulfillment of the operation p1127. An exemplary non-transitory signal bearing medium version of the information storage subsystem s200 is depicted in FIG. 42 as bearing the one or more receiving information list instructions j1127 that when executed will direct performance of the operation p1127. Furthermore, the receiving information list electrical circuitry arrangement ("elec circ arrange") f1127, when activated, will perform the operation p1127. Also, the receiving information list module n1127, when executed and/or activated, will direct performance of and/or perform the operation p1127. For instance, in one or more exemplary implementations, the one or more receiving information list instructions j1127, when executed, direct performance of the operation p1127 in the illustrative depiction as follows, and/or the receiving information list electrical circuitry arrangement f1127, when activated, performs the operation p1127 in the illustrative depiction as follows, and/or the receiving information list module n1127, when executed and/or activated, directs performance of and/or performs the operation p1127 in the illustrative depiction as follows, and/or the operation p1127 is otherwise carried out in the illustrative depiction as follows: electronically receiving the selection information at least in part identifying the one or more selected ingestible products being subject to ingestion by the one or more particular individual living beings, the selection information electronically received via the electronically enabled input in response to the electronically outputted one or more selection menus in list form (e.g. including an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated dislikes, one or more selection menus in list form, such as a menu containing listed one or more descriptions of possible ingestible product to select from, etc.).

Figure 65:
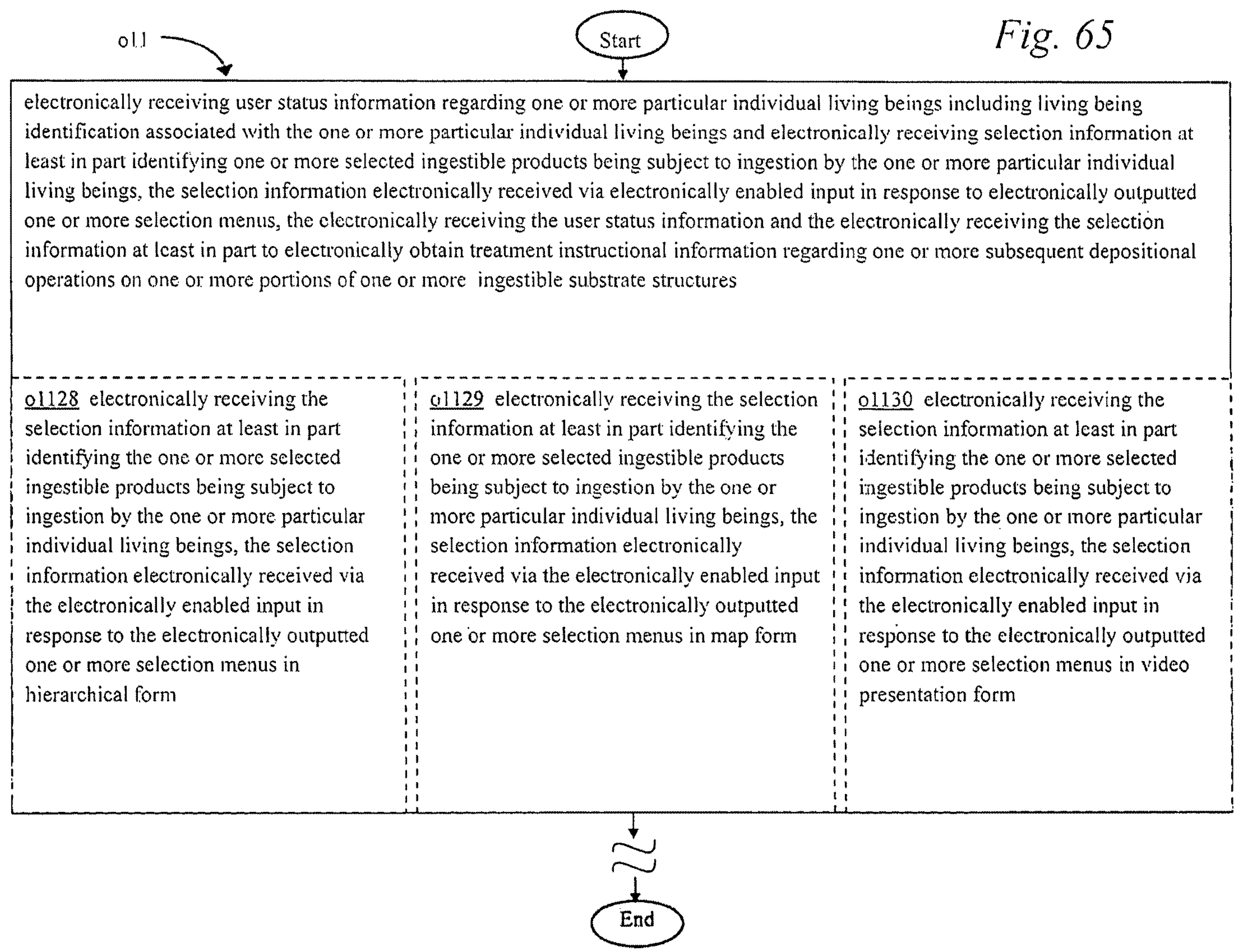
FIG. 65 is a high-level flowchart including exemplary implementations of operation p11 of FIG. 55.

In one or more implementations, as shown in FIG. 65, operation p11 includes an operation p1128 for electronically receiving the selection information at least in part identifying the one or more selected ingestible products being subject to ingestion by the one or more particular individual living beings, the selection information electronically received via the electronically enabled input in response to the electronically outputted one or more selection menus in hierarchical form. Origination of an illustratively derived receiving information hierarchical component group can be accomplished through skilled in the art design choice selection of one or more of the above depicted components from one or more of the above depicted subsystems shown in FIG. 16. Components from the receiving information hierarchical component group can be used in implementing execution of the one or more receiving information hierarchical instructions j1128 of FIG. 42, can be used in performance of the receiving information hierarchical electrical circuitry arrangement f1128 of FIG. 43, and/or can be used in otherwise fulfillment of the operation p1128. An exemplary non-transitory signal bearing medium version of the information storage subsystem s200 is depicted in FIG. 42 as bearing the one or more receiving information hierarchical instructions j1128 that when executed will direct performance of the operation p1128. Furthermore, the receiving information hierarchical electrical circuitry arrangement ("elec circ arrange") f1128, when activated, will perform the operation p1128. Also, the receiving information hierarchical module n1128, when executed and/or activated, will direct performance of and/or perform the operation p1128. For instance, in one or more exemplary implementations, the one or more receiving information hierarchical instructions j1128, when executed, direct performance of the operation p1128 in the illustrative depiction as follows, and/or the receiving information hierarchical electrical circuitry arrangement f1128, when activated, performs the operation p1128 in the illustrative depiction as follows, and/or the receiving information hierarchical module n1128, when executed and/or activated, directs performance of and/or performs the operation p1128 in the illustrative depiction as follows, and/or the operation p1128 is otherwise carried out in the illustrative depiction as follows: electronically receiving the selection information at least in part identifying the one or more selected ingestible products being subject to ingestion by the one or more particular individual living beings, the selection information electronically received via the electronically enabled input in response to the electronically outputted one or more selection menus in hierarchical form (e.g. including an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated past purchases, one or more selection menus in hierarchical form, such as a menu containing hierarchical one or more descriptions of possible ingestible product to select from, etc.).

In one or more implementations, as shown in FIG. 65, operation p11 includes an operation p1129 for electronically receiving the selection information at least in part identifying the one or more selected ingestible products being subject to ingestion by the one or more particular individual living beings, the selection information electronically received via the electronically enabled input in response to the electronically outputted one or more selection menus in map form. Origination of an illustratively derived receiving information map component group can be accomplished through skilled in the art design choice selection of one or more of the above depicted components from one or more of the above depicted subsystems shown in FIG. 16. Components from the receiving information map component group can be used in implementing execution of the one or more receiving information map instructions j1129 of FIG. 42, can be used in performance of the receiving information map electrical circuitry arrangement f1129 of FIG. 43, and/or can be used in otherwise fulfillment of the operation p1129. An exemplary non-transitory signal bearing medium version of the information storage subsystem s200 is depicted in FIG. 42 as bearing the one or more receiving information map instructions j1129 that when executed will direct performance of the operation p1129. Furthermore, the receiving information map electrical circuitry arrangement ("elec circ arrange") f1129, when activated, will perform the operation p1129. Also, the receiving information map module n1129, when executed and/or activated, will direct performance of and/or perform the operation p1129. For instance, in one or more exemplary implementations, the one or more receiving information map instructions j1129, when executed, direct performance of the operation p1129 in the illustrative depiction as follows, and/or the receiving information map electrical circuitry arrangement f1129, when activated, performs the operation p1129 in the illustrative depiction as follows, and/or the receiving information map module n1129, when executed and/or activated, directs performance of and/or performs the operation p1129 in the illustrative depiction as follows, and/or the operation p1129 is otherwise carried out in the illustrative depiction as follows: electronically receiving the selection information at least in part identifying the one or more selected ingestible products being subject to ingestion by the one or more particular individual living beings, the selection information electronically received via the electronically enabled input in response to the electronically outputted one or more selection menus in map form (e.g. including an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated food preferences determined from use history stored in one or more distributed databases, one or more selection menus in map form, such as a menu having arrangements resembling one or more maps containing one or more selections and one or more descriptions of possible ingestible product to select from, etc.).

In one or more implementations, as shown in FIG. 65, operation p11 includes an operation p1130 for electronically receiving the selection information at least in part identifying the one or more selected ingestible products being subject to ingestion by the one or more particular individual living beings, the selection information electronically received via the electronically enabled input in response to the electronically outputted one or more selection menus in video presentation form. Origination of an illustratively derived receiving information presentation component group can be accomplished through skilled in the art design choice selection of one or more of the above depicted components from one or more of the above depicted subsystems shown in FIG. 16. Components from the receiving information presentation component group can be used in implementing execution of the one or more receiving information presentation instructions j1130 of FIG. 42, can be used in performance of the receiving information presentation electrical circuitry arrangement f1130 of FIG. 43, and/or can be used in otherwise fulfillment of the operation p1130. An exemplary non-transitory signal bearing medium version of the information storage subsystem s200 is depicted in FIG. 42 as bearing the one or more receiving information presentation instructions j1130 that when executed will direct performance of the operation p1130. Furthermore, the receiving information presentation electrical circuitry arrangement ("elec circ arrange") f1130, when activated, will perform the operation p1130. Also, the receiving information presentation module n1130, when executed and/or activated, will direct performance of and/or perform the operation p1130. For instance, in one or more exemplary implementations, the one or more receiving information presentation instructions j1130, when executed, direct performance of the operation p1130 in the illustrative depiction as follows, and/or the receiving information presentation electrical circuitry arrangement f1130, when activated, performs the operation p1130 in the illustrative depiction as follows, and/or the receiving information presentation module n1130, when executed and/or activated, directs performance of and/or performs the operation p1130 in the illustrative depiction as follows, and/or the operation p1130 is otherwise carried out in the illustrative depiction as follows: electronically receiving the selection information at least in part identifying the one or more selected ingestible products being subject to ingestion by the one or more particular individual living beings, the selection information electronically received via the electronically enabled input in response to the electronically outputted one or more selection menus in video presentation form (e.g. including an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated one or more prescriptions, one or more selection menus in video presentation form, such as a menu containing one or more video presentations having one or more descriptions of possible ingestible product to select from, etc.).

Figure 66:
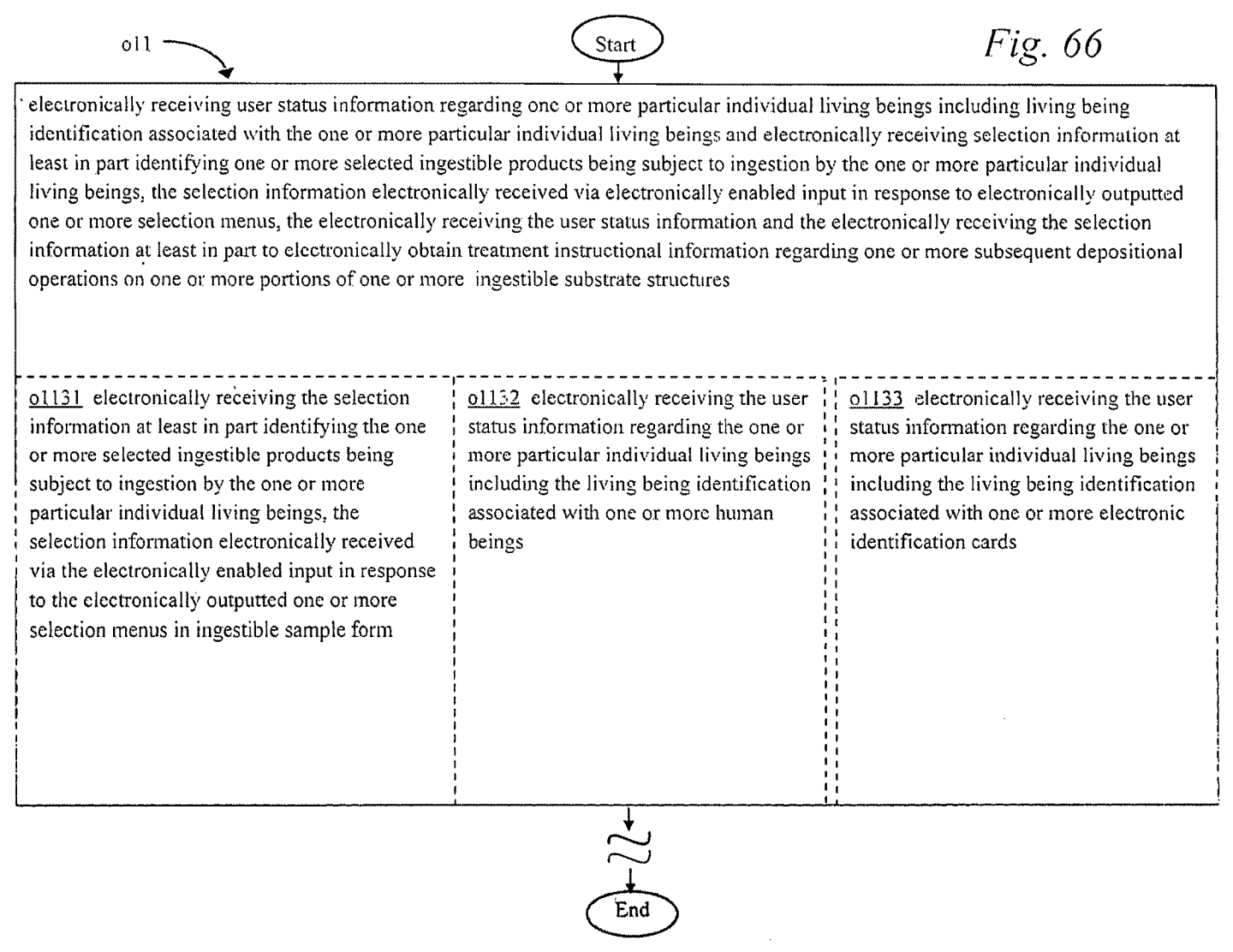

In one or more implementations, as shown in FIG. 66, operation p11 includes an operation p1131 for electronically receiving the selection information at least in part identifying the one or more selected ingestible products being subject to ingestion by the one or more particular individual living beings, the selection information electronically received via the electronically enabled input in response to the electronically outputted one or more selection menus in ingestible sample form. Origination of an illustratively derived receiving information sample component group can be accomplished through skilled in the art design choice selection of one or more of the above depicted components from one or more of the above depicted subsystems shown in FIG. 16. Components from the receiving information sample component group can be used in implementing execution of the one or more receiving information sample instructions j1131 of FIG. 42, can be used in performance of the receiving information sample electrical circuitry arrangement f1131 of FIG. 43, and/or can be used in otherwise fulfillment of the operation p1131. An exemplary non-transitory signal bearing medium version of the information storage subsystem s200 is depicted in FIG. 42 as bearing the one or more receiving information sample instructions j1131 that when executed will direct performance of the operation p1131. Furthermore, the receiving information sample electrical circuitry arrangement ("elec circ arrange") f1131, when activated, will perform the operation p1131. Also, the receiving information sample module n1131, when executed and/or activated, will direct performance of and/or perform the operation p1131. For instance, in one or more exemplary implementations, the one or more receiving information sample instructions j1131, when executed, direct performance of the operation p1131 in the illustrative depiction as follows, and/or the receiving information sample electrical circuitry arrangement f1131, when activated, performs the operation p1131 in the illustrative depiction as follows, and/or the receiving information sample module n1131, when executed and/or activated, directs performance of and/or performs the operation p1131 in the illustrative depiction as follows, and/or the operation p1131 is otherwise carried out in the illustrative depiction as follows: electronically receiving the selection information at least in part identifying the one or more selected ingestible products being subject to ingestion by the one or more particular individual living beings, the selection information electronically received via the electronically enabled input in response to the electronically outputted one or more selection menus in ingestible sample form (e.g. including an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated one or more holidays stored in one or more databases, one or more selection menus in ingestible sample form, such as a menu containing ingestible samples that are either stored or produced in real time to serve as or otherwise complement one or more descriptions of possible ingestible product to select from, etc.).

In one or more implementations, as shown in FIG. 66, operation p11 includes an operation p1132 for electronically receiving the user status information regarding the one or more particular individual living beings including the living being identification associated with one or more human beings. Origination of an illustratively derived receiving information human component group can be accomplished through skilled in the art design choice selection of one or more of the above depicted components from one or more of the above depicted subsystems shown in FIG. 16. Components from the receiving information human component group can be used in implementing execution of the one or more receiving information human instructions j1132 of FIG. 42, can be used in performance of the receiving information human electrical circuitry arrangement f1132 of FIG. 43, and/or can be used in otherwise fulfillment of the operation p1132. An exemplary non-transitory signal bearing medium version of the information storage subsystem s200 is depicted in FIG. 42 as bearing the one or more receiving information human instructions j1132 that when executed will direct performance of the operation p1132. Furthermore, the receiving information human electrical circuitry arrangement ("elec circ arrange") f1132, when activated, will perform the operation p1132. Also, the receiving information human module n1132, when executed and/or activated, will direct performance of and/or perform the operation p1132. For instance, in one or more exemplary implementations, the one or more receiving information human instructions j1132, when executed, direct performance of the operation p1132 in the illustrative depiction as follows, and/or the receiving information human electrical circuitry arrangement f1132, when activated, performs the operation p1132 in the illustrative depiction as follows, and/or the receiving information human module n1132, when executed and/or activated, directs performance of and/or performs the operation p1132 in the illustrative depiction as follows, and/or the operation p1132 is otherwise carried out in the illustrative depiction as follows: electronically receiving the user status information regarding the one or more particular individual living beings including the living being identification associated with one or more human beings (e.g. including an implementation of the receiver component s528 is configured to electronically engage with the processor component s102 to receive the user status information regarding the particular individual living being including living being identification as determined by the processor component to be identifying a human being, etc.).

In one or more implementations, as shown in FIG. 66, operation p11 includes an operation p1133 for electronically receiving the user status information regarding the one or more particular individual living beings including the living being identification associated with one or more electronic identification cards. Origination of an illustratively derived receiving information ID card component group can be accomplished through skilled in the art design choice selection of one or more of the above depicted components from one or more of the above depicted subsystems shown in FIG. 16. Components from the receiving information ID card component group can be used in implementing execution of the one or more receiving information ID card instructions j1133 of FIG. 42, can be used in performance of the receiving information ID card electrical circuitry arrangement f1133 of FIG. 43, and/or can be used in otherwise fulfillment of the operation p1133. An exemplary non-transitory signal bearing medium version of the information storage subsystem s200 is depicted in FIG. 42 as bearing the one or more receiving information ID card instructions j1133 that when executed will direct performance of the operation p1133. Furthermore, the receiving information ID card electrical circuitry arrangement ("elec circ arrange") f1133, when activated, will perform the operation p1133. Also, the receiving information ID card module n1133, when executed and/or activated, will direct performance of and/or perform the operation p1133. For instance, in one or more exemplary implementations, the one or more receiving information ID card instructions j1133, when executed, direct performance of the operation p1133 in the illustrative depiction as follows, and/or the receiving information ID card electrical circuitry arrangement f1133, when activated, performs the operation p1133 in the illustrative depiction as follows, and/or the receiving information ID card module n1133, when executed and/or activated, directs performance of and/or performs the operation p1133 in the illustrative depiction as follows, and/or the operation p1133 is otherwise carried out in the illustrative depiction as follows: electronically receiving the user status information regarding the one or more particular individual living beings including the living being identification associated with one or more electronic identification cards (e.g. including an implementation of the receiver component s528 is configured to electronically engage with the processor component s102 to receive the user status information regarding the particular individual living being including living being identification as determined by the processor component to be identifying a living being through the electronic identification card, etc.).

Figure 67:
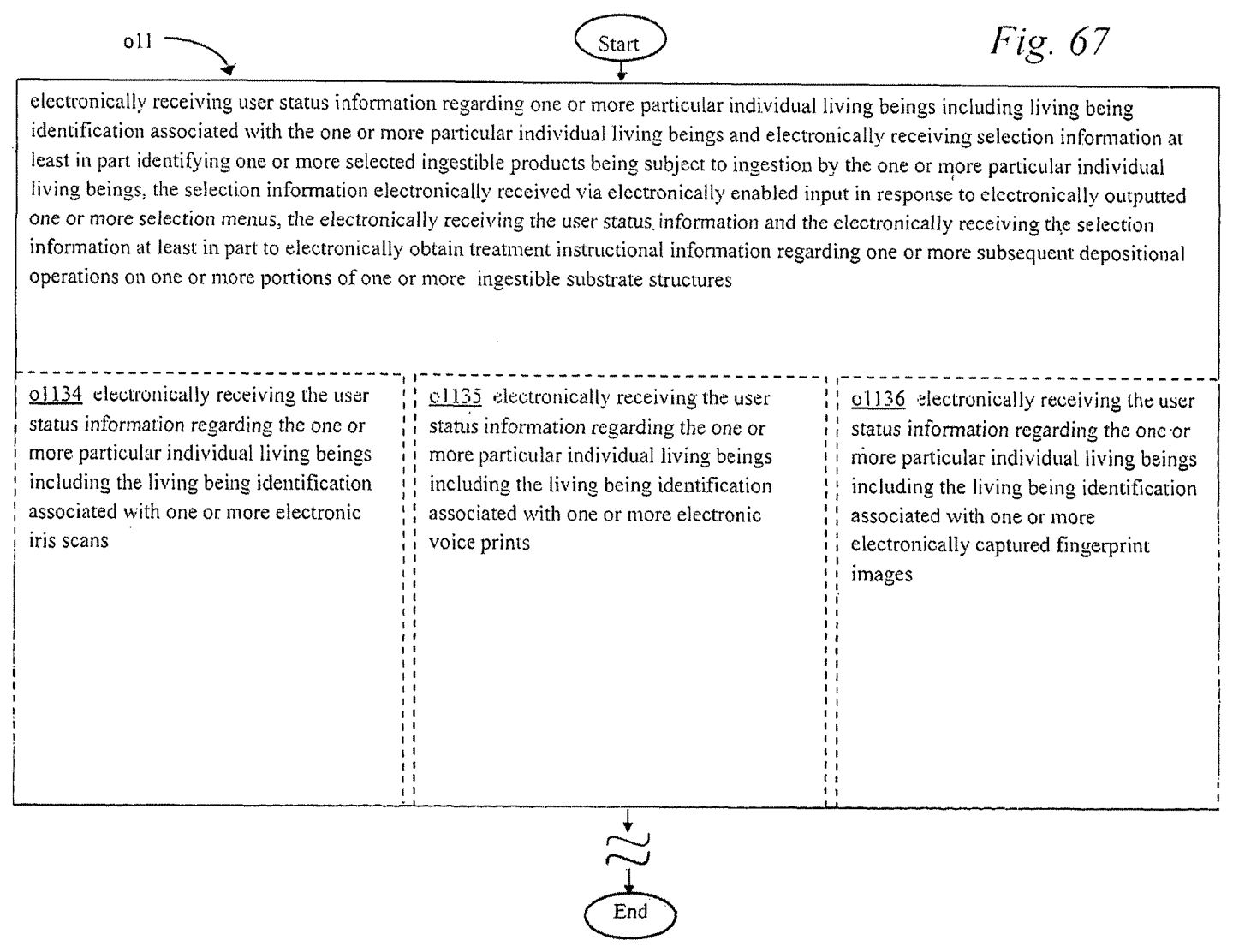

In one or more implementations, as shown in FIG. 67, operation p11 includes an operation p1134 for electronically receiving the user status information regarding the one or more particular individual living beings including the living being identification associated with one or more electronic iris scans. Origination of an illustratively derived receiving information iris scan component group can be accomplished through skilled in the art design choice selection of one or more of the above depicted components from one or more of the above depicted subsystems shown in FIG. 16. Components from the receiving information iris scan component group can be used in implementing execution of the one or more receiving information iris scan instructions j1134 of FIG. 42, can be used in performance of the receiving information iris scan electrical circuitry arrangement f1134 of FIG. 43, and/or can be used in otherwise fulfillment of the operation p1134. An exemplary non-transitory signal bearing medium version of the information storage subsystem s200 is depicted in FIG. 42 as bearing the one or more receiving information iris scan instructions j1134 that when executed will direct performance of the operation p1134. Furthermore, the receiving information iris scan electrical circuitry arrangement ("elec circ arrange") f1134, when activated, will perform the operation p1134. Also, the receiving information iris scan module n1134, when executed and/or activated, will direct performance of and/or perform the operation p1134. For instance, in one or more exemplary implementations, the one or more receiving information iris scan instructions j1134, when executed, direct performance of the operation p1134 in the illustrative depiction as follows, and/or the receiving information iris scan electrical circuitry arrangement f1134, when activated, performs the operation p1134 in the illustrative depiction as follows, and/or the receiving information iris scan module n1134, when executed and/or activated, directs performance of and/or performs the operation p1134 in the illustrative depiction as follows, and/or the operation p1134 is otherwise carried out in the illustrative depiction as follows: electronically receiving the user status information regarding the one or more particular individual living beings including the living being identification associated with one or more electronic iris scans (e.g. including an implementation of the receiver component s528 is configured to electronically engage with the processor component s102 to receive the user status information regarding the particular individual living being including living being identification as determined by the processor component to be identifying the living being through the electronic iris scan, etc.).

In one or more implementations, as shown in FIG. 67, operation p11 includes an operation p1135 for electronically receiving the user status information regarding the one or more particular individual living beings including the living being identification associated with one or more electronic voice prints. Origination of an illustratively derived receiving information voice component group can be accomplished through skilled in the art design choice selection of one or more of the above depicted components from one or more of the above depicted subsystems shown in FIG. 16. Components from the receiving information voice component group can be used in implementing execution of the one or more receiving information voice instructions j1135 of FIG. 42, can be used in performance of the receiving information voice electrical circuitry arrangement f1135 of FIG. 43, and/or can be used in otherwise fulfillment of the operation p1135. An exemplary non-transitory signal bearing medium version of the information storage subsystem s200 is depicted in FIG. 42 as bearing the one or more receiving information voice instructions j1135 that when executed will direct performance of the operation p1135. Furthermore, the receiving information voice electrical circuitry arrangement ("elec circ arrange") f1135, when activated, will perform the operation p1135. Also, the receiving information voice module n1135, when executed and/or activated, will direct performance of and/or perform the operation p1135. For instance, in one or more exemplary implementations, the one or more receiving information voice instructions j1135, when executed, direct performance of the operation p1135 in the illustrative depiction as follows, and/or the receiving information voice electrical circuitry arrangement f1135, when activated, performs the operation p1135 in the illustrative depiction as follows, and/or the receiving information voice module n1135, when executed and/or activated, directs performance of and/or performs the operation p1135 in the illustrative depiction as follows, and/or the operation p1135 is otherwise carried out in the illustrative depiction as follows: electronically receiving the user status information regarding the one or more particular individual living beings including the living being identification associated with one or more electronic voice prints (e.g. including an implementation of the receiver component s528 is configured to electronically engage with the processor component s102 to receive the user status information regarding the particular individual living being including living being identification as determined by the processor component to be identifying the living being through the electronic voice print, etc.).

In one or more implementations, as shown in FIG. 67, operation p11 includes an operation p1136 for electronically receiving the user status information regarding the one or more particular individual living beings including the living being identification associated with one or more electronically captured fingerprint images. Origination of an illustratively derived receiving information fingerprint component group can be accomplished through skilled in the art design choice selection of one or more of the above depicted components from one or more of the above depicted subsystems shown in FIG. 16. Components from the receiving information fingerprint component group can be used in implementing execution of the one or more receiving information fingerprint instructions j1136 of FIG. 42, can be used in performance of the receiving information fingerprint electrical circuitry arrangement f1136 of FIG. 43, and/or can be used in otherwise fulfillment of the operation p1136. An exemplary non-transitory signal bearing medium version of the information storage subsystem s200 is depicted in FIG. 42 as bearing the one or more receiving information fingerprint instructions j1136 that when executed will direct performance of the operation p1136. Furthermore, the receiving information fingerprint electrical circuitry arrangement ("elec circ arrange") f1136, when activated, will perform the operation p1136. Also, the receiving information fingerprint module n1136, when executed and/or activated, will direct performance of and/or perform the operation p1136. For instance, in one or more exemplary implementations, the one or more receiving information fingerprint instructions j1136, when executed, direct performance of the operation p1136 in the illustrative depiction as follows, and/or the receiving information fingerprint electrical circuitry arrangement f1136, when activated, performs the operation p1136 in the illustrative depiction as follows, and/or the receiving information fingerprint module n1136, when executed and/or activated, directs performance of and/or performs the operation p1136 in the illustrative depiction as follows, and/or the operation p1136 is otherwise carried out in the illustrative depiction as follows: electronically receiving the user status information regarding the one or more particular individual living beings including the living being identification associated with one or more electronically captured fingerprint images (e.g. including an implementation of the receiver component s528 is configured to electronically engage with the processor component s102 to receive the user status information regarding the particular individual living being including living being identification as determined by the processor component to be identifying the living being through the electronically captured fingerprint image, etc.).

Figure 68:
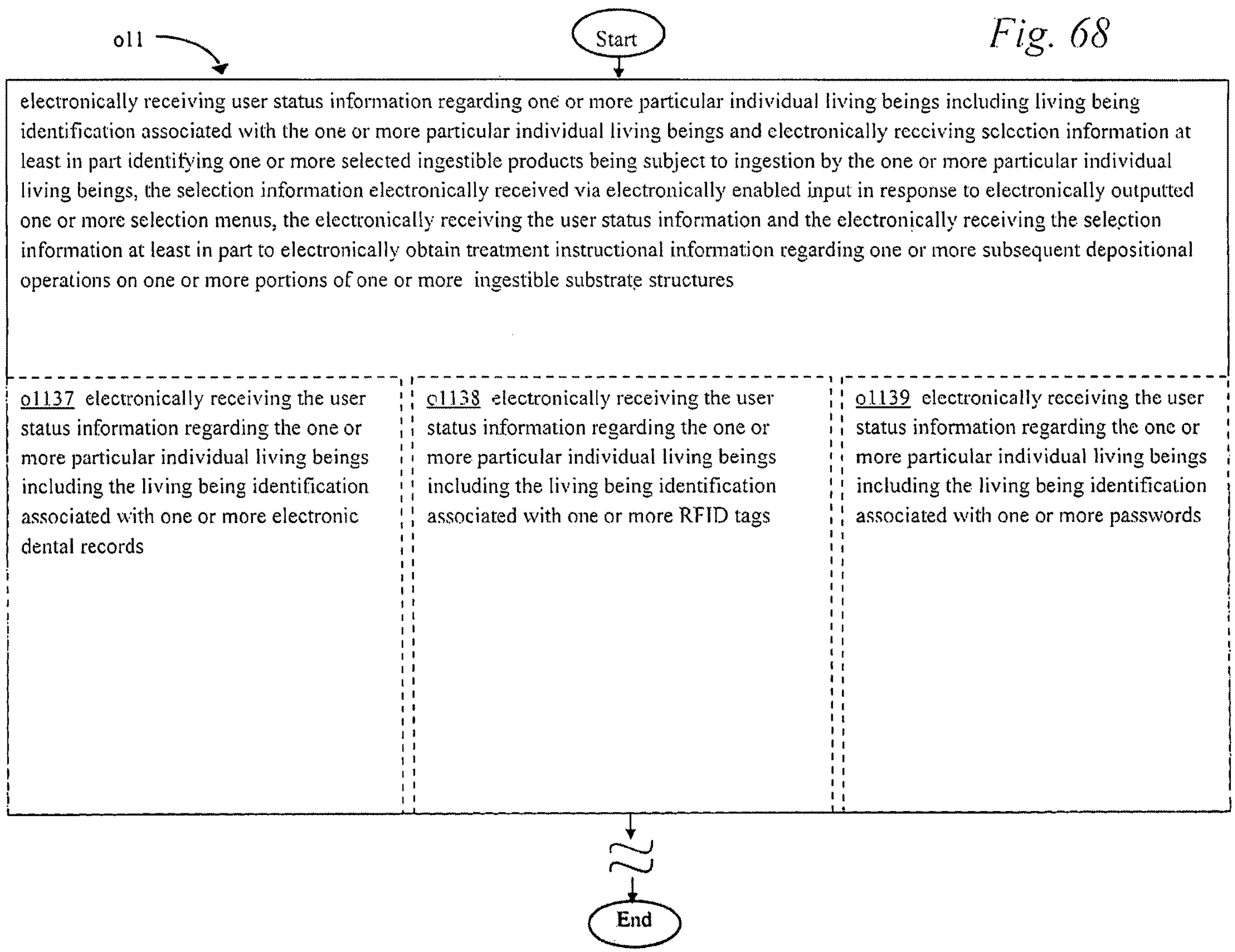
FIG. 68 is a high-level flowchart including exemplary implementations of operation p11 of FIG. 55.

In one or more implementations, as shown in FIG. 68, operation p11 includes an operation p1137 for electronically receiving the user status information regarding the one or more particular individual living beings including the living being identification associated with one or more electronic dental records. Origination of an illustratively derived receiving information dental component group can be accomplished through skilled in the art design choice selection of one or more of the above depicted components from one or more of the above depicted subsystems shown in FIG. 16. Components from the receiving information dental component group can be used in implementing execution of the one or more receiving information dental instructions j1137 of FIG. 42, can be used in performance of the receiving information dental electrical circuitry arrangement f1137 of FIG. 43, and/or can be used in otherwise fulfillment of the operation p1137. An exemplary non-transitory signal bearing medium version of the information storage subsystem s200 is depicted in FIG. 42 as bearing the one or more receiving information dental instructions j1137 that when executed will direct performance of the operation p1137. Furthermore, the receiving information dental electrical circuitry arrangement ("elec circ arrange") f1137, when activated, will perform the operation p1137. Also, the receiving information dental module n1137, when executed and/or activated, will direct performance of and/or perform the operation p1137. For instance, in one or more exemplary implementations, the one or more receiving information dental instructions j1137, when executed, direct performance of the operation p1137 in the illustrative depiction as follows, and/or the receiving information dental electrical circuitry arrangement f1137, when activated, performs the operation p1137 in the illustrative depiction as follows, and/or the receiving information dental module n1137, when executed and/or activated, directs performance of and/or performs the operation p1137 in the illustrative depiction as follows, and/or the operation p1137 is otherwise carried out in the illustrative depiction as follows: electronically receiving the user status information regarding the one or more particular individual living beings including the living being identification associated with one or more electronic dental records (e.g. including an implementation of the receiver component s528 is configured to electronically engage with the processor component s102 to receive the user status information regarding the particular individual living being including living being identification as determined by the processor component to be identifying the living being through the electronic dental records, etc.).

In one or more implementations, as shown in FIG. 68, operation p11 includes an operation p1138 for electronically receiving the user status information regarding the one or more particular individual living beings including the living being identification associated with one or more RFID tags. Origination of an illustratively derived receiving information RFID component group can be accomplished through skilled in the art design choice selection of one or more of the above depicted components from one or more of the above depicted subsystems shown in FIG. 16. Components from the receiving information RFID component group can be used in implementing execution of the one or more receiving information RFID instructions j1138 of FIG. 42, can be used in performance of the receiving information RFID electrical circuitry arrangement f1138 of FIG. 43, and/or can be used in otherwise fulfillment of the operation p1138. An exemplary non-transitory signal bearing medium version of the information storage subsystem s200 is depicted in FIG. 42 as bearing the one or more receiving information RFID instructions j1138 that when executed will direct performance of the operation p1138. Furthermore, the receiving information RFID electrical circuitry arrangement ("elec circ arrange") f1138, when activated, will perform the operation p1138. Also, the receiving information RFID module n1138, when executed and/or activated, will direct performance of and/or perform the operation p1138. For instance, in one or more exemplary implementations, the one or more receiving information RFID instructions j1138, when executed, direct performance of the operation p1138 in the illustrative depiction as follows, and/or the receiving information RFID electrical circuitry arrangement f1138, when activated, performs the operation p1138 in the illustrative depiction as follows, and/or the receiving information RFID module n1138, when executed and/or activated, directs performance of and/or performs the operation p1138 in the illustrative depiction as follows, and/or the operation p1138 is otherwise carried out in the illustrative depiction as follows: electronically receiving the user status information regarding the one or more particular individual living beings including the living being identification associated with one or more RFID tags (e.g. including an implementation of the receiver component s528 is configured to electronically engage with the processor component s102 to receive the user status information regarding the particular individual living being including living being identification as determined by the processor component to be identifying the living being through the RFID tag, etc.).

In one or more implementations, as shown in FIG. 68, operation p11 includes an operation p1139 for electronically receiving the user status information regarding the one or more particular individual living beings including the living being identification associated with one or more passwords. Origination of an illustratively derived receiving information password component group can be accomplished through skilled in the art design choice selection of one or more of the above depicted components from one or more of the above depicted subsystems shown in FIG. 16. Components from the receiving information password component group can be used in implementing execution of the one or more receiving information password instructions j1139 of FIG. 42, can be used in performance of the receiving information password electrical circuitry arrangement f1139 of FIG. 43, and/or can be used in otherwise fulfillment of the operation p1139. An exemplary non-transitory signal bearing medium version of the information storage subsystem s200 is depicted in FIG. 42 as bearing the one or more receiving information password instructions j1139 that when executed will direct performance of the operation p1139. Furthermore, the receiving information password electrical circuitry arrangement ("elec circ arrange") f1139, when activated, will perform the operation p1139. Also, the receiving information password module n1139, when executed and/or activated, will direct performance of and/or perform the operation p1139. For instance, in one or more exemplary implementations, the one or more receiving information password instructions j1139, when executed, direct performance of the operation p1139 in the illustrative depiction as follows, and/or the receiving information password electrical circuitry arrangement f1139, when activated, performs the operation p1139 in the illustrative depiction as follows, and/or the receiving information password module n1139, when executed and/or activated, directs performance of and/or performs the operation p1139 in the illustrative depiction as follows, and/or the operation p1139 is otherwise carried out in the illustrative depiction as follows: electronically receiving the user status information regarding the one or more particular individual living beings including the living being identification associated with one or more passwords (e.g. including an implementation of the receiver component s528 is configured to electronically engage with the processor component s102 to receive the user status information regarding the particular individual living being including living being identification as determined by the processor component to be identifying the living being through the password, etc.).

Figure 69:
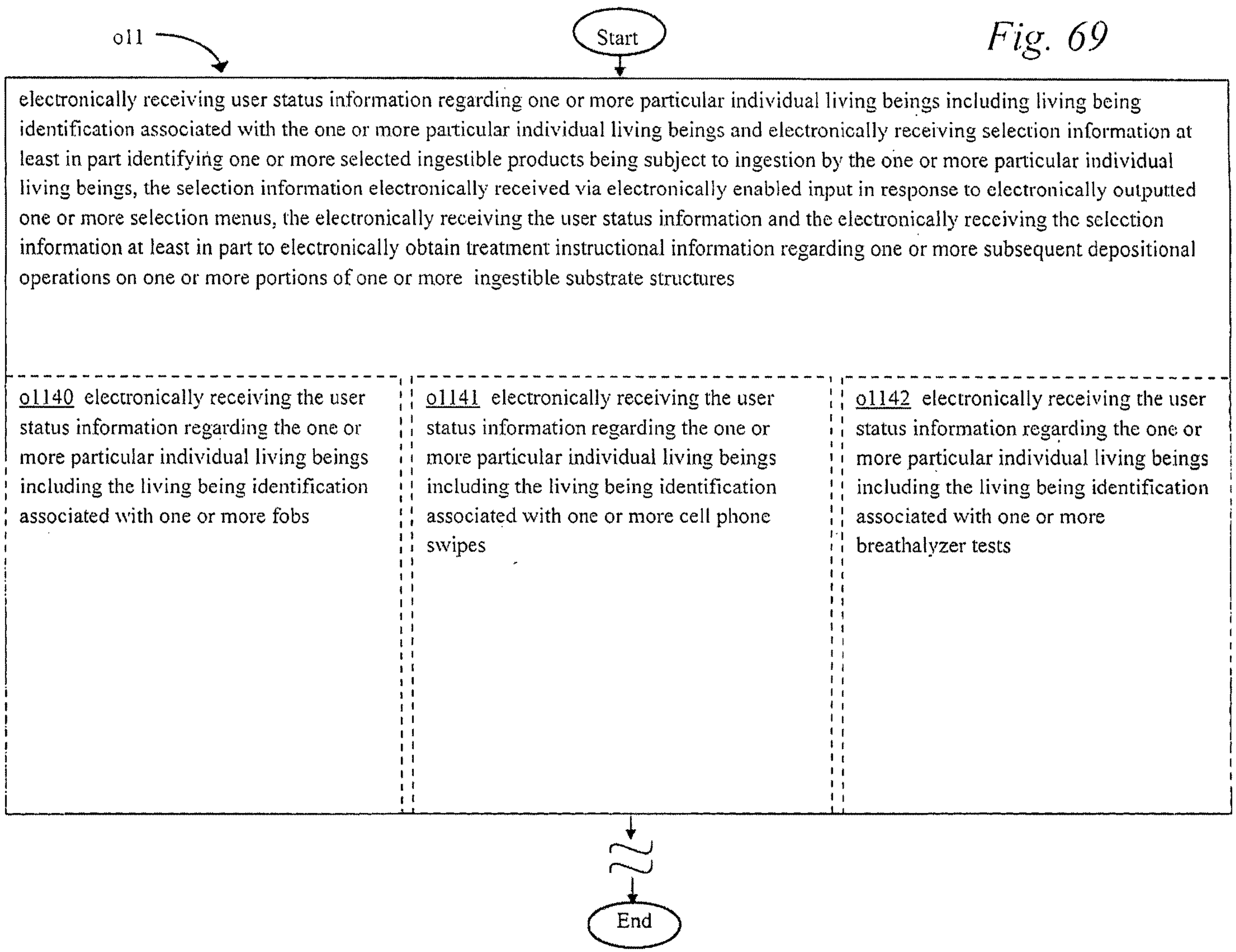
FIG. 69 is a high-level flowchart including exemplary implementations of operation p11 of FIG. 55.

In one or more implementations, as shown in FIG. 69, operation p11 includes an operation p1140 for electronically receiving the user status information regarding the one or more particular individual living beings including the living being identification associated with one or more fobs. Origination of an illustratively derived receiving information fob component group can be accomplished through skilled in the art design choice selection of one or more of the above depicted components from one or more of the above depicted subsystems shown in FIG. 16. Components from the receiving information fob component group can be used in implementing execution of the one or more receiving information fob instructions j1140 of FIG. 43, can be used in performance of the receiving information fob electrical circuitry arrangement f1140 of FIG. 44, and/or can be used in otherwise fulfillment of the operation p1140. An exemplary non-transitory signal bearing medium version of the information storage subsystem s200 is depicted in FIG. 43 as bearing the one or more receiving information fob instructions j1140 that when executed will direct performance of the operation p1140. Furthermore, the receiving information fob electrical circuitry arrangement ("elec circ arrange") f1140, when activated, will perform the operation p1140. Also, the receiving information fob module n1140, when executed and/or activated, will direct performance of and/or perform the operation p1140. For instance, in one or more exemplary implementations, the one or more receiving information fob instructions j1140, when executed, direct performance of the operation p1140 in the illustrative depiction as follows, and/or the receiving information fob electrical circuitry arrangement f1140, when activated, performs the operation p1140 in the illustrative depiction as follows, and/or the receiving information fob module n1140, when executed and/or activated, directs performance of and/or performs the operation p1140 in the illustrative depiction as follows, and/or the operation p1140 is otherwise carried out in the illustrative depiction as follows: electronically receiving the user status information regarding the one or more particular individual living beings including the living being identification associated with one or more fobs (e.g. including an implementation of the receiver component s528 is configured to electronically engage with the processor component s102 to receive the user status information regarding the particular individual living being including living being identification as determined by the processor component to be identifying the living being through electronic data contained on the fob, etc.).

In one or more implementations, as shown in FIG. 69, operation p11 includes an operation p1141 for electronically receiving the user status information regarding the one or more particular individual living beings including the living being identification associated with one or more cell phone swipes. Origination of an illustratively derived receiving information cell phone component group can be accomplished through skilled in the art design choice selection of one or more of the above depicted components from one or more of the above depicted subsystems shown in FIG. 16. Components from the receiving information cell phone component group can be used in implementing execution of the one or more receiving information cell phone instructions j1141 of FIG. 43, can be used in performance of the receiving information cell phone electrical circuitry arrangement f1141 of FIG. 44, and/or can be used in otherwise fulfillment of the operation p1141. An exemplary non-transitory signal bearing medium version of the information storage subsystem s200 is depicted in FIG. 43 as bearing the one or more receiving information cell phone instructions j1141 that when executed will direct performance of the operation p1141. Furthermore, the receiving information cell phone electrical circuitry arrangement ("elec circ arrange") f1141, when activated, will perform the operation p1141. Also, the receiving information cell phone module n1141, when executed and/or activated, will direct performance of and/or perform the operation p1141. For instance, in one or more exemplary implementations, the one or more receiving information cell phone instructions j1141, when executed, direct performance of the operation p1141 in the illustrative depiction as follows, and/or the receiving information cell phone electrical circuitry arrangement f1141, when activated, performs the operation p1141 in the illustrative depiction as follows, and/or the receiving information cell phone module n1141, when executed and/or activated, directs performance of and/or performs the operation p1141 in the illustrative depiction as follows, and/or the operation p1141 is otherwise carried out in the illustrative depiction as follows: electronically receiving the user status information regarding the one or more particular individual living beings including the living being identification associated with one or more cell phone swipes (e.g. including an implementation of the receiver component s528 is configured to electronically engage with the processor component s102 to receive the user status information regarding the particular individual living being including living being identification as determined by the processor component to be identifying the living being through passing the cell phone in close proximity to the cell phone, etc.).

In one or more implementations, as shown in FIG. 69, operation p11 includes an operation p1142 for electronically receiving the user status information regarding the one or more particular individual living beings including the living being identification associated with one or more breathalyzer tests. Origination of an illustratively derived receiving information breathalyzer component group can be accomplished through skilled in the art design choice selection of one or more of the above depicted components from one or more of the above depicted subsystems shown in FIG. 16. Components from the receiving information breathalyzer component group can be used in implementing execution of the one or more receiving information breathalyzer instructions j1142 of FIG. 43, can be used in performance of the receiving information breathalyzer electrical circuitry arrangement f1142 of FIG. 44, and/or can be used in otherwise fulfillment of the operation p1142. An exemplary non-transitory signal bearing medium version of the information storage subsystem s200 is depicted in FIG. 43 as bearing the one or more receiving information breathalyzer instructions j1142 that when executed will direct performance of the operation p1142. Furthermore, the receiving information breathalyzer electrical circuitry arrangement ("elec circ arrange") f1142, when activated, will perform the operation p1142. Also, the receiving information breathalyzer module n1142, when executed and/or activated, will direct performance of and/or perform the operation p1142. For instance, in one or more exemplary implementations, the one or more receiving information breathalyzer instructions j1142, when executed, direct performance of the operation p1142 in the illustrative depiction as follows, and/or the receiving information breathalyzer electrical circuitry arrangement f1142, when activated, performs the operation p1142 in the illustrative depiction as follows, and/or the receiving information breathalyzer module n1142, when executed and/or activated, directs performance of and/or performs the operation p1142 in the illustrative depiction as follows, and/or the operation p1142 is otherwise carried out in the illustrative depiction as follows: electronically receiving the user status information regarding the one or more particular individual living beings including the living being identification associated with one or more breathalyzer tests (e.g. including an implementation of the receiver component s528 is configured to electronically engage with the processor component s102 to receive the user status information regarding the particular individual living being including living being identification as determined by the processor component to be identifying the living being through the breathalyzer test of the living being, etc.).

Figure 70:
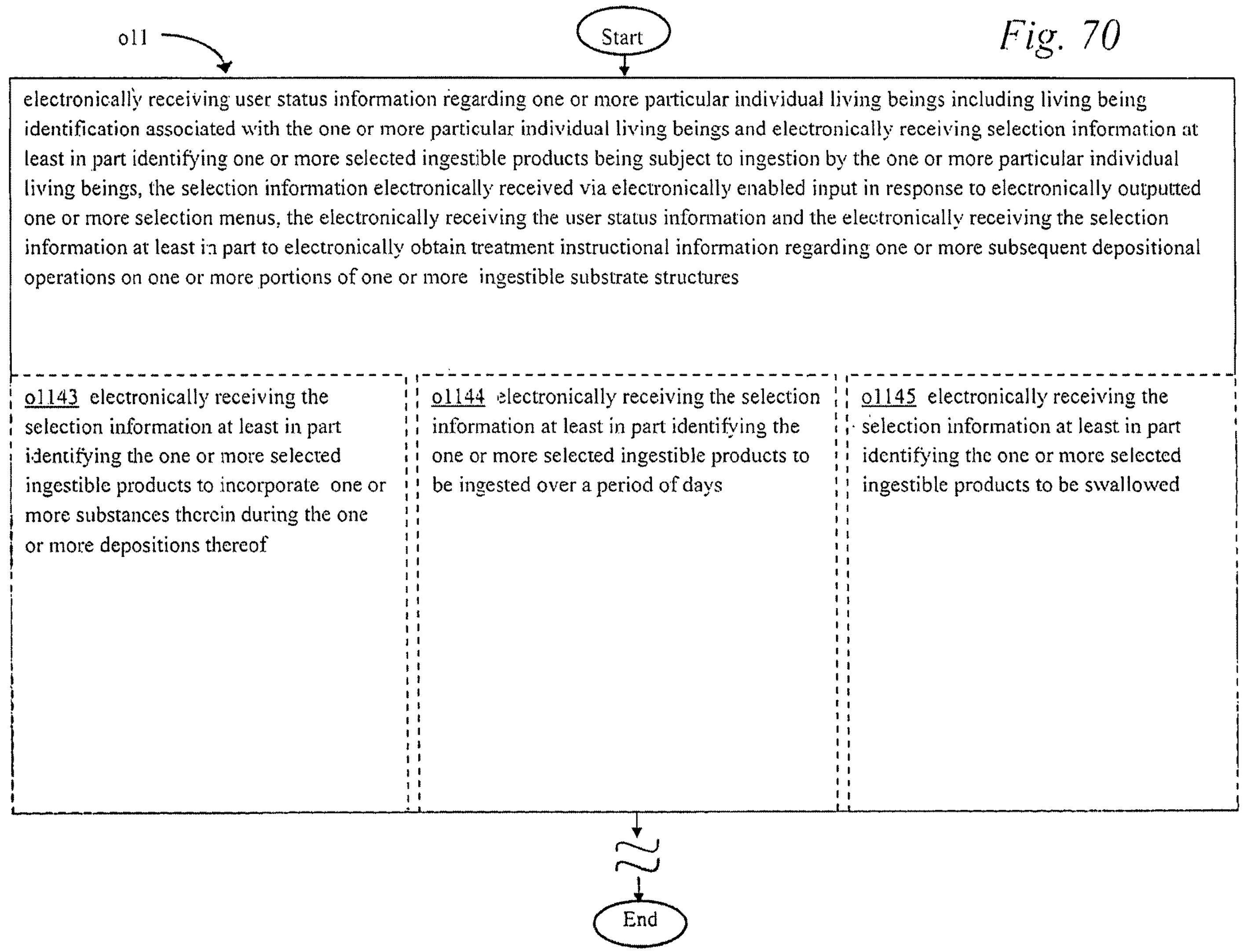
FIG. 70 is a high-level flowchart including exemplary implementations of operation p11 of FIG. 55.

In one or more implementations, as shown in FIG. 70, operation p11 includes an operation p1143 for electronically receiving the selection information at least in part identifying the one or more selected ingestible products to incorporate one or more substances therein during the one or more depositions thereof. Origination of an illustratively derived receiving information incorporate component group can be accomplished through skilled in the art design choice selection of one or more of the above depicted components from one or more of the above depicted subsystems shown in FIG. 16. Components from the receiving information incorporate component group can be used in implementing execution of the one or more receiving information incorporate instructions j1143 of FIG. 43, can be used in performance of the receiving information incorporate electrical circuitry arrangement f1143 of FIG. 44, and/or can be used in otherwise fulfillment of the operation p1143. An exemplary non-transitory signal bearing medium version of the information storage subsystem s200 is depicted in FIG. 43 as bearing the one or more receiving information incorporate instructions j1143 that when executed will direct performance of the operation p1143. Furthermore, the receiving information incorporate electrical circuitry arrangement ("elec circ arrange") f1143, when activated, will perform the operation p1143. Also, the receiving information incorporate module n1143, when executed and/or activated, will direct performance of and/or perform the operation p1143. For instance, in one or more exemplary implementations, the one or more receiving information incorporate instructions j1143, when executed, direct performance of the operation p1143 in the illustrative depiction as follows, and/or the receiving information incorporate electrical circuitry arrangement f1143, when activated, performs the operation p1143 in the illustrative depiction as follows, and/or the receiving information incorporate module n1143, when executed and/or activated, directs performance of and/or performs the operation p1143 in the illustrative depiction as follows, and/or the operation p1143 is otherwise carried out in the illustrative depiction as follows: electronically receiving the selection information at least in part identifying the one or more selected ingestible products to incorporate one or more substances (e.g. including an implementation of the receiver component s528 is configured to electronically receive the selection information and to engage with the processor component s102 to at least in part electronically identify one or more selected ingestible products to incorporate one or more substances such as a sandwich to include the substance as an amino acid incorporated into the sandwich, etc.) therein during the one or more depositions thereof.

In one or more implementations, as shown in FIG. 70, operation p11 includes an operation p1144 for electronically receiving the selection information at least in part identifying the one or more selected ingestible products to be ingested over a period of days. Origination of an illustratively derived receiving information days component group can be accomplished through skilled in the art design choice selection of one or more of the above depicted components from one or more of the above depicted subsystems shown in FIG. 16. Components from the receiving information days component group can be used in implementing execution of the one or more receiving information days instructions j1144 of FIG. 43, can be used in performance of the receiving information days electrical circuitry arrangement f1144 of FIG. 44, and/or can be used in otherwise fulfillment of the operation p1144. An exemplary non-transitory signal bearing medium version of the information storage subsystem s200 is depicted in FIG. 43 as bearing the one or more receiving information days instructions j1144 that when executed will direct performance of the operation p1144. Furthermore, the receiving information days electrical circuitry arrangement ("elec circ arrange") f1144, when activated, will perform the operation p1144. Also, the receiving information days module n1144, when executed and/or activated, will direct performance of and/or perform the operation p1144. For instance, in one or more exemplary implementations, the one or more receiving information days instructions j1144, when executed, direct performance of the operation p1144 in the illustrative depiction as follows, and/or the receiving information days electrical circuitry arrangement f1144, when activated, performs the operation p1144 in the illustrative depiction as follows, and/or the receiving information days module n1144, when executed and/or activated, directs performance of and/or performs the operation p1144 in the illustrative depiction as follows, and/or the operation p1144 is otherwise carried out in the illustrative depiction as follows: electronically receiving the selection information at least in part identifying the one or more selected ingestible products to be ingested over a period of days (e.g. including an implementation of the receiver component s528 is configured to electronically receive the selection information and engage with the processor component s102 to at least in part electronically identify one or more selected ingestible products to be ingested over a period of days such as a smoothie to contain an activator that is designed to interact with a substance, such as a pharmaceutical agent that is encapsulated in pill form to be ingested over a period of days by a living being, such as a boy, at the same time that the smoothie is being ingested by the boy, etc.).

In one or more implementations, as shown in FIG. 70, operation p11 includes an operation p1145 for electronically receiving the selection information at least in part identifying the one or more selected ingestible products to be swallowed. Origination of an illustratively derived receiving information swallow component group can be accomplished through skilled in the art design choice selection of one or more of the above depicted components from one or more of the above depicted subsystems shown in FIG. 16. Components from the receiving information swallow component group can be used in implementing execution of the one or more receiving information swallow instructions j1145 of FIG. 43, can be used in performance of the receiving information swallow electrical circuitry arrangement f1145 of FIG. 44, and/or can be used in otherwise fulfillment of the operation p1145. An exemplary non-transitory signal bearing medium version of the information storage subsystem s200 is depicted in FIG. 43 as bearing the one or more receiving information swallow instructions j1145 that when executed will direct performance of the operation p1145. Furthermore, the receiving information swallow electrical circuitry arrangement ("elec circ arrange") f1145, when activated, will perform the operation p1145. Also, the receiving information swallow module n1145, when executed and/or activated, will direct performance of and/or perform the operation p1145. For instance, in one or more exemplary implementations, the one or more receiving information swallow instructions j1145, when executed, direct performance of the operation p1145 in the illustrative depiction as follows, and/or the receiving information swallow electrical circuitry arrangement f1145, when activated, performs the operation p1145 in the illustrative depiction as follows, and/or the receiving information swallow module n1145, when executed and/or activated, directs performance of and/or performs the operation p1145 in the illustrative depiction as follows, and/or the operation p1145 is otherwise carried out in the illustrative depiction as follows: electronically receiving the selection information at least in part identifying the one or more selected ingestible products to be swallowed (e.g. including an implementation of the receiver component s528 is configured to electronically receive the selection information and engage with the processor component s102 to direct the material processing subsystem s700 to electronically identify the one or more selected ingestible products to be swallowed such as a snack bar, etc.).

Figure 71:
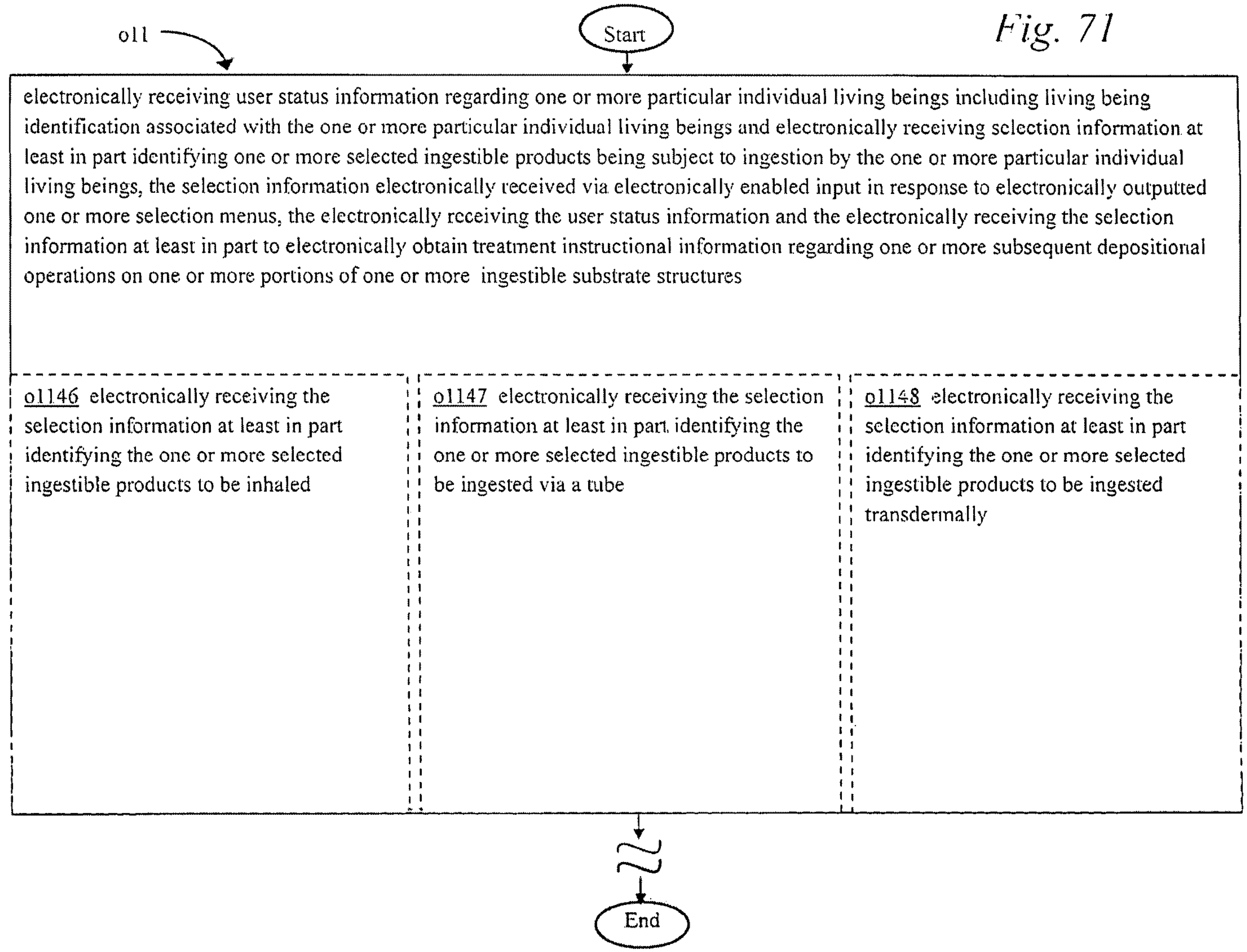
FIG. 71 is a high-level flowchart including exemplary implementations of operation p11 of FIG. 55.

In one or more implementations, as shown in FIG. 71, operation p11 includes an operation p1146 for electronically receiving the selection information at least in part identifying the one or more selected ingestible products to be inhaled. Origination of an illustratively derived receiving information inhaled component group can be accomplished through skilled in the art design choice selection of one or more of the above depicted components from one or more of the above depicted subsystems shown in FIG. 16. Components from the receiving information inhaled component group can be used in implementing execution of the one or more receiving information inhaled instructions j1146 of FIG. 43, can be used in performance of the receiving information inhaled electrical circuitry arrangement f1146 of FIG. 44, and/or can be used in otherwise fulfillment of the operation p1146. An exemplary non-transitory signal bearing medium version of the information storage subsystem s200 is depicted in FIG. 43 as bearing the one or more receiving information inhaled instructions j1146 that when executed will direct performance of the operation p1146. Furthermore, the receiving information inhaled electrical circuitry arrangement ("elec circ arrange") f1146, when activated, will perform the operation p1146. Also, the receiving information inhaled module n1146, when executed and/or activated, will direct performance of and/or perform the operation p1146. For instance, in one or more exemplary implementations, the one or more receiving information inhaled instructions j1146, when executed, direct performance of the operation p1146 in the illustrative depiction as follows, and/or the receiving information inhaled electrical circuitry arrangement f1146, when activated, performs the operation p1146 in the illustrative depiction as follows, and/or the receiving information inhaled module n1146, when executed and/or activated, directs performance of and/or performs the operation p1146 in the illustrative depiction as follows, and/or the operation p1146 is otherwise carried out in the illustrative depiction as follows: electronically receiving the selection information at least in part identifying the one or more selected ingestible products to be inhaled (e.g. including an implementation of the receiver component s528 is configured to electronically receive the selection information and engage with the processor component s102 to direct the material processing subsystem s700 to electronically identify the one or more selected ingestible products to be inhaled such as a medicament dispensed through a nebulizer, etc.).

In one or more implementations, as shown in FIG. 71, operation p11 includes an operation p1147 for electronically receiving the selection information at least in part identifying the one or more selected ingestible products to be ingested via a tube. Origination of an illustratively derived receiving information tube component group can be accomplished through skilled in the art design choice selection of one or more of the above depicted components from one or more of the above depicted subsystems shown in FIG. 16. Components from the receiving information tube component group can be used in implementing execution of the one or more receiving information tube instructions j1147 of FIG. 43, can be used in performance of the receiving information tube electrical circuitry arrangement f1147 of FIG. 44, and/or can be used in otherwise fulfillment of the operation p1147. An exemplary non-transitory signal bearing medium version of the information storage subsystem s200 is depicted in FIG. 43 as bearing the one or more receiving information tube instructions j1147 that when executed will direct performance of the operation p1147. Furthermore, the receiving information tube electrical circuitry arrangement ("elec circ arrange") f1147, when activated, will perform the operation p1147. Also, the receiving information tube module n1147, when executed and/or activated, will direct performance of and/or perform the operation p1147. For instance, in one or more exemplary implementations, the one or more receiving information tube instructions j1147, when executed, direct performance of the operation p1147 in the illustrative depiction as follows, and/or the receiving information tube electrical circuitry arrangement f1147, when activated, performs the operation p1147 in the illustrative depiction as follows, and/or the receiving information tube module n1147, when executed and/or activated, directs performance of and/or performs the operation p1147 in the illustrative depiction as follows, and/or the operation p1147 is otherwise carried out in the illustrative depiction as follows: electronically receiving the selection information at least in part identifying the one or more selected ingestible products to be ingested via a tube (e.g. including an implementation of the receiver component s528 is configured to electronically receive the selection information and engage with the processor component s102 to direct the material processing subsystem s700 to electronically identify at least in part the one or more selected ingestible products to be ingested via a tube such as a liquid meal replacement, etc.).

In one or more implementations, as shown in FIG. 71, operation p11 includes an operation p1148 for electronically receiving the selection information at least in part identifying the one or more selected ingestible products to be ingested transdermally. Origination of an illustratively derived receiving information transdermal component group can be accomplished through skilled in the art design choice selection of one or more of the above depicted components from one or more of the above depicted subsystems shown in FIG. 16. Components from the receiving information transdermal component group can be used in implementing execution of the one or more receiving information transdermal instructions j1148 of FIG. 43, can be used in performance of the receiving information transdermal electrical circuitry arrangement f1148 of FIG. 44, and/or can be used in otherwise fulfillment of the operation p1148. An exemplary non-transitory signal bearing medium version of the information storage subsystem s200 is depicted in FIG. 43 as bearing the one or more receiving information transdermal instructions j1148 that when executed will direct performance of the operation p1148. Furthermore, the receiving information transdermal electrical circuitry arrangement ("elec circ arrange") f1148, when activated, will perform the operation p1148. Also, the receiving information transdermal module n1148, when executed and/or activated, will direct performance of and/or perform the operation p1148. For instance, in one or more exemplary implementations, the one or more receiving information transdermal instructions j1148, when executed, direct performance of the operation p1148 in the illustrative depiction as follows, and/or the receiving information transdermal electrical circuitry arrangement f1148, when activated, performs the operation p1148 in the illustrative depiction as follows, and/or the receiving information transdermal module n1148, when executed and/or activated, directs performance of and/or performs the operation p1148 in the illustrative depiction as follows, and/or the operation p1148 is otherwise carried out in the illustrative depiction as follows: electronically receiving the selection information at least in part identifying the one or more selected ingestible products to be ingested transdermally (e.g. including an implementation of the receiver component s528 is configured to electronically receive the selection information and engage with the processor component s102 to direct the material processing subsystem s700 to at least in part electronically identify the one or more selected ingestible products to be ingested transdermally such as a cream, etc.).

Figure 72:
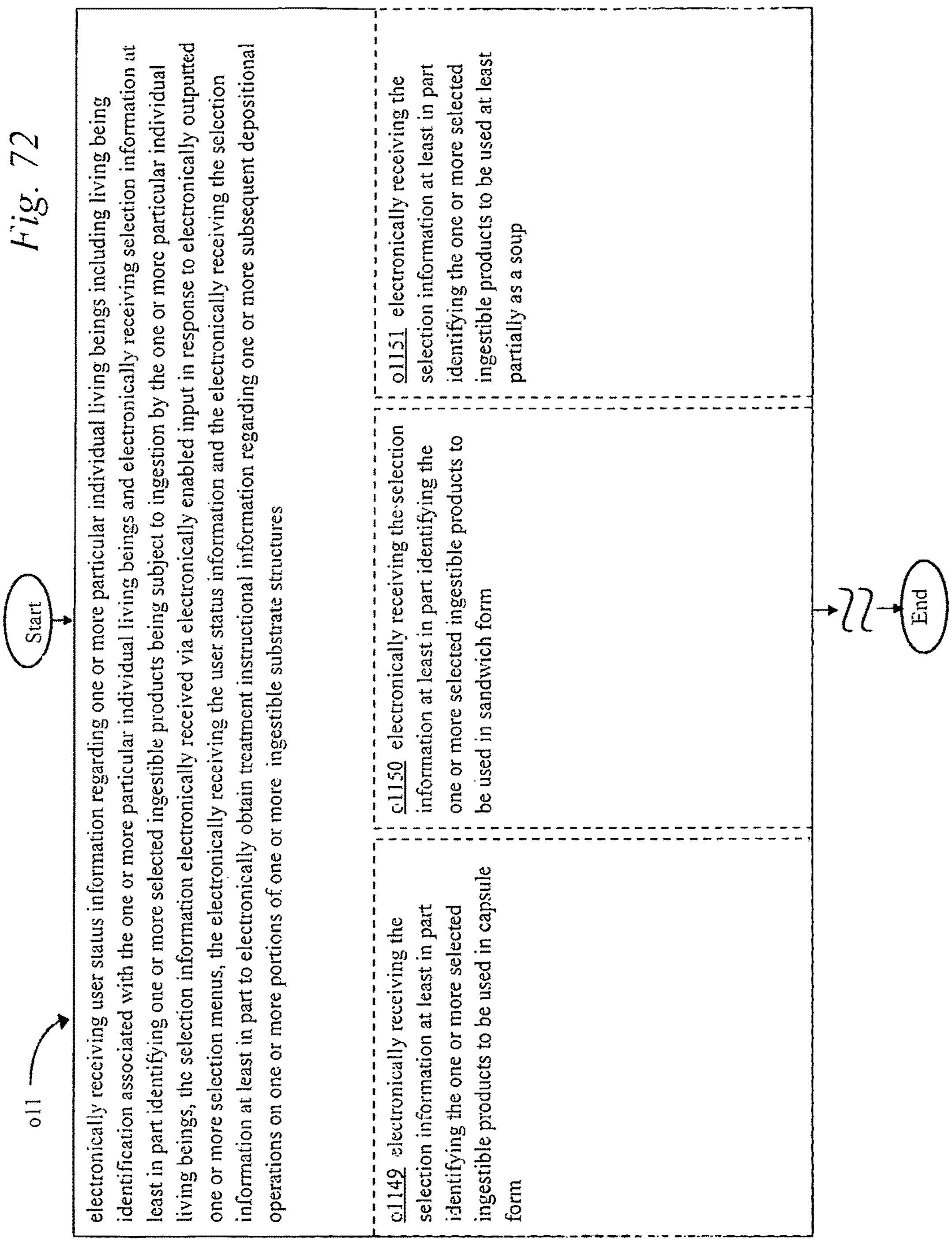
FIG. 72 is a high-level flowchart including exemplary implementations of operation p11 of FIG. 55.

In one or more implementations, as shown in FIG. 72, operation p11 includes an operation p1149 for electronically receiving the selection information at least in part identifying the one or more selected ingestible products to be used in capsule form. Origination of an illustratively derived receiving information capsule component group can be accomplished through skilled in the art design choice selection of one or more of the above depicted components from one or more of the above depicted subsystems shown in FIG. 16. Components from the receiving information capsule component group can be used in implementing execution of the one or more receiving information capsule instructions j1149 of FIG. 43, can be used in performance of the receiving information capsule electrical circuitry arrangement f1149 of FIG. 44, and/or can be used in otherwise fulfillment of the operation p1149. An exemplary non-transitory signal bearing medium version of the information storage subsystem s200 is depicted in FIG. 43 as bearing the one or more receiving information capsule instructions j1149 that when executed will direct performance of the operation p1149. Furthermore, the receiving information capsule electrical circuitry arrangement ("elec circ arrange") f1149, when activated, will perform the operation p1149. Also, the receiving information capsule module n1149, when executed and/or activated, will direct performance of and/or perform the operation p1149. For instance, in one or more exemplary implementations, the one or more receiving information capsule instructions j1149, when executed, direct performance of the operation p1149 in the illustrative depiction as follows, and/or the receiving information capsule electrical circuitry arrangement f1149, when activated, performs the operation p1149 in the illustrative depiction as follows, and/or the receiving information capsule module n1149, when executed and/or activated, directs performance of and/or performs the operation p1149 in the illustrative depiction as follows, and/or the operation p1149 is otherwise carried out in the illustrative depiction as follows: electronically receiving the selection information at least in part identifying the one or more selected ingestible products to be used in capsule form (e.g. including an implementation of the receiver component s528 is configured to electronically receive the selection information and engage with the processor component s102 to direct the material processing subsystem s700 to at least in part electronically generate the one or more selection menus electronically identifying at least in part the one or more selected ingestible products to be used in capsule form, such as through capsules via encapsulation, etc.).

In one or more implementations, as shown in FIG. 72, operation p11 includes an operation p1150 for electronically receiving the selection information at least in part identifying the one or more selected ingestible products to be used in sandwich form. Origination of an illustratively derived receiving information sandwich component group can be accomplished through skilled in the art design choice selection of one or more of the above depicted components from one or more of the above depicted subsystems shown in FIG. 16. Components from the receiving information sandwich component group can be used in implementing execution of the one or more receiving information sandwich instructions j1150 of FIG. 43, can be used in performance of the receiving information sandwich electrical circuitry arrangement f1150 of FIG. 44, and/or can be used in otherwise fulfillment of the operation p1150. An exemplary non-transitory signal bearing medium version of the information storage subsystem s200 is depicted in FIG. 43 as bearing the one or more receiving information sandwich instructions j1150 that when executed will direct performance of the operation p1150. Furthermore, the receiving information sandwich electrical circuitry arrangement ("elec circ arrange") f1150, when activated, will perform the operation p1150. Also, the receiving information sandwich module n1150, when executed and/or activated, will direct performance of and/or perform the operation p1150. For instance, in one or more exemplary implementations, the one or more receiving information sandwich instructions j1150, when executed, direct performance of the operation p1150 in the illustrative depiction as follows, and/or the receiving information sandwich electrical circuitry arrangement f1150, when activated, performs the operation p1150 in the illustrative depiction as follows, and/or the receiving information sandwich module n1150, when executed and/or activated, directs performance of and/or performs the operation p1150 in the illustrative depiction as follows, and/or the operation p1150 is otherwise carried out in the illustrative depiction as follows: electronically receiving the selection information at least in part identifying the one or more selected ingestible products to be used in sandwich form (e.g. including an implementation of the receiver component s528 is configured to electronically receive the selection information and engage with the processor component s102 to at least in part electronically identify the one or more selected ingestible products in sandwich form such as a hamburger, etc.).

In one or more implementations, as shown in FIG. 72, operation p11 includes an operation p1151 for electronically receiving the selection information at least in part identifying the one or more selected ingestible products to be used at least partially as a soup. Origination of an illustratively derived receiving information soup component group can be accomplished through skilled in the art design choice selection of one or more of the above depicted components from one or more of the above depicted subsystems shown in FIG. 16. Components from the receiving information soup component group can be used in implementing execution of the one or more receiving information soup instructions j1151 of FIG. 43, can be used in performance of the receiving information soup electrical circuitry arrangement f1151 of FIG. 44, and/or can be used in otherwise fulfillment of the operation p1151. An exemplary non-transitory signal bearing medium version of the information storage subsystem s200 is depicted in FIG. 43 as bearing the one or more receiving information soup instructions j1151 that when executed will direct performance of the operation p1151. Furthermore, the receiving information soup electrical circuitry arrangement ("elec circ arrange") f1151, when activated, will perform the operation p1151. Also, the receiving information soup module n1151, when executed and/or activated, will direct performance of and/or perform the operation p1151. For instance, in one or more exemplary implementations, the one or more receiving information soup instructions j1151, when executed, direct performance of the operation p1151 in the illustrative depiction as follows, and/or the receiving information soup electrical circuitry arrangement f1151, when activated, performs the operation p1151 in the illustrative depiction as follows, and/or the receiving information soup module n1151, when executed and/or activated, directs performance of and/or performs the operation p1151 in the illustrative depiction as follows, and/or the operation p1151 is otherwise carried out in the illustrative depiction as follows: electronically receiving the selection information at least in part identifying the one or more selected ingestible products to be used at least partially as a soup (e.g. including an implementation of the receiver component s528 is configured to electronically receive the selection information and engage with the processor component s102 to at least in part electronically identify the one or more selected ingestible products to be used as a soup such as tomato soup, etc.).

Figure 73:
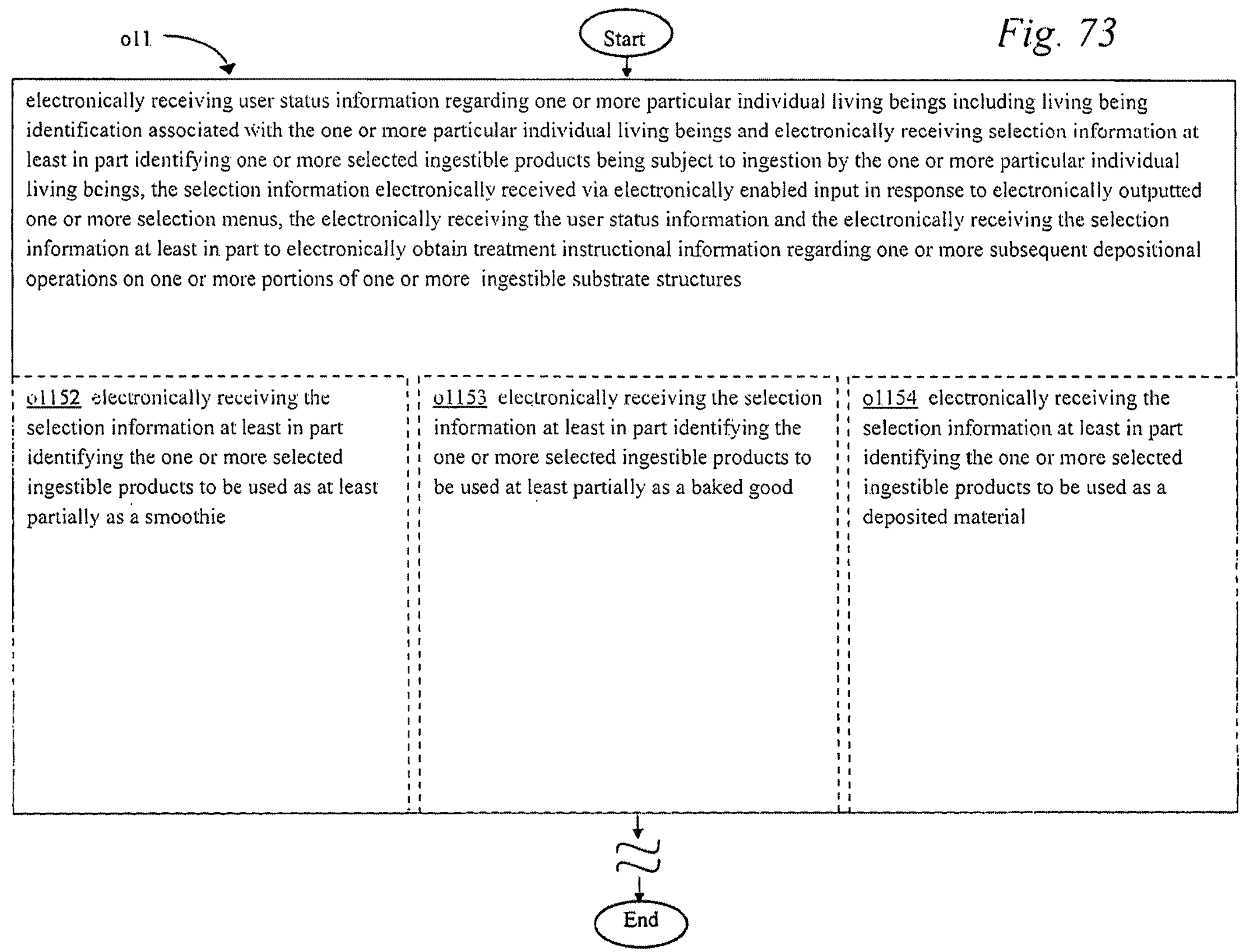
FIG. 73 is a high-level flowchart including exemplary implementations of operation p11 of FIG. 55.

In one or more implementations, as shown in FIG. 73, operation p11 includes an operation p1152 for electronically receiving the selection information at least in part identifying the one or more selected ingestible products to be used as at least partially as a smoothie. Origination of an illustratively derived receiving information smoothie component group can be accomplished through skilled in the art design choice selection of one or more of the above depicted components from one or more of the above depicted subsystems shown in FIG. 16. Components from the receiving information smoothie component group can be used in implementing execution of the one or more receiving information smoothie instructions j1152 of FIG. 43, can be used in performance of the receiving information smoothie electrical circuitry arrangement f1152 of FIG. 44, and/or can be used in otherwise fulfillment of the operation p1152. An exemplary non-transitory signal bearing medium version of the information storage subsystem s200 is depicted in FIG. 43 as bearing the one or more receiving information smoothie instructions j1152 that when executed will direct performance of the operation p1152. Furthermore, the receiving information smoothie electrical circuitry arrangement ("elec circ arrange") f1152, when activated, will perform the operation p1152. Also, the receiving information smoothie module n1152, when executed and/or activated, will direct performance of and/or perform the operation p1152. For instance, in one or more exemplary implementations, the one or more receiving information smoothie instructions j1152, when executed, direct performance of the operation p1152 in the illustrative depiction as follows, and/or the receiving information smoothie electrical circuitry arrangement f1152, when activated, performs the operation p1152 in the illustrative depiction as follows, and/or the receiving information smoothie module n1152, when executed and/or activated, directs performance of and/or performs the operation p1152 in the illustrative depiction as follows, and/or the operation p1152 is otherwise carried out in the illustrative depiction as follows: electronically receiving the selection information at least in part identifying the one or more selected ingestible products to be used as at least partially as a smoothie (e.g. including an implementation of the receiver component s528 is configured to electronically receive the selection information and engage with the processor component s102 to at least in part electronically identify the one or more selected ingestible products to be used a smoothie such as a fruit smoothie, etc.).

In one or more implementations, as shown in FIG. 73, operation p11 includes an operation p1153 for electronically receiving the selection information at least in part identifying the one or more selected ingestible products to be used at least partially as a baked good. Origination of an illustratively derived receiving information baked component group can be accomplished through skilled in the art design choice selection of one or more of the above depicted components from one or more of the above depicted subsystems shown in FIG. 16. Components from the receiving information baked component group can be used in implementing execution of the one or more receiving information baked instructions j1153 of FIG. 43, can be used in performance of the receiving information baked electrical circuitry arrangement f1153 of FIG. 44, and/or can be used in otherwise fulfillment of the operation p1153. An exemplary non-transitory signal bearing medium version of the information storage subsystem s200 is depicted in FIG. 43 as bearing the one or more receiving information baked instructions j1153 that when executed will direct performance of the operation p1153. Furthermore, the receiving information baked electrical circuitry arrangement ("elec circ arrange") f1153, when activated, will perform the operation p1153. Also, the receiving information baked module n1153, when executed and/or activated, will direct performance of and/or perform the operation p1153. For instance, in one or more exemplary implementations, the one or more receiving information baked instructions j1153, when executed, direct performance of the operation p1153 in the illustrative depiction as follows, and/or the receiving information baked electrical circuitry arrangement f1153, when activated, performs the operation p1153 in the illustrative depiction as follows, and/or the receiving information baked module n1153, when executed and/or activated, directs performance of and/or performs the operation p1153 in the illustrative depiction as follows, and/or the operation p1153 is otherwise carried out in the illustrative depiction as follows: electronically receiving the selection information at least in part identifying the one or more selected ingestible products to be used at least partially as a baked good (e.g. including an implementation of the receiver component s528 is configured to electronically receive the selection information and engage with the processor component s102 to at least in part electronically identifying at least in part the one or more selected ingestible products to be used as a baked goods such as a muffin, etc.).

In one or more implementations, as shown in FIG. 73, operation p11 includes an operation p1154 for electronically receiving the selection information at least in part identifying the one or more selected ingestible products to be used as a deposited material. Origination of an illustratively derived receiving information deposited component group can be accomplished through skilled in the art design choice selection of one or more of the above depicted components from one or more of the above depicted subsystems shown in FIG. 16. Components from the receiving information deposited component group can be used in implementing execution of the one or more receiving information deposited instructions j1154 of FIG. 43, can be used in performance of the receiving information deposited electrical circuitry arrangement f1154 of FIG. 44, and/or can be used in otherwise fulfillment of the operation p1154. An exemplary non-transitory signal bearing medium version of the information storage subsystem s200 is depicted in FIG. 43 as bearing the one or more receiving information deposited instructions j1154 that when executed will direct performance of the operation p1154. Furthermore, the receiving information deposited electrical circuitry arrangement ("elec circ arrange") f1154, when activated, will perform the operation p1154. Also, the receiving information deposited module n1154, when executed and/or activated, will direct performance of and/or perform the operation p1154. For instance, in one or more exemplary implementations, the one or more receiving information deposited instructions j1154, when executed, direct performance of the operation p1154 in the illustrative depiction as follows, and/or the receiving information deposited electrical circuitry arrangement f1154, when activated, performs the operation p1154 in the illustrative depiction as follows, and/or the receiving information deposited module n1154, when executed and/or activated, directs performance of and/or performs the operation p1154 in the illustrative depiction as follows, and/or the operation p1154 is otherwise carried out in the illustrative depiction as follows: electronically receiving the selection information at least in part identifying the one or more selected ingestible products to be used as a deposited material (e.g. including an implementation of the receiver component s528 is configured to electronically receive the selection information and engage with the processor component s102 to direct the material processing subsystem s700 to at least in part electronically identify at least in part the one or more selected ingestible products to be used as a deposited material such as frosting on a multi-layered cake, etc.).

Figure 74:
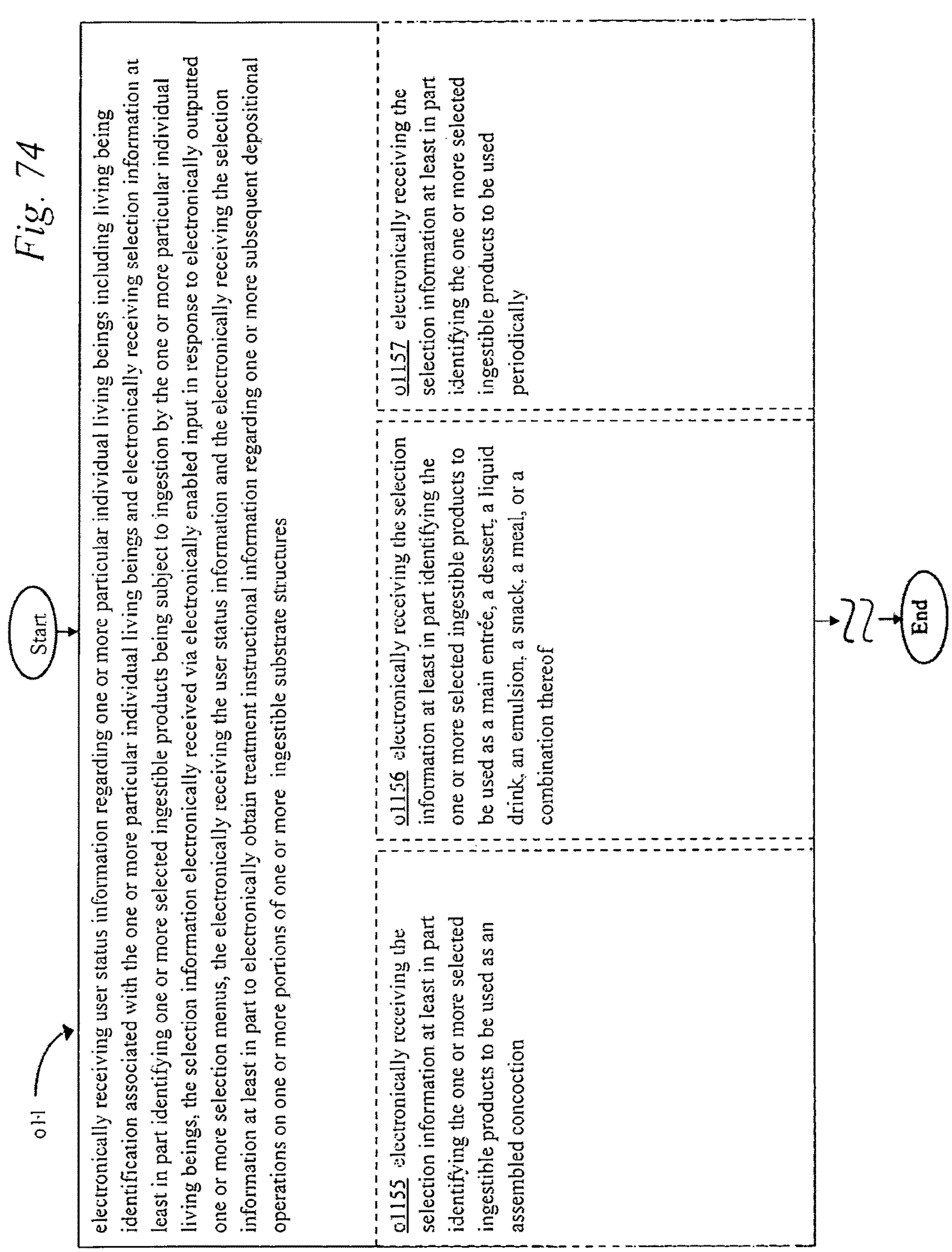
FIG. 74 is a high-level flowchart including exemplary implementations of operation p11 of FIG. 55.

In one or more implementations, as shown in FIG. 74, operation p11 includes an operation p1155 for electronically receiving the selection information at least in part identifying the one or more selected ingestible products to be used as an assembled concoction. Origination of an illustratively derived receiving information assembled component group can be accomplished through skilled in the art design choice selection of one or more of the above depicted components from one or more of the above depicted subsystems shown in FIG. 16. Components from the receiving information assembled component group can be used in implementing execution of the one or more receiving information assembled instructions j1155 of FIG. 43, can be used in performance of the receiving information assembled electrical circuitry arrangement f1155 of FIG. 44, and/or can be used in otherwise fulfillment of the operation p1155. An exemplary non-transitory signal bearing medium version of the information storage subsystem s200 is depicted in FIG. 43 as bearing the one or more receiving information assembled instructions j1155 that when executed will direct performance of the operation p1155. Furthermore, the receiving information assembled electrical circuitry arrangement ("elec circ arrange") f1155, when activated, will perform the operation p1155. Also, the receiving information assembled module n1155, when executed and/or activated, will direct performance of and/or perform the operation p1155. For instance, in one or more exemplary implementations, the one or more receiving information assembled instructions j1155, when executed, direct performance of the operation p1155 in the illustrative depiction as follows, and/or the receiving information assembled electrical circuitry arrangement f1155, when activated, performs the operation p1155 in the illustrative depiction as follows, and/or the receiving information assembled module n1155, when executed and/or activated, directs performance of and/or performs the operation p1155 in the illustrative depiction as follows, and/or the operation p1155 is otherwise carried out in the illustrative depiction as follows: electronically receiving the selection information at least in part identifying the one or more selected ingestible products to be used as an assembled concoction (e.g. including an implementation of the receiver component s528 is configured to electronically receive the selection information and engage with the processor component s102 to direct the material processing subsystem s700 to at least in part electronically identify at least the one or more selected ingestible products to be used as an assembled concoction such as a decorated confection, etc.).

In one or more implementations, as shown in FIG. 74, operation p11 includes an operation p1156 for electronically receiving the selection information at least in part identifying the one or more selected ingestible products to be used as a main entrée, a dessert, a liquid drink, an emulsion, a snack, a meal, or a combination thereof. Origination of an illustratively derived receiving information uses component group can be accomplished through skilled in the art design choice selection of one or more of the above depicted components from one or more of the above depicted subsystems shown in FIG. 16. Components from the receiving information uses component group can be used in implementing execution of the one or more receiving information uses instructions j1156 of FIG. 43, can be used in performance of the receiving information uses electrical circuitry arrangement f1156 of FIG. 44, and/or can be used in otherwise fulfillment of the operation p1156. An exemplary non-transitory signal bearing medium version of the information storage subsystem s200 is depicted in FIG. 43 as bearing the one or more receiving information uses instructions j1156 that when executed will direct performance of the operation p1156. Furthermore, the receiving information uses electrical circuitry arrangement ("elec circ arrange") f1156, when activated, will perform the operation p1156. Also, the receiving information uses module n1156, when executed and/or activated, will direct performance of and/or perform the operation p1156. For instance, in one or more exemplary implementations, the one or more receiving information uses instructions j1156, when executed, direct performance of the operation p1156 in the illustrative depiction as follows, and/or the receiving information uses electrical circuitry arrangement f1156, when activated, performs the operation p1156 in the illustrative depiction as follows, and/or the receiving information uses module n1156, when executed and/or activated, directs performance of and/or performs the operation p1156 in the illustrative depiction as follows, and/or the operation p1156 is otherwise carried out in the illustrative depiction as follows: electronically receiving the selection information at least in part identifying the one or more selected ingestible products to be used as a main entrée, a dessert, a liquid drink, an emulsion, a snack, a meal, or a combination thereof (e.g. including an implementation of the receiver component s528 is configured to electronically receive the selection information and engage with the processor component s102 to at least in part electronically identify the one or more selected ingestible products to be used as a as a main entrée, a dessert, a liquid drink, an emulsion, a snack, a meal, or a combination thereof such as a steak dinner, etc.).

In one or more implementations, as shown in FIG. 74, operation p11 includes an operation p1157 for electronically receiving the selection information at least in part identifying the one or more selected ingestible products to be used periodically. Origination of illustratively derived receiving information periods component group can be accomplished through skilled in the art design choice selection of one or more of the above depicted components from one or more of the above depicted subsystems shown in FIG. 16. Components from the receiving information periods component group can be used in implementing execution of the one or more receiving information periods instructions j1157 of FIG. 43, can be used in performance of the receiving information periods electrical circuitry arrangement f1157 of FIG. 44, and/or can be used in otherwise fulfillment of the operation p1157. An exemplary non-transitory signal bearing medium version of the information storage subsystem s200 is depicted in FIG. 43 as bearing the one or more receiving information periods instructions j1157 that when executed will direct performance of the operation p1157. Furthermore, the receiving information periods electrical circuitry arrangement ("elec circ arrange") f1157, when activated, will perform the operation p1157. Also, the receiving information periods module n1157, when executed and/or activated, will direct performance of and/or perform the operation p1157. For instance, in one or more exemplary implementations, the one or more receiving information periods instructions j1157, when executed, direct performance of the operation p1157 in the illustrative depiction as follows, and/or the receiving information periods electrical circuitry arrangement f1157, when activated, performs the operation p1157 in the illustrative depiction as follows, and/or the receiving information periods module n1157, when executed and/or activated, directs performance of and/or performs the operation p1157 in the illustrative depiction as follows, and/or the operation p1157 is otherwise carried out in the illustrative depiction as follows: electronically receiving the selection information at least in part identifying the one or more selected ingestible products to be used periodically (e.g. including an implementation of the receiver component s528 is configured to electronically receive the selection information and engage with the processor component s102 to at least in part electronically identify the one or more selected ingestible products to be used periodically such as once a week, etc.).

Figure 75:
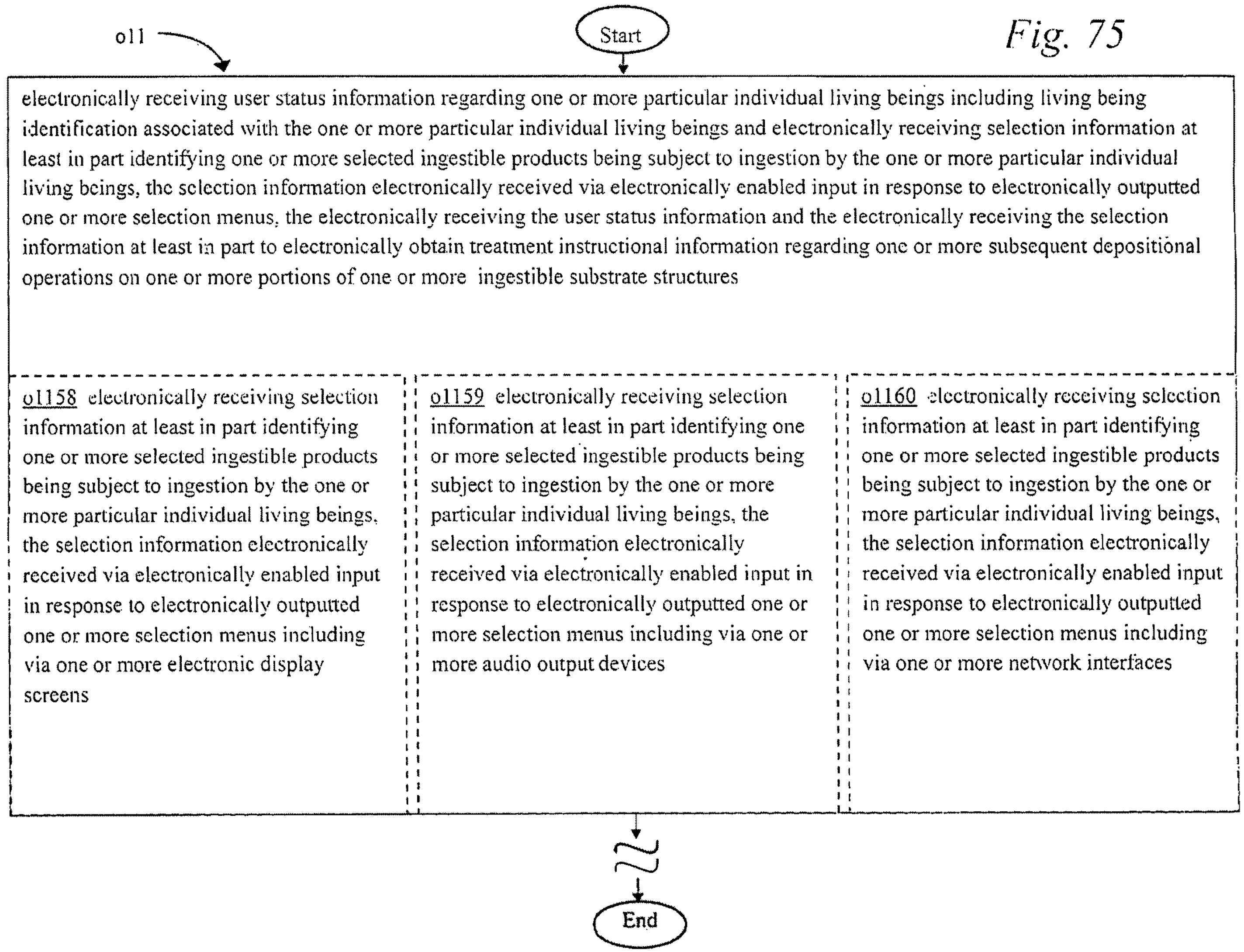
FIG. 75 is a high-level flowchart including exemplary implementations of operation p11 of FIG. 55.

In one or more implementations, as shown in FIG. 75, operation p11 includes an operation p1158 for electronically receiving selection information at least in part identifying one or more selected ingestible products being subject to ingestion by the one or more particular individual living beings, the selection information electronically received via electronically enabled input in response to electronically outputted one or more selection menus including via one or more electronic display screens. Origination of an illustratively derived receiving information display component group can be accomplished through skilled in the art design choice selection of one or more of the above depicted components from one or more of the above depicted subsystems shown in FIG. 16. Components from the receiving information display component group can be used in implementing execution of the one or more receiving information display instructions j1158 of FIG. 43, can be used in performance of the receiving information display electrical circuitry arrangement f1158 of FIG. 44, and/or can be used in otherwise fulfillment of the operation p1158. An exemplary non-transitory signal bearing medium version of the information storage subsystem s200 is depicted in FIG. 43 as bearing the one or more receiving information display instructions j1158 that when executed will direct performance of the operation p1158. Furthermore, the receiving information display electrical circuitry arrangement ("elec circ arrange") f1158, when activated, will perform the operation p1158. Also, the receiving information display module n1158, when executed and/or activated, will direct performance of and/or perform the operation p1158. For instance, in one or more exemplary implementations, the one or more receiving information display instructions j1158, when executed, direct performance of the operation p1158 in the illustrative depiction as follows, and/or the receiving information display electrical circuitry arrangement f1158, when activated, performs the operation p1158 in the illustrative depiction as follows, and/or the receiving information display module n1158, when executed and/or activated, directs performance of and/or performs the operation p1158 in the illustrative depiction as follows, and/or the operation p1158 is otherwise carried out in the illustrative depiction as follows: electronically receiving selection information at least in part identifying one or more selected ingestible products being subject to ingestion by the one or more particular individual living beings, the selection information electronically received via electronically enabled input in response to electronically outputted one or more selection menus including via one or more electronic display screens (e.g. including an implementation of the receiver component s528 is configured to electronically receive the selection information in a format for the processor component s102 to at least in part electronically output the one or more selection menus to be electronically outputted including via one or more display screens such as via graphical user interface (GUI) component s302, etc.).

In one or more implementations, as shown in FIG. 75, operation p11 includes an operation p1159 for electronically receiving selection information at least in part identifying one or more selected ingestible products being subject to ingestion by the one or more particular individual living beings, the selection information electronically received via electronically enabled input in response to electronically outputted one or more selection menus including via one or more audio output devices. Origination of an illustratively derived receiving information audio component group can be accomplished through skilled in the art design choice selection of one or more of the above depicted components from one or more of the above depicted subsystems shown in FIG. 16. Components from the receiving information audio component group can be used in implementing execution of the one or more receiving information audio instructions j1159 of FIG. 43, can be used in performance of the receiving information audio electrical circuitry arrangement f1159 of FIG. 44, and/or can be used in otherwise fulfillment of the operation p1159. An exemplary non-transitory signal bearing medium version of the information storage subsystem s200 is depicted in FIG. 43 as bearing the one or more receiving information audio instructions j1159 that when executed will direct performance of the operation p1159. Furthermore, the receiving information audio electrical circuitry arrangement ("elec circ arrange") f1159, when activated, will perform the operation p1159. Also, the receiving information audio module n1159, when executed and/or activated, will direct performance of and/or perform the operation p1159. For instance, in one or more exemplary implementations, the one or more receiving information audio instructions j1159, when executed, direct performance of the operation p1159 in the illustrative depiction as follows, and/or the receiving information audio electrical circuitry arrangement f1159, when activated, performs the operation p1159 in the illustrative depiction as follows, and/or the receiving information audio module n1159, when executed and/or activated, directs performance of and/or performs the operation p1159 in the illustrative depiction as follows, and/or the operation p1159 is otherwise carried out in the illustrative depiction as follows: electronically receiving selection information at least in part identifying one or more selected ingestible products being subject to ingestion by the one or more particular individual living beings, the selection information electronically received via electronically enabled input in response to electronically outputted one or more selection menus including via one or more audio output devices (e.g. including an implementation of the receiver component s528 is configured to electronically receive the selection information in a format for the processor component s102 to at least in part electronically generate the one or more selection menus to be electronically outputted including via one or more audio output devices such as via audio in/out component s328, etc.).

In one or more implementations, as shown in FIG. 75, operation p11 includes an operation p1160 for electronically receiving selection information at least in part identifying one or more selected ingestible products being subject to ingestion by the one or more particular individual living beings, the selection information electronically received via electronically enabled input in response to electronically outputted one or more selection menus including via one or more network interfaces. Origination of an illustratively derived receiving information interface component group can be accomplished through skilled in the art design choice selection of one or more of the above depicted components from one or more of the above depicted subsystems shown in FIG. 16. Components from the receiving information interface component group can be used in implementing execution of the one or more receiving information interface instructions j1160 of FIG. 44, can be used in performance of the receiving information interface electrical circuitry arrangement f1160 of FIG. 45, and/or can be used in otherwise fulfillment of the operation p1160. An exemplary non-transitory signal bearing medium version of the information storage subsystem s200 is depicted in FIG. 44 as bearing the one or more receiving information interface instructions j1160 that when executed will direct performance of the operation p1160. Furthermore, the receiving information interface electrical circuitry arrangement ("elec circ arrange") f1160, when activated, will perform the operation p1160. Also, the receiving information interface module n1160, when executed and/or activated, will direct performance of and/or perform the operation p1160. For instance, in one or more exemplary implementations, the one or more receiving information interface instructions j1160, when executed, direct performance of the operation p1160 in the illustrative depiction as follows, and/or the receiving information interface electrical circuitry arrangement f1160, when activated, performs the operation p1160 in the illustrative depiction as follows, and/or the receiving information interface module n1160, when executed and/or activated, directs performance of and/or performs the operation p1160 in the illustrative depiction as follows, and/or the operation p1160 is otherwise carried out in the illustrative depiction as follows: electronically receiving selection information at least in part identifying one or more selected ingestible products being subject to ingestion by the one or more particular individual living beings, the selection information electronically received via electronically enabled input in response to electronically outputted one or more selection menus including via one or more network interfaces (e.g. including an implementation of the receiver component s528 is configured to electronically receive the selection information in a format for the processor component s102 to at least in part electronically generate the one or more selection menus to be electronically outputted including via one or more network interfaces such as via wide area network component s516, etc.).

Figure 76:
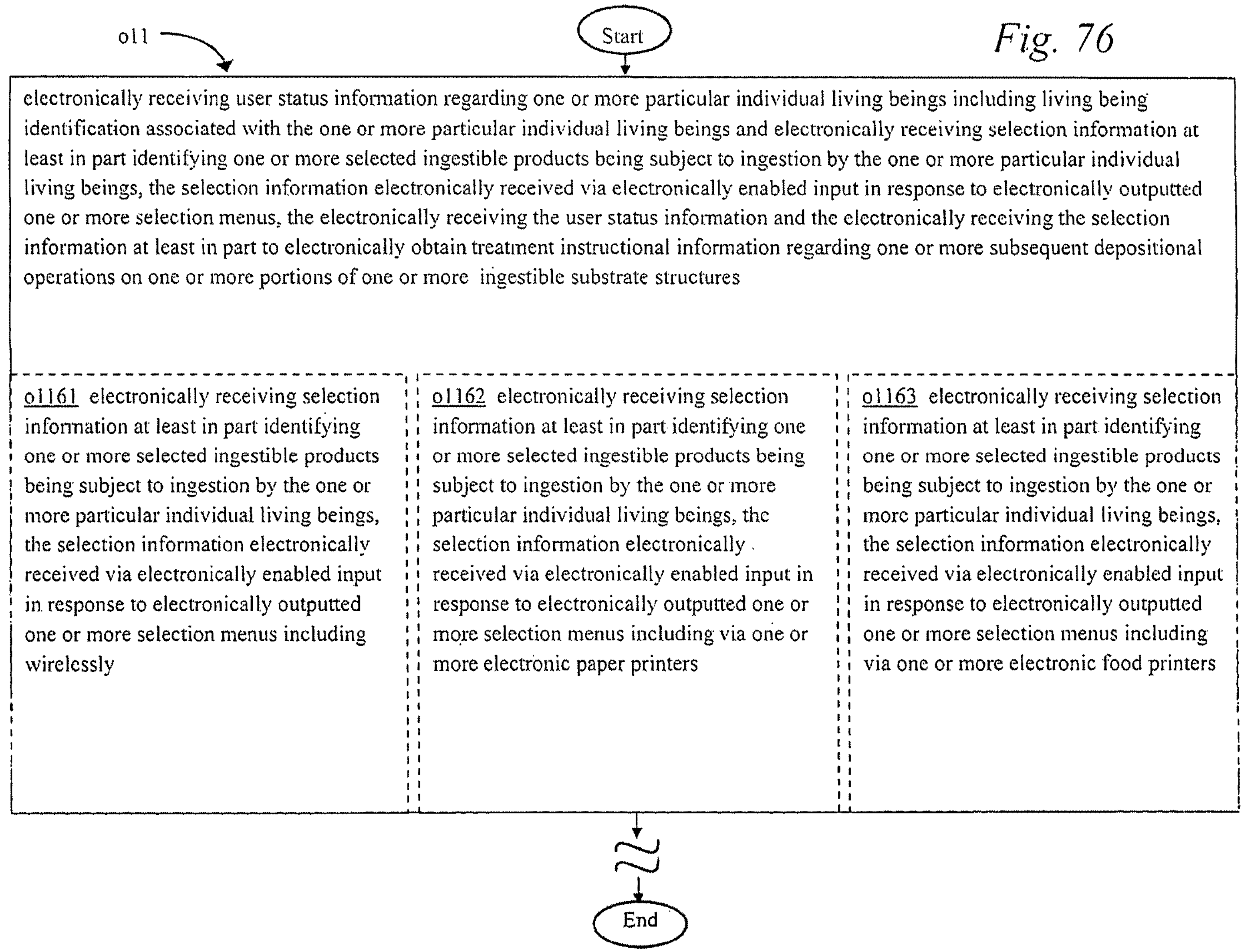
FIG. 76 is a high-level flowchart including exemplary implementations of operation p11 of FIG. 55.

In one or more implementations, as shown in FIG. 76, operation p11 includes an operation p1161 for electronically receiving selection information at least in part identifying one or more selected ingestible products being subject to ingestion by the one or more particular individual living beings, the selection information electronically received via electronically enabled input in response to electronically outputted one or more selection menus including wirelessly. Origination of an illustratively derived receiving information wirelessly component group can be accomplished through skilled in the art design choice selection of one or more of the above depicted components from one or more of the above depicted subsystems shown in FIG. 16. Components from the receiving information wirelessly component group can be used in implementing execution of the one or more receiving information wirelessly instructions j1161 of FIG. 44, can be used in performance of the receiving information wirelessly electrical circuitry arrangement f1161 of FIG. 45, and/or can be used in otherwise fulfillment of the operation p1161. An exemplary non-transitory signal bearing medium version of the information storage subsystem s200 is depicted in FIG. 44 as bearing the one or more receiving information wirelessly instructions j1161 that when executed will direct performance of the operation p1161. Furthermore, the receiving information wirelessly electrical circuitry arrangement ("elec circ arrange") f1161, when activated, will perform the operation p1161. Also, the receiving information wirelessly module n1161, when executed and/or activated, will direct performance of and/or perform the operation p1161. For instance, in one or more exemplary implementations, the one or more receiving information wirelessly instructions j1161, when executed, direct performance of the operation p1161 in the illustrative depiction as follows, and/or the receiving information wirelessly electrical circuitry arrangement f1161, when activated, performs the operation p1161 in the illustrative depiction as follows, and/or the receiving information wirelessly module n1161, when executed and/or activated, directs performance of and/or performs the operation p1161 in the illustrative depiction as follows, and/or the operation p1161 is otherwise carried out in the illustrative depiction as follows: electronically receiving selection information at least in part identifying one or more selected ingestible products being subject to ingestion by the one or more particular individual living beings, the selection information electronically received via electronically enabled input in response to electronically outputted one or more selection menus including wirelessly (e.g. including an implementation of the receiver component s528 is configured to electronically receive the selection information in a format for the processor component s102 to at least in part electronically generate the one or more selection menus to be electronically outputted including wirelessly such as via wireless network component s510, etc.).

In one or more implementations, as shown in FIG. 76, operation p11 includes an operation p1162 for electronically receiving selection information at least in part identifying one or more selected ingestible products being subject to ingestion by the one or more particular individual living beings, the selection information electronically received via electronically enabled input in response to electronically outputted one or more selection menus including via one or more electronic paper printers. Origination of an illustratively derived receiving information authority component group can be accomplished through skilled in the art design choice selection of one or more of the above depicted components from one or more of the above depicted subsystems shown in FIG. 16. Components from the receiving information authority component group can be used in implementing execution of the one or more receiving information authority instructions j1162 of FIG. 44, can be used in performance of the receiving information authority electrical circuitry arrangement f1162 of FIG. 45, and/or can be used in otherwise fulfillment of the operation p1162. An exemplary non-transitory signal bearing medium version of the information storage subsystem s200 is depicted in FIG. 44 as bearing the one or more receiving information authority instructions j1162 that when executed will direct performance of the operation p1162. Furthermore, the receiving information authority electrical circuitry arrangement ("elec circ arrange") f1162, when activated, will perform the operation p1162. Also, the receiving information authority module n1162, when executed and/or activated, will direct performance of and/or perform the operation p1162. For instance, in one or more exemplary implementations, the one or more receiving information authority instructions j1162, when executed, direct performance of the operation p1162 in the illustrative depiction as follows, and/or the receiving information authority electrical circuitry arrangement f1162, when activated, performs the operation p1162 in the illustrative depiction as follows, and/or the receiving information authority module n1162, when executed and/or activated, directs performance of and/or performs the operation p1162 in the illustrative depiction as follows, and/or the operation p1162 is otherwise carried out in the illustrative depiction as follows: electronically receiving selection information at least in part identifying one or more selected ingestible products being subject to ingestion by the one or more particular individual living beings, the selection information electronically received via electronically enabled input in response to electronically outputted one or more selection menus including via one or more electronic paper printers (e.g. including an implementation of the receiver component s528 is configured to electronically receive the selection information in a format for the processor component s102 to at least in part electronically generate the one or more selection menus to be electronically outputted including via electronic paper printer such as via scanner component s338, etc.).

In one or more implementations, as shown in FIG. 76, operation p11 includes an operation p1163 for electronically receiving selection information at least in part identifying one or more selected ingestible products being subject to ingestion by the one or more particular individual living beings, the selection information electronically received via electronically enabled input in response to electronically outputted one or more selection menus including via one or more electronic food printers. Origination of an illustratively derived receiving information printer component group can be accomplished through skilled in the art design choice selection of one or more of the above depicted components from one or more of the above depicted subsystems shown in FIG. 16. Components from the receiving information printer component group can be used in implementing execution of the one or more receiving information printer instructions j1163 of FIG. 44, can be used in performance of the receiving information printer electrical circuitry arrangement f1163 of FIG. 45, and/or can be used in otherwise fulfillment of the operation p1163. An exemplary non-transitory signal bearing medium version of the information storage subsystem s200 is depicted in FIG. 44 as bearing the one or more receiving information printer instructions j1163 that when executed will direct performance of the operation p1163. Furthermore, the receiving information printer electrical circuitry arrangement ("elec circ arrange") f1163, when activated, will perform the operation p1163. Also, the receiving information printer module n1163, when executed and/or activated, will direct performance of and/or perform the operation p1163. For instance, in one or more exemplary implementations, the one or more receiving information printer instructions j1163, when executed, direct performance of the operation p1163 in the illustrative depiction as follows, and/or the receiving information printer electrical circuitry arrangement f1163, when activated, performs the operation p1163 in the illustrative depiction as follows, and/or the receiving information printer module n1163, when executed and/or activated, directs performance of and/or performs the operation p1163 in the illustrative depiction as follows, and/or the operation p1163 is otherwise carried out in the illustrative depiction as follows: electronically receiving selection information at least in part identifying one or more selected ingestible products being subject to ingestion by the one or more particular individual living beings, the selection information electronically received via electronically enabled input in response to electronically outputted one or more selection menus including via one or more electronic food printers (e.g. including an implementation of the receiver component s528 is configured to electronically receive the user status information in a format for the processor component s102 to at least in part electronically generate the one or more selection menus to be electronically outputted including via electronic food printer such as via deposition component s740, etc.).

Figure 77:
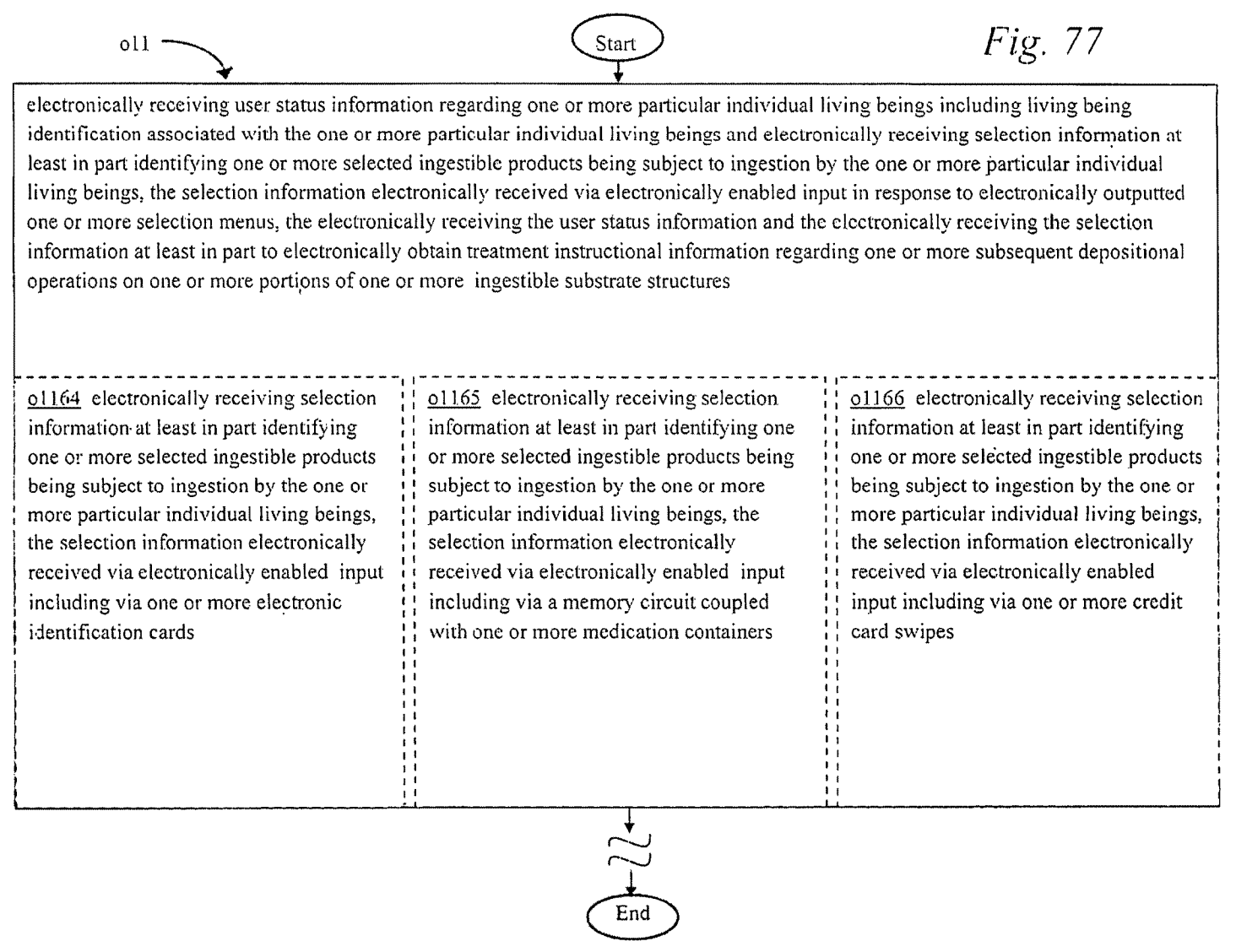

In one or more implementations, as shown in FIG. 77, operation p11 includes an operation p1164 for electronically receiving selection information at least in part identifying one or more selected ingestible products being subject to ingestion by the one or more particular individual living beings, the selection information electronically received via electronically enabled input including via one or more electronic identification cards. Origination of an illustratively derived receiving information ID card component group can be accomplished through skilled in the art design choice selection of one or more of the above depicted components from one or more of the above depicted subsystems shown in FIG. 16. Components from the receiving information ID card component group can be used in implementing execution of the one or more receiving information ID card instructions j1164 of FIG. 44, can be used in performance of the receiving information ID card electrical circuitry arrangement f1164 of FIG. 45, and/or can be used in otherwise fulfillment of the operation p1164. An exemplary non-transitory signal bearing medium version of the information storage subsystem s200 is depicted in FIG. 44 as bearing the one or more receiving information ID card instructions j1164 that when executed will direct performance of the operation p1164. Furthermore, the receiving information ID card electrical circuitry arrangement ("elec circ arrange") f1164, when activated, will perform the operation p1164. Also, the receiving information ID card module n1164, when executed and/or activated, will direct performance of and/or perform the operation p1164. For instance, in one or more exemplary implementations, the one or more receiving information ID card instructions j1164, when executed, direct performance of the operation p1164 in the illustrative depiction as follows, and/or the receiving information ID card electrical circuitry arrangement f1164, when activated, performs the operation p1164 in the illustrative depiction as follows, and/or the receiving information ID card module n1164, when executed and/or activated, directs performance of and/or performs the operation p1164 in the illustrative depiction as follows, and/or the operation p1164 is otherwise carried out in the illustrative depiction as follows: electronically receiving selection information at least in part identifying one or more selected ingestible products being subject to ingestion by the one or more particular individual living beings, the selection information electronically received via electronically enabled input including via one or more electronic identification cards (e.g. including an implementation of the receiver component s528 is configured to electronically engage with a card having memory storage holding the selection information to be used by the processor component s102, etc.).

In one or more implementations, as shown in FIG. 77, operation p11 includes an operation p1165 for electronically receiving selection information at least in part identifying one or more selected ingestible products being subject to ingestion by the one or more particular individual living beings, the selection information electronically received via electronically enabled input including via a memory circuit coupled with one or more medication containers. Origination of an illustratively derived receiving information containers component group can be accomplished through skilled in the art design choice selection of one or more of the above depicted components from one or more of the above depicted subsystems shown in FIG. 16. Components from the receiving information containers component group can be used in implementing execution of the one or more receiving information containers instructions j1165 of FIG. 44, can be used in performance of the receiving information containers electrical circuitry arrangement f1165 of FIG. 45, and/or can be used in otherwise fulfillment of the operation p1165. An exemplary non-transitory signal bearing medium version of the information storage subsystem s200 is depicted in FIG. 44 as bearing the one or more receiving information containers instructions j1165 that when executed will direct performance of the operation p1165. Furthermore, the receiving information containers electrical circuitry arrangement ("elec circ arrange") f1165, when activated, will perform the operation p1165. Also, the receiving information containers module n1165, when executed and/or activated, will direct performance of and/or perform the operation p1165. For instance, in one or more exemplary implementations, the one or more receiving information containers instructions j1165, when executed, direct performance of the operation p1165 in the illustrative depiction as follows, and/or the receiving information containers electrical circuitry arrangement f1165, when activated, performs the operation p1165 in the illustrative depiction as follows, and/or the receiving information containers module n1165, when executed and/or activated, directs performance of and/or performs the operation p1165 in the illustrative depiction as follows, and/or the operation p1165 is otherwise carried out in the illustrative depiction as follows: electronically receiving selection information at least in part identifying one or more selected ingestible products being subject to ingestion by the one or more particular individual living beings, the selection information electronically received via electronically enabled input including via a memory circuit coupled with one or more medication containers (e.g. including an implementation of the receiver component s528 is configured to electronically engage with a memory storage coupled with a medication container to receive the selection information via the electronically enabled input in electronic form to be used by the processor component s102, etc.).

In one or more implementations, as shown in FIG. 77, operation p11 includes an operation p1166 for electronically receiving selection information at least in part identifying one or more selected ingestible products being subject to ingestion by the one or more particular individual living beings, the selection information electronically received via electronically enabled input including via one or more credit card swipes. Origination of an illustratively derived receiving information credit component group can be accomplished through skilled in the art design choice selection of one or more of the above depicted components from one or more of the above depicted subsystems shown in FIG. 16. Components from the receiving information credit component group can be used in implementing execution of the one or more receiving information credit instructions j1166 of FIG. 44, can be used in performance of the receiving information credit electrical circuitry arrangement f1166 of FIG. 45, and/or can be used in otherwise fulfillment of the operation p1166. An exemplary non-transitory signal bearing medium version of the information storage subsystem s200 is depicted in FIG. 44 as bearing the one or more receiving information credit instructions j1166 that when executed will direct performance of the operation p1166. Furthermore, the receiving information credit electrical circuitry arrangement ("elec circ arrange") f1166, when activated, will perform the operation p1166. Also, the receiving information credit module n1166, when executed and/or activated, will direct performance of and/or perform the operation p1166. For instance, in one or more exemplary implementations, the one or more receiving information credit instructions j1166, when executed, direct performance of the operation p1166 in the illustrative depiction as follows, and/or the receiving information credit electrical circuitry arrangement f1166, when activated, performs the operation p1166 in the illustrative depiction as follows, and/or the receiving information credit module n1166, when executed and/or activated, directs performance of and/or performs the operation p1166 in the illustrative depiction as follows, and/or the operation p1166 is otherwise carried out in the illustrative depiction as follows: electronically receiving selection information at least in part identifying one or more selected ingestible products being subject to ingestion by the one or more particular individual living beings, the selection information electronically received via electronically enabled input including via one or more credit card swipes (e.g. including an implementation of the receiver component s528 is configured to electronically engage with an electronic memory stripe integrated into a credit card to receive the selection information via electronically enabled input to be used by the processor component s102, etc.).

Figure 78:
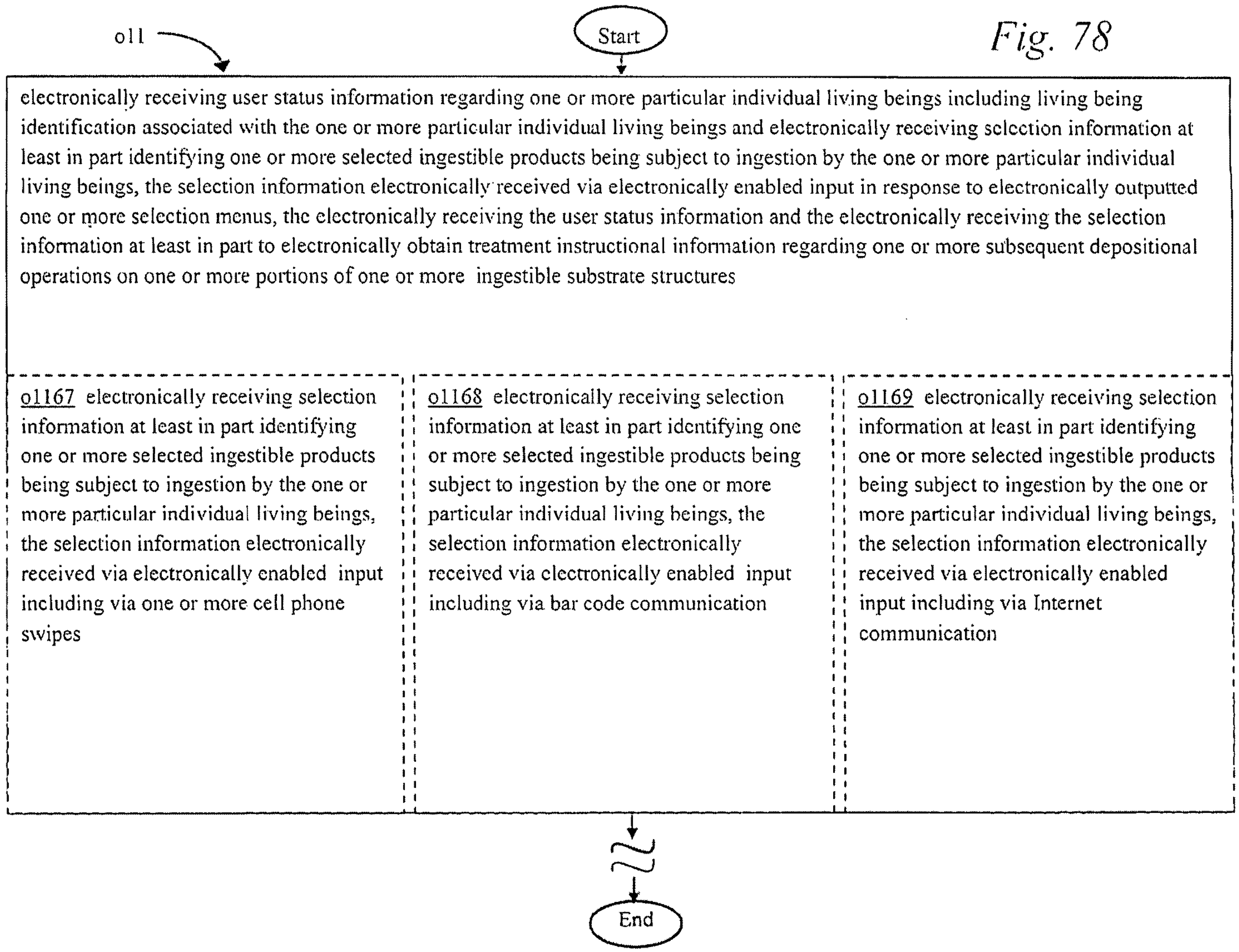
FIG. 78 is a high-level flowchart including exemplary implementations of operation p11 of FIG. 55.

In one or more implementations, as shown in FIG. 78, operation p11 includes an operation p1167 for electronically receiving selection information at least in part identifying one or more selected ingestible products being subject to ingestion by the one or more particular individual living beings, the selection information electronically received via electronically enabled input including via one or more cell phone swipes. Origination of an illustratively derived receiving information cell component group can be accomplished through skilled in the art design choice selection of one or more of the above depicted components from one or more of the above depicted subsystems shown in FIG. 16. Components from the receiving information cell component group can be used in implementing execution of the one or more receiving information cell instructions j1167 of FIG. 44, can be used in performance of the receiving information cell electrical circuitry arrangement f1167 of FIG. 45, and/or can be used in otherwise fulfillment of the operation p1167. An exemplary non-transitory signal bearing medium version of the information storage subsystem s200 is depicted in FIG. 44 as bearing the one or more receiving information cell instructions j1167 that when executed will direct performance of the operation p1167. Furthermore, the receiving information cell electrical circuitry arrangement ("elec circ arrange") f1167, when activated, will perform the operation p1167. Also, the receiving information cell module n1167, when executed and/or activated, will direct performance of and/or perform the operation p1167. For instance, in one or more exemplary implementations, the one or more receiving information cell instructions j1167, when executed, direct performance of the operation p1167 in the illustrative depiction as follows, and/or the receiving information cell electrical circuitry arrangement f1167, when activated, performs the operation p1167 in the illustrative depiction as follows, and/or the receiving information cell module n1167, when executed and/or activated, directs performance of and/or performs the operation p1167 in the illustrative depiction as follows, and/or the operation p1167 is otherwise carried out in the illustrative depiction as follows: electronically receiving selection information at least in part identifying one or more selected ingestible products being subject to ingestion by the one or more particular individual living beings, the selection information electronically received via electronically enabled input including via one or more cell phone swipes (e.g. including an implementation of the receiver component s528 is configured to electronically engage with an electronic memory component integrated into a cell phone to receive the selection information via electronically enabled input to be used by the processor component s102 to generate the one or more selection menus, etc.).

In one or more implementations, as shown in FIG. 78, operation p11 includes an operation p1168 for electronically receiving selection information at least in part identifying one or more selected ingestible products being subject to ingestion by the one or more particular individual living beings, the selection information electronically received via electronically enabled input including via bar code communication. Origination of an illustratively derived receiving information bar code component group can be accomplished through skilled in the art design choice selection of one or more of the above depicted components from one or more of the above depicted subsystems shown in FIG. 16. Components from the receiving information bar code component group can be used in implementing execution of the one or more receiving information bar code instructions j1168 of FIG. 44, can be used in performance of the receiving information bar code electrical circuitry arrangement f1168 of FIG. 45, and/or can be used in otherwise fulfillment of the operation p1168. An exemplary non-transitory signal bearing medium version of the information storage subsystem s200 is depicted in FIG. 44 as bearing the one or more receiving information bar code instructions j1168 that when executed will direct performance of the operation p1168. Furthermore, the receiving information bar code electrical circuitry arrangement ("elec circ arrange") f1168, when activated, will perform the operation p1168. Also, the receiving information bar code module n1168, when executed and/or activated, will direct performance of and/or perform the operation p1168. For instance, in one or more exemplary implementations, the one or more receiving information bar code instructions j1168, when executed, direct performance of the operation p1168 in the illustrative depiction as follows, and/or the receiving information bar code electrical circuitry arrangement f1168, when activated, performs the operation p1168 in the illustrative depiction as follows, and/or the receiving information bar code module n1168, when executed and/or activated, directs performance of and/or performs the operation p1168 in the illustrative depiction as follows, and/or the operation p1168 is otherwise carried out in the illustrative depiction as follows: electronically receiving selection information at least in part identifying one or more selected ingestible products being subject to ingestion by the one or more particular individual living beings, the selection information electronically received via electronically enabled input including via bar code communication (e.g. including an implementation of the receiver component s528 is configured to electronically read a bar code label to receive the selection information via electronically enabled input to be used by the processor component s102, etc.).

In one or more implementations, as shown in FIG. 78, operation p11 includes an operation p1169 for electronically receiving selection information at least in part identifying one or more selected ingestible products being subject to ingestion by the one or more particular individual living beings, the selection information electronically received via electronically enabled input including via Internet communication. Origination of an illustratively derived receiving information Internet component group can be accomplished through skilled in the art design choice selection of one or more of the above depicted components from one or more of the above depicted subsystems shown in FIG. 16. Components from the receiving information Internet component group can be used in implementing execution of the one or more receiving information Internet instructions j1169 of FIG. 44, can be used in performance of the receiving information Internet electrical circuitry arrangement f1169 of FIG. 45, and/or can be used in otherwise fulfillment of the operation p1169. An exemplary non-transitory signal bearing medium version of the information storage subsystem s200 is depicted in FIG. 44 as bearing the one or more receiving information Internet instructions j1169 that when executed will direct performance of the operation p1169. Furthermore, the receiving information Internet electrical circuitry arrangement ("elec circ arrange") f1169, when activated, will perform the operation p1169. Also, the receiving information Internet module n1169, when executed and/or activated, will direct performance of and/or perform the operation p1169. For instance, in one or more exemplary implementations, the one or more receiving information Internet instructions j1169, when executed, direct performance of the operation p1169 in the illustrative depiction as follows, and/or the receiving information Internet electrical circuitry arrangement f1169, when activated, performs the operation p1169 in the illustrative depiction as follows, and/or the receiving information Internet module n1169, when executed and/or activated, directs performance of and/or performs the operation p1169 in the illustrative depiction as follows, and/or the operation p1169 is otherwise carried out in the illustrative depiction as follows: electronically receiving selection information at least in part identifying one or more selected ingestible products being subject to ingestion by the one or more particular individual living beings, the selection information electronically received via electronically enabled input including via Internet communication (e.g. including an implementation of the receiver component s528 is configured to electronically receive the selection information through the internet network component s508 to be used by the processor component s102, etc.).

Figure 79:
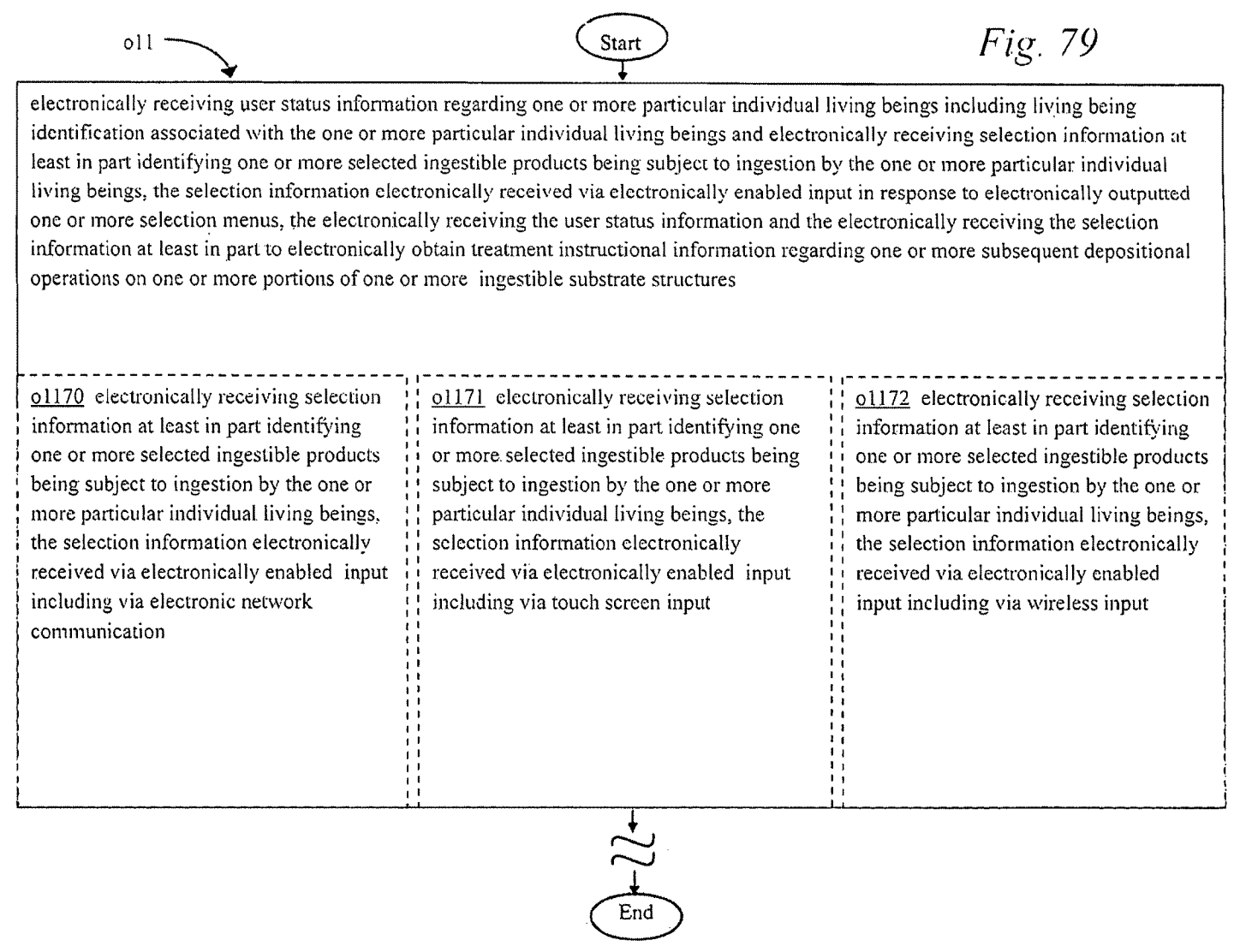

In one or more implementations, as shown in FIG. 79, operation p11 includes an operation p1170 for electronically receiving selection information at least in part identifying one or more selected ingestible products being subject to ingestion by the one or more particular individual living beings, the selection information electronically received via electronically enabled input including via electronic network communication. Origination of an illustratively derived receiving information network component group can be accomplished through skilled in the art design choice selection of one or more of the above depicted components from one or more of the above depicted subsystems shown in FIG. 16. Components from the receiving information network component group can be used in implementing execution of the one or more receiving information network instructions j1170 of FIG. 44, can be used in performance of the receiving information network electrical circuitry arrangement f1170 of FIG. 45, and/or can be used in otherwise fulfillment of the operation p1170. An exemplary non-transitory signal bearing medium version of the information storage subsystem s200 is depicted in FIG. 44 as bearing the one or more receiving information network instructions j1170 that when executed will direct performance of the operation p1170. Furthermore, the receiving information network electrical circuitry arrangement ("elec circ arrange") f1170, when activated, will perform the operation p1170. Also, the receiving information network module n1170, when executed and/or activated, will direct performance of and/or perform the operation p1170. For instance, in one or more exemplary implementations, the one or more receiving information network instructions j1170, when executed, direct performance of the operation p1170 in the illustrative depiction as follows, and/or the receiving information network electrical circuitry arrangement f1170, when activated, performs the operation p1170 in the illustrative depiction as follows, and/or the receiving information network module n1170, when executed and/or activated, directs performance of and/or performs the operation p1170 in the illustrative depiction as follows, and/or the operation p1170 is otherwise carried out in the illustrative depiction as follows: electronically receiving selection information at least in part identifying one or more selected ingestible products being subject to ingestion by the one or more particular individual living beings, the selection information electronically received via electronically enabled input including via electronic network communication (e.g. including an implementation of the receiver component s528 is configured to electronically engage with the network cable component s502 to receive the selection information to be used by the processor component s102, etc.).

In one or more implementations, as shown in FIG. 79, operation p11 includes an operation p1171 for electronically receiving selection information at least in part identifying one or more selected ingestible products being subject to ingestion by the one or more particular individual living beings, the selection information electronically received via electronically enabled input including via touch screen input. Origination of an illustratively derived receiving information touch component group can be accomplished through skilled in the art design choice selection of one or more of the above depicted components from one or more of the above depicted subsystems shown in FIG. 16. Components from the receiving information touch component group can be used in implementing execution of the one or more receiving information touch instructions j1171 of FIG. 44, can be used in performance of the receiving information touch electrical circuitry arrangement f1171 of FIG. 45, and/or can be used in otherwise fulfillment of the operation p1171. An exemplary non-transitory signal bearing medium version of the information storage subsystem s200 is depicted in FIG. 44 as bearing the one or more receiving information touch instructions j1171 that when executed will direct performance of the operation p1171. Furthermore, the receiving information touch electrical circuitry arrangement ("elec circ arrange") f1171, when activated, will perform the operation p1171. Also, the receiving information touch module n1171, when executed and/or activated, will direct performance of and/or perform the operation p1171. For instance, in one or more exemplary implementations, the one or more receiving information touch instructions j1171, when executed, direct performance of the operation p1171 in the illustrative depiction as follows, and/or the receiving information touch electrical circuitry arrangement f1171, when activated, performs the operation p1171 in the illustrative depiction as follows, and/or the receiving information touch module n1171, when executed and/or activated, directs performance of and/or performs the operation p1171 in the illustrative depiction as follows, and/or the operation p1171 is otherwise carried out in the illustrative depiction as follows: electronically receiving selection information at least in part identifying one or more selected ingestible products being subject to ingestion by the one or more particular individual living beings, the selection information electronically received via electronically enabled input including via touch screen input (e.g. including an implementation of the receiver component s528 is configured to electronically receive through the touch screen component s314 the selection information to be used by the processor component s102, etc.).

In one or more implementations, as shown in FIG. 79, operation p11 includes an operation p1172 for electronically receiving selection information at least in part identifying one or more selected ingestible products being subject to ingestion by the one or more particular individual living beings, the selection information electronically received via electronically enabled input including via wireless input. Origination of an illustratively derived receiving information wireless component group can be accomplished through skilled in the art design choice selection of one or more of the above depicted components from one or more of the above depicted subsystems shown in FIG. 16. Components from the receiving information wireless component group can be used in implementing execution of the one or more receiving information wireless instructions j1172 of FIG. 44, can be used in performance of the receiving information wireless electrical circuitry arrangement f1172 of FIG. 45, and/or can be used in otherwise fulfillment of the operation p1172. An exemplary non-transitory signal bearing medium version of the information storage subsystem s200 is depicted in FIG. 44 as bearing the one or more receiving information wireless instructions j1172 that when executed will direct performance of the operation p1172. Furthermore, the receiving information wireless electrical circuitry arrangement ("elec circ arrange") f1172, when activated, will perform the operation p1172. Also, the receiving information wireless module n1172, when executed and/or activated, will direct performance of and/or perform the operation p1172. For instance, in one or more exemplary implementations, the one or more receiving information wireless instructions j1172, when executed, direct performance of the operation p1172 in the illustrative depiction as follows, and/or the receiving information wireless electrical circuitry arrangement f1172, when activated, performs the operation p1172 in the illustrative depiction as follows, and/or the receiving information wireless module n1172, when executed and/or activated, directs performance of and/or performs the operation p1172 in the illustrative depiction as follows, and/or the operation p1172 is otherwise carried out in the illustrative depiction as follows: electronically receiving selection information at least in part identifying one or more selected ingestible products being subject to ingestion by the one or more particular individual living beings, the selection information electronically received via electronically enabled input including via wireless input (e.g. including an implementation of the receiver component s528 is configured to electronically receive through the wireless network component s510 to receive the selection information to be used by the processor component s102, etc.).

Figure 80:
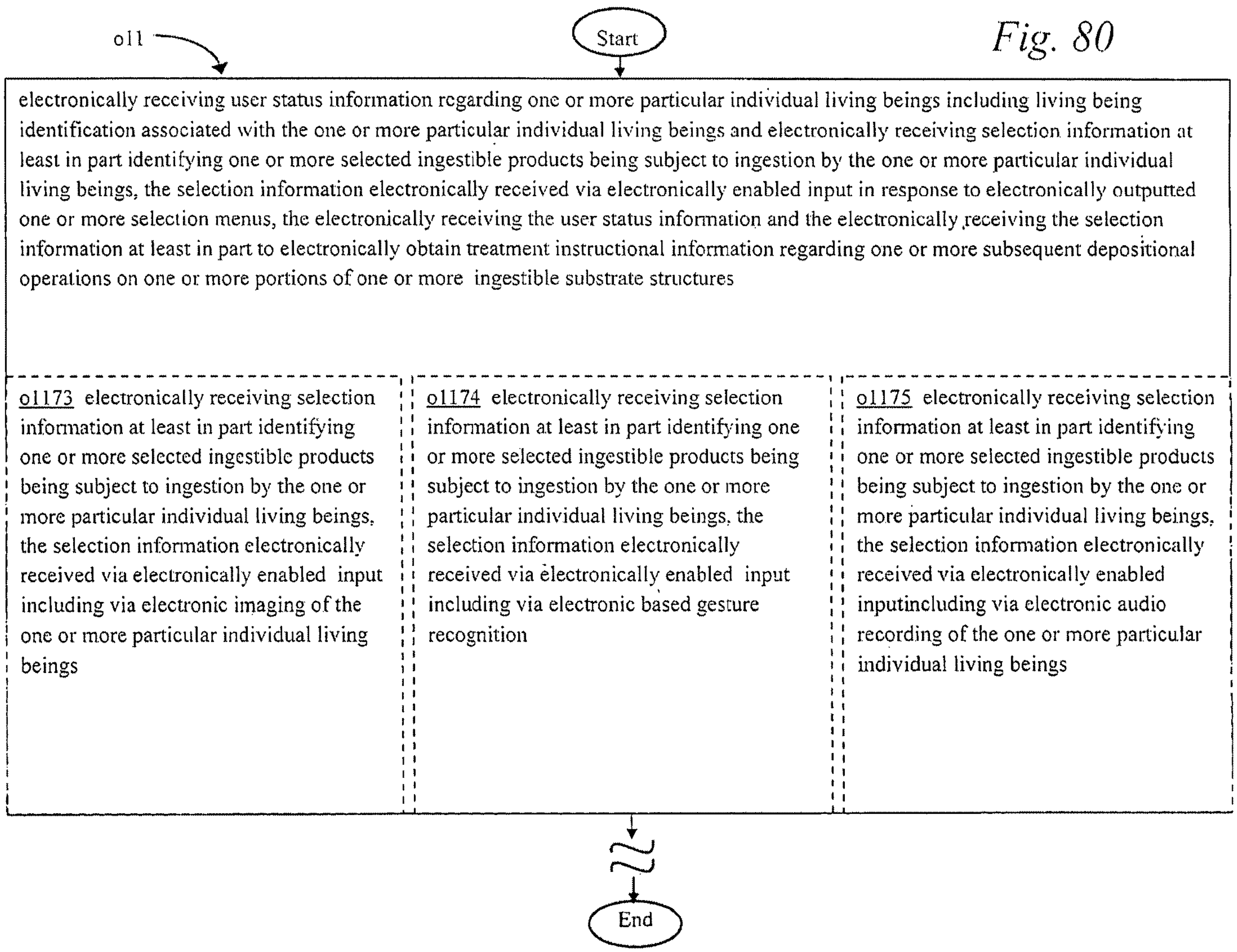
FIG. 80 is a high-level flowchart including exemplary implementations of operation p11 of FIG. 55.

In one or more implementations, as shown in FIG. 80, operation p11 includes an operation p1173 for electronically receiving selection information at least in part identifying one or more selected ingestible products being subject to ingestion by the one or more particular individual living beings, the selection information electronically received via electronically enabled input including via electronic imaging of the one or more particular individual living beings. Origination of illustratively derived receiving information imaging component group can be accomplished through skilled in the art design choice selection of one or more of the above depicted components from one or more of the above depicted subsystems shown in FIG. 16. Components from the receiving information imaging component group can be used in implementing execution of the one or more receiving information imaging instructions j1173 of FIG. 44, can be used in performance of the receiving information imaging electrical circuitry arrangement f1173 of FIG. 45, and/or can be used in otherwise fulfillment of the operation p1173. An exemplary non-transitory signal bearing medium version of the information storage subsystem s200 is depicted in FIG. 44 as bearing the one or more receiving information imaging instructions j1173 that when executed will direct performance of the operation p1173. Furthermore, the receiving information imaging electrical circuitry arrangement ("elec circ arrange") f1173, when activated, will perform the operation p1173. Also, the receiving information imaging module n1173, when executed and/or activated, will direct performance of and/or perform the operation p1173. For instance, in one or more exemplary implementations, the one or more receiving information imaging instructions j1173, when executed, direct performance of the operation p1173 in the illustrative depiction as follows, and/or the receiving information imaging electrical circuitry arrangement f1173, when activated, performs the operation p1173 in the illustrative depiction as follows, and/or the receiving information imaging module n1173, when executed and/or activated, directs performance of and/or performs the operation p1173 in the illustrative depiction as follows, and/or the operation p1173 is otherwise carried out in the illustrative depiction as follows: electronically receiving selection information at least in part identifying one or more selected ingestible products being subject to ingestion by the one or more particular individual living beings, the selection information electronically received via electronically enabled input including via electronic imaging (e.g. including an implementation of the receiver component s528 is configured to electronically receive through the camera component s336 the selection information to be used by the processor component s102, etc.) of the one or more particular individual living beings.

In one or more implementations, as shown in FIG. 80, operation p11 includes an operation p1174 for electronically receiving selection information at least in part identifying one or more selected ingestible products being subject to ingestion by the one or more particular individual living beings, the selection information electronically received via electronically enabled input including via electronic based gesture recognition. Origination of an illustratively derived receiving information gesture component group can be accomplished through skilled in the art design choice selection of one or more of the above depicted components from one or more of the above depicted subsystems shown in FIG. 16. Components from the receiving information gesture component group can be used in implementing execution of the one or more receiving information gesture instructions j1174 of FIG. 44, can be used in performance of the receiving information gesture electrical circuitry arrangement f1174 of FIG. 45, and/or can be used in otherwise fulfillment of the operation p1174. An exemplary non-transitory signal bearing medium version of the information storage subsystem s200 is depicted in FIG. 44 as bearing the one or more receiving information gesture instructions j1174 that when executed will direct performance of the operation p1174. Furthermore, the receiving information gesture electrical circuitry arrangement ("elec circ arrange") f1174, when activated, will perform the operation p1174. Also, the receiving information gesture module n1174, when executed and/or activated, will direct performance of and/or perform the operation p1174. For instance, in one or more exemplary implementations, the one or more receiving information gesture instructions j1174, when executed, direct performance of the operation p1174 in the illustrative depiction as follows, and/or the receiving information gesture electrical circuitry arrangement f1174, when activated, performs the operation p1174 in the illustrative depiction as follows, and/or the receiving information gesture module n1174, when executed and/or activated, directs performance of and/or performs the operation p1174 in the illustrative depiction as follows, and/or the operation p1174 is otherwise carried out in the illustrative depiction as follows: electronically receiving selection information at least in part identifying one or more selected ingestible products being subject to ingestion by the one or more particular individual living beings, the selection information electronically received via electronically enabled input including via electronic based gesture recognition (e.g. including an implementation of the receiver component s528 is configured to electronically engage with the optical sensing component s418 to receive the selection to be used by the processor component s102, etc.).

In one or more implementations, as shown in FIG. 80, operation p11 includes an operation p1175 for electronically receiving selection information at least in part identifying one or more selected ingestible products being subject to ingestion by the one or more particular individual living beings, the selection information electronically received via electronically enabled input including via electronic audio recording of the one or more particular individual living beings. Origination of an illustratively derived receiving information audio component group can be accomplished through skilled in the art design choice selection of one or more of the above depicted components from one or more of the above depicted subsystems shown in FIG. 16. Components from the receiving information audio component group can be used in implementing execution of the one or more receiving information audio instructions j1175 of FIG. 44, can be used in performance of the receiving information audio electrical circuitry arrangement f1175 of FIG. 45, and/or can be used in otherwise fulfillment of the operation p1175. An exemplary non-transitory signal bearing medium version of the information storage subsystem s200 is depicted in FIG. 44 as bearing the one or more receiving information audio instructions j1175 that when executed will direct performance of the operation p1175. Furthermore, the receiving information audio electrical circuitry arrangement ("elec circ arrange") f1175, when activated, will perform the operation p1175. Also, the receiving information audio module n1175, when executed and/or activated, will direct performance of and/or perform the operation p1175. For instance, in one or more exemplary implementations, the one or more receiving information audio instructions j1175, when executed, direct performance of the operation p1175 in the illustrative depiction as follows, and/or the receiving information audio electrical circuitry arrangement f1175, when activated, performs the operation p1175 in the illustrative depiction as follows, and/or the receiving information audio module n1175, when executed and/or activated, directs performance of and/or performs the operation p1175 in the illustrative depiction as follows, and/or the operation p1175 is otherwise carried out in the illustrative depiction as follows: electronically receiving selection information at least in part identifying one or more selected ingestible products being subject to ingestion by the one or more particular individual living beings, the selection information electronically received via electronically enabled input including via electronic audio recording (e.g. including an implementation of the receiver component s528 is configured to electronically engage with the sound sensing component s420 to receive the selection information to be used by the processor component s102, etc.) of the one or more particular individual living beings.

Figure 81:
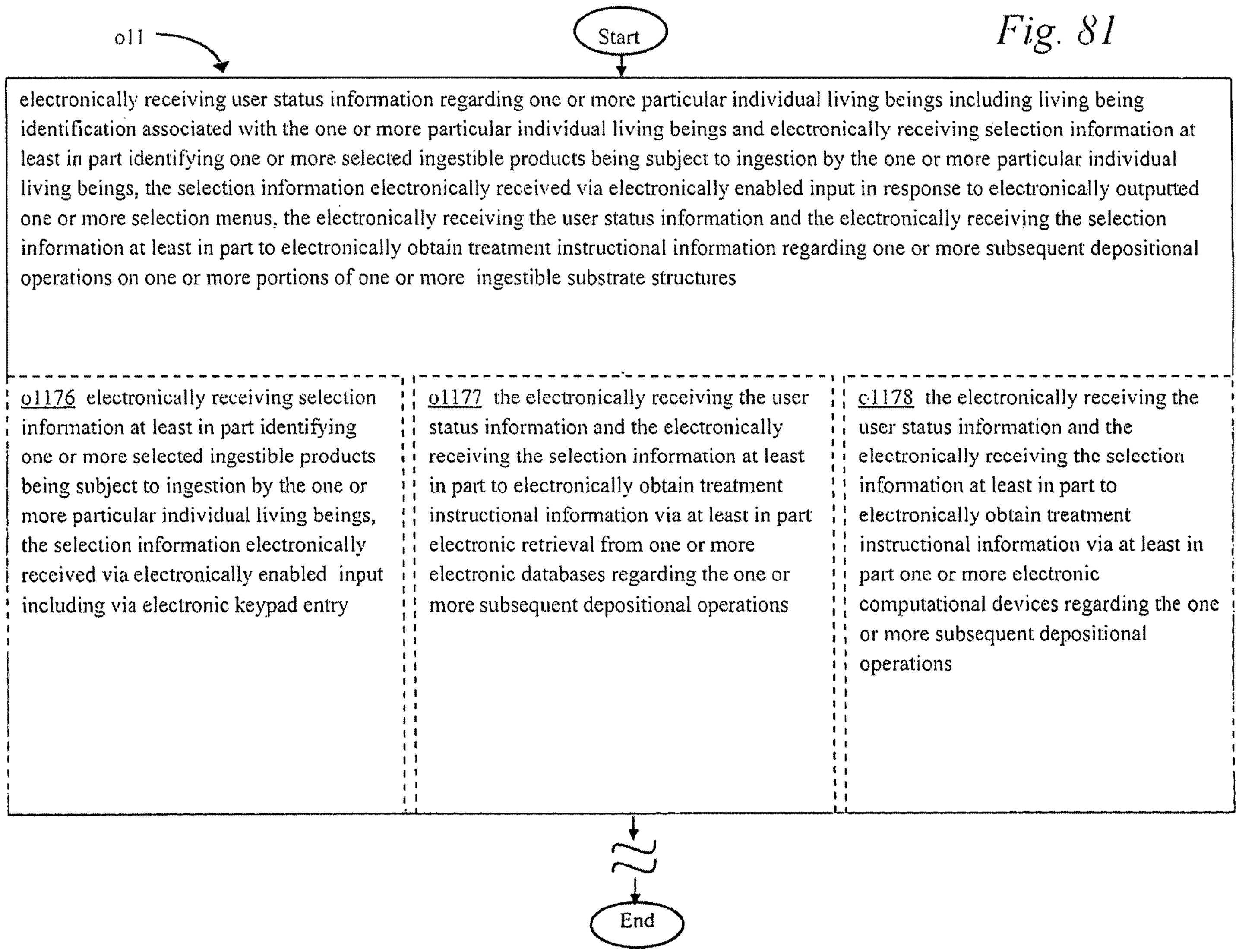
FIG. 81 is a high-level flowchart including exemplary implementations of operation p11 of FIG. 55.

In one or more implementations, as shown in FIG. 81, operation p11 includes an operation p1176 for electronically receiving selection information at least in part identifying one or more selected ingestible products being subject to ingestion by the one or more particular individual living beings, the selection information electronically received via electronically enabled input including via electronic keypad entry. Origination of an illustratively derived receiving information keypad component group can be accomplished through skilled in the art design choice selection of one or more of the above depicted components from one or more of the above depicted subsystems shown in FIG. 16. Components from the receiving information keypad component group can be used in implementing execution of the one or more receiving information keypad instructions j1176 of FIG. 44, can be used in performance of the receiving information keypad electrical circuitry arrangement f1176 of FIG. 45, and/or can be used in otherwise fulfillment of the operation p1176. An exemplary non-transitory signal bearing medium version of the information storage subsystem s200 is depicted in FIG. 44 as bearing the one or more receiving information keypad instructions j1176 that when executed will direct performance of the operation p1176. Furthermore, the receiving information keypad electrical circuitry arrangement ("elec circ arrange") f1176, when activated, will perform the operation p1176. Also, the receiving information keypad module n1176, when executed and/or activated, will direct performance of and/or perform the operation p1176. For instance, in one or more exemplary implementations, the one or more receiving information keypad instructions j1176, when executed, direct performance of the operation p1176 in the illustrative depiction as follows, and/or the receiving information keypad electrical circuitry arrangement f1176, when activated, performs the operation p1176 in the illustrative depiction as follows, and/or the receiving information keypad module n1176, when executed and/or activated, directs performance of and/or performs the operation p1176 in the illustrative depiction as follows, and/or the operation p1176 is otherwise carried out in the illustrative depiction as follows: electronically receiving selection information at least in part identifying one or more selected ingestible products being subject to ingestion by the one or more particular individual living beings, the selection information electronically received via electronically enabled input including via electronic keypad entry (e.g. including an implementation of the receiver component s528 is configured to electronically engage with the keypad component s308 to receive the selection information to be used by the processor component s102, etc.).

In one or more implementations, as shown in FIG. 81, operation p11 includes an operation p1177 for the electronically receiving the user status information and the electronically receiving the selection information at least in part to electronically obtain treatment instructional information via at least in part electronic retrieval from one or more electronic databases regarding the one or more subsequent depositional operations. Origination of an illustratively derived obtain instructional database component group can be accomplished through skilled in the art design choice selection of one or more of the above depicted components from one or more of the above depicted subsystems shown in FIG. 16. Components from the obtain instructional database component group can be used in implementing execution of the one or more obtain instructional database instructions j1177 of FIG. 44, can be used in performance of the obtain instructional database electrical circuitry arrangement f1177 of FIG. 45, and/or can be used in otherwise fulfillment of the operation p1177. An exemplary non-transitory signal bearing medium version of the information storage subsystem s200 is depicted in FIG. 44 as bearing the one or more obtain instructional database instructions j1177 that when executed will direct performance of the operation p1177. Furthermore, the obtain instructional database electrical circuitry arrangement ("elec circ arrange") f1177, when activated, will perform the operation p1177. Also, the obtain instructional database module n1177, when executed and/or activated, will direct performance of and/or perform the operation p1177. For instance, in one or more exemplary implementations, the one or more obtain instructional database instructions j1177, when executed, direct performance of the operation p1177 in the illustrative depiction as follows, and/or the obtain instructional database electrical circuitry arrangement f1177, when activated, performs the operation p1177 in the illustrative depiction as follows, and/or the obtain instructional database module n1177, when executed and/or activated, directs performance of and/or performs the operation p1177 in the illustrative depiction as follows, and/or the operation p1177 is otherwise carried out in the illustrative depiction as follows: the electronically receiving the user status information and the electronically receiving the selection information at least in part to electronically obtain treatment instructional information via at least in part electronic retrieval from one or more electronic databases (e.g. including an implementation of the receiver component s528 is configured to electronically engage with the electromagnetic sensing component s402 to receive the selection information to be used by the processor component s102, etc.) regarding the one or more subsequent depositional operations.

In one or more implementations, as shown in FIG. 81, operation p11 includes an operation p1178 for the electronically receiving the user status information and the electronically receiving the selection information at least in part to electronically obtain treatment instructional information via at least in part one or more electronic computational devices regarding the one or more subsequent depositional operations. Origination of an illustratively derived obtain instructional computational component group can be accomplished through skilled in the art design choice selection of one or more of the above depicted components from one or more of the above depicted subsystems shown in FIG. 16. Components from the obtain instructional computational component group can be used in implementing execution of the one or more obtain instructional computational instructions j1178 of FIG. 44, can be used in performance of the obtain instructional computational electrical circuitry arrangement f1178 of FIG. 45, and/or can be used in otherwise fulfillment of the operation p1178. An exemplary non-transitory signal bearing medium version of the information storage subsystem s200 is depicted in FIG. 44 as bearing the one or more obtain instructional computational instructions j1178 that when executed will direct performance of the operation p1178. Furthermore, the obtain instructional computational electrical circuitry arrangement ("elec circ arrange") f1178, when activated, will perform the operation p1178. Also, the obtain instructional computational module n1178, when executed and/or activated, will direct performance of and/or perform the operation p1178. For instance, in one or more exemplary implementations, the one or more obtain instructional computational instructions j1178, when executed, direct performance of the operation p1178 in the illustrative depiction as follows, and/or the obtain instructional computational electrical circuitry arrangement f1178, when activated, performs the operation p1178 in the illustrative depiction as follows, and/or the obtain instructional computational module n1178, when executed and/or activated, directs performance of and/or performs the operation p1178 in the illustrative depiction as follows, and/or the operation p1178 is otherwise carried out in the illustrative depiction as follows: the electronically receiving the user status information and the electronically receiving the selection information at least in part to electronically obtain treatment instructional information via at least in part one or more electronic computational devices (e.g. including an implementation of the receiver component s528 is configured to electronically engage with the encrypted communication component s520 to receive the selection information to be used by the processor component s102, etc.) regarding the one or more subsequent depositional operations.

Figure 82:
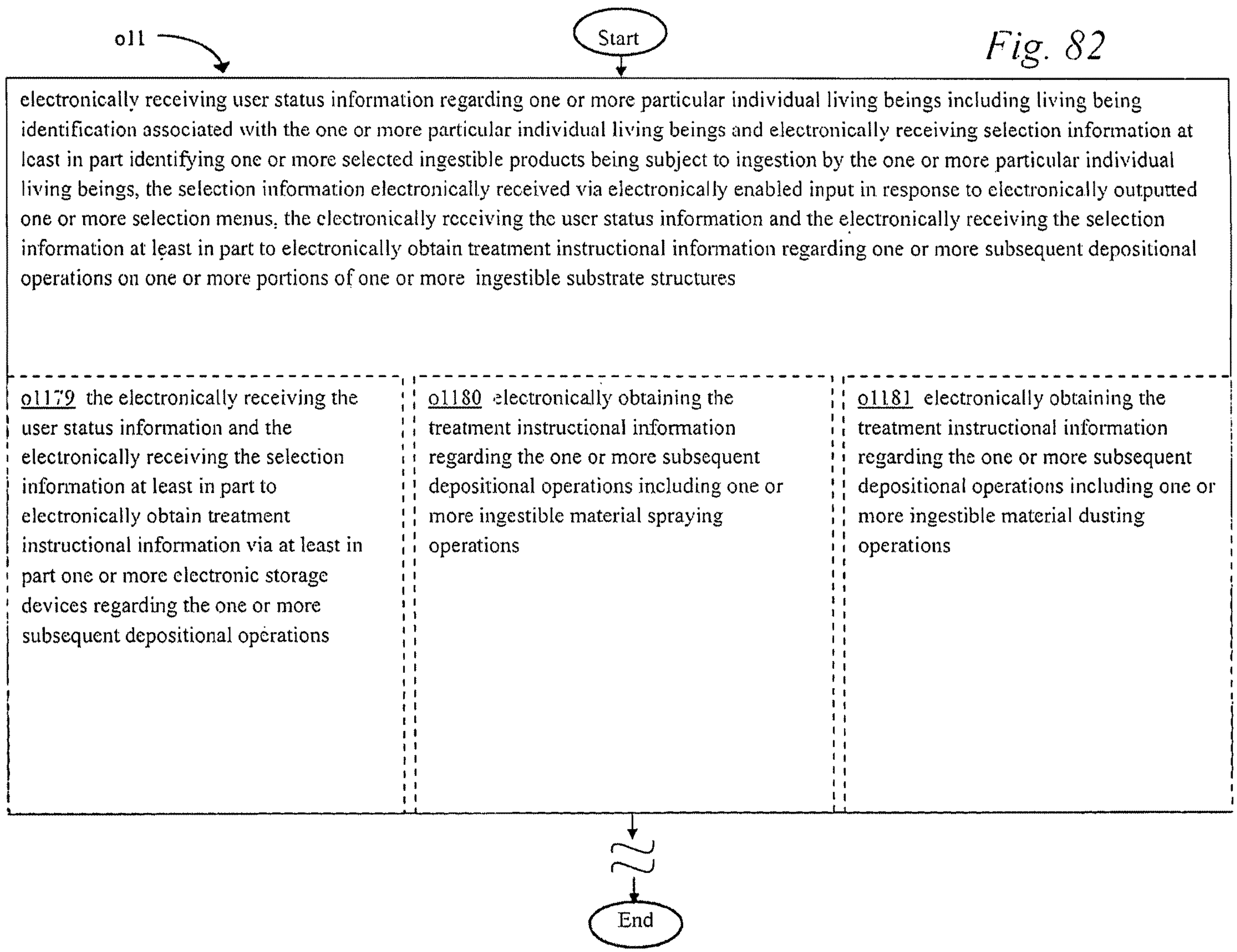
FIG. 82 is a high-level flowchart including exemplary implementations of operation p11 of FIG. 55.

In one or more implementations, as shown in FIG. 82, operation p11 includes an operation p1179 for the electronically receiving the user status information and the electronically receiving the selection information at least in part to electronically obtain treatment instructional information via at least in part one or more electronic storage devices regarding the one or more subsequent depositional operations. Origination of an illustratively derived obtain instructional storage component group can be accomplished through skilled in the art design choice selection of one or more of the above depicted components from one or more of the above depicted subsystems shown in FIG. 16. Components from the obtain instructional storage component group can be used in implementing execution of the one or more obtain instructional storage instructions j1179 of FIG. 44, can be used in performance of the obtain instructional storage electrical circuitry arrangement f1179 of FIG. 45, and/or can be used in otherwise fulfillment of the operation p1179. An exemplary non-transitory signal bearing medium version of the information storage subsystem s200 is depicted in FIG. 44 as bearing the one or more obtain instructional storage instructions j1179 that when executed will direct performance of the operation p1179. Furthermore, the obtain instructional storage electrical circuitry arrangement ("elec circ arrange") f1179, when activated, will perform the operation p1179. Also, the obtain instructional storage module n1179, when executed and/or activated, will direct performance of and/or perform the operation p1179. For instance, in one or more exemplary implementations, the one or more obtain instructional storage instructions j1179, when executed, direct performance of the operation p1179 in the illustrative depiction as follows, and/or the obtain instructional storage electrical circuitry arrangement f1179, when activated, performs the operation p1179 in the illustrative depiction as follows, and/or the obtain instructional storage module n1179, when executed and/or activated, directs performance of and/or performs the operation p1179 in the illustrative depiction as follows, and/or the operation p1179 is otherwise carried out in the illustrative depiction as follows: the electronically receiving the user status information and the electronically receiving the selection information at least in part to electronically obtain treatment instructional information via at least in part one or more electronic storage devices (e.g. including an implementation of the receiver component s528 is configured to electronically engage with one or more components of the information storage subsystem s200, such as the server component s230, to receive the selection information to be used by the processor component s102, etc.) regarding the one or more subsequent depositional operations.

In one or more implementations, as shown in FIG. 82, operation p11 includes an operation p1180 for electronically obtaining the treatment instructional information regarding the one or more subsequent depositional operations including one or more ingestible material spraying operations. Origination of an illustratively derived obtain instructional spray component group can be accomplished through skilled in the art design choice selection of one or more of the above depicted components from one or more of the above depicted subsystems shown in FIG. 16. Components from the obtain instructional spray component group can be used in implementing execution of the one or more obtain instructional spray instructions j1180 of FIG. 45, can be used in performance of the obtain instructional spray electrical circuitry arrangement f1180 of FIG. 46, and/or can be used in otherwise fulfillment of the operation p1180. An exemplary non-transitory signal bearing medium version of the information storage subsystem s200 is depicted in FIG. 45 as bearing the one or more obtain instructional spray instructions j1180 that when executed will direct performance of the operation p1180. Furthermore, the obtain instructional spray electrical circuitry arrangement ("elec circ arrange") f1180, when activated, will perform the operation p1180. Also, the obtain instructional spray module n1180, when executed and/or activated, will direct performance of and/or perform the operation p1180. For instance, in one or more exemplary implementations, the one or more obtain instructional spray instructions j1180, when executed, direct performance of the operation p1180 in the illustrative depiction as follows, and/or the obtain instructional spray electrical circuitry arrangement f1180, when activated, performs the operation p1180 in the illustrative depiction as follows, and/or the obtain instructional spray module n1180, when executed and/or activated, directs performance of and/or performs the operation p1180 in the illustrative depiction as follows, and/or the operation p1180 is otherwise carried out in the illustrative depiction as follows: electronically obtaining the treatment instructional information regarding the one or more subsequent depositional operations including one or more ingestible material spraying operations (e.g. including one or more misting operations using one or more atomizers to spray flavor enhancer liquid, etc.).

In one or more implementations, as shown in FIG. 82, operation p11 includes an operation p1181 for electronically obtaining the treatment instructional information regarding the one or more subsequent depositional operations including one or more ingestible material dusting operations. Origination of an illustratively derived obtain instructional dust component group can be accomplished through skilled in the art design choice selection of one or more of the above depicted components from one or more of the above depicted subsystems shown in FIG. 16. Components from the obtain instructional dust component group can be used in implementing execution of the one or more obtain instructional dust instructions j1181 of FIG. 45, can be used in performance of the obtain instructional dust electrical circuitry arrangement f1181 of FIG. 46, and/or can be used in otherwise fulfillment of the operation p1181. An exemplary non-transitory signal bearing medium version of the information storage subsystem s200 is depicted in FIG. 45 as bearing the one or more obtain instructional dust instructions j1181 that when executed will direct performance of the operation p1181. Furthermore, the obtain instructional dust electrical circuitry arrangement ("elec circ arrange") f1181, when activated, will perform the operation p1181. Also, the obtain instructional dust module n1181, when executed and/or activated, will direct performance of and/or perform the operation p1181. For instance, in one or more exemplary implementations, the one or more obtain instructional dust instructions j1181, when executed, direct performance of the operation p1181 in the illustrative depiction as follows, and/or the obtain instructional dust electrical circuitry arrangement f1181, when activated, performs the operation p1181 in the illustrative depiction as follows, and/or the obtain instructional dust module n1181, when executed and/or activated, directs performance of and/or performs the operation p1181 in the illustrative depiction as follows, and/or the operation p1181 is otherwise carried out in the illustrative depiction as follows: electronically obtaining the treatment instructional information regarding the one or more subsequent depositional operations including one or more ingestible material dusting operations (e.g. including one or more pressurized air jets to blow powdered ingestible material, such as powdered sugar, etc.).

In one or more implementations, an operation includes electronically obtaining the treatment instructional information regarding one or more subsequent injection operations including one or more ingestible material steam injection operations. For instance, electronically obtaining the treatment instructional information regarding the one or more subsequent injection operations including one or more ingestible material steam injection operations (e.g. including one or more injection probes, needles, tubes, syringes, and/or etc. that are configured to pierce, penetrate, be inserted into, and/or etc. one or more portions of the one or more ingestible substrate structures, the one or more injection probes, needles, and/or etc. having channels, conduits, voids, chambers, passageways, and/or etc. sized, shaped, and/or etc. and/or pressurized, defined, directed, controlled, and/or etc. jets, streams, flows and/or etc. to introduce, deliver, inject, and/or etc. at least steam such as wet steam, dry steam, high pressure steam, low pressure steam, adiabatic steam, and/or etc. into, through, and/or etc. the one or more portions of the one or more ingestible substrate structures, and/or etc.).

Figure 83:
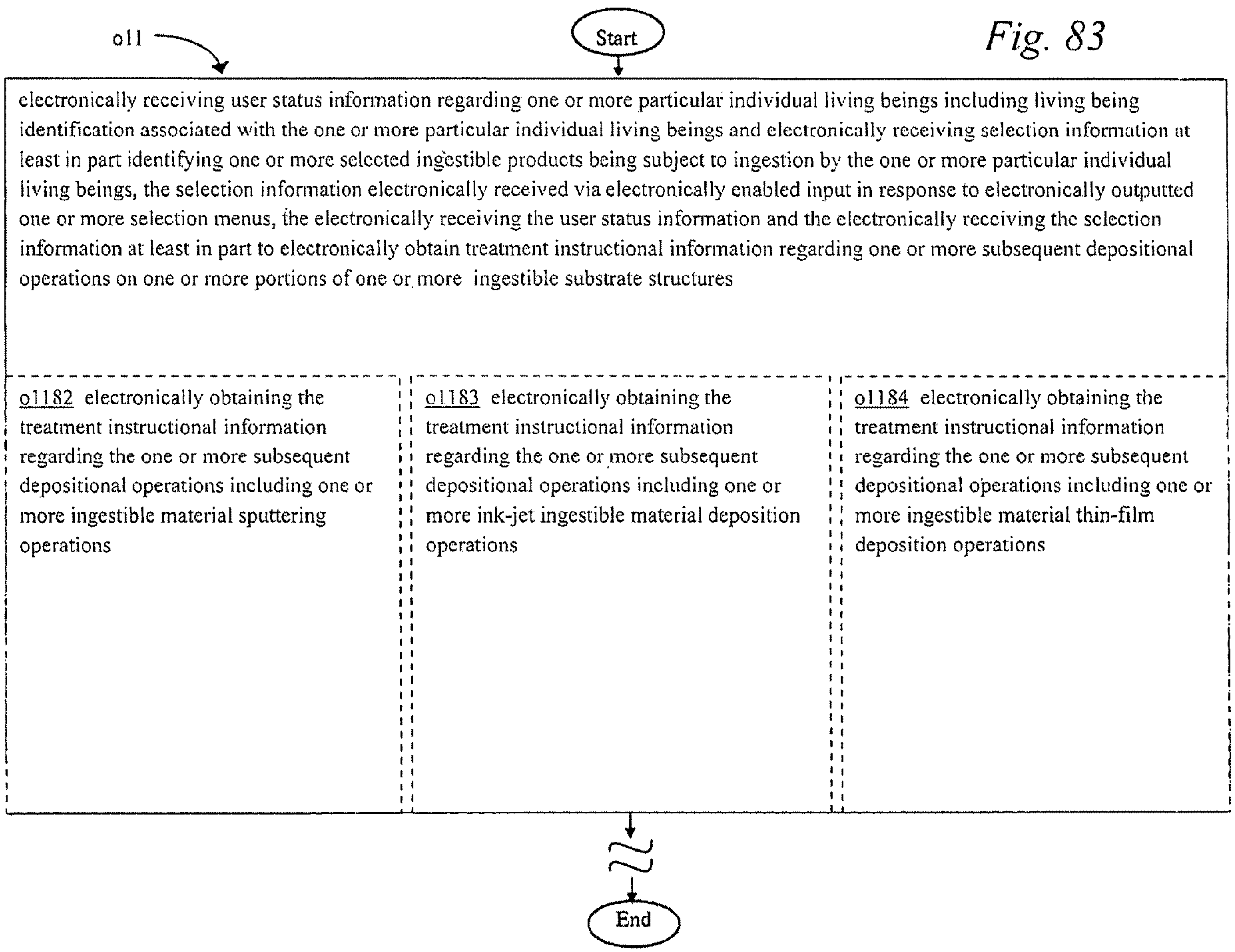
FIG. 83 is a high-level flowchart including exemplary implementations of operation p11 of FIG. 55.

In one or more implementations, as shown in FIG. 83, operation p11 includes an operation p1182 for electronically obtaining the treatment instructional information regarding the one or more subsequent depositional operations including one or more ingestible material sputtering operations. Origination of an illustratively derived obtain instructional sputter component group can be accomplished through skilled in the art design choice selection of one or more of the above depicted components from one or more of the above depicted subsystems shown in FIG. 16. Components from the obtain instructional sputter component group can be used in implementing execution of the one or more obtain instructional sputter instructions j1182 of FIG. 45, can be used in performance of the obtain instructional sputter electrical circuitry arrangement f1182 of FIG. 46, and/or can be used in otherwise fulfillment of the operation p1182. An exemplary non-transitory signal bearing medium version of the information storage subsystem s200 is depicted in FIG. 45 as bearing the one or more obtain instructional sputter instructions j1182 that when executed will direct performance of the operation p1182. Furthermore, the obtain instructional sputter electrical circuitry arrangement ("elec circ arrange") f1182, when activated, will perform the operation p1182. Also, the obtain instructional sputter module n1182, when executed and/or activated, will direct performance of and/or perform the operation p1182. For instance, in one or more exemplary implementations, the one or more obtain instructional sputter instructions j1182, when executed, direct performance of the operation p1182 in the illustrative depiction as follows, and/or the obtain instructional sputter electrical circuitry arrangement f1182, when activated, performs the operation p1182 in the illustrative depiction as follows, and/or the obtain instructional sputter module n1182, when executed and/or activated, directs performance of and/or performs the operation p1182 in the illustrative depiction as follows, and/or the operation p1182 is otherwise carried out in the illustrative depiction as follows: electronically obtaining the treatment instructional information regarding the one or more subsequent depositional operations including one or more ingestible material sputtering operations (e.g. including one or more electrostatic field generators to create static field to carry charged ingestible particles such as semi-metallic coatings, etc.).

In one or more implementations, as shown in FIG. 83, operation p11 includes an operation p1183 for electronically obtaining the treatment instructional information regarding the one or more subsequent depositional operations including one or more ink jet ingestible material deposition operations. Origination of an illustratively derived obtain instructional ink jet component group can be accomplished through skilled in the art design choice selection of one or more of the above depicted components from one or more of the above depicted subsystems shown in FIG. 16. Components from the obtain instructional ink-jet component group can be used in implementing execution of the one or more obtain instructional ink-jet instructions j1183 of FIG. 45, can be used in performance of the obtain instructional ink jet electrical circuitry arrangement f1183 of FIG. 46, and/or can be used in otherwise fulfillment of the operation p1183. An exemplary non-transitory signal bearing medium version of the information storage subsystem s200 is depicted in FIG. 45 as bearing the one or more obtain instructional ink jet instructions j1183 that when executed will direct performance of the operation p1183. Furthermore, the obtain instructional ink-jet electrical circuitry arrangement ("elec circ arrange") f1183, when activated, will perform the operation p1183. Also, the obtain instructional ink jet module n1183, when executed and/or activated, will direct performance of and/or perform the operation p1183. For instance, in one or more exemplary implementations, the one or more obtain instructional ink-jet instructions j1183, when executed, direct performance of the operation p1183 in the illustrative depiction as follows, and/or the obtain instructional ink-jet electrical circuitry arrangement f1183, when activated, performs the operation p1183 in the illustrative depiction as follows, and/or the obtain instructional ink jet module n1183, when executed and/or activated, directs performance of and/or performs the operation p1183 in the illustrative depiction as follows, and/or the operation p1183 is otherwise carried out in the illustrative depiction as follows: electronically obtaining the treatment instructional information regarding the one or more subsequent depositional operations including one or more ink jet ingestible material deposition operations (e.g. including deposition through an ink jet printer of ingestible ink onto substrate surfaces, etc.).

In one or more implementations, as shown in FIG. 83, operation p11 includes an operation p1184 for electronically obtaining the treatment instructional information regarding the one or more subsequent depositional operations including one or more ingestible material thin-film deposition operations. Origination of an illustratively derived obtain instructional thin-film component group can be accomplished through skilled in the art design choice selection of one or more of the above depicted components from one or more of the above depicted subsystems shown in FIG. 16. Components from the obtain instructional thin-film component group can be used in implementing execution of the one or more obtain instructional thin-film instructions j1184 of FIG. 45, can be used in performance of the obtain instructional thin-film electrical circuitry arrangement f1184 of FIG. 46, and/or can be used in otherwise fulfillment of the operation p1184. An exemplary non-transitory signal bearing medium version of the information storage subsystem s200 is depicted in FIG. 45 as bearing the one or more obtain instructional thin-film instructions j1184 that when executed will direct performance of the operation p1184. Furthermore, the obtain instructional thin-film electrical circuitry arrangement ("elec circ arrange") f1184, when activated, will perform the operation p1184. Also, the obtain instructional thin-film module n1184, when executed and/or activated, will direct performance of and/or perform the operation p1184. For instance, in one or more exemplary implementations, the one or more obtain instructional thin-film instructions j1184, when executed, direct performance of the operation p1184 in the illustrative depiction as follows, and/or the obtain instructional thin-film electrical circuitry arrangement f1184, when activated, performs the operation p1184 in the illustrative depiction as follows, and/or the obtain instructional thin-film module n1184, when executed and/or activated, directs performance of and/or performs the operation p1184 in the illustrative depiction as follows, and/or the operation p1184 is otherwise carried out in the illustrative depiction as follows: electronically obtaining the treatment instructional information regarding the one or more subsequent depositional operations including one or more ingestible material thin-film deposition operations (e.g. including thin film rolls of carbohydrate laid over substrate surfaces, etc.).

Figure 84:
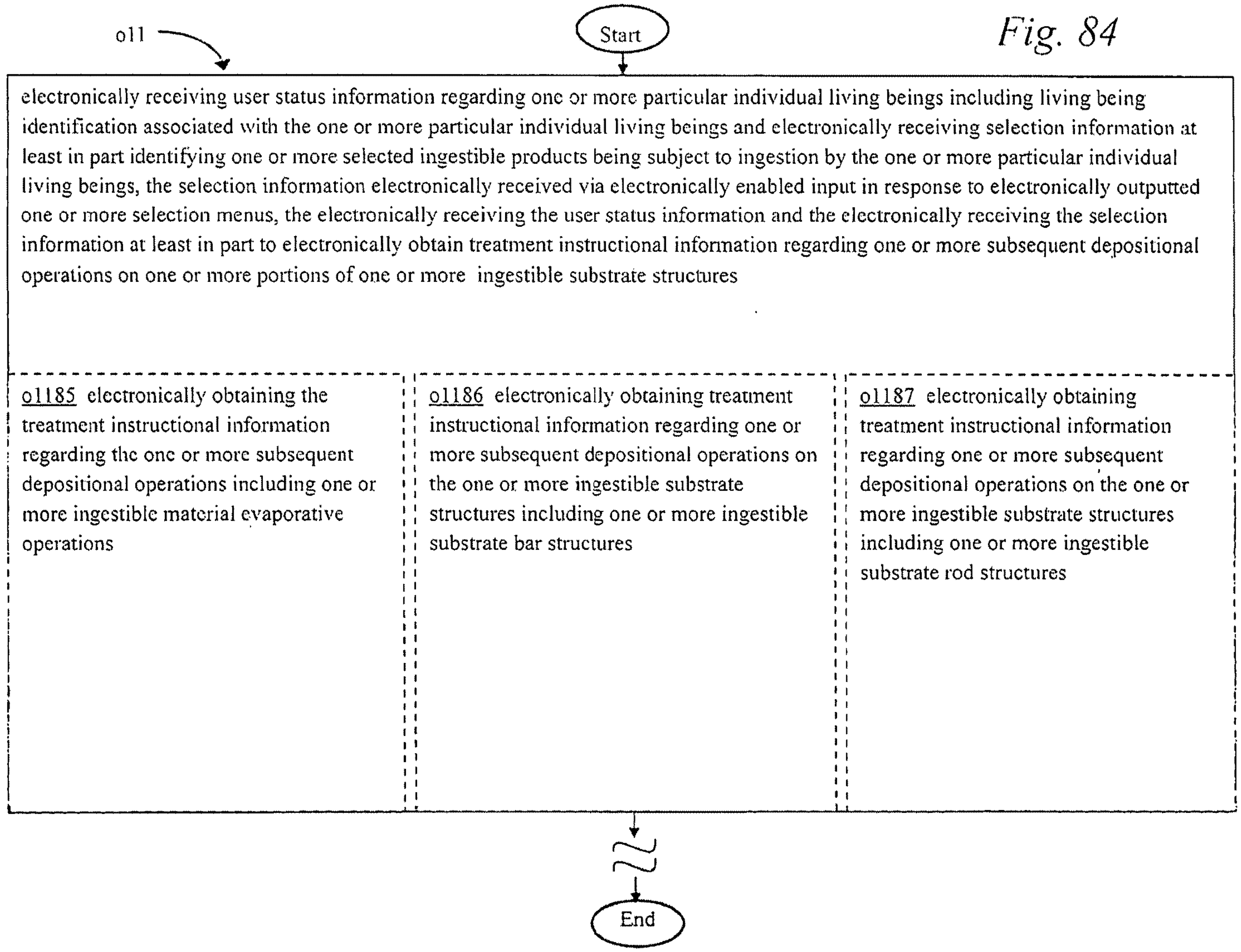
FIG. 84 is a high-level flowchart including exemplary implementations of operation p11 of FIG. 55.

In one or more implementations, as shown in FIG. 84, operation p11 includes an operation p1185 for electronically obtaining the treatment instructional information regarding the one or more subsequent depositional operations including one or more ingestible material evaporative operations. Origination of an illustratively derived obtain instructional evaporative component group can be accomplished through skilled in the art design choice selection of one or more of the above depicted components from one or more of the above depicted subsystems shown in FIG. 16. Components from the obtain instructional evaporative component group can be used in implementing execution of the one or more obtain instructional evaporative instructions j1185 of FIG. 45, can be used in performance of the obtain instructional evaporative electrical circuitry arrangement f1185 of FIG. 46, and/or can be used in otherwise fulfillment of the operation p1185. An exemplary non-transitory signal bearing medium version of the information storage subsystem s200 is depicted in FIG. 45 as bearing the one or more obtain instructional evaporative instructions j1185 that when executed will direct performance of the operation p1185. Furthermore, the obtain instructional evaporative electrical circuitry arrangement ("elec circ arrange") f1185, when activated, will perform the operation p1185. Also, the obtain instructional evaporative module n1185, when executed and/or activated, will direct performance of and/or perform the operation p1185. For instance, in one or more exemplary implementations, the one or more obtain instructional evaporative instructions j1185, when executed, direct performance of the operation p1185 in the illustrative depiction as follows, and/or the obtain instructional evaporative electrical circuitry arrangement f1185, when activated, performs the operation p1185 in the illustrative depiction as follows, and/or the obtain instructional evaporative module n1185, when executed and/or activated, directs performance of and/or performs the operation p1185 in the illustrative depiction as follows, and/or the operation p1185 is otherwise carried out in the illustrative depiction as follows: electronically obtaining the treatment instructional information regarding the one or more subsequent depositional operations including one or more ingestible material evaporative operations (e.g. including depositing texture modifiers onto substrate, the texture modifiers including volatile alcohol carriers that evaporate with applied heat, etc.).

In one or more implementations, as shown in FIG. 84, operation p11 includes an operation p1186 for electronically obtaining treatment instructional information regarding one or more subsequent depositional operations on the one or more ingestible substrate structures including one or more ingestible substrate bar structures. Origination of an illustratively derived obtain instructional bar component group can be accomplished through skilled in the art design choice selection of one or more of the above depicted components from one or more of the above depicted subsystems shown in FIG. 16. Components from the obtain instructional bar component group can be used in implementing execution of the one or more obtain instructional bar instructions j1186 of FIG. 45, can be used in performance of the obtain instructional bar electrical circuitry arrangement f1186 of FIG. 46, and/or can be used in otherwise fulfillment of the operation p1186. An exemplary non-transitory signal bearing medium version of the information storage subsystem s200 is depicted in FIG. 45 as bearing the one or more obtain instructional bar instructions j1186 that when executed will direct performance of the operation p1186. Furthermore, the obtain instructional bar electrical circuitry arrangement ("elec circ arrange") f1186, when activated, will perform the operation p1186. Also, the obtain instructional bar module n1186, when executed and/or activated, will direct performance of and/or perform the operation p1186. For instance, in one or more exemplary implementations, the one or more obtain instructional bar instructions j1186, when executed, direct performance of the operation p1186 in the illustrative depiction as follows, and/or the obtain instructional bar electrical circuitry arrangement f1186, when activated, performs the operation p1186 in the illustrative depiction as follows, and/or the obtain instructional bar module n1186, when executed and/or activated, directs performance of and/or performs the operation p1186 in the illustrative depiction as follows, and/or the operation p1186 is otherwise carried out in the illustrative depiction as follows: electronically obtaining treatment instructional information regarding one or more subsequent depositional operations on the one or more ingestible substrate structures including one or more ingestible substrate bar structures (e.g. including rectangular shaped bars, etc.).

In one or more implementations, as shown in FIG. 84, operation p11 includes an operation p1187 for electronically obtaining treatment instructional information regarding one or more subsequent depositional operations on the one or more ingestible substrate structures including one or more ingestible substrate rod structures. Origination of an illustratively derived obtain instructional rod component group can be accomplished through skilled in the art design choice selection of one or more of the above depicted components from one or more of the above depicted subsystems shown in FIG. 16. Components from the obtain instructional rod component group can be used in implementing execution of the one or more obtain instructional rod instructions j1187 of FIG. 45, can be used in performance of the obtain instructional rod electrical circuitry arrangement f1187 of FIG. 46, and/or can be used in otherwise fulfillment of the operation p1187. An exemplary non-transitory signal bearing medium version of the information storage subsystem s200 is depicted in FIG. 45 as bearing the one or more obtain instructional rod instructions j1187 that when executed will direct performance of the operation p1187. Furthermore, the obtain instructional rod electrical circuitry arrangement ("elec circ arrange") f1187, when activated, will perform the operation p1187. Also, the obtain instructional rod module n1187, when executed and/or activated, will direct performance of and/or perform the operation p1187. For instance, in one or more exemplary implementations, the one or more obtain instructional rod instructions j1187, when executed, direct performance of the operation p1187 in the illustrative depiction as follows, and/or the obtain instructional rod electrical circuitry arrangement f1187, when activated, performs the operation p1187 in the illustrative depiction as follows, and/or the obtain instructional rod module n1187, when executed and/or activated, directs performance of and/or performs the operation p1187 in the illustrative depiction as follows, and/or the operation p1187 is otherwise carried out in the illustrative depiction as follows: electronically obtaining treatment instructional information regarding one or more subsequent depositional operations on the one or more ingestible substrate structures including one or more ingestible substrate rod structures (e.g. including pretzel sticks, etc.).

Figure 85:
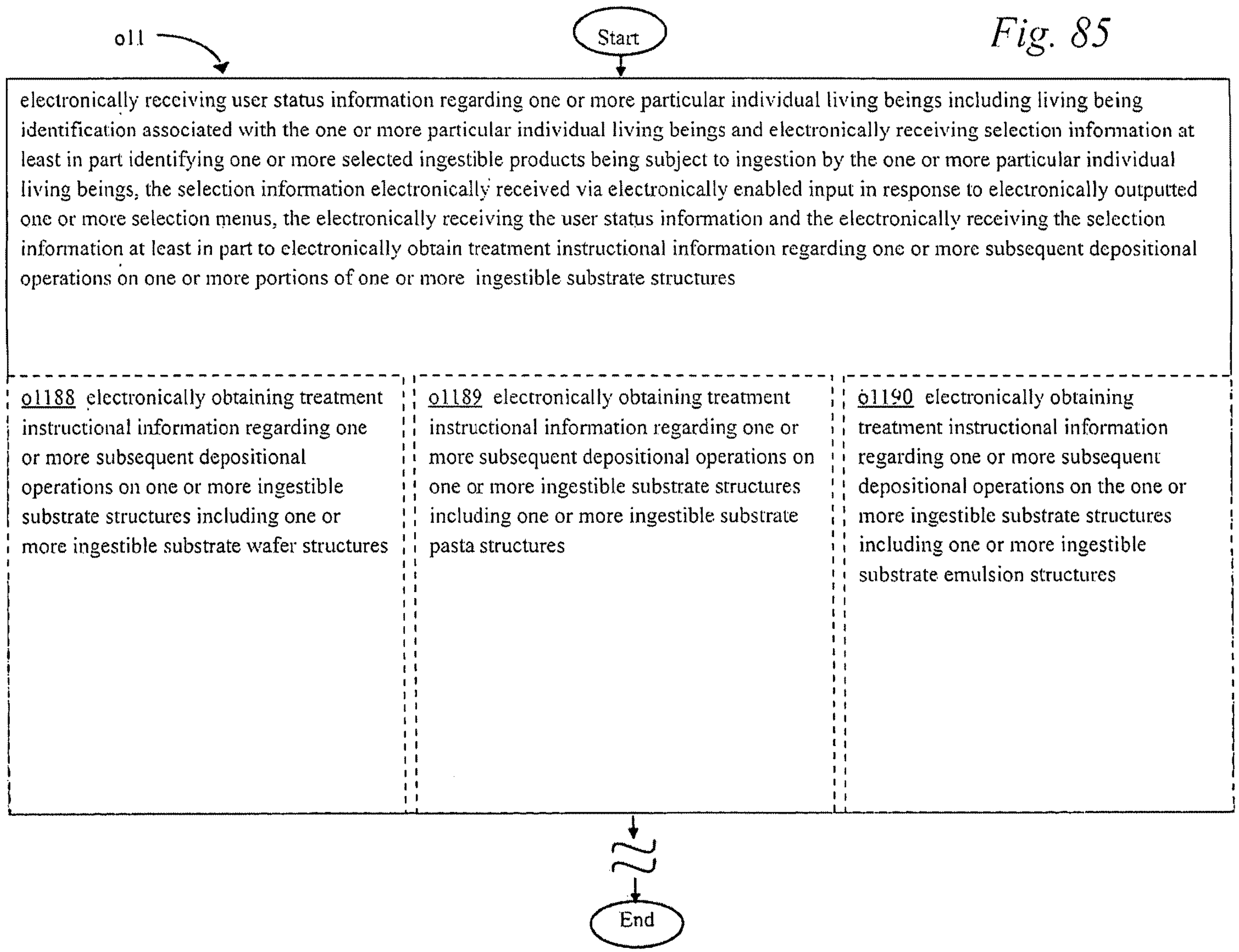
FIG. 85 is a high-level flowchart including exemplary implementations of operation p11 of FIG. 55.

In one or more implementations, as shown in FIG. 85, operation p11 includes an operation p1188 for electronically obtaining treatment instructional information regarding one or more subsequent depositional operations on one or more ingestible substrate structures including one or more ingestible substrate wafer structures. Origination of an illustratively derived obtain instructional wafer component group can be accomplished through skilled in the art design choice selection of one or more of the above depicted components from one or more of the above depicted subsystems shown in FIG. 16. Components from the obtain instructional wafer component group can be used in implementing execution of the one or more obtain instructional wafer instructions j1188 of FIG. 45, can be used in performance of the obtain instructional wafer electrical circuitry arrangement f1188 of FIG. 46, and/or can be used in otherwise fulfillment of the operation p1188. An exemplary non-transitory signal bearing medium version of the information storage subsystem s200 is depicted in FIG. 45 as bearing the one or more obtain instructional wafer instructions j1188 that when executed will direct performance of the operation p1188. Furthermore, the obtain instructional wafer electrical circuitry arrangement ("elec circ arrange") f1188, when activated, will perform the operation p1188. Also, the obtain instructional wafer module n1188, when executed and/or activated, will direct performance of and/or perform the operation p1188. For instance, in one or more exemplary implementations, the one or more obtain instructional wafer instructions j1188, when executed, direct performance of the operation p1188 in the illustrative depiction as follows, and/or the obtain instructional wafer electrical circuitry arrangement f1188, when activated, performs the operation p1188 in the illustrative depiction as follows, and/or the obtain instructional wafer module n1188, when executed and/or activated, directs performance of and/or performs the operation p1188 in the illustrative depiction as follows, and/or the operation p1188 is otherwise carried out in the illustrative depiction as follows: electronically obtaining treatment instructional information regarding one or more subsequent depositional operations on one or more ingestible substrate structures including one or more ingestible substrate wafer structures (e.g. including cookie textured structures, etc.).

In one or more implementations, as shown in FIG. 85, operation p11 includes an operation p1189 for electronically obtaining treatment instructional information regarding one or more subsequent depositional operations on one or more ingestible substrate structures including one or more ingestible substrate pasta structures. Origination of an illustratively derived obtain instructional pasta component group can be accomplished through skilled in the art design choice selection of one or more of the above depicted components from one or more of the above depicted subsystems shown in FIG. 16. Components from the obtain instructional pasta component group can be used in implementing execution of the one or more obtain instructional pasta instructions j1189 of FIG. 45, can be used in performance of the obtain instructional pasta electrical circuitry arrangement f1189 of FIG. 46, and/or can be used in otherwise fulfillment of the operation p1189. An exemplary non-transitory signal bearing medium version of the information storage subsystem s200 is depicted in FIG. 45 as bearing the one or more obtain instructional pasta instructions j1189 that when executed will direct performance of the operation p1189. Furthermore, the obtain instructional pasta electrical circuitry arrangement ("elec circ arrange") f1189, when activated, will perform the operation p1189. Also, the obtain instructional pasta module n1189, when executed and/or activated, will direct performance of and/or perform the operation p1189. For instance, in one or more exemplary implementations, the one or more obtain instructional pasta instructions j1189, when executed, direct performance of the operation p1189 in the illustrative depiction as follows, and/or the obtain instructional pasta electrical circuitry arrangement f1189, when activated, performs the operation p1189 in the illustrative depiction as follows, and/or the obtain instructional pasta module n1189, when executed and/or activated, directs performance of and/or performs the operation p1189 in the illustrative depiction as follows, and/or the operation p1189 is otherwise carried out in the illustrative depiction as follows: electronically obtaining treatment instructional information regarding one or more subsequent depositional operations on one or more ingestible substrate structures including one or more ingestible substrate pasta structures (e.g. including noodle structures, etc.).

In one or more implementations, as shown in FIG. 85, operation p11 includes an operation p1190 for electronically obtaining treatment instructional information regarding one or more subsequent depositional operations on the one or more ingestible substrate structures including one or more ingestible substrate emulsion structures. Origination of an illustratively derived obtain instructional emulsion component group can be accomplished through skilled in the art design choice selection of one or more of the above depicted components from one or more of the above depicted subsystems shown in FIG. 16. Components from the obtain instructional emulsion component group can be used in implementing execution of the one or more obtain instructional emulsion instructions j1190 of FIG. 45, can be used in performance of the obtain instructional emulsion electrical circuitry arrangement f1190 of FIG. 46, and/or can be used in otherwise fulfillment of the operation p1190. An exemplary non-transitory signal bearing medium version of the information storage subsystem s200 is depicted in FIG. 45 as bearing the one or more obtain instructional emulsion instructions j1190 that when executed will direct performance of the operation p1190. Furthermore, the obtain instructional emulsion electrical circuitry arrangement ("elec circ arrange") f1190, when activated, will perform the operation p1190. Also, the obtain instructional emulsion module n1190, when executed and/or activated, will direct performance of and/or perform the operation p1190. For instance, in one or more exemplary implementations, the one or more obtain instructional emulsion instructions j1190, when executed, direct performance of the operation p1190 in the illustrative depiction as follows, and/or the obtain instructional emulsion electrical circuitry arrangement f1190, when activated, performs the operation p1190 in the illustrative depiction as follows, and/or the obtain instructional emulsion module n1190, when executed and/or activated, directs performance of and/or performs the operation p1190 in the illustrative depiction as follows, and/or the operation p1190 is otherwise carried out in the illustrative depiction as follows: electronically obtaining treatment instructional information regarding one or more subsequent depositional operations on the one or more ingestible substrate structures including one or more ingestible substrate emulsion structures (e.g. including a substrate incorporating o11 and vinegar, etc.).

Figure 86:
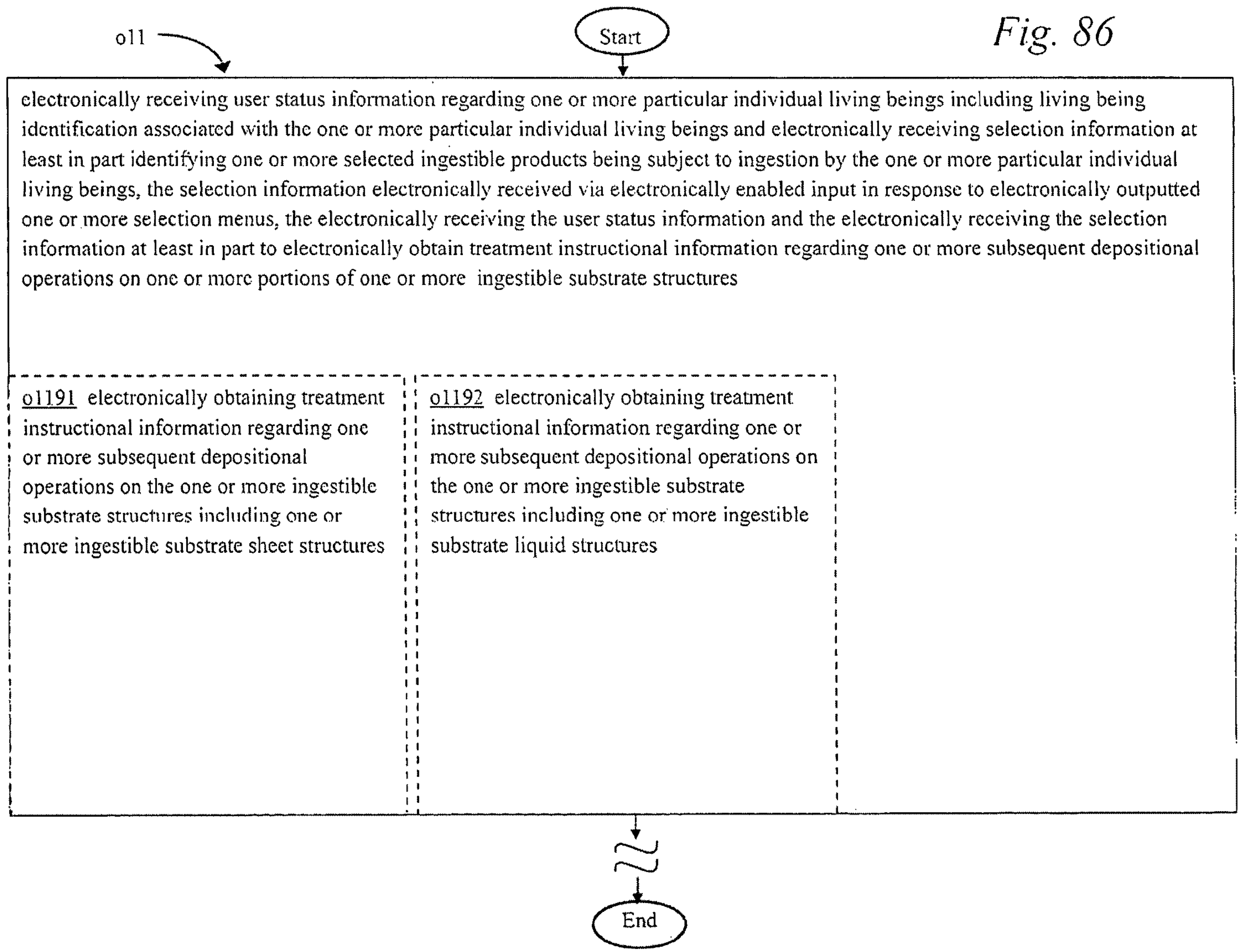
FIG. 86 is a high-level flowchart including exemplary implementations of operation p11 of FIG. 55.

In one or more implementations, as shown in FIG. 86, operation p11 includes an operation p1191 for electronically obtaining treatment instructional information regarding one or more subsequent depositional operations on the one or more ingestible substrate structures including one or more ingestible substrate sheet structures. Origination of an illustratively derived obtain instructional sheet component group can be accomplished through skilled in the art design choice selection of one or more of the above depicted components from one or more of the above depicted subsystems shown in FIG. 16. Components from the obtain instructional sheet component group can be used in implementing execution of the one or more obtain instructional sheet instructions j1191 of FIG. 45, can be used in performance of the obtain instructional sheet electrical circuitry arrangement f1191 of FIG. 46, and/or can be used in otherwise fulfillment of the operation p1191. An exemplary non-transitory signal bearing medium version of the information storage subsystem s200 is depicted in FIG. 45 as bearing the one or more obtain instructional sheet instructions j1191 that when executed will direct performance of the operation p1191. Furthermore, the obtain instructional sheet electrical circuitry arrangement ("elec circ arrange") f1191, when activated, will perform the operation p1191. Also, the obtain instructional sheet module n1191, when executed and/or activated, will direct performance of and/or perform the operation p1191. For instance, in one or more exemplary implementations, the one or more obtain instructional sheet instructions j1191, when executed, direct performance of the operation p1191 in the illustrative depiction as follows, and/or the obtain instructional sheet electrical circuitry arrangement f1191, when activated, performs the operation p1191 in the illustrative depiction as follows, and/or the obtain instructional sheet module n1191, when executed and/or activated, directs performance of and/or performs the operation p1191 in the illustrative depiction as follows, and/or the operation p1191 is otherwise carried out in the illustrative depiction as follows: electronically obtaining treatment instructional information regarding one or more subsequent depositional operations on the one or more ingestible substrate structures including one or more ingestible substrate sheet structures (e.g. including cake layers, etc.).

In one or more implementations, as shown in FIG. 86, operation p11 includes an operation p1192 for electronically obtaining treatment instructional information regarding one or more subsequent depositional operations on the one or more ingestible substrate structures including one or more ingestible substrate liquid structures. Origination of an illustratively derived obtain instructional liquid component group can be accomplished through skilled in the art design choice selection of one or more of the above depicted components from one or more of the above depicted subsystems shown in FIG. 16. Components from the obtain instructional liquid component group can be used in implementing execution of the one or more obtain instructional liquid instructions j1192 of FIG. 45, can be used in performance of the obtain instructional liquid electrical circuitry arrangement f1192 of FIG. 46, and/or can be used in otherwise fulfillment of the operation p1192. An exemplary non-transitory signal bearing medium version of the information storage subsystem s200 is depicted in FIG. 45 as bearing the one or more obtain instructional liquid instructions j1192 that when executed will direct performance of the operation p1192. Furthermore, the obtain instructional liquid electrical circuitry arrangement ("elec circ arrange") f1192, when activated, will perform the operation p1192. Also, the obtain instructional liquid module n1192, when executed and/or activated, will direct performance of and/or perform the operation p1192. For instance, in one or more exemplary implementations, the one or more obtain instructional liquid instructions j1192, when executed, direct performance of the operation p1192 in the illustrative depiction as follows, and/or the obtain instructional liquid electrical circuitry arrangement f1192, when activated, performs the operation p1192 in the illustrative depiction as follows, and/or the obtain instructional liquid module n1192, when executed and/or activated, directs performance of and/or performs the operation p1192 in the illustrative depiction as follows, and/or the operation p1192 is otherwise carried out in the illustrative depiction as follows: electronically obtaining treatment instructional information regarding one or more subsequent depositional operations on the one or more ingestible substrate structures including one or more ingestible substrate liquid structures (e.g. including smoothie ingredients, etc.).

As shown in FIG. 55, the operational flow p10 proceeds to operation p12 for electronically directing control of at least partial treatment of the one or more portions of the one or more ingestible substrate structures according to the treatment instructional information regarding the one or more subsequent depositional operations including at least one or more depositions of one or more materials onto the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products. An exemplary version of a non-transitory signal bearing medium of information storage subsystem s200 is depicted as bearing one or more controlling treatment instructions j12 that when executed will direct performance of the operation p12. In an implementation, the one or more controlling treatment instructions j12 when executed direct electronically directing control (e.g. including the microprocessor component s102 can direct control, etc.) of at least partial treatment (e.g. including depositional treatment, etc.) of the one or more portions of the one or more ingestible substrate structures (e.g. including rods, pasta, wafers, etc.) according to the treatment instructional information (e.g. including treatment steps, etc.) regarding the one or more subsequent depositional operations (e.g. including, etc.) including at least one or more depositions (e.g. including sputtering, layers, bathing, etc.) of one or more materials (e.g. including powders, flavors, extracts, liquids, gases, concentrates, etc.) onto the one or more portions of the one or more ingestible substrate structures (e.g. including cones, semi-spheres, rectangles, girders, etc.) to form (e.g. including assemble fabricate, layer, make, etc.) at least in part the one or more selected ingestible products (e.g. including snacks, meals, sandwiches, smoothies, etc.) subsequent to and based at least in part upon the electronically receiving (e.g. including through wireless, network, direct electrical connection, packets, etc.) the user status information (e.g. including identification, memberships, etc.) regarding the one or more particular individual living beings (e.g. including children, adults, retired, etc.) and the electronically receiving (e.g. including wired reception, etc.) the selection information (e.g. including meal selection, etc.) at least in part identifying the (e.g. including titles, names, serial numbers, etc.) one or more selected ingestible products (e.g. including full meals, European dishes, Asian dishes, Mexican dishes, South American dishes, American dishes, etc.). Furthermore, the controlling treatment electrical circuitry arrangement f12 when activated will perform the operation p12. Also, the controlling treatment module n12, when executed and/or activated, will direct performance of and/or perform the operation p12. In an implementation, the controlling treatment electrical circuitry arrangement f12, when activated performs the operation p12 in the illustrative depiction as follows, and/or the controlling treatment module n12, when executed and/or activated, directs performance of and/or performs electronically directing control (e.g. including the microprocessor component s102 can direct control, etc.) of at least partial treatment (e.g. including depositional treatment, etc.) of the one or more portions of the one or more ingestible substrate structures (e.g. including rods, pasta, wafers, etc.) according to the treatment instructional information (e.g. including treatment steps, etc.) regarding the one or more subsequent depositional operations (e.g. including, etc.) including at least one or more depositions (e.g. including sputtering, layers, bathing, etc.) of one or more materials (e.g. including powders, flavors, extracts, liquids, gases, concentrates, etc.) onto the one or more portions of the one or more ingestible substrate structures (e.g. including cones, semi-spheres, rectangles, girders, etc.) to form (e.g. including assemble fabricate, layer, make, etc.) at least in part the one or more selected ingestible products (e.g. including snacks, meals, sandwiches, smoothies, etc.) subsequent to and based at least in part upon the electronically receiving (e.g. including through wireless, network, direct electrical connection, packets, etc.) the user status information (e.g. including identification, memberships, etc.) regarding the one or more particular individual living beings (e.g. including children, adults, retired, etc.) and the electronically receiving (e.g. including wired reception, etc.) the selection information (e.g. including meal selection, etc.) at least in part identifying the (e.g. including titles, names, serial numbers, etc.) one or more selected ingestible products (e.g. including full meals, European dishes, Asian dishes, Mexican dishes, South American dishes, American dishes, etc.). In an implementation, the electronically directing control of at least partial treatment of the one or more portions of the one or more ingestible substrate structures according to the treatment instructional information regarding the one or more subsequent depositional operations including at least one or more depositions of one or more materials onto the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products is carried out by electronically directing control (e.g. including the microprocessor component s102 can direct control, etc.) of at least partial treatment (e.g. including depositional treatment, etc.) of the one or more portions of the one or more ingestible substrate structures (e.g. including rods, pasta, wafers, etc.) according to the treatment instructional information (e.g. including treatment steps, etc.) regarding the one or more subsequent depositional operations (e.g. including, etc.) including at least one or more depositions (e.g. including sputtering, layers, bathing, etc.) of one or more materials (e.g. including powders, flavors, extracts, liquids, gases, concentrates, etc.) onto the one or more portions of the one or more ingestible substrate structures (e.g. including cones, semi-spheres, rectangles, girders, etc.) to form (e.g. including assemble fabricate, layer, make, etc.) at least in part the one or more selected ingestible products (e.g. including snacks, meals, sandwiches, smoothies, etc.) subsequent to and based at least in part upon the electronically receiving (e.g. including through wireless, network, direct electrical connection, packets, etc.) the user status information (e.g. including identification, memberships, etc.) regarding the one or more particular individual living beings (e.g. including children, adults, retired, etc.) and the electronically receiving (e.g. including wired reception, etc.) the selection information (e.g. including meal selection, etc.) at least in part identifying the (e.g. including titles, names, serial numbers, etc.) one or more selected ingestible products (e.g. including full meals, European dishes, Asian dishes, Mexican dishes, South American dishes, American dishes, etc.).

Figure 87:
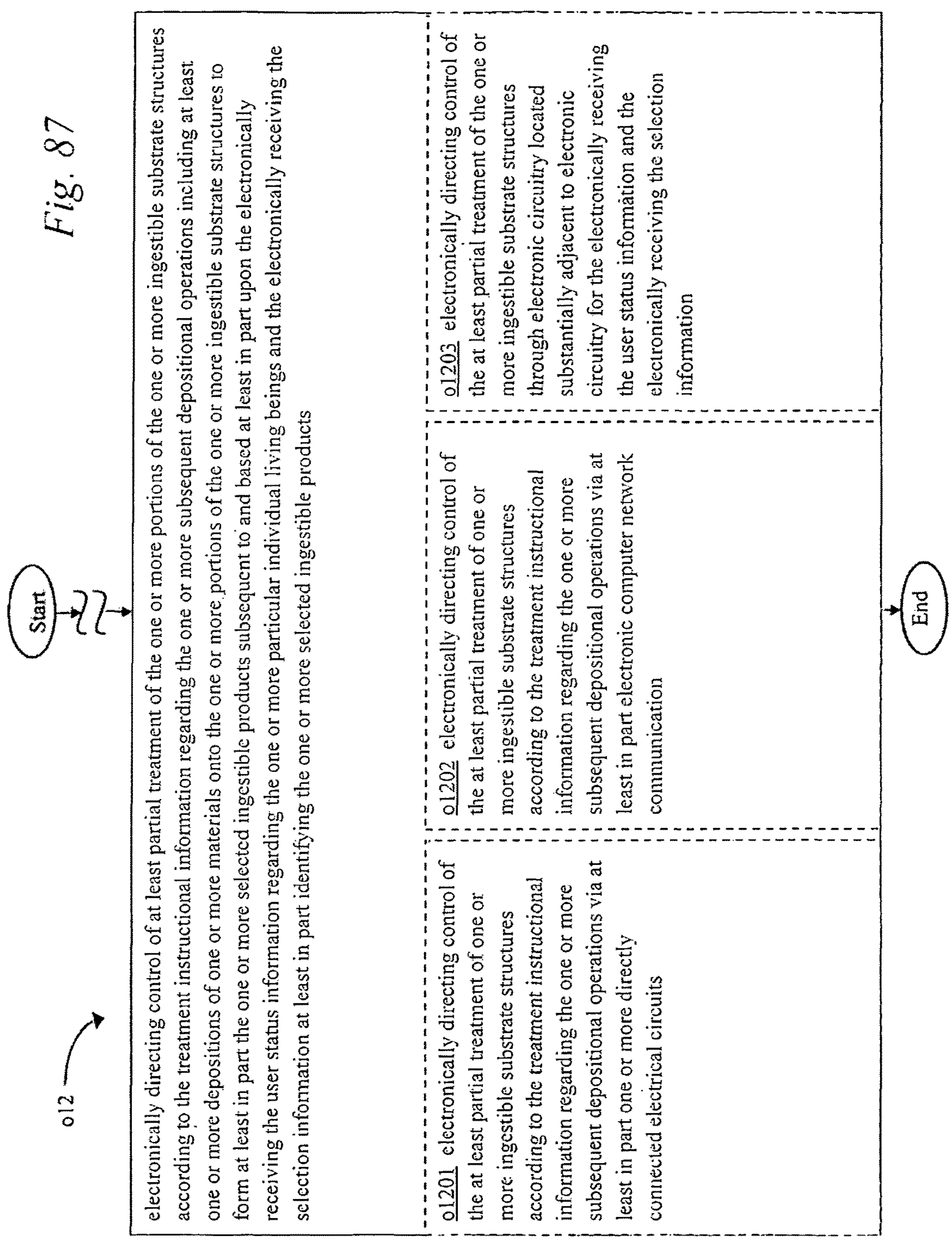
FIG. 87 is a high-level flowchart including exemplary implementations of operation p12 of FIG. 55.

In one or more implementations, as shown in FIG. 87, operation p12 includes an operation p1201 for electronically directing control of the at least partial treatment of one or more ingestible substrate structures according to the treatment instructional information regarding the one or more subsequent depositional operations via at least in part one or more directly connected electrical circuits. Origination of an illustratively derived direct treatment circuits component group can be accomplished through skilled in the art design choice selection of one or more of the above depicted components from one or more of the above depicted subsystems shown in FIG. 16. Components from the direct treatment circuits component group can be used in implementing execution of the one or more direct treatment circuits instructions j1201 of FIG. 46, can be used in performance of the direct treatment circuits electrical circuitry arrangement f1201 of FIG. 47, and/or can be used in otherwise fulfillment of the operation p1201. An exemplary non-transitory signal bearing medium version of the information storage subsystem s200 is depicted in FIG. 46 as bearing the one or more direct treatment circuits instructions j1201 that when executed will direct performance of the operation p1201. Furthermore, the direct treatment circuits electrical circuitry arrangement ("elec circ arrange") f1201, when activated, will perform the operation p1201. Also, the direct treatment circuits module n1201, when executed and/or activated, will direct performance of and/or perform the operation p1201. For instance, in one or more exemplary implementations, the one or more direct treatment circuits instructions j1201, when executed, direct performance of the operation p1201 in the illustrative depiction as follows, and/or the direct treatment circuits electrical circuitry arrangement f1201, when activated, performs the operation p1201 in the illustrative depiction as follows, and/or the direct treatment circuits module n1201, when executed and/or activated, directs performance of and/or performs the operation p1201 in the illustrative depiction as follows, and/or the operation p1201 is otherwise carried out in the illustrative depiction as follows: electronically directing control of the at least partial treatment of one or more ingestible substrate structures according to the treatment instructional information regarding the one or more subsequent depositional operations via at least in part one or more directly connected electrical circuits (e.g. including an implementation of the processor component s102 is configured to electronically receive directing control through receiver component s528 electrically connected with the material processing subsystem 700 for treatment of the one or more ingestible products, etc.).

In one or more implementations, as shown in FIG. 87, operation p12 includes an operation p1202 for electronically directing control of the at least partial treatment of one or more ingestible substrate structures according to the treatment instructional information regarding the one or more subsequent depositional operations via at least in part electronic computer network communication. Origination of an illustratively derived direct treatment network component group can be accomplished through skilled in the art design choice selection of one or more of the above depicted components from one or more of the above depicted subsystems shown in FIG. 16. Components from the direct treatment network component group can be used in implementing execution of the one or more direct treatment network instructions j1202 of FIG. 46, can be used in performance of the direct treatment network electrical circuitry arrangement f1202 of FIG. 47, and/or can be used in otherwise fulfillment of the operation p1202. An exemplary non-transitory signal bearing medium version of the information storage subsystem s200 is depicted in FIG. 46 as bearing the one or more direct treatment network instructions j1202 that when executed will direct performance of the operation p1202. Furthermore, the direct treatment network electrical circuitry arrangement ("elec circ arrange") f1202, when activated, will perform the operation p1202. Also, the direct treatment network module n1202, when executed and/or activated, will direct performance of and/or perform the operation p1202. For instance, in one or more exemplary implementations, the one or more direct treatment network instructions j1202, when executed, direct performance of the operation p1202 in the illustrative depiction as follows, and/or the direct treatment network electrical circuitry arrangement f1202, when activated, performs the operation p1202 in the illustrative depiction as follows, and/or the direct treatment network module n1202, when executed and/or activated, directs performance of and/or performs the operation p1202 in the illustrative depiction as follows, and/or the operation p1202 is otherwise carried out in the illustrative depiction as follows: electronically directing control of the at least partial treatment of one or more ingestible substrate structures according to the treatment instructional information regarding the one or more subsequent depositional operations via at least in part electronic computer network communication (e.g. including an implementation of the processor component s102 is configured to electronically receive directing control through internet network components s508 to control the material processing subsystem 700 for treatment of the one or more ingestible products, etc.).

In one or more implementations, as shown in FIG. 87, operation p12 includes an operation p1203 for electronically directing control of the at least partial treatment of the one or more ingestible substrate structures through electronic circuitry located substantially adjacent to electronic circuitry for the electronically receiving the user status information and the electronically receiving the selection information. Origination of an illustratively derived direct treatment adjacent component group can be accomplished through skilled in the art design choice selection of one or more of the above depicted components from one or more of the above depicted subsystems shown in FIG. 16. Components from the direct treatment adjacent component group can be used in implementing execution of the one or more direct treatment adjacent instructions j1203 of FIG. 46, can be used in performance of the direct treatment adjacent electrical circuitry arrangement f1203 of FIG. 47, and/or can be used in otherwise fulfillment of the operation p1203. An exemplary non-transitory signal bearing medium version of the information storage subsystem s200 is depicted in FIG. 46 as bearing the one or more direct treatment adjacent instructions j1203 that when executed will direct performance of the operation p1203. Furthermore, the direct treatment adjacent electrical circuitry arrangement ("elec circ arrange") f1203, when activated, will perform the operation p1203. Also, the direct treatment adjacent module n1203, when executed and/or activated, will direct performance of and/or perform the operation p1203. For instance, in one or more exemplary implementations, the one or more direct treatment adjacent instructions j1203, when executed, direct performance of the operation p1203 in the illustrative depiction as follows, and/or the direct treatment adjacent electrical circuitry arrangement f1203, when activated, performs the operation p1203 in the illustrative depiction as follows, and/or the direct treatment adjacent module n1203, when executed and/or activated, directs performance of and/or performs the operation p1203 in the illustrative depiction as follows, and/or the operation p1203 is otherwise carried out in the illustrative depiction as follows: electronically directing control of the at least partial treatment of the one or more ingestible substrate structures through electronic circuitry (e.g. including a first electronic component of processing subsystem s100 such as the processor component s102, etc.) located substantially adjacent to electronic circuitry (e.g. including a second electronic component of the processing subsystem s100 such as the CPU component s104, etc.) for the electronically receiving the user status information and the electronically receiving the selection information.

Figure 88:
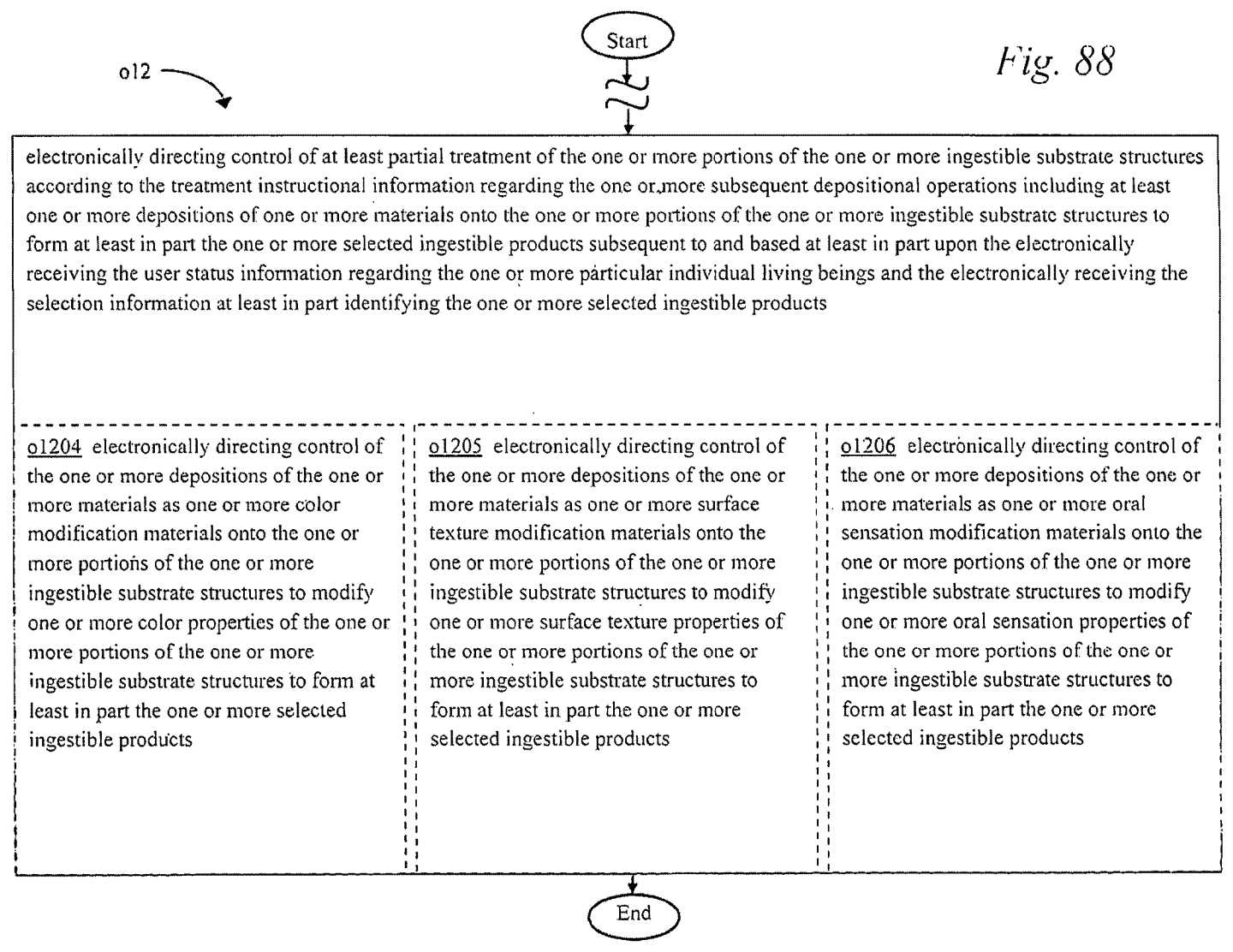

In one or more implementations, as shown in FIG. 88, operation p12 includes an operation p1204 for electronically directing control of the one or more depositions of the one or more materials as one or more color modification materials onto the one or more portions of the one or more ingestible substrate structures to modify one or more color properties of the one or more portions of the one or more ingestible substrate structures to form at least in part the one or more selected ingestible products. Origination of an illustratively derived direct modify color component group can be accomplished through skilled in the art design choice selection of one or more of the above depicted components from one or more of the above depicted subsystems shown in FIG. 16. Components from the direct modify color component group can be used in implementing execution of the one or more direct modify color instructions j1204 of FIG. 46, can be used in performance of the direct modify color electrical circuitry arrangement f1204 of FIG. 47, and/or can be used in otherwise fulfillment of the operation p1204. An exemplary non-transitory signal bearing medium version of the information storage subsystem s200 is depicted in FIG. 46 as bearing the one or more direct modify color instructions j1204 that when executed will direct performance of the operation p1204. Furthermore, the direct modify color electrical circuitry arrangement ("elec circ arrange") f1204, when activated, will perform the operation p1204. Also, the direct modify color module n1204, when executed and/or activated, will direct performance of and/or perform the operation p1204. For instance, in one or more exemplary implementations, the one or more direct modify color instructions j1204, when executed, direct performance of the operation p1204 in the illustrative depiction as follows, and/or the direct modify color electrical circuitry arrangement f1204, when activated, performs the operation p1204 in the illustrative depiction as follows, and/or the direct modify color module n1204, when executed and/or activated, directs performance of and/or performs the operation p1204 in the illustrative depiction as follows, and/or the operation p1204 is otherwise carried out in the illustrative depiction as follows: electronically directing control of the one or more depositions of the one or more materials as one or more color modification materials onto the one or more portions of the one or more ingestible substrate structures to modify (e.g. including replace, etc.) one or more color properties (e.g. including increase intensity of existing surface color, etc.) of the one or more portions of the one or more ingestible substrate structures to form at least in part the one or more selected ingestible products.

In one or more implementations, as shown in FIG. 88, operation p12 includes an operation p1205 for electronically directing control of the one or more depositions of the one or more materials as one or more surface texture modification materials onto the one or more portions of the one or more ingestible substrate structures to modify one or more surface texture properties of the one or more portions of the one or more ingestible substrate structures to form at least in part the one or more selected ingestible products. Origination of an illustratively derived direct modify surface component group can be accomplished through skilled in the art design choice selection of one or more of the above depicted components from one or more of the above depicted subsystems shown in FIG. 16. Components from the direct modify surface component group can be used in implementing execution of the one or more direct modify surface instructions j1205 of FIG. 46, can be used in performance of the direct modify surface electrical circuitry arrangement f1205 of FIG. 47, and/or can be used in otherwise fulfillment of the operation p1205. An exemplary non-transitory signal bearing medium version of the information storage subsystem s200 is depicted in FIG. 46 as bearing the one or more direct modify surface instructions j1205 that when executed will direct performance of the operation p1205. Furthermore, the direct modify surface electrical circuitry arrangement ("elec circ arrange") f1205, when activated, will perform the operation p1205. Also, the direct modify surface module n1205, when executed and/or activated, will direct performance of and/or perform the operation p1205. For instance, in one or more exemplary implementations, the one or more direct modify surface instructions j1205, when executed, direct performance of the operation p1205 in the illustrative depiction as follows, and/or the direct modify surface electrical circuitry arrangement f1205, when activated, performs the operation p1205 in the illustrative depiction as follows, and/or the direct modify surface module n1205, when executed and/or activated, directs performance of and/or performs the operation p1205 in the illustrative depiction as follows, and/or the operation p1205 is otherwise carried out in the illustrative depiction as follows: electronically directing control of the one or more depositions of the one or more materials as one or more surface texture modification materials (e.g. including one or more liquids, etc.) onto the one or more portions of the one or more ingestible substrate structures to modify (e.g. including create indentations, etc.) one or more surface texture properties (e.g. including surface integrity, etc.) of the one or more portions of the one or more ingestible substrate structures to form at least in part the one or more selected ingestible products.

In one or more implementations, as shown in FIG. 88, operation p12 includes an operation p1206 for electronically directing control of the one or more depositions of the one or more materials as one or more oral sensation modification materials onto the one or more portions of the one or more ingestible substrate structures to modify one or more oral sensation properties of the one or more portions of the one or more ingestible substrate structures to form at least in part the one or more selected ingestible products. Origination of an illustratively derived direct modify oral component group can be accomplished through skilled in the art design choice selection of one or more of the above depicted components from one or more of the above depicted subsystems shown in FIG. 16. Components from the direct modify oral component group can be used in implementing execution of the one or more direct modify oral instructions j1206 of FIG. 46, can be used in performance of the direct modify oral electrical circuitry arrangement f1206 of FIG. 47, and/or can be used in otherwise fulfillment of the operation p1206. An exemplary non-transitory signal bearing medium version of the information storage subsystem s200 is depicted in FIG. 46 as bearing the one or more direct modify oral instructions j1206 that when executed will direct performance of the operation p1206. Furthermore, the direct modify oral electrical circuitry arrangement ("elec circ arrange") f1206, when activated, will perform the operation p1206. Also, the direct modify oral module n1206, when executed and/or activated, will direct performance of and/or perform the operation p1206. For instance, in one or more exemplary implementations, the one or more direct modify oral instructions j1206, when executed, direct performance of the operation p1206 in the illustrative depiction as follows, and/or the direct modify oral electrical circuitry arrangement f1206, when activated, performs the operation p1206 in the illustrative depiction as follows, and/or the direct modify oral module n1206, when executed and/or activated, directs performance of and/or performs the operation p1206 in the illustrative depiction as follows, and/or the operation p1206 is otherwise carried out in the illustrative depiction as follows: electronically directing control of the one or more depositions of the one or more materials as one or more oral sensation modification materials (e.g. including flavored gels, etc.) onto the one or more portions of the one or more ingestible substrate structures to modify (e.g. including enhancement, etc.) one or more oral sensation properties (e.g. including adding mint-based flavors, etc.) of the one or more portions of the one or more ingestible substrate structures to form at least in part the one or more selected ingestible products.

Figure 89:
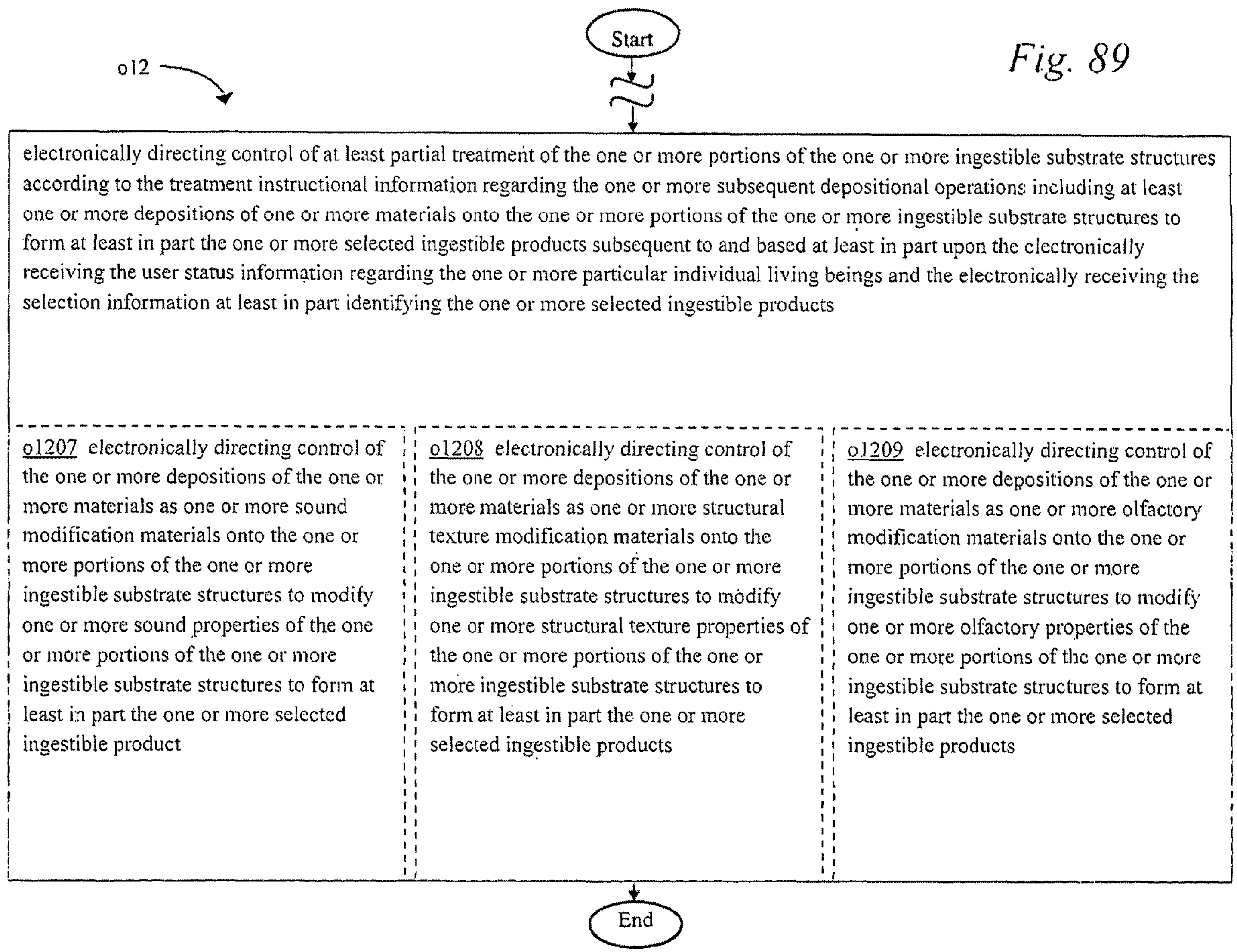
FIG. 89 is a high-level flowchart including exemplary implementations of operation p12 of FIG. 55.

In one or more implementations, as shown in FIG. 89, operation p12 includes an operation p1207 for electronically directing control of the one or more depositions of the one or more materials as one or more sound modification materials onto the one or more portions of the one or more ingestible substrate structures to modify one or more sound properties of the one or more portions of the one or more ingestible substrate structures to form at least in part the one or more selected ingestible product. Origination of an illustratively derived direct modify sound component group can be accomplished through skilled in the art design choice selection of one or more of the above depicted components from one or more of the above depicted subsystems shown in FIG. 16. Components from the direct modify sound component group can be used in implementing execution of the one or more direct modify sound instructions j1207 of FIG. 46, can be used in performance of the direct modify sound electrical circuitry arrangement f1207 of FIG. 47, and/or can be used in otherwise fulfillment of the operation p1207. An exemplary non-transitory signal bearing medium version of the information storage subsystem s200 is depicted in FIG. 46 as bearing the one or more direct modify sound instructions j1207 that when executed will direct performance of the operation p1207. Furthermore, the direct modify sound electrical circuitry arrangement ("elec circ arrange") f1207, when activated, will perform the operation p1207. Also, the direct modify sound module n1207, when executed and/or activated, will direct performance of and/or perform the operation p1207. For instance, in one or more exemplary implementations, the one or more direct modify sound instructions j1207, when executed, direct performance of the operation p1207 in the illustrative depiction as follows, and/or the direct modify sound electrical circuitry arrangement f1207, when activated, performs the operation p1207 in the illustrative depiction as follows, and/or the direct modify sound module n1207, when executed and/or activated, directs performance of and/or performs the operation p1207 in the illustrative depiction as follows, and/or the operation p1207 is otherwise carried out in the illustrative depiction as follows: electronically directing control of the one or more depositions of the one or more materials as one or more sound modification materials (e.g. including one or more powders, etc.) onto the one or more portions of the one or more ingestible substrate structures to modify (e.g. including reducing decibel levels, etc.) one or more sound properties (e.g. including decibel levels when substrate is bitten into, etc.) of the one or more portions of the one or more ingestible substrate structures to form at least in part the one or more selected ingestible products.

In one or more implementations, as shown in FIG. 89, operation p12 includes an operation p1208 for electronically directing control of the one or more depositions of the one or more materials as one or more structural texture modification materials onto the one or more portions of the one or more ingestible substrate structures to modify one or more structural texture properties of the one or more portions of the one or more ingestible substrate structures to form at least in part the one or more selected ingestible products. Origination of an illustratively derived direct modify structural component group can be accomplished through skilled in the art design choice selection of one or more of the above depicted components from one or more of the above depicted subsystems shown in FIG. 16. Components from the direct modify structural component group can be used in implementing execution of the one or more direct modify structural instructions j1208 of FIG. 46, can be used in performance of the direct modify structural electrical circuitry arrangement f1208 of FIG. 47, and/or can be used in otherwise fulfillment of the operation p1208. An exemplary non-transitory signal bearing medium version of the information storage subsystem s200 is depicted in FIG. 46 as bearing the one or more direct modify structural instructions j1208 that when executed will direct performance of the operation p1208. Furthermore, the direct modify structural electrical circuitry arrangement ("elec circ arrange") f1208, when activated, will perform the operation p1208. Also, the direct modify structural module n1208, when executed and/or activated, will direct performance of and/or perform the operation p1208. For instance, in one or more exemplary implementations, the one or more direct modify structural instructions j1208, when executed, direct performance of the operation p1208 in the illustrative depiction as follows, and/or the direct modify structural electrical circuitry arrangement f1208, when activated, performs the operation p1208 in the illustrative depiction as follows, and/or the direct modify structural module n1208, when executed and/or activated, directs performance of and/or performs the operation p1208 in the illustrative depiction as follows, and/or the operation p1208 is otherwise carried out in the illustrative depiction as follows: electronically directing control of the one or more depositions of the one or more materials as one or more structural texture modification materials (e.g. including liquid binders, etc.) onto the one or more portions of the one or more ingestible substrate structures to modify (e.g. including strengthening, etc.) one or more structural texture properties (e.g. including rigidity, etc.) of the one or more portions of the one or more ingestible substrate structures to form at least in part the one or more selected ingestible products.

In one or more implementations, as shown in FIG. 89, operation p12 includes an operation p1209 for electronically directing control of the one or more depositions of the one or more materials as one or more olfactory modification materials onto the one or more portions of the one or more ingestible substrate structures to modify one or more olfactory properties of the one or more portions of the one or more ingestible substrate structures to form at least in part the one or more selected ingestible products. Origination of an illustratively derived direct modify olfactory component group can be accomplished through skilled in the art design choice selection of one or more of the above depicted components from one or more of the above depicted subsystems shown in FIG. 16. Components from the direct modify olfactory component group can be used in implementing execution of the one or more direct modify olfactory instructions j1209 of FIG. 46, can be used in performance of the direct modify olfactory electrical circuitry arrangement f1209 of FIG. 47, and/or can be used in otherwise fulfillment of the operation p1209. An exemplary non-transitory signal bearing medium version of the information storage subsystem s200 is depicted in FIG. 46 as bearing the one or more direct modify olfactory instructions j1209 that when executed will direct performance of the operation p1209. Furthermore, the direct modify olfactory electrical circuitry arrangement ("elec circ arrange") f1209, when activated, will perform the operation p1209. Also, the direct modify olfactory module n1209, when executed and/or activated, will direct performance of and/or perform the operation p1209. For instance, in one or more exemplary implementations, the one or more direct modify olfactory instructions j1209, when executed, direct performance of the operation p1209 in the illustrative depiction as follows, and/or the direct modify olfactory electrical circuitry arrangement f1209, when activated, performs the operation p1209 in the illustrative depiction as follows, and/or the direct modify olfactory module n1209, when executed and/or activated, directs performance of and/or performs the operation p1209 in the illustrative depiction as follows, and/or the operation p1209 is otherwise carried out in the illustrative depiction as follows: electronically directing control of the one or more depositions of the one or more materials as one or more olfactory modification materials (e.g. including one or more food extracts, etc.) onto the one or more portions of the one or more ingestible substrate structures to modify (e.g. including adding scents, etc.) one or more olfactory properties (e.g. including smell of the substrate, etc.) of the one or more portions of the one or more ingestible substrate structures to form at least in part the one or more selected ingestible products.

Figure 90:
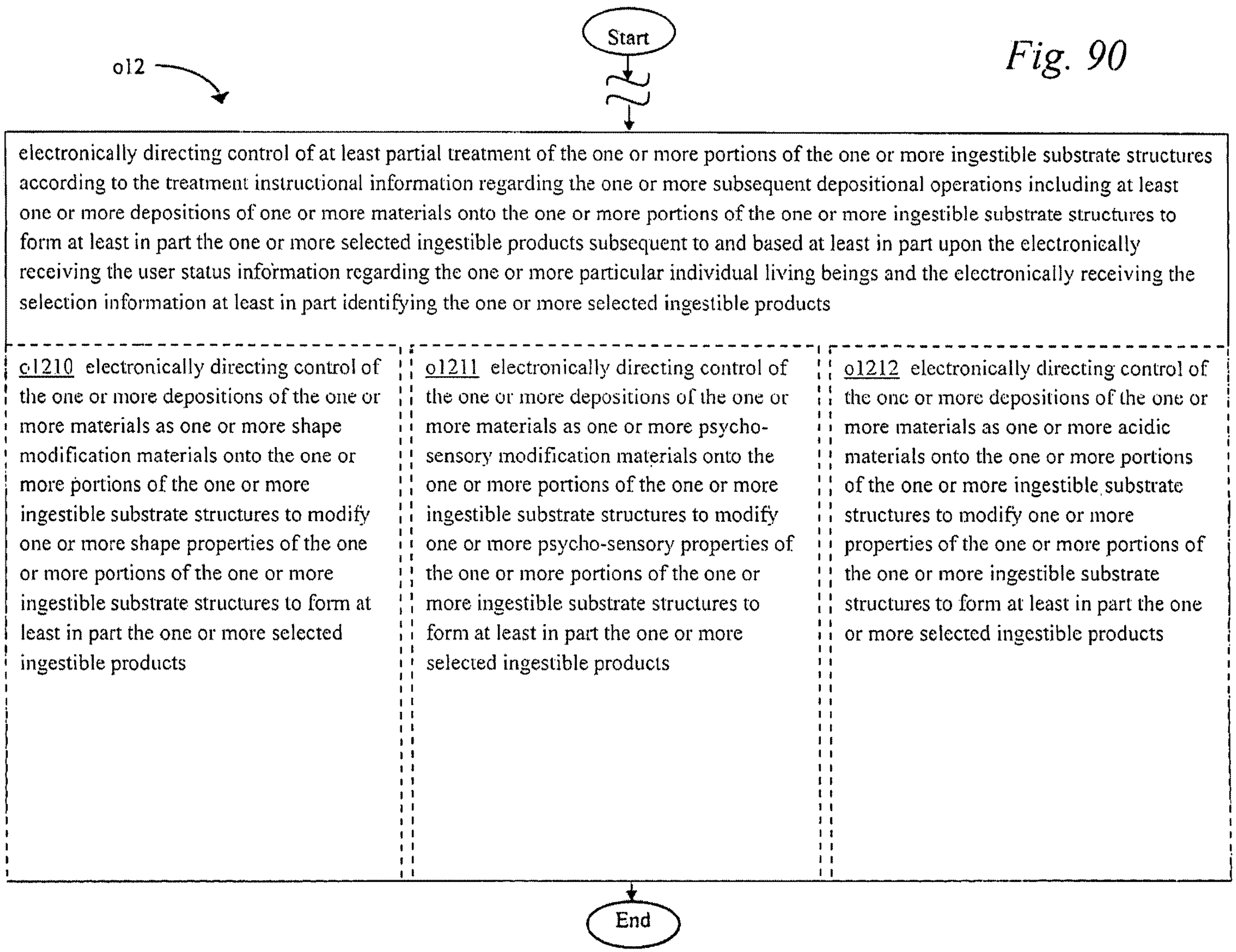
FIG. 90 is a high-level flowchart including exemplary implementations of operation p12 of FIG. 55.

In one or more implementations, as shown in FIG. 90, operation p12 includes an operation p1210 for electronically directing control of the one or more depositions of the one or more materials as one or more shape modification materials onto the one or more portions of the one or more ingestible substrate structures to modify one or more shape properties of the one or more portions of the one or more ingestible substrate structures to form at least in part the one or more selected ingestible products. Origination of an illustratively derived direct modify shape component group can be accomplished through skilled in the art design choice selection of one or more of the above depicted components from one or more of the above depicted subsystems shown in FIG. 16. Components from the direct modify shape component group can be used in implementing execution of the one or more direct modify shape instructions j1210 of FIG. 46, can be used in performance of the direct modify shape electrical circuitry arrangement f1210 of FIG. 47, and/or can be used in otherwise fulfillment of the operation p1210. An exemplary non-transitory signal bearing medium version of the information storage subsystem s200 is depicted in FIG. 46 as bearing the one or more direct modify shape instructions j1210 that when executed will direct performance of the operation p1210. Furthermore, the direct modify shape electrical circuitry arrangement ("elec circ arrange") f1210, when activated, will perform the operation p1210. Also, the direct modify shape module n1210, when executed and/or activated, will direct performance of and/or perform the operation p1210. For instance, in one or more exemplary implementations, the one or more direct modify shape instructions j1210, when executed, direct performance of the operation p1210 in the illustrative depiction as follows, and/or the direct modify shape electrical circuitry arrangement f1210, when activated, performs the operation p1210 in the illustrative depiction as follows, and/or the direct modify shape module n1210, when executed and/or activated, directs performance of and/or performs the operation p1210 in the illustrative depiction as follows, and/or the operation p1210 is otherwise carried out in the illustrative depiction as follows: electronically directing control of the one or more depositions of the one or more materials as one or more shape modification materials (e.g. including dissolving agents, etc.) onto the one or more portions of the one or more ingestible substrate structures to modify (e.g. including eliminate portions of the substrate, etc.) one or more shape properties (e.g. including changing a rectangularly configured substrate to irregularly configured substrate, etc.) of the one or more portions of the one or more ingestible substrate structures to form at least in part the one or more selected ingestible products.

In one or more implementations, as shown in FIG. 90, operation p12 includes an operation p1211 for electronically directing control of the one or more depositions of the one or more materials as one or more psycho-sensory modification materials onto the one or more portions of the one or more ingestible substrate structures to modify one or more psycho-sensory properties of the one or more portions of the one or more ingestible substrate structures to form at least in part the one or more selected ingestible products. Origination of an illustratively derived direct modify psycho-sensory component group can be accomplished through skilled in the art design choice selection of one or more of the above depicted components from one or more of the above depicted subsystems shown in FIG. 16.

Figure 47:
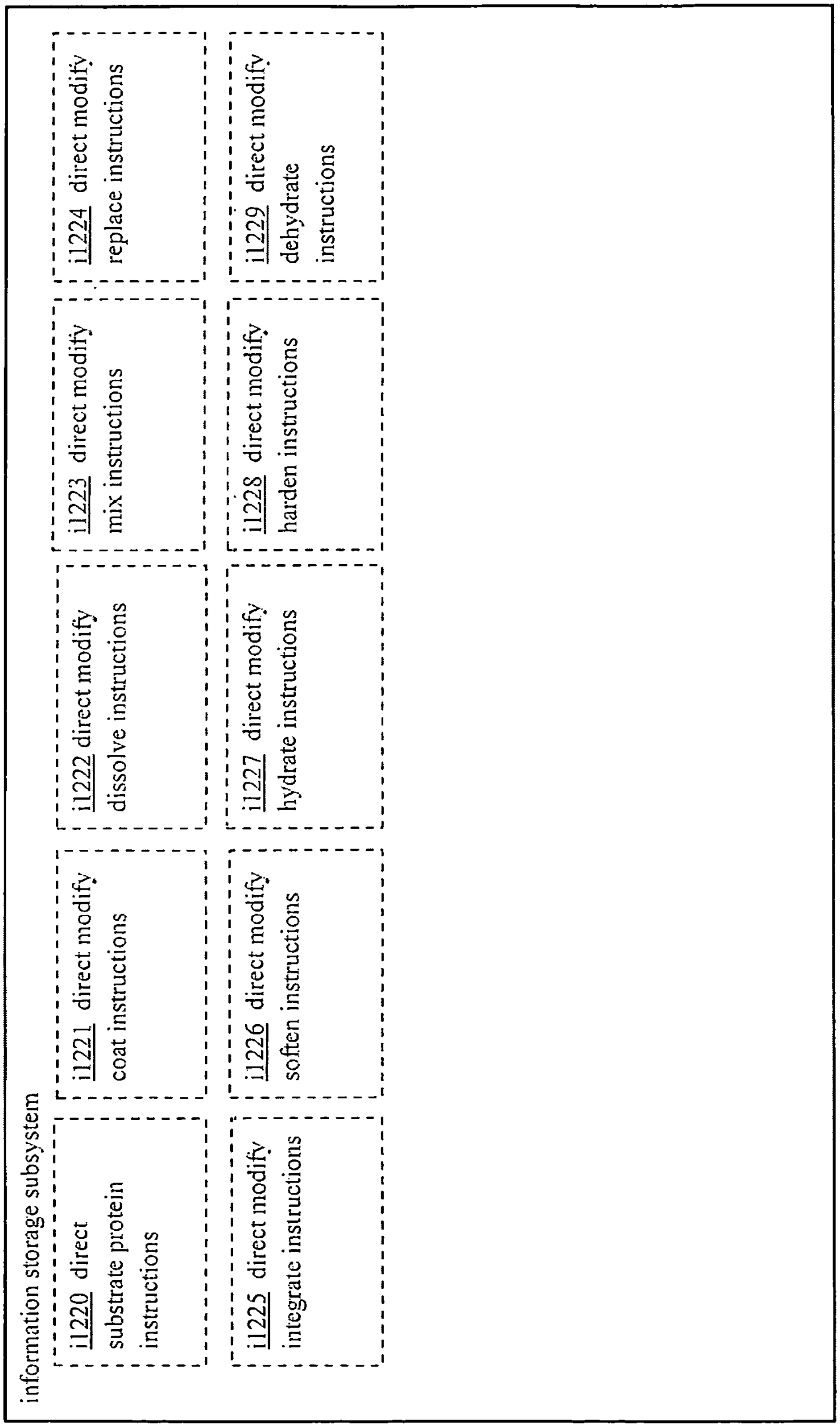
FIG. 47 is a block diagram depicting one or more exemplary instructions of the information storage subsystem s200 of the ingestible product preparation system 10 of FIG. 1.

Components from the direct modify psycho-sensory component group can be used in implementing execution of the one or more direct modify psycho-sensory instructions j1211 of FIG. 46, can be used in performance of the direct modify psycho-sensory electrical circuitry arrangement f1211 of FIG. 47, and/or can be used in otherwise fulfillment of the operation p1211. An exemplary non-transitory signal bearing medium version of the information storage subsystem s200 is depicted in FIG. 46 as bearing the one or more direct modify psycho-sensory instructions j1211 that when executed will direct performance of the operation p1211. Furthermore, the direct modify psycho-sensory electrical circuitry arrangement ("elec circ arrange") f1211, when activated, will perform the operation p1211. Also, the direct modify psycho-sensory module n1211, when executed and/or activated, will direct performance of and/or perform the operation p1211. For instance, in one or more exemplary implementations, the one or more direct modify psycho-sensory instructions j1211, when executed, direct performance of the operation p1211 in the illustrative depiction as follows, and/or the direct modify psycho-sensory electrical circuitry arrangement f1211, when activated, performs the operation p1211 in the illustrative depiction as follows, and/or the direct modify psycho-sensory module n1211, when executed and/or activated, directs performance of and/or performs the operation p1211 in the illustrative depiction as follows, and/or the operation p1211 is otherwise carried out in the illustrative depiction as follows: electronically directing control of the one or more depositions of the one or more materials as one or more psycho-sensory modification materials (e.g. including colored and scented liquids, etc.) onto the one or more portions of the one or more ingestible substrate structures to modify (e.g. including adding perceived sensory output associated with a selected ingestible product, etc.) one or more psycho-sensory properties (e.g. including perceived flavor as influenced by a combination of color and scent, etc.) of the one or more portions of the one or more ingestible substrate structures to form at least in part the one or more selected ingestible products.

In one or more implementations, as shown in FIG. 90, operation p12 includes an operation p1212 for electronically directing control of the one or more depositions of the one or more materials as one or more acidic materials onto the one or more portions of the one or more ingestible substrate structures to modify one or more properties of the one or more portions of the one or more ingestible substrate structures to form at least in part the one or more selected ingestible products. Origination of an illustratively derived direct modify acidic component group can be accomplished through skilled in the art design choice selection of one or more of the above depicted components from one or more of the above depicted subsystems shown in FIG. 16. Components from the direct modify acidic component group can be used in implementing execution of the one or more direct modify acidic instructions j1212 of FIG. 46, can be used in performance of the direct modify acidic electrical circuitry arrangement f1212 of FIG. 47, and/or can be used in otherwise fulfillment of the operation p1212. An exemplary non-transitory signal bearing medium version of the information storage subsystem s200 is depicted in FIG. 46 as bearing the one or more direct modify acidic instructions j1212 that when executed will direct performance of the operation p1212. Furthermore, the direct modify acidic electrical circuitry arrangement ("elec circ arrange") f1212, when activated, will perform the operation p1212. Also, the direct modify acidic module n1212, when executed and/or activated, will direct performance of and/or perform the operation p1212. For instance, in one or more exemplary implementations, the one or more direct modify acidic instructions j1212, when executed, direct performance of the operation p1212 in the illustrative depiction as follows, and/or the direct modify acidic electrical circuitry arrangement f1212, when activated, performs the operation p1212 in the illustrative depiction as follows, and/or the direct modify acidic module n1212, when executed and/or activated, directs performance of and/or performs the operation p1212 in the illustrative depiction as follows, and/or the operation p1212 is otherwise carried out in the illustrative depiction as follows: electronically directing control of the one or more depositions of the one or more materials as one or more acidic materials (e.g. including acetic acid, etc.) onto the one or more portions of the one or more ingestible substrate structures to modify (e.g. including intensify, etc.) one or more properties (e.g. including flavors, etc.) of the one or more portions of the one or more ingestible substrate structures to form at least in part the one or more selected ingestible products.

Figure 91:
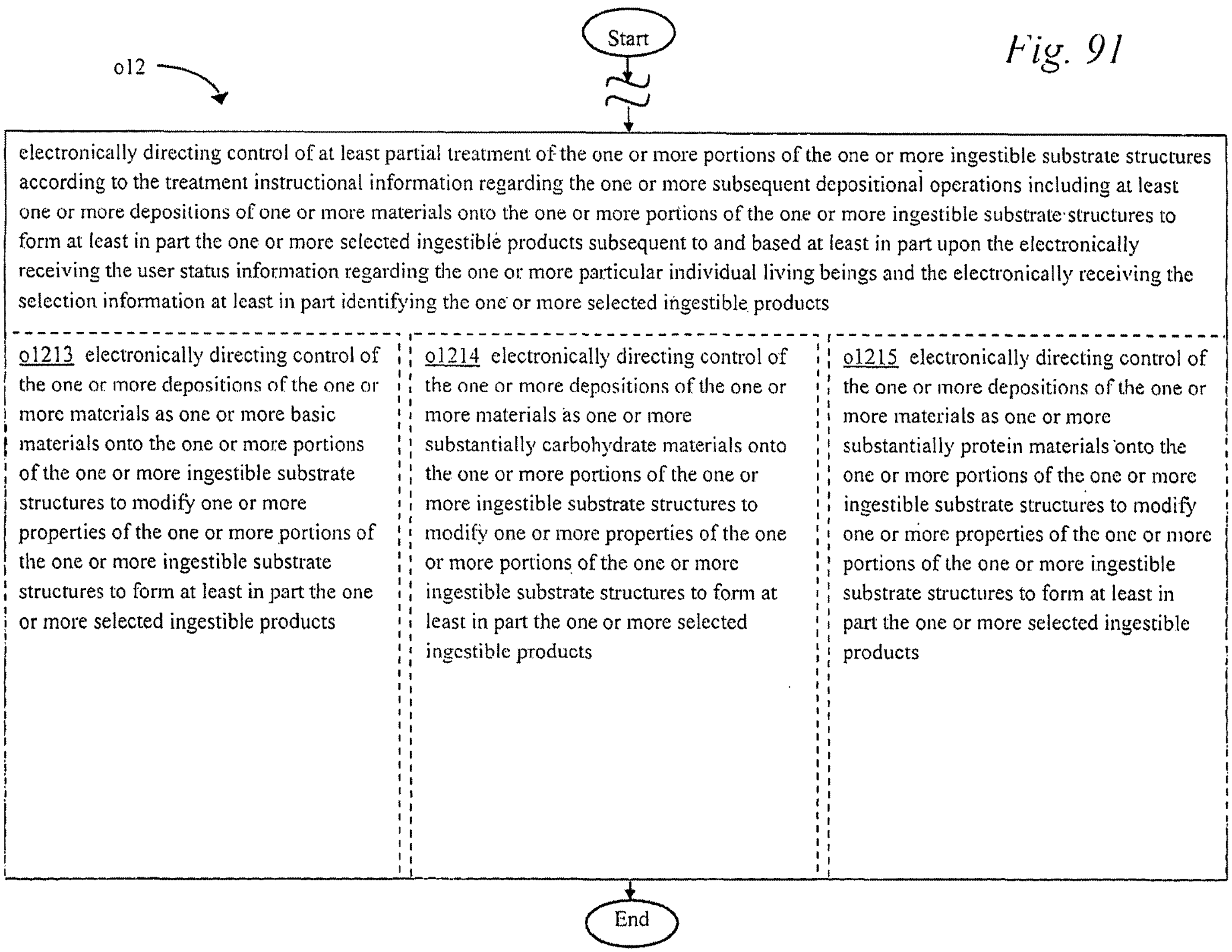
FIG. 91 is a high-level flowchart including exemplary implementations of operation p12 of FIG. 55.

In one or more implementations, as shown in FIG. 91, operation p12 includes an operation p1213 for electronically directing control of the one or more depositions of the one or more materials as one or more basic materials onto the one or more portions of the one or more ingestible substrate structures to modify one or more properties of the one or more portions of the one or more ingestible substrate structures to form at least in part the one or more selected ingestible products. Origination of an illustratively derived direct modify basic component group can be accomplished through skilled in the art design choice selection of one or more of the above depicted components from one or more of the above depicted subsystems shown in FIG. 16. Components from the direct modify basic component group can be used in implementing execution of the one or more direct modify basic instructions j1213 of FIG. 46, can be used in performance of the direct modify basic electrical circuitry arrangement f1213 of FIG. 47, and/or can be used in otherwise fulfillment of the operation p1213. An exemplary non-transitory signal bearing medium version of the information storage subsystem s200 is depicted in FIG. 46 as bearing the one or more direct modify basic instructions j1213 that when executed will direct performance of the operation p1213. Furthermore, the direct modify basic electrical circuitry arrangement ("elec circ arrange") f1213, when activated, will perform the operation p1213. Also, the direct modify basic module n1213, when executed and/or activated, will direct performance of and/or perform the operation p1213. For instance, in one or more exemplary implementations, the one or more direct modify basic instructions j1213, when executed, direct performance of the operation p1213 in the illustrative depiction as follows, and/or the direct modify basic electrical circuitry arrangement f1213, when activated, performs the operation p1213 in the illustrative depiction as follows, and/or the direct modify basic module n1213, when executed and/or activated, directs performance of and/or performs the operation p1213 in the illustrative depiction as follows, and/or the operation p1213 is otherwise carried out in the illustrative depiction as follows: electronically directing control of the one or more depositions of the one or more materials as one or more basic materials (e.g. including sodium bicarbonate, etc.) onto the one or more portions of the one or more ingestible substrate structures to modify (e.g. including reactivity to oxidizing compounds, etc.) one or more properties (e.g. including surface color, etc.) of the one or more portions of the one or more ingestible substrate structures to form at least in part the one or more selected ingestible products.

In one or more implementations, as shown in FIG. 91, operation p12 includes an operation p1214 for electronically directing control of the one or more depositions of the one or more materials as one or more substantially carbohydrate materials onto the one or more portions of the one or more ingestible substrate structures to modify one or more properties of the one or more portions of the one or more ingestible substrate structures to form at least in part the one or more selected ingestible products. Origination of an illustratively derived direct modify carbohydrate component group can be accomplished through skilled in the art design choice selection of one or more of the above depicted components from one or more of the above depicted subsystems shown in FIG. 16. Components from the direct modify carbohydrate component group can be used in implementing execution of the one or more direct modify carbohydrate instructions j1214 of FIG. 46, can be used in performance of the direct modify carbohydrate electrical circuitry arrangement f1214 of FIG. 47, and/or can be used in otherwise fulfillment of the operation p1214. An exemplary non-transitory signal bearing medium version of the information storage subsystem s200 is depicted in FIG. 46 as bearing the one or more direct modify carbohydrate instructions j1214 that when executed will direct performance of the operation p1214. Furthermore, the direct modify carbohydrate electrical circuitry arrangement ("elec circ arrange") f1214, when activated, will perform the operation p1214. Also, the direct modify carbohydrate module n1214, when executed and/or activated, will direct performance of and/or perform the operation p1214. For instance, in one or more exemplary implementations, the one or more direct modify carbohydrate instructions j1214, when executed, direct performance of the operation p1214 in the illustrative depiction as follows, and/or the direct modify carbohydrate electrical circuitry arrangement f1214, when activated, performs the operation p1214 in the illustrative depiction as follows, and/or the direct modify carbohydrate module n1214, when executed and/or activated, directs performance of and/or performs the operation p1214 in the illustrative depiction as follows, and/or the operation p1214 is otherwise carried out in the illustrative depiction as follows: electronically directing control of the one or more depositions of the one or more materials as one or more substantially carbohydrate materials (e.g. including sugars, etc.) onto the one or more portions of the one or more ingestible substrate structures to modify (e.g. change surface composition, etc.) one or more properties (e.g. including flavor, etc.) of the one or more portions of the one or more ingestible substrate structures to form at least in part the one or more selected ingestible products.

In one or more implementations, as shown in FIG. 91, operation p12 includes an operation p1215 for electronically directing control of the one or more depositions of the one or more materials as one or more substantially protein materials onto the one or more portions of the one or more ingestible substrate structures to modify one or more properties of the one or more portions of the one or more ingestible substrate structures to form at least in part the one or more selected ingestible products. Origination of an illustratively derived direct modify protein component group can be accomplished through skilled in the art design choice selection of one or more of the above depicted components from one or more of the above depicted subsystems shown in FIG. 16. Components from the direct modify protein component group can be used in implementing execution of the one or more direct modify protein instructions j1215 of FIG. 46, can be used in performance of the direct modify protein electrical circuitry arrangement f1215 of FIG. 47, and/or can be used in otherwise fulfillment of the operation p1215. An exemplary non-transitory signal bearing medium version of the information storage subsystem s200 is depicted in FIG. 46 as bearing the one or more direct modify protein instructions j1215 that when executed will direct performance of the operation p1215. Furthermore, the direct modify protein electrical circuitry arrangement ("elec circ arrange") f1215, when activated, will perform the operation p1215. Also, the direct modify protein module n1215, when executed and/or activated, will direct performance of and/or perform the operation p1215. For instance, in one or more exemplary implementations, the one or more direct modify protein instructions j1215, when executed, direct performance of the operation p1215 in the illustrative depiction as follows, and/or the direct modify protein electrical circuitry arrangement f1215, when activated, performs the operation p1215 in the illustrative depiction as follows, and/or the direct modify protein module n1215, when executed and/or activated, directs performance of and/or performs the operation p1215 in the illustrative depiction as follows, and/or the operation p1215 is otherwise carried out in the illustrative depiction as follows: electronically directing control of the one or more depositions of the one or more materials as one or more substantially protein materials (e.g. including whey powder, etc.) onto the one or more portions of the one or more ingestible substrate structures to modify (e.g. including add to the surface composition, etc.) one or more properties (e.g. including increase protein content, etc.) of the one or more portions of the one or more ingestible substrate structures to form at least in part the one or more selected ingestible products.

Figure 92:
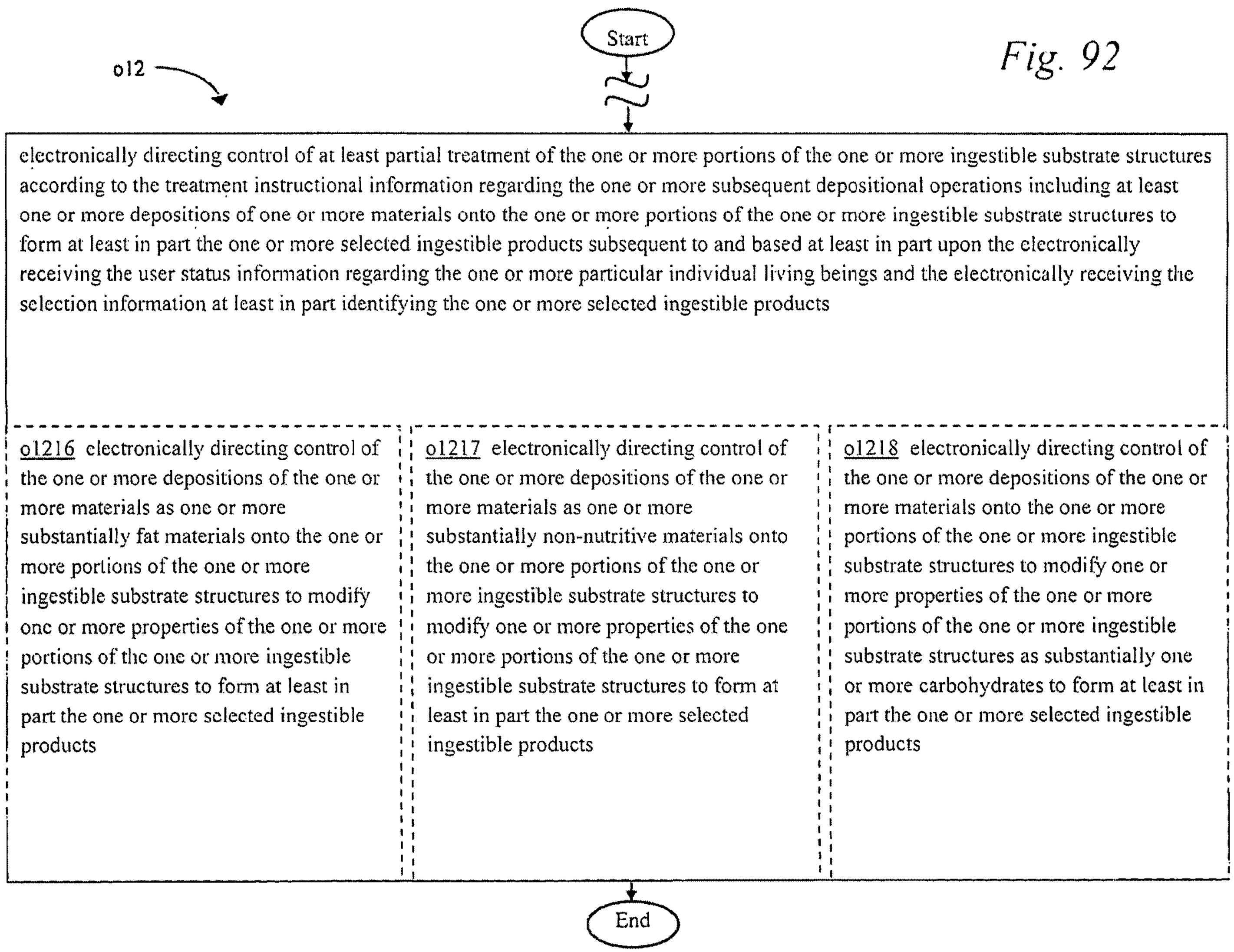
FIG. 92 is a high-level flowchart including exemplary implementations of operation p12 of FIG. 55.

In one or more implementations, as shown in FIG. 92, operation p12 includes an operation p1216 for electronically directing control of the one or more depositions of the one or more materials as one or more substantially fat materials onto the one or more portions of the one or more ingestible substrate structures to modify one or more properties of the one or more portions of the one or more ingestible substrate structures to form at least in part the one or more selected ingestible products. Origination of an illustratively derived direct modify fat component group can be accomplished through skilled in the art design choice selection of one or more of the above depicted components from one or more of the above depicted subsystems shown in FIG. 16. Components from the direct modify fat component group can be used in implementing execution of the one or more direct modify fat instructions j1216 of FIG. 46, can be used in performance of the direct modify fat electrical circuitry arrangement f1216 of FIG. 47, and/or can be used in otherwise fulfillment of the operation p1216. An exemplary non-transitory signal bearing medium version of the information storage subsystem s200 is depicted in FIG. 46 as bearing the one or more direct modify fat instructions j1216 that when executed will direct performance of the operation p1216. Furthermore, the direct modify fat electrical circuitry arrangement ("elec circ arrange") f1216, when activated, will perform the operation p1216. Also, the direct modify fat module n1216, when executed and/or activated, will direct performance of and/or perform the operation p1216. For instance, in one or more exemplary implementations, the one or more direct modify fat instructions j1216, when executed, direct performance of the operation p1216 in the illustrative depiction as follows, and/or the direct modify fat electrical circuitry arrangement f1216, when activated, performs the operation p1216 in the illustrative depiction as follows, and/or the direct modify fat module n1216, when executed and/or activated, directs performance of and/or performs the operation p1216 in the illustrative depiction as follows, and/or the operation p1216 is otherwise carried out in the illustrative depiction as follows: electronically directing control of the one or more depositions of the one or more materials as one or more substantially fat materials (e.g. including refined vegetable oil, etc.) onto the one or more portions of the one or more ingestible substrate structures to modify (e.g. including increase fat content of structure, etc.) one or more properties (e.g. including calorie content, etc.) of the one or more portions of the one or more ingestible substrate structures to form at least in part the one or more selected ingestible products.

In one or more implementations, as shown in FIG. 92, operation p12 includes an operation p1217 for electronically directing control of the one or more depositions of the one or more materials as one or more substantially non-nutritive materials onto the one or more portions of the one or more ingestible substrate structures to modify one or more properties of the one or more portions of the one or more ingestible substrate structures to form at least in part the one or more selected ingestible products. Origination of an illustratively derived direct modify non-nutritive component group can be accomplished through skilled in the art design choice selection of one or more of the above depicted components from one or more of the above depicted subsystems shown in FIG. 16. Components from the direct modify non-nutritive component group can be used in implementing execution of the one or more direct modify non-nutritive instructions j1217 of FIG. 46, can be used in performance of the direct modify non-nutritive electrical circuitry arrangement f1217 of FIG. 47, and/or can be used in otherwise fulfillment of the operation p1217. An exemplary non-transitory signal bearing medium version of the information storage subsystem s200 is depicted in FIG. 46 as bearing the one or more direct modify non-nutritive instructions j1217 that when executed will direct performance of the operation p1217. Furthermore, the direct modify non-nutritive electrical circuitry arrangement ("elec circ arrange") f1217, when activated, will perform the operation p1217. Also, the direct modify non-nutritive module n1217, when executed and/or activated, will direct performance of and/or perform the operation p1217. For instance, in one or more exemplary implementations, the one or more direct modify non-nutritive instructions j1217, when executed, direct performance of the operation p1217 in the illustrative depiction as follows, and/or the direct modify non-nutritive electrical circuitry arrangement f1217, when activated, performs the operation p1217 in the illustrative depiction as follows, and/or the direct modify non-nutritive module n1217, when executed and/or activated, directs performance of and/or performs the operation p1217 in the illustrative depiction as follows, and/or the operation p1217 is otherwise carried out in the illustrative depiction as follows: electronically directing control of the one or more depositions of the one or more materials as one or more substantially non-nutritive materials (e.g. including a bulking agent powder, etc.) onto the one or more portions of the one or more ingestible substrate structures to modify (e.g. including increasing volume, etc.) one or more properties (e.g. including size and structural texture, etc.) of the one or more portions of the one or more ingestible substrate structures to form at least in part the one or more selected ingestible products.

In one or more implementations, as shown in FIG. 92, operation p12 includes an operation p1218 for electronically directing control of the one or more depositions of the one or more materials onto the one or more portions of the one or more ingestible substrate structures to modify one or more properties of the one or more portions of the one or more ingestible substrate structures as substantially one or more carbohydrates to form at least in part the one or more selected ingestible products. Origination of an illustratively derived direct substrate carbohydrate component group can be accomplished through skilled in the art design choice selection of one or more of the above depicted components from one or more of the above depicted subsystems shown in FIG. 16. Components from the direct substrate carbohydrate component group can be used in implementing execution of the one or more direct substrate carbohydrate instructions j1218 of FIG. 46, can be used in performance of the direct substrate carbohydrate electrical circuitry arrangement f1218 of FIG. 47, and/or can be used in otherwise fulfillment of the operation p1218. An exemplary non-transitory signal bearing medium version of the information storage subsystem s200 is depicted in FIG. 46 as bearing the one or more direct substrate carbohydrate instructions j1218 that when executed will direct performance of the operation p1218. Furthermore, the direct substrate carbohydrate electrical circuitry arrangement ("elec circ arrange") f1218, when activated, will perform the operation p1218. Also, the direct substrate carbohydrate module n1218, when executed and/or activated, will direct performance of and/or perform the operation p1218. For instance, in one or more exemplary implementations, the one or more direct substrate carbohydrate instructions j1218, when executed, direct performance of the operation p1218 in the illustrative depiction as follows, and/or the direct substrate carbohydrate electrical circuitry arrangement f1218, when activated, performs the operation p1218 in the illustrative depiction as follows, and/or the direct substrate carbohydrate module n1218, when executed and/or activated, directs performance of and/or performs the operation p1218 in the illustrative depiction as follows, and/or the operation p1218 is otherwise carried out in the illustrative depiction as follows: electronically directing control of the one or more depositions of the one or more materials onto the one or more portions of the one or more ingestible substrate structures to modify (e.g. including changing, etc.) one or more properties (e.g. including flavor, etc.) of the one or more portions of the one or more ingestible substrate structures as substantially one or more carbohydrates (e.g. including rice starch, etc.) to form at least in part the one or more selected ingestible products.

Figure 93:
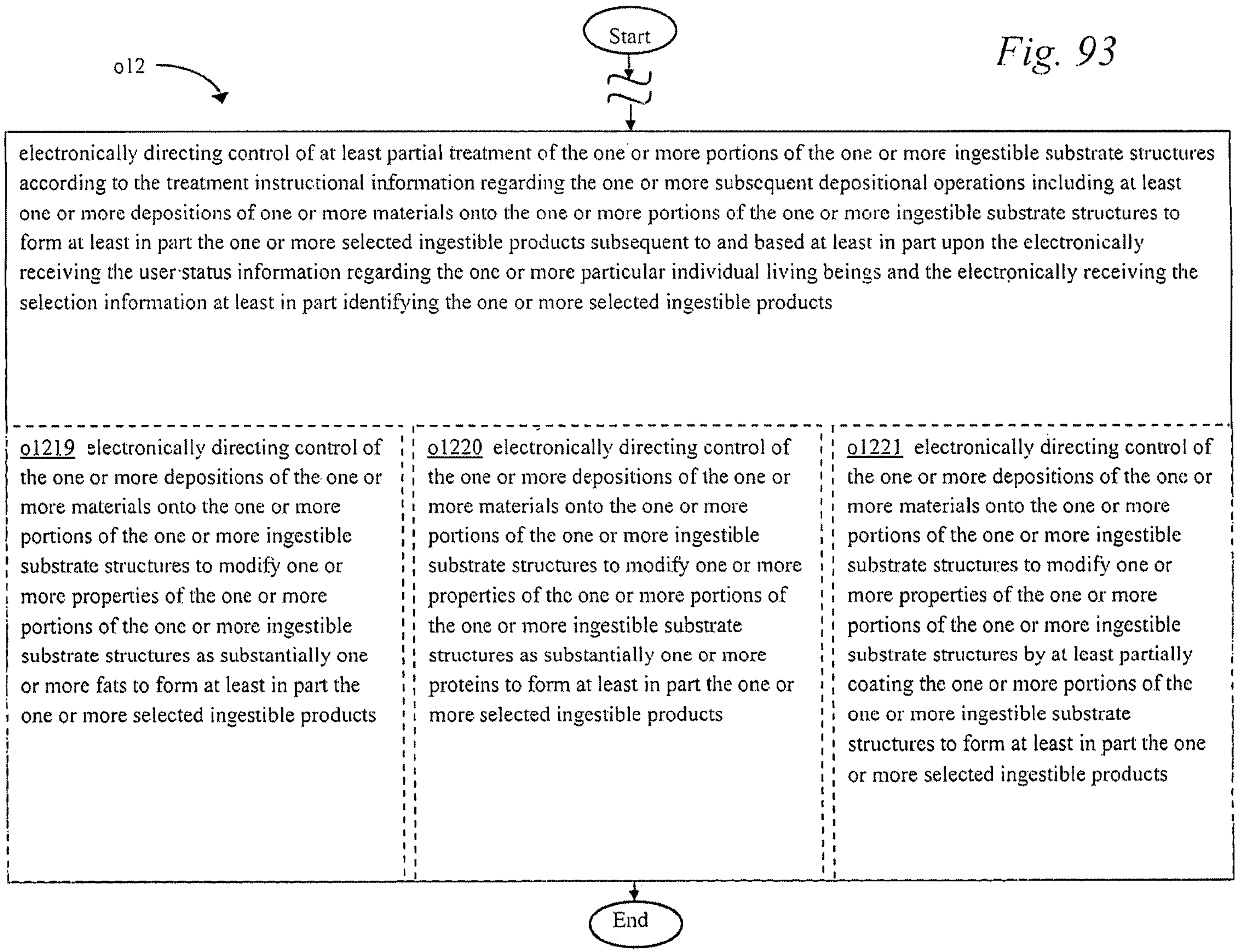
FIG. 93 is a high-level flowchart including exemplary implementations of operation p12 of FIG. 55.

In one or more implementations, as shown in FIG. 93, operation p12 includes an operation p1219 for electronically directing control of the one or more depositions of the one or more materials onto the one or more portions of the one or more ingestible substrate structures to modify one or more properties of the one or more portions of the one or more ingestible substrate structures as substantially one or more fats to form at least in part the one or more selected ingestible products. Origination of an illustratively derived direct substrate fat component group can be accomplished through skilled in the art design choice selection of one or more of the above depicted components from one or more of the above depicted subsystems shown in FIG. 16. Components from the direct substrate fat component group can be used in implementing execution of the one or more direct substrate fat instructions j1219 of FIG. 46, can be used in performance of the direct substrate fat electrical circuitry arrangement f1219 of FIG. 47, and/or can be used in otherwise fulfillment of the operation p1219. An exemplary non-transitory signal bearing medium version of the information storage subsystem s200 is depicted in FIG. 46 as bearing the one or more direct substrate fat instructions j1219 that when executed will direct performance of the operation p1219. Furthermore, the direct substrate fat electrical circuitry arrangement ("elec circ arrange") f1219, when activated, will perform the operation p1219. Also, the direct substrate fat module n1219, when executed and/or activated, will direct performance of and/or perform the operation p1219. For instance, in one or more exemplary implementations, the one or more direct substrate fat instructions j1219, when executed, direct performance of the operation p1219 in the illustrative depiction as follows, and/or the direct substrate fat electrical circuitry arrangement f1219, when activated, performs the operation p1219 in the illustrative depiction as follows, and/or the direct substrate fat module n1219, when executed and/or activated, directs performance of and/or performs the operation p1219 in the illustrative depiction as follows, and/or the operation p1219 is otherwise carried out in the illustrative depiction as follows: electronically directing control of the one or more depositions of the one or more materials onto the one or more portions of the one or more ingestible substrate structures to modify (e.g. including darken, etc.) one or more properties (e.g. including substrate color, etc.) of the one or more portions of the one or more ingestible substrate structures as substantially one or more fats (e.g. including coconut oil, etc.) to form at least in part the one or more selected ingestible products.

In one or more implementations, as shown in FIG. 93, operation p12 includes an operation p1220 for electronically directing control of the one or more depositions of the one or more materials onto the one or more portions of the one or more ingestible substrate structures to modify one or more properties of the one or more portions of the one or more ingestible substrate structures as substantially one or more proteins to form at least in part the one or more selected ingestible products. Origination of an illustratively derived direct substrate protein component group can be accomplished through skilled in the art design choice selection of one or more of the above depicted components from one or more of the above depicted subsystems shown in FIG. 16. Components from the direct substrate protein component group can be used in implementing execution of the one or more direct substrate protein instructions j1220 of FIG. 47, can be used in performance of the direct substrate protein electrical circuitry arrangement f1220 of FIG. 40, and/or can be used in otherwise fulfillment of the operation p1220. An exemplary non-transitory signal bearing medium version of the information storage subsystem s200 is depicted in FIG. 47 as bearing the one or more direct substrate protein instructions j1220 that when executed will direct performance of the operation p1220. Furthermore, the direct substrate protein electrical circuitry arrangement ("elec circ arrange") f1220, when activated, will perform the operation p1220. Also, the direct substrate protein module n1220, when executed and/or activated, will direct performance of and/or perform the operation p1220. For instance, in one or more exemplary implementations, the one or more direct substrate protein instructions j1220, when executed, direct performance of the operation p1220 in the illustrative depiction as follows, and/or the direct substrate protein electrical circuitry arrangement f1220, when activated, performs the operation p1220 in the illustrative depiction as follows, and/or the direct substrate protein module n1220, when executed and/or activated, directs performance of and/or performs the operation p1220 in the illustrative depiction as follows, and/or the operation p1220 is otherwise carried out in the illustrative depiction as follows: electronically directing control of the one or more depositions of the one or more materials onto the one or more portions of the one or more ingestible substrate structures to modify (e.g. including increase, etc.) one or more properties (e.g. including protein content, etc.) of the one or more portions of the one or more ingestible substrate structures as substantially one or more proteins (e.g. including peanut butter, etc.) to form at least in part the one or more selected ingestible products.

In one or more implementations, as shown in FIG. 93, operation p12 includes an operation p1221 for electronically directing control of the one or more depositions of the one or more materials onto the one or more portions of the one or more ingestible substrate structures to modify one or more properties of the one or more portions of the one or more ingestible substrate structures by at least partially coating the one or more portions of the one or more ingestible substrate structures to form at least in part the one or more selected ingestible products. Origination of an illustratively derived direct modify coat component group can be accomplished through skilled in the art design choice selection of one or more of the above depicted components from one or more of the above depicted subsystems shown in FIG. 16. Components from the direct modify coat component group can be used in implementing execution of the one or more direct modify coat instructions j1221 of FIG. 47, can be used in performance of the direct modify coat electrical circuitry arrangement f1221 of FIG. 40, and/or can be used in otherwise fulfillment of the operation p1221. An exemplary non-transitory signal bearing medium version of the information storage subsystem s200 is depicted in FIG. 47 as bearing the one or more direct modify coat instructions j1221 that when executed will direct performance of the operation p1221. Furthermore, the direct modify coat electrical circuitry arrangement ("elec circ arrange") f1221, when activated, will perform the operation p1221. Also, the direct modify coat module n1221, when executed and/or activated, will direct performance of and/or perform the operation p1221. For instance, in one or more exemplary implementations, the one or more direct modify coat instructions j1221, when executed, direct performance of the operation p1221 in the illustrative depiction as follows, and/or the direct modify coat electrical circuitry arrangement f1221, when activated, performs the operation p1221 in the illustrative depiction as follows, and/or the direct modify coat module n1221, when executed and/or activated, directs performance of and/or performs the operation p1221 in the illustrative depiction as follows, and/or the operation p1221 is otherwise carried out in the illustrative depiction as follows: electronically directing control of the one or more depositions of the one or more materials onto the one or more portions of the one or more ingestible substrate structures to modify (e.g. including changing, etc.) one or more properties (e.g. including flavor, etc.) of the one or more portions of the one or more ingestible substrate structures by at least partially coating (e.g. depositing a spread, etc.) the one or more portions of the one or more ingestible substrate structures to form at least in part the one or more selected ingestible products.

Figure 94:
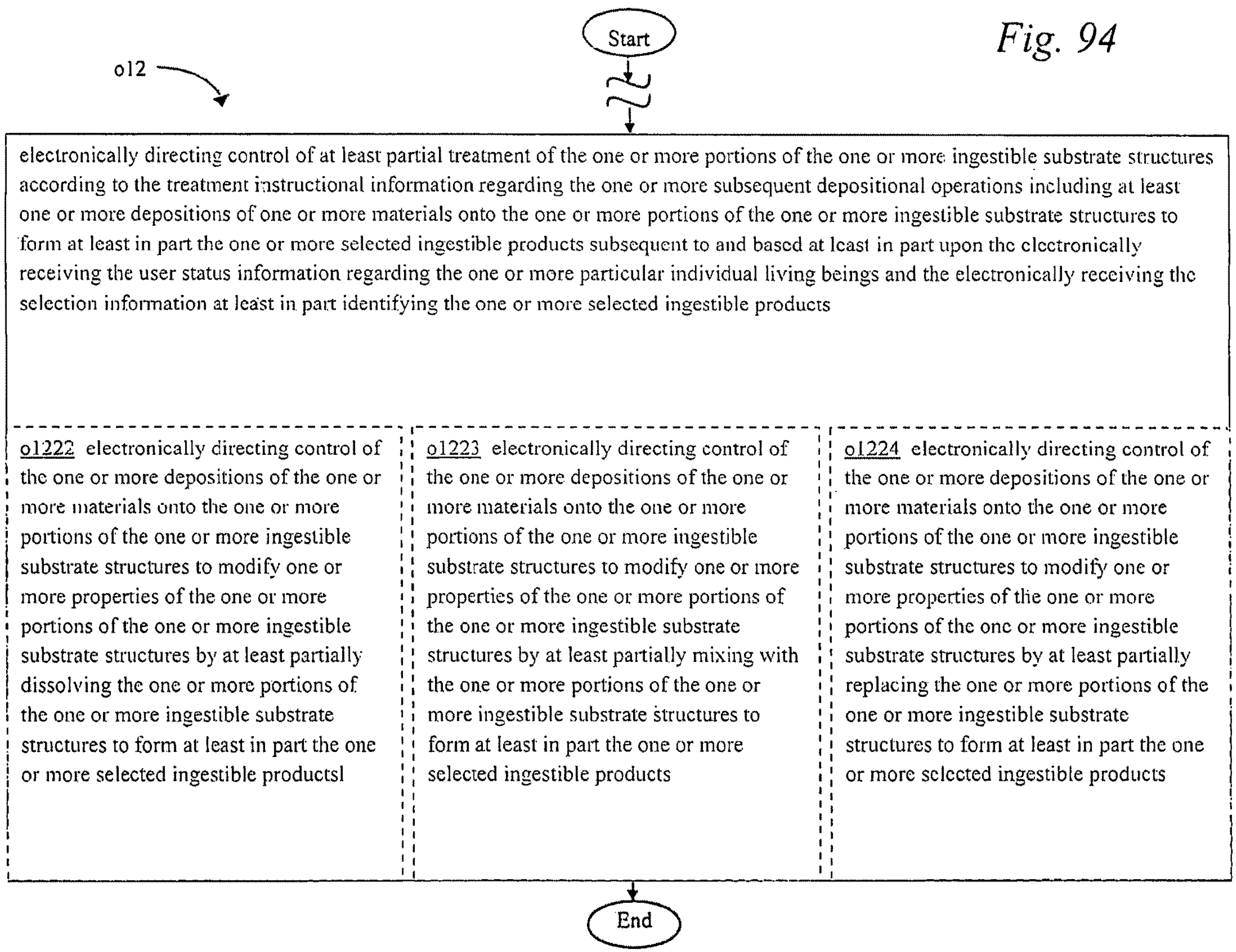
FIG. 94 is a high-level flowchart including exemplary implementations of operation p12 of FIG. 55.

In one or more implementations, as shown in FIG. 94, operation p12 includes an operation p1222 for electronically directing control of the one or more depositions of the one or more materials onto the one or more portions of the one or more ingestible substrate structures to modify one or more properties of the one or more portions of the one or more ingestible substrate structures by at least partially dissolving the one or more portions of the one or more ingestible substrate structures to form at least in part the one or more selected ingestible products. Origination of an illustratively derived direct modify dissolve component group can be accomplished through skilled in the art design choice selection of one or more of the above depicted components from one or more of the above depicted subsystems shown in FIG. 16. Components from the direct modify dissolve component group can be used in implementing execution of the one or more direct modify dissolve instructions j1222 of FIG. 47, can be used in performance of the direct modify dissolve electrical circuitry arrangement f1222 of FIG. 40, and/or can be used in otherwise fulfillment of the operation p1222. An exemplary non-transitory signal bearing medium version of the information storage subsystem s200 is depicted in FIG. 47 as bearing the one or more direct modify dissolve instructions j1222 that when executed will direct performance of the operation p1222. Furthermore, the direct modify dissolve electrical circuitry arrangement ("elec circ arrange") f1222, when activated, will perform the operation p1222. Also, the direct modify dissolve module n1222, when executed and/or activated, will direct performance of and/or perform the operation p1222. For instance, in one or more exemplary implementations, the one or more direct modify dissolve instructions j1222, when executed, direct performance of the operation p1222 in the illustrative depiction as follows, and/or the direct modify dissolve electrical circuitry arrangement f1222, when activated, performs the operation p1222 in the illustrative depiction as follows, and/or the direct modify dissolve module n1222, when executed and/or activated, directs performance of and/or performs the operation p1222 in the illustrative depiction as follows, and/or the operation p1222 is otherwise carried out in the illustrative depiction as follows: electronically directing control of the one or more depositions of the one or more materials onto the one or more portions of the one or more ingestible substrate structures to modify (e.g. including removing, etc.) one or more properties (e.g. including shape, etc.) of the one or more portions of the one or more ingestible substrate structures by at least partially dissolving (e.g. including reactive chemicals with the substrate, etc.) the one or more portions of the one or more ingestible substrate structures to form at least in part the one or more selected ingestible products.

In one or more implementations, as shown in FIG. 94, operation p12 includes an operation p1223 for electronically directing control of the one or more depositions of the one or more materials onto the one or more portions of the one or more ingestible substrate structures to modify one or more properties of the one or more portions of the one or more ingestible substrate structures by at least partially mixing with the one or more portions of the one or more ingestible substrate structures to form at least in part the one or more selected ingestible products. Origination of an illustratively derived direct modify mix component group can be accomplished through skilled in the art design choice selection of one or more of the above depicted components from one or more of the above depicted subsystems shown in FIG. 16. Components from the direct modify mix component group can be used in implementing execution of the one or more direct modify mix instructions j1223 of FIG. 47, can be used in performance of the direct modify mix electrical circuitry arrangement f1223 of FIG. 40, and/or can be used in otherwise fulfillment of the operation p1223. An exemplary non-transitory signal bearing medium version of the information storage subsystem s200 is depicted in FIG. 47 as bearing the one or more direct modify mix instructions j1223 that when executed will direct performance of the operation p1223. Furthermore, the direct modify mix electrical circuitry arrangement ("elec circ arrange") f1223, when activated, will perform the operation p1223. Also, the direct modify mix module n1223, when executed and/or activated, will direct performance of and/or perform the operation p1223. For instance, in one or more exemplary implementations, the one or more direct modify mix instructions j1223, when executed, direct performance of the operation p1223 in the illustrative depiction as follows, and/or the direct modify mix electrical circuitry arrangement f1223, when activated, performs the operation p1223 in the illustrative depiction as follows, and/or the direct modify mix module n1223, when executed and/or activated, directs performance of and/or performs the operation p1223 in the illustrative depiction as follows, and/or the operation p1223 is otherwise carried out in the illustrative depiction as follows: electronically directing control of the one or more depositions of the one or more materials onto the one or more portions of the one or more ingestible substrate structures to modify (e.g. including increasing, etc.) one or more properties (e.g. including flavor, etc.) of the one or more portions of the one or more ingestible substrate structures by at least partially mixing (e.g. including mixing one or more added flavors, etc.) with the one or more portions of the one or more ingestible substrate structures to form at least in part the one or more selected ingestible products.

In one or more implementations, as shown in FIG. 94, operation p12 includes an operation p1224 for electronically directing control of the one or more depositions of the one or more materials onto the one or more portions of the one or more ingestible substrate structures to modify one or more properties of the one or more portions of the one or more ingestible substrate structures by at least partially replacing the one or more portions of the one or more ingestible substrate structures to form at least in part the one or more selected ingestible products. Origination of an illustratively derived direct modify replace component group can be accomplished through skilled in the art design choice selection of one or more of the above depicted components from one or more of the above depicted subsystems shown in FIG. 16. Components from the direct modify replace component group can be used in implementing execution of the one or more direct modify replace instructions j1224 of FIG. 47, can be used in performance of the direct modify replace electrical circuitry arrangement f1224 of FIG. 40, and/or can be used in otherwise fulfillment of the operation p1224. An exemplary non-transitory signal bearing medium version of the information storage subsystem s200 is depicted in FIG. 47 as bearing the one or more direct modify replace instructions j1224 that when executed will direct performance of the operation p1224. Furthermore, the direct modify replace electrical circuitry arrangement ("elec circ arrange") f1224, when activated, will perform the operation p1224. Also, the direct modify replace module n1224, when executed and/or activated, will direct performance of and/or perform the operation p1224. For instance, in one or more exemplary implementations, the one or more direct modify replace instructions j1224, when executed, direct performance of the operation p1224 in the illustrative depiction as follows, and/or the direct modify replace electrical circuitry arrangement f1224, when activated, performs the operation p1224 in the illustrative depiction as follows, and/or the direct modify replace module n1224, when executed and/or activated, directs performance of and/or performs the operation p1224 in the illustrative depiction as follows, and/or the operation p1224 is otherwise carried out in the illustrative depiction as follows: electronically directing control of the one or more depositions of the one or more materials onto the one or more portions of the one or more ingestible substrate structures to modify (e.g. including decreasing, etc.) one or more properties (e.g. including structural texture, etc.) of the one or more portions of the one or more ingestible substrate structures by at least partially replacing (e.g. including substituting softer ingestible materials in portion of the substrate, etc.) the one or more portions of the one or more ingestible substrate structures to form at least in part the one or more selected ingestible products.

Figure 95:
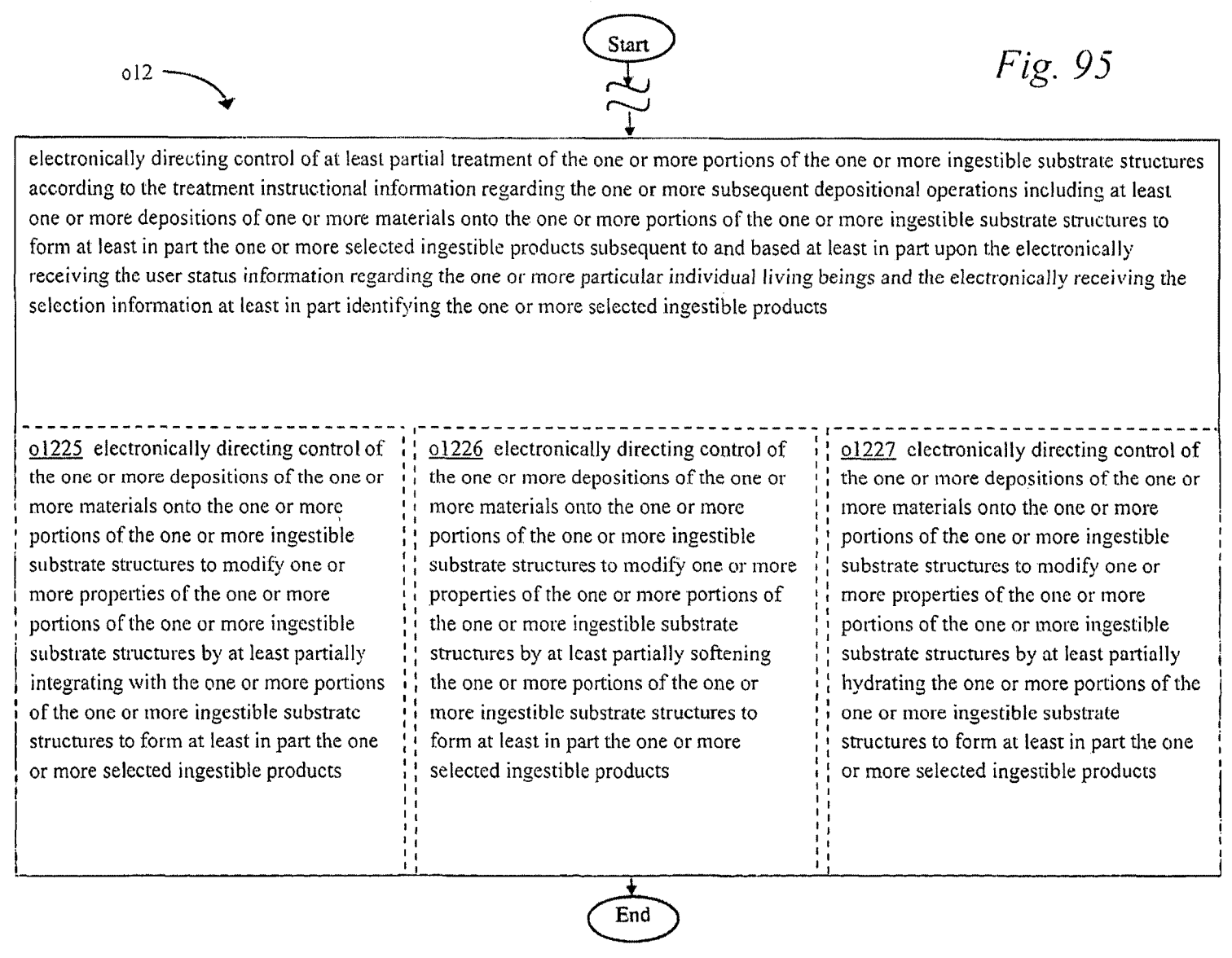

In one or more implementations, as shown in FIG. 95, operation p12 includes an operation p1225 for electronically directing control of the one or more depositions of the one or more materials onto the one or more portions of the one or more ingestible substrate structures to modify one or more properties of the one or more portions of the one or more ingestible substrate structures by at least partially integrating with the one or more portions of the one or more ingestible substrate structures to form at least in part the one or more selected ingestible products. Origination of an illustratively derived direct modify integrate component group can be accomplished through skilled in the art design choice selection of one or more of the above depicted components from one or more of the above depicted subsystems shown in FIG. 16. Components from the direct modify integrate component group can be used in implementing execution of the one or more direct modify integrate instructions j1225 of FIG. 47, can be used in performance of the direct modify integrate electrical circuitry arrangement f1225 of FIG. 40, and/or can be used in otherwise fulfillment of the operation p1225. An exemplary non-transitory signal bearing medium version of the information storage subsystem s200 is depicted in FIG. 47 as bearing the one or more direct modify integrate instructions j1225 that when executed will direct performance of the operation p1225. Furthermore, the direct modify integrate electrical circuitry arrangement ("elec circ arrange") f1225, when activated, will perform the operation p1225. Also, the direct modify integrate module n1225, when executed and/or activated, will direct performance of and/or perform the operation p1225. For instance, in one or more exemplary implementations, the one or more direct modify integrate instructions j1225, when executed, direct performance of the operation p1225 in the illustrative depiction as follows, and/or the direct modify integrate electrical circuitry arrangement f1225, when activated, performs the operation p1225 in the illustrative depiction as follows, and/or the direct modify integrate module n1225, when executed and/or activated, directs performance of and/or performs the operation p1225 in the illustrative depiction as follows, and/or the operation p1225 is otherwise carried out in the illustrative depiction as follows: electronically directing control of the one or more depositions of the one or more materials onto the one or more portions of the one or more ingestible substrate structures to modify (e.g. including changing, etc.) one or more properties (e.g. including substrate color, etc.) of the one or more portions of the one or more ingestible substrate structures by at least partially integrating (e.g. including combining added ingredients to the substrate structure to change color, etc.) with the one or more portions of the one or more ingestible substrate structures to form at least in part the one or more selected ingestible products.

In one or more implementations, as shown in FIG. 95, operation p12 includes an operation p1226 for electronically directing control of the one or more depositions of the one or more materials onto the one or more portions of the one or more ingestible substrate structures to modify one or more properties of the one or more portions of the one or more ingestible substrate structures by at least partially softening the one or more portions of the one or more ingestible substrate structures to form at least in part the one or more selected ingestible products. Origination of an illustratively derived direct modify soften component group can be accomplished through skilled in the art design choice selection of one or more of the above depicted components from one or more of the above depicted subsystems shown in FIG. 16. Components from the direct modify soften component group can be used in implementing execution of the one or more direct modify soften instructions j1226 of FIG. 47, can be used in performance of the direct modify soften electrical circuitry arrangement f1226 of FIG. 40, and/or can be used in otherwise fulfillment of the operation p1226. An exemplary non-transitory signal bearing medium version of the information storage subsystem s200 is depicted in FIG. 47 as bearing the one or more direct modify soften instructions j1226 that when executed will direct performance of the operation p1226. Furthermore, the direct modify soften electrical circuitry arrangement ("elec circ arrange") f1226, when activated, will perform the operation p1226. Also, the direct modify soften module n1226, when executed and/or activated, will direct performance of and/or perform the operation p1226. For instance, in one or more exemplary implementations, the one or more direct modify soften instructions j1226, when executed, direct performance of the operation p1226 in the illustrative depiction as follows, and/or the direct modify soften electrical circuitry arrangement f1226, when activated, performs the operation p1226 in the illustrative depiction as follows, and/or the direct modify soften module n1226, when executed and/or activated, directs performance of and/or performs the operation p1226 in the illustrative depiction as follows, and/or the operation p1226 is otherwise carried out in the illustrative depiction as follows: electronically directing control of the one or more depositions of the one or more materials onto the one or more portions of the one or more ingestible substrate structures to modify (e.g. including changing, etc.) one or more properties (e.g. including structural texture, etc.) of the one or more portions of the one or more ingestible substrate structures by at least partially softening (e.g. including introducing ingestible gel into the substrate structure, etc.) the one or more portions of the one or more ingestible substrate structures to form at least in part the one or more selected ingestible products.

In one or more implementations, as shown in FIG. 95, operation p12 includes an operation p1227 for electronically directing control of the one or more depositions of the one or more materials onto the one or more portions of the one or more ingestible substrate structures to modify one or more properties of the one or more portions of the one or more ingestible substrate structures by at least partially hydrating the one or more portions of the one or more ingestible substrate structures to form at least in part the one or more selected ingestible products. Origination of an illustratively derived direct modify hydrate component group can be accomplished through skilled in the art design choice selection of one or more of the above depicted components from one or more of the above depicted subsystems shown in FIG. 16. Components from the direct modify hydrate component group can be used in implementing execution of the one or more direct modify hydrate instructions j1227 of FIG. 47, can be used in performance of the direct modify hydrate electrical circuitry arrangement f1227 of FIG. 40, and/or can be used in otherwise fulfillment of the operation p1227. An exemplary non-transitory signal bearing medium version of the information storage subsystem s200 is depicted in FIG. 47 as bearing the one or more direct modify hydrate instructions j1227 that when executed will direct performance of the operation p1227. Furthermore, the direct modify hydrate electrical circuitry arrangement ("elec circ arrange") f1227, when activated, will perform the operation p1227. Also, the direct modify hydrate module n1227, when executed and/or activated, will direct performance of and/or perform the operation p1227. For instance, in one or more exemplary implementations, the one or more direct modify hydrate instructions j1227, when executed, direct performance of the operation p1227 in the illustrative depiction as follows, and/or the direct modify hydrate electrical circuitry arrangement f1227, when activated, performs the operation p1227 in the illustrative depiction as follows, and/or the direct modify hydrate module n1227, when executed and/or activated, directs performance of and/or performs the operation p1227 in the illustrative depiction as follows, and/or the operation p1227 is otherwise carried out in the illustrative depiction as follows: electronically directing control of the one or more depositions of the one or more materials onto the one or more portions of the one or more ingestible substrate structures to modify (e.g. including decreasing, etc.) one or more properties (e.g. including structural texture including rigidity, etc.) of the one or more portions of the one or more ingestible substrate structures by at least partially hydrating (e.g. including exposing substrate to water bath, etc.) the one or more portions of the one or more ingestible substrate structures to form at least in part the one or more selected ingestible products.

Figure 96:
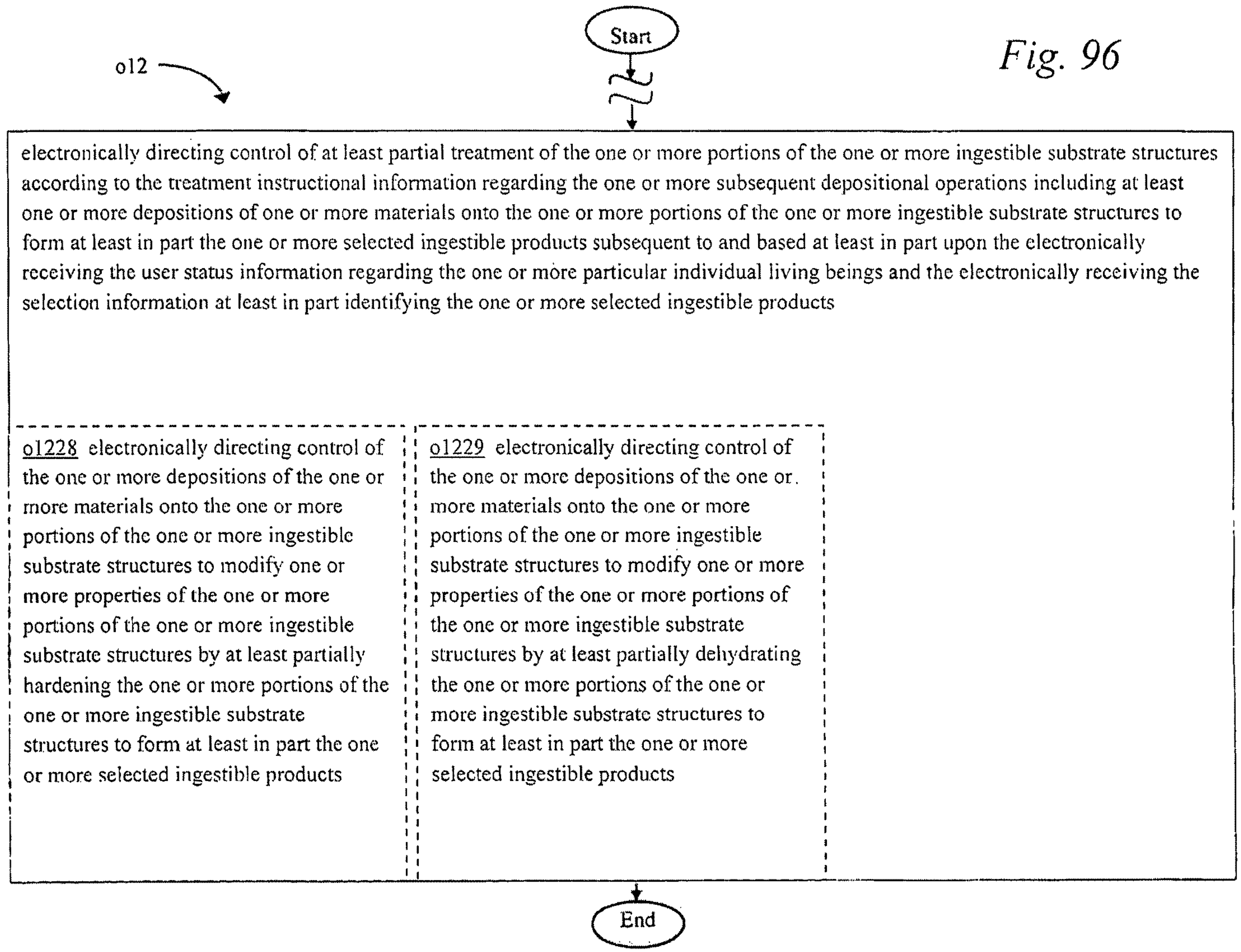
FIG. 96 is a high-level flowchart including exemplary implementations of operation p12 of FIG. 55.

In one or more implementations, as shown in FIG. 96, operation p12 includes an operation p1228 for electronically directing control of the one or more depositions of the one or more materials onto the one or more portions of the one or more ingestible substrate structures to modify one or more properties of the one or more portions of the one or more ingestible substrate structures by at least partially hardening the one or more portions of the one or more ingestible substrate structures to form at least in part the one or more selected ingestible products. Origination of an illustratively derived direct modify harden component group can be accomplished through skilled in the art design choice selection of one or more of the above depicted components from one or more of the above depicted subsystems shown in FIG. 16. Components from the direct modify harden component group can be used in implementing execution of the one or more direct modify harden instructions j1228 of FIG. 47, can be used in performance of the direct modify harden electrical circuitry arrangement f1228 of FIG. 40, and/or can be used in otherwise fulfillment of the operation p1228. An exemplary non-transitory signal bearing medium version of the information storage subsystem s200 is depicted in FIG. 47 as bearing the one or more direct modify harden instructions j1228 that when executed will direct performance of the operation p1228. Furthermore, the direct modify harden electrical circuitry arrangement ("elec circ arrange") f1228, when activated, will perform the operation p1228. Also, the direct modify harden module n1228, when executed and/or activated, will direct performance of and/or perform the operation p1228. For instance, in one or more exemplary implementations, the one or more direct modify harden instructions j1228, when executed, direct performance of the operation p1228 in the illustrative depiction as follows, and/or the direct modify harden electrical circuitry arrangement f1228, when activated, performs the operation p1228 in the illustrative depiction as follows, and/or the direct modify harden module n1228, when executed and/or activated, directs performance of and/or performs the operation p1228 in the illustrative depiction as follows, and/or the operation p1228 is otherwise carried out in the illustrative depiction as follows: electronically directing control of the one or more depositions of the one or more materials onto the one or more portions of the one or more ingestible substrate structures to modify (e.g. including changing, etc.) one or more properties (e.g. including structural texture, etc.) of the one or more portions of the one or more ingestible substrate structures by at least partially hardening (e.g. including depositing hardening agent on surface to penetrate substrate, etc.) the one or more portions of the one or more ingestible substrate structures to form at least in part the one or more selected ingestible products.

In one or more implementations, as shown in FIG. 96, operation p12 includes an operation p1229 for electronically directing control of the one or more depositions of the one or more materials onto the one or more portions of the one or more ingestible substrate structures to modify one or more properties of the one or more portions of the one or more ingestible substrate structures by at least partially dehydrating the one or more portions of the one or more ingestible substrate structures to form at least in part the one or more selected ingestible products. Origination of an illustratively derived direct modify dehydrate component group can be accomplished through skilled in the art design choice selection of one or more of the above depicted components from one or more of the above depicted subsystems shown in FIG. 16. Components from the direct modify dehydrate component group can be used in implementing execution of the one or more direct modify dehydrate instructions j1229 of FIG. 47, can be used in performance of the direct modify dehydrate electrical circuitry arrangement f1229 of FIG. 40, and/or can be used in otherwise fulfillment of the operation p1229. An exemplary non-transitory signal bearing medium version of the information storage subsystem s200 is depicted in FIG. 47 as bearing the one or more direct modify dehydrate instructions j1229 that when executed will direct performance of the operation p1229. Furthermore, the direct modify dehydrate electrical circuitry arrangement ("elec circ arrange") f1229, when activated, will perform the operation p1229. Also, the direct modify dehydrate module n1229, when executed and/or activated, will direct performance of and/or perform the operation p1229. For instance, in one or more exemplary implementations, the one or more direct modify dehydrate instructions j1229, when executed, direct performance of the operation p1229 in the illustrative depiction as follows, and/or the direct modify dehydrate electrical circuitry arrangement f1229, when activated, performs the operation p1229 in the illustrative depiction as follows, and/or the direct modify dehydrate module n1229, when executed and/or activated, directs performance of and/or performs the operation p1229 in the illustrative depiction as follows, and/or the operation p1229 is otherwise carried out in the illustrative depiction as follows: electronically directing control of the one or more depositions of the one or more materials onto the one or more portions of the one or more ingestible substrate structures to modify (e.g. including increasing, etc.) one or more properties (e.g. including structural texture, etc.) of the one or more portions of the one or more ingestible substrate structures by at least partially dehydrating (e.g. including depositing dehydrating agents such as calcium carbonate on surface, etc.) the one or more portions of the one or more ingestible substrate structures to form at least in part the one or more selected ingestible products.

Figure 97:
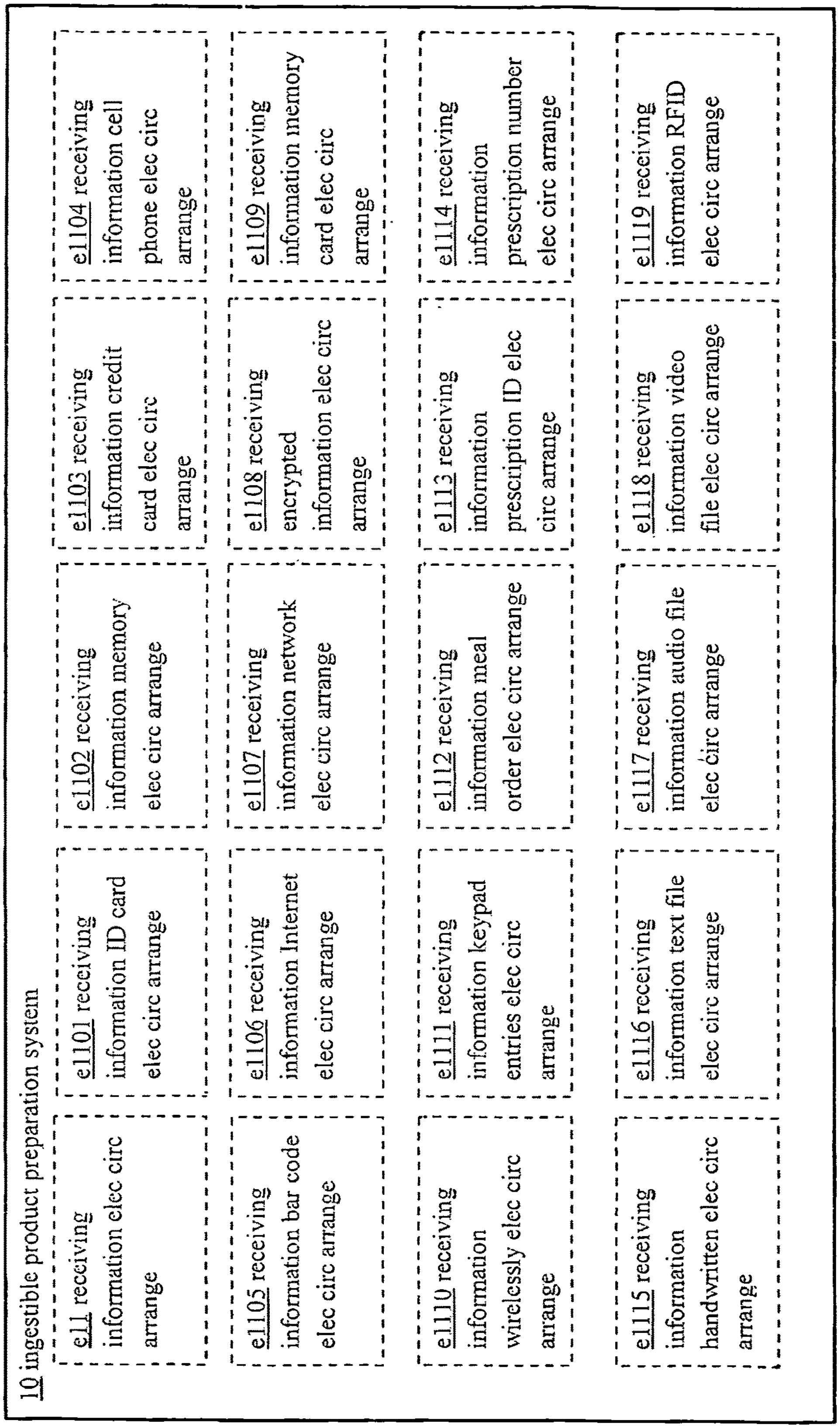
FIG. 97 is a block diagram depicting one or more exemplary electrical circuitry arrangements of the ingestible product preparation system 10 of FIG. 1.

Implementations involve different combinations (otherwise known as "electrical circuitry arrangements") of components from the subsystems of the ingestible product preparation system 10. Exemplary depictions of some of these electrical circuitry arrangements are shown in FIG. 97 to include receiving information electrical circuitry arrangement e11, receiving information ID card electrical circuitry arrangement e1101, receiving information memory electrical circuitry arrangement e1102, receiving information credit card electrical circuitry arrangement e1103, receiving information cell phone electrical circuitry arrangement e1104, receiving information bar code electrical circuitry arrangement e1105, receiving information Internet electrical circuitry arrangement e1106, receiving information network electrical circuitry arrangement e1107, receiving encrypted information electrical circuitry arrangement e1108, receiving information memory card electrical circuitry arrangement e1109, receiving information wirelessly electrical circuitry arrangement e1110, receiving information keypad entries electrical circuitry arrangement e1111, receiving information meal order electrical circuitry arrangement e1112, receiving information prescription ID electrical circuitry arrangement e1113, receiving information prescription number electrical circuitry arrangement e1114, receiving information handwritten electrical circuitry arrangement e1115, receiving information text file electrical circuitry arrangement e1116, receiving information audio file electrical circuitry arrangement e1117, receiving information video file electrical circuitry arrangement e1118, and receiving information RFID electrical circuitry arrangement e1119.

Figure 98:
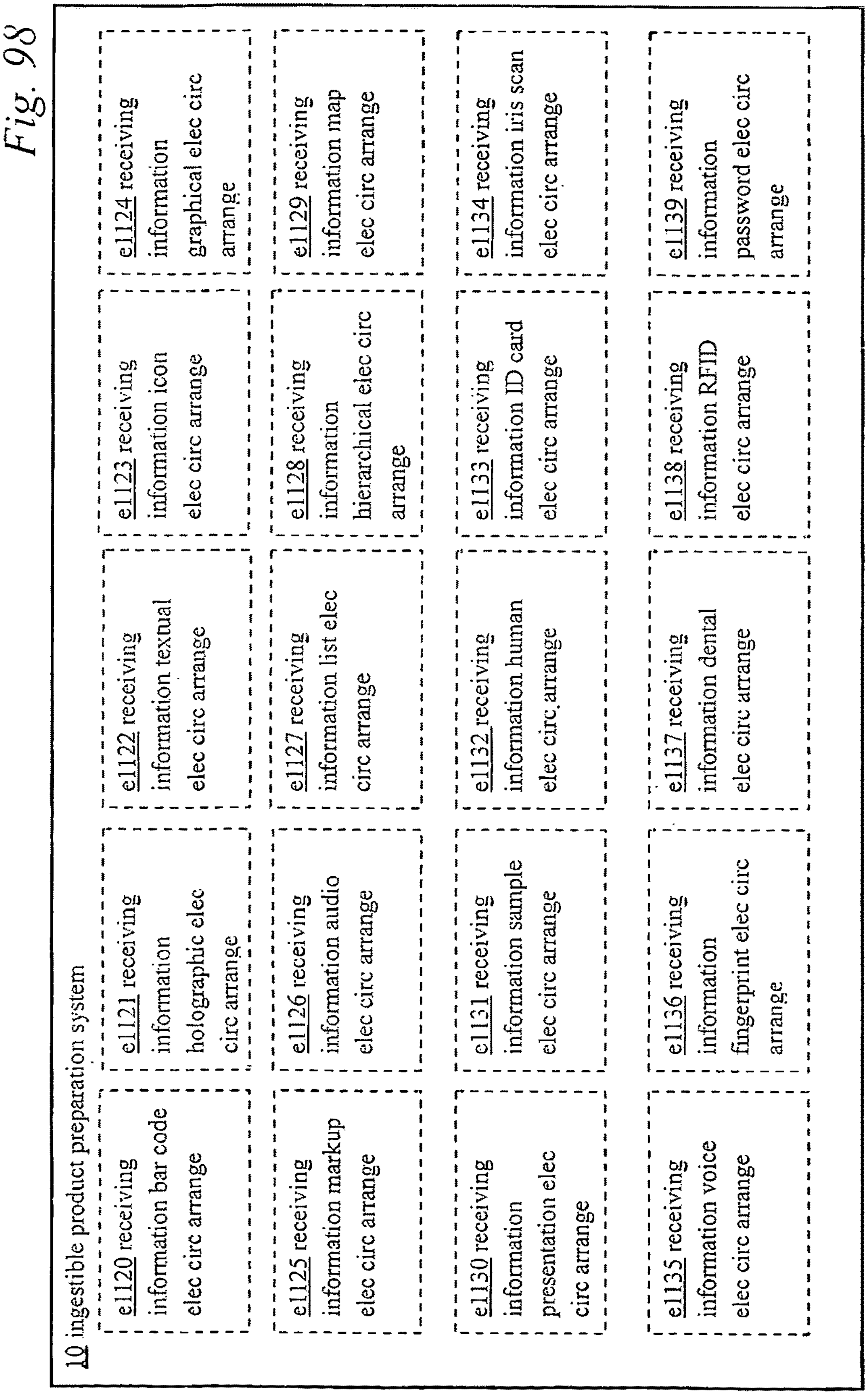
FIG. 98 is a block diagram depicting one or more exemplary electrical circuitry arrangements of the ingestible product preparation system 10 of FIG. 1.

Some of these electrical circuitry arrangements are depicted in FIG. 98 to include receiving information bar code electrical circuitry arrangement e1120, receiving information holographic electrical circuitry arrangement e1121, receiving information textual electrical circuitry arrangement e1122, receiving information icon electrical circuitry arrangement e1123, receiving information graphical electrical circuitry arrangement e1124, receiving information markup electrical circuitry arrangement e1125, receiving information audio electrical circuitry arrangement e1126, receiving information list electrical circuitry arrangement e1127, receiving information hierarchical electrical circuitry arrangement e1128, receiving information map electrical circuitry arrangement e1129, receiving information presentation electrical circuitry arrangement e1130, receiving information sample electrical circuitry arrangement e113, receiving information human electrical circuitry arrangement e1132, receiving information ID card electrical circuitry arrangement e1133, receiving information iris scan electrical circuitry arrangement e1134, receiving information voice electrical circuitry arrangement e1135, receiving information fingerprint electrical circuitry arrangement e1136, receiving information dental electrical circuitry arrangement e1137, receiving information RFID electrical circuitry arrangement e1138, and receiving information password electrical circuitry arrangement e1139.

Figure 99:
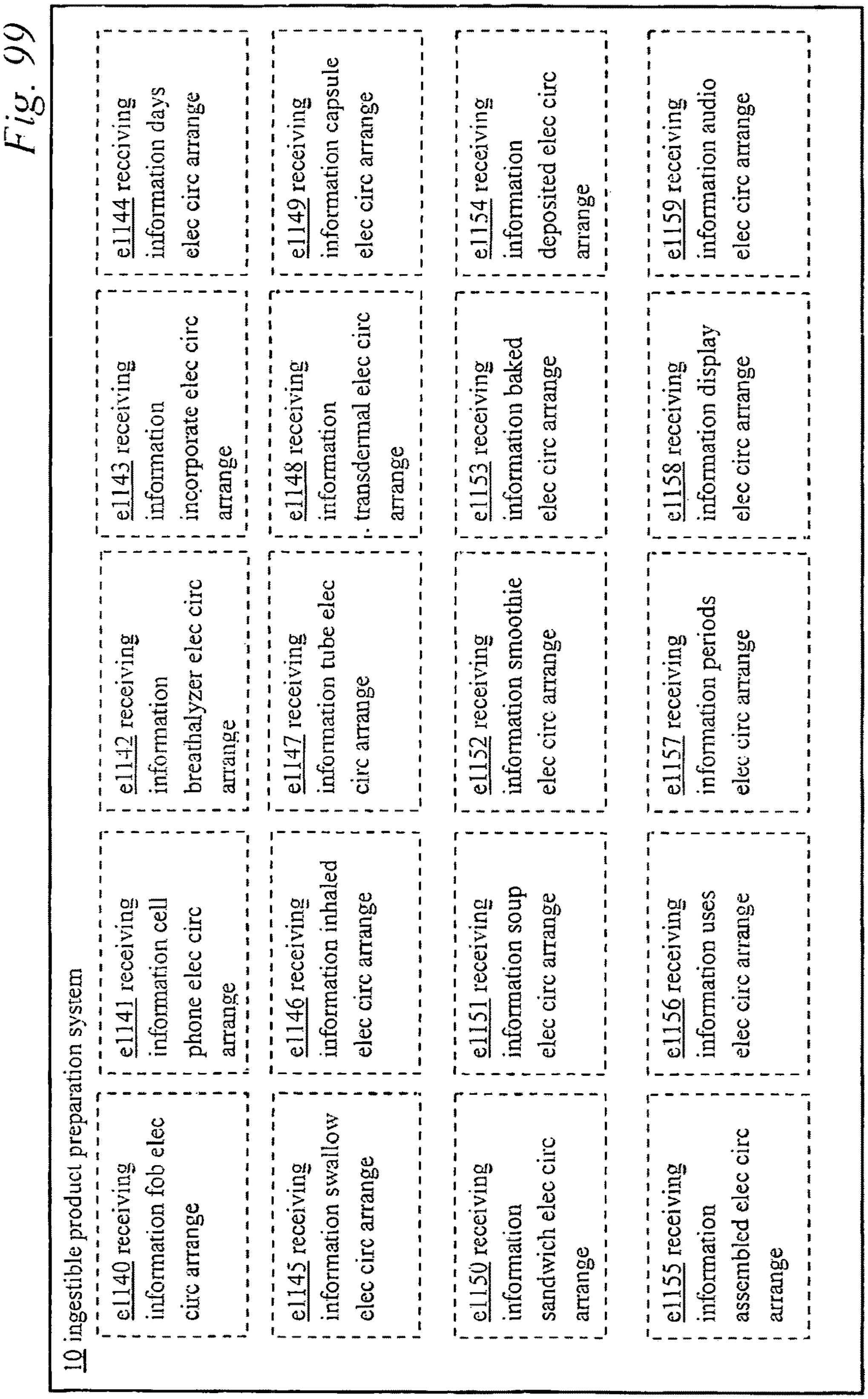
FIG. 99 is a block diagram depicting one or more exemplary electrical circuitry arrangements of the ingestible product preparation system 10 of FIG. 1.

Some of these electrical circuitry arrangements are depicted in FIG. 99 to include receiving information fob electrical circuitry arrangement e1140, receiving information cell phone electrical circuitry arrangement e1141, receiving information breathalyzer electrical circuitry arrangement e1142, receiving information incorporate electrical circuitry arrangement e1143, receiving information days electrical circuitry arrangement e1144, receiving information swallow electrical circuitry arrangement e1145, receiving information inhaled electrical circuitry arrangement e1146, receiving information tube electrical circuitry arrangement e1147, receiving information transdermal electrical circuitry arrangement e1148, receiving information capsule electrical circuitry arrangement e1149, receiving information sandwich electrical circuitry arrangement e1150, receiving information soup electrical circuitry arrangement e1151, receiving information smoothie electrical circuitry arrangement e1152, receiving information baked electrical circuitry arrangement e1153, receiving information deposited electrical circuitry arrangement e1154, receiving information assembled electrical circuitry arrangement e1155, receiving information uses electrical circuitry arrangement e1156, receiving information periods electrical circuitry arrangement e1157, receiving information display electrical circuitry arrangement e1158, and receiving information audio electrical circuitry arrangement e1159.

Figure 100:
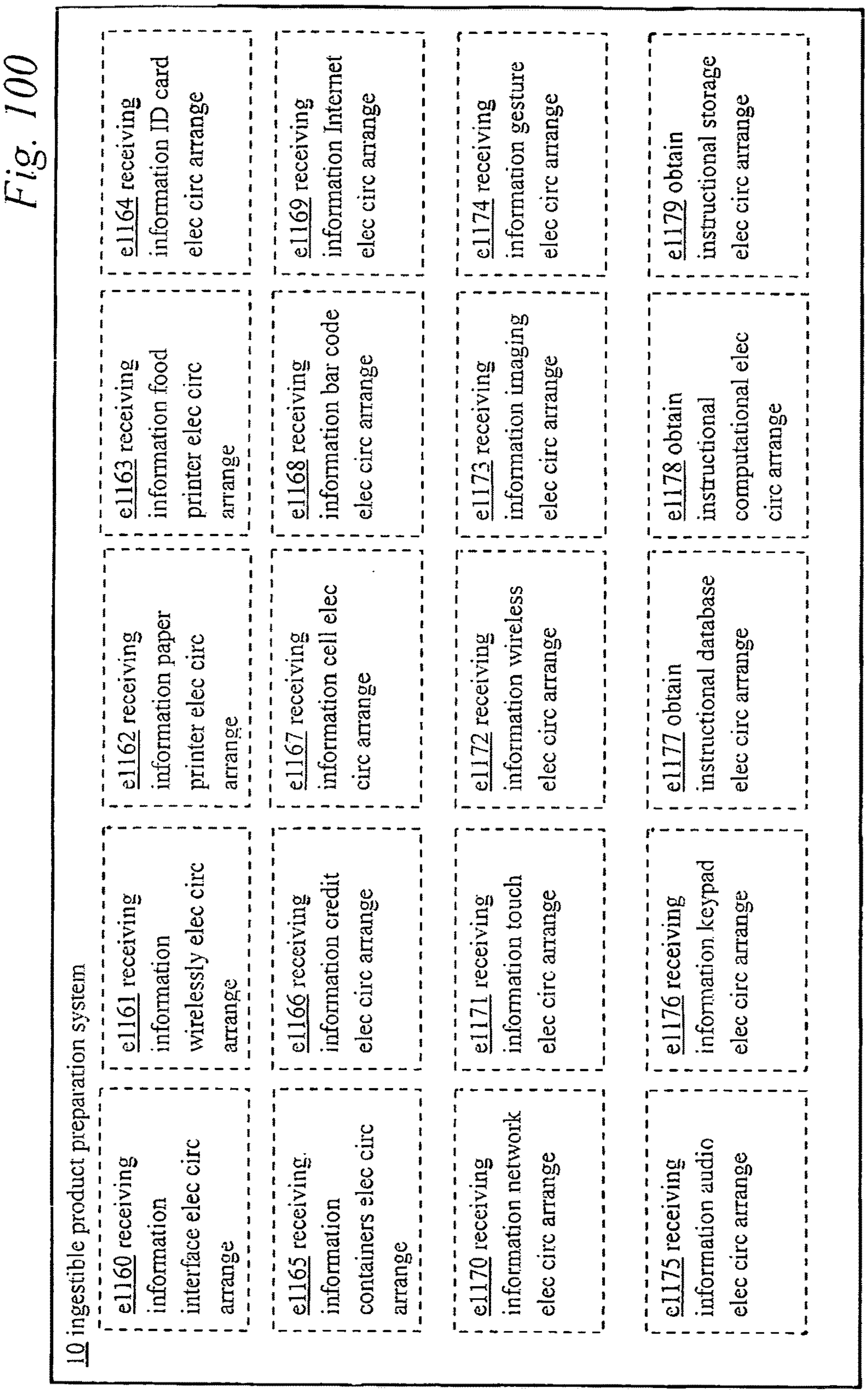
FIG. 100 is a block diagram depicting one or more exemplary electrical circuitry arrangements of the ingestible product preparation system 10 of FIG. 1.

Some of these electrical circuitry arrangements are depicted in FIG. 100 to include receiving information interface electrical circuitry arrangement e1160, receiving information wirelessly electrical circuitry arrangement e1161, receiving information paper printer electrical circuitry arrangement e1162, receiving information food printer electrical circuitry arrangement e1163, receiving information ID card electrical circuitry arrangement e1164, receiving information containers electrical circuitry arrangement e1165, and receiving information credit electrical circuitry arrangement e1166, receiving information cell electrical circuitry arrangement e1167, receiving information bar code electrical circuitry arrangement e1168, receiving information Internet electrical circuitry arrangement e1169, receiving information network electrical circuitry arrangement e1170, receiving information touch electrical circuitry arrangement e1171, receiving information wireless electrical circuitry arrangement e1172, receiving information imaging electrical circuitry arrangement e1173, receiving information gesture electrical circuitry arrangement e1174, receiving information audio electrical circuitry arrangement e1175, receiving information keypad electrical circuitry arrangement e1176, obtain instructional database electrical circuitry arrangement e1177, obtain instructional computational electrical circuitry arrangement e1178, and obtain instructional storage electrical circuitry arrangement e1179.

Figure 101:
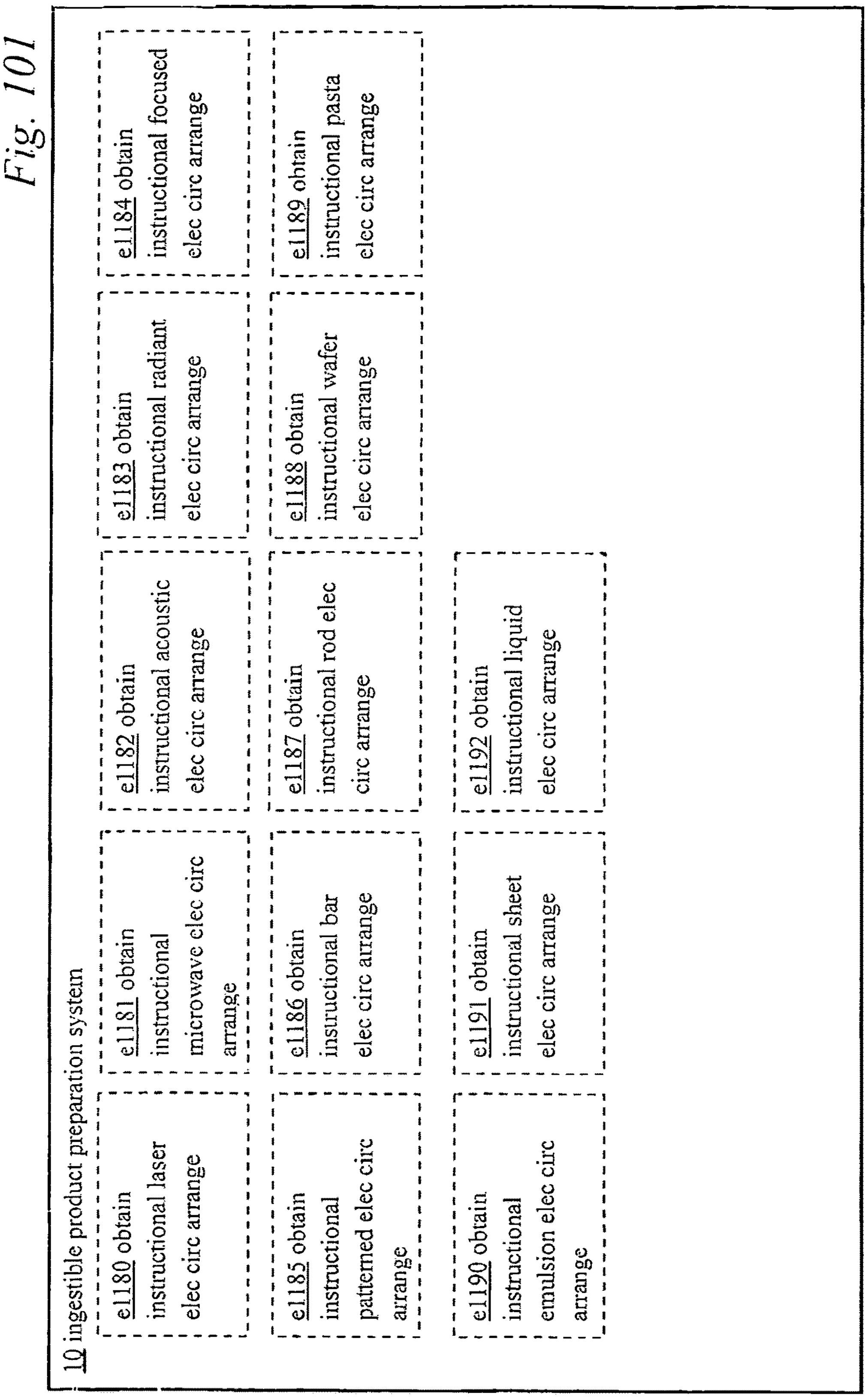
FIG. 101 is a block diagram depicting one or more exemplary electrical circuitry arrangements of the ingestible product preparation system 10 of FIG. 1.

Some of these electrical circuitry arrangements are depicted in FIG. 101 to include obtain instructional laser electrical circuitry arrangement e1180, obtain instructional microwave electrical circuitry arrangement e1181, obtain instructional acoustic electrical circuitry arrangement e1182, obtain instructional radiant electrical circuitry arrangement e1183, obtain instructional focused electrical circuitry arrangement e1184, obtain instructional patterned electrical circuitry arrangement e1185, obtain instructional bar electrical circuitry arrangement e1186, obtain instructional rod electrical circuitry arrangement e1187, obtain instructional wafer electrical circuitry arrangement e1188, obtain instructional pasta electrical circuitry arrangement e1189, obtain instructional emulsion electrical circuitry arrangement e1190, obtain instructional sheet electrical circuitry arrangement e1191, and obtain instructional liquid electrical circuitry arrangement e1192.

Figure 102:
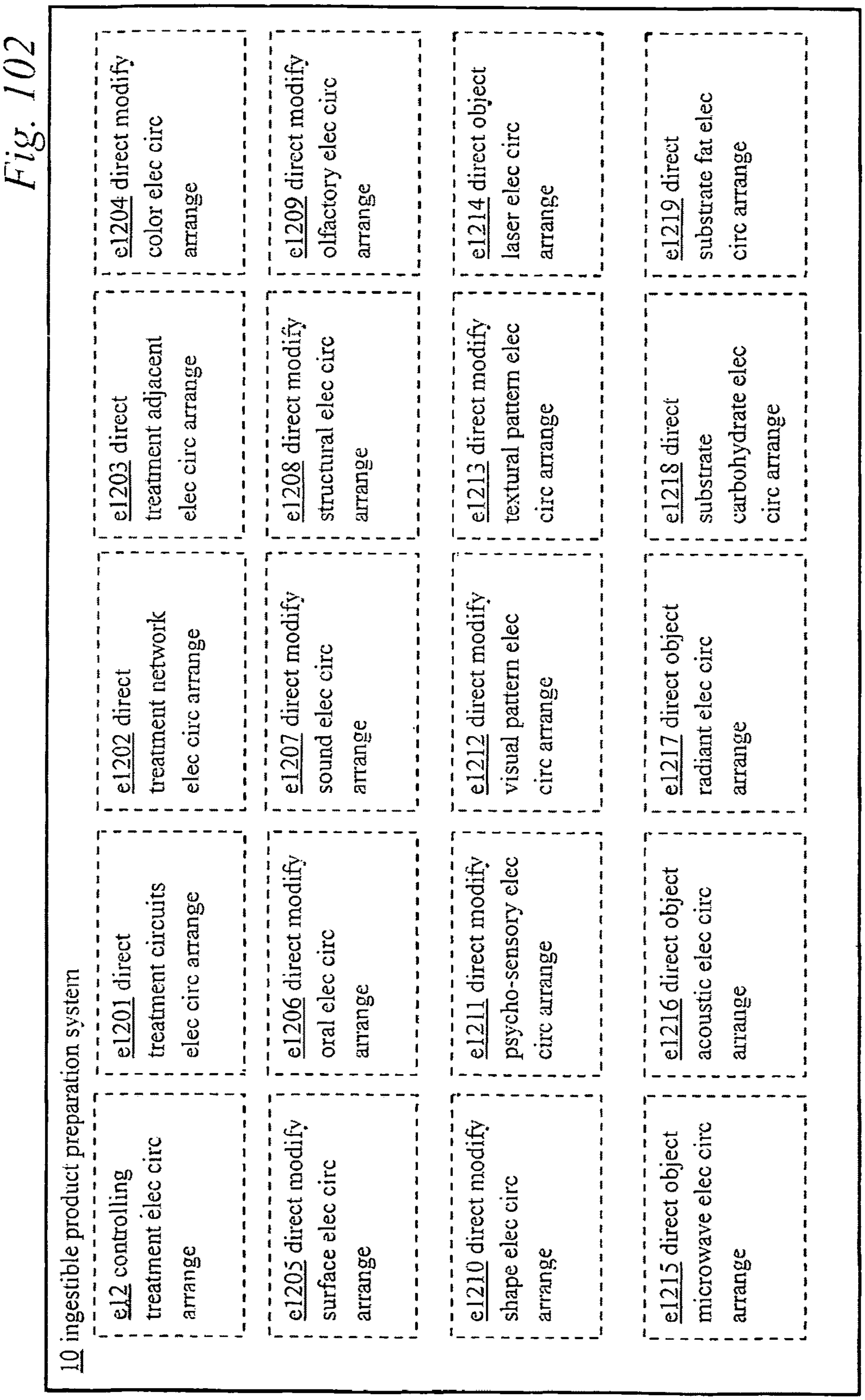
FIG. 102 is a block diagram depicting one or more exemplary electrical circuitry arrangements of the ingestible product preparation system 10 of FIG. 1.

Some of these electrical circuitry arrangements are depicted in FIG. 102 to include controlling treatment electrical circuitry arrangement e12, direct treatment circuits electrical circuitry arrangement e1201, direct treatment network electrical circuitry arrangement e1202, direct treatment adjacent electrical circuitry arrangement e1203, direct modify color electrical circuitry arrangement e1204, direct modify surface electrical circuitry arrangement e1205, direct modify oral electrical circuitry arrangement e1206, direct modify sound electrical circuitry arrangement e1207, direct modify structural electrical circuitry arrangement e1208, direct modify olfactory electrical circuitry arrangement e1209, direct modify shape electrical circuitry arrangement e1210, direct modify psycho-sensory electrical circuitry arrangement e1211, and direct modify visual pattern electrical circuitry arrangement e1212, direct modify textural pattern electrical circuitry arrangement e1213, direct object laser electrical circuitry arrangement e1214, direct object microwave electrical circuitry arrangement e1215, direct object acoustic electrical circuitry arrangement e1216, direct object radiant electrical circuitry arrangement e1217, direct substrate carbohydrate electrical circuitry arrangement e1218, and direct substrate fat electrical circuitry arrangement e1219.

Some of these electrical circuitry arrangements are depicted in FIG. 103 to include direct substrate protein electrical circuitry arrangement e12, direct modify multiple electrical circuitry arrangement e1221, direct modify patterned electrical circuitry arrangement e1222, direct modify focused electrical circuitry arrangement e1223, direct modify replace electrical circuitry arrangement e1224, direct modify integrate electrical circuitry arrangement e1225, direct modify soften electrical circuitry arrangement e1226, direct modify compress electrical circuitry arrangement e1227, direct modify harden electrical circuitry arrangement e1228, and direct modify patterning electrical circuitry arrangement e1229.

In implementations one or more instructions are stored and/or otherwise borne in various subsystems, components, and/or accessories of the ingestible product preparation system 10 such as being borne in a non-transitory signal bearing medium of information storage subsystem s200. One or more exemplary instructions depicted in FIG. 104 as being borne in an exemplary version of a non-transitory signal bearing medium of information storage subsystem s200 include one or more receiving information instructions i11, one or more receiving information ID card instructions i1101, one or more receiving information memory instructions i1102, one or more receiving information credit card instructions i1103, one or more receiving information cell phone instructions i1104, one or more receiving information bar code instructions i1105, one or more receiving information Internet instructions i1106, one or more receiving information network instructions i1107, one or more receiving encrypted information instructions i1108, one or more receiving information memory card instructions i1109, one or more receiving information wirelessly instructions i1110, one or more receiving information keypad entries instructions i1111, one or more receiving information meal order instructions i1112, one or more receiving information prescription ID instructions i1113, one or more receiving information prescription number instructions i1114, one or more receiving information handwritten instructions i1115, one or more receiving information text file instructions i1116, one or more receiving information audio file instructions i1117, one or more receiving information video file instructions i1118, and one or more receiving information RFID instructions i1119.

Figure 105:
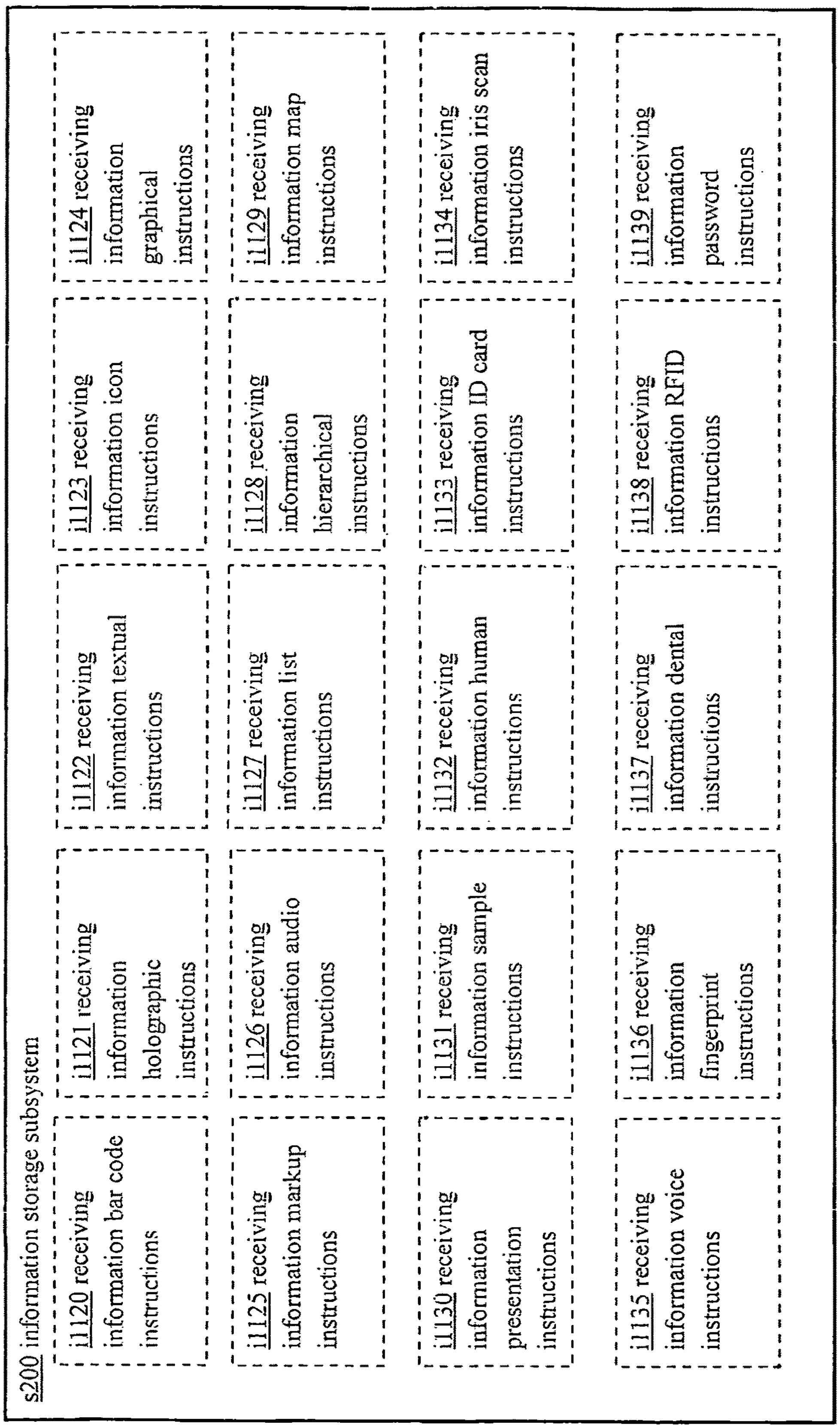
FIG. 105 is a block diagram depicting one or more exemplary instructions of the information storage subsystem s200 of the ingestible product preparation system 10 of FIG. 1.

One or more exemplary instructions depicted in FIG. 105 as being borne in an exemplary version of a non-transitory signal bearing medium of information storage subsystem s200 include one or more receiving information bar code instructions i1120, one or more receiving information holographic instructions i1121, one or more receiving information textual instructions i1122, one or more receiving information icon instructions i1123, one or more receiving information graphical instructions i1124, one or more receiving information markup instructions i1125, one or more receiving information audio instructions i1126, one or more receiving information list instructions i1127, one or more receiving information hierarchical instructions i1128, one or more receiving information map instructions i1129, one or more receiving information presentation instructions i1130, one or more receiving information sample instructions i1131, one or more receiving information human instructions i1132, one or more receiving information ID card instructions i1133, one or more receiving information iris scan instructions i1134, one or more receiving information voice instructions i1135, one or more receiving information fingerprint instructions i1136, one or more receiving information dental instructions i1137, one or more receiving information RFID instructions i1138, and one or more receiving information password instructions i1139.

Figure 106:
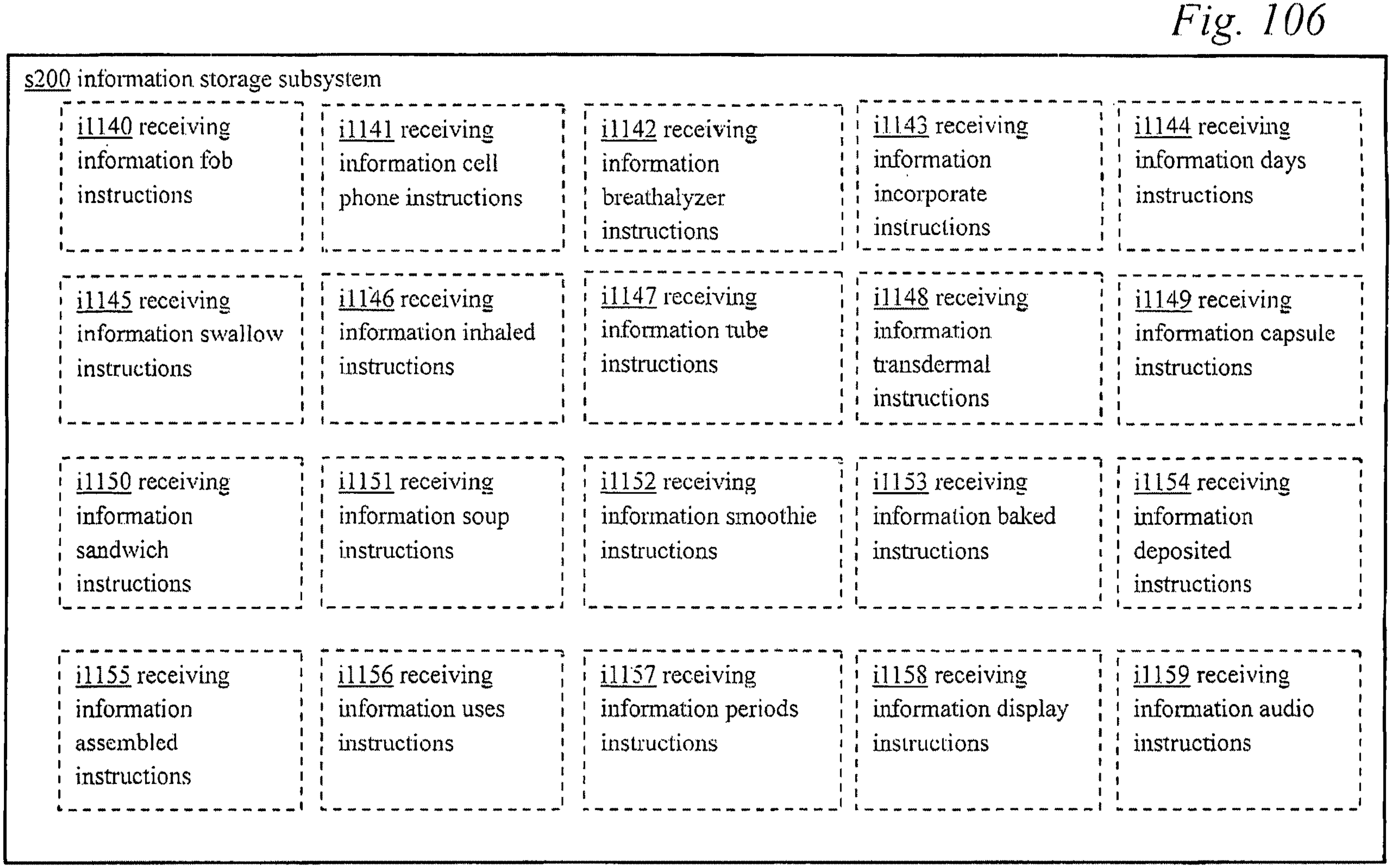
FIG. 106 is a block diagram depicting one or more exemplary instructions of the information storage subsystem s200 of the ingestible product preparation system 10 of FIG. 1.

One or more exemplary instructions depicted in FIG. 106 as being borne in an exemplary version of a non-transitory signal bearing medium of information storage subsystem s200 include one or more receiving information fob instructions i1140, one or more receiving information cell phone instructions i1141, one or more receiving information breathalyzer instructions i1142, one or more receiving information incorporate instructions i1143, one or more receiving information days instructions i1144, one or more receiving information swallow instructions i1145, one or more receiving information inhaled instructions i1146, one or more receiving information tube instructions i1147, one or more receiving information transdermal instructions i1148, one or more receiving information capsule instructions i1149, one or more receiving information sandwich instructions i1150, one or more receiving information soup instructions i1151, one or more receiving information smoothie instructions i1152, one or more receiving information baked instructions i1153, one or more receiving information deposited instructions i1154, one or more receiving information assembled instructions i1155, one or more receiving information uses instructions i1156, one or more receiving information periods instructions i1157, one or more receiving information display instructions i1158, and one or more receiving information audio instructions i1159.

Figure 107:
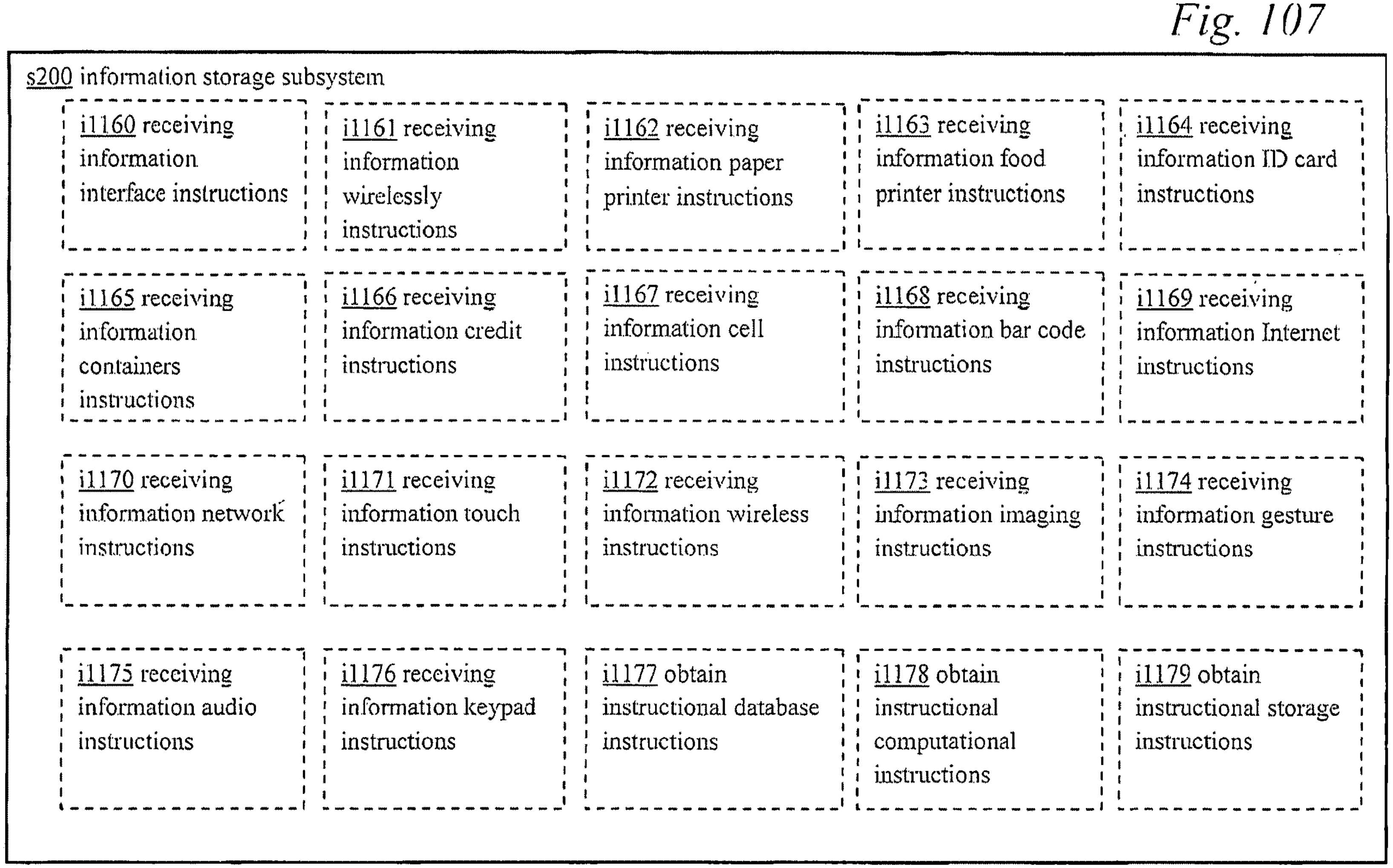
FIG. 107 is a block diagram depicting one or more exemplary instructions of the information storage subsystem s200 of the ingestible product preparation system 10 of FIG. 1.

One or more exemplary instructions depicted in FIG. 107 as being borne in an exemplary version of a non-transitory signal bearing medium of information storage subsystem s200 include one or more receiving information interface instructions i1160, one or more receiving information wirelessly instructions i1161, one or more receiving information paper printer instructions i1162, one or more receiving information food printer instructions i1163, one or more receiving information ID card instructions i1164, one or more receiving information containers instructions i1165, and one or more receiving information credit instructions i1166, one or more receiving information cell instructions i1167, one or more receiving information bar code instructions i1168, one or more receiving information Internet instructions i1169, one or more receiving information network instructions i1170, one or more receiving information touch instructions i1171, one or more receiving information wireless instructions i1172, one or more receiving information imaging instructions i1173, one or more receiving information gesture instructions i1174, one or more receiving information audio instructions i1175, one or more receiving information keypad instructions i1176, one or more obtain instructional database instructions i1177, one or more obtain instructional computational instructions i1178, and one or more obtain instructional storage instructions i1179.

Figure 108:
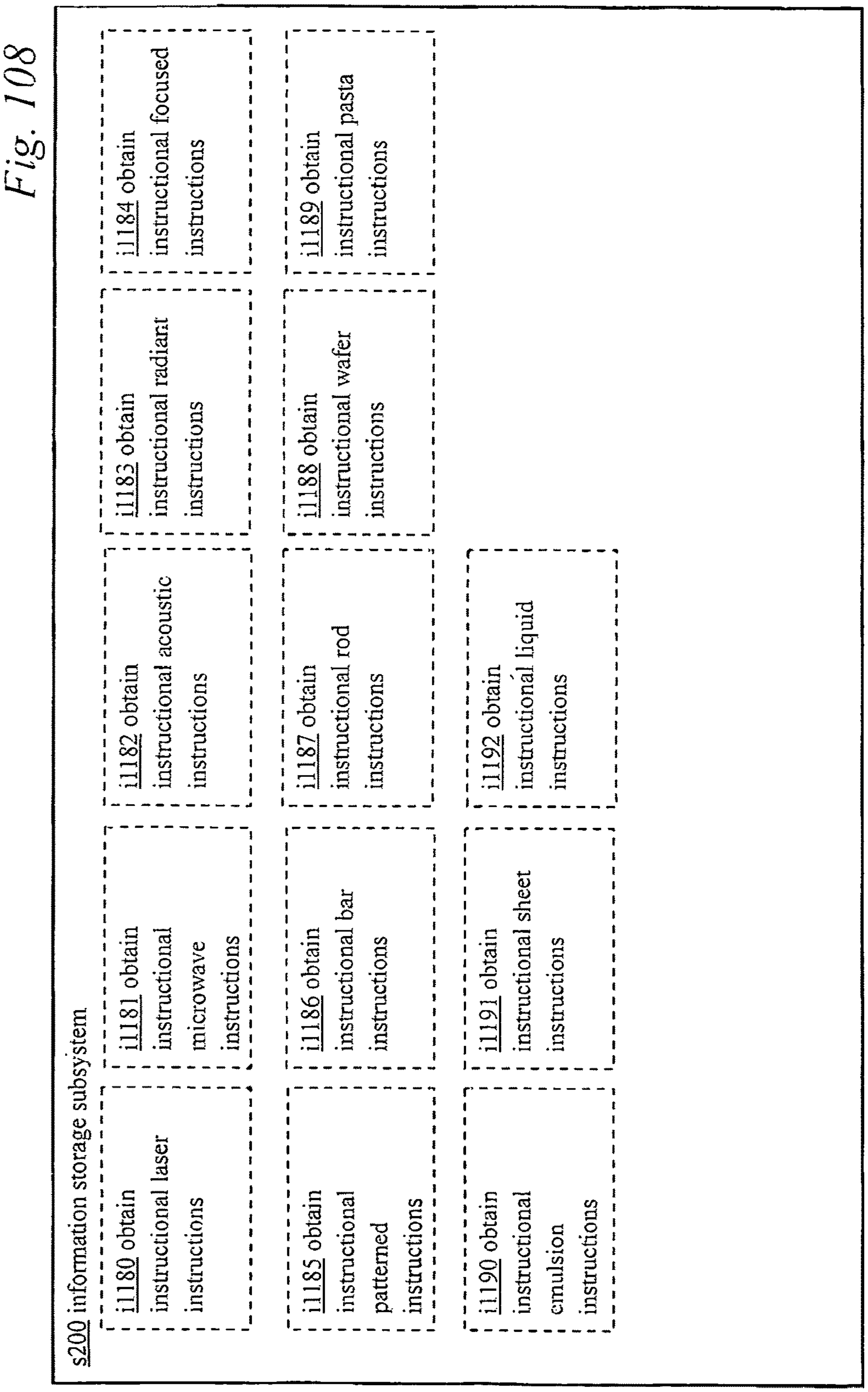
FIG. 108 is a block diagram depicting one or more exemplary instructions of the information storage subsystem s200 of the ingestible product preparation system 10 of FIG. 1.

One or more exemplary instructions depicted in FIG. 108 as being borne in an exemplary version of a non-transitory signal bearing medium of information storage subsystem s200 include one or more obtain instructional laser instructions i1180, one or more obtain instructional microwave instructions i1181, one or more obtain instructional acoustic instructions i1182, one or more obtain instructional radiant instructions i1183, one or more obtain instructional focused instructions i1184, one or more obtain instructional patterned instructions i1185, one or more obtain instructional bar instructions i1186, one or more obtain instructional rod instructions i1187, one or more obtain instructional wafer instructions i1188, one or more obtain instructional pasta instructions i1189, one or more obtain instructional emulsion instructions i1190, one or more obtain instructional sheet instructions i1191, and one or more obtain instructional liquid instructions i1192.

Figure 109:
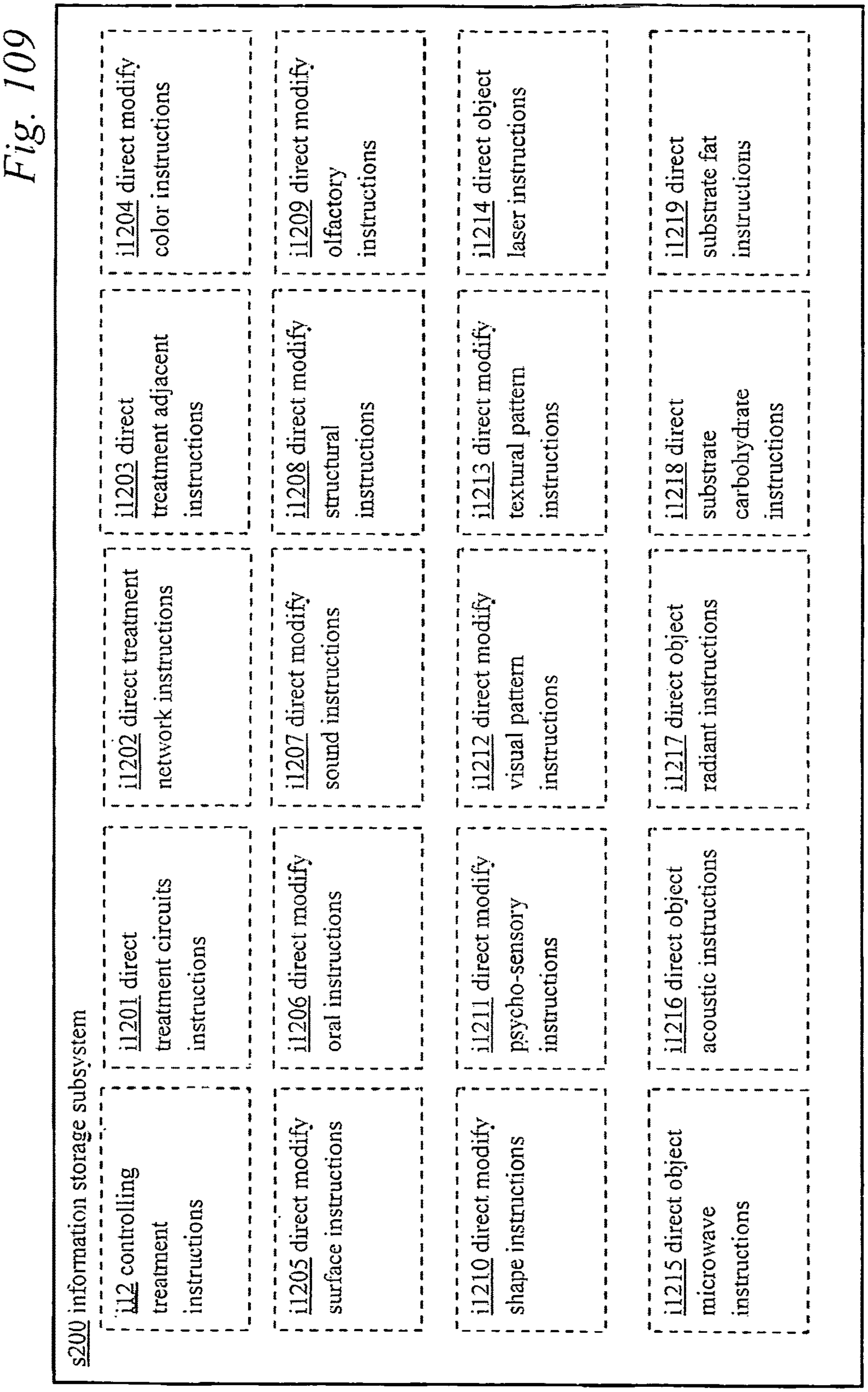
FIG. 109 is a block diagram depicting one or more exemplary instructions of the information storage subsystem s200 of the ingestible product preparation system 10 of FIG. 1.

One or more exemplary instructions depicted in FIG. 109 as being borne in an exemplary version of a non-transitory signal bearing medium of information storage subsystem s200 include one or more controlling treatment instructions i12, one or more direct treatment circuits instructions i1201, one or more direct treatment network instructions i1202, one or more direct treatment adjacent instructions i1203, one or more direct modify color instructions i1204, one or more direct modify surface instructions i1205, one or more direct modify oral instructions i1206, one or more direct modify sound instructions i1207, one or more direct modify structural instructions i1208, one or more direct modify olfactory instructions i1209, one or more direct modify shape instructions i1210, one or more direct modify psycho-sensory instructions i1211, one or more direct modify visual pattern instructions i1212, one or more direct modify textural pattern instructions i1213, one or more direct object laser instructions i1214, one or more direct object microwave instructions i1215, one or more direct object acoustic instructions i1216, one or more direct object radiant instructions i1217, one or more direct substrate carbohydrate instructions i1218, and one or more direct substrate fat instructions i1219.

Figure 110:
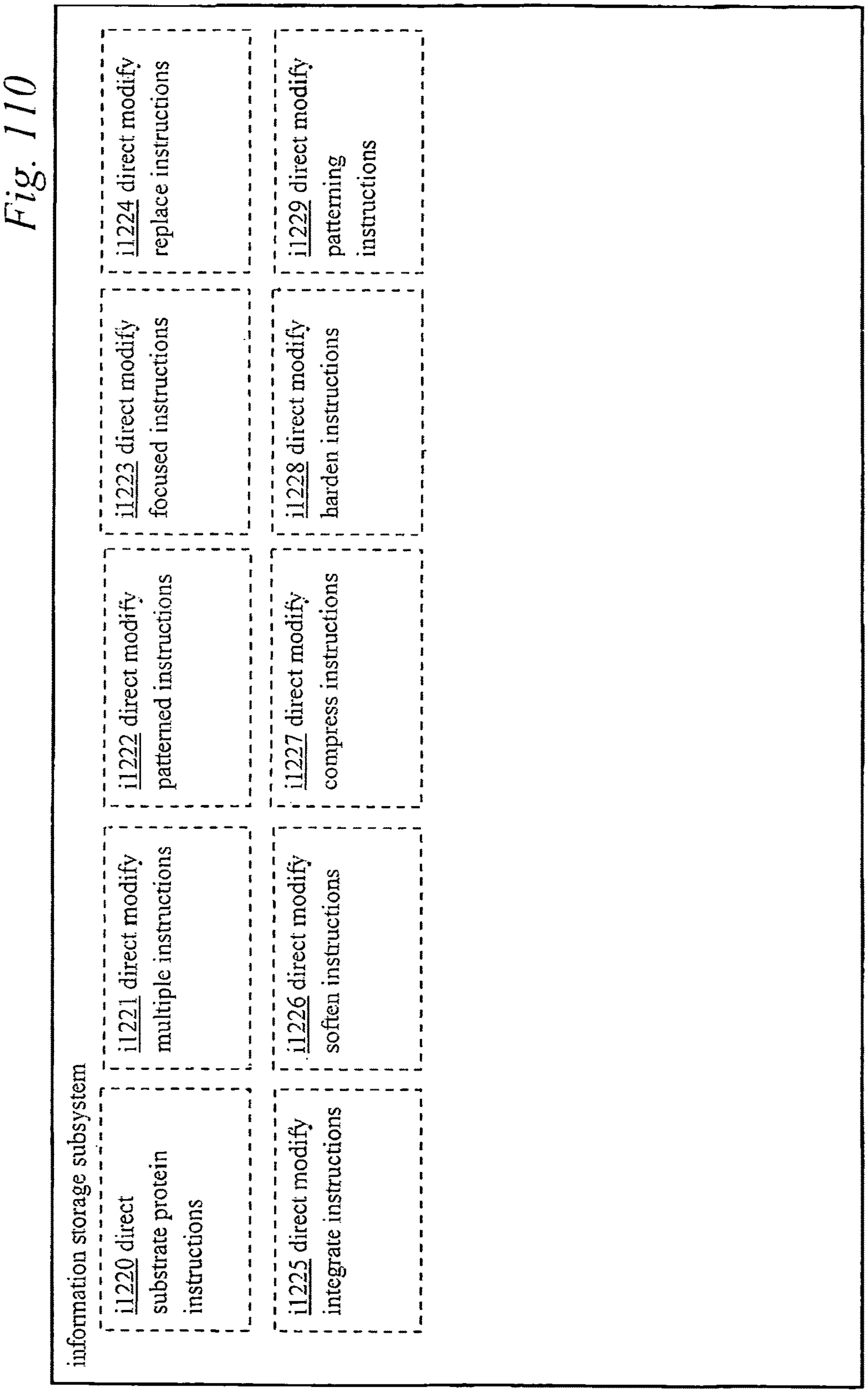
FIG. 110 is a block diagram depicting one or more exemplary instructions of the information storage subsystem s200 of the ingestible product preparation system 10 of FIG. 1.

One or more exemplary instructions depicted in FIG. 110 as being borne in an exemplary version of a non-transitory signal bearing medium of information storage subsystem s200 include one or more direct substrate protein instructions i1220, one or more direct modify multiple instructions i1221, one or more direct modify patterned instructions i1222, one or more direct modify focused instructions i1223, one or more direct modify replace instructions i1224, one or more direct modify integrate instructions i1225, one or more direct modify soften instructions i1226, one or more direct modify compress instructions i1227, one or more direct modify harden instructions i1228, and one or more direct modify patterning instructions i1229.

Figure 111:
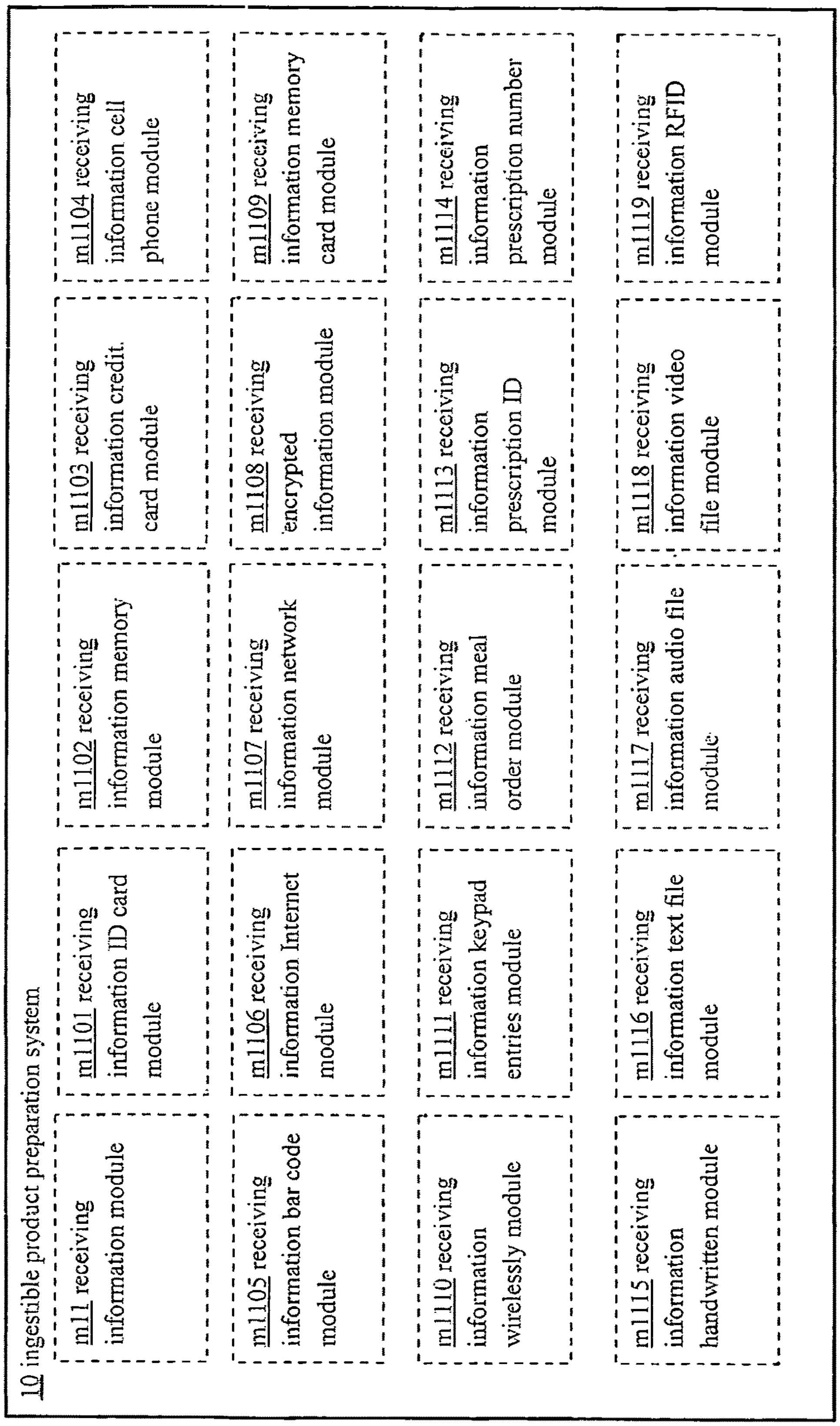
FIG. 111 is a block diagram depicting one or more exemplary modules of the ingestible product preparation system 10 of FIG. 1.

Implementations of modules involve different combinations (limited to patentable subject matter under 35 U.S.C. 101) of one or more aspects from one or more of the electrical circuitry arrangements and/or one or more aspects from one or more of the instructions of the ingestible product preparation system 10. Exemplary depictions of some of these modules are shown in FIG. 111 to include receiving information module m11, receiving information ID card module m1101, receiving information memory module m1102, receiving information credit card module m1103, receiving information cell phone module m1104, receiving information bar code module m1105, receiving information Internet module m1106, receiving information network module m1107, receiving encrypted information module m1108, receiving information memory card module m1109, receiving information wirelessly module m1110, receiving information keypad entries module m1111, receiving information meal order module m1112, receiving information prescription ID module m1113, receiving information prescription number module m1114, receiving information handwritten module m1115, receiving information text file module m1116, receiving information audio file module m1117, receiving information video file module m1118, and receiving information RFID module m1119.

Figure 112:
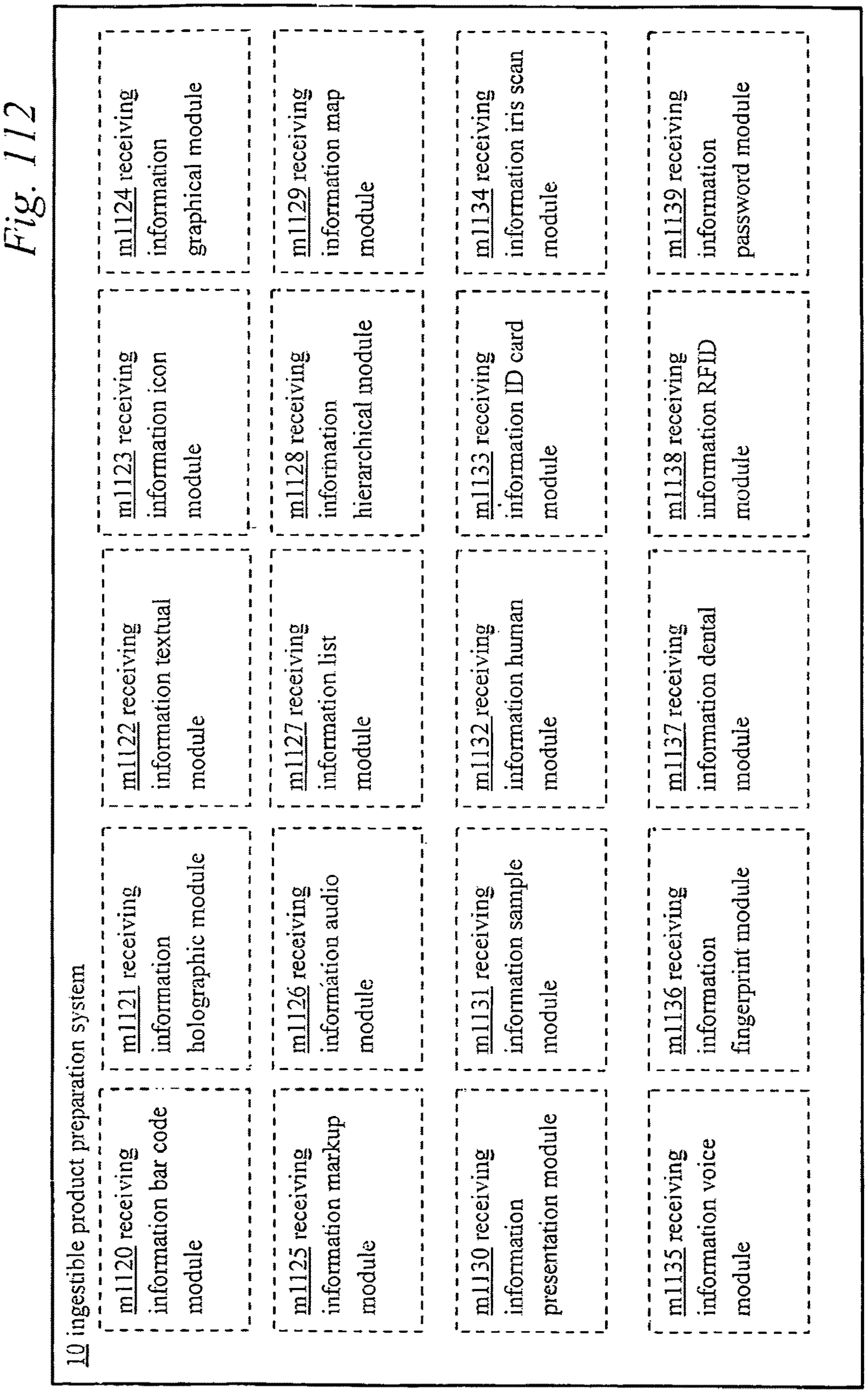
FIG. 112 is a block diagram depicting one or more exemplary modules of the ingestible product preparation system 10 of FIG. 1.

Some of these modules are depicted in FIG. 112 to include receiving information bar code module m1120, receiving information holographic module m1121, receiving information textual module m1122, receiving information icon module m1123, receiving information graphical module m1124, receiving information markup module m1125, receiving information audio module m1126, receiving information list module m1127, receiving information hierarchical module m1128, receiving information map module m1129, receiving information presentation module m1130, receiving information sample module m113, receiving information human module m1132, receiving information ID card module m1133, receiving information iris scan module m1134, receiving information voice module m1135, receiving information fingerprint module m1136, receiving information dental module m1137, receiving information RFID module m1138, and receiving information password module m1139.

Figure 113:
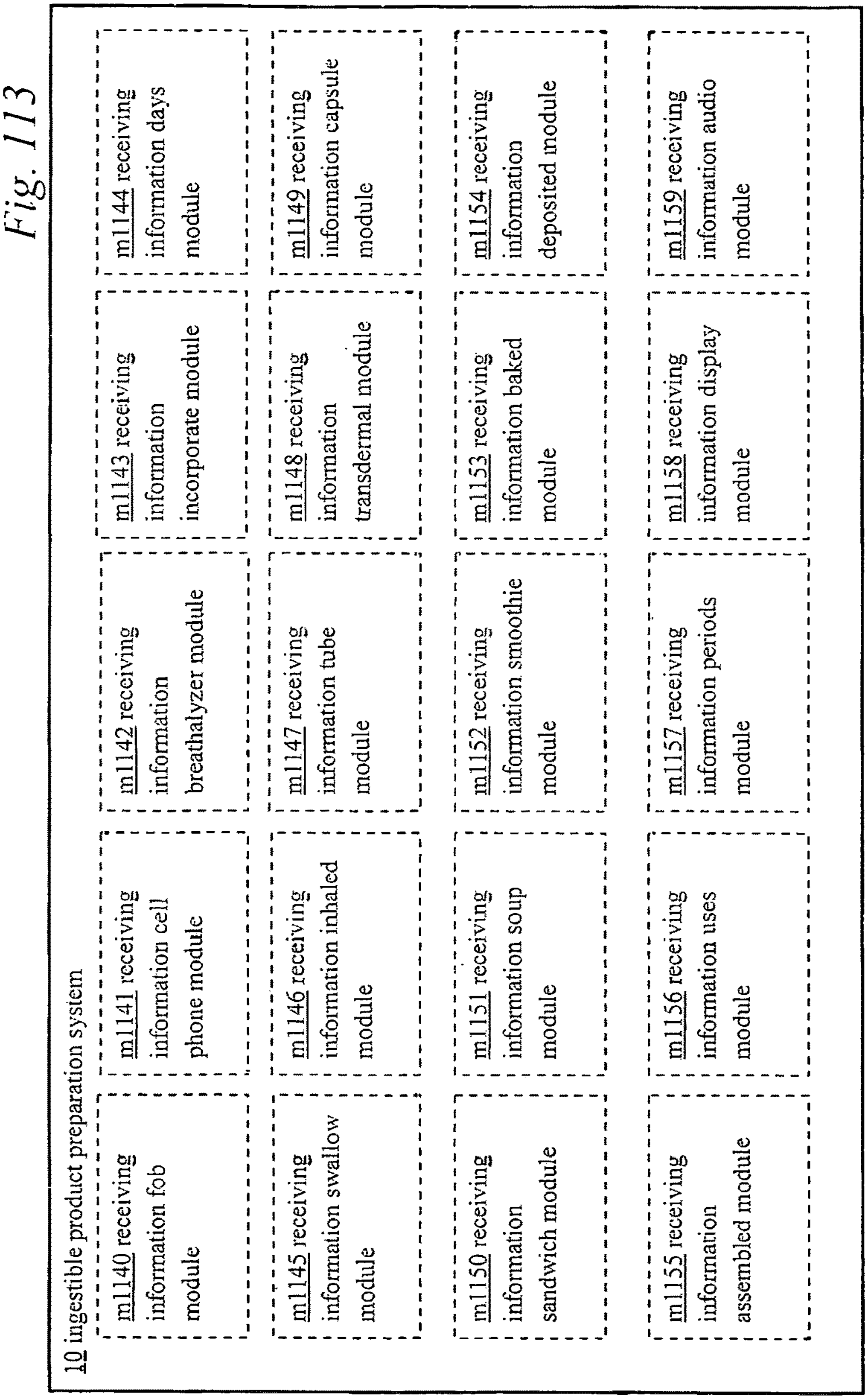
FIG. 113 is a block diagram depicting one or more exemplary modules of the ingestible product preparation system 10 of FIG. 1.

Some of these modules are depicted in FIG. 113 to include receiving information fob module m1140, receiving information cell phone module m1141, receiving information breathalyzer module m1142, receiving information incorporate module m1143, receiving information days module m1144, receiving information swallow module m1145, receiving information inhaled module m1146, receiving information tube module m1147, receiving information transdermal module m1148, receiving information capsule module m1149, receiving information sandwich module m1150, receiving information soup module m1151, receiving information smoothie module m1152, receiving information baked module m1153, receiving information deposited module m1154, receiving information assembled module m1155, receiving information uses module m1156, receiving information periods module m1157, receiving information display module m1158, and receiving information audio module m1159.

Figure 114:
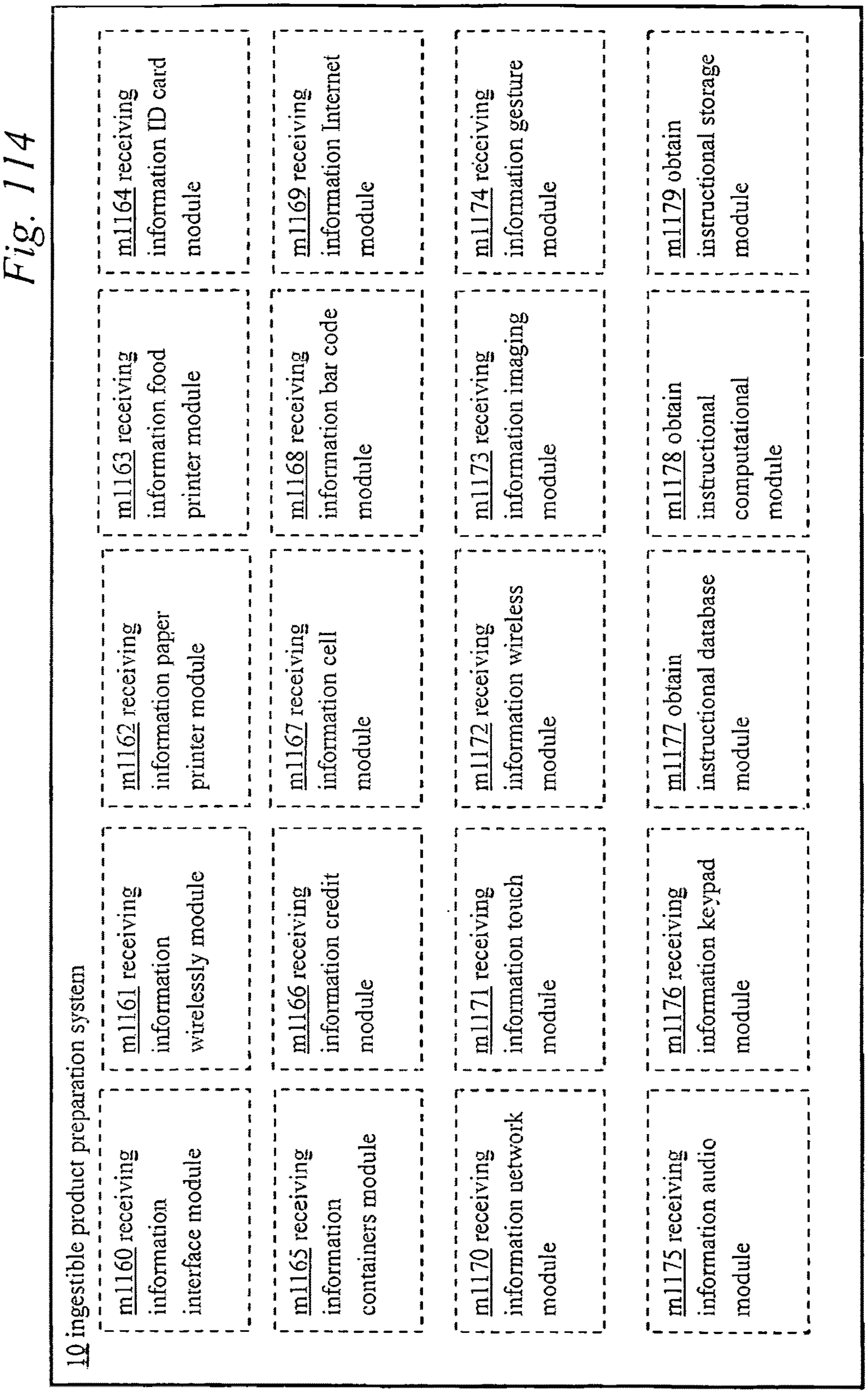
FIG. 114 is a block diagram depicting one or more exemplary modules of the ingestible product preparation system 10 of FIG. 1.

Some of these modules are depicted in FIG. 114 to include receiving information interface module m1160, receiving information wirelessly module m1161, receiving information paper printer module m1162, receiving information food printer module m1163, receiving information ID card module m1164, receiving information containers module m1165, and receiving information credit module m1166, receiving information cell module m1167, receiving information bar code module m1168, receiving information Internet module m1169, receiving information network module m1170, receiving information touch module m1171, receiving information wireless module m1172, receiving information imaging module m1173, receiving information gesture module m1174, receiving information audio module m1175, receiving information keypad module m1176, obtain instructional database module m1177, obtain instructional computational module m1178, and obtain instructional storage module m1179.

Figure 115:
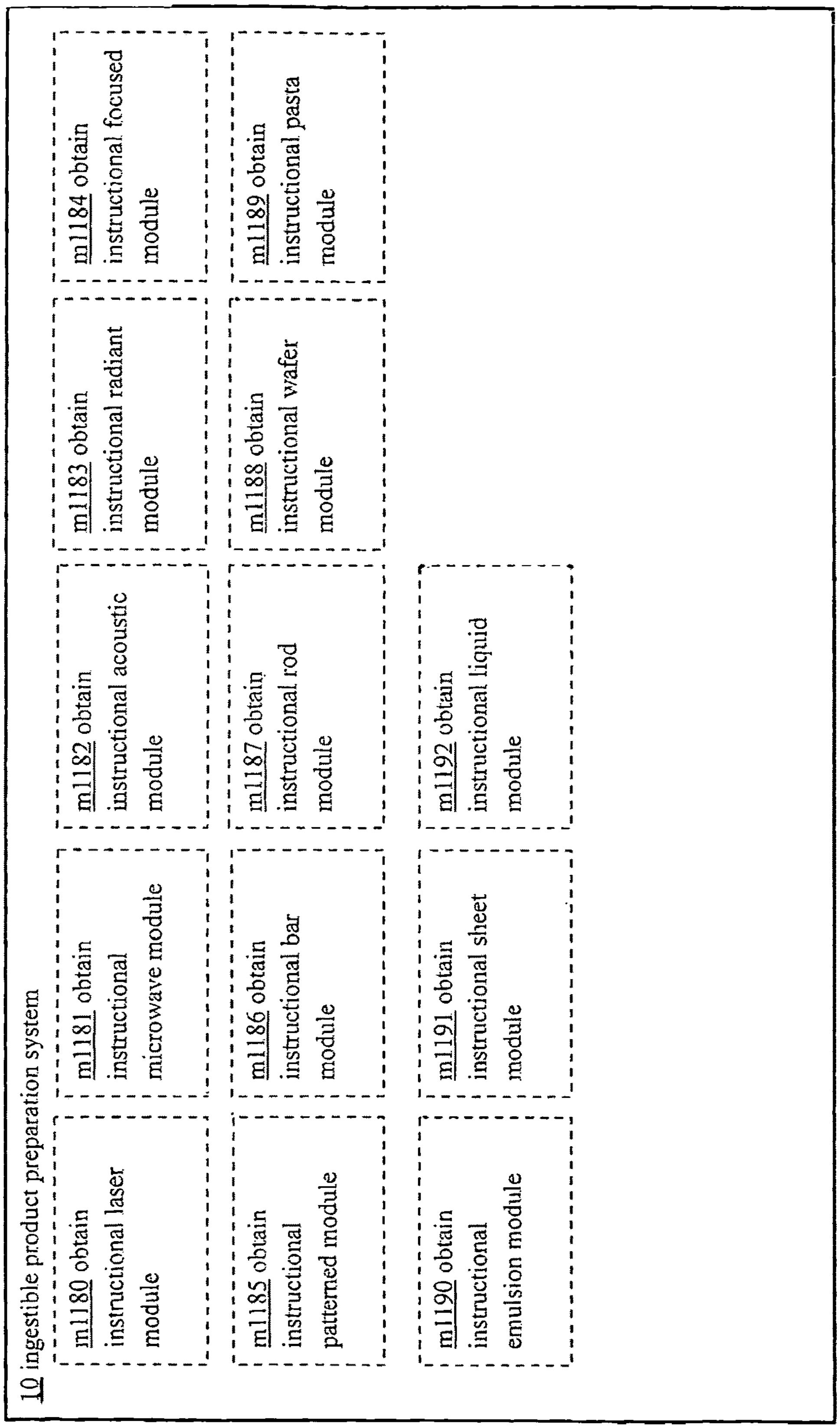

Some of these modules are depicted in FIG. 115 to include obtain instructional laser module m1180, obtain instructional microwave module m1181, obtain instructional acoustic module m1182, obtain instructional radiant module m1183, obtain instructional focused module m1184, obtain instructional patterned module m1185, obtain instructional bar module m1186, obtain instructional rod module m1187, obtain instructional wafer module m1188, obtain instructional pasta module m1189, obtain instructional emulsion module m1190, obtain instructional sheet module m1191, and obtain instructional liquid module m1192.

Figure 116:
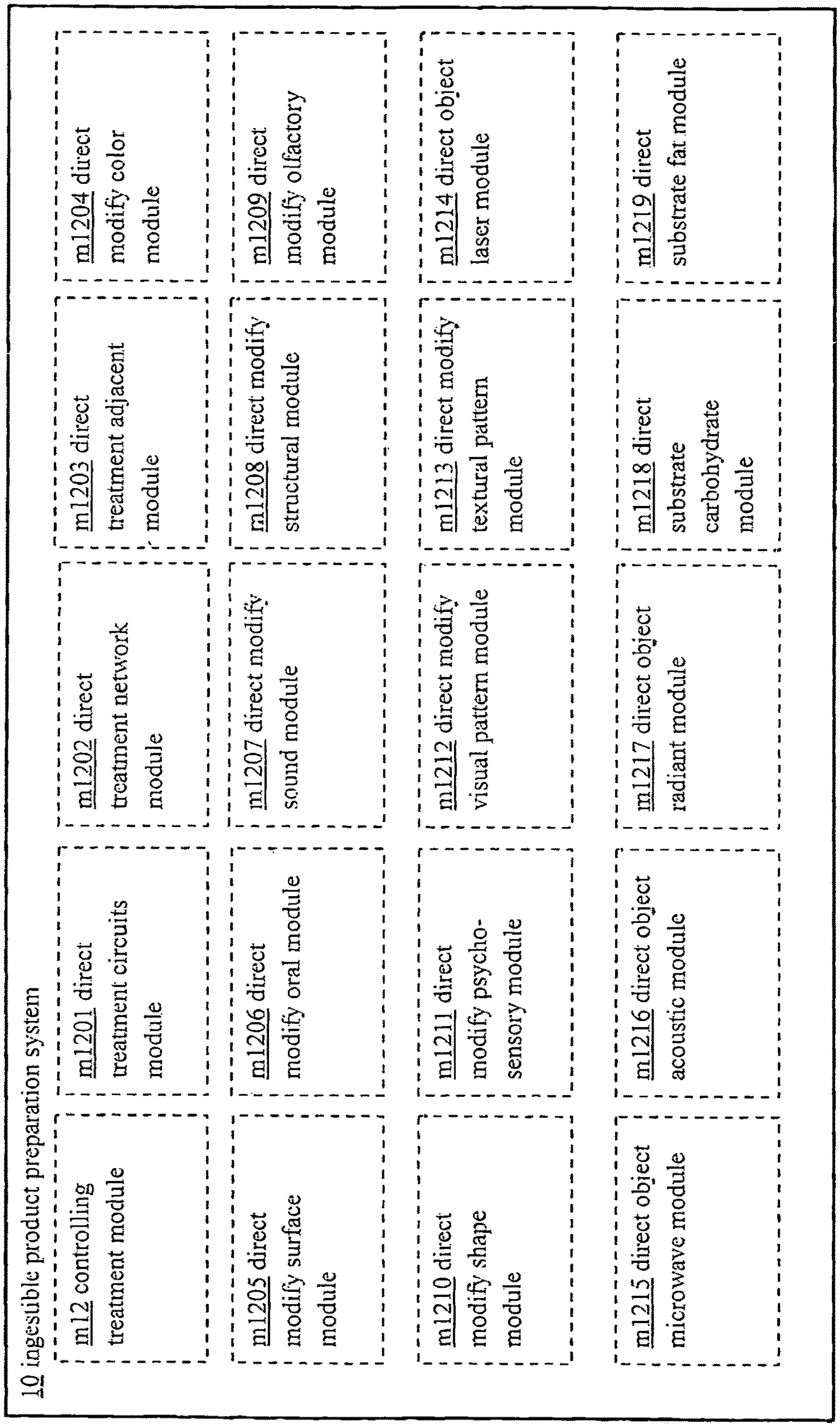

Some of these modules are depicted in FIG. 116 to include controlling treatment module m12, direct treatment circuits module m1201, direct treatment network module m1202, direct treatment adjacent module m1203, direct modify color module m1204, direct modify surface module m1205, direct modify oral module m1206, direct modify sound module m1207, direct modify structural module m1208, direct modify olfactory module m1209, direct modify shape module m1210, direct modify psycho-sensory module m1211, and direct modify visual pattern module m1212, direct modify textural pattern module m1213, direct object laser module m1214, direct object microwave module m1215, direct object acoustic module m1216, direct object radiant module m1217, direct substrate carbohydrate module m1218, and direct substrate fat module m1219.

Figure 117:
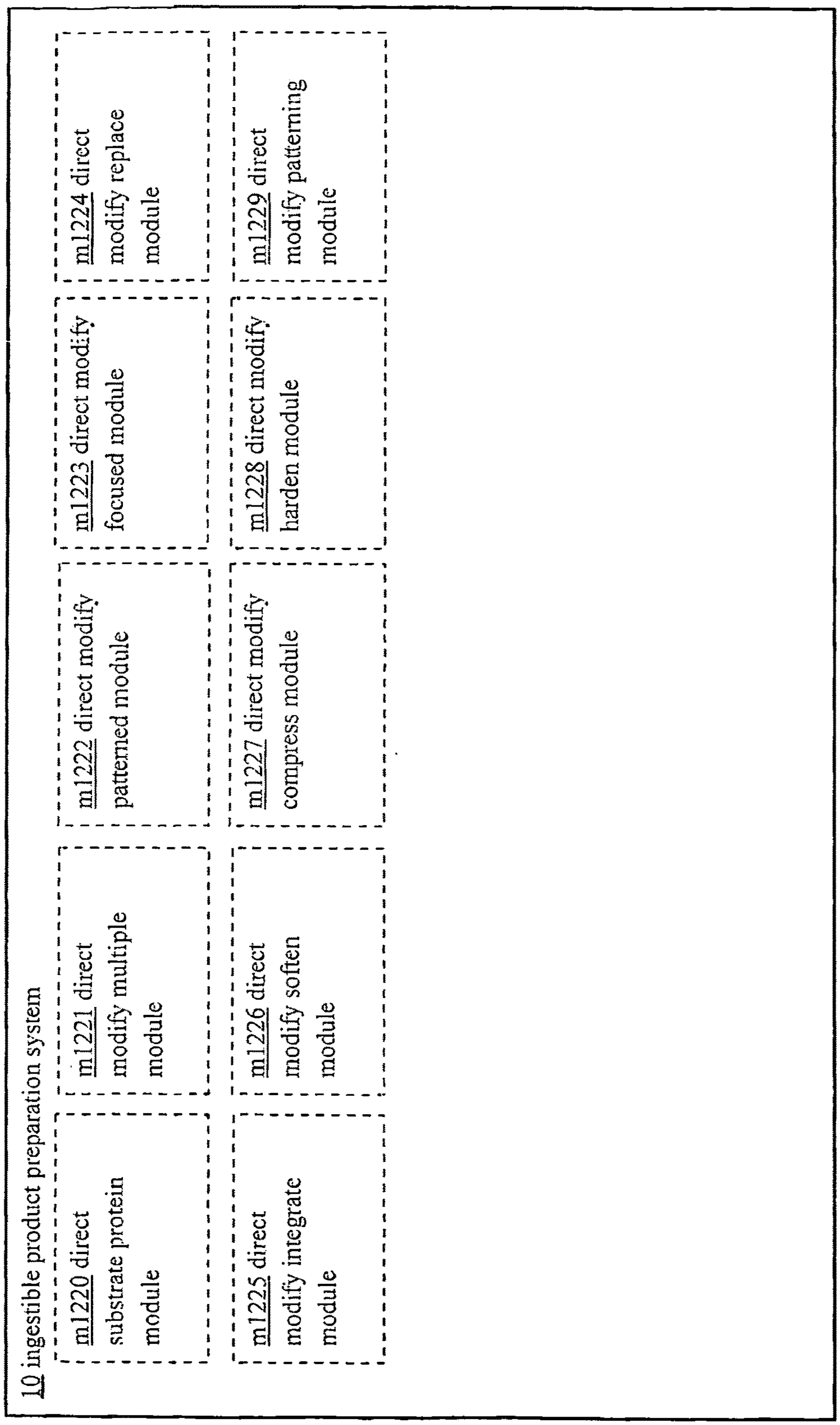

Some of these modules are depicted in FIG. 117 to include direct substrate protein module m12, direct modify multiple module m1221, direct modify patterned module m1222, direct modify focused module m1223, direct modify replace module m1224, direct modify integrate module m1225, direct modify soften module m1226, direct modify compress module m1227, direct modify harden module m1228, and direct modify patterning module m1229.

In some implementations, non-transistory signal-bearing medium of information storage subsystem s200 as articles of manufacture may store the one or more exemplary instructions. In some implementations, the non-transistory signal bearing medium may include a computer-readable medium. In some implementations, the non-transitory signal-bearing medium may include a recordable medium. In some implementations, the signal-bearing medium may include a communication medium.

The various subsystems and components of the ingestible product preparation system s10 such as the control and information processing subsystem s100, the information storage subsystem s200, the information user interface subsystem s300, the sensing subsystem s400 and the electronic communication subsystem s500 and their sub-components and the other exemplary entities depicted may be embodied by hardware, software and/or firmware (limited to patentable subject matter under 35 USC 101). For example, in some implementations of the ingestible product preparation system s10, aspects may be implemented with a processor (e.g., microprocessor, controller, and so forth) executing computer readable instructions (e.g., computer program product) stored in a storage medium (e.g., volatile or non-volatile memory) such as a signal-bearing medium. Alternatively, hardware such as application specific integrated circuit (ASIC) may be employed in order to implement such modules in some alternative implementations.

An operational flow o10 as shown in FIG. 118 represents example operations related to electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures and electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products.

FIG. 118 and those figures that follow may have various examples of operational flows, and explanation may be provided with respect to the above-described examples of FIGS. 1-17 and/or with respect to other examples and contexts. Nonetheless, it should be understood that the operational flows may be executed in a number of other environments and contexts, and/or in modified versions of FIGS. 1-17. Furthermore, although the various operational flows are presented in the sequence(s) illustrated, it should be understood that the various operations may be performed in other orders than those which are illustrated, or may be performed concurrently.

In FIG. 118 and those figures that follow, various operations may be depicted in a box-within-a-box manner. Such depictions may indicate that an operation in an internal box may comprise an optional exemplary implementation of the operational step illustrated in one or more external boxes. However, it should be understood that internal box operations may be viewed as independent operations separate from any associated external boxes and may be performed in any sequence with respect to all other illustrated operations, or may be performed concurrently.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

As shown in FIG. 118, the operational flow o10 proceeds to operation o11 for electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures. An exemplary version of a non-transitory signal bearing medium of information storage subsystem s200 is depicted as bearing one or more receiving information instructions i11 that when executed will direct performance of the operation o11. In an implementation, the one or more receiving information instructions i11 when executed direct electronically receiving (e.g. including the network cable component s502 carries information to the transceiver component s522, and/or etc.) user status information (e.g. including identification, characteristics, affiliations, and/or etc.) regarding one or more particular individual living beings (e.g. including one or more particular human beings, animals, and/or etc.) including one or more identifiers (e.g. including identification numbers, order numbers, passwords, biometric data such as voice prints, stored in information storage subsystem 200, and/or etc.) associated with the one or more particular individual living beings (e.g. including one or more humans, animals, and/or etc.) and electronically receiving (e.g. including through the receiver component s528, and/or etc.) selection information (e.g. including preferences, choices, and/or etc.) at least in part identifying (e.g. including textual descriptions, graphical representations, and/or etc.) one or more selected ingestible products (e.g. including sandwiches, snack bars, full course meals, deserts, drinks, side dishes, medications, and/or etc.) being subject to ingestion (e.g. including oral, dermal, nasal, and/or etc.) by the one or more particular individual living beings (e.g. including one or more humans, animals, and/or etc.), the selection information (e.g. including likes, dislikes, meal selection, and/or etc.) electronically received (e.g. including through the transceiver component s522, and/or etc.) via electronically enabled input (e.g. including voice, gesture, keypad, and/or etc.), the electronically receiving (e.g. including through transceiver component s522, and/or etc.) the user status information (e.g. including identification, associated location information, memberships, and/or etc.) and the electronically receiving (e.g. including through transceiver component s522, and/or etc.) the selection information (e.g. including ingestible materials desired, and/or etc.) at least in part to electronically obtain (e.g. including through data packets, and/or etc.) treatment instructional information (e.g. including methodology, preparation steps, and/or etc.) regarding one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) for one or more portions (e.g. including units, sections, randomized areas, items, isolated, preparation steps, and/or etc.) of one or more ingestible substrate structures (e.g. including bars, sheets, cylinders, spheroids, cuboids, polygons, and/or etc.). Furthermore, the receiving information electrical circuitry arrangement ("elec circ arrange") e11 when activated will perform the operation o1101. Also, the receiving information ID card module m1101, when executed and/or activated, will direct performance of and/or performs the operation o11. In an implementation, the receiving information electrical circuitry arrangement e11, when activated performs electronically receiving (e.g. including the network cable component s502 carries information to the transceiver component s522, and/or etc.) user status information (e.g. including identification, characteristics, affiliations, and/or etc.) regarding one or more particular individual living beings (e.g. including one or more particular human beings, animals, and/or etc.) including one or more identifiers (e.g. including identification numbers, order numbers, passwords, biometric data such as voice prints, stored in information storage subsystem 200, and/or etc.) associated with the one or more particular individual living beings (e.g. including one or more humans, animals, and/or etc.) and electronically receiving (e.g. including through the receiver component s528, and/or etc.) selection information (e.g. including preferences, choices, and/or etc.) at least in part identifying (e.g. including textual descriptions, graphical representations, and/or etc.) one or more selected ingestible products (e.g. including sandwiches, snack bars, full course meals, deserts, drinks, side dishes, medications, and/or etc.) being subject to ingestion (e.g. including oral, dermal, nasal, and/or etc.) by the one or more particular individual living beings (e.g. including one or more humans, animals, and/or etc.), the selection information (e.g. including likes, dislikes, meal selection, and/or etc.) electronically received (e.g. including through the transceiver component s522, and/or etc.) via electronically enabled input (e.g. including voice, gesture, keypad, and/or etc.), the electronically receiving (e.g. including through transceiver component s522, and/or etc.) the user status information (e.g. including identification, associated location information, memberships, and/or etc.) and the electronically receiving (e.g. including through transceiver component s522, and/or etc.) the selection information (e.g. including ingestible materials desired, and/or etc.) at least in part to electronically obtain (e.g. including through data packets, and/or etc.) treatment instructional information (e.g. including methodology, preparation steps, and/or etc.) regarding one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) for one or more portions (e.g. including units, sections, randomized areas, items, isolated, preparation steps, and/or etc.) of one or more ingestible substrate structures (e.g. including bars, sheets, cylinders, spheroids, cuboids, polygons, and/or etc.). Also, the receiving information module m11, when executed and/or activated, will direct performance of and/or perform the operation o11. In an implementation, the electronically receiving user status information regarding one or more particular individual living beings including one or more identifiers associated with the one or more particular individual living beings and electronically receiving selection information at least in part identifying one or more selected ingestible products being subject to ingestion by the one or more particular individual living beings, the selection information electronically received via electronically enabled input, the electronically receiving the user status information and the electronically receiving the selection information at least in part to electronically obtain treatment instructional information regarding one or more subsequent ingestible substrate structure directed energy operations for one or more portions of one or more ingestible substrate structures is carried out by electronically receiving (e.g. including the network cable component s502 carries information to the transceiver component s522, and/or etc.) user status information (e.g. including identification, characteristics, affiliations, and/or etc.) regarding one or more particular individual living beings (e.g. including one or more particular human beings, animals, and/or etc.) including one or more identifiers (e.g. including identification numbers, order numbers, passwords, biometric data such as voice prints, stored in information storage subsystem 200, and/or etc.) associated with the one or more particular individual living beings (e.g. including one or more humans, animals, and/or etc.) and electronically receiving (e.g. including through the receiver component s528, and/or etc.) selection information (e.g. including preferences, choices, and/or etc.) at least in part identifying (e.g. including textual descriptions, graphical representations, and/or etc.) one or more selected ingestible products (e.g. including sandwiches, snack bars, full course meals, deserts, drinks, side dishes, medications, and/or etc.) being subject to ingestion (e.g. including oral, dermal, nasal, and/or etc.) by the one or more particular individual living beings (e.g. including one or more humans, animals, and/or etc.), the selection information (e.g. including likes, dislikes, meal selection, and/or etc.) electronically received (e.g. including through the transceiver component s522, and/or etc.) via electronically enabled input (e.g. including voice, gesture, keypad, and/or etc.), the electronically receiving (e.g. including through transceiver component s522, and/or etc.) the user status information (e.g. including identification, associated location information, memberships, and/or etc.) and the electronically receiving (e.g. including through transceiver component s522, and/or etc.) the selection information (e.g. including ingestible materials desired, and/or etc.) at least in part to electronically obtain (e.g. including through data packets, and/or etc.) treatment instructional information (e.g. including methodology, preparation steps, and/or etc.) regarding one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) for one or more portions (e.g. including units, sections, randomized areas, items, isolated, preparation steps, and/or etc.) of one or more ingestible substrate structures (e.g. including bars, sheets, cylinders, spheroids, cuboids, polygons, and/or etc.).

Figure 104:
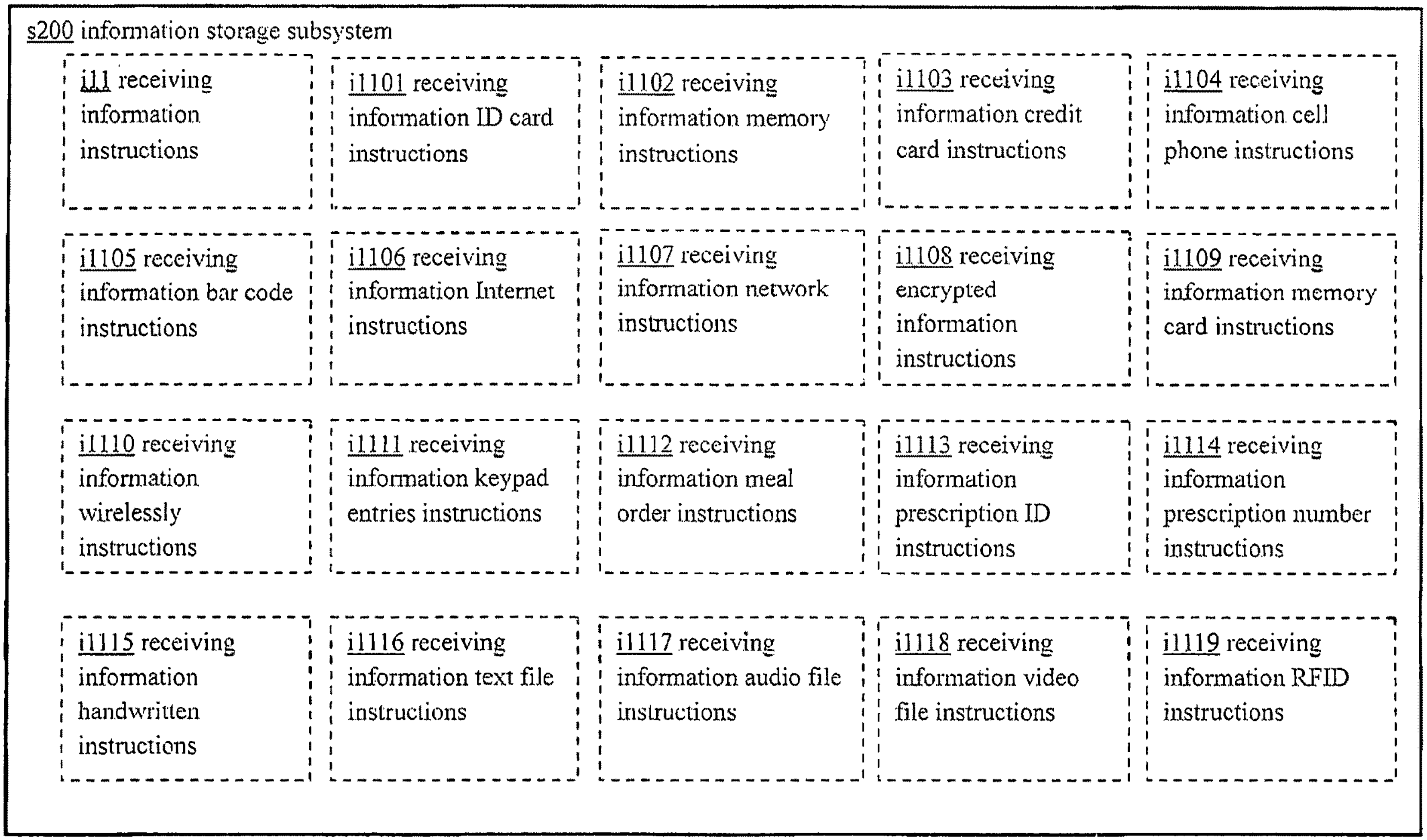
FIG. 104 is a block diagram depicting one or more exemplary instructions of the information storage subsystem s200 of the ingestible product preparation system 10 of FIG. 1.

In one or more implementations, as shown in FIG. 119, operation o11 includes an operation o1101 for electronically receiving the user status information regarding the one or more particular individual living beings via one or more electronic identification cards. Origination of an illustratively derived receiving information ID card component group can be accomplished through skilled in the art design choice selection of one or more of the above depicted components from one or more of the above depicted subsystems shown in FIG. 18. Components from the receiving information ID card component group can be used in implementing execution of the one or more receiving information ID card instructions i1101 of FIG. 104, can be used in performance of the receiving information ID card electrical circuitry arrangement e1101 of FIG. 97, and/or can be used in otherwise fulfillment of the operation o1101. An exemplary non-transitory signal bearing medium version of the information storage subsystem s200 is depicted in FIG. 104 as bearing the one or more receiving information ID card instructions i1101 that when executed will direct performance of the operation o1101. Furthermore, the receiving information ID card electrical circuitry arrangement ("elec circ arrange") e1101, when activated, will perform the operation o1101. Also, the receiving information ID card module m1101, when executed and/or activated, will direct performance of and/or perform the operation o1101. For instance, in one or more exemplary implementations, the one or more receiving information ID card instructions i1101, when executed, direct performance of the operation o1101 in the illustrative depiction as follows, and/or the receiving information ID card electrical circuitry arrangement e1101, when activated, performs the operation o1101 in the illustrative depiction as follows, and/or the receiving information ID card module m1101, when executed and/or activated, directs performance of and/or performs the operation o1101 in the illustrative depiction as follows, and/or the operation o1101 is otherwise carried out in the illustrative depiction as follows: electronically receiving the user status information regarding the one or more particular individual living beings via one or more electronic identification cards (e.g. including an implementation of the receiver component s528 is configured to electronically engage with a card having memory storage holding the user status information, and/or etc.).

In one or more implementations, as shown in FIG. 119, operation o11 includes an operation o1102 for electronically receiving the user status information regarding the one or more particular individual living beings contained in one or more memory circuit coupled with a medication containers. Origination of an illustratively derived receiving information memory component group can be accomplished through skilled in the art design choice selection of one or more of the above depicted components from one or more of the above depicted subsystems shown in FIG. 18. Components from the receiving information memory component group can be used in implementing execution of the one or more receiving information memory instructions i1102 of FIG. 104, can be used in performance of the receiving information memory electrical circuitry arrangement e1102 of FIG. 97, and/or can be used in otherwise fulfillment of the operation o1102. An exemplary non-transitory signal bearing medium version of the information storage subsystem s200 is depicted in FIG. 104 as bearing the one or more receiving information memory instructions i1102 that when executed will direct performance of the operation o1102. Furthermore, the receiving information memory electrical circuitry arrangement ("elec circ arrange") e1102, when activated, will perform the operation o1102. Also, the receiving information memory module m1102, when executed and/or activated, will direct performance of and/or perform the operation o1102. For instance, in one or more exemplary implementations, the one or more receiving information memory instructions i1102, when executed, direct performance of the operation o1102 in the illustrative depiction as follows, and/or the receiving information memory electrical circuitry arrangement e1102, when activated, performs the operation o1102 in the illustrative depiction as follows, and/or the receiving information memory module m1102, when executed and/or activated, directs performance of and/or performs the operation o1102 in the illustrative depiction as follows, and/or the operation o1102 is otherwise carried out in the illustrative depiction as follows: electronically receiving the user status information regarding the one or more particular individual living beings contained in one or more memory circuit (e.g. including RAM component s202, and/or etc.) coupled with a medication containers (e.g. including an implementation of the receiver component s528 is configured to electronically engage with a memory storage coupled with a medication container to receive the user status information in electronic form, and/or etc.).

In one or more implementations, as shown in FIG. 119, operation o11 includes an operation o1103 for electronically receiving the user status information regarding the one or more particular individual living beings via one or more credit card swipes. Origination of an illustratively derived receiving information credit card component group can be accomplished through skilled in the art design choice selection of one or more of the above depicted components from one or more of the above depicted subsystems shown in FIG. 18. Components from the receiving information credit card component group can be used in implementing execution of the one or more receiving information credit card instructions i1103 of FIG. 104, can be used in performance of the receiving information credit card electrical circuitry arrangement e1103 of FIG. 97, and/or can be used in otherwise fulfillment of the operation o1103. An exemplary non-transitory signal bearing medium version of the information storage subsystem s200 is depicted in FIG. 104 as bearing the one or more receiving information credit card instructions i1103 that when executed will direct performance of the operation o1103. Furthermore, the receiving information credit card electrical circuitry arrangement ("elec circ arrange") e1103, when activated, will perform the operation o1103. Also, the receiving information credit card module m1103, when executed and/or activated, will direct performance of and/or perform the operation o1103. For instance, in one or more exemplary implementations, the one or more receiving information credit card instructions i1103, when executed, direct performance of the operation o1103 in the illustrative depiction as follows, and/or the receiving information credit card electrical circuitry arrangement e1103, when activated, performs the operation o1103 in the illustrative depiction as follows, and/or the receiving information credit card module m1103, when executed and/or activated, directs performance of and/or performs the operation o1103 in the illustrative depiction as follows, and/or the operation o1103 is otherwise carried out in the illustrative depiction as follows: electronically receiving the user status information regarding the one or more particular individual living beings via one or more credit card swipes (e.g. including an implementation of the receiver component s528 is configured to electronically engage with an electronic memory stripe integrated into a credit card to receive the user status information, and/or etc.).

In one or more implementations, as shown in FIG. 120, operation o11 includes an operation o1104 for electronically receiving the user status information regarding the one or more particular individual living beings via one or more cell phone swipes. Origination of an illustratively derived receiving information cell phone component group can be accomplished through skilled in the art design choice selection of one or more of the above depicted components from one or more of the above depicted subsystems shown in FIG. 18. Components from the receiving information cell phone component group can be used in implementing execution of the one or more receiving information cell phone instructions i1104 of FIG. 104, can be used in performance of the receiving information cell phone electrical circuitry arrangement e1104 of FIG. 97, and/or can be used in otherwise fulfillment of the operation o1104. An exemplary non-transitory signal bearing medium version of the information storage subsystem s200 is depicted in FIG. 104 as bearing the one or more receiving information cell phone instructions i1104 that when executed will direct performance of the operation o1104. Furthermore, the receiving information cell phone electrical circuitry arrangement ("elec circ arrange") e1104, when activated, will perform the operation o1104. Also, the receiving information cell phone module m1104, when executed and/or activated, will direct performance of and/or perform the operation o1104. For instance, in one or more exemplary implementations, the one or more receiving information cell phone instructions i1104, when executed, direct performance of the operation o1104 in the illustrative depiction as follows, and/or the receiving information cell phone electrical circuitry arrangement e1104, when activated, performs the operation o1104 in the illustrative depiction as follows, and/or the receiving information cell phone module m1104, when executed and/or activated, directs performance of and/or performs the operation o1104 in the illustrative depiction as follows, and/or the operation o1104 is otherwise carried out in the illustrative depiction as follows: electronically receiving the user status information regarding the one or more particular individual living beings via one or more cell phone swipes (e.g. including an implementation of the receiver component s528 is configured to electronically engage with an electronic memory component integrated into a cell phone to receive the user status information, and/or etc.).

In one or more implementations, as shown in FIG. 120, operation o11 includes an operation o1105 for electronically receiving the user status information regarding the one or more particular individual living beings via bar code communication. Origination of an illustratively derived receiving information bar code component group can be accomplished through skilled in the art design choice selection of one or more of the above depicted components from one or more of the above depicted subsystems shown in FIG. 18. Components from the receiving information bar code component group can be used in implementing execution of the one or more receiving information bar code instructions i1105 of FIG. 104, can be used in performance of the receiving information bar code electrical circuitry arrangement e1105 of FIG. 97, and/or can be used in otherwise fulfillment of the operation o1105. An exemplary non-transitory signal bearing medium version of the information storage subsystem s200 is depicted in FIG. 104 as bearing the one or more receiving information bar code instructions i1105 that when executed will direct performance of the operation o1105. Furthermore, the receiving information bar code electrical circuitry arrangement ("elec circ arrange") e1105, when activated, will perform the operation o1105. Also, the receiving information bar code module m1105, when executed and/or activated, will direct performance of and/or perform the operation o1105. For instance, in one or more exemplary implementations, the one or more receiving information bar code instructions i1105, when executed, direct performance of the operation o1105 in the illustrative depiction as follows, and/or the receiving information bar code electrical circuitry arrangement e1105, when activated, performs the operation o1105 in the illustrative depiction as follows, and/or the receiving information bar code module m1105, when executed and/or activated, directs performance of and/or performs the operation o1105 in the illustrative depiction as follows, and/or the operation o1105 is otherwise carried out in the illustrative depiction as follows: electronically receiving the user status information regarding the one or more particular individual living beings via bar code communication (e.g. including an implementation of the receiver component s528 is configured to electronically read a bar code label to receive the user status information, and/or etc.).

In one or more implementations, as shown in FIG. 120, operation o11 includes an operation o1106 for electronically receiving the user status information regarding the one or more particular individual living beings via Internet communication. Origination of an illustratively derived receiving information Internet component group can be accomplished through skilled in the art design choice selection of one or more of the above depicted components from one or more of the above depicted subsystems shown in FIG. 18. Components from the receiving information Internet component group can be used in implementing execution of the one or more receiving information Internet instructions i1106 of FIG. 104, can be used in performance of the receiving information Internet electrical circuitry arrangement e1106 of FIG. 97, and/or can be used in otherwise fulfillment of the operation o1106. An exemplary non-transitory signal bearing medium version of the information storage subsystem s200 is depicted in FIG. 104 as bearing the one or more receiving information Internet instructions i1106 that when executed will direct performance of the operation o1106. Furthermore, the receiving information Internet electrical circuitry arrangement ("elec circ arrange") e1106, when activated, will perform the operation o1106. Also, the receiving information Internet module m1106, when executed and/or activated, will direct performance of and/or perform the operation o1106. For instance, in one or more exemplary implementations, the one or more receiving information Internet instructions i1106, when executed, direct performance of the operation o1106 in the illustrative depiction as follows, and/or the receiving information Internet electrical circuitry arrangement e1106, when activated, performs the operation o1106 in the illustrative depiction as follows, and/or the receiving information Internet module m1106, when executed and/or activated, directs performance of and/or performs the operation o1106 in the illustrative depiction as follows, and/or the operation o1106 is otherwise carried out in the illustrative depiction as follows: electronically receiving the user status information regarding the one or more particular individual living beings via Internet communication (e.g. including an implementation of the receiver component s528 is configured to electronically receive through the internet network component s508 the user status information, and/or etc.).

In one or more implementations, as shown in FIG. 121, operation o11 includes an operation o1107 for electronically receiving the user status information regarding the one or more particular individual living beings via an electronic network. Origination of an illustratively derived receiving information network component group can be accomplished through skilled in the art design choice selection of one or more of the above depicted components from one or more of the above depicted subsystems shown in FIG. 18. Components from the receiving information network component group can be used in implementing execution of the one or more receiving information network instructions i1107 of FIG. 104, can be used in performance of the receiving information network electrical circuitry arrangement e1107 of FIG. 97, and/or can be used in otherwise fulfillment of the operation o1107. An exemplary non-transitory signal bearing medium version of the information storage subsystem s200 is depicted in FIG. 104 as bearing the one or more receiving information network instructions i1107 that when executed will direct performance of the operation o1107. Furthermore, the receiving information network electrical circuitry arrangement ("elec circ arrange") e1107, when activated, will perform the operation o1107. Also, the receiving information network module m1107, when executed and/or activated, will direct performance of and/or perform the operation o1107. For instance, in one or more exemplary implementations, the one or more receiving information network instructions i1107, when executed, direct performance of the operation o1107 in the illustrative depiction as follows, and/or the receiving information network electrical circuitry arrangement e1107, when activated, performs the operation o1107 in the illustrative depiction as follows, and/or the receiving information network module m1107, when executed and/or activated, directs performance of and/or performs the operation o1107 in the illustrative depiction as follows, and/or the operation o1107 is otherwise carried out in the illustrative depiction as follows: electronically receiving the user status information regarding the one or more particular individual living beings via an electronic network (e.g. including an implementation of the receiver component s528 is configured to electronically engage with the network cable component s502 to receive the user status information, and/or etc.).

In one or more implementations, as shown in FIG. 121, operation o11 includes an operation o1108 for electronically receiving the user status information regarding the one or more particular individual living beings as encrypted data. Origination of an illustratively derived receiving encrypted information component group can be accomplished through skilled in the art design choice selection of one or more of the above depicted components from one or more of the above depicted subsystems shown in FIG. 18. Components from the receiving encrypted information component group can be used in implementing execution of the one or more receiving encrypted information instructions i1108 of FIG. 104, can be used in performance of the receiving encrypted information electrical circuitry arrangement e1108 of FIG. 97, and/or can be used in otherwise fulfillment of the operation o1108. An exemplary non-transitory signal bearing medium version of the information storage subsystem s200 is depicted in FIG. 104 as bearing the one or more receiving encrypted information instructions i1108 that when executed will direct performance of the operation o1108. Furthermore, the receiving encrypted information electrical circuitry arrangement ("elec circ arrange") e1108, when activated, will perform the operation o1108. Also, the receiving encrypted information module m1108, when executed and/or activated, will direct performance of and/or perform the operation o1108. For instance, in one or more exemplary implementations, the one or more receiving encrypted information instructions i1108, when executed, direct performance of the operation o1108 in the illustrative depiction as follows, and/or the receiving encrypted information electrical circuitry arrangement e1108, when activated, performs the operation o1108 in the illustrative depiction as follows, and/or the receiving encrypted information module m1108, when executed and/or activated, directs performance of and/or performs the operation o1108 in the illustrative depiction as follows, and/or the operation o1108 is otherwise carried out in the illustrative depiction as follows: electronically receiving the user status information regarding the one or more particular individual living beings as encrypted data (e.g. including an implementation of the receiver component s528 is configured to electronically receive through the encrypted communication component s520 the user status information, and/or etc.).

In one or more implementations, as shown in FIG. 121, operation o11 includes an operation o1109 for electronically receiving the user status information regarding the one or more particular individual living beings contained on one or more memory cards. Origination of an illustratively derived receiving information memory card component group can be accomplished through skilled in the art design choice selection of one or more of the above depicted components from one or more of the above depicted subsystems shown in FIG. 18. Components from the receiving information memory card component group can be used in implementing execution of the one or more receiving information memory card instructions i1109 of FIG. 104, can be used in performance of the receiving information memory card electrical circuitry arrangement e1109 of FIG. 97, and/or can be used in otherwise fulfillment of the operation o1109. An exemplary non-transitory signal bearing medium version of the information storage subsystem s200 is depicted in FIG. 104 as bearing the one or more receiving information memory card instructions i1109 that when executed will direct performance of the operation o1109. Furthermore, the receiving information memory card electrical circuitry arrangement ("elec circ arrange") e1109, when activated, will perform the operation o1109. Also, the receiving information memory card module m1109, when executed and/or activated, will direct performance of and/or perform the operation o1109. For instance, in one or more exemplary implementations, the one or more receiving information memory card instructions i1109, when executed, direct performance of the operation o1109 in the illustrative depiction as follows, and/or the receiving information memory card electrical circuitry arrangement e1109, when activated, performs the operation o1109 in the illustrative depiction as follows, and/or the receiving information memory card module m1109, when executed and/or activated, directs performance of and/or performs the operation o1109 in the illustrative depiction as follows, and/or the operation o1109 is otherwise carried out in the illustrative depiction as follows: electronically receiving the user status information regarding the one or more particular individual living beings contained on one or more memory cards (e.g. including an implementation of the receiver component s528 is configured to electronically engage with an electronic memory card to receive the user status information, and/or etc.).

In one or more implementations, as shown in FIG. 122, operation o11 includes an operation o1110 for electronically receiving the user status information regarding the one or more particular individual living beings wirelessly. Origination of an illustratively derived receiving information wirelessly component group can be accomplished through skilled in the art design choice selection of one or more of the above depicted components from one or more of the above depicted subsystems shown in FIG. 18. Components from the receiving information wirelessly component group can be used in implementing execution of the one or more receiving information wirelessly instructions i1110 of FIG. 104, can be used in performance of the receiving information wirelessly electrical circuitry arrangement e1110 of FIG. 97, and/or can be used in otherwise fulfillment of the operation o1110. An exemplary non-transitory signal bearing medium version of the information storage subsystem s200 is depicted in FIG. 104 as bearing the one or more receiving information wirelessly instructions i1110 that when executed will direct performance of the operation o1110. Furthermore, the receiving information wirelessly electrical circuitry arrangement ("elec circ arrange") e1110, when activated, will perform the operation o1110. Also, the receiving information wirelessly module m1110, when executed and/or activated, will direct performance of and/or perform the operation o1110. For instance, in one or more exemplary implementations, the one or more receiving information wirelessly instructions i1110, when executed, direct performance of the operation o1110 in the illustrative depiction as follows, and/or the receiving information wirelessly electrical circuitry arrangement e1110, when activated, performs the operation o1110 in the illustrative depiction as follows, and/or the receiving information wirelessly module m1110, when executed and/or activated, directs performance of and/or performs the operation o1110 in the illustrative depiction as follows, and/or the operation o1110 is otherwise carried out in the illustrative depiction as follows: electronically receiving the user status information regarding the one or more particular individual living beings wirelessly (e.g. including an implementation of the receiver component s528 is configured to electronically receive through the wireless network component s512 the user status information, and/or etc.).

In one or more implementations, as shown in FIG. 122, operation o11 includes an operation o1111 for electronically receiving the user status information regarding the one or more particular individual living beings via one or more electronic keypad entries. Origination of an illustratively derived receiving information keypad entries component group can be accomplished through skilled in the art design choice selection of one or more of the above depicted components from one or more of the above depicted subsystems shown in FIG. 18. Components from the receiving information keypad entries component group can be used in implementing execution of the one or more receiving information keypad entries instructions i1111 of FIG. 104, can be used in performance of the receiving information keypad entries electrical circuitry arrangement e1111 of FIG. 97, and/or can be used in otherwise fulfillment of the operation o1111. An exemplary non-transitory signal bearing medium version of the information storage subsystem s200 is depicted in FIG. 104 as bearing the one or more receiving information keypad entries instructions i1111 that when executed will direct performance of the operation o1111. Furthermore, the receiving information keypad entries electrical circuitry arrangement ("elec circ arrange") e1111, when activated, will perform the operation o1111. Also, the receiving information keypad entries module m1111, when executed and/or activated, will direct performance of and/or perform the operation o1111. For instance, in one or more exemplary implementations, the one or more receiving information keypad entries instructions i1111, when executed, direct performance of the operation o1111 in the illustrative depiction as follows, and/or the receiving information keypad entries electrical circuitry arrangement e1111, when activated, performs the operation o1111 in the illustrative depiction as follows, and/or the receiving information keypad entries module m1111, when executed and/or activated, directs performance of and/or performs the operation o1111 in the illustrative depiction as follows, and/or the operation o1111 is otherwise carried out in the illustrative depiction as follows: electronically receiving the user status information regarding the one or more particular individual living beings via one or more electronic keypad entries (e.g. including an implementation of the receiver component s528 is configured to electronically engage with the keypad component s308 to receive the user status information as inputted by a user, and/or etc.).

In one or more implementations, as shown in FIG. 122, operation o11 includes an operation o1112 for electronically receiving the user status information regarding the one or more particular individual living beings including the one or more identifiers associated with the one or more particular individual living beings via one or more restaurant meal orders. Origination of an illustratively derived receiving information meal order component group can be accomplished through skilled in the art design choice selection of one or more of the above depicted components from one or more of the above depicted subsystems shown in FIG. 18. Components from the receiving information meal order component group can be used in implementing execution of the one or more receiving information meal order instructions i1112 of FIG. 104, can be used in performance of the receiving information meal order electrical circuitry arrangement e1112 of FIG. 97, and/or can be used in otherwise fulfillment of the operation o1112. An exemplary non-transitory signal bearing medium version of the information storage subsystem s200 is depicted in FIG. 104 as bearing the one or more receiving information meal order instructions i1112 that when executed will direct performance of the operation o1112. Furthermore, the receiving information meal order electrical circuitry arrangement ("elec circ arrange") e1112, when activated, will perform the operation o1112. Also, the receiving information meal order module m1112, when executed and/or activated, will direct performance of and/or perform the operation o1112. For instance, in one or more exemplary implementations, the one or more receiving information meal order instructions i1112, when executed, direct performance of the operation o1112 in the illustrative depiction as follows, and/or the receiving information meal order electrical circuitry arrangement e1112, when activated, performs the operation o1112 in the illustrative depiction as follows, and/or the receiving information meal order module m1112, when executed and/or activated, directs performance of and/or performs the operation o1112 in the illustrative depiction as follows, and/or the operation o1112 is otherwise carried out in the illustrative depiction as follows: electronically receiving the user status information regarding the one or more particular individual living beings including the one or more identifiers associated with the one or more particular individual living beings via one or more restaurant meal orders (e.g. including an implementation of the receiver component s528 is configured to electronically engage with the processor component s102 to receive the user status information including the one or more identifiers associated with the one or more particular individual living beings via a meal order electronically inputted by a wait staff person, and/or etc.).

In one or more implementations, as shown in FIG. 123, operation o11 includes an operation o1113 for electronically receiving the user status information regarding the one or more particular individual living beings including the one or more identifiers associated with the one or more particular individual living beings via prescription identification. Origination of an illustratively derived receiving information prescription ID component group can be accomplished through skilled in the art design choice selection of one or more of the above depicted components from one or more of the above depicted subsystems shown in FIG. 18. Components from the receiving information prescription ID component group can be used in implementing execution of the one or more receiving information prescription ID instructions i1113 of FIG. 104, can be used in performance of the receiving information prescription ID electrical circuitry arrangement e1113 of FIG. 97, and/or can be used in otherwise fulfillment of the operation o1113. An exemplary non-transitory signal bearing medium version of the information storage subsystem s200 is depicted in FIG. 104 as bearing the one or more receiving information prescription ID instructions i1113 that when executed will direct performance of the operation o1113. Furthermore, the receiving information prescription ID electrical circuitry arrangement ("elec circ arrange") e1113, when activated, will perform the operation o1113. Also, the receiving information prescription ID module m1113, when executed and/or activated, will direct performance of and/or perform the operation o1113. For instance, in one or more exemplary implementations, the one or more receiving information prescription ID instructions i1113, when executed, direct performance of the operation o1113 in the illustrative depiction as follows, and/or the receiving information prescription ID electrical circuitry arrangement e1113, when activated, performs the operation o1113 in the illustrative depiction as follows, and/or the receiving information prescription ID module m1113, when executed and/or activated, directs performance of and/or performs the operation o1113 in the illustrative depiction as follows, and/or the operation o1113 is otherwise carried out in the illustrative depiction as follows: electronically receiving the user status information regarding the one or more particular individual living beings including the one or more identifiers associated with the one or more particular individual living beings via prescription identification (e.g. including an implementation of the receiver component s528 is configured to electronically engage with the processor component s102 to receive the user status information including the one or more identifiers associated with the particular individual living being as determined by the processor component to include a prescription identification, and/or etc.).

In one or more implementations, as shown in FIG. 123, operation o11 includes an operation o1114 for electronically receiving the user status information regarding the one or more particular individual living beings including the one or more identifiers associated with the one or more particular individual living beings via one or more prescription serial numbers. Origination of an illustratively derived receiving information prescription number component group can be accomplished through skilled in the art design choice selection of one or more of the above depicted components from one or more of the above depicted subsystems shown in FIG. 18. Components from the receiving information prescription number component group can be used in implementing execution of the one or more receiving information prescription number instructions i1114 of FIG. 104, can be used in performance of the receiving information prescription number electrical circuitry arrangement e1114 of FIG. 97, and/or can be used in otherwise fulfillment of the operation o1114. An exemplary non-transitory signal bearing medium version of the information storage subsystem s200 is depicted in FIG. 104 as bearing the one or more receiving information prescription number instructions i1114 that when executed will direct performance of the operation o1114. Furthermore, the receiving information prescription number electrical circuitry arrangement ("elec circ arrange") e1114, when activated, will perform the operation o1114. Also, the receiving information prescription number module m1114, when executed and/or activated, will direct performance of and/or perform the operation o1114. For instance, in one or more exemplary implementations, the one or more receiving information prescription number instructions i1114, when executed, direct performance of the operation o1114 in the illustrative depiction as follows, and/or the receiving information prescription number electrical circuitry arrangement e1114, when activated, performs the operation o1114 in the illustrative depiction as follows, and/or the receiving information prescription number module m1114, when executed and/or activated, directs performance of and/or performs the operation o1114 in the illustrative depiction as follows, and/or the operation o1114 is otherwise carried out in the illustrative depiction as follows: electronically receiving the user status information regarding the one or more particular individual living beings including the one or more identifiers associated with the one or more particular individual living beings via one or more prescription serial numbers (e.g. including an implementation of the receiver component s528 is configured to electronically engage with the processor component s102 to receive the user status information including the one or more identifiers associated with the particular individual living being as determined by the processor component to include a prescription serial number, and/or etc.).

In one or more implementations, as shown in FIG. 123, operation o11 includes an operation o1115 for electronically receiving the user status information regarding the one or more particular individual living beings including the one or more identifiers associated with the one or more particular individual living beings via one or more data images of handwritten text. Origination of an illustratively derived receiving information handwritten component group can be accomplished through skilled in the art design choice selection of one or more of the above depicted components from one or more of the above depicted subsystems shown in FIG. 18. Components from the receiving information handwritten component group can be used in implementing execution of the one or more receiving information handwritten instructions i1115 of FIG. 104, can be used in performance of the receiving information handwritten electrical circuitry arrangement e1115 of FIG. 97, and/or can be used in otherwise fulfillment of the operation o1115. An exemplary non-transitory signal bearing medium version of the information storage subsystem s200 is depicted in FIG. 104 as bearing the one or more receiving information handwritten instructions i1115 that when executed will direct performance of the operation o1115. Furthermore, the receiving information handwritten electrical circuitry arrangement ("elec circ arrange") e1115, when activated, will perform the operation o1115. Also, the receiving information handwritten module m1115, when executed and/or activated, will direct performance of and/or perform the operation o1115. For instance, in one or more exemplary implementations, the one or more receiving information handwritten instructions i1115, when executed, direct performance of the operation o1115 in the illustrative depiction as follows, and/or the receiving information handwritten electrical circuitry arrangement e1115, when activated, performs the operation o1115 in the illustrative depiction as follows, and/or the receiving information handwritten module m1115, when executed and/or activated, directs performance of and/or performs the operation o1115 in the illustrative depiction as follows, and/or the operation o1115 is otherwise carried out in the illustrative depiction as follows: electronically receiving the user status information regarding the one or more particular individual living beings including the one or more identifiers associated with the one or more particular individual living beings via one or more data images of handwritten text (e.g. including an implementation of the receiver component s528 is configured to electronically engage with the processor component s102 to receive the user status information regarding the particular individual living being including the one or more identifiers associated with the particular individual living being as determined by the processor component through electronic handwriting analysis of the data image of the handwritten text, and/or etc.).

In one or more implementations, as shown in FIG. 124, operation o11 includes an operation o1116 for electronically receiving the user status information regarding the one or more particular individual living beings including the one or more identifiers associated with the one or more particular individual living beings via one or more computer text files. Origination of an illustratively derived receiving information text file component group can be accomplished through skilled in the art design choice selection of one or more of the above depicted components from one or more of the above depicted subsystems shown in FIG. 18. Components from the receiving information text file component group can be used in implementing execution of the one or more receiving information text file instructions i1116 of FIG. 104, can be used in performance of the receiving information text file electrical circuitry arrangement e1116 of FIG. 97, and/or can be used in otherwise fulfillment of the operation o1116. An exemplary non-transitory signal bearing medium version of the information storage subsystem s200 is depicted in FIG. 104 as bearing the one or more receiving information text file instructions i1116 that when executed will direct performance of the operation o1116. Furthermore, the receiving information text file electrical circuitry arrangement ("elec circ arrange") e1116, when activated, will perform the operation o1116. Also, the receiving information text file module m1116, when executed and/or activated, will direct performance of and/or perform the operation o1116. For instance, in one or more exemplary implementations, the one or more receiving information text file instructions i1116, when executed, direct performance of the operation o1116 in the illustrative depiction as follows, and/or the receiving information text file electrical circuitry arrangement e1116, when activated, performs the operation o1116 in the illustrative depiction as follows, and/or the receiving information text file module m1116, when executed and/or activated, directs performance of and/or performs the operation o1116 in the illustrative depiction as follows, and/or the operation o1116 is otherwise carried out in the illustrative depiction as follows: electronically receiving the user status information regarding the one or more particular individual living beings including the one or more identifiers associated with the one or more particular individual living beings via one or more computer text files (e.g. including an implementation of the receiver component s528 is configured to electronically engage with the processor component s102 to receive the user status information including the one or more identifiers associated with the particular individual living being as determined by the processor component through electronic reading of the computer text file, and/or etc.).

In one or more implementations, as shown in FIG. 124, operation o11 includes an operation o1117 for electronically receiving the user status information regarding the one or more particular individual living beings including the one or more identifiers associated with the one or more particular individual living beings via one or more computer audio files. Origination of an illustratively derived receiving information audio file component group can be accomplished through skilled in the art design choice selection of one or more of the above depicted components from one or more of the above depicted subsystems shown in FIG. 18. Components from the receiving information audio file component group can be used in implementing execution of the one or more receiving information audio file instructions i1117 of FIG. 104, can be used in performance of the receiving information audio file electrical circuitry arrangement e1117 of FIG. 97, and/or can be used in otherwise fulfillment of the operation o1117. An exemplary non-transitory signal bearing medium version of the information storage subsystem s200 is depicted in FIG. 104 as bearing the one or more receiving information audio file instructions i1117 that when executed will direct performance of the operation o1117. Furthermore, the receiving information audio file electrical circuitry arrangement ("elec circ arrange") e1117, when activated, will perform the operation o1117. Also, the receiving information audio file module m1117, when executed and/or activated, will direct performance of and/or perform the operation o1117. For instance, in one or more exemplary implementations, the one or more receiving information audio file instructions i1117, when executed, direct performance of the operation o1117 in the illustrative depiction as follows, and/or the receiving information audio file electrical circuitry arrangement e1117, when activated, performs the operation o1117 in the illustrative depiction as follows, and/or the receiving information audio file module m1117, when executed and/or activated, directs performance of and/or performs the operation o1117 in the illustrative depiction as follows, and/or the operation o1117 is otherwise carried out in the illustrative depiction as follows: electronically receiving the user status information regarding the one or more particular individual living beings including the one or more identifiers associated with the one or more particular individual living beings via one or more computer audio files (e.g. including an implementation of the receiver component s528 is configured to electronically engage with the processor component s102 to receive the user status information including the one or more identifiers associated with the particular individual living being as determined by the processor component through electronic reading of the computer audio file, and/or etc.).

In one or more implementations, as shown in FIG. 124, operation o11 includes an operation o1118 for electronically receiving the user status information regarding the one or more particular individual living beings including the one or more identifiers associated with the one or more particular individual living beings via one or more computer video files. Origination of an illustratively derived receiving information video file component group can be accomplished through skilled in the art design choice selection of one or more of the above depicted components from one or more of the above depicted subsystems shown in FIG. 18. Components from the receiving information video file component group can be used in implementing execution of the one or more receiving information video file instructions i1118 of FIG. 104, can be used in performance of the receiving information video file electrical circuitry arrangement e1118 of FIG. 97, and/or can be used in otherwise fulfillment of the operation o1118. An exemplary non-transitory signal bearing medium version of the information storage subsystem s200 is depicted in FIG. 104 as bearing the one or more receiving information video file instructions i1118 that when executed will direct performance of the operation o1118. Furthermore, the receiving information video file electrical circuitry arrangement ("elec circ arrange") e1118, when activated, will perform the operation o1118. Also, the receiving information video file module m1118, when executed and/or activated, will direct performance of and/or perform the operation o1118. For instance, in one or more exemplary implementations, the one or more receiving information video file instructions i1118, when executed, direct performance of the operation o1118 in the illustrative depiction as follows, and/or the receiving information video file electrical circuitry arrangement e1118, when activated, performs the operation o1118 in the illustrative depiction as follows, and/or the receiving information video file module m1118, when executed and/or activated, directs performance of and/or performs the operation o1118 in the illustrative depiction as follows, and/or the operation o1118 is otherwise carried out in the illustrative depiction as follows: electronically receiving the user status information regarding the one or more particular individual living beings including the one or more identifiers associated with the one or more particular individual living beings via one or more computer video files (e.g. including an implementation of the receiver component s528 is configured to electronically engage with the processor component s102 to receive the user status information including the one or more identifiers associated with the particular individual living being as determined by the processor component through electronic reading of the computer video file, and/or etc.).

In one or more implementations, as shown in FIG. 125, operation o11 includes an operation o1119 for electronically receiving the user status information regarding the one or more particular individual living beings including the one or more identifiers associated with the one or more particular individual living beings via one or more RFID tags. Origination of an illustratively derived receiving information RFID component group can be accomplished through skilled in the art design choice selection of one or more of the above depicted components from one or more of the above depicted subsystems shown in FIG. 18. Components from the receiving information RFID component group can be used in implementing execution of the one or more receiving information RFID instructions i1119 of FIG. 104, can be used in performance of the receiving information RFID electrical circuitry arrangement e1119 of FIG. 97, and/or can be used in otherwise fulfillment of the operation o1119. An exemplary non-transitory signal bearing medium version of the information storage subsystem s200 is depicted in FIG. 104 as bearing the one or more receiving information RFID instructions i1119 that when executed will direct performance of the operation o1119. Furthermore, the receiving information RFID electrical circuitry arrangement ("elec circ arrange") e1119, when activated, will perform the operation o1119. Also, the receiving information RFID module m1119, when executed and/or activated, will direct performance of and/or perform the operation o1119. For instance, in one or more exemplary implementations, the one or more receiving information RFID instructions i1119, when executed, direct performance of the operation o1119 in the illustrative depiction as follows, and/or the receiving information RFID electrical circuitry arrangement e1119, when activated, performs the operation o1119 in the illustrative depiction as follows, and/or the receiving information RFID module m1119, when executed and/or activated, directs performance of and/or performs the operation o1119 in the illustrative depiction as follows, and/or the operation o1119 is otherwise carried out in the illustrative depiction as follows: electronically receiving the user status information regarding the one or more particular individual living beings including the one or more identifiers associated with the one or more particular individual living beings via one or more RFID tags (e.g. including an implementation of the receiver component s528 is configured to electronically engage with the processor component s102 to receive the user status information including the one or more identifiers associated with the particular individual living being as determined by the processor component through electronic reading be the radio frequency identification (RFID) sensing component s414 of the RFID tag, and/or etc.).

In one or more implementations, as shown in FIG. 125, operation o11 includes an operation o1120 for electronically receiving the user status information regarding the one or more particular individual living beings including the one or more identifiers associated with the one or more particular individual living beings via one or more bar codes. Origination of an illustratively derived receiving information bar code component group can be accomplished through skilled in the art design choice selection of one or more of the above depicted components from one or more of the above depicted subsystems shown in FIG. 18. Components from the receiving information bar code component group can be used in implementing execution of the one or more receiving information bar code instructions i1120 of FIG. 105, can be used in performance of the receiving information bar code electrical circuitry arrangement e1120 of FIG. 98, and/or can be used in otherwise fulfillment of the operation o1120. An exemplary non-transitory signal bearing medium version of the information storage subsystem s200 is depicted in FIG. 105 as bearing the one or more receiving information bar code instructions i1120 that when executed will direct performance of the operation o1120. Furthermore, the receiving information bar code electrical circuitry arrangement ("elec circ arrange") e1120, when activated, will perform the operation o1120. Also, the receiving information bar code module m1120, when executed and/or activated, will direct performance of and/or perform the operation o1120. For instance, in one or more exemplary implementations, the one or more receiving information bar code instructions i1120, when executed, direct performance of the operation o1120 in the illustrative depiction as follows, and/or the receiving information bar code electrical circuitry arrangement e1120, when activated, performs the operation o1120 in the illustrative depiction as follows, and/or the receiving information bar code module m1120, when executed and/or activated, directs performance of and/or performs the operation o1120 in the illustrative depiction as follows, and/or the operation o1120 is otherwise carried out in the illustrative depiction as follows: electronically receiving the user status information regarding the one or more particular individual living beings including the one or more identifiers associated with the one or more particular individual living beings via one or more bar codes (e.g. including an implementation of the receiver component s528 is configured to electronically engage with the processor component s102 to receive the user status information including the one or more identifiers associated with the particular individual living being as determined by the processor component through electronic reading of the bar code, and/or etc.).

In one or more implementations, as shown in FIG. 125, operation o11 includes an operation o1121 for electronically receiving the user status information regarding the one or more particular individual living beings including the one or more identifiers associated with the one or more particular individual living beings via one or more holographic images. Origination of an illustratively derived receiving information holographic component group can be accomplished through skilled in the art design choice selection of one or more of the above depicted components from one or more of the above depicted subsystems shown in FIG. 18. Components from the receiving information holographic component group can be used in implementing execution of the one or more receiving information holographic instructions i1121 of FIG. 105, can be used in performance of the receiving information holographic electrical circuitry arrangement e1121 of FIG. 98, and/or can be used in otherwise fulfillment of the operation o1121. An exemplary non-transitory signal bearing medium version of the information storage subsystem s200 is depicted in FIG. 105 as bearing the one or more receiving information holographic instructions i1121 that when executed will direct performance of the operation o1121. Furthermore, the receiving information holographic electrical circuitry arrangement ("elec circ arrange") e1121, when activated, will perform the operation o1121. Also, the receiving information holographic module m1121, when executed and/or activated, will direct performance of and/or perform the operation o1121. For instance, in one or more exemplary implementations, the one or more receiving information holographic instructions i1121, when executed, direct performance of the operation o1121 in the illustrative depiction as follows, and/or the receiving information holographic electrical circuitry arrangement e1121, when activated, performs the operation o1121 in the illustrative depiction as follows, and/or the receiving information holographic module m1121, when executed and/or activated, directs performance of and/or performs the operation o1121 in the illustrative depiction as follows, and/or the operation o1121 is otherwise carried out in the illustrative depiction as follows: electronically receiving the user status information regarding the one or more particular individual living beings including the one or more identifiers associated with the one or more particular individual living beings via one or more holographic images (e.g. including an implementation of the receiver component s528 is configured to electronically engage with the processor component s102 to receive the user status information including the one or more identifiers associated with the particular individual living being as determined by the processor component through electronic reading of the holographic image, and/or etc.).

In one or more implementations, as shown in FIG. 126, operation o11 includes an operation o1122 for electronically receiving the selection information at least in part identifying the one or more selected ingestible products being subject to ingestion by the one or more particular individual living beings, the selection information electronically received via the electronically enabled input in response to the electronically outputted one or more selection menus in textual form. Origination of an illustratively derived receiving information textual component group can be accomplished through skilled in the art design choice selection of one or more of the above depicted components from one or more of the above depicted subsystems shown in FIG. 18. Components from the receiving information textual component group can be used in implementing execution of the one or more receiving information textual instructions i1122 of FIG. 105, can be used in performance of the receiving information textual electrical circuitry arrangement e1122 of FIG. 98, and/or can be used in otherwise fulfillment of the operation o1122. An exemplary non-transitory signal bearing medium version of the information storage subsystem s200 is depicted in FIG. 105 as bearing the one or more receiving information textual instructions i1122 that when executed will direct performance of the operation o1122. Furthermore, the receiving information textual electrical circuitry arrangement ("elec circ arrange") e1122, when activated, will perform the operation o1122. Also, the receiving information textual module m1122, when executed and/or activated, will direct performance of and/or perform the operation o1122. For instance, in one or more exemplary implementations, the one or more receiving information textual instructions i1122, when executed, direct performance of the operation o1122 in the illustrative depiction as follows, and/or the receiving information textual electrical circuitry arrangement e1122, when activated, performs the operation o1122 in the illustrative depiction as follows, and/or the receiving information textual module m1122, when executed and/or activated, directs performance of and/or performs the operation o1122 in the illustrative depiction as follows, and/or the operation o1122 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input in response to the electronically outputted one or more selection menus in textual form (e.g. including an implementation of the receiver component s528 is configured to electronically engage with the processor component s102 to receive the user status information including the one or more identifiers associated with the particular individual living being for the processor component to at least in part electronically generate, based at least in part upon the user status information regarding the particular individual living being, such as based on associated allergies, one or more selection menus in textual form, such as a menu containing textual one or more descriptions of possible ingestible product to select from, and/or etc.).

In one or more implementations, as shown in FIG. 126, operation o11 includes an operation o1123 for electronically receiving the selection information at least in part identifying the one or more selected ingestible products being subject to ingestion by the one or more particular individual living beings, the selection information electronically received via the electronically enabled input in response to the electronically outputted one or more selection menus in icon form. Origination of an illustratively derived receiving information icon component group can be accomplished through skilled in the art design choice selection of one or more of the above depicted components from one or more of the above depicted subsystems shown in FIG. 18. Components from the receiving information icon component group can be used in implementing execution of the one or more receiving information icon instructions i1123 of FIG. 105, can be used in performance of the receiving information icon electrical circuitry arrangement e1123 of FIG. 98, and/or can be used in otherwise fulfillment of the operation o1123. An exemplary non-transitory signal bearing medium version of the information storage subsystem s200 is depicted in FIG. 105 as bearing the one or more receiving information icon instructions i1123 that when executed will direct performance of the operation o1123. Furthermore, the receiving information icon electrical circuitry arrangement ("elec circ arrange") e1123, when activated, will perform the operation o1123. Also, the receiving information icon module m1123, when executed and/or activated, will direct performance of and/or perform the operation o1123. For instance, in one or more exemplary implementations, the one or more receiving information icon instructions i1123, when executed, direct performance of the operation o1123 in the illustrative depiction as follows, and/or the receiving information icon electrical circuitry arrangement e1123, when activated, performs the operation o1123 in the illustrative depiction as follows, and/or the receiving information icon module m1123, when executed and/or activated, directs performance of and/or performs the operation o1123 in the illustrative depiction as follows, and/or the operation o1123 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input in response to the electronically outputted one or more selection menus in icon form (e.g. including an implementation of the receiver component s528 is configured to electronically engage with the processor component s102 to receive the user status information including the one or more identifiers associated with the particular individual living being for the processor component to at least in part electronically generate, based at least in part upon the user status information regarding the particular individual living being, such as based on associated previous meals, one or more selection menus in icon form, such as a menu containing iconic one or more descriptions of possible ingestible product to select from, and/or etc.).

In one or more implementations, as shown in FIG. 126, operation o11 includes an operation o1124 for electronically receiving the selection information at least in part identifying the one or more selected ingestible products being subject to ingestion by the one or more particular individual living beings, the selection information electronically received via the electronically enabled input in response to the electronically outputted one or more selection menus in graphical form. Origination of an illustratively derived receiving information graphical component group can be accomplished through skilled in the art design choice selection of one or more of the above depicted components from one or more of the above depicted subsystems shown in FIG. 18. Components from the receiving information graphical component group can be used in implementing execution of the one or more receiving information graphical instructions i1124 of FIG. 105, can be used in performance of the receiving information graphical electrical circuitry arrangement e1124 of FIG. 98, and/or can be used in otherwise fulfillment of the operation o1124. An exemplary non-transitory signal bearing medium version of the information storage subsystem s200 is depicted in FIG. 105 as bearing the one or more receiving information graphical instructions i1124 that when executed will direct performance of the operation o1124. Furthermore, the receiving information graphical electrical circuitry arrangement ("elec circ arrange") e1124, when activated, will perform the operation o1124. Also, the receiving information graphical module m1124, when executed and/or activated, will direct performance of and/or perform the operation o1124. For instance, in one or more exemplary implementations, the one or more receiving information graphical instructions i1124, when executed, direct performance of the operation o1124 in the illustrative depiction as follows, and/or the receiving information graphical electrical circuitry arrangement e1124, when activated, performs the operation o1124 in the illustrative depiction as follows, and/or the receiving information graphical module m1124, when executed and/or activated, directs performance of and/or performs the operation o1124 in the illustrative depiction as follows, and/or the operation o1124 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input in response to the electronically outputted one or more selection menus in graphical form (e.g. including an implementation of the receiver component s528 is configured to electronically engage with the processor component s102 to receive the user status information including the one or more identifiers associated with the particular individual living being for the processor component to at least in part electronically generate, based at least in part upon the user status information regarding the particular individual living being, such as based on associated favorite foods as observed and recorded in a database, one or more selection menus in graphical form, such as a menu containing graphical one or more descriptions of possible ingestible product to select from, and/or etc.).

In one or more implementations, as shown in FIG. 127, operation o11 includes an operation o1125 for electronically receiving the selection information at least in part identifying the one or more selected ingestible products being subject to ingestion by the one or more particular individual living beings, the selection information electronically received via the electronically enabled input in response to the electronically outputted one or more selection menus in markup language form. Origination of an illustratively derived receiving information markup component group can be accomplished through skilled in the art design choice selection of one or more of the above depicted components from one or more of the above depicted subsystems shown in FIG. 18. Components from the receiving information markup component group can be used in implementing execution of the one or more receiving information markup instructions i1125 of FIG. 105, can be used in performance of the receiving information markup electrical circuitry arrangement e1125 of FIG. 98, and/or can be used in otherwise fulfillment of the operation o1125. An exemplary non-transitory signal bearing medium version of the information storage subsystem s200 is depicted in FIG. 105 as bearing the one or more receiving information markup instructions i1125 that when executed will direct performance of the operation o1125. Furthermore, the receiving information markup electrical circuitry arrangement ("elec circ arrange") e1125, when activated, will perform the operation o1125. Also, the receiving information markup module m1125, when executed and/or activated, will direct performance of and/or perform the operation o1125. For instance, in one or more exemplary implementations, the one or more receiving information markup instructions i1125, when executed, direct performance of the operation o1125 in the illustrative depiction as follows, and/or the receiving information markup electrical circuitry arrangement e1125, when activated, performs the operation o1125 in the illustrative depiction as follows, and/or the receiving information markup module m1125, when executed and/or activated, directs performance of and/or performs the operation o1125 in the illustrative depiction as follows, and/or the operation o1125 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input in response to the electronically outputted one or more selection menus in markup language form (e.g. including an implementation of the receiver component s528 is configured to electronically engage with the processor component s102 to receive the user status information including the one or more identifiers associated with the particular individual living being for the processor component to at least in part electronically generate, based at least in part upon the user status information regarding the particular individual living being, such as based on associated health building goals, one or more selection menus in markup language form, such as a menu containing markup language one or more descriptions of possible ingestible product to select from, and/or etc.).

In one or more implementations, as shown in FIG. 127, operation o11 includes an operation o1126 for electronically receiving the selection information at least in part identifying the one or more selected ingestible products being subject to ingestion by the one or more particular individual living beings, the selection information electronically received via the electronically enabled input in response to the electronically outputted one or more selection menus in audio form. Origination of an illustratively derived receiving information audio component group can be accomplished through skilled in the art design choice selection of one or more of the above depicted components from one or more of the above depicted subsystems shown in FIG. 18. Components from the receiving information audio component group can be used in implementing execution of the one or more receiving information audio instructions i1126 of FIG. 105, can be used in performance of the receiving information audio electrical circuitry arrangement e1126 of FIG. 98, and/or can be used in otherwise fulfillment of the operation o1126. An exemplary non-transitory signal bearing medium version of the information storage subsystem s200 is depicted in FIG. 105 as bearing the one or more receiving information audio instructions i1126 that when executed will direct performance of the operation o1126. Furthermore, the receiving information audio electrical circuitry arrangement ("elec circ arrange") e1126, when activated, will perform the operation o1126. Also, the receiving information audio module m1126, when executed and/or activated, will direct performance of and/or perform the operation o1126. For instance, in one or more exemplary implementations, the one or more receiving information audio instructions i1126, when executed, direct performance of the operation o1126 in the illustrative depiction as follows, and/or the receiving information audio electrical circuitry arrangement e1126, when activated, performs the operation o1126 in the illustrative depiction as follows, and/or the receiving information audio module m1126, when executed and/or activated, directs performance of and/or performs the operation o1126 in the illustrative depiction as follows, and/or the operation o1126 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input in response to the electronically outputted one or more selection menus in audio form (e.g. including an implementation of the receiver component s528 is configured to electronically engage with the processor component s102 to receive the user status information including the one or more identifiers associated with the particular individual living being for the processor component to at least in part electronically generate, based at least in part upon the user status information regarding the particular individual living being, such as based on associated disease mitigating measures, one or more selection menus in audio form, such as a menu containing audio one or more descriptions of possible ingestible product to select from, and/or etc.).

In one or more implementations, as shown in FIG. 127, operation o11 includes an operation o1127 for electronically receiving the selection information at least in part identifying the one or more selected ingestible products being subject to ingestion by the one or more particular individual living beings, the selection information electronically received via the electronically enabled input in response to the electronically outputted one or more selection menus in list form. Origination of an illustratively derived receiving information list component group can be accomplished through skilled in the art design choice selection of one or more of the above depicted components from one or more of the above depicted subsystems shown in FIG. 18. Components from the receiving information list component group can be used in implementing execution of the one or more receiving information list instructions i1127 of FIG. 105, can be used in performance of the receiving information list electrical circuitry arrangement e1127 of FIG. 98, and/or can be used in otherwise fulfillment of the operation o1127. An exemplary non-transitory signal bearing medium version of the information storage subsystem s200 is depicted in FIG. 105 as bearing the one or more receiving information list instructions i1127 that when executed will direct performance of the operation o1127. Furthermore, the receiving information list electrical circuitry arrangement ("elec circ arrange") e1127, when activated, will perform the operation o1127. Also, the receiving information list module m1127, when executed and/or activated, will direct performance of and/or perform the operation o1127. For instance, in one or more exemplary implementations, the one or more receiving information list instructions i1127, when executed, direct performance of the operation o1127 in the illustrative depiction as follows, and/or the receiving information list electrical circuitry arrangement e1127, when activated, performs the operation o1127 in the illustrative depiction as follows, and/or the receiving information list module m1127, when executed and/or activated, directs performance of and/or performs the operation o1127 in the illustrative depiction as follows, and/or the operation o1127 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input in response to the electronically outputted one or more selection menus in list form (e.g. including an implementation of the receiver component s528 is configured to electronically engage with the processor component s102 to receive the user status information including the one or more identifiers associated with the particular individual living being for the processor component to at least in part electronically generate, based at least in part upon the user status information regarding the particular individual living being, such as based on associated dislikes, one or more selection menus in list form, such as a menu containing listed one or more descriptions of possible ingestible product to select from, and/or etc.).

In one or more implementations, as shown in FIG. 128, operation o11 includes an operation o1128 for electronically receiving the selection information at least in part identifying the one or more selected ingestible products being subject to ingestion by the one or more particular individual living beings, the selection information electronically received via the electronically enabled input in response to the electronically outputted one or more selection menus in hierarchical form. Origination of an illustratively derived receiving information hierarchical component group can be accomplished through skilled in the art design choice selection of one or more of the above depicted components from one or more of the above depicted subsystems shown in FIG. 18. Components from the receiving information hierarchical component group can be used in implementing execution of the one or more receiving information hierarchical instructions i1128 of FIG. 105, can be used in performance of the receiving information hierarchical electrical circuitry arrangement e1128 of FIG. 98, and/or can be used in otherwise fulfillment of the operation o1128. An exemplary non-transitory signal bearing medium version of the information storage subsystem s200 is depicted in FIG. 105 as bearing the one or more receiving information hierarchical instructions i1128 that when executed will direct performance of the operation o1128. Furthermore, the receiving information hierarchical electrical circuitry arrangement ("elec circ arrange") e1128, when activated, will perform the operation o1128. Also, the receiving information hierarchical module m1128, when executed and/or activated, will direct performance of and/or perform the operation o1128. For instance, in one or more exemplary implementations, the one or more receiving information hierarchical instructions i1128, when executed, direct performance of the operation o1128 in the illustrative depiction as follows, and/or the receiving information hierarchical electrical circuitry arrangement e1128, when activated, performs the operation o1128 in the illustrative depiction as follows, and/or the receiving information hierarchical module m1128, when executed and/or activated, directs performance of and/or performs the operation o1128 in the illustrative depiction as follows, and/or the operation o1128 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input in response to the electronically outputted one or more selection menus in hierarchical form (e.g. including an implementation of the receiver component s528 is configured to electronically engage with the processor component s102 to receive the user status information including the one or more identifiers associated with the particular individual living being for the processor component to at least in part electronically generate, based at least in part upon the user status information regarding the particular individual living being, such as based on associated past purchases, one or more selection menus in hierarchical form, such as a menu containing hierarchical one or more descriptions of possible ingestible product to select from, and/or etc.).

In one or more implementations, as shown in FIG. 128, operation o11 includes an operation o1129 for electronically receiving the selection information at least in part identifying the one or more selected ingestible products being subject to ingestion by the one or more particular individual living beings, the selection information electronically received via the electronically enabled input in response to the electronically outputted one or more selection menus in map form. Origination of an illustratively derived receiving information map component group can be accomplished through skilled in the art design choice selection of one or more of the above depicted components from one or more of the above depicted subsystems shown in FIG. 18. Components from the receiving information map component group can be used in implementing execution of the one or more receiving information map instructions i1129 of FIG. 105, can be used in performance of the receiving information map electrical circuitry arrangement e1129 of FIG. 98, and/or can be used in otherwise fulfillment of the operation o1129. An exemplary non-transitory signal bearing medium version of the information storage subsystem s200 is depicted in FIG. 105 as bearing the one or more receiving information map instructions i1129 that when executed will direct performance of the operation o1129. Furthermore, the receiving information map electrical circuitry arrangement ("elec circ arrange") e1129, when activated, will perform the operation o1129. Also, the receiving information map module m1129, when executed and/or activated, will direct performance of and/or perform the operation o1129. For instance, in one or more exemplary implementations, the one or more receiving information map instructions i1129, when executed, direct performance of the operation o1129 in the illustrative depiction as follows, and/or the receiving information map electrical circuitry arrangement e1129, when activated, performs the operation o1129 in the illustrative depiction as follows, and/or the receiving information map module m1129, when executed and/or activated, directs performance of and/or performs the operation o1129 in the illustrative depiction as follows, and/or the operation o1129 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input in response to the electronically outputted one or more selection menus in map form (e.g. including an implementation of the receiver component s528 is configured to electronically engage with the processor component s102 to receive the user status information including the one or more identifiers associated with the particular individual living being for the processor component to at least in part electronically generate, based at least in part upon the user status information regarding the particular individual living being, such as based on associated food preferences determined from use history stored in one or more distributed databases, one or more selection menus in map form, such as a menu having arrangements resembling one or more maps containing one or more selections and one or more descriptions of possible ingestible product to select from, and/or etc.).

In one or more implementations, as shown in FIG. 128, operation o11 includes an operation o1130 for electronically receiving the selection information at least in part identifying the one or more selected ingestible products being subject to ingestion by the one or more particular individual living beings, the selection information electronically received via the electronically enabled input in response to the electronically outputted one or more selection menus in video presentation form. Origination of an illustratively derived receiving information presentation component group can be accomplished through skilled in the art design choice selection of one or more of the above depicted components from one or more of the above depicted subsystems shown in FIG. 18. Components from the receiving information presentation component group can be used in implementing execution of the one or more receiving information presentation instructions i1130 of FIG. 105, can be used in performance of the receiving information presentation electrical circuitry arrangement e1130 of FIG. 98, and/or can be used in otherwise fulfillment of the operation o1130. An exemplary non-transitory signal bearing medium version of the information storage subsystem s200 is depicted in FIG. 105 as bearing the one or more receiving information presentation instructions i1130 that when executed will direct performance of the operation o1130. Furthermore, the receiving information presentation electrical circuitry arrangement ("elec circ arrange") e1130, when activated, will perform the operation o1130. Also, the receiving information presentation module m1130, when executed and/or activated, will direct performance of and/or perform the operation o1130. For instance, in one or more exemplary implementations, the one or more receiving information presentation instructions i1130, when executed, direct performance of the operation o1130 in the illustrative depiction as follows, and/or the receiving information presentation electrical circuitry arrangement e1130, when activated, performs the operation o1130 in the illustrative depiction as follows, and/or the receiving information presentation module m1130, when executed and/or activated, directs performance of and/or performs the operation o1130 in the illustrative depiction as follows, and/or the operation o1130 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input in response to the electronically outputted one or more selection menus in video presentation form (e.g. including an implementation of the receiver component s528 is configured to electronically engage with the processor component s102 to receive the user status information including the one or more identifiers associated with the particular individual living being for the processor component to at least in part electronically generate, based at least in part upon the user status information regarding the particular individual living being, such as based on associated one or more prescriptions, one or more selection menus in video presentation form, such as a menu containing one or more video presentations having one or more descriptions of possible ingestible product to select from, and/or etc.).

In one or more implementations, as shown in FIG. 129, operation o11 includes an operation o1131 for electronically receiving the selection information at least in part identifying the one or more selected ingestible products being subject to ingestion by the one or more particular individual living beings, the selection information electronically received via the electronically enabled input in response to the electronically outputted one or more selection menus in ingestible sample form. Origination of an illustratively derived receiving information sample component group can be accomplished through skilled in the art design choice selection of one or more of the above depicted components from one or more of the above depicted subsystems shown in FIG. 18. Components from the receiving information sample component group can be used in implementing execution of the one or more receiving information sample instructions i1131 of FIG. 105, can be used in performance of the receiving information sample electrical circuitry arrangement e1131 of FIG. 98, and/or can be used in otherwise fulfillment of the operation o1131. An exemplary non-transitory signal bearing medium version of the information storage subsystem s200 is depicted in FIG. 105 as bearing the one or more receiving information sample instructions i1131 that when executed will direct performance of the operation o1131. Furthermore, the receiving information sample electrical circuitry arrangement ("elec circ arrange") e1131, when activated, will perform the operation o1131. Also, the receiving information sample module m1131, when executed and/or activated, will direct performance of and/or perform the operation o1131. For instance, in one or more exemplary implementations, the one or more receiving information sample instructions i1131, when executed, direct performance of the operation o1131 in the illustrative depiction as follows, and/or the receiving information sample electrical circuitry arrangement e1131, when activated, performs the operation o1131 in the illustrative depiction as follows, and/or the receiving information sample module m1131, when executed and/or activated, directs performance of and/or performs the operation o1131 in the illustrative depiction as follows, and/or the operation o1131 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input in response to the electronically outputted one or more selection menus in ingestible sample form (e.g. including an implementation of the receiver component s528 is configured to electronically engage with the processor component s102 to receive the user status information including the one or more identifiers associated with the particular individual living being for the processor component to at least in part electronically generate, based at least in part upon the user status information regarding the particular individual living being, such as based on associated one or more holidays stored in one or more databases, one or more selection menus in ingestible sample form, such as a menu containing ingestible samples that are either stored or produced in real time to serve as or otherwise complement one or more descriptions of possible ingestible product to select from, and/or etc.).

In one or more implementations, as shown in FIG. 129, operation o11 includes an operation o1132 for electronically receiving the user status information regarding the one or more particular individual living beings including the one or more identifiers associated with one or more human beings. Origination of an illustratively derived receiving information human component group can be accomplished through skilled in the art design choice selection of one or more of the above depicted components from one or more of the above depicted subsystems shown in FIG. 18. Components from the receiving information human component group can be used in implementing execution of the one or more receiving information human instructions i1132 of FIG. 105, can be used in performance of the receiving information human electrical circuitry arrangement e1132 of FIG. 98, and/or can be used in otherwise fulfillment of the operation o1132. An exemplary non-transitory signal bearing medium version of the information storage subsystem s200 is depicted in FIG. 105 as bearing the one or more receiving information human instructions i1132 that when executed will direct performance of the operation o1132. Furthermore, the receiving information human electrical circuitry arrangement ("elec circ arrange") e1132, when activated, will perform the operation o1132. Also, the receiving information human module m1132, when executed and/or activated, will direct performance of and/or perform the operation o1132. For instance, in one or more exemplary implementations, the one or more receiving information human instructions i1132, when executed, direct performance of the operation o1132 in the illustrative depiction as follows, and/or the receiving information human electrical circuitry arrangement e1132, when activated, performs the operation o1132 in the illustrative depiction as follows, and/or the receiving information human module m1132, when executed and/or activated, directs performance of and/or performs the operation o1132 in the illustrative depiction as follows, and/or the operation o1132 is otherwise carried out in the illustrative depiction as follows: electronically receiving the user status information regarding the one or more particular individual living beings including the one or more identifiers associated with one or more human beings (e.g. including an implementation of the receiver component s528 is configured to electronically engage with the processor component s102 to receive the user status information regarding the particular individual living being including one or more identifiers as determined by the processor component to be identifying a human being, and/or etc.).

In one or more implementations, as shown in FIG. 129, operation o11 includes an operation o1133 for electronically receiving the user status information regarding the one or more particular individual living beings including the one or more identifiers associated with one or more electronic identification cards. Origination of an illustratively derived receiving information ID card component group can be accomplished through skilled in the art design choice selection of one or more of the above depicted components from one or more of the above depicted subsystems shown in FIG. 18. Components from the receiving information ID card component group can be used in implementing execution of the one or more receiving information ID card instructions i1133 of FIG. 105, can be used in performance of the receiving information ID card electrical circuitry arrangement e1133 of FIG. 98, and/or can be used in otherwise fulfillment of the operation o1133. An exemplary non-transitory signal bearing medium version of the information storage subsystem s200 is depicted in FIG. 105 as bearing the one or more receiving information ID card instructions i1133 that when executed will direct performance of the operation o1133. Furthermore, the receiving information ID card electrical circuitry arrangement ("elec circ arrange") e1133, when activated, will perform the operation o1133. Also, the receiving information ID card module m1133, when executed and/or activated, will direct performance of and/or perform the operation o1133. For instance, in one or more exemplary implementations, the one or more receiving information ID card instructions i1133, when executed, direct performance of the operation o1133 in the illustrative depiction as follows, and/or the receiving information ID card electrical circuitry arrangement e1133, when activated, performs the operation o1133 in the illustrative depiction as follows, and/or the receiving information ID card module m1133, when executed and/or activated, directs performance of and/or performs the operation o1133 in the illustrative depiction as follows, and/or the operation o1133 is otherwise carried out in the illustrative depiction as follows: electronically receiving the user status information regarding the one or more particular individual living beings including the one or more identifiers associated with one or more electronic identification cards (e.g. including an implementation of the receiver component s528 is configured to electronically engage with the processor component s102 to receive the user status information regarding the particular individual living being including one or more identifiers as determined by the processor component to be identifying a living being through the electronic identification card, and/or etc.).

In one or more implementations, as shown in FIG. 130, operation o11 includes an operation o1134 for electronically receiving the user status information regarding the one or more particular individual living beings including the one or more identifiers associated with one or more electronic iris scans. Origination of an illustratively derived receiving information iris scan component group can be accomplished through skilled in the art design choice selection of one or more of the above depicted components from one or more of the above depicted subsystems shown in FIG. 18. Components from the receiving information iris scan component group can be used in implementing execution of the one or more receiving information iris scan instructions i1134 of FIG. 105, can be used in performance of the receiving information iris scan electrical circuitry arrangement e1134 of FIG. 98, and/or can be used in otherwise fulfillment of the operation o1134. An exemplary non-transitory signal bearing medium version of the information storage subsystem s200 is depicted in FIG. 105 as bearing the one or more receiving information iris scan instructions i1134 that when executed will direct performance of the operation o1134. Furthermore, the receiving information iris scan electrical circuitry arrangement ("elec circ arrange") e1134, when activated, will perform the operation o1134. Also, the receiving information iris scan module m1134, when executed and/or activated, will direct performance of and/or perform the operation o1134. For instance, in one or more exemplary implementations, the one or more receiving information iris scan instructions i1134, when executed, direct performance of the operation o1134 in the illustrative depiction as follows, and/or the receiving information iris scan electrical circuitry arrangement e1134, when activated, performs the operation o1134 in the illustrative depiction as follows, and/or the receiving information iris scan module m1134, when executed and/or activated, directs performance of and/or performs the operation o1134 in the illustrative depiction as follows, and/or the operation o1134 is otherwise carried out in the illustrative depiction as follows: electronically receiving the user status information regarding the one or more particular individual living beings including the one or more identifiers associated with one or more electronic iris scans (e.g. including an implementation of the receiver component s528 is configured to electronically engage with the processor component s102 to receive the user status information regarding the particular individual living being including one or more identifiers as determined by the processor component to be identifying the living being through the electronic iris scan, and/or etc.).

In one or more implementations, as shown in FIG. 130, operation o11 includes an operation o1135 for electronically receiving the user status information regarding the one or more particular individual living beings including the one or more identifiers associated with one or more electronic voice prints. Origination of an illustratively derived receiving information voice component group can be accomplished through skilled in the art design choice selection of one or more of the above depicted components from one or more of the above depicted subsystems shown in FIG. 18. Components from the receiving information voice component group can be used in implementing execution of the one or more receiving information voice instructions i1135 of FIG. 105, can be used in performance of the receiving information voice electrical circuitry arrangement e1135 of FIG. 98, and/or can be used in otherwise fulfillment of the operation o1135. An exemplary non-transitory signal bearing medium version of the information storage subsystem s200 is depicted in FIG. 105 as bearing the one or more receiving information voice instructions i1135 that when executed will direct performance of the operation o1135. Furthermore, the receiving information voice electrical circuitry arrangement ("elec circ arrange") e1135, when activated, will perform the operation o1135. Also, the receiving information voice module m1135, when executed and/or activated, will direct performance of and/or perform the operation o1135. For instance, in one or more exemplary implementations, the one or more receiving information voice instructions i1135, when executed, direct performance of the operation o1135 in the illustrative depiction as follows, and/or the receiving information voice electrical circuitry arrangement e1135, when activated, performs the operation o1135 in the illustrative depiction as follows, and/or the receiving information voice module m1135, when executed and/or activated, directs performance of and/or performs the operation o1135 in the illustrative depiction as follows, and/or the operation o1135 is otherwise carried out in the illustrative depiction as follows: electronically receiving the user status information regarding the one or more particular individual living beings including the one or more identifiers associated with one or more electronic voice prints (e.g. including an implementation of the receiver component s528 is configured to electronically engage with the processor component s102 to receive the user status information regarding the particular individual living being including one or more identifiers as determined by the processor component to be identifying the living being through the electronic voice print, and/or etc.).

In one or more implementations, as shown in FIG. 130, operation o11 includes an operation o1136 for electronically receiving the user status information regarding the one or more particular individual living beings including the one or more identifiers associated with one or more electronically captured fingerprint images. Origination of an illustratively derived receiving information fingerprint component group can be accomplished through skilled in the art design choice selection of one or more of the above depicted components from one or more of the above depicted subsystems shown in FIG. 18. Components from the receiving information fingerprint component group can be used in implementing execution of the one or more receiving information fingerprint instructions i1136 of FIG. 105, can be used in performance of the receiving information fingerprint electrical circuitry arrangement e1136 of FIG. 98, and/or can be used in otherwise fulfillment of the operation o1136. An exemplary non-transitory signal bearing medium version of the information storage subsystem s200 is depicted in FIG. 105 as bearing the one or more receiving information fingerprint instructions i1136 that when executed will direct performance of the operation o1136. Furthermore, the receiving information fingerprint electrical circuitry arrangement ("elec circ arrange") e1136, when activated, will perform the operation o1136. Also, the receiving information fingerprint module m1136, when executed and/or activated, will direct performance of and/or perform the operation o1136. For instance, in one or more exemplary implementations, the one or more receiving information fingerprint instructions i1136, when executed, direct performance of the operation o1136 in the illustrative depiction as follows, and/or the receiving information fingerprint electrical circuitry arrangement e1136, when activated, performs the operation o1136 in the illustrative depiction as follows, and/or the receiving information fingerprint module m1136, when executed and/or activated, directs performance of and/or performs the operation o1136 in the illustrative depiction as follows, and/or the operation o1136 is otherwise carried out in the illustrative depiction as follows: electronically receiving the user status information regarding the one or more particular individual living beings including the one or more identifiers associated with one or more electronically captured fingerprint images (e.g. including an implementation of the receiver component s528 is configured to electronically engage with the processor component s102 to receive the user status information regarding the particular individual living being including one or more identifiers as determined by the processor component to be identifying the living being through the electronically captured fingerprint image, and/or etc.).

In one or more implementations, as shown in FIG. 131, operation o11 includes an operation o1137 for electronically receiving the user status information regarding the one or more particular individual living beings including the one or more identifiers associated with one or more electronic dental records. Origination of an illustratively derived receiving information dental component group can be accomplished through skilled in the art design choice selection of one or more of the above depicted components from one or more of the above depicted subsystems shown in FIG. 18. Components from the receiving information dental component group can be used in implementing execution of the one or more receiving information dental instructions i1137 of FIG. 105, can be used in performance of the receiving information dental electrical circuitry arrangement e1137 of FIG. 98, and/or can be used in otherwise fulfillment of the operation o1137. An exemplary non-transitory signal bearing medium version of the information storage subsystem s200 is depicted in FIG. 105 as bearing the one or more receiving information dental instructions i1137 that when executed will direct performance of the operation o1137. Furthermore, the receiving information dental electrical circuitry arrangement ("elec circ arrange") e1137, when activated, will perform the operation o1137. Also, the receiving information dental module m1137, when executed and/or activated, will direct performance of and/or perform the operation o1137. For instance, in one or more exemplary implementations, the one or more receiving information dental instructions i1137, when executed, direct performance of the operation o1137 in the illustrative depiction as follows, and/or the receiving information dental electrical circuitry arrangement e1137, when activated, performs the operation o1137 in the illustrative depiction as follows, and/or the receiving information dental module m1137, when executed and/or activated, directs performance of and/or performs the operation o1137 in the illustrative depiction as follows, and/or the operation o1137 is otherwise carried out in the illustrative depiction as follows: electronically receiving the user status information regarding the one or more particular individual living beings including the one or more identifiers associated with one or more electronic dental records (e.g. including an implementation of the receiver component s528 is configured to electronically engage with the processor component s102 to receive the user status information regarding the particular individual living being including one or more identifiers as determined by the processor component to be identifying the living being through the electronic dental records, and/or etc.).

In one or more implementations, as shown in FIG. 131, operation o11 includes an operation o1138 for electronically receiving the user status information regarding the one or more particular individual living beings including the one or more identifiers associated with one or more RFID tags. Origination of an illustratively derived receiving information RFID component group can be accomplished through skilled in the art design choice selection of one or more of the above depicted components from one or more of the above depicted subsystems shown in FIG. 18. Components from the receiving information RFID component group can be used in implementing execution of the one or more receiving information RFID instructions i1138 of FIG. 105, can be used in performance of the receiving information RFID electrical circuitry arrangement e1138 of FIG. 98, and/or can be used in otherwise fulfillment of the operation o1138. An exemplary non-transitory signal bearing medium version of the information storage subsystem s200 is depicted in FIG. 105 as bearing the one or more receiving information RFID instructions i1138 that when executed will direct performance of the operation o1138. Furthermore, the receiving information RFID electrical circuitry arrangement ("elec circ arrange") e1138, when activated, will perform the operation o1138. Also, the receiving information RFID module m1138, when executed and/or activated, will direct performance of and/or perform the operation o1138. For instance, in one or more exemplary implementations, the one or more receiving information RFID instructions i1138, when executed, direct performance of the operation o1138 in the illustrative depiction as follows, and/or the receiving information RFID electrical circuitry arrangement e1138, when activated, performs the operation o1138 in the illustrative depiction as follows, and/or the receiving information RFID module m1138, when executed and/or activated, directs performance of and/or performs the operation o1138 in the illustrative depiction as follows, and/or the operation o1138 is otherwise carried out in the illustrative depiction as follows: electronically receiving the user status information regarding the one or more particular individual living beings including the one or more identifiers associated with one or more RFID tags (e.g. including an implementation of the receiver component s528 is configured to electronically engage with the processor component s102 to receive the user status information regarding the particular individual living being including one or more identifiers as determined by the processor component to be identifying the living being through the RFID tag, and/or etc.).

In one or more implementations, as shown in FIG. 131, operation o11 includes an operation o1139 for electronically receiving the user status information regarding the one or more particular individual living beings including the one or more identifiers associated with one or more passwords. Origination of an illustratively derived receiving information password component group can be accomplished through skilled in the art design choice selection of one or more of the above depicted components from one or more of the above depicted subsystems shown in FIG. 18. Components from the receiving information password component group can be used in implementing execution of the one or more receiving information password instructions i1139 of FIG. 105, can be used in performance of the receiving information password electrical circuitry arrangement e1139 of FIG. 98, and/or can be used in otherwise fulfillment of the operation o1139. An exemplary non-transitory signal bearing medium version of the information storage subsystem s200 is depicted in FIG. 105 as bearing the one or more receiving information password instructions i1139 that when executed will direct performance of the operation o1139. Furthermore, the receiving information password electrical circuitry arrangement ("elec circ arrange") e1139, when activated, will perform the operation o1139. Also, the receiving information password module m1139, when executed and/or activated, will direct performance of and/or perform the operation o1139. For instance, in one or more exemplary implementations, the one or more receiving information password instructions i1139, when executed, direct performance of the operation o1139 in the illustrative depiction as follows, and/or the receiving information password electrical circuitry arrangement e1139, when activated, performs the operation o1139 in the illustrative depiction as follows, and/or the receiving information password module m1139, when executed and/or activated, directs performance of and/or performs the operation o1139 in the illustrative depiction as follows, and/or the operation o1139 is otherwise carried out in the illustrative depiction as follows: electronically receiving the user status information regarding the one or more particular individual living beings including the one or more identifiers associated with one or more passwords (e.g. including an implementation of the receiver component s528 is configured to electronically engage with the processor component s102 to receive the user status information regarding the particular individual living being including one or more identifiers as determined by the processor component to be identifying the living being through the password, and/or etc.).

In one or more implementations, as shown in FIG. 132, operation o11 includes an operation o1140 for electronically receiving the user status information regarding the one or more particular individual living beings including the one or more identifiers associated with one or more fobs. Origination of an illustratively derived receiving information fob component group can be accomplished through skilled in the art design choice selection of one or more of the above depicted components from one or more of the above depicted subsystems shown in FIG. 18. Components from the receiving information fob component group can be used in implementing execution of the one or more receiving information fob instructions i1140 of FIG. 106, can be used in performance of the receiving information fob electrical circuitry arrangement e1140 of FIG. 99, and/or can be used in otherwise fulfillment of the operation o1140. An exemplary non-transitory signal bearing medium version of the information storage subsystem s200 is depicted in FIG. 106 as bearing the one or more receiving information fob instructions i1140 that when executed will direct performance of the operation o1140. Furthermore, the receiving information fob electrical circuitry arrangement ("elec circ arrange") e1140, when activated, will perform the operation o1140. Also, the receiving information fob module m1140, when executed and/or activated, will direct performance of and/or perform the operation o1140. For instance, in one or more exemplary implementations, the one or more receiving information fob instructions i1140, when executed, direct performance of the operation o1140 in the illustrative depiction as follows, and/or the receiving information fob electrical circuitry arrangement e1140, when activated, performs the operation o1140 in the illustrative depiction as follows, and/or the receiving information fob module m1140, when executed and/or activated, directs performance of and/or performs the operation o1140 in the illustrative depiction as follows, and/or the operation o1140 is otherwise carried out in the illustrative depiction as follows: electronically receiving the user status information regarding the one or more particular individual living beings including the one or more identifiers associated with one or more fobs (e.g. including an implementation of the receiver component s528 is configured to electronically engage with the processor component s102 to receive the user status information regarding the particular individual living being including one or more identifiers as determined by the processor component to be identifying the living being through electronic data contained on the fob, and/or etc.).

In one or more implementations, as shown in FIG. 132, operation o11 includes an operation o1141 for electronically receiving the user status information regarding the one or more particular individual living beings including the one or more identifiers associated with one or more cell phone swipes. Origination of an illustratively derived receiving information cell phone component group can be accomplished through skilled in the art design choice selection of one or more of the above depicted components from one or more of the above depicted subsystems shown in FIG. 18. Components from the receiving information cell phone component group can be used in implementing execution of the one or more receiving information cell phone instructions i1141 of FIG. 106, can be used in performance of the receiving information cell phone electrical circuitry arrangement e1141 of FIG. 99, and/or can be used in otherwise fulfillment of the operation o1141. An exemplary non-transitory signal bearing medium version of the information storage subsystem s200 is depicted in FIG. 106 as bearing the one or more receiving information cell phone instructions i1141 that when executed will direct performance of the operation o1141. Furthermore, the receiving information cell phone electrical circuitry arrangement ("elec circ arrange") e1141, when activated, will perform the operation o1141. Also, the receiving information cell phone module m1141, when executed and/or activated, will direct performance of and/or perform the operation o1141. For instance, in one or more exemplary implementations, the one or more receiving information cell phone instructions i1141, when executed, direct performance of the operation o1141 in the illustrative depiction as follows, and/or the receiving information cell phone electrical circuitry arrangement e1141, when activated, performs the operation o1141 in the illustrative depiction as follows, and/or the receiving information cell phone module m1141, when executed and/or activated, directs performance of and/or performs the operation o1141 in the illustrative depiction as follows, and/or the operation o1141 is otherwise carried out in the illustrative depiction as follows: electronically receiving the user status information regarding the one or more particular individual living beings including the one or more identifiers associated with one or more cell phone swipes (e.g. including an implementation of the receiver component s528 is configured to electronically engage with the processor component s102 to receive the user status information regarding the particular individual living being including one or more identifiers as determined by the processor component to be identifying the living being through passing the cell phone in close proximity to the cell phone, and/or etc.).

In one or more implementations, as shown in FIG. 132, operation o11 includes an operation o1142 for electronically receiving the user status information regarding the one or more particular individual living beings including the one or more identifiers associated with one or more breathalyzer tests. Origination of an illustratively derived receiving information breathalyzer component group can be accomplished through skilled in the art design choice selection of one or more of the above depicted components from one or more of the above depicted subsystems shown in FIG. 18. Components from the receiving information breathalyzer component group can be used in implementing execution of the one or more receiving information breathalyzer instructions i1142 of FIG. 106, can be used in performance of the receiving information breathalyzer electrical circuitry arrangement e1142 of FIG. 99, and/or can be used in otherwise fulfillment of the operation o1142. An exemplary non-transitory signal bearing medium version of the information storage subsystem s200 is depicted in FIG. 106 as bearing the one or more receiving information breathalyzer instructions i1142 that when executed will direct performance of the operation o1142. Furthermore, the receiving information breathalyzer electrical circuitry arrangement ("elec circ arrange") e1142, when activated, will perform the operation o1142. Also, the receiving information breathalyzer module m1142, when executed and/or activated, will direct performance of and/or perform the operation o1142. For instance, in one or more exemplary implementations, the one or more receiving information breathalyzer instructions i1142, when executed, direct performance of the operation o1142 in the illustrative depiction as follows, and/or the receiving information breathalyzer electrical circuitry arrangement e1142, when activated, performs the operation o1142 in the illustrative depiction as follows, and/or the receiving information breathalyzer module m1142, when executed and/or activated, directs performance of and/or performs the operation o1142 in the illustrative depiction as follows, and/or the operation o1142 is otherwise carried out in the illustrative depiction as follows: electronically receiving the user status information regarding the one or more particular individual living beings including the one or more identifiers associated with one or more breathalyzer tests (e.g. including an implementation of the receiver component s528 is configured to electronically engage with the processor component s102 to receive the user status information regarding the particular individual living being including one or more identifiers as determined by the processor component to be identifying the living being through the breathalyzer test of the living being, and/or etc.).

In one or more implementations, as shown in FIG. 133, operation o11 includes an operation o1143 for electronically receiving the selection information at least in part identifying the one or more selected ingestible products to incorporate one or more substances therein during the one or more substrate structure directed energy operations thereof. Origination of an illustratively derived receiving information incorporate component group can be accomplished through skilled in the art design choice selection of one or more of the above depicted components from one or more of the above depicted subsystems shown in FIG. 18. Components from the receiving information incorporate component group can be used in implementing execution of the one or more receiving information incorporate instructions i1143 of FIG. 106, can be used in performance of the receiving information incorporate electrical circuitry arrangement e1143 of FIG. 99, and/or can be used in otherwise fulfillment of the operation o1143. An exemplary non-transitory signal bearing medium version of the information storage subsystem s200 is depicted in FIG. 106 as bearing the one or more receiving information incorporate instructions i1143 that when executed will direct performance of the operation o1143. Furthermore, the receiving information incorporate electrical circuitry arrangement ("elec circ arrange") e1143, when activated, will perform the operation o1143. Also, the receiving information incorporates module m1143, when executed and/or activated, will direct performance of and/or perform the operation o1143. For instance, in one or more exemplary implementations, the one or more receiving information incorporate instructions i1143, when executed, direct performance of the operation o1143 in the illustrative depiction as follows, and/or the receiving information incorporate electrical circuitry arrangement e1143, when activated, performs the operation o1143 in the illustrative depiction as follows, and/or the receiving information incorporate module m1143, when executed and/or activated, directs performance of and/or performs the operation o1143 in the illustrative depiction as follows, and/or the operation o1143 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) to incorporate one or more substances (e.g. including an implementation of the receiver component s528 is configured to electronically receive the selection information and to engage with the processor component s102 to at least in part electronically identify one or more selected ingestible products to incorporate one or more substances such as a sandwich to include the substance as an amino acid incorporated into the sandwich, and/or etc.) therein during the one or more substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) thereof.

In one or more implementations, as shown in FIG. 133, operation o11 includes an operation o1144 for electronically receiving the selection information at least in part identifying the one or more selected ingestible products to be ingested over a period of days. Origination of an illustratively derived receiving information days component group can be accomplished through skilled in the art design choice selection of one or more of the above depicted components from one or more of the above depicted subsystems shown in FIG. 18. Components from the receiving information days component group can be used in implementing execution of the one or more receiving information days instructions i1144 of FIG. 106, can be used in performance of the receiving information days electrical circuitry arrangement e1144 of FIG. 99, and/or can be used in otherwise fulfillment of the operation o1144. An exemplary non-transitory signal bearing medium version of the information storage subsystem s200 is depicted in FIG. 106 as bearing the one or more receiving information days instructions i1144 that when executed will direct performance of the operation o1144. Furthermore, the receiving information days electrical circuitry arrangement ("elec circ arrange") e1144, when activated, will perform the operation o1144. Also, the receiving information days module m1144, when executed and/or activated, will direct performance of and/or perform the operation o1144. For instance, in one or more exemplary implementations, the one or more receiving information days instructions i1144, when executed, direct performance of the operation o1144 in the illustrative depiction as follows, and/or the receiving information days electrical circuitry arrangement e1144, when activated, performs the operation o1144 in the illustrative depiction as follows, and/or the receiving information days module m1144, when executed and/or activated, directs performance of and/or performs the operation o1144 in the illustrative depiction as follows, and/or the operation o1144 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) to be ingested over a period of days (e.g. including an implementation of the receiver component s528 is configured to electronically receive the selection information and engage with the processor component s102 to at least in part electronically identify one or more selected ingestible products to be ingested over a period of days such as a smoothie to contain an activator that is designed to interact with a substance, such as a pharmaceutical agent that is encapsulated in pill form to be ingested over a period of days by a living being, such as a boy, at the same time that the smoothie is being ingested by the boy, and/or etc.).

In one or more implementations, as shown in FIG. 133, operation o11 includes an operation o1145 for electronically receiving the selection information at least in part identifying the one or more selected ingestible products to be swallowed. Origination of an illustratively derived receiving information swallow component group can be accomplished through skilled in the art design choice selection of one or more of the above depicted components from one or more of the above depicted subsystems shown in FIG. 18. Components from the receiving information swallow component group can be used in implementing execution of the one or more receiving information swallow instructions i1145 of FIG. 106, can be used in performance of the receiving information swallow electrical circuitry arrangement e1145 of FIG. 99, and/or can be used in otherwise fulfillment of the operation o1145. An exemplary non-transitory signal bearing medium version of the information storage subsystem s200 is depicted in FIG. 106 as bearing the one or more receiving information swallow instructions i1145 that when executed will direct performance of the operation o1145. Furthermore, the receiving information swallow electrical circuitry arrangement ("elec circ arrange") e1145, when activated, will perform the operation o1145. Also, the receiving information swallow module m1145, when executed and/or activated, will direct performance of and/or perform the operation o1145. For instance, in one or more exemplary implementations, the one or more receiving information swallow instructions i1145, when executed, direct performance of the operation o1145 in the illustrative depiction as follows, and/or the receiving information swallow electrical circuitry arrangement e1145, when activated, performs the operation o1145 in the illustrative depiction as follows, and/or the receiving information swallow module m1145, when executed and/or activated, directs performance of and/or performs the operation o1145 in the illustrative depiction as follows, and/or the operation o1145 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) to be swallowed (e.g. including an implementation of the receiver component s528 is configured to electronically receive the selection information and engage with the processor component s102 to direct the material processing subsystem s700 to electronically identify the one or more selected ingestible products to be swallowed such as a snack bar, and/or etc.).

In one or more implementations, as shown in FIG. 65, operation o11 includes an operation o1146 for electronically receiving the selection information at least in part identifying the one or more selected ingestible products to be inhaled. Origination of an illustratively derived receiving information inhaled component group can be accomplished through skilled in the art design choice selection of one or more of the above depicted components from one or more of the above depicted subsystems shown in FIG. 18. Components from the receiving information inhaled component group can be used in implementing execution of the one or more receiving information inhaled instructions i1146 of FIG. 106, can be used in performance of the receiving information inhaled electrical circuitry arrangement e1146 of FIG. 99, and/or can be used in otherwise fulfillment of the operation o1146. An exemplary non-transitory signal bearing medium version of the information storage subsystem s200 is depicted in FIG. 106 as bearing the one or more receiving information inhaled instructions i1146 that when executed will direct performance of the operation o1146. Furthermore, the receiving information inhaled electrical circuitry arrangement ("elec circ arrange") e1146, when activated, will perform the operation o1146. Also, the receiving information inhaled module m1146, when executed and/or activated, will direct performance of and/or perform the operation o1146. For instance, in one or more exemplary implementations, the one or more receiving information inhaled instructions i1146, when executed, direct performance of the operation o1146 in the illustrative depiction as follows, and/or the receiving information inhaled electrical circuitry arrangement e1146, when activated, performs the operation o1146 in the illustrative depiction as follows, and/or the receiving information inhaled module m1146, when executed and/or activated, directs performance of and/or performs the operation o1146 in the illustrative depiction as follows, and/or the operation o1146 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.)

to be inhaled (e.g. including an implementation of the receiver component s528 is configured to electronically receive the selection information and engage with the processor component s102 to direct the material processing subsystem s700 to electronically identify the one or more selected ingestible products to be inhaled such as a medicament dispensed through a nebulizer, and/or etc.).

In one or more implementations, as shown in FIG. 134, operation o11 includes an operation o1147 for electronically receiving the selection information at least in part identifying the one or more selected ingestible products to be ingested via a tube. Origination of an illustratively derived receiving information tube component group can be accomplished through skilled in the art design choice selection of one or more of the above depicted components from one or more of the above depicted subsystems shown in FIG. 18. Components from the receiving information tube component group can be used in implementing execution of the one or more receiving information tube instructions i1147 of FIG. 106, can be used in performance of the receiving information tube electrical circuitry arrangement e1147 of FIG. 99, and/or can be used in otherwise fulfillment of the operation o1147. An exemplary non-transitory signal bearing medium version of the information storage subsystem s200 is depicted in FIG. 106 as bearing the one or more receiving information tube instructions i1147 that when executed will direct performance of the operation o1147. Furthermore, the receiving information tube electrical circuitry arrangement ("elec circ arrange") e1147, when activated, will perform the operation o1147. Also, the receiving information tube module m1147, when executed and/or activated, will direct performance of and/or perform the operation o1147. For instance, in one or more exemplary implementations, the one or more receiving information tube instructions i1147, when executed, direct performance of the operation o1147 in the illustrative depiction as follows, and/or the receiving information tube electrical circuitry arrangement e1147, when activated, performs the operation o1147 in the illustrative depiction as follows, and/or the receiving information tube module m1147, when executed and/or activated, directs performance of and/or performs the operation o1147 in the illustrative depiction as follows, and/or the operation o1147 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) to be ingested via a tube (e.g. including an implementation of the receiver component s528 is configured to electronically receive the selection information and engage with the processor component s102 to direct the material processing subsystem s700 to electronically identify at least in part the one or more selected ingestible products to be ingested via a tube such as a liquid meal replacement, and/or etc.).

In one or more implementations, as shown in FIG. 134, operation o11 includes an operation o1148 for electronically receiving the selection information at least in part identifying the one or more selected ingestible products to be ingested transdermally. Origination of an illustratively derived receiving information transdermal component group can be accomplished through skilled in the art design choice selection of one or more of the above depicted components from one or more of the above depicted subsystems shown in FIG. 18. Components from the receiving information transdermal component group can be used in implementing execution of the one or more receiving information transdermal instructions i1148 of FIG. 106, can be used in performance of the receiving information transdermal electrical circuitry arrangement e1148 of FIG. 99, and/or can be used in otherwise fulfillment of the operation o1148. An exemplary non-transitory signal bearing medium version of the information storage subsystem s200 is depicted in FIG. 106 as bearing the one or more receiving information transdermal instructions i1148 that when executed will direct performance of the operation o1148. Furthermore, the receiving information transdermal electrical circuitry arrangement ("elec circ arrange") e1148, when activated, will perform the operation o1148. Also, the receiving information transdermal module m1148, when executed and/or activated, will direct performance of and/or perform the operation o1148. For instance, in one or more exemplary implementations, the one or more receiving information transdermal instructions i1148, when executed, direct performance of the operation o1148 in the illustrative depiction as follows, and/or the receiving information transdermal electrical circuitry arrangement e1148, when activated, performs the operation o1148 in the illustrative depiction as follows, and/or the receiving information transdermal module m1148, when executed and/or activated, directs performance of and/or performs the operation o1148 in the illustrative depiction as follows, and/or the operation o1148 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) to be ingested transdermally (e.g. including an implementation of the receiver component s528 is configured to electronically receive the selection information and engage with the processor component s102 to direct the material processing subsystem s700 to at least in part electronically identify the one or more selected ingestible products to be ingested transdermally such as a cream, and/or etc.).

In one or more implementations, as shown in FIG. 135, operation o11 includes an operation o1149 for electronically receiving the selection information at least in part identifying the one or more selected ingestible products to be used in capsule form. Origination of an illustratively derived receiving information capsule component group can be accomplished through skilled in the art design choice selection of one or more of the above depicted components from one or more of the above depicted subsystems shown in FIG. 18. Components from the receiving information capsule component group can be used in implementing execution of the one or more receiving information capsule instructions i1149 of FIG. 106, can be used in performance of the receiving information capsule electrical circuitry arrangement e1149 of FIG. 99, and/or can be used in otherwise fulfillment of the operation o1149. An exemplary non-transitory signal bearing medium version of the information storage subsystem s200 is depicted in FIG. 106 as bearing the one or more receiving information capsule instructions i1149 that when executed will direct performance of the operation o1149. Furthermore, the receiving information capsule electrical circuitry arrangement ("elec circ arrange") e1149, when activated, will perform the operation o1149. Also, the receiving information capsule module m1149, when executed and/or activated, will direct performance of and/or perform the operation o1149. For instance, in one or more exemplary implementations, the one or more receiving information capsule instructions i1149, when executed, direct performance of the operation o1149 in the illustrative depiction as follows, and/or the receiving information capsule electrical circuitry arrangement e1149, when activated, performs the operation o1149 in the illustrative depiction as follows, and/or the receiving information capsule module m1149, when executed and/or activated, directs performance of and/or performs the operation o1149 in the illustrative depiction as follows, and/or the operation o1149 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) to be used in capsule form (e.g. including an implementation of the receiver component s528 is configured to electronically receive the selection information and engage with the processor component s102 to direct the material processing subsystem s700 to at least in part electronically generate the one or more selection menus electronically identifying at least in part the one or more selected ingestible products to be used in capsule form, such as through capsules via encapsulation, and/or etc.).

In one or more implementations, as shown in FIG. 135, operation o11 includes an operation o1150 for electronically receiving the selection information at least in part identifying the one or more selected ingestible products to be used in sandwich form. Origination of an illustratively derived receiving information sandwich component group can be accomplished through skilled in the art design choice selection of one or more of the above depicted components from one or more of the above depicted subsystems shown in FIG. 18. Components from the receiving information sandwich component group can be used in implementing execution of the one or more receiving information sandwich instructions i1150 of FIG. 106, can be used in performance of the receiving information sandwich electrical circuitry arrangement e1150 of FIG. 99, and/or can be used in otherwise fulfillment of the operation o1150. An exemplary non-transitory signal bearing medium version of the information storage subsystem s200 is depicted in FIG. 106 as bearing the one or more receiving information sandwich instructions i1150 that when executed will direct performance of the operation o1150. Furthermore, the receiving information sandwich electrical circuitry arrangement ("elec circ arrange") e1150, when activated, will perform the operation o1150. Also, the receiving information sandwich module m1150, when executed and/or activated, will direct performance of and/or perform the operation o1150. For instance, in one or more exemplary implementations, the one or more receiving information sandwich instructions i1150, when executed, direct performance of the operation o1150 in the illustrative depiction as follows, and/or the receiving information sandwich electrical circuitry arrangement e1150, when activated, performs the operation o1150 in the illustrative depiction as follows, and/or the receiving information sandwich module m1150, when executed and/or activated, directs performance of and/or performs the operation o1150 in the illustrative depiction as follows, and/or the operation o1150 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) to be used in sandwich form (e.g. including an implementation of the receiver component s528 is configured to electronically receive the selection information and engage with the processor component s102 to at least in part electronically identify the one or more selected ingestible products in sandwich form such as a hamburger, and/or etc.).

In one or more implementations, as shown in FIG. 135, operation o11 includes an operation o1151 for electronically receiving the selection information at least in part identifying the one or more selected ingestible products to be used at least partially as a soup. Origination of an illustratively derived receiving information soup component group can be accomplished through skilled in the art design choice selection of one or more of the above depicted components from one or more of the above depicted subsystems shown in FIG. 18. Components from the receiving information soup component group can be used in implementing execution of the one or more receiving information soup instructions i1151 of FIG. 106, can be used in performance of the receiving information soup electrical circuitry arrangement e1151 of FIG. 99, and/or can be used in otherwise fulfillment of the operation o1151. An exemplary non-transitory signal bearing medium version of the information storage subsystem s200 is depicted in FIG. 106 as bearing the one or more receiving information soup instructions i1151 that when executed will direct performance of the operation o1151. Furthermore, the receiving information soup electrical circuitry arrangement ("elec circ arrange") e1151, when activated, will perform the operation o1151. Also, the receiving information soup module m1151, when executed and/or activated, will direct performance of and/or perform the operation o1151. For instance, in one or more exemplary implementations, the one or more receiving information soup instructions i1151, when executed, direct performance of the operation o1151 in the illustrative depiction as follows, and/or the receiving information soup electrical circuitry arrangement e1151, when activated, performs the operation o1151 in the illustrative depiction as follows, and/or the receiving information soup module m1151, when executed and/or activated, directs performance of and/or performs the operation o1151 in the illustrative depiction as follows, and/or the operation o1151 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) to be used at least partially as a soup (e.g. including an implementation of the receiver component s528 is configured to electronically receive the selection information and engage with the processor component s102 to at least in part electronically identify the one or more selected ingestible products to be used as a soup such as tomato soup, and/or etc.).

In one or more implementations, as shown in FIG. 136, operation o11 includes an operation o1152 for electronically receiving the selection information at least in part identifying the one or more selected ingestible products to be used as at least partially as a smoothie. Origination of an illustratively derived receiving information smoothie component group can be accomplished through skilled in the art design choice selection of one or more of the above depicted components from one or more of the above depicted subsystems shown in FIG. 18. Components from the receiving information smoothie component group can be used in implementing execution of the one or more receiving information smoothie instructions i1152 of FIG. 106, can be used in performance of the receiving information smoothie electrical circuitry arrangement e1152 of FIG. 99, and/or can be used in otherwise fulfillment of the operation o1152. An exemplary non-transitory signal bearing medium version of the information storage subsystem s200 is depicted in FIG. 106 as bearing the one or more receiving information smoothie instructions i1152 that when executed will direct performance of the operation o1152. Furthermore, the receiving information smoothie electrical circuitry arrangement ("elec circ arrange") e1152, when activated, will perform the operation o1152. Also, the receiving information smoothie module m1152, when executed and/or activated, will direct performance of and/or perform the operation o1152. For instance, in one or more exemplary implementations, the one or more receiving information smoothie instructions i1152, when executed, direct performance of the operation o1152 in the illustrative depiction as follows, and/or the receiving information smoothie electrical circuitry arrangement e1152, when activated, performs the operation o1152 in the illustrative depiction as follows, and/or the receiving information smoothie module m1152, when executed and/or activated, directs performance of and/or performs the operation o1152 in the illustrative depiction as follows, and/or the operation o1152 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) to be used as at least partially as a smoothie (e.g. including an implementation of the receiver component s528 is configured to electronically receive the selection information and engage with the processor component s102 to at least in part electronically identify the one or more selected ingestible products to be used a smoothie such as a fruit smoothie, and/or etc.).

In one or more implementations, as shown in FIG. 136, operation o11 includes an operation o1153 for electronically receiving the selection information at least in part identifying the one or more selected ingestible products to be used at least partially as a baked good. Origination of an illustratively derived receiving information baked component group can be accomplished through skilled in the art design choice selection of one or more of the above depicted components from one or more of the above depicted subsystems shown in FIG. 18. Components from the receiving information baked component group can be used in implementing execution of the one or more receiving information baked instructions i1153 of FIG. 106, can be used in performance of the receiving information baked electrical circuitry arrangement e1153 of FIG. 99, and/or can be used in otherwise fulfillment of the operation o1153. An exemplary non-transitory signal bearing medium version of the information storage subsystem s200 is depicted in FIG. 106 as bearing the one or more receiving information baked instructions i1153 that when executed will direct performance of the operation o1153. Furthermore, the receiving information baked electrical circuitry arrangement ("elec circ arrange") e1153, when activated, will perform the operation o1153. Also, the receiving information baked module m1153, when executed and/or activated, will direct performance of and/or perform the operation o1153. For instance, in one or more exemplary implementations, the one or more receiving information baked instructions i1153, when executed, direct performance of the operation o1153 in the illustrative depiction as follows, and/or the receiving information baked electrical circuitry arrangement e1153, when activated, performs the operation o1153 in the illustrative depiction as follows, and/or the receiving information baked module m1153, when executed and/or activated, directs performance of and/or performs the operation o1153 in the illustrative depiction as follows, and/or the operation o1153 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) to be used at least partially as a baked good (e.g. including an implementation of the receiver component s528 is configured to electronically receive the selection information and engage with the processor component s102 to at least in part electronically identifying at least in part the one or more selected ingestible products to be used as a baked goods such as a muffin, and/or etc.).

In one or more implementations, as shown in FIG. 136, operation o11 includes an operation o1154 for electronically receiving the selection information at least in part identifying the one or more selected ingestible products to be used as a deposited material. Origination of an illustratively derived receiving information deposited component group can be accomplished through skilled in the art design choice selection of one or more of the above depicted components from one or more of the above depicted subsystems shown in FIG. 18. Components from the receiving information deposited component group can be used in implementing execution of the one or more receiving information deposited instructions i1154 of FIG. 106, can be used in performance of the receiving information deposited electrical circuitry arrangement e1154 of FIG. 99, and/or can be used in otherwise fulfillment of the operation o1154. An exemplary non-transitory signal bearing medium version of the information storage subsystem s200 is depicted in FIG. 106 as bearing the one or more receiving information deposited instructions i1154 that when executed will direct performance of the operation o1154. Furthermore, the receiving information deposited electrical circuitry arrangement ("elec circ arrange") e1154, when activated, will perform the operation o1154. Also, the receiving information deposited module m1154, when executed and/or activated, will direct performance of and/or perform the operation o1154. For instance, in one or more exemplary implementations, the one or more receiving information deposited instructions i1154, when executed, direct performance of the operation o1154 in the illustrative depiction as follows, and/or the receiving information deposited electrical circuitry arrangement e1154, when activated, performs the operation o1154 in the illustrative depiction as follows, and/or the receiving information deposited module m1154, when executed and/or activated, directs performance of and/or performs the operation o1154 in the illustrative depiction as follows, and/or the operation o1154 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) to be used as a deposited material (e.g. including an implementation of the receiver component s528 is configured to electronically receive the selection information and engage with the processor component s102 to direct the material processing subsystem s700 to at least in part electronically identify at least in part the one or more selected ingestible products to be used as a deposited material such as frosting on a multi-layered cake, and/or etc.).

In one or more implementations, as shown in FIG. 137, operation o11 includes an operation o1155 for electronically receiving the selection information at least in part identifying the one or more selected ingestible products to be used as an assembled concoction. Origination of an illustratively derived receiving information assembled component group can be accomplished through skilled in the art design choice selection of one or more of the above depicted components from one or more of the above depicted subsystems shown in FIG. 18. Components from the receiving information assembled component group can be used in implementing execution of the one or more receiving information assembled instructions i1155 of FIG. 106, can be used in performance of the receiving information assembled electrical circuitry arrangement e1155 of FIG. 99, and/or can be used in otherwise fulfillment of the operation o1155. An exemplary non-transitory signal bearing medium version of the information storage subsystem s200 is depicted in FIG. 106 as bearing the one or more receiving information assembled instructions i1155 that when executed will direct performance of the operation o1155. Furthermore, the receiving information assembled electrical circuitry arrangement ("elec circ arrange") e1155, when activated, will perform the operation o1155. Also, the receiving information assembled module m1155, when executed and/or activated, will direct performance of and/or perform the operation o1155. For instance, in one or more exemplary implementations, the one or more receiving information assembled instructions i1155, when executed, direct performance of the operation o1155 in the illustrative depiction as follows, and/or the receiving information assembled electrical circuitry arrangement e1155, when activated, performs the operation o1155 in the illustrative depiction as follows, and/or the receiving information assembled module m1155, when executed and/or activated, directs performance of and/or performs the operation o1155 in the illustrative depiction as follows, and/or the operation o1155 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) to be used as an assembled concoction (e.g. including an implementation of the receiver component s528 is configured to electronically receive the selection information and engage with the processor component s102 to direct the material processing subsystem s700 to at least in part electronically identify at least the one or more selected ingestible products to be used as an assembled concoction such as a decorated confection, and/or etc.).

In one or more implementations, as shown in FIG. 137, operation o11 includes an operation o1156 for electronically receiving the selection information at least in part identifying the one or more selected ingestible products to be used as a main entrée, a dessert, a liquid drink, an emulsion, a snack, a meal, or a combination thereof. Origination of an illustratively derived receiving information uses component group can be accomplished through skilled in the art design choice selection of one or more of the above depicted components from one or more of the above depicted subsystems shown in FIG. 18. Components from the receiving information uses component group can be used in implementing execution of the one or more receiving information uses instructions i1156 of FIG. 106, can be used in performance of the receiving information uses electrical circuitry arrangement e1156 of FIG. 99, and/or can be used in otherwise fulfillment of the operation o1156. An exemplary non-transitory signal bearing medium version of the information storage subsystem s200 is depicted in FIG. 106 as bearing the one or more receiving information uses instructions i1156 that when executed will direct performance of the operation o1156. Furthermore, the receiving information uses electrical circuitry arrangement ("elec circ arrange") e1156, when activated, will perform the operation o1156. Also, the receiving information uses module m1156, when executed and/or activated, will direct performance of and/or perform the operation o1156. For instance, in one or more exemplary implementations, the one or more receiving information uses instructions i1156, when executed, direct performance of the operation o1156 in the illustrative depiction as follows, and/or the receiving information uses electrical circuitry arrangement e1156, when activated, performs the operation o1156 in the illustrative depiction as follows, and/or the receiving information uses module m1156, when executed and/or activated, directs performance of and/or performs the operation o1156 in the illustrative depiction as follows, and/or the operation o1156 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) to be used as a main entrée, a dessert, a liquid drink, an emulsion, a snack, a meal, or a combination thereof (e.g. including an implementation of the receiver component s528 is configured to electronically receive the selection information and engage with the processor component s102 to at least in part electronically identify the one or more selected ingestible products to be used as a as a main entrée, a dessert, a liquid drink, an emulsion, a snack, a meal, or a combination thereof such as a steak dinner, and/or etc.).

In one or more implementations, as shown in FIG. 137, operation o11 includes an operation o1157 for electronically receiving the selection information at least in part identifying the one or more selected ingestible products to be used periodically. Origination of illustratively derived receiving information periods component group can be accomplished through skilled in the art design choice selection of one or more of the above depicted components from one or more of the above depicted subsystems shown in FIG. 18. Components from the receiving information periods component group can be used in implementing execution of the one or more receiving information periods instructions i1157 of FIG. 106, can be used in performance of the receiving information periods electrical circuitry arrangement e1157 of FIG. 99, and/or can be used in otherwise fulfillment of the operation o1157. An exemplary non-transitory signal bearing medium version of the information storage subsystem s200 is depicted in FIG. 106 as bearing the one or more receiving information periods instructions i1157 that when executed will direct performance of the operation o1157. Furthermore, the receiving information periods electrical circuitry arrangement ("elec circ arrange") e1157, when activated, will perform the operation o1157. Also, the receiving information periods module m1157, when executed and/or activated, will direct performance of and/or perform the operation o1157. For instance, in one or more exemplary implementations, the one or more receiving information periods instructions i1157, when executed, direct performance of the operation o1157 in the illustrative depiction as follows, and/or the receiving information periods electrical circuitry arrangement e1157, when activated, performs the operation o1157 in the illustrative depiction as follows, and/or the receiving information periods module m1157, when executed and/or activated, directs performance of and/or performs the operation o1157 in the illustrative depiction as follows, and/or the operation o1157 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) to be used periodically (e.g. including an implementation of the receiver component s528 is configured to electronically receive the selection information and engage with the processor component s102 to at least in part electronically identify the one or more selected ingestible products to be used periodically such as once a week, and/or etc.).

In one or more implementations, as shown in FIG. 138, operation o11 includes an operation o1158 for electronically receiving the selection information at least in part identifying the one or more selected ingestible products being subject to ingestion by the one or more particular individual living beings, the selection information electronically received via the electronically enabled input in response to electronically outputted one or more selection menus including via one or more electronic display screens. Origination of an illustratively derived receiving information display component group can be accomplished through skilled in the art design choice selection of one or more of the above depicted components from one or more of the above depicted subsystems shown in FIG. 18. Components from the receiving information display component group can be used in implementing execution of the one or more receiving information display instructions i1158 of FIG. 106, can be used in performance of the receiving information display electrical circuitry arrangement e1158 of FIG. 99, and/or can be used in otherwise fulfillment of the operation o1158. An exemplary non-transitory signal bearing medium version of the information storage subsystem s200 is depicted in FIG. 106 as bearing the one or more receiving information display instructions i1158 that when executed will direct performance of the operation o1158. Furthermore, the receiving information display electrical circuitry arrangement ("elec circ arrange") e1158, when activated, will perform the operation o1158. Also, the receiving information display module m1158, when executed and/or activated, will direct performance of and/or perform the operation o1158. For instance, in one or more exemplary implementations, the one or more receiving information display instructions i1158, when executed, direct performance of the operation o1158 in the illustrative depiction as follows, and/or the receiving information display electrical circuitry arrangement e1158, when activated, performs the operation o1158 in the illustrative depiction as follows, and/or the receiving information display module m1158, when executed and/or activated, directs performance of and/or performs the operation o1158 in the illustrative depiction as follows, and/or the operation o1158 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input in response to electronically outputted one or more selection menus including via one or more electronic display screens (e.g. including an implementation of the receiver component s528 is configured to electronically receive the selection information in a format for the processor component s102 to at least in part electronically output the one or more selection menus to be electronically outputted including via one or more display screens such as via graphical user interface (GUI) component s302, and/or etc.).

In one or more implementations, as shown in FIG. 138, operation o11 includes an operation o1159 for electronically receiving the selection information at least in part identifying the one or more selected ingestible products being subject to ingestion by the one or more particular individual living beings, the selection information electronically received via the electronically enabled input in response to electronically outputted one or more selection menus including via one or more audio output devices. Origination of an illustratively derived receiving information audio component group can be accomplished through skilled in the art design choice selection of one or more of the above depicted components from one or more of the above depicted subsystems shown in FIG. 18. Components from the receiving information audio component group can be used in implementing execution of the one or more receiving information audio instructions i1159 of FIG. 106, can be used in performance of the receiving information audio electrical circuitry arrangement e1159 of FIG. 99, and/or can be used in otherwise fulfillment of the operation o1159. An exemplary non-transitory signal bearing medium version of the information storage subsystem s200 is depicted in FIG. 106 as bearing the one or more receiving information audio instructions i1159 that when executed will direct performance of the operation o1159. Furthermore, the receiving information audio electrical circuitry arrangement ("elec circ arrange") e1159, when activated, will perform the operation o1159. Also, the receiving information audio module m1159, when executed and/or activated, will direct performance of and/or perform the operation o1159. For instance, in one or more exemplary implementations, the one or more receiving information audio instructions i1159, when executed, direct performance of the operation o1159 in the illustrative depiction as follows, and/or the receiving information audio electrical circuitry arrangement e1159, when activated, performs the operation o1159 in the illustrative depiction as follows, and/or the receiving information audio module m1159, when executed and/or activated, directs performance of and/or performs the operation o1159 in the illustrative depiction as follows, and/or the operation o1159 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input in response to electronically outputted one or more selection menus including via one or more audio output devices (e.g. including an implementation of the receiver component s528 is configured to electronically receive the selection information in a format for the processor component s102 to at least in part electronically generate the one or more selection menus to be electronically outputted including via one or more audio output devices such as via audio in/out component s328, and/or etc.).

In one or more implementations, as shown in FIG. 138, operation o11 includes an operation o1160 for electronically receiving the selection information at least in part identifying the one or more selected ingestible products being subject to ingestion by the one or more particular individual living beings, the selection information electronically received via the electronically enabled input in response to electronically outputted one or more selection menus including via one or more network interfaces. Origination of an illustratively derived receiving information interface component group can be accomplished through skilled in the art design choice selection of one or more of the above depicted components from one or more of the above depicted subsystems shown in FIG. 18. Components from the receiving information interface component group can be used in implementing execution of the one or more receiving information interface instructions i1160 of FIG. 107, can be used in performance of the receiving information interface electrical circuitry arrangement e1160 of FIG. 100, and/or can be used in otherwise fulfillment of the operation o1160. An exemplary non-transitory signal bearing medium version of the information storage subsystem s200 is depicted in FIG. 107 as bearing the one or more receiving information interface instructions i1160 that when executed will direct performance of the operation o1160. Furthermore, the receiving information interface electrical circuitry arrangement ("elec circ arrange") e1160, when activated, will perform the operation o1160. Also, the receiving information interface module m1160, when executed and/or activated, will direct performance of and/or perform the operation o1160. For instance, in one or more exemplary implementations, the one or more receiving information interface instructions i1160, when executed, direct performance of the operation o1160 in the illustrative depiction as follows, and/or the receiving information interface electrical circuitry arrangement e1160, when activated, performs the operation o1160 in the illustrative depiction as follows, and/or the receiving information interface module m1160, when executed and/or activated, directs performance of and/or performs the operation o1160 in the illustrative depiction as follows, and/or the operation o1160 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input in response to electronically outputted one or more selection menus including via one or more network interfaces (e.g. including an implementation of the receiver component s528 is configured to electronically receive the selection information in a format for the processor component s102 to at least in part electronically generate the one or more selection menus to be electronically outputted including via one or more network interfaces such as via wide area network component s516, and/or etc.).

In one or more implementations, as shown in FIG. 139, operation o11 includes an operation o1161 for electronically receiving the selection information at least in part identifying the one or more selected ingestible products being subject to ingestion by the one or more particular individual living beings, the selection information electronically received via the electronically enabled input in response to electronically outputted one or more selection menus including wirelessly. Origination of an illustratively derived receiving information wirelessly component group can be accomplished through skilled in the art design choice selection of one or more of the above depicted components from one or more of the above depicted subsystems shown in FIG. 18. Components from the receiving information wirelessly component group can be used in implementing execution of the one or more receiving information wirelessly instructions i1161 of FIG. 107, can be used in performance of the receiving information wirelessly electrical circuitry arrangement e1161 of FIG. 100, and/or can be used in otherwise fulfillment of the operation o1161. An exemplary non-transitory signal bearing medium version of the information storage subsystem s200 is depicted in FIG. 107 as bearing the one or more receiving information wirelessly instructions i1161 that when executed will direct performance of the operation o1161. Furthermore, the receiving information wirelessly electrical circuitry arrangement ("elec circ arrange") e1161, when activated, will perform the operation o1161. Also, the receiving information wirelessly module m1161, when executed and/or activated, will direct performance of and/or perform the operation o1161. For instance, in one or more exemplary implementations, the one or more receiving information wirelessly instructions i1161, when executed, direct performance of the operation o1161 in the illustrative depiction as follows, and/or the receiving information wirelessly electrical circuitry arrangement e1161, when activated, performs the operation o1161 in the illustrative depiction as follows, and/or the receiving information wirelessly module m1161, when executed and/or activated, directs performance of and/or performs the operation o1161 in the illustrative depiction as follows, and/or the operation o1161 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input in response to electronically outputted one or more selection menus including wirelessly (e.g. including an implementation of the receiver component s528 is configured to electronically receive the selection information in a format for the processor component s102 to at least in part electronically generate the one or more selection menus to be electronically outputted including wirelessly such as via wireless network component s510, and/or etc.).

In one or more implementations, as shown in FIG. 139, operation o11 includes an operation o1162 for electronically receiving the selection information at least in part identifying the one or more selected ingestible products being subject to ingestion by the one or more particular individual living beings, the selection information electronically received via electronically enabled input in response to electronically outputted one or more selection menus including via the one or more electronic paper printers. Origination of an illustratively derived receiving information paper printer component group can be accomplished through skilled in the art design choice selection of one or more of the above depicted components from one or more of the above depicted subsystems shown in FIG. 18. Components from the receiving information paper printer component group can be used in implementing execution of the one or more receiving information paper printer instructions i1162 of FIG. 107, can be used in performance of the receiving information paper printer electrical circuitry arrangement e1162 of FIG. 100, and/or can be used in otherwise fulfillment of the operation o1162. An exemplary non-transitory signal bearing medium version of the information storage subsystem s200 is depicted in FIG. 107 as bearing the one or more receiving information paper printer instructions i1162 that when executed will direct performance of the operation o1162. Furthermore, the receiving information paper printer electrical circuitry arrangement ("elec circ arrange") e1162, when activated, will perform the operation o1162. Also, the receiving information paper printer module m1162, when executed and/or activated, will direct performance of and/or perform the operation o1162. For instance, in one or more exemplary implementations, the one or more receiving information paper printer instructions i1162, when executed, direct performance of the operation o1162 in the illustrative depiction as follows, and/or the receiving information paper printer electrical circuitry arrangement e1162, when activated, performs the operation o1162 in the illustrative depiction as follows, and/or the receiving information paper printer module m1162, when executed and/or activated, directs performance of and/or performs the operation o1162 in the illustrative depiction as follows, and/or the operation o1162 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via electronically enabled input in response to electronically outputted one or more selection menus including via the one or more electronic paper printers (e.g. including an implementation of the receiver component s528 is configured to electronically receive the selection information in a format for the processor component s102 to at least in part electronically generate the one or more selection menus to be electronically outputted including via electronic paper printer such as via scanner component s338, and/or etc.).

In one or more implementations, as shown in FIG. 139, operation o11 includes an operation o1163 for electronically receiving the selection information at least in part identifying the one or more selected ingestible products being subject to ingestion by the one or more particular individual living beings, the selection information electronically received via electronically enabled input in response to electronically outputted one or more selection menus including via the one or more electronic food printers. Origination of an illustratively derived receiving information food printer component group can be accomplished through skilled in the art design choice selection of one or more of the above depicted components from one or more of the above depicted subsystems shown in FIG. 18. Components from the receiving information food printer component group can be used in implementing execution of the one or more receiving information food printer instructions i1163 of FIG. 107, can be used in performance of the receiving information food printer electrical circuitry arrangement e1163 of FIG. 100, and/or can be used in otherwise fulfillment of the operation o1163. An exemplary non-transitory signal bearing medium version of the information storage subsystem s200 is depicted in FIG. 107 as bearing the one or more receiving information food printer instructions i1163 that when executed will direct performance of the operation o1163. Furthermore, the receiving information food printer electrical circuitry arrangement ("elec circ arrange") e1163, when activated, will perform the operation o1163. Also, the receiving information food printer module m1163, when executed and/or activated, will direct performance of and/or perform the operation o1163. For instance, in one or more exemplary implementations, the one or more receiving information food printer instructions i1163, when executed, direct performance of the operation o1163 in the illustrative depiction as follows, and/or the receiving information food printer electrical circuitry arrangement e1163, when activated, performs the operation o1163 in the illustrative depiction as follows, and/or the receiving information food printer module m1163, when executed and/or activated, directs performance of and/or performs the operation o1163 in the illustrative depiction as follows, and/or the operation o1163 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via electronically enabled input in response to electronically outputted one or more selection menus including via the one or more electronic food printers (e.g. including an implementation of the receiver component s528 is configured to electronically receive the user status information in a format for the processor component s102 to at least in part electronically generate the one or more selection menus to be electronically outputted including via electronic food printer such as via deposition component s740, and/or etc.).

In one or more implementations, as shown in FIG. 140, operation o11 includes an operation o1164 for electronically receiving the selection information at least in part identifying the one or more selected ingestible products being subject to ingestion by the one or more particular individual living beings, the selection information electronically received via the electronically enabled input including via one or more electronic identification cards. Origination of an illustratively derived receiving information ID card component group can be accomplished through skilled in the art design choice selection of one or more of the above depicted components from one or more of the above depicted subsystems shown in FIG. 18. Components from the receiving information ID card component group can be used in implementing execution of the one or more receiving information ID card instructions i1164 of FIG. 107, can be used in performance of the receiving information ID card electrical circuitry arrangement e1164 of FIG. 100, and/or can be used in otherwise fulfillment of the operation o1164. An exemplary non-transitory signal bearing medium version of the information storage subsystem s200 is depicted in FIG. 107 as bearing the one or more receiving information ID card instructions i1164 that when executed will direct performance of the operation o1164. Furthermore, the receiving information ID card electrical circuitry arrangement ("elec circ arrange") e1164, when activated, will perform the operation o1164. Also, the receiving information ID card module m1164, when executed and/or activated, will direct performance of and/or perform the operation o1164. For instance, in one or more exemplary implementations, the one or more receiving information ID card instructions i1164, when executed, direct performance of the operation o1164 in the illustrative depiction as follows, and/or the receiving information ID card electrical circuitry arrangement e1164, when activated, performs the operation o1164 in the illustrative depiction as follows, and/or the receiving information ID card module m1164, when executed and/or activated, directs performance of and/or performs the operation o1164 in the illustrative depiction as follows, and/or the operation o1164 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input including via one or more electronic identification cards (e.g. including an implementation of the receiver component s528 is configured to electronically engage with a card having memory storage holding the selection information to be used by the processor component s102, and/or etc.).

In one or more implementations, as shown in FIG. 140, operation o11 includes an operation o1165 for electronically receiving the selection information at least in part identifying the one or more selected ingestible products being subject to ingestion by the one or more particular individual living beings, the selection information electronically received via the electronically enabled input including via a memory circuit coupled with one or more medication containers. Origination of an illustratively derived receiving information containers component group can be accomplished through skilled in the art design choice selection of one or more of the above depicted components from one or more of the above depicted subsystems shown in FIG. 18. Components from the receiving information containers component group can be used in implementing execution of the one or more receiving information containers instructions i1165 of FIG. 107, can be used in performance of the receiving information containers electrical circuitry arrangement e1165 of FIG. 100, and/or can be used in otherwise fulfillment of the operation o1165. An exemplary non-transitory signal bearing medium version of the information storage subsystem s200 is depicted in FIG. 107 as bearing the one or more receiving information containers instructions i1165 that when executed will direct performance of the operation o1165. Furthermore, the receiving information containers electrical circuitry arrangement ("elec circ arrange") e1165, when activated, will perform the operation o1165. Also, the receiving information containers module m1165, when executed and/or activated, will direct performance of and/or perform the operation o1165. For instance, in one or more exemplary implementations, the one or more receiving information containers instructions i1165, when executed, direct performance of the operation o1165 in the illustrative depiction as follows, and/or the receiving information containers electrical circuitry arrangement e1165, when activated, performs the operation o1165 in the illustrative depiction as follows, and/or the receiving information containers module m1165, when executed and/or activated, directs performance of and/or performs the operation o1165 in the illustrative depiction as follows, and/or the operation o1165 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input including via a memory circuit coupled with one or more medication containers (e.g. including an implementation of the receiver component s528 is configured to electronically engage with a memory storage coupled with a medication container to receive the selection information via the electronically enabled input in electronic form to be used by the processor component s102, and/or etc.).

In one or more implementations, as shown in FIG. 140, operation o11 includes an operation o1166 for electronically receiving the selection information at least in part identifying the one or more selected ingestible products being subject to ingestion by the one or more particular individual living beings, the selection information electronically received via the electronically enabled input including via one or more credit card swipes. Origination of an illustratively derived receiving information credit component group can be accomplished through skilled in the art design choice selection of one or more of the above depicted components from one or more of the above depicted subsystems shown in FIG. 18. Components from the receiving information credit component group can be used in implementing execution of the one or more receiving information credit instructions i1166 of FIG. 107, can be used in performance of the receiving information credit electrical circuitry arrangement e1166 of FIG. 100, and/or can be used in otherwise fulfillment of the operation o1166. An exemplary non-transitory signal bearing medium version of the information storage subsystem s200 is depicted in FIG. 107 as bearing the one or more receiving information credit instructions i1166 that when executed will direct performance of the operation o1166. Furthermore, the receiving information credit electrical circuitry arrangement ("elec circ arrange") e1166, when activated, will perform the operation o1166. Also, the receiving information credit module m1166, when executed and/or activated, will direct performance of and/or perform the operation o1166. For instance, in one or more exemplary implementations, the one or more receiving information credit instructions i1166, when executed, direct performance of the operation o1166 in the illustrative depiction as follows, and/or the receiving information credit electrical circuitry arrangement e1166, when activated, performs the operation o1166 in the illustrative depiction as follows, and/or the receiving information credit module m1166, when executed and/or activated, directs performance of and/or performs the operation o1166 in the illustrative depiction as follows, and/or the operation o1166 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input including via one or more credit card swipes (e.g. including an implementation of the receiver component s528 is configured to electronically engage with an electronic memory stripe integrated into a credit card to receive the selection information via electronically enabled input to be used by the processor component s102, and/or etc.).

In one or more implementations, as shown in FIG. 141, operation o11 includes an operation o1167 for electronically receiving the selection information at least in part identifying the one or more selected ingestible products being subject to ingestion by the one or more particular individual living beings, the selection information electronically received via the electronically enabled input including via one or more cell phone swipes. Origination of an illustratively derived receiving information cell component group can be accomplished through skilled in the art design choice selection of one or more of the above depicted components from one or more of the above depicted subsystems shown in FIG. 18. Components from the receiving information cell component group can be used in implementing execution of the one or more receiving information cell instructions i1167 of FIG. 107, can be used in performance of the receiving information cell electrical circuitry arrangement e1167 of FIG. 100, and/or can be used in otherwise fulfillment of the operation o1167. An exemplary non-transitory signal bearing medium version of the information storage subsystem s200 is depicted in FIG. 107 as bearing the one or more receiving information cell instructions i1167 that when executed will direct performance of the operation o1167.

Furthermore, the receiving information cell electrical circuitry arrangement ("elec circ arrange") e1167, when activated, will perform the operation o1167. Also, the receiving information cell module m1167, when executed and/or activated, will direct performance of and/or perform the operation o1167. For instance, in one or more exemplary implementations, the one or more receiving information cell instructions i1167, when executed, direct performance of the operation o1167 in the illustrative depiction as follows, and/or the receiving information cell electrical circuitry arrangement e1167, when activated, performs the operation o1167 in the illustrative depiction as follows, and/or the receiving information cell module m1167, when executed and/or activated, directs performance of and/or performs the operation o1167 in the illustrative depiction as follows, and/or the operation o1167 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input including via one or more cell phone swipes (e.g. including an implementation of the receiver component s528 is configured to electronically engage with an electronic memory component integrated into a cell phone to receive the selection information via electronically enabled input to be used by the processor component s102 to generate the one or more selection menus, and/or etc.).

In one or more implementations, as shown in FIG. 141, operation o11 includes an operation o1168 for electronically receiving the selection information at least in part identifying the one or more selected ingestible products being subject to ingestion by the one or more particular individual living beings, the selection information electronically received via the electronically enabled input including via bar code communication. Origination of an illustratively derived receiving information bar code component group can be accomplished through skilled in the art design choice selection of one or more of the above depicted components from one or more of the above depicted subsystems shown in FIG. 18. Components from the receiving information bar code component group can be used in implementing execution of the one or more receiving information bar code instructions i1168 of FIG. 107, can be used in performance of the receiving information bar code electrical circuitry arrangement e1168 of FIG. 100, and/or can be used in otherwise fulfillment of the operation o1168. An exemplary non-transitory signal bearing medium version of the information storage subsystem s200 is depicted in FIG. 107 as bearing the one or more receiving information bar code instructions i1168 that when executed will direct performance of the operation o1168. Furthermore, the receiving information bar code electrical circuitry arrangement ("elec circ arrange") e1168, when activated, will perform the operation o1168. Also, the receiving information bar code module m1168, when executed and/or activated, will direct performance of and/or perform the operation o1168. For instance, in one or more exemplary implementations, the one or more receiving information bar code instructions i1168, when executed, direct performance of the operation o1168 in the illustrative depiction as follows, and/or the receiving information bar code electrical circuitry arrangement e1168, when activated, performs the operation o1168 in the illustrative depiction as follows, and/or the receiving information bar code module m1168, when executed and/or activated, directs performance of and/or performs the operation o1168 in the illustrative depiction as follows, and/or the operation o1168 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input including via bar code communication (e.g. including an implementation of the receiver component s528 is configured to electronically read a bar code label to receive the selection information via electronically enabled input to be used by the processor component s102, and/or etc.).

In one or more implementations, as shown in FIG. 141, operation o11 includes an operation o1169 for electronically receiving the selection information at least in part identifying the one or more selected ingestible products being subject to ingestion by the one or more particular individual living beings, the selection information electronically received via the electronically enabled input including via Internet communication. Origination of an illustratively derived receiving information Internet component group can be accomplished through skilled in the art design choice selection of one or more of the above depicted components from one or more of the above depicted subsystems shown in FIG. 18. Components from the receiving information Internet component group can be used in implementing execution of the one or more receiving information Internet instructions i1169 of FIG. 107, can be used in performance of the receiving information Internet electrical circuitry arrangement e1169 of FIG. 100, and/or can be used in otherwise fulfillment of the operation o1169. An exemplary non-transitory signal bearing medium version of the information storage subsystem s200 is depicted in FIG. 107 as bearing the one or more receiving information Internet instructions i1169 that when executed will direct performance of the operation o1169. Furthermore, the receiving information Internet electrical circuitry arrangement ("elec circ arrange") e1169, when activated, will perform the operation o1169. Also, the receiving information Internet module m1169, when executed and/or activated, will direct performance of and/or perform the operation o1169. For instance, in one or more exemplary implementations, the one or more receiving information Internet instructions i1169, when executed, direct performance of the operation o1169 in the illustrative depiction as follows, and/or the receiving information Internet electrical circuitry arrangement e1169, when activated, performs the operation o1169 in the illustrative depiction as follows, and/or the receiving information Internet module m1169, when executed and/or activated, directs performance of and/or performs the operation o1169 in the illustrative depiction as follows, and/or the operation o1169 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input including via Internet communication (e.g. including an implementation of the receiver component s528 is configured to electronically receive the selection information through the internet network component s508 to be used by the processor component s102, and/or etc.).

In one or more implementations, as shown in FIG. 142, operation o11 includes an operation o1170 for electronically receiving the selection information at least in part identifying the one or more selected ingestible products being subject to ingestion by the one or more particular individual living beings, the selection information electronically received via the electronically enabled input including via electronic network communication. Origination of an illustratively derived receiving information network component group can be accomplished through skilled in the art design choice selection of one or more of the above depicted components from one or more of the above depicted subsystems shown in FIG. 18. Components from the receiving information network component group can be used in implementing execution of the one or more receiving information network instructions i1170 of FIG. 107, can be used in performance of the receiving information network electrical circuitry arrangement e1170 of FIG. 100, and/or can be used in otherwise fulfillment of the operation o1170. An exemplary non-transitory signal bearing medium version of the information storage subsystem s200 is depicted in FIG. 107 as bearing the one or more receiving information network instructions i1170 that when executed will direct performance of the operation o1170. Furthermore, the receiving information network electrical circuitry arrangement ("elec circ arrange") e1170, when activated, will perform the operation o1170. Also, the receiving information network module m1170, when executed and/or activated, will direct performance of and/or perform the operation o1170. For instance, in one or more exemplary implementations, the one or more receiving information network instructions i1170, when executed, direct performance of the operation o1170 in the illustrative depiction as follows, and/or the receiving information network electrical circuitry arrangement e1170, when activated, performs the operation o1170 in the illustrative depiction as follows, and/or the receiving information network module m1170, when executed and/or activated, directs performance of and/or performs the operation o1170 in the illustrative depiction as follows, and/or the operation o1170 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input including via electronic network communication (e.g. including an implementation of the receiver component s528 is configured to electronically engage with the network cable component s502 to receive the selection information to be used by the processor component s102, and/or etc.).

In one or more implementations, as shown in FIG. 142, operation o11 includes an operation o1171 for electronically receiving the selection information at least in part identifying the one or more selected ingestible products being subject to ingestion by the one or more particular individual living beings, the selection information electronically received via the electronically enabled input including via touch screen input. Origination of an illustratively derived receiving information touch component group can be accomplished through skilled in the art design choice selection of one or more of the above depicted components from one or more of the above depicted subsystems shown in FIG. 18. Components from the receiving information touch component group can be used in implementing execution of the one or more receiving information touch instructions i1171 of FIG. 107, can be used in performance of the receiving information touch electrical circuitry arrangement e1171 of FIG. 100, and/or can be used in otherwise fulfillment of the operation o1171. An exemplary non-transitory signal bearing medium version of the information storage subsystem s200 is depicted in FIG. 107 as bearing the one or more receiving information touch instructions i1171 that when executed will direct performance of the operation o1171. Furthermore, the receiving information touch electrical circuitry arrangement ("elec circ arrange") e1171, when activated, will perform the operation o1171. Also, the receiving information touch module m1171, when executed and/or activated, will direct performance of and/or perform the operation o1171. For instance, in one or more exemplary implementations, the one or more receiving information touch instructions i1171, when executed, direct performance of the operation o1171 in the illustrative depiction as follows, and/or the receiving information touch electrical circuitry arrangement e1171, when activated, performs the operation o1171 in the illustrative depiction as follows, and/or the receiving information touch module m1171, when executed and/or activated, directs performance of and/or performs the operation o1171 in the illustrative depiction as follows, and/or the operation o1171 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input including via touch screen input (e.g. including an implementation of the receiver component s528 is configured to electronically receive through the touch screen component s314 the selection information to be used by the processor component s102, and/or etc.).

In one or more implementations, as shown in FIG. 142, operation o11 includes an operation o1172 for electronically receiving the selection information at least in part identifying the one or more selected ingestible products being subject to ingestion by the one or more particular individual living beings, the selection information electronically received via the electronically enabled input including via wireless input. Origination of an illustratively derived receiving information wireless component group can be accomplished through skilled in the art design choice selection of one or more of the above depicted components from one or more of the above depicted subsystems shown in FIG. 18. Components from the receiving information wireless component group can be used in implementing execution of the one or more receiving information wireless instructions i1172 of FIG. 107, can be used in performance of the receiving information wireless electrical circuitry arrangement e1172 of FIG. 100, and/or can be used in otherwise fulfillment of the operation o1172. An exemplary non-transitory signal bearing medium version of the information storage subsystem s200 is depicted in FIG. 107 as bearing the one or more receiving information wireless instructions i1172 that when executed will direct performance of the operation o1172. Furthermore, the receiving information wireless electrical circuitry arrangement ("elec circ arrange") e1172, when activated, will perform the operation o1172. Also, the receiving information wireless module m1172, when executed and/or activated, will direct performance of and/or perform the operation o1172. For instance, in one or more exemplary implementations, the one or more receiving information wireless instructions i1172, when executed, direct performance of the operation o1172 in the illustrative depiction as follows, and/or the receiving information wireless electrical circuitry arrangement e1172, when activated, performs the operation o1172 in the illustrative depiction as follows, and/or the receiving information wireless module m1172, when executed and/or activated, directs performance of and/or performs the operation o1172 in the illustrative depiction as follows, and/or the operation o1172 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input including via wireless input (e.g. including an implementation of the receiver component s528 is configured to electronically receive through the wireless network component s510 to receive the selection information to be used by the processor component s102, and/or etc.).

In one or more implementations, as shown in FIG. 143, operation o11 includes an operation o1173 for electronically receiving the selection information at least in part identifying the one or more selected ingestible products being subject to ingestion by the one or more particular individual living beings, the selection information electronically received via the electronically enabled input including via electronic imaging of the one or more particular individual living beings. Origination of an illustratively derived receiving information imaging component group can be accomplished through skilled in the art design choice selection of one or more of the above depicted components from one or more of the above depicted subsystems shown in FIG. 18. Components from the receiving information imaging component group can be used in implementing execution of the one or more receiving information imaging instructions i1173 of FIG. 107, can be used in performance of the receiving information imaging electrical circuitry arrangement e1173 of FIG. 100, and/or can be used in otherwise fulfillment of the operation o1173. An exemplary non-transitory signal bearing medium version of the information storage subsystem s200 is depicted in FIG. 107 as bearing the one or more receiving information imaging instructions i1173 that when executed will direct performance of the operation o1173. Furthermore, the receiving information imaging electrical circuitry arrangement ("elec circ arrange") e1173, when activated, will perform the operation o1173. Also, the receiving information imaging module m1173, when executed and/or activated, will direct performance of and/or perform the operation o1173. For instance, in one or more exemplary implementations, the one or more receiving information imaging instructions i1173, when executed, direct performance of the operation o1173 in the illustrative depiction as follows, and/or the receiving information imaging electrical circuitry arrangement e1173, when activated, performs the operation o1173 in the illustrative depiction as follows, and/or the receiving information imaging module m1173, when executed and/or activated, directs performance of and/or performs the operation o1173 in the illustrative depiction as follows, and/or the operation o1173 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input including via electronic imaging (e.g. including an implementation of the receiver component s528 is configured to electronically receive through the camera component s336 the selection information to be used by the processor component s102, and/or etc.) of the one or more particular individual living beings.

In one or more implementations, as shown in FIG. 143, operation o11 includes an operation o1174 for electronically receiving the selection information at least in part identifying the one or more selected ingestible products being subject to ingestion by the one or more particular individual living beings, the selection information electronically received via the electronically enabled input including via electronic based gesture recognition. Origination of an illustratively derived receiving information gesture component group can be accomplished through skilled in the art design choice selection of one or more of the above depicted components from one or more of the above depicted subsystems shown in FIG. 18. Components from the receiving information gesture component group can be used in implementing execution of the one or more receiving information gesture instructions i1174 of FIG. 107, can be used in performance of the receiving information gesture electrical circuitry arrangement e1174 of FIG. 100, and/or can be used in otherwise fulfillment of the operation o1174. An exemplary non-transitory signal bearing medium version of the information storage subsystem s200 is depicted in FIG. 107 as bearing the one or more receiving information gesture instructions i1174 that when executed will direct performance of the operation o1174. Furthermore, the receiving information gesture electrical circuitry arrangement ("elec circ arrange") e1174, when activated, will perform the operation o1174. Also, the receiving information gesture module m1174, when executed and/or activated, will direct performance of and/or perform the operation o1174. For instance, in one or more exemplary implementations, the one or more receiving information gesture instructions i1174, when executed, direct performance of the operation o1174 in the illustrative depiction as follows, and/or the receiving information gesture electrical circuitry arrangement e1174, when activated, performs the operation o1174 in the illustrative depiction as follows, and/or the receiving information gesture module m1174, when executed and/or activated, directs performance of and/or performs the operation o1174 in the illustrative depiction as follows, and/or the operation o1174 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input including via electronic based gesture recognition (e.g. including an implementation of the receiver component s528 is configured to electronically engage with the optical sensing component s418 to receive the selection to be used by the processor component s102, and/or etc.).

In one or more implementations, as shown in FIG. 143, operation o11 includes an operation o1175 for electronically receiving the selection information at least in part identifying the one or more selected ingestible products being subject to ingestion by the one or more particular individual living beings, the selection information electronically received via the electronically enabled input including via electronic audio recording of the one or more particular individual living beings. Origination of an illustratively derived receiving information audio component group can be accomplished through skilled in the art design choice selection of one or more of the above depicted components from one or more of the above depicted subsystems shown in FIG. 18. Components from the receiving information audio component group can be used in implementing execution of the one or more receiving information audio instructions i1175 of FIG. 107, can be used in performance of the receiving information audio electrical circuitry arrangement e1175 of FIG. 100, and/or can be used in otherwise fulfillment of the operation o1175. An exemplary non-transitory signal bearing medium version of the information storage subsystem s200 is depicted in FIG. 107 as bearing the one or more receiving information audio instructions i1175 that when executed will direct performance of the operation o1175. Furthermore, the receiving information audio electrical circuitry arrangement ("elec circ arrange") e1175, when activated, will perform the operation o1175. Also, the receiving information audio module m1175, when executed and/or activated, will direct performance of and/or perform the operation o1175. For instance, in one or more exemplary implementations, the one or more receiving information audio instructions i1175, when executed, direct performance of the operation o1175 in the illustrative depiction as follows, and/or the receiving information audio electrical circuitry arrangement e1175, when activated, performs the operation o1175 in the illustrative depiction as follows, and/or the receiving information audio module m1175, when executed and/or activated, directs performance of and/or performs the operation o1175 in the illustrative depiction as follows, and/or the operation o1175 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input including via electronic audio recording (e.g. including an implementation of the receiver component s528 is configured to electronically engage with the sound sensing component s420 to receive the selection information to be used by the processor component s102, and/or etc.) of the one or more particular individual living beings.

In one or more implementations, as shown in FIG. 144, operation o11 includes an operation o1176 for electronically receiving the selection information at least in part identifying the one or more selected ingestible products being subject to ingestion by the one or more particular individual living beings, the selection information electronically received via the electronically enabled input including via electronic keypad entry. Origination of an illustratively derived receiving information keypad component group can be accomplished through skilled in the art design choice selection of one or more of the above depicted components from one or more of the above depicted subsystems shown in FIG. 18. Components from the receiving information keypad component group can be used in implementing execution of the one or more receiving information keypad instructions i1176 of FIG. 107, can be used in performance of the receiving information keypad electrical circuitry arrangement e1176 of FIG. 100, and/or can be used in otherwise fulfillment of the operation o1176. An exemplary non-transitory signal bearing medium version of the information storage subsystem s200 is depicted in FIG. 107 as bearing the one or more receiving information keypad instructions i1176 that when executed will direct performance of the operation o1176. Furthermore, the receiving information keypad electrical circuitry arrangement ("elec circ arrange") e1176, when activated, will perform the operation o1176. Also, the receiving information keypad module m1176, when executed and/or activated, will direct performance of and/or perform the operation o1176. For instance, in one or more exemplary implementations, the one or more receiving information keypad instructions i1176, when executed, direct performance of the operation o1176 in the illustrative depiction as follows, and/or the receiving information keypad electrical circuitry arrangement e1176, when activated, performs the operation o1176 in the illustrative depiction as follows, and/or the receiving information keypad module m1176, when executed and/or activated, directs performance of and/or performs the operation o1176 in the illustrative depiction as follows, and/or the operation o1176 is otherwise carried out in the illustrative depiction as follows: electronically receiving the selection information at least in part identifying the one or more selected ingestible products (e.g. including sandwiches, snack bars, full course meals, deserts, drinks, side dishes, medications, and/or etc.) being subject to ingestion by the one or more particular individual living beings, the selection information electronically received via the electronically enabled input including via electronic keypad entry (e.g. including an implementation of the receiver component s528 is configured to electronically engage with the keypad component s308 to receive the selection information to be used by the processor component s102, and/or etc.).

In one or more implementations, as shown in FIG. 144, operation o11 includes an operation o1177 for the electronically receiving the user status information and the electronically receiving the selection information at least in part to electronically obtain the treatment instructional information via at least in part electronic retrieval from one or more electronic databases regarding the one or more subsequent ingestible substrate structure directed energy operations. Origination of an illustratively derived obtain instructional database component group can be accomplished through skilled in the art design choice selection of one or more of the above depicted components from one or more of the above depicted subsystems shown in FIG. 18. Components from the obtain instructional database component group can be used in implementing execution of the one or more obtain instructional database instructions i1177 of FIG. 107, can be used in performance of the obtain instructional database electrical circuitry arrangement e1177 of FIG. 100, and/or can be used in otherwise fulfillment of the operation o1177. An exemplary non-transitory signal bearing medium version of the information storage subsystem s200 is depicted in FIG. 107 as bearing the one or more obtain instructional database instructions i1177 that when executed will direct performance of the operation o1177. Furthermore, the obtain instructional database electrical circuitry arrangement ("elec circ arrange") e1177, when activated, will perform the operation o1177. Also, the obtain instructional database module m1177, when executed and/or activated, will direct performance of and/or perform the operation o1177. For instance, in one or more exemplary implementations, the one or more obtain instructional database instructions i1177, when executed, direct performance of the operation o1177 in the illustrative depiction as follows, and/or the obtain instructional database electrical circuitry arrangement e1177, when activated, performs the operation o1177 in the illustrative depiction as follows, and/or the obtain instructional database module m1177, when executed and/or activated, directs performance of and/or performs the operation o1177 in the illustrative depiction as follows, and/or the operation o1177 is otherwise carried out in the illustrative depiction as follows: the electronically receiving the user status information and the electronically receiving the selection information at least in part to electronically obtain the treatment instructional information via at least in part electronic retrieval from one or more electronic databases (e.g. including an implementation of the receiver component s528 is configured to electronically engage with the electromagnetic sensing component s402 to receive the selection information to be used by the processor component s102, and/or etc.) regarding the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.).

In one or more implementations, as shown in FIG. 144, operation o11 includes an operation o1178 for the electronically receiving the user status information and the electronically receiving the selection information at least in part to electronically obtain the treatment instructional information via at least in part one or more electronic computational devices regarding the one or more subsequent ingestible substrate structure directed energy operations. Origination of an illustratively derived obtain instructional computational component group can be accomplished through skilled in the art design choice selection of one or more of the above depicted components from one or more of the above depicted subsystems shown in FIG. 18. Components from the obtain instructional computational component group can be used in implementing execution of the one or more obtain instructional computational instructions i1178 of FIG. 107, can be used in performance of the obtain instructional computational electrical circuitry arrangement e1178 of FIG. 100, and/or can be used in otherwise fulfillment of the operation o1178. An exemplary non-transitory signal bearing medium version of the information storage subsystem s200 is depicted in FIG. 107 as bearing the one or more obtain instructional computational instructions i1178 that when executed will direct performance of the operation o1178. Furthermore, the obtain instructional computational electrical circuitry arrangement ("elec circ arrange") e1178, when activated, will perform the operation o1178. Also, the obtain instructional computational module m1178, when executed and/or activated, will direct performance of and/or perform the operation o1178. For instance, in one or more exemplary implementations, the one or more obtain instructional computational instructions i1178, when executed, direct performance of the operation o1178 in the illustrative depiction as follows, and/or the obtain instructional computational electrical circuitry arrangement e1178, when activated, performs the operation o1178 in the illustrative depiction as follows, and/or the obtain instructional computational module m1178, when executed and/or activated, directs performance of and/or performs the operation o1178 in the illustrative depiction as follows, and/or the operation o1178 is otherwise carried out in the illustrative depiction as follows: the electronically receiving the user status information and the electronically receiving the selection information at least in part to electronically obtain the treatment instructional information via at least in part one or more electronic computational devices (e.g. including an implementation of the receiver component s528 is configured to electronically engage with the encrypted communication component s520 to receive the selection information to be used by the processor component s102, and/or etc.) regarding the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.).

In one or more implementations, as shown in FIG. 145, operation o11 includes an operation o1179 for the electronically receiving the user status information and the electronically receiving the selection information at least in part to electronically obtain the treatment instructional information via at least in part one or more electronic storage devices regarding the one or more subsequent ingestible substrate structure directed energy operations. Origination of an illustratively derived obtain instructional storage component group can be accomplished through skilled in the art design choice selection of one or more of the above depicted components from one or more of the above depicted subsystems shown in FIG. 18. Components from the obtain instructional storage component group can be used in implementing execution of the one or more obtain instructional storage instructions i1179 of FIG. 107, can be used in performance of the obtain instructional storage electrical circuitry arrangement e1179 of FIG. 100, and/or can be used in otherwise fulfillment of the operation o1179. An exemplary non-transitory signal bearing medium version of the information storage subsystem s200 is depicted in FIG. 107 as bearing the one or more obtain instructional storage instructions i1179 that when executed will direct performance of the operation o1179. Furthermore, the obtain instructional storage electrical circuitry arrangement ("elec circ arrange") e1179, when activated, will perform the operation o1179. Also, the obtain instructional storage module m1179, when executed and/or activated, will direct performance of and/or perform the operation o1179. For instance, in one or more exemplary implementations, the one or more obtain instructional storage instructions i1179, when executed, direct performance of the operation o1179 in the illustrative depiction as follows, and/or the obtain instructional storage electrical circuitry arrangement e1179, when activated, performs the operation o1179 in the illustrative depiction as follows, and/or the obtain instructional storage module m1179, when executed and/or activated, directs performance of and/or performs the operation o1179 in the illustrative depiction as follows, and/or the operation o1179 is otherwise carried out in the illustrative depiction as follows: the electronically receiving the user status information and the electronically receiving the selection information at least in part to electronically obtain the treatment instructional information via at least in part one or more electronic storage devices (e.g. including an implementation of the receiver component s528 is configured to electronically engage with one or more components of the information storage subsystem s200, such as the server component s230, to receive the selection information to be used by the processor component s102, and/or etc.) regarding the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.).

In one or more implementations, as shown in FIG. 145, operation o11 includes an operation o1180 for electronically obtaining the treatment instructional information regarding the one or more subsequent ingestible substrate structure directed energy operations including directing energy in laser form to treat the one or more portions of the one or more ingestible substrate structures. Origination of an illustratively derived obtain instructional laser component group can be accomplished through skilled in the art design choice selection of one or more of the above depicted components from one or more of the above depicted subsystems shown in FIG. 18. Components from the obtain instructional laser component group can be used in implementing execution of the one or more obtain instructional laser instructions i1180 of FIG. 108, can be used in performance of the obtain instructional laser electrical circuitry arrangement e1180 of FIG. 101, and/or can be used in otherwise fulfillment of the operation o1180. An exemplary non-transitory signal bearing medium version of the information storage subsystem s200 is depicted in FIG. 108 as bearing the one or more obtain instructional laser instructions i1180 that when executed will direct performance of the operation o1180. Furthermore, the obtain instructional laser electrical circuitry arrangement ("elec circ arrange") e1180, when activated, will perform the operation o1180. Also, the obtain instructional laser module m1180, when executed and/or activated, will direct performance of and/or perform the operation o1180. For instance, in one or more exemplary implementations, the one or more obtain instructional laser instructions i1180, when executed, direct performance of the operation o1180 in the illustrative depiction as follows, and/or the obtain instructional laser electrical circuitry arrangement e1180, when activated, performs the operation o1180 in the illustrative depiction as follows, and/or the obtain instructional laser module m1180, when executed and/or activated, directs performance of and/or performs the operation o1180 in the illustrative depiction as follows, and/or the operation o1180 is otherwise carried out in the illustrative depiction as follows: electronically obtaining the treatment instructional information (e.g. information including location, direction, number and type of parts and order of assembly, and/or etc.) regarding the one or more subsequent ingestible substrate structure duct operations including flowing one or more fluids through one or more ducts located internally within one or more portions of the one or more ingestible substrate structures (e.g. one or more pins, nails, and/or etc.) to treat (including processing, changing, modifying, supplementing, refining, amplifying, enhancing, acting upon, exposing, reacting with, integrating with, and/or etc.) the one or more portions of the one or more ingestible substrate structures (e.g. including projection surfaces of food products, and/or etc.).

In one or more implementations, as shown in FIG. 145, operation o11 includes an operation o1181 for electronically obtaining the treatment instructional information regarding the one or more subsequent ingestible substrate structure directed energy operations including directing energy in microwave form to treat one or more portions of the one or more ingestible substrate structures. Origination of an illustratively derived obtain instructional microwave component group can be accomplished through skilled in the art design choice selection of one or more of the above depicted components from one or more of the above depicted subsystems shown in FIG. 18. Components from the obtain instructional microwave component group can be used in implementing execution of the one or more obtain instructional microwave instructions i1181 of FIG. 108, can be used in performance of the obtain instructional microwave electrical circuitry arrangement e1181 of FIG. 101, and/or can be used in otherwise fulfillment of the operation o1181. An exemplary non-transitory signal bearing medium version of the information storage subsystem s200 is depicted in FIG. 108 as bearing the one or more obtain instructional microwave instructions i1181 that when executed will direct performance of the operation o1181. Furthermore, the obtain instructional microwave electrical circuitry arrangement ("elec circ arrange") e1181, when activated, will perform the operation o1181. Also, the obtain instructional microwave module m1181, when executed and/or activated, will direct performance of and/or perform the operation o1181. For instance, in one or more exemplary implementations, the one or more obtain instructional microwave instructions i1181, when executed, direct performance of the operation o1181 in the illustrative depiction as follows, and/or the obtain instructional microwave electrical circuitry arrangement e1181, when activated, performs the operation o1181 in the illustrative depiction as follows, and/or the obtain instructional microwave module m1181, when executed and/or activated, directs performance of and/or performs the operation o1181 in the illustrative depiction as follows, and/or the operation o1181 is otherwise carried out in the illustrative depiction as follows: electronically obtaining the treatment instructional information regarding the one or more subsequent ingestible substrate structure duct operations including flowing one or more fluids through one or more ducts having one or more linear surfaces (e.g. including one or more channel, raceway, or wire-like surfaces, and/or etc.) to treat (including processing, changing, modifying, supplementing, refining, amplifying, enhancing, acting upon, exposing, reacting with, integrating with, and/or etc.) one or more portions of the one or more ingestible substrate structures (e.g. including one or more external surfaces of the one or more ingestible substrate structures, and/or etc.).

In one or more implementations, as shown in FIG. 146, operation o11 includes an operation o1182 for electronically obtaining the treatment instructional information regarding the one or more subsequent ingestible substrate structure directed energy operations including directing energy in acoustic form to treat one or more portions of the one or more ingestible substrate structures. Origination of an illustratively derived obtain instructional acoustic component group can be accomplished through skilled in the art design choice selection of one or more of the above depicted components from one or more of the above depicted subsystems shown in FIG. 18. Components from the obtain instructional acoustic component group can be used in implementing execution of the one or more obtain instructional acoustic instructions i1182 of FIG. 108, can be used in performance of the obtain instructional acoustic electrical circuitry arrangement e1182 of FIG. 101, and/or can be used in otherwise fulfillment of the operation o1182. An exemplary non-transitory signal bearing medium version of the information storage subsystem s200 is depicted in FIG. 108 as bearing the one or more obtain instructional acoustic instructions i1182 that when executed will direct performance of the operation o1182. Furthermore, the obtain instructional acoustic electrical circuitry arrangement ("elec circ arrange") e1182, when activated, will perform the operation o1182. Also, the obtain instructional acoustic module m1182, when executed and/or activated, will direct performance of and/or perform the operation o1182. For instance, in one or more exemplary implementations, the one or more obtain instructional acoustic instructions i1182, when executed, direct performance of the operation o1182 in the illustrative depiction as follows, and/or the obtain instructional acoustic electrical circuitry arrangement e1182, when activated, performs the operation o1182 in the illustrative depiction as follows, and/or the obtain instructional acoustic module m1182, when executed and/or activated, directs performance of and/or performs the operation o1182 in the illustrative depiction as follows, and/or the operation o1182 is otherwise carried out in the illustrative depiction as follows: electronically obtaining the treatment instructional information regarding the one or more subsequent ingestible substrate structure duct operations including flowing one or more fluids through one or more ducts having one or more dissolvable surfaces (e.g. including one or more ingestible pieces with substantially flat surfaces, and/or etc.) to treat (including processing, changing, modifying, supplementing, refining, amplifying, enhancing, acting upon, exposing, reacting with, integrating with, and/or etc.) one or more portions of the one or more ingestible substrate structures (e.g. including one or more external surfaces of the one or more portions of the one or more ingestible substrate structures, and/or etc.).

In one or more implementations, as shown in FIG. 146, operation o11 includes an operation o1183 for electronically obtaining the treatment instructional information regarding the one or more subsequent ingestible substrate structure directed energy operations including directing energy in radiant form to treat one or more portions of the one or more ingestible substrate structures. Origination of an illustratively derived obtain instructional radiant component group can be accomplished through skilled in the art design choice selection of one or more of the above depicted components from one or more of the above depicted subsystems shown in FIG. 18. Components from the obtain instructional radiant component group can be used in implementing execution of the one or more obtain instructional radiant instructions i1183 of FIG. 108, can be used in performance of the obtain instructional radiant electrical circuitry arrangement e1183 of FIG. 101, and/or can be used in otherwise fulfillment of the operation o1183. An exemplary non-transitory signal bearing medium version of the information storage subsystem s200 is depicted in FIG. 108 as bearing the one or more obtain instructional radiant instructions i1183 that when executed will direct performance of the operation o1183. Furthermore, the obtain instructional radiant electrical circuitry arrangement ("elec circ arrange") e1183, when activated, will perform the operation o1183. Also, the obtain instructional radiant module m1183, when executed and/or activated, will direct performance of and/or perform the operation o1183. For instance, in one or more exemplary implementations, the one or more obtain instructional radiant instructions i1183, when executed, direct performance of the operation o1183 in the illustrative depiction as follows, and/or the obtain instructional radiant electrical circuitry arrangement e1183, when activated, performs the operation o1183 in the illustrative depiction as follows, and/or the obtain instructional radiant module m1183, when executed and/or activated, directs performance of and/or performs the operation o1183 in the illustrative depiction as follows, and/or the operation o1183 is otherwise carried out in the illustrative depiction as follows: electronically obtaining the treatment instructional information regarding the one or more subsequent ingestible substrate structure duct operations including flowing one or more fluids through one or more ducts having one or more cylindrical surfaces (e.g. including one or more ingestible pieces with substantially cylindrical surfaces, and/or etc.) to treat (including processing, changing, modifying, supplementing, refining, amplifying, enhancing, acting upon, exposing, reacting with, integrating with, and/or etc.) one or more portions of the one or more ingestible substrate structures (e.g. including one or more external surfaces of the one or more portions of the one or more ingestible substrate structures, and/or etc.).

In one or more implementations, as shown in FIG. 146, operation o11 includes an operation o1184 for electronically obtaining the treatment instructional information regarding the one or more subsequent ingestible substrate structure directed energy operations including directing energy in focused form to treat one or more portions of the one or more ingestible substrate structures. Origination of an illustratively derived obtain instructional focused component group can be accomplished through skilled in the art design choice selection of one or more of the above depicted components from one or more of the above depicted subsystems shown in FIG. 18. Components from the obtain instructional focused component group can be used in implementing execution of the one or more obtain instructional focused instructions i1184 of FIG. 108, can be used in performance of the obtain instructional focused electrical circuitry arrangement e1184 of FIG. 101, and/or can be used in otherwise fulfillment of the operation o1184. An exemplary non-transitory signal bearing medium version of the information storage subsystem s200 is depicted in FIG. 108 as bearing the one or more obtain instructional focused instructions i1184 that when executed will direct performance of the operation o1184. Furthermore, the obtain instructional focused electrical circuitry arrangement ("elec circ arrange") e1184, when activated, will perform the operation o1184. Also, the obtain instructional focused module m1184, when executed and/or activated, will direct performance of and/or perform the operation o1184. For instance, in one or more exemplary implementations, the one or more obtain instructional focused instructions i1184, when executed, direct performance of the operation o1184 in the illustrative depiction as follows, and/or the obtain instructional focused electrical circuitry arrangement e1184, when activated, performs the operation o1184 in the illustrative depiction as follows, and/or the obtain instructional focused module m1184, when executed and/or activated, directs performance of and/or performs the operation o1184 in the illustrative depiction as follows, and/or the operation o1184 is otherwise carried out in the illustrative depiction as follows: electronically obtaining the treatment instructional information regarding the one or more subsequent ingestible substrate structure duct operations including flowing one or more fluids through one or more ducts having one or more removable surfaces (e.g. including one or more pieces with one or more matrices of ingestible pieces having structures such as rods, pins, and/or etc.) to treat (including processing, changing, modifying, supplementing, refining, amplifying, enhancing, acting upon, exposing, reacting with, integrating with, and/or etc.) one or more portions of the one or more ingestible substrate structures (e.g. including one or more external surfaces of the one or more portions of the one or more ingestible substrate structures, and/or etc.).

In one or more implementations, as shown in FIG. 147, operation o11 includes an operation o1185 for electronically obtaining the treatment instructional information regarding the one or more subsequent ingestible substrate structure directed energy operations including directing energy in patterned form to treat one or more portions of the one or more ingestible substrate structures. Origination of an illustratively derived obtain instructional patterned component group can be accomplished through skilled in the art design choice selection of one or more of the above depicted components from one or more of the above depicted subsystems shown in FIG. 18. Components from the obtain instructional patterned component group can be used in implementing execution of the one or more obtain instructional patterned instructions i1185 of FIG. 108, can be used in performance of the obtain instructional patterned electrical circuitry arrangement e1185 of FIG. 101, and/or can be used in otherwise fulfillment of the operation o1185. An exemplary non-transitory signal bearing medium version of the information storage subsystem s200 is depicted in FIG. 108 as bearing the one or more obtain instructional patterned instructions i1185 that when executed will direct performance of the operation o1185. Furthermore, the obtain instructional patterned electrical circuitry arrangement ("elec circ arrange") e1185, when activated, will perform the operation o1185. Also, the obtain instructional patterned module m1185, when executed and/or activated, will direct performance of and/or perform the operation o1185. For instance, in one or more exemplary implementations, the one or more obtain instructional patterned instructions i1185, when executed, direct performance of the operation o1185 in the illustrative depiction as follows, and/or the obtain instructional patterned electrical circuitry arrangement e1185, when activated, performs the operation o1185 in the illustrative depiction as follows, and/or the obtain instructional patterned module m1185, when executed and/or activated, directs performance of and/or performs the operation o1185 in the illustrative depiction as follows, and/or the operation o1185 is otherwise carried out in the illustrative depiction as follows: electronically obtaining the treatment instructional information regarding the one or more subsequent ingestible substrate structure duct operations including flowing one or more fluids through one or more ducts having one or more curvilinear surfaces (e.g. including ingestible pieces with one or more substantially straight surfaces, such as rod, rule, and/or etc.) to treat (including processing, changing, modifying, supplementing, refining, amplifying, enhancing, acting upon, exposing, reacting with, integrating with, and/or etc.) one or more portions of the one or more ingestible substrate structures (e.g. including one or more external surfaces of the one or more portions of the one or more ingestible substrate structures, and/or etc.).

In one or more implementations, as shown in FIG. 147, operation o11 includes an operation o1186 for electronically obtaining the treatment instructional information regarding the one or more subsequent ingestible substrate structure directed energy operations to treat at least a portion of the one or more ingestible substrate structures including one or more ingestible substrate bar structures. Origination of an illustratively derived obtain instructional bar component group can be accomplished through skilled in the art design choice selection of one or more of the above depicted components from one or more of the above depicted subsystems shown in FIG. 18. Components from the obtain instructional bar component group can be used in implementing execution of the one or more obtain instructional bar instructions i1186 of FIG. 108, can be used in performance of the obtain instructional bar electrical circuitry arrangement e1186 of FIG. 101, and/or can be used in otherwise fulfillment of the operation o1186. An exemplary non-transitory signal bearing medium version of the information storage subsystem s200 is depicted in FIG. 108 as bearing the one or more obtain instructional bar instructions i1186 that when executed will direct performance of the operation o1186. Furthermore, the obtain instructional bar electrical circuitry arrangement ("elec circ arrange") e1186, when activated, will perform the operation o1186. Also, the obtain instructional bar module m1186, when executed and/or activated, will direct performance of and/or perform the operation o1186. For instance, in one or more exemplary implementations, the one or more obtain instructional bar instructions i1186, when executed, direct performance of the operation o1186 in the illustrative depiction as follows, and/or the obtain instructional bar electrical circuitry arrangement e1186, when activated, performs the operation o1186 in the illustrative depiction as follows, and/or the obtain instructional bar module m1186, when executed and/or activated, directs performance of and/or performs the operation o1186 in the illustrative depiction as follows, and/or the operation o1186 is otherwise carried out in the illustrative depiction as follows: electronically obtaining the treatment instructional information regarding the one or more subsequent ingestible substrate structure duct operations to treat (including processing, changing, modifying, supplementing, refining, amplifying, enhancing, acting upon, exposing, reacting with, integrating with, and/or etc.) at least a portion of the one or more ingestible substrate structures including one or more ingestible substrate bar structures (e.g. including rectangular shaped bars, and/or etc.).

In one or more implementations, as shown in FIG. 147, operation o11 includes an operation o1187 for electronically obtaining the treatment instructional information regarding the one or more subsequent ingestible substrate structure directed energy operations to treat at least a portion of the one or more ingestible substrate structures including one or more ingestible substrate rod structures. Origination of an illustratively derived obtain instructional rod component group can be accomplished through skilled in the art design choice selection of one or more of the above depicted components from one or more of the above depicted subsystems shown in FIG. 18. Components from the obtain instructional rod component group can be used in implementing execution of the one or more obtain instructional rod instructions i1187 of FIG. 108, can be used in performance of the obtain instructional rod electrical circuitry arrangement e1187 of FIG. 101, and/or can be used in otherwise fulfillment of the operation o1187. An exemplary non-transitory signal bearing medium version of the information storage subsystem s200 is depicted in FIG. 108 as bearing the one or more obtain instructional rod instructions i1187 that when executed will direct performance of the operation o1187. Furthermore, the obtain instructional rod electrical circuitry arrangement ("elec circ arrange") e1187, when activated, will perform the operation o1187. Also, the obtain instructional rod module m1187, when executed and/or activated, will direct performance of and/or perform the operation o1187. For instance, in one or more exemplary implementations, the one or more obtain instructional rod instructions i1187, when executed, direct performance of the operation o1187 in the illustrative depiction as follows, and/or the obtain instructional rod electrical circuitry arrangement e1187, when activated, performs the operation o1187 in the illustrative depiction as follows, and/or the obtain instructional rod module m1187, when executed and/or activated, directs performance of and/or performs the operation o1187 in the illustrative depiction as follows, and/or the operation o1187 is otherwise carried out in the illustrative depiction as follows: electronically obtaining the treatment instructional information regarding the one or more subsequent ingestible substrate structure duct operations to treat (including processing, changing, modifying, supplementing, refining, amplifying, enhancing, acting upon, exposing, reacting with, integrating with, and/or etc.) at least a portion of the one or more ingestible substrate structures including one or more ingestible substrate rod structures (e.g. including pretzel sticks, and/or etc.).

In one or more implementations, as shown in FIG. 148, operation o11 includes an operation o1188 for electronically obtaining the treatment instructional information regarding the one or more subsequent ingestible substrate structure directed energy operations to treat at least a portion of the one or more ingestible substrate structures including one or more ingestible substrate wafer structures. Origination of an illustratively derived obtain instructional wafer component group can be accomplished through skilled in the art design choice selection of one or more of the above depicted components from one or more of the above depicted subsystems shown in FIG. 18. Components from the obtain instructional wafer component group can be used in implementing execution of the one or more obtain instructional wafer instructions i1188 of FIG. 108, can be used in performance of the obtain instructional wafer electrical circuitry arrangement e1188 of FIG. 101, and/or can be used in otherwise fulfillment of the operation o1188. An exemplary non-transitory signal bearing medium version of the information storage subsystem s200 is depicted in FIG. 108 as bearing the one or more obtain instructional wafer instructions i1188 that when executed will direct performance of the operation o1188. Furthermore, the obtain instructional wafer electrical circuitry arrangement ("elec circ arrange") e1188, when activated, will perform the operation o1188. Also, the obtain instructional wafer module m1188, when executed and/or activated, will direct performance of and/or perform the operation o1188. For instance, in one or more exemplary implementations, the one or more obtain instructional wafer instructions i1188, when executed, direct performance of the operation o1188 in the illustrative depiction as follows, and/or the obtain instructional wafer electrical circuitry arrangement e1188, when activated, performs the operation o1188 in the illustrative depiction as follows, and/or the obtain instructional wafer module m1188, when executed and/or activated, directs performance of and/or performs the operation o1188 in the illustrative depiction as follows, and/or the operation o1188 is otherwise carried out in the illustrative depiction as follows: electronically obtaining the treatment instructional information regarding the one or more subsequent ingestible substrate structure duct operations to treat (including processing, changing, modifying, supplementing, refining, amplifying, enhancing, acting upon, exposing, reacting with, integrating with, and/or etc.) at least a portion of the one or more ingestible substrate structures including one or more ingestible substrate wafer structures (e.g. including cookie textured structures, and/or etc.).

In one or more implementations, as shown in FIG. 148, operation o11 includes an operation o1189 for electronically obtaining the treatment instructional information regarding the one or more subsequent ingestible substrate structure directed energy operations to treat at least a portion of the one or more ingestible substrate structures including one or more ingestible substrate pasta structures. Origination of an illustratively derived obtain instructional pasta component group can be accomplished through skilled in the art design choice selection of one or more of the above depicted components from one or more of the above depicted subsystems shown in FIG. 18. Components from the obtain instructional pasta component group can be used in implementing execution of the one or more obtain instructional pasta instructions i1189 of FIG. 108, can be used in performance of the obtain instructional pasta electrical circuitry arrangement e1189 of FIG. 101, and/or can be used in otherwise fulfillment of the operation o1189. An exemplary non-transitory signal bearing medium version of the information storage subsystem s200 is depicted in FIG. 108 as bearing the one or more obtain instructional pasta instructions i1189 that when executed will direct performance of the operation o1189. Furthermore, the obtain instructional pasta electrical circuitry arrangement ("elec circ arrange") e1189, when activated, will perform the operation o1189. Also, the obtain instructional pasta module m1189, when executed and/or activated, will direct performance of and/or perform the operation o1189. For instance, in one or more exemplary implementations, the one or more obtain instructional pasta instructions i1189, when executed, direct performance of the operation o1189 in the illustrative depiction as follows, and/or the obtain instructional pasta electrical circuitry arrangement e1189, when activated, performs the operation o1189 in the illustrative depiction as follows, and/or the obtain instructional pasta module m1189, when executed and/or activated, directs performance of and/or performs the operation o1189 in the illustrative depiction as follows, and/or the operation o1189 is otherwise carried out in the illustrative depiction as follows: electronically obtaining the treatment instructional information regarding the one or more subsequent ingestible substrate structure duct operations to treat (including processing, changing, modifying, supplementing, refining, amplifying, enhancing, acting upon, exposing, reacting with, integrating with, and/or etc.) at least a portion of the one or more ingestible substrate structures including one or more ingestible substrate pasta structures (e.g. including noodle structures, and/or etc.).

In one or more implementations, as shown in FIG. 148, operation o11 includes an operation o1190 for electronically obtaining the treatment instructional information regarding the one or more subsequent ingestible substrate structure directed energy operations to treat at least a portion of the one or more ingestible substrate structures including one or more ingestible substrate emulsion structures. Origination of an illustratively derived obtain instructional emulsion component group can be accomplished through skilled in the art design choice selection of one or more of the above depicted components from one or more of the above depicted subsystems shown in FIG. 18. Components from the obtain instructional emulsion component group can be used in implementing execution of the one or more obtain instructional emulsion instructions i1190 of FIG. 108, can be used in performance of the obtain instructional emulsion electrical circuitry arrangement e1190 of FIG. 101, and/or can be used in otherwise fulfillment of the operation o1190. An exemplary non-transitory signal bearing medium version of the information storage subsystem s200 is depicted in FIG. 108 as bearing the one or more obtain instructional emulsion instructions i1190 that when executed will direct performance of the operation o1190. Furthermore, the obtain instructional emulsion electrical circuitry arrangement ("elec circ arrange") e1190, when activated, will perform the operation o1190. Also, the obtain instructional emulsion module m1190, when executed and/or activated, will direct performance of and/or perform the operation o1190. For instance, in one or more exemplary implementations, the one or more obtain instructional emulsion instructions i1190, when executed, direct performance of the operation o1190 in the illustrative depiction as follows, and/or the obtain instructional emulsion electrical circuitry arrangement e1190, when activated, performs the operation o1190 in the illustrative depiction as follows, and/or the obtain instructional emulsion module m1190, when executed and/or activated, directs performance of and/or performs the operation o1190 in the illustrative depiction as follows, and/or the operation o1190 is otherwise carried out in the illustrative depiction as follows: electronically obtaining the treatment instructional information regarding the one or more subsequent ingestible substrate structure duct operations to treat (including processing, changing, modifying, supplementing, refining, amplifying, enhancing, acting upon, exposing, reacting with, integrating with, and/or etc.) at least a portion of the one or more ingestible substrate structures including one or more ingestible substrate emulsion structures (e.g. including a substrate incorporating o11 and vinegar, and/or etc.).

In one or more implementations, as shown in FIG. 149, operation o11 includes an operation o1191 for electronically obtaining the treatment instructional information regarding the one or more subsequent ingestible substrate structure directed energy operations to treat at least a portion of the one or more ingestible substrate structures including one or more ingestible substrate sheet structures. Origination of an illustratively derived obtain instructional sheet component group can be accomplished through skilled in the art design choice selection of one or more of the above depicted components from one or more of the above depicted subsystems shown in FIG. 18. Components from the obtain instructional sheet component group can be used in implementing execution of the one or more obtain instructional sheet instructions i1191 of FIG. 108, can be used in performance of the obtain instructional sheet electrical circuitry arrangement e1191 of FIG. 101, and/or can be used in otherwise fulfillment of the operation o1191. An exemplary non-transitory signal bearing medium version of the information storage subsystem s200 is depicted in FIG. 108 as bearing the one or more obtain instructional sheet instructions i1191 that when executed will direct performance of the operation o1191. Furthermore, the obtain instructional sheet electrical circuitry arrangement ("elec circ arrange") e1191, when activated, will perform the operation o1191. Also, the obtain instructional sheet module m1191, when executed and/or activated, will direct performance of and/or perform the operation o1191. For instance, in one or more exemplary implementations, the one or more obtain instructional sheet instructions i1191, when executed, direct performance of the operation o1191 in the illustrative depiction as follows, and/or the obtain instructional sheet electrical circuitry arrangement e1191, when activated, performs the operation o1191 in the illustrative depiction as follows, and/or the obtain instructional sheet module m1191, when executed and/or activated, directs performance of and/or performs the operation o1191 in the illustrative depiction as follows, and/or the operation o1191 is otherwise carried out in the illustrative depiction as follows: electronically obtaining the treatment instructional information regarding the one or more subsequent ingestible substrate structure duct operations to treat (including processing, changing, modifying, supplementing, refining, amplifying, enhancing, acting upon, exposing, reacting with, integrating with, and/or etc.) at least a portion of the one or more ingestible substrate structures including one or more ingestible substrate sheet structures (e.g. including cake layers, and/or etc.).

In one or more implementations, as shown in FIG. 149, operation o11 includes an operation o1192 for electronically obtaining the treatment instructional information regarding the one or more subsequent ingestible substrate structure directed energy operations to treat at least a portion of the one or more ingestible substrate structures including one or more ingestible substrate liquid structures. Origination of an illustratively derived obtain instructional liquid component group can be accomplished through skilled in the art design choice selection of one or more of the above depicted components from one or more of the above depicted subsystems shown in FIG. 18. Components from the obtain instructional liquid component group can be used in implementing execution of the one or more obtain instructional liquid instructions i1192 of FIG. 108, can be used in performance of the obtain instructional liquid electrical circuitry arrangement e1192 of FIG. 101, and/or can be used in otherwise fulfillment of the operation o1192. An exemplary non-transitory signal bearing medium version of the information storage subsystem s200 is depicted in FIG. 108 as bearing the one or more obtain instructional liquid instructions i1192 that when executed will direct performance of the operation o1192. Furthermore, the obtain instructional liquid electrical circuitry arrangement ("elec circ arrange") e1192, when activated, will perform the operation o1192. Also, the obtain instructional liquid module m1192, when executed and/or activated, will direct performance of and/or perform the operation o1192. For instance, in one or more exemplary implementations, the one or more obtain instructional liquid instructions i1192, when executed, direct performance of the operation o1192 in the illustrative depiction as follows, and/or the obtain instructional liquid electrical circuitry arrangement e1192, when activated, performs the operation o1192 in the illustrative depiction as follows, and/or the obtain instructional liquid module m1192, when executed and/or activated, directs performance of and/or performs the operation o1192 in the illustrative depiction as follows, and/or the operation o1192 is otherwise carried out in the illustrative depiction as follows: electronically obtaining the treatment instructional information regarding the one or more subsequent ingestible substrate structure duct operations to treat (including processing, changing, modifying, supplementing, refining, amplifying, enhancing, acting upon, exposing, reacting with, integrating with, and/or etc.) at least a portion of the one or more ingestible substrate structures including one or more ingestible substrate liquid structures (e.g. including smoothie ingredients, and/or etc.).

As shown in FIG. 118, the operational flow o10 proceeds to operation o12 for electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products. An exemplary version of a non-transitory signal bearing medium of information storage subsystem s200 is depicted as bearing one or more controlling treatment instructions i12 that when executed will direct performance of the operation o12. In an implementation, the one or more controlling treatment instructions i12 when executed direct electronically directing control (e.g. including the microprocessor component s102 can direct control, and/or etc.) of at least partial treatment (e.g. including ingestible parts assembly treatment assembly various ingestible parts to form at least in part one or more ingestible substrate structures, and/or etc.) of the one or more portions of the one or more ingestible substrate structures (e.g. including rods, pasta, wafers, and/or etc.) according to the treatment instructional information (e.g. including treatment steps, and/or etc.) regarding the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) including flowing one or more fluids through one or more ducts (including tubes, channels, conduits, raceways, piping, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures (e.g. including cones, semi-spheres, rectangles, girders, and/or etc.) to form (e.g. including assemble fabricate, layer, make, and/or etc.) at least in part the one or more selected ingestible products (e.g. including snacks, meals, sandwiches, smoothies, medications and/or etc.) subsequent to and based at least in part upon the electronically receiving (e.g. including through wireless, network, direct electrical connection, packets, and/or etc.) the user status information (e.g. including identification, memberships, and/or etc.) regarding the one or more particular individual living beings (e.g. including children, adults, retired, and/or etc.) and the electronically receiving (e.g. including wired reception, and/or etc.) the selection information (e.g. including meal selection, and/or etc.) at least in part identifying (e.g. including titles, names, serial numbers, and/or etc.) the one or more selected ingestible products (e.g. including full meals, European dishes, Asian dishes, Mexican dishes, South American dishes, American dishes, and/or etc.). Furthermore, the controlling treatment electrical circuitry arrangement e12 when activated will perform the operation o12. Also, the controlling treatment module m12, when executed and/or activated, will direct performance of and/or perform the operation o12. In an implementation, the controlling treatment electrical circuitry arrangement e12, when activated performs the operation o12 in the illustrative depiction as follows, and/or the controlling treatment module m12, when executed and/or activated, directs performance of and/or performs electronically directing control (e.g. including the microprocessor component s102 can direct control, and/or etc.) of at least partial treatment (e.g. including ingestible parts assembly treatment assembly various ingestible parts to form at least in part one or more ingestible substrate structures, and/or etc.) of the one or more portions of the one or more ingestible substrate structures (e.g. including rods, pasta, wafers, and/or etc.) according to the treatment instructional information (e.g. including treatment steps, and/or etc.) regarding the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) including flowing one or more fluids through one or more ducts (including tubes, channels, conduits, raceways, piping, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures (e.g. including cones, semi-spheres, rectangles, girders, and/or etc.) to form (e.g. including assemble fabricate, layer, make, and/or etc.) at least in part the one or more selected ingestible products (e.g. including snacks, meals, sandwiches, smoothies, medications and/or etc.) subsequent to and based at least in part upon the electronically receiving (e.g. including through wireless, network, direct electrical connection, packets, and/or etc.) the user status information (e.g. including identification, memberships, and/or etc.) regarding the one or more particular individual living beings (e.g. including children, adults, retired, and/or etc.) and the electronically receiving (e.g. including wired reception, and/or etc.) the selection information (e.g. including meal selection, and/or etc.) at least in part identifying (e.g. including titles, names, serial numbers, and/or etc.) the one or more selected ingestible products (e.g. including full meals, European dishes, Asian dishes, Mexican dishes, South American dishes, American dishes, and/or etc.). In an implementation, the electronically directing control of at least partial treatment of the one or more portions of the one or more ingestible substrate structures according to the treatment instructional information regarding the one or more subsequent ingestible substrate structure directed energy operations including directing energy to treat at least in part the one or more portions of the one or more ingestible substrate structures to form at least in part the one or more selected ingestible products subsequent to and based at least in part upon the electronically receiving the user status information regarding the one or more particular individual living beings and the electronically receiving the selection information at least in part identifying the one or more selected ingestible products is carried out by electronically directing control (e.g. including the microprocessor component s102 can direct control, and/or etc.) of at least partial treatment (e.g. including ingestible parts assembly treatment assembly various ingestible parts to form at least in part one or more ingestible substrate structures, and/or etc.) of the one or more portions of the one or more ingestible substrate structures (e.g. including rods, pasta, wafers, and/or etc.) according to the treatment instructional information (e.g. including treatment steps, and/or etc.) regarding the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) including flowing one or more fluids through one or more ducts (including tubes, channels, conduits, raceways, piping, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures (e.g. including cones, semi-spheres, rectangles, girders, and/or etc.) to form (e.g. including assemble fabricate, layer, make, and/or etc.) at least in part the one or more selected ingestible products (e.g. including snacks, meals, sandwiches, smoothies, medications and/or etc.) subsequent to and based at least in part upon the electronically receiving (e.g. including through wireless, network, direct electrical connection, packets, and/or etc.) the user status information (e.g. including identification, memberships, and/or etc.) regarding the one or more particular individual living beings (e.g. including children, adults, retired, and/or etc.) and the electronically receiving (e.g. including wired reception, and/or etc.) the selection information (e.g. including meal selection, and/or etc.) at least in part identifying (e.g. including titles, names, serial numbers, and/or etc.) the one or more selected ingestible products (e.g. including full meals, European dishes, Asian dishes, Mexican dishes, South American dishes, American dishes, and/or etc.).

In one or more implementations, as shown in FIG. 150, operation o12 includes an operation o1201 for electronically directing control of the at least partial treatment of the one or more ingestible substrate structures according to the treatment instructional information regarding the one or more subsequent ingestible substrate structure directed energy operations via at least in part one or more directly connected electrical circuits. Origination of an illustratively derived direct treatment circuits component group can be accomplished through skilled in the art design choice selection of one or more of the above depicted components from one or more of the above depicted subsystems shown in FIG. 18. Components from the direct treatment circuits component group can be used in implementing execution of the one or more direct treatment circuits instructions i1201 of FIG. 109, can be used in performance of the direct treatment circuits electrical circuitry arrangement e1201 of FIG. 102, and/or can be used in otherwise fulfillment of the operation o1201. An exemplary non-transitory signal bearing medium version of the information storage subsystem s200 is depicted in FIG. 109 as bearing the one or more direct treatment circuits instructions i1201 that when executed will direct performance of the operation o1201. Furthermore, the direct treatment circuits electrical circuitry arrangement ("elec circ arrange") e1201, when activated, will perform the operation o1201. Also, the direct treatment circuits module m1201, when executed and/or activated, will direct performance of and/or perform the operation o1201. For instance, in one or more exemplary implementations, the one or more direct treatment circuits instructions i1201, when executed, direct performance of the operation o1201 in the illustrative depiction as follows, and/or the direct treatment circuits electrical circuitry arrangement e1201, when activated, performs the operation o1201 in the illustrative depiction as follows, and/or the direct treatment circuits module m1201, when executed and/or activated, directs performance of and/or performs the operation o1201 in the illustrative depiction as follows, and/or the operation o1201 is otherwise carried out in the illustrative depiction as follows: electronically directing control of the at least partial treatment of the one or more ingestible substrate structures according to the treatment instructional information regarding the one or more subsequent ingestible substrate structure duct operations via at least in part one or more directly connected electrical circuits (e.g. including an implementation of the processor component s102 is configured to electronically receive directing control through receiver component s528 electrically connected with the material processing subsystem 700 for treatment of the one or more ingestible products, and/or etc.).

In one or more implementations, as shown in FIG. 150, operation o12 includes an operation o1202 for electronically directing control of the at least partial treatment of the one or more ingestible substrate structures according to the treatment instructional information regarding the one or more subsequent ingestible substrate structure directed energy operations via at least in part electronic computer network communication. Origination of an illustratively derived direct treatment network component group can be accomplished through skilled in the art design choice selection of one or more of the above depicted components from one or more of the above depicted subsystems shown in FIG. 18. Components from the direct treatment network component group can be used in implementing execution of the one or more direct treatment network instructions i1202 of FIG. 109, can be used in performance of the direct treatment network electrical circuitry arrangement e1202 of FIG. 102, and/or can be used in otherwise fulfillment of the operation o1202. An exemplary non-transitory signal bearing medium version of the information storage subsystem s200 is depicted in FIG. 109 as bearing the one or more direct treatment network instructions i1202 that when executed will direct performance of the operation o1202. Furthermore, the direct treatment network electrical circuitry arrangement ("elec circ arrange") e1202, when activated, will perform the operation o1202. Also, the direct treatment network module m1202, when executed and/or activated, will direct performance of and/or perform the operation o1202. For instance, in one or more exemplary implementations, the one or more direct treatment network instructions i1202, when executed, direct performance of the operation o1202 in the illustrative depiction as follows, and/or the direct treatment network electrical circuitry arrangement e1202, when activated, performs the operation o1202 in the illustrative depiction as follows, and/or the direct treatment network module m1202, when executed and/or activated, directs performance of and/or performs the operation o1202 in the illustrative depiction as follows, and/or the operation o1202 is otherwise carried out in the illustrative depiction as follows: electronically directing control of the at least partial treatment of the one or more ingestible substrate structures according to the treatment instructional information regarding the one or more subsequent ingestible substrate structure duct operations via at least in part electronic computer network communication (e.g. including an implementation of the processor component s102 is configured to electronically receive directing control through internet network components s508 to control the material processing subsystem 700 for treatment of the one or more ingestible products, and/or etc.).

In one or more implementations, as shown in FIG. 150, operation o12 includes an operation o1203 for electronically directing control of the at least partial treatment of the one or more ingestible substrate structures through electronic circuitry located substantially adjacent to electronic circuitry for the electronically receiving the user status information and the electronically receiving the selection information. Origination of an illustratively derived direct treatment adjacent component group can be accomplished through skilled in the art design choice selection of one or more of the above depicted components from one or more of the above depicted subsystems shown in FIG. 18. Components from the direct treatment adjacent component group can be used in implementing execution of the one or more direct treatment adjacent instructions i1203 of FIG. 109, can be used in performance of the direct treatment adjacent electrical circuitry arrangement e1203 of FIG. 102, and/or can be used in otherwise fulfillment of the operation o1203. An exemplary non-transitory signal bearing medium version of the information storage subsystem s200 is depicted in FIG. 109 as bearing the one or more direct treatment adjacent instructions i1203 that when executed will direct performance of the operation o1203. Furthermore, the direct treatment adjacent electrical circuitry arrangement ("elec circ arrange") e1203, when activated, will perform the operation o1203. Also, the direct treatment adjacent module m1203, when executed and/or activated, will direct performance of and/or perform the operation o1203. For instance, in one or more exemplary implementations, the one or more direct treatment adjacent instructions i1203, when executed, direct performance of the operation o1203 in the illustrative depiction as follows, and/or the direct treatment adjacent electrical circuitry arrangement e1203, when activated, performs the operation o1203 in the illustrative depiction as follows, and/or the direct treatment adjacent module m1203, when executed and/or activated, directs performance of and/or performs the operation o1203 in the illustrative depiction as follows, and/or the operation o1203 is otherwise carried out in the illustrative depiction as follows: electronically directing control of the at least partial treatment of the one or more ingestible substrate structures through electronic circuitry (e.g. including a first electronic component of processing subsystem s100 such as the processor component s102, and/or etc.) located substantially adjacent to electronic circuitry (e.g. including a second electronic component of the processing subsystem s100 such as the CPU component s104, and/or etc.) for the electronically receiving the user status information and the electronically receiving the selection information.

In one or more implementations, as shown in FIG. 151, operation o12 includes an operation o1204 for electronically directing control of the one or more subsequent ingestible substrate structure directed energy operations to treat at least in part the one or more portions of the one or more ingestible substrate structures to influence at least in part one or more color properties of the one or more portions of the one or more ingestible substrate structures to form at least in part the one or more selected ingestible products. Origination of an illustratively derived direct modify color component group can be accomplished through skilled in the art design choice selection of one or more of the above depicted components from one or more of the above depicted subsystems shown in FIG. 18. Components from the direct modify color component group can be used in implementing execution of the one or more direct modify color instructions i1204 of FIG. 109, can be used in performance of the direct modify color electrical circuitry arrangement e1204 of FIG. 102, and/or can be used in otherwise fulfillment of the operation o1204. An exemplary non-transitory signal bearing medium version of the information storage subsystem s200 is depicted in FIG. 109 as bearing the one or more direct modify color instructions i1204 that when executed will direct performance of the operation o1204. Furthermore, the direct modify color electrical circuitry arrangement ("elec circ arrange") e1204, when activated, will perform the operation o1204. Also, the direct modify color module m1204, when executed and/or activated, will direct performance of and/or perform the operation o1204. For instance, in one or more exemplary implementations, the one or more direct modify color instructions i1204, when executed, direct performance of the operation o1204 in the illustrative depiction as follows, and/or the direct modify color electrical circuitry arrangement e1204, when activated, performs the operation o1204 in the illustrative depiction as follows, and/or the direct modify color module m1204, when executed and/or activated, directs performance of and/or performs the operation o1204 in the illustrative depiction as follows, and/or the operation o1204 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including replace, and/or etc.) one or more color properties (e.g. including increase intensity of existing surface color, and/or etc.) of the one or more portions of the one or more ingestible substrate structures (e.g. one or more rectangular structures, etc.) to form (e.g. including assemble fabricate, layer, make, and/or etc.) at least in part the one or more selected ingestible products.

In one or more implementations, as shown in FIG. 151, operation o12 includes an operation o1205 for electronically directing control of the one or more subsequent ingestible substrate structure directed energy operations at least in part the one or more portions of the one or more ingestible substrate structures to influence at least in part one or more surface texture properties of the one or more portions of the one or more ingestible substrate structures to form at least in part the one or more selected ingestible products. Origination of an illustratively derived direct modify surface component group can be accomplished through skilled in the art design choice selection of one or more of the above depicted components from one or more of the above depicted subsystems shown in FIG. 18. Components from the direct modify surface component group can be used in implementing execution of the one or more direct modify surface instructions i1205 of FIG. 109, can be used in performance of the direct modify surface electrical circuitry arrangement e1205 of FIG. 102, and/or can be used in otherwise fulfillment of the operation o1205. An exemplary non-transitory signal bearing medium version of the information storage subsystem s200 is depicted in FIG. 109 as bearing the one or more direct modify surface instructions i1205 that when executed will direct performance of the operation o1205. Furthermore, the direct modify surface electrical circuitry arrangement ("elec circ arrange") e1205, when activated, will perform the operation o1205. Also, the direct modify surface module m1205, when executed and/or activated, will direct performance of and/or perform the operation o1205. For instance, in one or more exemplary implementations, the one or more direct modify surface instructions i1205, when executed, direct performance of the operation o1205 in the illustrative depiction as follows, and/or the direct modify surface electrical circuitry arrangement e1205, when activated, performs the operation o1205 in the illustrative depiction as follows, and/or the direct modify surface module m1205, when executed and/or activated, directs performance of and/or performs the operation o1205 in the illustrative depiction as follows, and/or the operation o1205 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including create indentations, and/or etc.) one or more surface texture properties (e.g. including surface integrity, and/or etc.) of the one or more portions of the one or more ingestible substrate structures (e.g. one or more flake structures, etc.) to form (e.g. including assemble fabricate, layer, make, and/or etc.) at least in part the one or more selected ingestible products.

In one or more implementations, as shown in FIG. 151, operation o12 includes an operation o1206 for electronically directing control of the one or more subsequent ingestible substrate structure directed energy operations to treat at least in part the one or more portions of the one or more ingestible substrate structures to influence at least in part one or more oral sensation properties of the one or more portions of the one or more ingestible substrate structures to form at least in part the one or more selected ingestible products. Origination of an illustratively derived direct modify oral component group can be accomplished through skilled in the art design choice selection of one or more of the above depicted components from one or more of the above depicted subsystems shown in FIG. 18. Components from the direct modify oral component group can be used in implementing execution of the one or more direct modify oral instructions i1206 of FIG. 109, can be used in performance of the direct modify oral electrical circuitry arrangement e1206 of FIG. 102, and/or can be used in otherwise fulfillment of the operation o1206. An exemplary non-transitory signal bearing medium version of the information storage subsystem s200 is depicted in FIG. 109 as bearing the one or more direct modify oral instructions i1206 that when executed will direct performance of the operation o1206. Furthermore, the direct modify oral electrical circuitry arrangement ("elec circ arrange") e1206, when activated, will perform the operation o1206. Also, the direct modify oral module m1206, when executed and/or activated, will direct performance of and/or perform the operation o1206. For instance, in one or more exemplary implementations, the one or more direct modify oral instructions i1206, when executed, direct performance of the operation o1206 in the illustrative depiction as follows, and/or the direct modify oral electrical circuitry arrangement e1206, when activated, performs the operation o1206 in the illustrative depiction as follows, and/or the direct modify oral module m1206, when executed and/or activated, directs performance of and/or performs the operation o1206 in the illustrative depiction as follows, and/or the operation o1206 is otherwise carried out in the illustrative depiction as follows: electronically directing control of the one or more subsequent ingestible substrate structure duct operations (e.g. e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including enhancement, and/or etc.) one or more oral sensation properties (e.g. including adding mint-based flavors, and/or etc.) of the one or more portions of the one or more ingestible substrate structures (e.g. one or more strip structures, etc.) to form (e.g. including assemble fabricate, layer, make, and/or etc.) at least in part the one or more selected ingestible products.

In one or more implementations, as shown in FIG. 152, operation o12 includes an operation o1207 for electronically directing control of the one or more subsequent ingestible substrate structure directed energy operations to treat at least in part the one or more portions of the one or more ingestible substrate structures to influence at least in part one or more sound properties of the one or more portions of the one or more ingestible substrate structures to form at least in part the one or more selected ingestible products. Origination of an illustratively derived direct modify sound component group can be accomplished through skilled in the art design choice selection of one or more of the above depicted components from one or more of the above depicted subsystems shown in FIG. 18. Components from the direct modify sound component group can be used in implementing execution of the one or more direct modify sound instructions i1207 of FIG. 109, can be used in performance of the direct modify sound electrical circuitry arrangement e1207 of FIG. 102, and/or can be used in otherwise fulfillment of the operation o1207. An exemplary non-transitory signal bearing medium version of the information storage subsystem s200 is depicted in FIG. 109 as bearing the one or more direct modify sound instructions i1207 that when executed will direct performance of the operation o1207. Furthermore, the direct modify sound electrical circuitry arrangement ("elec circ arrange") e1207, when activated, will perform the operation o1207. Also, the direct modify sound module m1207, when executed and/or activated, will direct performance of and/or perform the operation o1207. For instance, in one or more exemplary implementations, the one or more direct modify sound instructions i1207, when executed, direct performance of the operation o1207 in the illustrative depiction as follows, and/or the direct modify sound electrical circuitry arrangement e1207, when activated, performs the operation o1207 in the illustrative depiction as follows, and/or the direct modify sound module m1207, when executed and/or activated, directs performance of and/or performs the operation o1207 in the illustrative depiction as follows, and/or the operation o1207 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including reducing decibel levels, and/or etc.) one or more sound properties (e.g. including decibel levels when substrate is bitten into, and/or etc.) of the one or more portions of the one or more ingestible substrate structures (e.g. one or more pasta structures, etc.) to form (e.g. including assemble fabricate, layer, make, and/or etc.) at least in part the one or more selected ingestible products.

In one or more implementations, as shown in FIG. 152, operation o12 includes an operation o1208 for electronically directing control of the one or more subsequent ingestible substrate structure directed energy operations to treat at least in part the one or more portions of the one or more ingestible substrate structures to influence at least in part one or more structural texture properties of the one or more portions of the one or more ingestible substrate structures to form at least in part the one or more selected ingestible products. Origination of an illustratively derived direct modify structural component group can be accomplished through skilled in the art design choice selection of one or more of the above depicted components from one or more of the above depicted subsystems shown in FIG. 18. Components from the direct modify structural component group can be used in implementing execution of the one or more direct modify structural instructions i1208 of FIG. 109, can be used in performance of the direct modify structural electrical circuitry arrangement e1208 of FIG. 102, and/or can be used in otherwise fulfillment of the operation o1208. An exemplary non-transitory signal bearing medium version of the information storage subsystem s200 is depicted in FIG. 109 as bearing the one or more direct modify structural instructions i1208 that when executed will direct performance of the operation o1208. Furthermore, the direct modify structural electrical circuitry arrangement ("elec circ arrange") e1208, when activated, will perform the operation o1208. Also, the direct modify structural module m1208, when executed and/or activated, will direct performance of and/or perform the operation o1208. For instance, in one or more exemplary implementations, the one or more direct modify structural instructions i1208, when executed, direct performance of the operation o1208 in the illustrative depiction as follows, and/or the direct modify structural electrical circuitry arrangement e1208, when activated, performs the operation o1208 in the illustrative depiction as follows, and/or the direct modify structural module m1208, when executed and/or activated, directs performance of and/or performs the operation o1208 in the illustrative depiction as follows, and/or the operation o1208 is otherwise carried out in the illustrative depiction as follows: electronically directing control of the one or more subsequent ingestible substrate structure duct operations (e.g. including stacking, inserting, laying, placing, joining, affixing, gluing, joining, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including strengthening, and/or etc.) one or more structural texture properties (e.g. including rigidity, and/or etc.) of the one or more portions of the one or more ingestible substrate structures (e.g. one or more sheet structures, etc.) to form (e.g. including assemble fabricate, layer, make, and/or etc.) at least in part the one or more selected ingestible products.

In one or more implementations, as shown in FIG. 152, operation o12 includes an operation o1209 for electronically directing control of the one or more subsequent ingestible substrate structure directed energy operations to treat at least in part the one or more portions of the one or more ingestible substrate structures to influence at least in part one or more olfactory properties of the one or more portions of the one or more ingestible substrate structures to form at least in part the one or more selected ingestible products. Origination of an illustratively derived direct modify olfactory component group can be accomplished through skilled in the art design choice selection of one or more of the above depicted components from one or more of the above depicted subsystems shown in FIG. 18. Components from the direct modify olfactory component group can be used in implementing execution of the one or more direct modify olfactory instructions i1209 of FIG. 109, can be used in performance of the direct modify olfactory electrical circuitry arrangement e1209 of FIG. 102, and/or can be used in otherwise fulfillment of the operation o1209. An exemplary non-transitory signal bearing medium version of the information storage subsystem s200 is depicted in FIG. 109 as bearing the one or more direct modify olfactory instructions i1209 that when executed will direct performance of the operation o1209. Furthermore, the direct modify olfactory electrical circuitry arrangement ("elec circ arrange") e1209, when activated, will perform the operation o1209. Also, the direct modify olfactory module m1209, when executed and/or activated, will direct performance of and/or perform the operation o1209. For instance, in one or more exemplary implementations, the one or more direct modify olfactory instructions i1209, when executed, direct performance of the operation o1209 in the illustrative depiction as follows, and/or the direct modify olfactory electrical circuitry arrangement e1209, when activated, performs the operation o1209 in the illustrative depiction as follows, and/or the direct modify olfactory module m1209, when executed and/or activated, directs performance of and/or performs the operation o1209 in the illustrative depiction as follows, and/or the operation o1209 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including adding scents, and/or etc.) one or more olfactory properties (e.g. including smell of the substrate, and/or etc.) of the one or more portions of the one or more ingestible substrate structures (e.g. one or more liquid filled structures, etc.) to form (e.g. including assemble fabricate, layer, make, and/or etc.) at least in part the one or more selected ingestible products.

In one or more implementations, as shown in FIG. 153, operation o12 includes an operation o1210 for electronically directing control of the one or more subsequent ingestible substrate structure directed energy operations to treat at least in part the one or more portions of the one or more ingestible substrate structures to influence at least in part one or more shape properties of the one or more portions of the one or more ingestible substrate structures to form at least in part the one or more selected ingestible products. Origination of an illustratively derived direct modify shape component group can be accomplished through skilled in the art design choice selection of one or more of the above depicted components from one or more of the above depicted subsystems shown in FIG. 18. Components from the direct modify shape component group can be used in implementing execution of the one or more direct modify shape instructions i1210 of FIG. 109, can be used in performance of the direct modify shape electrical circuitry arrangement e1210 of FIG. 102, and/or can be used in otherwise fulfillment of the operation o1210. An exemplary non-transitory signal bearing medium version of the information storage subsystem s200 is depicted in FIG. 109 as bearing the one or more direct modify shape instructions i1210 that when executed will direct performance of the operation o1210. Furthermore, the direct modify shape electrical circuitry arrangement ("elec circ arrange") e1210, when activated, will perform the operation o1210. Also, the direct modify shape module m1210, when executed and/or activated, will direct performance of and/or perform the operation o1210. For instance, in one or more exemplary implementations, the one or more direct modify shape instructions i1210, when executed, direct performance of the operation o1210 in the illustrative depiction as follows, and/or the direct modify shape electrical circuitry arrangement e1210, when activated, performs the operation o1210 in the illustrative depiction as follows, and/or the direct modify shape module m1210, when executed and/or activated, directs performance of and/or performs the operation o1210 in the illustrative depiction as follows, and/or the operation o1210 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including eliminate portions of the substrate, and/or etc.) one or more shape properties (e.g. including changing a rectangularly configured substrate to irregularly configured substrate, and/or etc.) of the one or more portions of the one or more ingestible substrate structures (e.g. one or more sheet structures, etc.) to form (e.g. including assemble fabricate, layer, make, and/or etc.) at least in part the one or more selected ingestible products.

In one or more implementations, as shown in FIG. 153, operation o12 includes an operation o1211 for electronically directing control of the one or more subsequent ingestible substrate structure directed energy operations to treat at least in part the one or more portions of the one or more ingestible substrate structures to influence at least in part one or more psycho-sensory properties of the one or more portions of the one or more ingestible substrate structures to form at least in part the one or more selected ingestible products. Origination of an illustratively derived direct modify psycho-sensory component group can be accomplished through skilled in the art design choice selection of one or more of the above depicted components from one or more of the above depicted subsystems shown in FIG. 18. Components from the direct modify psycho-sensory component group can be used in implementing execution of the one or more direct modify psycho-sensory instructions i1211 of FIG. 109, can be used in performance of the direct modify psycho-sensory electrical circuitry arrangement e1211 of FIG. 102, and/or can be used in otherwise fulfillment of the operation o1211. An exemplary non-transitory signal bearing medium version of the information storage subsystem s200 is depicted in FIG. 109 as bearing the one or more direct modify psycho-sensory instructions i1211 that when executed will direct performance of the operation o1211. Furthermore, the direct modify psycho-sensory electrical circuitry arrangement ("elec circ arrange") e1211, when activated, will perform the operation o1211. Also, the direct modify psycho-sensory module m1211, when executed and/or activated, will direct performance of and/or perform the operation o1211. For instance, in one or more exemplary implementations, the one or more direct modify psycho-sensory instructions i1211, when executed, direct performance of the operation o1211 in the illustrative depiction as follows, and/or the direct modify psycho-sensory electrical circuitry arrangement e1211, when activated, performs the operation o1211 in the illustrative depiction as follows, and/or the direct modify psycho-sensory module m1211, when executed and/or activated, directs performance of and/or performs the operation o1211 in the illustrative depiction as follows, and/or the operation o1211 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including adding perceived sensory output associated with a selected ingestible product, and/or etc.) one or more psycho-sensory properties (e.g. including perceived flavor as influenced by a combination of color and scent, and/or etc.) of the one or more portions of the one or more ingestible substrate structures (e.g. one or more color or scent encapsulation containing structures, etc.) to form (e.g. including assemble fabricate, layer, make, and/or etc.) at least in part the one or more selected ingestible products.

In one or more implementations, as shown in FIG. 153, operation o12 includes an operation o1212 for electronically directing control of the one or more subsequent ingestible substrate structure directed energy operations to treat at least in part the one or more portions of the one or more ingestible substrate structures to influence at least in part one or more visual patterns of the one or more portions of the one or more ingestible substrate structures to form at least in part the one or more selected ingestible products. Origination of an illustratively derived direct modify visual pattern component group can be accomplished through skilled in the art design choice selection of one or more of the above depicted components from one or more of the above depicted subsystems shown in FIG. 18. Components from the direct modify visual pattern component group can be used in implementing execution of the one or more direct modify visual pattern instructions i1212 of FIG. 109, can be used in performance of the direct modify visual pattern electrical circuitry arrangement e1212 of FIG. 102, and/or can be used in otherwise fulfillment of the operation o1212. An exemplary non-transitory signal bearing medium version of the information storage subsystem s200 is depicted in FIG. 109 as bearing the one or more direct modify visual pattern instructions i1212 that when executed will direct performance of the operation o1212. Furthermore, the direct modify visual pattern electrical circuitry arrangement ("elec circ arrange") e1212, when activated, will perform the operation o1212. Also, the direct modify visual pattern module m1212, when executed and/or activated, will direct performance of and/or perform the operation o1212. For instance, in one or more exemplary implementations, the one or more direct modify visual pattern instructions i1212, when executed, direct performance of the operation o1212 in the illustrative depiction as follows, and/or the direct modify visual pattern electrical circuitry arrangement e1212, when activated, performs the operation o1212 in the illustrative depiction as follows, and/or the direct modify visual pattern module m1212, when executed and/or activated, directs performance of and/or performs the operation o1212 in the illustrative depiction as follows, and/or the operation o1212 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including intensify, and/or etc.) one or more visual patterns (e.g. including variations in surface shading made by slight impressions, and/or etc.) of the one or more portions of the one or more ingestible substrate structures (e.g. one or more sheet structures, etc.) to form (e.g. including assemble fabricate, layer, make, and/or etc.) at least in part the one or more selected ingestible products.

In one or more implementations, as shown in FIG. 154, operation o12 includes an operation o1213 for electronically directing control of the one or more subsequent ingestible substrate structure directed energy operations to treat at least in part the one or more portions of the one or more ingestible substrate structures to influence at least in part one or more textual patterns of the one or more portions of the one or more ingestible substrate structures to form at least in part the one or more selected ingestible products. Origination of an illustratively derived direct modify textural pattern component group can be accomplished through skilled in the art design choice selection of one or more of the above depicted components from one or more of the above depicted subsystems shown in FIG. 18. Components from the direct modify textural pattern component group can be used in implementing execution of the one or more direct modify textural pattern instructions i1213 of FIG. 109, can be used in performance of the direct modify textural pattern electrical circuitry arrangement e1213 of FIG. 102, and/or can be used in otherwise fulfillment of the operation o1213. An exemplary non-transitory signal bearing medium version of the information storage subsystem s200 is depicted in FIG. 109 as bearing the one or more direct modify textural pattern instructions i1213 that when executed will direct performance of the operation o1213. Furthermore, the direct modify textural pattern electrical circuitry arrangement ("elec circ arrange") e1213, when activated, will perform the operation o1213. Also, the direct modify textural pattern module m1213, when executed and/or activated, will direct performance of and/or perform the operation o1213. For instance, in one or more exemplary implementations, the one or more direct modify textural pattern instructions i1213, when executed, direct performance of the operation o1213 in the illustrative depiction as follows, and/or the direct modify textural pattern electrical circuitry arrangement e1213, when activated, performs the operation o1213 in the illustrative depiction as follows, and/or the direct modify textural pattern module m1213, when executed and/or activated, directs performance of and/or performs the operation o1213 in the illustrative depiction as follows, and/or the operation o1213 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including variability in surface depth, and/or etc.) one or more textual patterns (e.g. including regular rows of depressions running along the surface of the substrate structure, and/or etc.) of the one or more portions of the one or more ingestible substrate structures (e.g. one or more rectangular structures, etc.) to form (e.g. including assemble fabricate, layer, make, and/or etc.) at least in part the one or more selected ingestible products.

In one or more implementations, as shown in FIG. 154, operation o12 includes an operation o1214 for electronically directing control of the one or more subsequent ingestible substrate structure directed energy operations including directing energy in laser form to treat the one or more portions of the one or more ingestible substrate structures to influence at least in part one or more properties of the one or more portions of the one or more ingestible substrate structures to form at least in part the one or more selected ingestible products. Origination of an illustratively derived direct object laser component group can be accomplished through skilled in the art design choice selection of one or more of the above depicted components from one or more of the above depicted subsystems shown in FIG. 18. Components from the direct object laser component group can be used in implementing execution of the one or more direct object laser instructions i1214 of FIG. 109, can be used in performance of the direct object laser electrical circuitry arrangement e1214 of FIG. 102, and/or can be used in otherwise fulfillment of the operation o1214. An exemplary non-transitory signal bearing medium version of the information storage subsystem s200 is depicted in FIG. 109 as bearing the one or more direct object laser instructions i1214 that when executed will direct performance of the operation o1214. Furthermore, the direct object laser electrical circuitry arrangement ("elec circ arrange") e1214, when activated, will perform the operation o1214. Also, the direct object laser module m1214, when executed and/or activated, will direct performance of and/or perform the operation o1214. For instance, in one or more exemplary implementations, the one or more direct object laser instructions i1214, when executed, direct performance of the operation o1214 in the illustrative depiction as follows, and/or the direct object laser electrical circuitry arrangement e1214, when activated, performs the operation o1214 in the illustrative depiction as follows, and/or the direct object laser module m1214, when executed and/or activated, directs performance of and/or performs the operation o1214 in the illustrative depiction as follows, and/or the operation o1214 is otherwise carried out in the illustrative depiction as follows: electronically directing control of the one or more subsequent ingestible substrate structure duct operations including flowing one or more fluids through one or more ducts located internally within one or more portions of the one or more ingestible structures (e.g. one or more pins, nails, spikes, etc.) to treat (including processing, changing, modifying, supplementing, refining, amplifying, enhancing, acting upon, exposing, reacting with, integrating with, and/or etc.) the one or more portions (e.g. including one or more embedded flavor encapsulations, etc.) of the one or more ingestible substrate structures to influence at least in part (e.g. change surface composition, and/or etc.) one or more properties (e.g. including flavor, and/or etc.) of the one or more portions of the one or more ingestible substrate structures to form (e.g. including assemble fabricate, layer, make, and/or etc.) at least in part the one or more selected ingestible products.

In one or more implementations, as shown in FIG. 154, operation o12 includes an operation o1215 for electronically directing control of the one or more subsequent ingestible substrate structure directed energy operations including directing energy in microwave form to treat at least in part the one or more portions of the one or more ingestible substrate structures to influence at least in part one or more properties of the one or more portions of the one or more ingestible substrate structures to form at least in part the one or more selected ingestible products. Origination of an illustratively derived direct object microwave component group can be accomplished through skilled in the art design choice selection of one or more of the above depicted components from one or more of the above depicted subsystems shown in FIG. 18. Components from the direct object microwave component group can be used in implementing execution of the one or more direct object microwave instructions i1215 of FIG. 109, can be used in performance of the direct object microwave electrical circuitry arrangement e1215 of FIG. 102, and/or can be used in otherwise fulfillment of the operation o1215. An exemplary non-transitory signal bearing medium version of the information storage subsystem s200 is depicted in FIG. 109 as bearing the one or more direct object microwave instructions i1215 that when executed will direct performance of the operation o1215. Furthermore, the direct object microwave electrical circuitry arrangement ("elec circ arrange") e1215, when activated, will perform the operation o1215. Also, the direct object microwave module m1215, when executed and/or activated, will direct performance of and/or perform the operation o1215. For instance, in one or more exemplary implementations, the one or more direct object microwave instructions i1215, when executed, direct performance of the operation o1215 in the illustrative depiction as follows, and/or the direct object microwave electrical circuitry arrangement e1215, when activated, performs the operation o1215 in the illustrative depiction as follows, and/or the direct object microwave module m1215, when executed and/or activated, directs performance of and/or performs the operation o1215 in the illustrative depiction as follows, and/or the operation o1215 is otherwise carried out in the illustrative depiction as follows: electronically directing control of the one or more subsequent ingestible substrate structure duct operations including flowing one or more fluids through one or more ducts located externally in juxtaposition thereto one or more portions of the one or more ingestible structures (e.g. one or more planar, cuboid, polygonal, wire, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including add to the surface composition, and/or etc.) one or more properties (e.g. including modifying surface texture, and/or etc.) of the one or more portions of the one or more ingestible substrate structures to form (e.g. including assemble fabricate, layer, make, and/or etc.) at least in part the one or more selected ingestible products.

In one or more implementations, as shown in FIG. 155, operation o12 includes an operation o1216 for electronically directing control of the one or more subsequent ingestible substrate structure directed energy operations including directing energy in acoustic form to treat at least in part the one or more portions of the one or more ingestible substrate structures to influence at least in part one or more properties of the one or more portions of the one or more ingestible substrate structures to form at least in part the one or more selected ingestible products. Origination of an illustratively derived direct object acoustic component group can be accomplished through skilled in the art design choice selection of one or more of the above depicted components from one or more of the above depicted subsystems shown in FIG. 18. Components from the direct object acoustic component group can be used in implementing execution of the one or more direct object acoustic instructions i1216 of FIG. 109, can be used in performance of the direct object acoustic electrical circuitry arrangement e1216 of FIG. 102, and/or can be used in otherwise fulfillment of the operation o1216. An exemplary non-transitory signal bearing medium version of the information storage subsystem s200 is depicted in FIG. 109 as bearing the one or more direct object acoustic instructions i1216 that when executed will direct performance of the operation o1216. Furthermore, the direct object acoustic electrical circuitry arrangement ("elec circ arrange") e1216, when activated, will perform the operation o1216. Also, the direct object acoustic module m1216, when executed and/or activated, will direct performance of and/or perform the operation o1216. For instance, in one or more exemplary implementations, the one or more direct object acoustic instructions i1216, when executed, direct performance of the operation o1216 in the illustrative depiction as follows, and/or the direct object acoustic electrical circuitry arrangement e1216, when activated, performs the operation o1216 in the illustrative depiction as follows, and/or the direct object acoustic module m1216, when executed and/or activated, directs performance of and/or performs the operation o1216 in the illustrative depiction as follows, and/or the operation o1216 is otherwise carried out in the illustrative depiction as follows: electronically directing control of the one or more subsequent ingestible substrate structure duct operations including flowing one or more fluids through one or more ducts as substantially matrix structures to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including changing shape of structure, and/or etc.) one or more properties (e.g. including textural patterns, and/or etc.) of the one or more portions of the one or more ingestible substrate structures to form (e.g. including assemble fabricate, layer, make, and/or etc.) at least in part the one or more selected ingestible products.

In one or more implementations, as shown in FIG. 155, operation o12 includes an operation o1217 for electronically directing control of the one or more subsequent ingestible substrate structure directed energy operations including directing energy in radiant form to treat at least in part the one or more portions of the one or more ingestible substrate structures to influence at least in part one or more properties of the one or more portions of the one or more ingestible substrate structures to form at least in part the one or more selected ingestible products. Origination of an illustratively derived direct object radiant component group can be accomplished through skilled in the art design choice selection of one or more of the above depicted components from one or more of the above depicted subsystems shown in FIG. 18. Components from the direct object radiant component group can be used in implementing execution of the one or more direct object radiant instructions i1217 of FIG. 109, can be used in performance of the direct object radiant electrical circuitry arrangement e1217 of FIG. 102, and/or can be used in otherwise fulfillment of the operation o1217. An exemplary non-transitory signal bearing medium version of the information storage subsystem s200 is depicted in FIG. 109 as bearing the one or more direct object radiant instructions i1217 that when executed will direct performance of the operation o1217. Furthermore, the direct object radiant electrical circuitry arrangement ("elec circ arrange") e1217, when activated, will perform the operation o1217. Also, the direct object radiant module m1217, when executed and/or activated, will direct performance of and/or perform the operation o1217. For instance, in one or more exemplary implementations, the one or more direct object radiant instructions i1217, when executed, direct performance of the operation o1217 in the illustrative depiction as follows, and/or the direct object radiant electrical circuitry arrangement e1217, when activated, performs the operation o1217 in the illustrative depiction as follows, and/or the direct object radiant module m1217, when executed and/or activated, directs performance of and/or performs the operation o1217 in the illustrative depiction as follows, and/or the operation o1217 is otherwise carried out in the illustrative depiction as follows: electronically directing control of the one or more subsequent ingestible substrate structure duct operations including flowing one or more fluids through one or more ducts as one or more substantially curvilinear structures to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including changing volume, and/or etc.) one or more properties (e.g. including size and structural texture, and/or etc.) of the one or more portions of the one or more ingestible substrate structures to form (e.g. including assemble fabricate, layer, make, and/or etc.) at least in part the one or more selected ingestible products.

In one or more implementations, as shown in FIG. 155, operation o12 includes an operation o1218 for electronically directing control of the one or more subsequent ingestible substrate structure directed energy operations to treat at least in part the one or more portions of the one or more ingestible substrate structures to influence at least in part one or more properties of the one or more portions of the one or more ingestible substrate structures as substantially one or more carbohydrates to form at least in part the one or more selected ingestible products. Origination of an illustratively derived direct substrate carbohydrate component group can be accomplished through skilled in the art design choice selection of one or more of the above depicted components from one or more of the above depicted subsystems shown in FIG. 18. Components from the direct substrate carbohydrate component group can be used in implementing execution of the one or more direct substrate carbohydrate instructions i1218 of FIG. 109, can be used in performance of the direct substrate carbohydrate electrical circuitry arrangement e1218 of FIG. 102, and/or can be used in otherwise fulfillment of the operation o1218. An exemplary non-transitory signal bearing medium version of the information storage subsystem s200 is depicted in FIG. 109 as bearing the one or more direct substrate carbohydrate instructions i1218 that when executed will direct performance of the operation o1218. Furthermore, the direct substrate carbohydrate electrical circuitry arrangement ("elec circ arrange") e1218, when activated, will perform the operation o1218. Also, the direct substrate carbohydrate module m1218, when executed and/or activated, will direct performance of and/or perform the operation o1218. For instance, in one or more exemplary implementations, the one or more direct substrate carbohydrate instructions i1218, when executed, direct performance of the operation o1218 in the illustrative depiction as follows, and/or the direct substrate carbohydrate electrical circuitry arrangement e1218, when activated, performs the operation o1218 in the illustrative depiction as follows, and/or the direct substrate carbohydrate module m1218, when executed and/or activated, directs performance of and/or performs the operation o1218 in the illustrative depiction as follows, and/or the operation o1218 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including changing, and/or etc.) one or more properties (e.g. including flavor, and/or etc.) of the one or more portions of the one or more ingestible substrate structures as substantially one or more carbohydrates (e.g. including rice starch, and/or etc.) to form (e.g. including assemble fabricate, layer, make, and/or etc.) at least in part the one or more selected ingestible products.

In one or more implementations, as shown in FIG. 156, operation o12 includes an operation o1219 for electronically directing control of the one or more subsequent ingestible substrate structure directed energy operations to treat at least in part the one or more portions of the one or more ingestible substrate structures to influence at least in part one or more properties of the one or more portions of the one or more ingestible substrate structures as substantially one or more fats to form at least in part the one or more selected ingestible products. Origination of an illustratively derived direct substrate fat component group can be accomplished through skilled in the art design choice selection of one or more of the above depicted components from one or more of the above depicted subsystems shown in FIG. 18. Components from the direct substrate fat component group can be used in implementing execution of the one or more direct substrate fat instructions i1219 of FIG. 109, can be used in performance of the direct substrate fat electrical circuitry arrangement e1219 of FIG. 102, and/or can be used in otherwise fulfillment of the operation o1219. An exemplary non-transitory signal bearing medium version of the information storage subsystem s200 is depicted in FIG. 109 as bearing the one or more direct substrate fat instructions i1219 that when executed will direct performance of the operation o1219. Furthermore, the direct substrate fat electrical circuitry arrangement ("elec circ arrange") e1219, when activated, will perform the operation o1219. Also, the direct substrate fat module m1219, when executed and/or activated, will direct performance of and/or perform the operation o1219. For instance, in one or more exemplary implementations, the one or more direct substrate fat instructions i1219, when executed, direct performance of the operation o1219 in the illustrative depiction as follows, and/or the direct substrate fat electrical circuitry arrangement e1219, when activated, performs the operation o1219 in the illustrative depiction as follows, and/or the direct substrate fat module m1219, when executed and/or activated, directs performance of and/or performs the operation o1219 in the illustrative depiction as follows, and/or the operation o1219 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including darken, and/or etc.) one or more properties (e.g. including substrate color, and/or etc.) of the one or more portions of the one or more ingestible substrate structures as substantially one or more fats (e.g. including coconut o11, and/or etc.) to form (e.g. including assemble fabricate, layer, make, and/or etc.) at least in part the one or more selected ingestible products.

In one or more implementations, as shown in FIG. 156, operation o12 includes an operation o1220 for electronically directing control of the one or more subsequent ingestible substrate structure directed energy operations to treat at least in part the one or more portions of the one or more ingestible substrate structures to influence at least in part one or more properties of the one or more portions of the one or more ingestible substrate structures as substantially one or more proteins to form at least in part the one or more selected ingestible products. Origination of an illustratively derived direct substrate protein component group can be accomplished through skilled in the art design choice selection of one or more of the above depicted components from one or more of the above depicted subsystems shown in FIG. 18. Components from the direct substrate protein component group can be used in implementing execution of the one or more direct substrate protein instructions i1220 of FIG. 110, can be used in performance of the direct substrate protein electrical circuitry arrangement e1220 of FIG. 103, and/or can be used in otherwise fulfillment of the operation o1220. An exemplary non-transitory signal bearing medium version of the information storage subsystem s200 is depicted in FIG. 110 as bearing the one or more direct substrate protein instructions i1220 that when executed will direct performance of the operation o1220. Furthermore, the direct substrate protein electrical circuitry arrangement ("elec circ arrange") e1220, when activated, will perform the operation o1220. Also, the direct substrate protein module m1220, when executed and/or activated, will direct performance of and/or perform the operation o1220. For instance, in one or more exemplary implementations, the one or more direct substrate protein instructions i1220, when executed, direct performance of the operation o1220 in the illustrative depiction as follows, and/or the direct substrate protein electrical circuitry arrangement e1220, when activated, performs the operation o1220 in the illustrative depiction as follows, and/or the direct substrate protein module m1220, when executed and/or activated, directs performance of and/or performs the operation o1220 in the illustrative depiction as follows, and/or the operation o1220 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including increase, and/or etc.) one or more properties (e.g. including patterning of surface texture, and/or etc.) of the one or more portions of the one or more ingestible substrate structures as substantially one or more proteins (e.g. including peanut butter, and/or etc.) to form (e.g. including assemble fabricate, layer, make, and/or etc.) at least in part the one or more selected ingestible products.

In one or more implementations, as shown in FIG. 156, operation o12 includes an operation o1221 for electronically directing control of the one or more subsequent ingestible substrate structure directed energy operations to treat at least in part the one or more portions of the one or more ingestible substrate structures to influence at least in part one or more properties of the one or more portions of the one or more ingestible substrate structures through at least in part multiple beam arrangements for the one or more portions of the one or more ingestible substrate structures to form at least in part the one or more selected ingestible products. Origination of an illustratively derived direct modify multiple component group can be accomplished through skilled in the art design choice selection of one or more of the above depicted components from one or more of the above depicted subsystems shown in FIG. 18. Components from the direct modify multiple component group can be used in implementing execution of the one or more direct modify multiple instructions i1221 of FIG. 110, can be used in performance of the direct modify multiple electrical circuitry arrangement e1221 of FIG. 103, and/or can be used in otherwise fulfillment of the operation o1221. An exemplary non-transitory signal bearing medium version of the information storage subsystem s200 is depicted in FIG. 110 as bearing the one or more direct modify multiple instructions i1221 that when executed will direct performance of the operation o1221. Furthermore, the direct modify multiple electrical circuitry arrangement ("elec circ arrange") e1221, when activated, will perform the operation o1221. Also, the direct modify multiple module m1221, when executed and/or activated, will direct performance of and/or perform the operation o1221. For instance, in one or more exemplary implementations, the one or more direct modify multiple instructions i1221, when executed, direct performance of the operation o1221 in the illustrative depiction as follows, and/or the direct modify multiple electrical circuitry arrangement e1221, when activated, performs the operation o1221 in the illustrative depiction as follows, and/or the direct modify multiple module m1221, when executed and/or activated, directs performance of and/or performs the operation o1221 in the illustrative depiction as follows, and/or the operation o1221 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including changing, and/or etc.) one or more properties (e.g. including internal densities, and/or etc.) of the one or more portions of the one or more ingestible substrate structures through at least in part tubular duct arrangements for (e.g. modifying internal densities of the substrate structures through assembly of ingestible parts having internally positioned passageways, and/or etc.) the one or more portions of the one or more ingestible substrate structures (e.g. one or more rectangular structures, etc.) to form (e.g. including assemble fabricate, layer, make, and/or etc.) at least in part the one or more selected ingestible products.

In one or more implementations, as shown in FIG. 157, operation o12 includes an operation o1222 for electronically directing control of the one or more subsequent ingestible substrate structure directed energy operations to treat at least in part the one or more portions of the one or more ingestible substrate structures to influence at least in part one or more properties of the one or more portions of the one or more ingestible substrate structures through at least in part patterned energy arrangements for the one or more portions of the one or more ingestible substrate structures to form at least in part the one or more selected ingestible products. Origination of an illustratively derived direct modify patterned component group can be accomplished through skilled in the art design choice selection of one or more of the above depicted components from one or more of the above depicted subsystems shown in FIG. 18. Components from the direct modify patterned component group can be used in implementing execution of the one or more direct modify patterned instructions i1222 of FIG. 110, can be used in performance of the direct modify patterned electrical circuitry arrangement e1222 of FIG. 103, and/or can be used in otherwise fulfillment of the operation o1222. An exemplary non-transitory signal bearing medium version of the information storage subsystem s200 is depicted in FIG. 110 as bearing the one or more direct modify patterned instructions i1222 that when executed will direct performance of the operation o1222. Furthermore, the direct modify patterned electrical circuitry arrangement ("elec circ arrange") e1222, when activated, will perform the operation o1222. Also, the direct modify patterned module m1222, when executed and/or activated, will direct performance of and/or perform the operation o1222. For instance, in one or more exemplary implementations, the one or more direct modify patterned instructions i1222, when executed, direct performance of the operation o1222 in the illustrative depiction as follows, and/or the direct modify patterned electrical circuitry arrangement e1222, when activated, performs the operation o1222 in the illustrative depiction as follows, and/or the direct modify patterned module m1222, when executed and/or activated, directs performance of and/or performs the operation o1222 in the illustrative depiction as follows, and/or the operation o1222 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including removing, and/or etc.) one or more properties (e.g. including shape, and/or etc.) of the one or more portions of the one or more ingestible substrate structures through at least in part channel arrangements for (e.g. including stacking through dropping ingestible pieces into bins and pressing the pieces together, grabbing and stacking ingestible pieces with robotic hands, and/or etc.) the one or more portions of the one or more ingestible substrate structures (e.g. one or more sheet structures, etc.)

to form (e.g. including assemble fabricate, layer, make, and/or etc.) at least in part the one or more selected ingestible products.

In one or more implementations, as shown in FIG. 157, operation o12 includes an operation o1223 for electronically directing control of the one or more subsequent ingestible substrate structure directed energy operations to treat at least in part the one or more portions of the one or more ingestible substrate structures to influence at least in part one or more properties of the one or more portions of the one or more ingestible substrate structures by at least partially focused energy beam arrangements for one or more portions of the one or more ingestible substrate structures to form at least in part the one or more selected ingestible products. Origination of an illustratively derived direct modify focused component group can be accomplished through skilled in the art design choice selection of one or more of the above depicted components from one or more of the above depicted subsystems shown in FIG. 18. Components from the direct modify focused component group can be used in implementing execution of the one or more direct modify focused instructions i1223 of FIG. 110, can be used in performance of the direct modify focused electrical circuitry arrangement e1223 of FIG. 103, and/or can be used in otherwise fulfillment of the operation o1223. An exemplary non-transitory signal bearing medium version of the information storage subsystem s200 is depicted in FIG. 110 as bearing the one or more direct modify focused instructions i1223 that when executed will direct performance of the operation o1223. Furthermore, the direct modify focused electrical circuitry arrangement ("elec circ arrange") e1223, when activated, will perform the operation o1223. Also, the direct modify focused module m1223, when executed and/or activated, will direct performance of and/or perform the operation o1223. For instance, in one or more exemplary implementations, the one or more direct modify focused instructions i1223, when executed, direct performance of the operation o1223 in the illustrative depiction as follows, and/or the direct modify focused electrical circuitry arrangement e1223, when activated, performs the operation o1223 in the illustrative depiction as follows, and/or the direct modify focused module m1223, when executed and/or activated, directs performance of and/or performs the operation o1223 in the illustrative depiction as follows, and/or the operation o1223 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including increasing, and/or etc.) one or more properties (e.g. including surface texture, and/or etc.) of the one or more portions of the one or more ingestible substrate structures by at least partially dissolvable duct arrangements for (e.g. including recombining through assembly one or more surface textures, and/or etc.) one or more portions of the one or more ingestible substrate structures (e.g. one or more bar structures, etc.) to form (e.g. including assemble fabricate, layer, make, and/or etc.) at least in part the one or more selected ingestible products.

In one or more implementations, as shown in FIG. 157, operation o12 includes an operation o1224 for electronically directing control of the one or more subsequent ingestible substrate structure directed energy operations to treat at least in part the one or more portions of the one or more ingestible substrate structures to influence at least in part one or more properties of the one or more portions of the one or more ingestible substrate structures by at least partially replacing thereof to treat at least in part the one or more portions of the one or more ingestible substrate structures to form at least in part the one or more selected ingestible products. Origination of an illustratively derived direct modify replace component group can be accomplished through skilled in the art design choice selection of one or more of the above depicted components from one or more of the above depicted subsystems shown in FIG. 18. Components from the direct modify replace component group can be used in implementing execution of the one or more direct modify replace instructions i1224 of FIG. 110, can be used in performance of the direct modify replace electrical circuitry arrangement e1224 of FIG. 103, and/or can be used in otherwise fulfillment of the operation o1224. An exemplary non-transitory signal bearing medium version of the information storage subsystem s200 is depicted in FIG. 110 as bearing the one or more direct modify replace instructions i1224 that when executed will direct performance of the operation o1224. Furthermore, the direct modify replace electrical circuitry arrangement ("elec circ arrange") e1224, when activated, will perform the operation o1224. Also, the direct modify replace module m1224, when executed and/or activated, will direct performance of and/or perform the operation o1224. For instance, in one or more exemplary implementations, the one or more direct modify replace instructions i1224, when executed, direct performance of the operation o1224 in the illustrative depiction as follows, and/or the direct modify replace electrical circuitry arrangement e1224, when activated, performs the operation o1224 in the illustrative depiction as follows, and/or the direct modify replace module m1224, when executed and/or activated, directs performance of and/or performs the operation o1224 in the illustrative depiction as follows, and/or the operation o1224 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including decreasing, and/or etc.) one or more properties (e.g. including structural texture, and/or etc.) of the one or more portions of the one or more ingestible substrate structures by at least partially replacing thereof to treat at least in part (e.g. including replacing through assembly of ingestible parts having selected ingestible materials in portions of the substrate, and/or etc.) the one or more portions of the one or more ingestible substrate structures (e.g. one or more rectangular structures, etc.) to form (e.g. including assemble fabricate, layer, make, and/or etc.) at least in part the one or more selected ingestible products.

In one or more implementations, as shown in FIG. 158, operation o12 includes an operation o1225 for electronically directing control of the one or more subsequent ingestible substrate structure directed energy operations to treat at least in part the one or more portions of the one or more ingestible substrate structures to influence at least in part one or more properties of the one or more portions of the one or more ingestible substrate structures by at least partially integrating two or more portions of the one or more ingestible substrate structures to form at least in part the one or more selected ingestible products. Origination of an illustratively derived direct modify integrate component group can be accomplished through skilled in the art design choice selection of one or more of the above depicted components from one or more of the above depicted subsystems shown in FIG. 18. Components from the direct modify integrate component group can be used in implementing execution of the one or more direct modify integrate instructions i1225 of FIG. 110, can be used in performance of the direct modify integrate electrical circuitry arrangement e1225 of FIG. 103, and/or can be used in otherwise fulfillment of the operation o1225. An exemplary non-transitory signal bearing medium version of the information storage subsystem s200 is depicted in FIG. 110 as bearing the one or more direct modify integrate instructions i1225 that when executed will direct performance of the operation o1225. Furthermore, the direct modify integrate electrical circuitry arrangement ("elec circ arrange") e1225, when activated, will perform the operation o1225. Also, the direct modify integrate module m1225, when executed and/or activated, will direct performance of and/or perform the operation o1225. For instance, in one or more exemplary implementations, the one or more direct modify integrate instructions i1225, when executed, direct performance of the operation o1225 in the illustrative depiction as follows, and/or the direct modify integrate electrical circuitry arrangement e1225, when activated, performs the operation o1225 in the illustrative depiction as follows, and/or the direct modify integrate module m1225, when executed and/or activated, directs performance of and/or performs the operation o1225 in the illustrative depiction as follows, and/or the operation o1225 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including changing, and/or etc.) one or more properties (e.g. including substrate color, and/or etc.) of the one or more portions of the one or more ingestible substrate structures by at least partially integrating (e.g. including combining through assembly of ingestible parts one or more added ingredients to the substrate structure to change color, and/or etc.) two or more portions of the one or more ingestible substrate structures (e.g. one or more bars, etc.) to form (e.g. including assemble fabricate, layer, make, and/or etc.) at least in part the one or more selected ingestible products.

In one or more implementations, as shown in FIG. 158, operation o12 includes an operation o1226 for electronically directing control of the one or more subsequent ingestible substrate structure directed energy operations to treat at least in part the one or more portions of the one or more ingestible substrate structures to influence at least in part one or more properties of the one or more portions of the one or more ingestible substrate structures by at least partially softening the one or more portions of the one or more ingestible substrate structures to form at least in part the one or more selected ingestible products. Origination of an illustratively derived direct modify soften component group can be accomplished through skilled in the art design choice selection of one or more of the above depicted components from one or more of the above depicted subsystems shown in FIG. 18. Components from the direct modify soften component group can be used in implementing execution of the one or more direct modify soften instructions i1226 of FIG. 110, can be used in performance of the direct modify soften electrical circuitry arrangement e1226 of FIG. 103, and/or can be used in otherwise fulfillment of the operation o1226. An exemplary non-transitory signal bearing medium version of the information storage subsystem s200 is depicted in FIG. 110 as bearing the one or more direct modify soften instructions i1226 that when executed will direct performance of the operation o1226. Furthermore, the direct modify soften electrical circuitry arrangement ("elec circ arrange") e1226, when activated, will perform the operation o1226. Also, the direct modify soften module m1226, when executed and/or activated, will direct performance of and/or perform the operation o1226. For instance, in one or more exemplary implementations, the one or more direct modify soften instructions i1226, when executed, direct performance of the operation o1226 in the illustrative depiction as follows, and/or the direct modify soften electrical circuitry arrangement e1226, when activated, performs the operation o1226 in the illustrative depiction as follows, and/or the direct modify soften module m1226, when executed and/or activated, directs performance of and/or performs the operation o1226 in the illustrative depiction as follows, and/or the operation o1226 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including changing, and/or etc.) one or more properties (e.g. including structural texture, and/or etc.) of the one or more portions of the one or more ingestible substrate structures by at least partially softening (e.g. including softening through assembly of ingestible parts to form at least in part the substrate structure, and/or etc.) the one or more portions of the one or more ingestible substrate structures (e.g. one or more rectangular structures, etc.) to form (e.g. including assemble fabricate, layer, make, and/or etc.) at least in part the one or more selected ingestible products.

In one or more implementations, as shown in FIG. 158, operation o12 includes an operation o1227 for electronically directing control of the one or more subsequent ingestible substrate structure directed energy operations to treat at least in part the one or more portions of the one or more ingestible substrate structures to influence at least in part one or more properties of the one or more portions of the one or more ingestible substrate structures by at least partially compressing the one or more portions of the one or more ingestible substrate structures to form at least in part the one or more selected ingestible products. Origination of an illustratively derived direct modify compress component group can be accomplished through skilled in the art design choice selection of one or more of the above depicted components from one or more of the above depicted subsystems shown in FIG. 18. Components from the direct modify compress component group can be used in implementing execution of the one or more direct modify compress instructions i1227 of FIG. 110, can be used in performance of the direct modify compress electrical circuitry arrangement e1227 of FIG. 103, and/or can be used in otherwise fulfillment of the operation o1227. An exemplary non-transitory signal bearing medium version of the information storage subsystem s200 is depicted in FIG. 110 as bearing the one or more direct modify compress instructions i1227 that when executed will direct performance of the operation o1227. Furthermore, the direct modify compress electrical circuitry arrangement ("elec circ arrange") e1227, when activated, will perform the operation o1227. Also, the direct modify compress module m1227, when executed and/or activated, will direct performance of and/or perform the operation o1227. For instance, in one or more exemplary implementations, the one or more direct modify compress instructions i1227, when executed, direct performance of the operation o1227 in the illustrative depiction as follows, and/or the direct modify compress electrical circuitry arrangement e1227, when activated, performs the operation o1227 in the illustrative depiction as follows, and/or the direct modify compress module m1227, when executed and/or activated, directs performance of and/or performs the operation o1227 in the illustrative depiction as follows, and/or the operation o1227 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including decreasing, and/or etc.) one or more properties (e.g. including structural texture including rigidity, and/or etc.) of the one or more portions of the one or more ingestible substrate structures by at least partially compressing (e.g. including increasing rigidity through assembly of ingestible parts, and/or etc.) the one or more portions of the one or more ingestible substrate structures (e.g. one or more sheets, etc.) to form (e.g. including assemble fabricate, layer, make, and/or etc.) at least in part the one or more selected ingestible products.

In one or more implementations, as shown in FIG. 159, operation o12 includes an operation o1228 for electronically directing control of the one or more subsequent ingestible substrate structure directed energy operations to treat at least in part the one or more portions of the one or more ingestible substrate structures to influence at least in part one or more properties of the one or more portions of the one or more ingestible substrate structures by at least partially hardening for the one or more portions of the one or more ingestible substrate structures to form at least in part the one or more selected ingestible products. Origination of an illustratively derived direct modify harden component group can be accomplished through skilled in the art design choice selection of one or more of the above depicted components from one or more of the above depicted subsystems shown in FIG. 18. Components from the direct modify harden component group can be used in implementing execution of the one or more direct modify harden instructions i1228 of FIG. 110, can be used in performance of the direct modify harden electrical circuitry arrangement e1228 of FIG. 103, and/or can be used in otherwise fulfillment of the operation o1228. An exemplary non-transitory signal bearing medium version of the information storage subsystem s200 is depicted in FIG. 110 as bearing the one or more direct modify harden instructions i1228 that when executed will direct performance of the operation o1228. Furthermore, the direct modify harden electrical circuitry arrangement ("elec circ arrange") e1228, when activated, will perform the operation o1228. Also, the direct modify harden module m1228, when executed and/or activated, will direct performance of and/or perform the operation o1228. For instance, in one or more exemplary implementations, the one or more direct modify harden instructions i1228, when executed, direct performance of the operation o1228 in the illustrative depiction as follows, and/or the direct modify harden electrical circuitry arrangement e1228, when activated, performs the operation o1228 in the illustrative depiction as follows, and/or the direct modify harden module m1228, when executed and/or activated, directs performance of and/or performs the operation o1228 in the illustrative depiction as follows, and/or the operation o1228 is otherwise carried out in the illustrative depiction as follows: electronically directing control of the one or more subsequent ingestible substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including changing, and/or etc.) one or more properties (e.g. including structural texture, and/or etc.) of the one or more portions of the one or more ingestible substrate structures by at least partially hardening (e.g. including hardening through assembly of ingestible parts, and/or etc.) for the one or more portions of the one or more ingestible substrate structures (e.g. one or more pasta structures, etc.) to form (e.g. including assemble fabricate, layer, make, and/or etc.) at least in part the one or more selected ingestible products.

In one or more implementations, as shown in FIG. 159, operation o12 includes an operation o1229 for electronically directing control of the one or more subsequent substrate structure directed energy operations to treat at least in part the one or more portions of the one or more ingestible substrate structures to influence at least in part one or more properties of the one or more portions of the one or more ingestible substrate structures by at least partially forming patterns for the one or more portions of the one or more ingestible substrate structures to form at least in part the one or more selected ingestible products. Origination of an illustratively derived direct modify patterning component group can be accomplished through skilled in the art design choice selection of one or more of the above depicted components from one or more of the above depicted subsystems shown in FIG. 18. Components from the direct modify patterning component group can be used in implementing execution of the one or more direct modify patterning instructions i1229 of FIG. 110, can be used in performance of the direct modify patterning electrical circuitry arrangement e1229 of FIG. 103, and/or can be used in otherwise fulfillment of the operation o1229. An exemplary non-transitory signal bearing medium version of the information storage subsystem s200 is depicted in FIG. 110 as bearing the one or more direct modify patterning instructions i1229 that when executed will direct performance of the operation o1229. Furthermore, the direct modify patterning electrical circuitry arrangement ("elec circ arrange") e1229, when activated, will perform the operation o1229. Also, the direct modify patterning module m1229, when executed and/or activated, will direct performance of and/or perform the operation o1229. For instance, in one or more exemplary implementations, the one or more direct modify patterning instructions i1229, when executed, direct performance of the operation o1229 in the illustrative depiction as follows, and/or the direct modify patterning electrical circuitry arrangement e1229, when activated, performs the operation o1229 in the illustrative depiction as follows, and/or the direct modify patterning module m1229, when executed and/or activated, directs performance of and/or performs the operation o1229 in the illustrative depiction as follows, and/or the operation o1229 is otherwise carried out in the illustrative depiction as follows: electronically directing control of the one or more subsequent substrate structure duct operations (e.g. including flowing liquids, gases, fluidized powders, microfluidics, and/or etc. through tubes, channels, conduits, raceways, piping, and/or etc. located internally within one or more portions of one or more substrate structures, located externally to one or more portions of one or more substrate structures, and/or etc. located internally within packaging such as packaging containing one or more portions of one or more substrate structures, and/or etc.) to treat (including processing, changing, modifying, supplementing, refining, amplifying, enhancing, acting upon, exposing, reacting with, integrating with, and/or etc.) at least in part the one or more portions of the one or more ingestible substrate structures to influence at least in part (e.g. including increasing, and/or etc.) one or more properties (e.g. including structural texture, and/or etc.) of the one or more portions of the one or more ingestible substrate structures by at least partially forming patterns (e.g. including adding and/or changing surface and/or internal patterns through assembly of ingestible parts, and/or etc.) for the one or more portions of the one or more ingestible substrate structures (e.g. one or more pasta structures, etc.) to form (e.g. including assemble fabricate, layer, make, and/or etc.) at least in part the one or more selected ingestible products.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The one or more instructions discussed herein may be, for example, computer executable and/or logic-implemented instructions. In some implementations, signal-bearing medium as articles of manufacture may store the one or more instructions. In some implementations, the signal bearing medium may include a computer-readable medium. In some implementations, the signal-bearing medium may include a recordable medium. In some implementations, the signal-bearing medium may include a communication medium.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture (limited to patentable subject matter under 35 USC 101). Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof (limited to patentable subject matter under 35 U.S.C. 101). In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure (limited to patentable subject matter under 35 USC 101). In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although user XXX is shown/described herein as a single illustrated figure, those skilled in the art will appreciate that user XXX may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scalable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system, comprising:

an ingestible product preparation machine including at least one injection treatment assembly configured for one or more liquid injection operations and including at least one food printing assembly;

at least one microprocessor coupled with the ingestible product preparation machine; and at least one non-transitory computer-readable medium including at least one or more operations which, when executed by the at least one microprocessor, cause the at least one microprocessor to perform one or more operations including at least:

receiving at least some identifying data related to a user and one or more food selections selected from a menu of food items by the user;

directing one or more applied forces via one or more objects onto one or more ingestible substrate portions based at least in part on the one or more food selections;

printing, using the at least one food printing assembly, one or more layers of food material onto the one or more ingestible substrate portions based at least in part on the one or more food selections;

injecting, using the at least one injection treatment assembly, one or more liquid materials proximate to at least one of the one or more layers of food material or the one or more ingestible substrate portions based at least in part on at least one indication of one or more user preferences of the user for steaming obtained in association with the at least some identifying data; and directing at least some heat to steam at least in part at least one of the one or more layers of food material or the one or more ingestible substrate portions using the one or more liquid materials.

2. The system of claim 1, wherein injecting, using the at least one injection treatment assembly, one or more liquid materials proximate to at least one of the one or more layers of food material or the one or more ingestible substrate portions based at least in part on at least one indication of one or more user preferences of the user for steaming obtained in association with the at least some identifying data comprises:

injecting, via one or more needle-based injections, the one or more liquid materials proximate to the at least one of the one or more layers of food material or the one or more ingestible substrate portions based at least in part on the at least one indication of the one or more user preferences of the user for steaming obtained in association with the at least some identifying data.

3. The system of claim 1, wherein injecting, using the at least one injection treatment assembly, one or more liquid materials proximate to at least one of the one or more layers of food material or the one or more ingestible substrate portions based at least in part on at least one indication of one or more user preferences of the user for steaming obtained in association with the at least some identifying data comprises:

injecting, via one or more jet-based injections, the one or more liquid materials proximate to the at least one of the one or more layers of food material or the one or more ingestible substrate portions based at least in part on the at least one indication of the one or more user preferences of the user for steaming obtained in association with the at least some identifying data.

4. The system of claim 3, wherein injecting, via one or more jet-based injections, the one or more liquid materials proximate to the at least one of the one or more layers of food material or the one or more ingestible substrate portions based at least in part on the at least one indication of the one or more user preferences of the user for steaming obtained in association with the at least some identifying data comprises:

controlling one or more pressurized air jets of the at least one injection treatment assembly of the ingestible product preparation machine to inject the one or more liquid materials proximate to the at least one of the one or more layers of food material or the one or more ingestible substrate portions based at least in part on the at least one indication of the one or more user preferences of the user for steaming obtained it association with the at least some identifying data.

5. The system of claim 1, wherein printing, using the at least one food printing assembly, one or more layers of food material onto the one or more ingestible substrate portions based at least in part on the one or more food selections comprises:

flowing one or more fluids through one or more ducts to treat at least in part one or more portions of the one or more ingestible substrate portions.

6. The system of claim 5, wherein flowing one or more fluids through one or more ducts to treat at least in part one or more portions of the one or more ingestible substrate portions comprises:

flowing the one or more fluids through the one or more ducts, the one or more ducts at least one of (a) having one or more dissolvable surfaces, (b) configured with one or more matrices, (c) having tubular duct arrangements, or (d) being internally located within the one or more ingestible substrate portions, to treat at least in part the one or more portions of the one or more ingestible substrate portions.

7. The system of claim 1, wherein directing one or more applied forces via one or more objects onto one or more ingestible substrate portions based at least in part on the one or more food selections comprises:

directing the one or more applied forces via the one or more objects to form the one or more ingestible substrate portions including at least one or more wafer portions based at least in part on the one or more food selections.

8. The system of claim 1, wherein injecting, using the at least one injection treatment assembly, one or more liquid materials proximate to at least one of the one or more layers of food material or the one or more ingestible substrate portions based at least in part on at least one indication of one or more user preferences of the user for steaming obtained in association with the at least some identifying data comprises:

injecting the one or more liquid materials through one or more externally positioned ducts adjacent to the at least one of the one or more layers of food material or the one or more ingestible substrate portions based at least in part on the at least one indication of the one or more user preferences of the user for steaming obtained in association with the at least some identifying data.

9. The system of claim 1, wherein directing at least some heat to steam at least in part at least one of the one or more layers of food material or the one or more ingestible substrate portions using the one or more liquid materials comprises:

directing at least some acoustic energy to heat, using the acoustic energy, the one or more liquid materials proximate to the at least one of the one or more layers of food material or the one or more ingestible substrate portions.

10. A system, comprising:

at least one processing device; and at least one non-transitory computer-readable medium including at least one or more instructions that, when executed by the at least one processing device, cause the at least one processing device to perform one or more operations including at least:

receiving at least some identifying data related to a user and one or more food selections selected from a menu of food items by the user;

directing one or more applied forces via one or more objects onto one or more ingestible substrate portions based at least in part on the one or more food selections;

printing, using at least one food printing assembly of an ingestible product preparation machine coupled to the at least one processing device, one or more layers of food material onto the one or more ingestible substrate portions based at least in part on the one or more food selections;

injecting, using at least one injection treatment assembly of the ingestible product preparation machine coupled to the at least one processing device, one or more liquid materials proximate to at least one of the one or more layers of food material or the one or more ingestible substrate portions based at least in part on at least one indication of one or more user preferences of the user for steaming obtained in association with the at least some identifying data; and directing at least some heat to steam at least in part at least one of the one or more layers of food material or the one or more ingestible substrate portions using the one or more liquid materials.

11. The system of claim 1, wherein receiving at least some identifying data related to a user and one or more food selections selected from a menu of food items by the user comprises:

receiving the one or more user preferences of the user for a type of preparation of one or more ingestible products prepared by the ingestible product preparation machine using the one or more ingestible substrate portions and the one or more layers of food material.

12. The system of claim 1, wherein injecting, using the at least one injection treatment assembly, one or more liquid materials proximate to at least one of the one or more layers of food material or the one or more ingestible substrate portions based at least in part on at least one indication of one or more user preferences of the user for steaming obtained in association with the at least some identifying data comprises:

injecting, using the at least one injection treatment assembly, the one or more liquid materials into the at least one of the one or more layers of food material or the one or more ingestible substrate portions based at least in part on the at least one indication of the one or more user preferences of the user for steaming.

13. The system of claim 1, wherein directing at least some heat to steam at least in part at least one of the one or more layers of food material or the one or more ingestible substrate portions using the one or more liquid materials comprises:

controlling movement of at least one movable energy emitter of the ingestible product preparation machine to focus the at least some heat on the one or more liquid materials proximate to the at least one of the one or more layers of food material or the one or more ingestible substrate portions to steam at least in part the at least one of the one or more layers of food material or the one or more ingestible substrate portions using the one or more liquid materials.

14. A system, comprising:

at least one processing device; and at least one non-transitory computer-readable medium including at least one or more instructions that, when executed by the at least one processing device, cause the at least one processing device to perform one or more operations including at least:

receiving at least some identifying data related to a user and one or more food selections selected from a menu of food items by the user;

directing one or more applied forces via one or more objects onto one or more ingestible substrate portions based at least in part on the one or more food selections;

printing, using at least one food printing assembly, one or more layers of food material onto the one or more ingestible substrate portions based at least in part on the one or more food selections;

injecting, using at least one injection treatment assembly, one or more liquid materials proximate to at least one of the one or more layers of food material or the one or more ingestible substrate portions based at least in part on at least one indication of one or more user preferences of the user for steaming obtained in association with the at least some identifying data; and directing at least some heat to steam at least in part at least one of the one or more layers of food material or the one or more ingestible substrate portions using the one or more liquid materials.

15. The system of claim 1, wherein directing at least some heat to steam at least in part at least one of the one or more layers of food material or the one or more ingestible substrate portions using the one or more liquid materials comprises:

directing the at least some heat to create at least some adiabatic steam for steaming at least in part the at least one of the one or more layers of food material or the one or more ingestible substrate portions using the one or more liquid materials.

16. The system of claim 1, wherein injecting, using the at least one injection treatment assembly, one or more liquid materials proximate to at least one of the one or more layers of food material or the one or more ingestible substrate portions based at least in part on at least one indication of one or more user preferences of the user for steaming obtained in association with the at least some identifying data comprises:

causing one or more injection probes configured to pierce the at least one of the one or more layers of food material or the one or more ingestible substrate portions to be inserted into the at least one of the one or more layers of food material or the one or more ingestible substrate portions; and causing the one or more liquid materials to flow through the one or more injection probes into the at least one of the one or more layers of food material or the one or more ingestible substrate portions for use in steaming an ingestible product made with the at least one of the one or more layers of food material or the one or more ingestible substrate portions for the user.

17. The system of claim 1, wherein printing, using the at least one food printing assembly, one or more layers of food material onto the one or more ingestible substrate portions based at least in part on the one or more food selections comprises:

printing the one or more layers of food material onto the one or more ingestible substrate portions including at least leaving one or more channels within the one or more layers of food material for receiving the one or more liquid materials in one or more subsequent operations of injection of the one or more liquid materials.

18. The system of claim 1, wherein directing one or more applied forces via one or more objects onto one or more ingestible substrate portions based at least in part on the one or more food selections comprises:

directing one or more applied forces through one or more contact objects onto the one or more ingestible substrate portions based at least in part on the one or more food selections.

19. The system of claim 18, wherein directing one or more applied forces through one or more contact objects onto the one or more ingestible substrate portions based at least in part on the one or more food selections comprises:

directing one or more applied forces through one or more projection surfaces as the one or more contact objects onto the one or more ingestible substrate portions based at least in part on the one or more food selections.

20. The system of claim 19, wherein directing one or more applied forces through one or more projection surfaces as the one or more contact objects onto the one or more ingestible substrate portions based at least in part on the one or more food selections comprises:

directing one or more applied forces through the one or more projection surfaces onto the one or more ingestible substrate portions to create one or more channels in the one or more ingestible substrate portions for receiving the one or more liquid materials in one or more subsequent operations of injection of the one or more liquid materials based at least in part on the one or more food selections.

* * * * *